April 19, 1966  D. P. FITZSIMMONS ETAL  3,247,372
AUTOMATIC CONTROL SYSTEM FOR RAILWAY
CLASSIFICATION YARDS
Filed Aug. 7, 1957  67 Sheets-Sheet 1

INVENTORS.
David P. Fitzsimmons and
William A. Robison Jr.
BY W. L. Stout
THEIR ATTORNEY INVENTORS.
David P. Fitzsimmons and
William A. Robison Jr.
BY W. L. Stout
THEIR ATTORNEY INVENTORS.
David P. Fitzsimmons and
William A. Robison Jr.
BY
THEIR ATTORNEY INVENTORS.
David P. Fitzsimmons and
William A. Robison Jr.
BY W. L. Stout
THEIR ATTORNEY INVENTORS.
David P. Fitzsimmons and
William A. Robinson Jr.
BY W. L. Stout
THEIR ATTORNEY

Fig. 17.

INVENTORS.
David P. Fitzsimmons and
William A. Robison Jr.
BY W. L. Stout
THEIR ATTORNEY April 19, 1966  D. P. FITZSIMMONS ETAL  3,247,372
AUTOMATIC CONTROL SYSTEM FOR RAILWAY
CLASSIFICATION YARDS
Filed Aug. 7, 1957 67 Sheets-Sheet 61

INVENTORS.
David P. Fitzsimmons and
William A. Robison Jr.
BY
W. L. Strat.
THEIR ATTORNEY INVENTORS.
David P. Fitzsimmons and
William A. Robison Jr.
BY W. L. Stout
THEIR ATTORNEY INVENTORS.
David P. Fitzsimmons and
William A. Robison Jr.
BY
W. L. Stout
THEIR ATTORNEY April 19, 1966  D. P. FITZSIMMONS ETAL  3,247,372
AUTOMATIC CONTROL SYSTEM FOR RAILWAY
CLASSIFICATION YARDS
Filed Aug. 7, 1957  67 Sheets-Sheet 64

INVENTORS.
David P. Fitzsimmons and
William A. Robison Jr.
BY W. L. Strut.
THEIR ATTORNEY INVENTORS.
David P. Fitzsimmons and
William A. Robison Jr.
BY
W. L. Stout.
THEIR ATTORNEY INVENTORS
David P. Fitzsimmons and
William A. Robinson Jr.
BY
W. L. Stout
THEIR ATTORNEY : 3,247,372
Patented Apr. 19, 1966

3,247,372
AUTOMATIC CONTROL SYSTEM FOR RAILWAY
CLASSIFICATION YARDS
David P. Fitzsimmons, Trafford, and William A. Robison, Jr., Pittsburgh, Pa., assignors to Westinghouse Air Brake Company, Wilmerding, Pa., a corporation of Pennsylvania
Filed Aug. 7, 1957, Ser. No. 676,730
31 Claims. (Cl. 246—182)

Our invention relates to railway classification yards, and in particular to an improved automatic control system therefor.

For many years, the dual problems of speed of classification of freight cars in railway classification yards, and the damage to lading incident to the coupling of cars in the body tracks of such yards at unduly high velocities, have prevented railroads from taking full economic advantage of their yards. The older practice, and that still followed in some instances, was to station brakemen on the individual cars or cuts of cars which were brought into the classification yard, and to position the switches to line up the route for each cut in response to the control of an operator stationed in a central tower, or even to provide individual switchmen to set the switches. The switching operations have been made faster and more economical in recent years by the use of automatic switching systems of a type now well known in the art. The problem of braking individual cuts from the initial speed at the hump to a suitable coupling velocity on the selected body track has been attacked by placing retarders at selected points along the tracks which can be controlled from a central tower, in accordance with the judgement of a skilled operator, to brake the cars in their progress through the yard. There have been attempts to control these breaking operations in dependence upon the various factors affecting the performance of a car, such as its weight, which have been more or less successful in providing suitable speed control, but which have been greatly influenced by the skill and judgment of the operator; and which, in many instances, lead to considerable damage to lading occasioned by improper coupling velocities, or to lost time in the yard due to cars which stall before coupling. A need, therefore, has long existed for an accurate and rapid system for directing cars through a classification yard to their designated body tracks, at the same time adjusting their speeds accurately to suitable values for coupling. Accordingly, it is an object of our invention to provide an automatic control system for classification yards which will perform both of these functions in an accurate and efficient manner without the need for constant supervision by a highly skilled operator.

It is a further object of our invention to provide an automatic control system for classification yards which makes use of simple and reliable equipment capable of accurate operation for extended periods of time without the need for continual calibration and maintenance.

It is a further object of our invention to provide an automatic classification system which is made up of a few standardized components which can be combined in the manner prescribed by our invention to build up a control system for a particular classification yard without the need for extensive redesign to take care of the problems peculiar to each yard.

It is a more particular object of our invention to provide a control system for classification yards having a master retarder and one or more group retarders, in which means are provided for measuring the rolling resistance of each cut of one or more cars, means are provided for controlling the speed of cuts leaving the master retarder to a desired preselected value, and means are provided for controlling the speed of cuts leaving the group retarders in accordance with the measured rolling resistance of each cut to values suitable for safe coupling of the cuts with the preceding cars on the selected body tracks.

It is a further object of our invention to provide a control system comprising in combination means for automatically directing a car to a selected destination and means for controlling its speed at the destination to a predetermined value.

Other objects and further advantages of our invention will in part appear and in part be obvious to those skilled in the art as the description proceeds.

In practicing our invention, we prefer to measure the rolling resistance of each cut of one or more cars on tangent track at one location and to measure the rolling resistance on curved track at a separate location, since we have found that while the rolling resistance of a cut on tangent track is substantially constant, the rolling resistance on curved track cannot be correlated with the tangent value, but can be correlated from curve to curve by a relatively simple relationship.

The group retarder offers the last opportunity for the correction of the speed of each cut of cars before it reaches the designated body track. Accordingly, the problem of selecting the leaving speed of a cut of cars from a group retarder so that it will couple with the preceding cars on the designated body track at a safe speed is essentially one of predicting the performance of the cut from the point at which it leaves the group retarder to the point of coupling. This distance traversed by each cut consists of a curved portion including one or more switches, and a tangent portion which is longer or shorter in accordance with the fullness of the body track to which the cut is directed. Since the control of the speed of the cut in the group retarder must be accomplished before the cut leaves the group retarder, we provide suitable curved and tangent measuring sections ahead of these retarders for measuring the rolling resistances on curved and tangent track, a computer for correlating the rolling resistances on the measuring sections with those on the tangent sections, and means for storing and transferring these measurements to the computer at the proper time. The computer includes means for taking into account the track fullness of the body track to which the particular cut is routed, the weight of each cut, and the length of each cut. In accordance with one embodiment of our invention, the master retarder is used to bring the speed of the cuts down to a fixed value selected in accordance with the weight of each cut and the over-all operating conditions of the yard, while the group retarders are used to bring the speed of each cut down to the computed leaving speed.

We have found that previously existing retarder controls were not sufficiently accurate, and were too slow in operation, to take full advantage of the accuracy which the other components of our system can provide. Therefore, we have provided an improved speed control for use in the retarders which has a speed and accurary compatible with the other components of the system, as will hereinafter appear.

We shall first describe one embodiment of our invention, and shall then point out the novel features thereof in claims.

In describing our invention in detail, reference will be made to the accompanying drawings, in which corresponding parts are identified by corresponding reference characters, and in which:

FIGS. 1 and 2, when arranged side by side with FIG. 1 at the left, comprise a schematic diagram of a typical classification yard chosen to illustrate one embodiment of our invention;

FIG. 3 is a schematic drawing showing a car on a typical stretch of track in a gravity operated classification yard of the type shown in FIGS. 1 and 2;

FIGS. 4, 5 and 6, when arranged vertically side by side in numerical order, comprise a schematic diagram illustrating the mathematical operations performed in our control system;

FIGS. 7 through 14, when arranged vertically side by side in numerical order, comprise a schematic diagram of positions of one embodiment of our invention as applied to a classification yard of the type shown in FIGS. 1 and 2, illustrating the transfer of information through the yard;

FIG. 17 is a chart showing the manner in which FIGS. 18 through 68 should be arranged in order to disclose in detail one embodiment of our invention;

Figure 69:
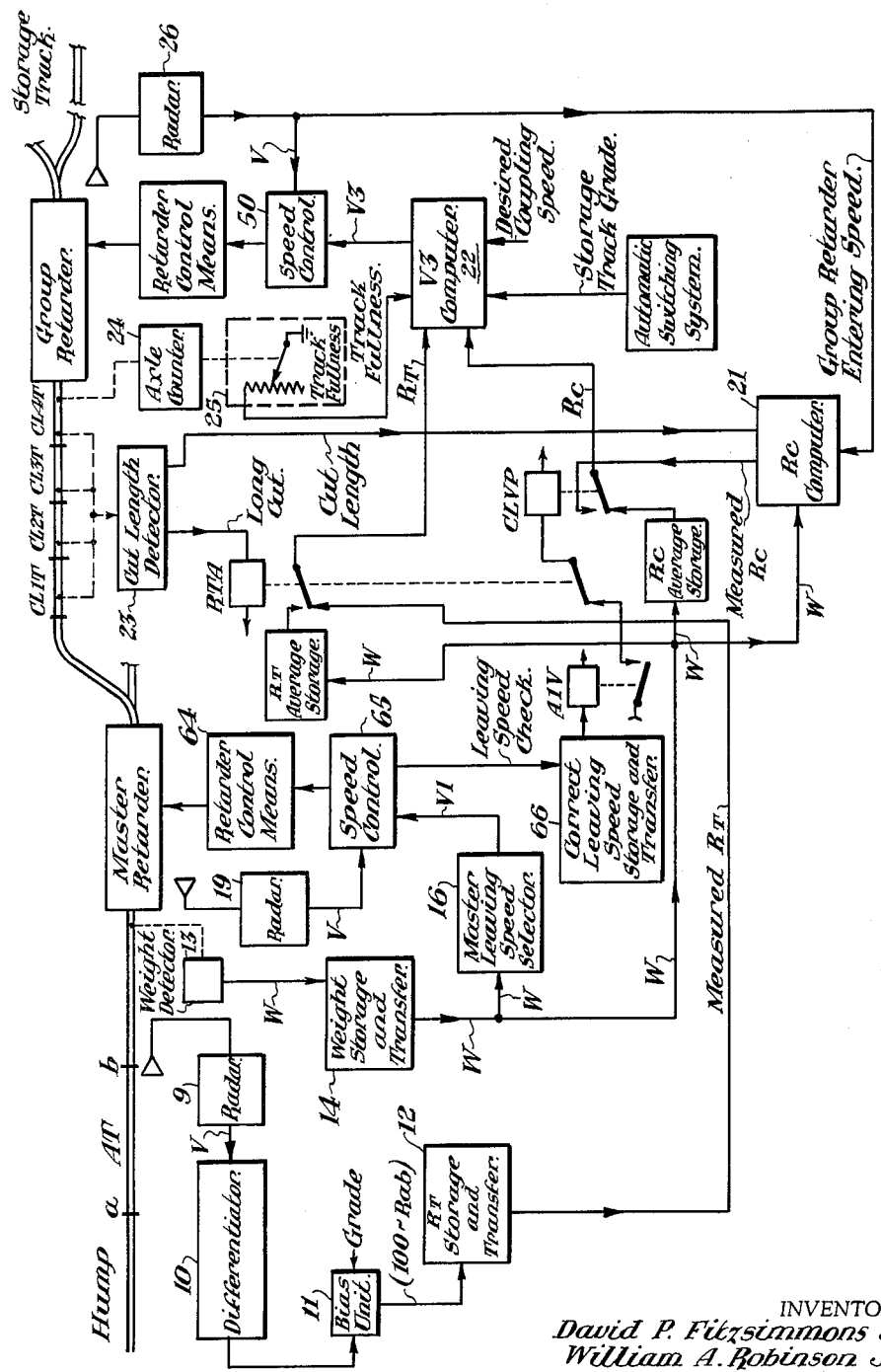

FIGS. 18 through 68, when arranged in the manner shown in FIG. 17, comprise a schematic wiring diagram of one embodiment of our invention; and FIG. 69 is a functional block diagram of the system of our invention, providing on a single drawing sheet a simplified schematic showing of the complete system to assist in the understanding of the disclosure.

In the drawings generally, a number of conventions have been adopted in order to simplify the description. First, since the power supplies employed in our apparatus may be of conventional construction, they have not been shown in detail. Most of the apparatus shown in the drawings can be operated from a conventional 24 volt D.C. power supply. This power supply is indicated throughout the drawings by the arrow symbols representing battery terminals, with the positive terminal of the battery represented by the reference character B and the negative terminal represented by the reference character N. Where the other voltages, or separate D.C. power supplies, are required, these sources have been indicated by conventional battery symbols having polarities marked thereon. In order to avoid duplicating leads throughout the drawings, a common reference has been chosen for these auxiliary power supplies, which is shown by the ground symbol in the drawings. It may be assumed that this ground symbol represents the same potential wherever it appears. Where alternating current energy is necessary in the operation of our apparatus, the source is indicated schematically by the arrow symbols employed for the 24-volt D.C. power supply, except that the terminals are indicated by the characters BX and NX, which have no polarity significance.

Since the apparatus employed in the illustrated embodiment of our invention is constructed in a large part of similar units used together to build up a system in accordance with our invention, many circuits are repeated in the illustrated embodiment, even though we have shown only a very simple yard for the purposes of reducing this duplication to a minimum. Accordingly, we have further adopted the convention of showing solid or dotted line blocks around components of our system which perform unit functions or which function together, and where leads enter or leave these blocks, we have arbitrarily shown terminals to which letter reference characters have been assigned. This convention is adopted purely for convenience in describing similar components and circuits, and should be given no physical significance. In particular, in practice our apparatus is rack-mounted in modules whose components have been chosen for engineering convenience, and such modules do not necessarily correspond to the blocks shown in the drawing, which were chosen merely for convenience in description. Further, while we have illustrated our apparatus by showing it in connection with a track plan, with the apparatus arranged roughly in accordance with its function in connection with such track plan, it will be appreciated by those skilled in the art that in practice most of this apparatus would be located in a single instrument house and would be arranged for engineering convenience and not necessarily in accordance with the functions which the individual components perform.

Figure 1:
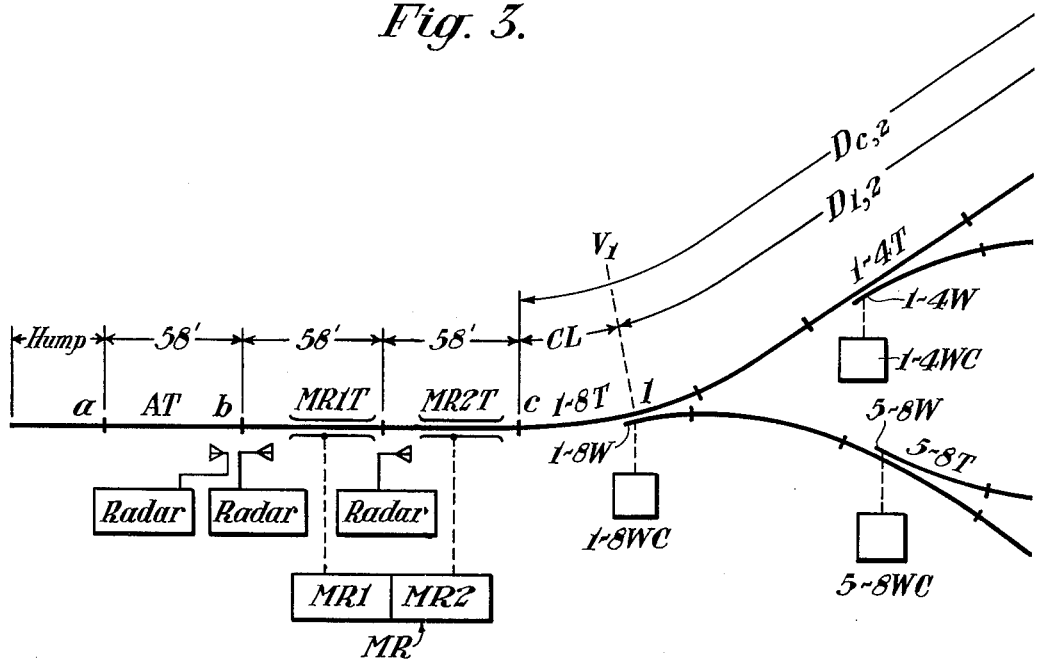
Figure 2:
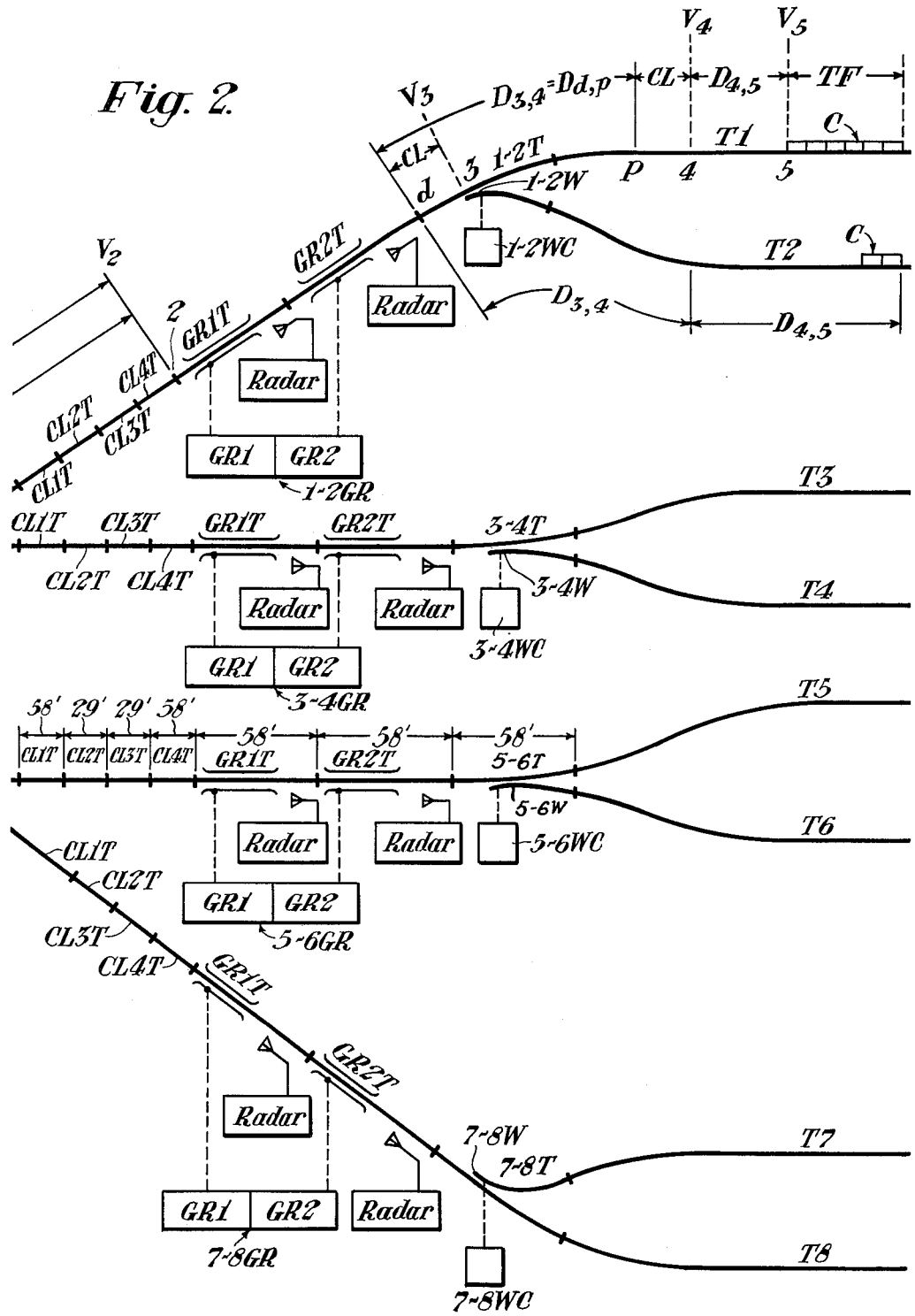

Referring now to FIGS. 1 and 2, there is shown a typical track plan for a classification yard equipped with the control system of our invention. For simplicity, only eight body tracks T1 to T8 are shown, providing eight routes controlled by seven switches 1–8W, 1–4W, etc., having detector track sections 1–8T, 1–4T, etc., and switch controls 1–8WC, 1–4WC, etc. The speed of cuts traversing the yard is controlled by a master retarder MR and four group retarders 1–2GR, 3–4GR, 5–6GR and 7–8GR.

It will be apparent that in an actual yard sixty or more body tracks might be provided, in which case the number of switches, switch controls and retarders would be correspondingly increased. Further, while only one switch is shown following each group retarder and only two switches are shown between the master retarder and each group retarder, in practice several additional switches in series might be employed at these locations. It should also be noted that intermediate retarders may be employed between the master and group retarders if so desired, within the scope of our invention. However, for simplicity such retarders have not been shown, since in such a case the controls for the intermediate retarders would be similar to those hereinafter shown for the master retarder. As will appear, these and other modifications in the yard layout may be accounted for in the practice of our invention by making use of basic building blocks arranged in the novel combination hereinafter described to control a yard of any desired size.

Referring again to FIGS. 1 and 2, the speed of cuts entering the yard is initially controlled to a value sufficient to enable the slowest roller to reach its destination by a hump track, to the crest of which cuts are propelled by conventional means. A cut rolling down the hump first traverses an approach track section AT defined by insulated joints located at $a$ and $b$ in a known manner. This section is used, in conjunction with a radar unit having its antenna located adjacent point $b$ and facing up the hump as shown, to measure the tangent track rolling resistance of the cut, as will hereinafter appear. Section AT has a length such that it cannot be spanned by the wheels of a single car. In practice, this length may be 58 feet, as shown. This length may also be chosen for the other track circuit sections in the yard, as shown by the typical value in FIGS. 1 and 2, with the exceptions to be hereinafter described.

Following section AT is track section MR1T, which includes the first section MR1 of a master retarder MR. The speed of cuts in this section is measured by a radar unit having its antenna located adjacent point $b$ and facing down the yard as shown. A second track section MR2T includes section MR2 of master retarder MR. The speed of cuts in section MR2T is measured by a radar unit having its antenna located adjacent the insulated joints separating sections MR1T and MR2T and facing down the yard as shown. As will hereinafter appear, the speed measurements made by these radar units are used, in conjunction with control apparatus associated with master retarder sections MR1 and MR2, to control the speed of cuts leaving retarder MR to a value $V_1$, selected in accordance with the weight of the cut and the position of a lever adjusted to reflect the prevailing conditions in the yard.

Cuts entering switch detector track section 1–8T are directed to switch 1–4W or switch 5–8W in accordance with a route code supplied to switch control 1–8WC by conventional automatic switching equipment, hereinafter described in more detail.

Cuts routed to switch 1–4W are routed to group retarder 1–2GR or 3–4GR, and cuts routed to switch 5–8W are routed to group retarder 5–6GR or 7–8GR, in accordance with the code supplied to switch control means 1–4WC and 5–8WC by the above-mentioned automatic switching equipment.

If the operation of master retarder MR has been correct, a cut will have the preselected speed $V_1$ when the front of the cut is at point 1, which is displaced from the end of master retarder MR by the length of the cut CL. CL is measured by circuitry, to be described, which is associated with a group of four track sections CL1T, CL2T, CL3T and CL4T, which are located in the immediate approach to each group retarder. As shown for the 5–6 location in FIG. 2, sections CL1T and CL4T may be 58 feet long, while sections CL2T and CL3T may be 29 feet long, for purposes to be described.

Each of group retarders 1–2GR, 3–4GR, 5–6GR, and 7–8GR comprises two operating sections GR1 and GR2, which are located in track sections GR1T and GR2T, respectively. At the end of each of the group retarder track sections is located the antenna of a radar unit, these antennas being located facing up the track as shown. The radar unit for GR1T at each of the group retarder locations is used to measure the speed V2 of cuts approaching the retarders as well as to measure the speed of cuts in section GR1T. The second radar unit is used to measure the speed of cuts in section GR2T of each group retarder.

The group retarders are controlled by apparatus, to be described, associated with sections GR1 and GR2 of the retarder, in accordance with the measured speed and the weight of each cut, to release the cuts at suitable calculated by computer apparatus to be described in detail below.

The switches following the group retarders are positioned by automatic switching equipment, previously mentioned, to direct cuts to their proper body tracks, where the cuts roll into contact with preceding cars on the body tracks and are coupled by impact at a preselected coupling speed.

Before describing the control apparatus of our invention in greater detail, an explanation of the theory underlying its operation will be given. For this purpose, reference should be made to FIG. 3, which shows a car C rolling between points $i$ and $j$ on a typical stretch of track T having a grade angle $\alpha$. In considering the behavior of this car, it is convenient to make an energy balance between points $i$ and $j$. The equation for such an energy balance is:

(1) $nI\omega_i^2 + \tfrac{1}{2}m_1V_i^2 + m_1g\Delta h =$
$\qquad nI\omega_j^2 + \tfrac{1}{2}m_1V_j^2 + D_{i,j}\epsilon F_{i,j}$ where $\omega$=angular velocity of wheels, radians/sec.
$I$=moment of inertia of wheels, pounds ft.$^2$
$n$=number of wheels
$m_1$=total mass of car C, pounds
$V_i$, $V_j$= car speed at points $i$ and $j$, feet/sec.
$\Delta h$=difference in level between $i$ and $j$, feet
$D_{i,j}$=distance $i$ to $j$, feet
$\epsilon F_{i,j}$=sum of resisting forces due to friction, etc., pound-ft./sec.

Recalling these fundamental relationships:

$$\Delta h = D_{i,j} \sin \alpha$$
$$I = \tfrac{1}{2} m_2 r_g^2$$
$$\omega_i = \frac{V_i}{r}, \quad \omega_j = \frac{V_j}{r}$$

where $m_2$=mass of wheel, pounds
$r_g$=radius of gyration of wheel, feet
$r$=radius of wheel, feet Equation 1 may be rewritten as:

$$\tfrac{1}{2}m_1(V_j^2 - V_i^2) = \frac{-nm_2 r_g^2}{2} \frac{(V_j^2 - V_i^2)}{r^2} - D_{i,j}\epsilon F_{i,j} +$$
$$m_1 g D_{i,j} \sin \alpha$$

For a car wheel, $r_g \cong r$. Then, $$\tfrac{1}{2}m_1(V_j^2 - V_i^2) = -\frac{nm_2}{2}(V_j^2 - V_i^2) - D_{i,j}\epsilon F_{i,j} +$$
$$m_1 g D_{i,j} \sin \alpha$$

dividing by $$\frac{m_1 g}{2}$$

$$\frac{1}{g}(V_j^2 - V_i^2) = -\frac{nm_2}{gm_1}(V_j^2 - V_i^2) - 2D_{i,j}\frac{\epsilon F_{i,j}}{gm_1} +$$
$$2D_{i,j} \sin \alpha$$

or $$(V_j^2 - V_i^2)\left(1 + \frac{nm_2}{m_1}\right) = 2gD_{i,j}\left[\sin \alpha - \frac{\epsilon F_{i,j}}{m_1 g}\right]$$

multiplying by $$\left(1 - \frac{nm_2}{m_1}\right)(V_j^2 - V_i^2)\left[1 - \left(\frac{nm_2}{m_1}\right)\right]^2$$
$$= 2gD_{i,j}\left[\sin \alpha - \frac{\epsilon F_{i,j}}{m_1 g}\right]\left(1 - \frac{nm_2}{m_1}\right)$$

A typical value for $nm_2$ is 1.5 tons. Since total car weight ranges in the neighborhood of from 20 to 100 tons, for practical purposes $$1 - \left(\frac{nm_2}{m_1}\right)^2 = 1$$

Therefore, $$V_i^2 = V_j^2 - 2gD_{i,j}\left[\sin \alpha - \frac{\epsilon F_{i,j}}{m_1 g}\right]\left(1 - \frac{nm_2}{m_1}\right)$$

Letting $\sin \alpha = G_{i,j}$, the grade factor, $$\frac{nm_2}{m_1} = K_w$$

here termed the inertia correction constant (2) $\qquad V_i^2 = V_j^2 - 2gD_{i,j}\left[G_{i,j} - \dfrac{\epsilon F_{i,j}}{m_1 g}\right](1 - K_w)$ or (2a) $\qquad \dfrac{V_j^2 - V_i^2}{2D_{i,j}} = g\left[G_{i,j} - \dfrac{\epsilon F_{i,j}}{m_1 g}\right](1 - K_w)$ The time required for a car to cover the distance $D_{i,j}$ is $$\Delta T_{i,j} = \frac{D_{i,j}}{V_{\text{ave}\, i,j}}$$

Where $$V_{\text{ave}\, i,j} = \frac{V_i + V_j}{2}$$

Then (3) $\qquad \Delta T_{i,j} = \dfrac{2D_{i,j}}{V_i + V_j}$

Also, the average acceleration (4) $$\alpha_{i,j} = \frac{\Delta V_{i,j}}{\Delta T_{i,j}}$$

therefore, (5) $$\alpha_{i,j} = \frac{V_j^2 + V_i^2}{2D_{i,j}}$$

From equations 2a and 5, (6) $$\alpha_{i,j} = g\left[G_{i,j} - \frac{\epsilon F_{i,j}}{m_1 g}\right](1 - K_w)$$

$\epsilon F_{i,j}$ represents the collected resisting forces acting on the car. This term may be considered to comprise a constant force $F_k$ which is the same for any stretch of tangent track, a variable force $(F_{wd})_{i,j}$ due to wind pressure, and a variable force $(F_{wr})_{i,j}$ which is influenced by weather conditions; that is;

(7) $$\epsilon F_{i,j} = F_k \pm (F_{wd})_{i,j} \pm (F_{wr})_{i,j}$$

$(F_{wr})_{i,j}$ may vary from winter to summer conditions, and in winter, the value at the hump, where the journal bearings of the car are cold, will generally be different from the value in the body track after the car has passed through the retarders and the bearings are warmer. The wind force $(F_{wd})_{i,j}$ may obviously vary from time to time and will depend on the direction of movement of the car relative to the wind direction. Therefore, particularly when the yard curves along a river or runs through hilly country, it may be materially different from the hump value in the body tracks.

Again referring to FIGS. 1 and 2, the particular sections along the track where the above equations will be applied are $a,b$ at the ends of measuring section $\Delta T$; from point 1, at which a cut is released from the master retarder, to point 2 at the entrance of the group retarder; from point 3, at which a cut is released from the group retarder, to point 4, at which the car is completely on tangent track, and from point 4 to the point of coupling. It will be noted that point 1 is displaced by the cut length CL from the end of the master retarder, since the front of the cut is at this point before the cut is released from the retarder. Similarly, point 3 is displaced from the end of the group retarders by CL, but point 4 is also displaced from the point of tangency $p$ by CL, so that the distance between points 3 and 4 is equal to the distance $D_{d,p}$ from the end of the group retarder to the point of tangency and is independent of cut length. The distance $D_{4,5}$ is theoretically shorter than the distance from the point of tangency to the nearest car by CL, but for reasons which will appear as the description proceeds, this correction can be ignored in a practical embodiment of our invention.

Figure 3:
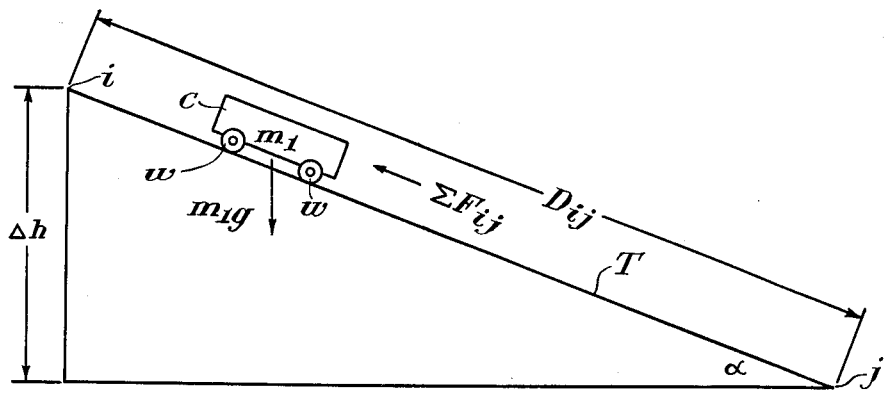

Referring now to FIGS. 1, 2 and 3, and substituting values for the sections shown in FIGS. 1 and 2 in equations 2 and 6, (2a) $$V_4^2 = V_5^2 - 2gD_{4,5}\left(G_{4,5} - \frac{\epsilon F_{4,5}}{m_1 g}\right)(1 - K_w)$$

(6a) $$\alpha_{4,5} = g\left(G_{4,5} - \frac{\epsilon F_{4,5}}{m_1 g}\right)(1 - K_w)$$

(6b) $$\alpha_{a,b} = g\left(G_{a,b} - \frac{\epsilon F_{a,b}}{m_1 g}\right)(1 - K_w)$$

(8) $$\epsilon F_{a,b} = m_1 g\left(G_{a,b} - \frac{\alpha_{a,b}}{g(1 - K_w)}\right)$$

from (7), $$\epsilon F_{a,b} = F_k \pm (F_{wd})_{a,b} \pm (F_{wr})_{a,b}$$

$$\epsilon F_{4,5} = F_k \pm (F_{wd})_{4,5} \pm (F_{wr})_{4,5}$$

Then $$\epsilon F_{4,5} = \epsilon F_{a,b} \pm (F_{wd})_{4,5} \mp (F_{wd})_{a,b} \pm (F_{wr})_{4,5} \mp (F_{wr})_{a,b}$$

(9) $$\epsilon F_{4,5} = \epsilon F_{a,b} \pm \Delta F_{wd} \pm \Delta F_{wr}$$

where $\Delta F_{wd}$, $\Delta F_{wr}$ = difference in wind and weather effects between the measuring section and the body track.

From Equations 8 and 9,

(10) $$\epsilon F_{4,5} = m_1 g\left(G_{a,b} - \frac{\alpha_{a,b}}{g(1 - K_w)}\right) \pm \Delta F_{wd} \pm \Delta F_{wr}$$

From Equations 6a and 10,

(10) $$\alpha_{4,5} = g\left(G_{4,5} - G_{a,b} + \frac{\alpha_{a,b}}{g(1 - K_w)} \mp \frac{\Delta F_{wd}}{m_1 g} \mp \frac{\Delta F_{wr}}{m_1 g}\right)(1 - K_w)$$

or

(11) $$\alpha_{4,5} = g\left(G_{4,5} - G_{a,b} \mp \frac{\Delta F_{wd}}{m_1 g} \mp \frac{\Delta F_{wr}}{m_1 g}\right)(1 - K_w) + \alpha_{a,b}$$

From Equations 2a and 10, $$V_4^2 = V_5^2 - 2gD_{4,5}\left((G_{4,5} - G_{a,b} \mp \frac{\Delta F_{wd}}{m_1 g} \mp \frac{\Delta F_{wr}}{m_1 g})(1 - K_w) + \frac{\alpha_{a,b}}{g}\right)$$

or

(12) $$V_4^2 = V_5^2 - 2gD_{4,5}\left[G_{4,5} - G_{a,b} \mp \frac{\Delta F_{wd}}{m_1 g} \mp \frac{\Delta F_{wr}}{m_1 g} - G_{4,5}K_w + G_{a,b}K_w \pm \frac{\Delta F_{wd}K_w}{m_1 g} \pm \frac{\Delta F_{wr}K_w}{m_1 g} + \frac{\alpha_{a,b}}{g}\right]$$

In order to simplify this equation, the concept of rolling resistance will be introduced. Referring to FIG. 3, an energy balance for a car without resistance would be:

$$\frac{m_1(V_j^2 - V_i^2)}{2} = m_1 g D_{i,j} G_{i,j}$$

or

(13) $$\frac{(V_j^2 - V_i^2)}{2g} = D_{i,j} G_{i,j}$$

The presence of resistance in the car may be considered as a modification of the effective grade; that is, a rear car rolling down a slope of grade factor $G$ may be treated as an ideal car rolling down a slope $G - R$, where $R$ and $G$ are dimensionless. Since $R$ is made up of terms such as $$\epsilon F / m_1 g$$

it may conveniently be considered as having the dimensions of pounds per pound. Then Equation 13 becomes, for a rear car,

(14) $$\frac{V_j^2 - V_i^2}{2g} = D_{i,j}(G_{i,j} - R_{i,j})$$

From Equations 14 and 12,

(15) $$R_{4,5} = G_{a,b} \pm \frac{\Delta F_{wd}}{m_1 g} \pm \frac{\Delta F_{wr}}{m_1 g} + G_{4,5}K_w - G_{a,b}K_w \mp \frac{\Delta F_{wd}K_w}{m_1 g} \mp \frac{\Delta F_{wr}K_w}{m_1 g} - \frac{\alpha_{a,b}}{g}$$

Figure 16:
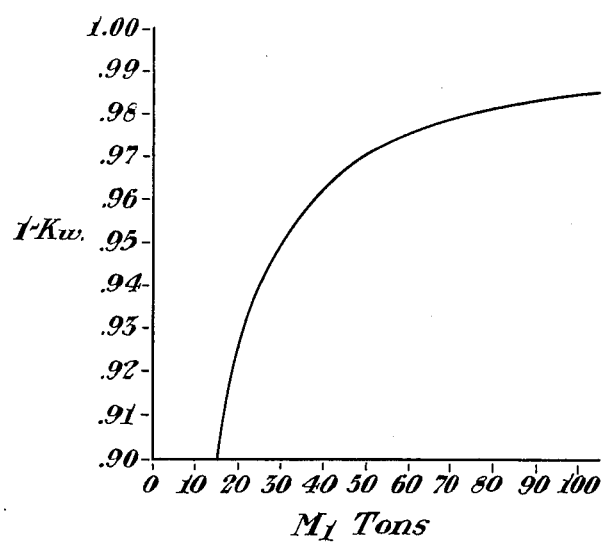
FIG. 16 is a graph of a function used in the illustrated embodiment of our invention to correct for wheel inertia.

FIG. 16 shows a plot of $1 - K_w$ versus car weight in tons for an eight wheel car having wheels of average weight. It can be seen that $K_w$ is a small number between 0 and 0.1 over the range of interest. Since $$\Delta F_{wr}/m_1 g$$

and $$\Delta F_{wd}/m_1 g$$

are also generally small, $$\Delta F_{wr}K_w/m_1 g$$

and $$\Delta F_{wb} K_w / m_1 g$$

can be ignored for all practical purposes. Therefore,

(16) $$R_{4,5} = \left(G_{a,b} - \frac{\alpha_{a,b}}{g}\right) \pm \frac{\Delta F_{wb}}{m_1 g} \pm \frac{\Delta F_{wr}}{m_1 g} + (G_{4,5} - G_{a,b}) K_w$$

Expressed in terms of rolling resistance,

(17) $$G_{a,b} - \frac{\alpha_{a,b}}{g} = R_{ta,b}$$

(18) $$\frac{\Delta F_{wd}}{m_1 g} = R_{wd}$$

(19) $$\frac{\Delta F_{wr}}{m_1 g} = R_{wr}$$

so that

(20) $$R_{4,5} = -(G_{a,b} - G_{4,5}) K_w + R_{ta,b} \pm R_{wd} + R_{wr}$$

From Equation 14, $$V_4^2 = V_5^2 - 2_g D_{4,5} (G_{4,5} - R_{4,5})$$

and $$V_3^2 = V_4^2 - 2_g D_{3,4} (G_{3,4} - R_{3,4})$$

By combining,

(21) $$V_3 = \sqrt{V_5^2 - 2_g D_{4,5}(G_{4,5} - R_{4,5}) - 2_g D_{3,4}(G_{3,4} - G_{3,4} - R_{3,4})}$$

where $V_3$ is the desired leaving speed from the group retarder to couple at a selected coupling velocity $V_5$.

Section 3–4 is normally curved, and $R_{3,4}$ cannot be correlated on the basis of the above considerations. However, it has been found that the rolling resistance on one curve can be correlated with that on a second curve to a sufficient degree of accuracy by the relationship:

(22) $$R_{1,j} = R_{m,n} bi + ci$$

where $bi$ and $ci$ are experimental constants for each pair of curves. In practice, $R_{1,2}$ is measured in order to compute $R_{3,4}$.

From Equation 14, $$\frac{V_2^2 - V_1^2}{2_g} = D_{1,2}(G_{1,2} - R_{1,2})$$

or $$D_{1,2} R_{1,2} = \frac{V_1^2}{2_g} + D_{1,2} G_{1,2} - \frac{V_2^2}{2_g}$$

But from Equation 13, $$D_{1,2} G_{1,2} + \frac{V_1^2}{2_g} = \frac{(V_2^*)^2}{2_g}$$

where $V_2^*$ is the velocity a car with no rolling resistance would have at point 2. Therefore,

(23) $$R_{1,2} = \frac{(V_2^*)^2 - V_2^2}{2_g D_{1,2}}$$

As explained in detail in the copending application of Robert W. Mowery, Serial No. 695,337, filed November 8, 1957, for Computing Apparatus, now Patent No. 3,054,892 issued September 18, 1962, and assigned to the same assignee as the present application, it has been found that Equation 23 can be approximated to a sufficient degree of accuracy by:

(24) $$R_{1,2} = \frac{(V_2^* + c - V_2) K}{2_g D_{1,2}}$$

where $c$ and $K$ are constants for particular values of $V_1$ and $D_{1,2}$ which can be evaluated by determining the best fit of a straight line on a plot of Equation 23.

From FIGS. 1 and 2, $D_{1,2} = D_{c,2} - CL$

Therefore,

(25) $$R_{1,2} = \frac{(V_2^* + c - V_2) K}{2_g (D_{c,2} - CL)}$$

Recalling that $(V_2^*)^2 = V_1^2 + 2_g D_{1,2} G_{1,2}$

(26) $$R_{1,2} = \frac{(\sqrt{V_1^2 + 2g(D_{c,2} - CL) G_{1,2}} + c - V_2) K}{2_g (D_{c,2} - CL)}$$

or, (26a) $$R_{1,2} = \frac{K(\sqrt{V_1^2 + 2_g(D_{c,2} - CL) G_{1,2}} + C)}{2_g (D_{c,2} - CL)} - \frac{K V_2}{2_g (D_{c,2} - CL)}$$

Since $V_1$ is determined, in the illustrated embodiment of our invention, in dependence on the weight W of the cut and the position of a lever FNS, while $c$ and $K$ are determined by $V_1$, $D_{c,2}$ and CL, for a given measuring stretch 1–2 we can define

(27) $$\mu(W, FNS, CL) = \frac{K(\sqrt{V_1^2 + 2_g(D_{c,2} - CL) G_{1,2}} + C)}{2_g(D_{c,2} - CL}$$

and

(28) $$v(W, FNS, CL) = \frac{K}{2_g(D_{c,2} - CL)}$$

Then

(29) $$R_{1,2} = \mu - v V_2$$

In practice, we have found it sufficient to divide weight into two categories, light and heavy, medium weight cars being treated as heavy. We divide cut lengths into four categories, and provide three operating positions for the FNS lever. Therefore, we require only twenty-four solutions for $\mu$ and $v$ in order to compute $R_{1,2}$ for any value of $V_2$. As will appear, these solutions are pre-computed and stored, and then selected for a particular case in accordance with the values of W, FNS and CL for the cut in question.

From Equation 22,

(30) $$R_{3,4} = R_{1,2} bi + ci$$

Figure 4:
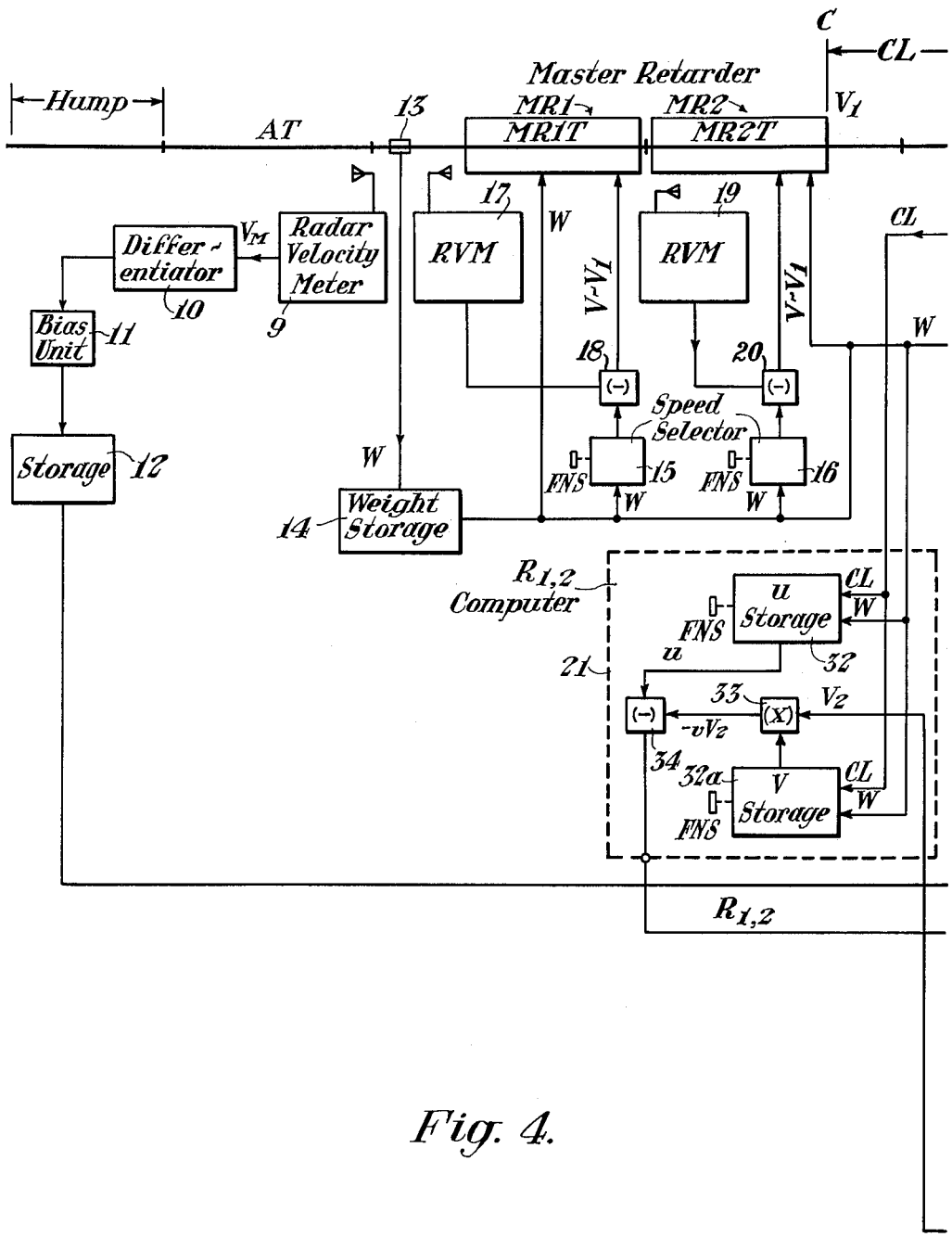
Figure 5:
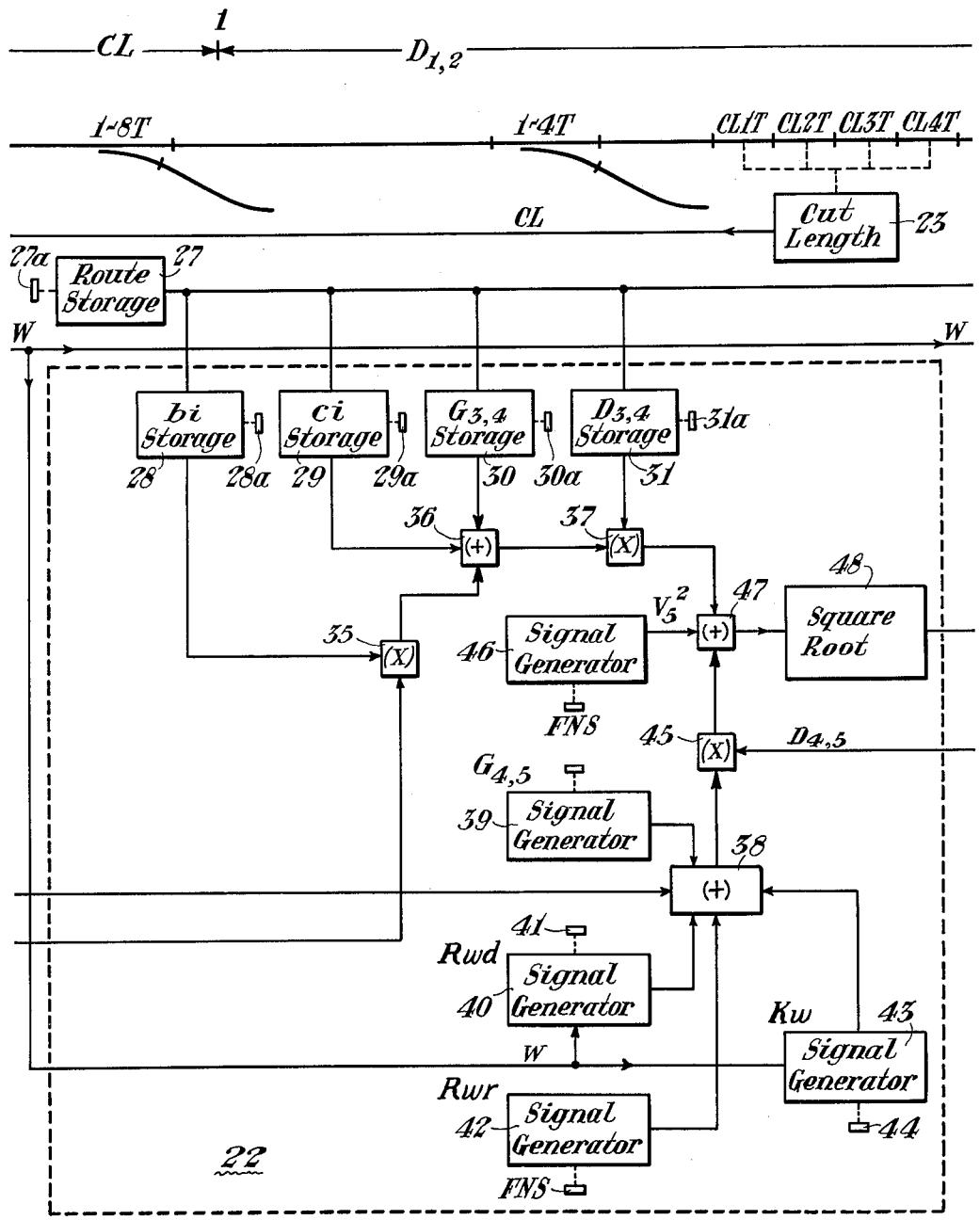
Figure 6:
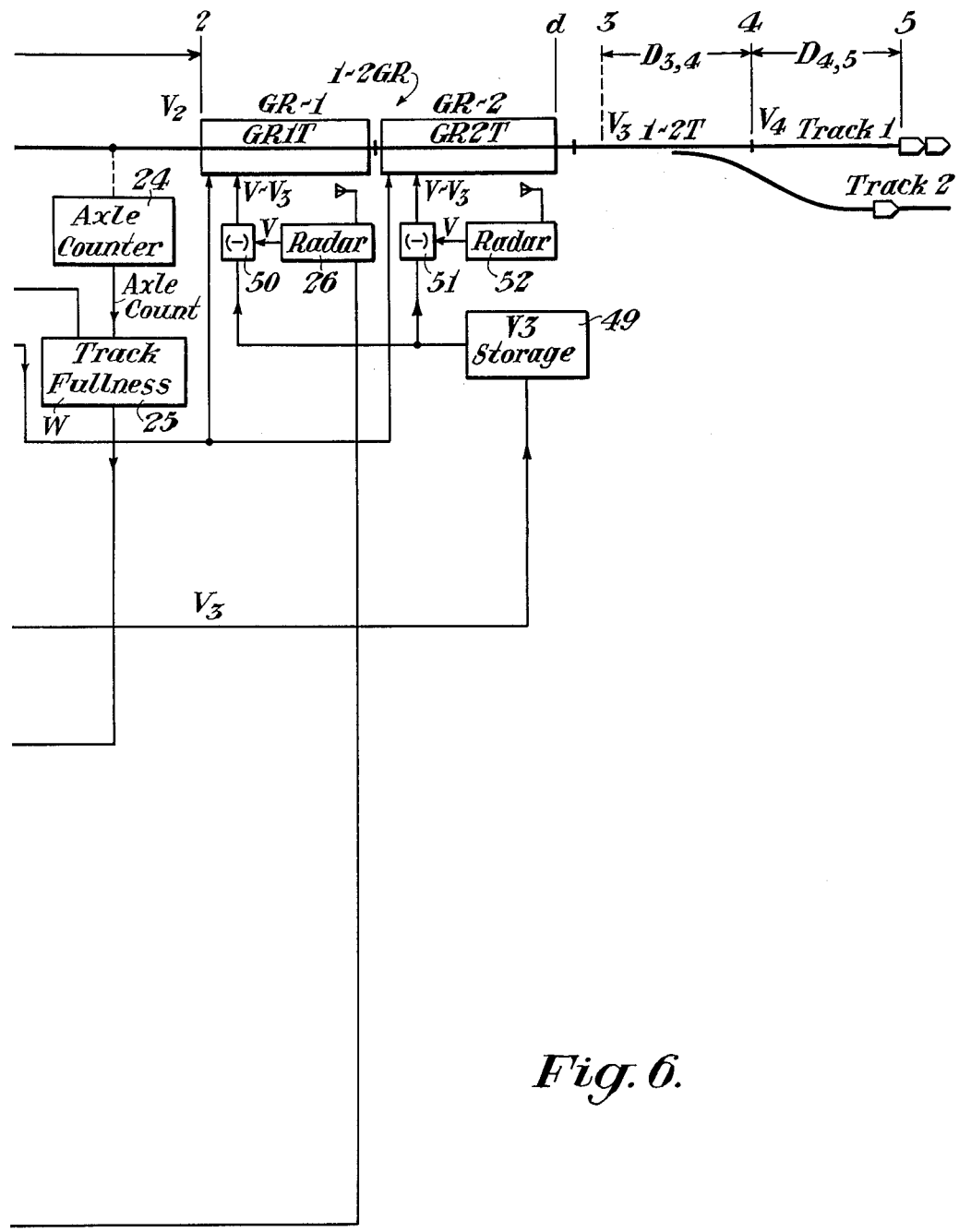

Equations 17, 20, 29 and 30 make it possible to solve Equation 21 for $V_3$ from measured values of $G_{a,b}$, $G_{4,5}$, $\alpha_{a,b}$, $D_{4,5}$, $D_{3,4}$, $G_{3,4}$ CL, $D_{c,2}$, $G_{1,2}$ and $V_2$, experimental values of $bi$ and $ci$, calculated values of $c$, $K$ and $K_w$, selected values of $V_1$ and $V_5$, and values of $R_{wd}$ and $R_{wr}$ chosen by the operator in accordance with the observed operating conditions. FIGS. 4, 5 and 6 show schematically how the control apparatus of our invention operates to carry out this solution automatically. In the illustrated embodiment of our invention, the weight of a cut is divided into three classifications; namely, light, medium and heavy, but as previously noted, for the purpose of selecting $V_1$, medium and heavy cuts are grouped together. This gives six possible values of $V_1$. The speed of a cut in section MR1T is measured by a radar velocity meter 17. The measured value V is supplied, together with the selected value $V_1$ from speed selector 15, to a subtractor 18 which has an output proportional to $V-V_1$, which represents the speed error of the cut at any instant. As will later appear, this signal may also be corrected in accordance with the rate of change of velocity, although for the purpose of the general description this refinement has been ignored. This signal is employed by the control apparatus of section MR1 of the master retarder, which will continue to retard the cut until the cut leaves the first section or until its speed equals the chosen value $V_1$. The speed of the cut in the second section MR2 of the master retarder is measured by a radar velocity meter 19 which operates in conjunction with speed selector 16 to supply subtractor 20, which has an output voltage V−V₁ similar to the output voltage of subtractor 18 for controlling the second section MR2 of the master retarder. As will hereinafter appear, the control units of the master retarder are further adjusted in accordance with the weight of the cut from weight storage 14 to adjust the action of the retarder to the weight of the particular cut under control. Referring first to FIG. 4, the velocity of a cut in approach track section AT is measured by a radar velocity meter 9 and this value is supplied to a differentiator 10, the output of which is the measured acceleration $$\frac{\alpha_{a,b}}{g}$$

Since the electronic storage unit employed in the illustrated embodiment of our invention is adapted to store only positive voltages, the measured value of acceleration is biased by 100 volts in a unit indicated schematically at 11, and at the same time is given the additional bias $G_{a,b}$ in order to provide a signal equal to $(100 - R_{a,b})$. This signal is stored by storage means 12 until required by the computer.

As a cut moves into track section MR1T of the master retarder, its weight is measured by a weighing device 13 and stored in a weight storage unit 14 until required by the various components of our control system.

The measured value of weight is supplied to speed selector units 15 and 16, which provide a signal proportional to V1 for the first and second sections of the master retarder, respectively. Speed selectors 15 and 16 choose values of V1 in accordance with the measured value of weight and with the position of lever FNS, which has three positions corresponding to fast, normal and slow overall yard operating conditions as selected by an operator.

The weight information stored in unit 14 is supplied to the various group retarders such as 1–2GR as shown, and is also supplied to $R_{1,2}$ computer 21 and V3 computer 22.

The cut length CL is measured by circuits associated with track sections CL1T, CL2T, CL3T and CL4T in cut length unit 23. The measured value of CL is supplied to computer 21 as shown. The number of axles in each cut is measured by an axle counter 24 which is located just inside of the first track section GR1T of each group retarder. The axle count is supplied to a track fullness unit 25 associated with each V3 computer 22.

The velocity V2 of a cut approaching the group retarder is measured by radar unit 26 located adjacent the end of track section GR1T and facing toward the hump as shown. This value is supplied to computer 21 for purposes to be described.

Route storage unit 27, which is an integral part of the automatic switching system of our invention, supplies the route of each cut to V3 computer 22 where it is used for several purposes. First, values of $b_i$, $c_i$, $G_{3,4}$ and $D_{3,4}$ for each body track are stored in units 28, 29, 30 and 31 after having been manually set in by means indicated schematically at 28a, 29a, 30a and 31a in the initial calibration of the equipment. The route information is supplied to these units to pick out the particular stored value corresponding to the route of the cut under control. The route information is also supplied to track fullness unit 25 in order to direct the axle count into the storage unit for the appropriate body track and to connect the correct track fullness storage unit to the computer to supply the distance $D_{4,5}$.

The track fullness unit provides a stored voltage for each body track representing the empty length of each track, from which successive increments are subtracted for each cut which is routed to the track in question. The axle count is divided by the number of axles per car, which would generally be 4, in order to give the number of cars in each cut, and this value is in effect multiplied by an average length such as 50 feet to determine the increment to be subtracted from the initial value $D_{4,5}$ for each cut.

As shown by Equations 27, 28 and 29, values of $\mu$ and $\nu$ can be calculated for each of the six chosen values of V1 if the yard parameters $D_{c,2}$ and $G_{1,2}$, the position of the FNS lever, and the variable CL are known. These solutions are precomputed for the six possible values of V1 and the 4 values of CL supplied from unit 23, and the weight, FNS lever position, and CL values which apply to a particular cut are used to select the applicable values of $\mu$ and $\nu$ for the solution. In the illustrated embodiment, $\mu$ is selected from storage unit 32 in accordance with weight, cut length and the position of the FNS lever. The value of $\nu$ is selected from storage unit 32a in the same manner. These values of $\nu$ are supplied to multiplier 33 which is also supplied with a value of V2 so that its output is proportional to the second term in Equation 29. This output and the values of $\mu$ are supplied to a subtractor 34 which has an output proportional to $R_{1,2}$. This output is supplied to computer 22. The value of $R_{1,2}$ is multiplied by the value $b_i$ chosen from storage unit 28 in a multiplier 35. The output of multiplier 35 is supplied as a negative voltage to an adder 36 together with a negative voltage proportional to $c_i$ from storage unit 29 and a positive voltage proportional to $G_{3,4}$ from storage unit 30. The output from adder 36 is multiplied by the value $D_{3,4}$ from storage unit 31 in multiplier 37. The output of multiplier 37 thus corresponds to the third term under the radical in Equation 21. The value of $100 - R_{a,b}$ from storage unit 12 is supplied to an adder 38. A second signal to adder 38 is supplied from a signal generator 39 which is manually adjusted in the initial calibration of the yard to supply output voltage proportional to $-100 + G_{4,5}$. The value of $\Delta R_{wd}$ is supplied from a signal generator 40 in accordance with a manual adjustment 41 set in accordance with the observed wind differential between the hump and the body tracks and modified in accordance with the weight of the cut from storage unit 14. The value of $\Delta R_{wr}$ is supplied from a signal generator 42 in accordance with the position of the FNS lever. The value of $(G_{a,b} - G_{4,5})K_w$ is supplied from a signal generator 43 in accordance with the weight, which determines $K_w$, and the grade values, which are selected manually in the initial calibration of the yard as indicated schematically by knob 44. As will appear from Equation 20 and the summation of the inputs to adder 38, the output of adder 38 is therefore equal to $(G_{4,5} - R_{4,5})$. This value is multiplied by $D_{4,5}$ supplied from track fullness unit 25 in the multiplier 45. The output of multiplier 45 is accordingly proportional to the second term under the radical in Equation 21. A signal generator 46 is adjusted in accordance with the position of the FNS lever to supply a voltage proportional to $V_5^2$, the square of the desired coupling velocity. The outputs from units 37, 45 and 46 are supplied to an adder 47, the output of which is proportional to the term under the radical in Equation 21. Finally, in order to obtain a voltage proportional to V3, the square root of the output of unit 47 is obtained by a square root computer 48. This value is supplied to a V3 storage unit 49.

Sections GR1 and GR2 of group retarder 1–2GR are controlled by weight information from storage unit 14 and by speed error signals from subtractors 50 and 51 as shown. Subtractor 50 is supplied by a signal proportional to V3 from storage unit 49 and a signal proportional to V, the actual speed of the cut in section GR1T, from radar unit 26. Subtractor 51 is supplied by the V3 signal from storage unit 49 and by a signal proportional to the actual velocity of V of a cut in section GR2T by radar unit 52. Accordingly, the retarder is controlled to release the cut at a velocity V3 which will enable it to couple with the preceding cars on the selected body track at a desired velocity V5.

FIGS. 7 through 14, when arranged side by side, comprise another type of flow sheet which illustrates the manner in which the various measured values referred to previously are stored and transferred in the equipment. The relay pickup and control circuits shown in this diagram correspond in function to actual circuits, but for the complete circuits reference should be made to FIGS. 18–68, to be described.

Figure 7:
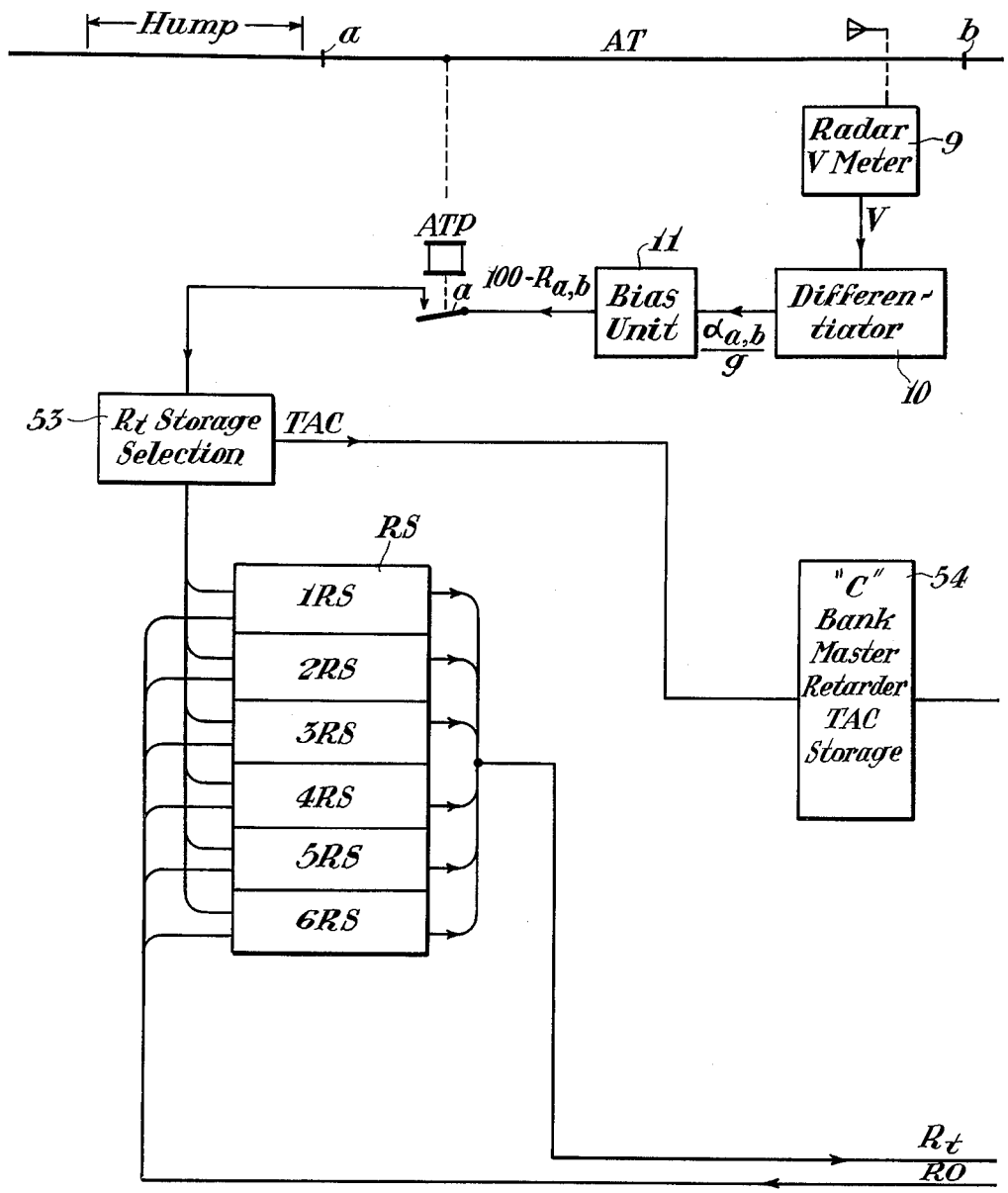

Referring first to FIG. 7, radar velocity meter 9 has its antenna located at the end of approach track section AT and supplies a velocity signal to differentiator 10, which in turn supplies an acceleration signal $$\frac{(\alpha_{a,b})}{g}$$

to bias unit 11 as previously described. The output signal from bias unit 11, which is $100-R_{a,b}$, is supplied over front contact $a$ of a track repeater relay ATP associated with approach track section AT to RT storage selection unit 53. Relay ATP is picked up when section AT is occupied and is released when section AT is unoccupied. As hereinafter described, unit 53 chooses the first available empty storage bank in storage unit RS from the six banks 1RS to 6RS shown. The number of storage banks shown is merely illustrative, the actual number necessary being dependent on the number of cuts which can be in the yard between section AT and the group retarders.

At the same time that the signal $100-R_{a,b}$ is stored, a tangent acceleration code (TAC) is supplied to the C bank 54 of a master retarder TAC storage unit as shown. As has previously been known in automatic switching practice, the TAC storage in the master retarder comprises a plurality of banks, here shown as banks A, B and C, such that information transferred to C bank 54 is supplied to B bank 55 as soon as that bank becomes vacant and the information in the B bank is supplied to A bank 56 when the A bank is vacated. This type of storage is provided to permit closer spacing of cars in the yards; for example, with the arrangement shown, there may be separate cuts occupying any adjacent pair of sections AT, MR1T and MR2T, so long as the minimum spacing, here shown as 58 feet, is preserved.

Information from the C bank of the TAC storage unit is supplied to the B bank over back contact $b$ of track repeater relay R1TP which is associated with track section MR1T. Relay R1TP is picked up or released accordingly as section MR1T is occupied or unoccupied. Accordingly, information may transfer from the C band to the B bank if the B bank is unoccupied and section MR1T is unoccupied.

The tangent acceleration code is supplied from the B bank to the A bank of the master retarder storage unit over back contact $c$ of end of cut relay GEC, which picks up as soon as section MR1T is vacated. This relay has a pickup circuit extending from terminal B of a suitable source of voltage such as a battery, not shown, over back contact $a$ of relay R1TP and front contact $b$ of a track repeater relay R2TP associated with section MR2T, through the winding of relay GEC to terminal N of the battery, and a stick circuit which extends from terminal B of the battery over front contact $a$ of relay GEC, front contact $b$ of relay R2TP, and through the winding of relay GEC to terminal N of the battery. Track repeater relay R2TP is picked up when section MR2T is occupied, and released when this section is unoccupied, by a conventional D.C. track circuit, not shown. Accordingly, relay GEC picks up when section MR2T is occupied and section MR1T is unoccupied and is held up as long as section MR2T is occupied.

As a cut enters section MR1T, its speed is measured by radar velocity meter 17 and the resulting signal V is supplied to R1 speed control unit 61 for the first section of the master retarder over front contact $c$ of relay R1TP, which is energized at this time.

At the same time, the cut begins to pass over weigh rail 13, actuating weigh rail contact 13$a$, which supplies weight information to weight coding circuits 57. Circuits 57 convert the weight measurement in a code having three possible values depending on whether the cut is light, medium or heavy. This weight code is supplied to storage unit 58 for the first unit R1 of the master retarder. The weight information is supplied immediately both to R1 retarder pressure control 60 and the R1 speed selector 59 for the first section of the master retarder.

In conjunction with the position of the FNS lever, previously described, speed selector 59 selects a value of V1 and supplies this value to R1 speed control unit 61. The output of speed control unit 61 is a speed error signal depending on the difference between the selected value of V1 and the output of velocity meter 17. This value is supplied to R1 pressure control unit 60.

Pressure control unit 60 actuates the control valves of the first section of the retarder to exert a braking effect on the cut which is dependent in magnitude on the weight of the cut and is dependent in sign on the sign of the speed error.

When the cut enters section MR2T and is still spanning section MR1T, relay 1–2RC picks up. This relay has a pickup circuit which extends from terminal B of the battery over front contact $c$ of relay R2TP, which is picked up at this time, through the winding of relay 1–2RC, and over back contact $b$ of relay GEC to terminal N of the battery. As previously noted, relay GEC will remain down until section MR1T is vacated. Relay 1–2RC has a stick circuit which extends from terminal B of the battery over its own front contact $a$, through its winding, and over back contact $b$ of relay GEC to terminal N of the battery. Accordingly, relay 1–2RC will remain energized until section MR1T has been vacated.

When relay 1–2RC picks up, weight information from storage unit 58 is supplied to R2 weight storage unit 62 over front contact $b$ of relay 1–2RC. This unit immediately supplies weight information to the R2 pressure control unit 64 and R2 speed selector 63. At the same time, the output of the R1 speed control unit 61 is supplied over front contact $c$ of relay 1–2RC to the R2 pressure control unit 64. Accordingly, at this time the cut is controlled in both sections MR1T and MR2T by the same speed error signal.

As soon as relay R2TP comes up when section MR2T is occupied, the speed of the cut measured by radar unit 19 is supplied over front contact $a$ of relay R2TP to R2 speed control unit 65. R2 speed selector 63 operates in response to the weight information from R2 storage unit 62 in conjunction with the selected position of the FNS lever to provide a signal proportional to the desired leaving speed V1 to speed control unit 65. When section MR1T is vacated and relay 1–2RC is released, the speed error signal from speed control 65 is supplied to R2 pressure control 64 over back contact $c$ of relay 1–2RC. The cut may then be controlled in the second section of the master retarder independently of the control in the first section, so that two cuts may be handled at the same time in the master retarder if so desired.

Signals proportional to the actual speed V and the selected leaving speed V1 are taken from speed control unit 65 and supplied to unit 66, which checks that the leaving velocity is within preselected limits of the selected velocity V1. The output CLV from unit 66 is accordingly a "yes-no" function which is sampled at the time the cut is released from the master retarder in order to determine whether the unit is functioning properly so that further computations will be of the desired accuracy. The point at which the cut is released from the master retarder is determined by the pickup of relay CLVEC. This relay has a pickup circuit which extends from terminal B of the battery over back contact *d* of relay R2TP, through the winding of relay CLVEC, and over back contact *a* of track relay 1–8TR associated with detector track section 1–8T of switch 1–8W. Relay CLVEC has an obvious stick circuit which extends from terminal B of the battery over its front contact *a*, shunting contact *d* of relay R2TP. Relay CLVEC will accordingly pick up as soon as section MR2T is vacated and section 1–8T is occupied and will remain up as long as section 1–8T is occupied.

In accordance with our invention, information stored in the master retarder units mentioned above is transferred to the group retarder computers along with route information in a combined information transfer system. This system comprises an initial 1–8 route storage unit of conventional design having three banks A, B and C, and additional combined storage units associated with the other switches in the yard, as will appear.

The C bank of the initial storage unit is provided with means such as push buttons 1PB through 8PB for inserting the desired route of a cut in the form of a code for positioning the successive switches along the route. While we have illustrated manual push buttons for performing this function, it will be apparent to those skilled in the art that the route information could be inserted by tape storage means or other desired programming equipment if so desired. For example, the system disclosed in copending application Serial No. 455,586, filed September 13, 1954, by Sih Hsuin Tsiang for Automatic Switching Tape Storage Feeding System, which is assigned to the assignee of our present application and is now Patent No. 2,826,360 issued March 11, 1958, could be employed for this purpose if so desired.

As is known in the art, upon depressing one of push buttons 1PB through 8PB to designate a selected body track destination for a particular cut, route information is stored first in the C bank and then transferred to the B bank and finally the A bank when these banks become unoccupied. The information in the A bank of the 1–8 storage unit is supplied to the 1–8 switch control to position the switch in accordance with the route desired.

It will be noted that route information is initially supplied to the C bank of the 1–8 storage unit in the form of a direct designation of the route desired. However, as will later appear, this information is converted in the A bank into a code which comprises one bit of information for each successive switch in the route, each bit of information having two possible conditions to differentiate between normal and reverse positions of the switch. The first bit of information is supplied to the 1–8 switch control as previously mentioned, and upon occupancy of the detector track section 1–8T the additional bits of information are transferred to the storage banks at the locations of the succeeding switches 1–4W or 5–8W in accordance with the normal or reverse position of switch 1–8W. The route information thus transferred is cascaded from the B bank to the A bank at the 1–4 or 5–8 switch locations and from the A bank the second bit of route information is supplied to the 1–4 or 5–8 switch control to position switch 1–4W or 5–8W. The remaining bit of route information is directed to the storage banks associated with the final switch 1–2W through 7–8W which has been selected by the previously positioned switch. When the final switch has been positioned and the last detector track circuit is occupied, the final bit of route information is cancelled.

The number of storage banks at each switch location determines the number of cuts that can be between that switch location and the preceding switch location, and the number of storage banks in the initial storage location will determine the number of routes that can be initially inserted in the system. Accordingly, the number of banks shown at these locations is merely illustrative and more or less banks could be used at any or all of these locations if so desired.

At the time that route information is transferred from the A bank of the 1–8 storage unit to the 1–4 storage or the 5–8 storage unit, the other information stored in the master retarder is similarly transferred.

The tangent acceleration code TAC is transferred from the A bank of master retarder TAC storage unit 56 to the B bank of the selected switch location 1–4W or 5–8W.

The weight information from the R2 weight storage unit 62 is transferred in parallel to both the B and A banks of the selected storage unit 1–4 or 5–8, by circuits to be disclosed. The purpose of making this information available to both banks at the switch location is to permit a more accurate weight determination of long cuts, which might be still actuating the weigh rail contactor 13*a* when detector track section 1–8T is occupied.

The weight information is made final when relay GEC picks up, indicating the cut has cleared section MR1T in which the weigh rail is located. This GEC indication is transmitted by a circuit, shown partly in detail and in part schematically which extends from terminal B of the battery over front contact *d* of relay GEC providing an indication which is transferred in parallel to the A and B banks of either the 1–4 storage unit or the 5–8 storage unit as selected by the normal or reverse position of switch 1–8W. When contact *d* of relay GEC is closed, the weight information is made final and is thenceforth transmitted through the information transfer system in the same manner as the route code.

The correct leaving velocity indication CLV is transferred to the A bank of the selected storage location 1–4 or 5–8 and in parallel to the A and B banks of phantom storage units associated with the group retarder selected by the position of switch 1–4W or 5–8W. For example, a cut approaching detector track circuit 1–4T would have its route information in the A bank of the 1–4 storage unit and the 1–4 switch control would position switch 1–4W accordingly; and for example set it to its normal position. The CLV indication would be available at that time to the A bank of the 1–4 storage unit and as the cut progressed and occupied section 1–4T, the CLV indication would be made available to the A and B banks of the 1–2 phantom storage unit.

In addition to the switch storage locations normally provided in an automatic switching system, as indicated above, we provide additional phantom storage units at each of the group retarder locations to store information used in the control of the retarders. The details of these units will be described below. However, in general, the transfer of information to these units and from bank to bank within the units is similar to the operation of the equipment at the switch storage locations.

The CLV indication is not made final until the CLVEC relay picks up, indicating that the cut has been released from the master retarder. The CLVEC indication is transferred in the same manner as the CLV indication and is shown in part as a circuit extending from terminal B of the battery over front contact *b* of relay CLVEC and in part schematically as an information transfer line extending to the A bank of the selected switch storage location 1–4 or 5–8 and to the A and B banks of the selected group retarder phantom storage unit. It will thus appear that the CLV indication may be inserted in any one of three storage banks, but when the CLVEC indication is transmitted, the CLV indication becomes final and is thenceforth cascaded to the succeeding banks in the same manner as the route information.

The tangent acceleration code is transferred from the A bank of the phantom storage unit to a tangent acceleration code repeater as shown. The TAC repeater then sets up a circuit combination which connects the particular storage unit 1RS through 6RS initially selected to store the indication $100 - R_{a, b}$ in the storage unit RS to the $V_3$ computer as shown. At the same time, the circuit combination established in the TAC repeater transmits an indication labeled RO to the storage unit 1RS through 6RS which was selected by the TAC indication to cancel the storage and make that unit available for further storage.

As the cut occupies track circuits CL1T through CL4T, the number of these sections which are spanned when the cut enters section CL4T indicates the length of the cut in terms of the combination of repeater relays CL1TP, CL2TP, CL3TP and CL4TP which are energized. This indication is transmitted to $R_{1,2}$ computer 21 as shown.

When relay CL4TP picks up, indicating the occupancy of section CL4T, the computation of the leaving speed $V_3$ from the group retarder is made on the basis of the information now available to the computers. This operation will be illustrated for the 1–2 group retarder, with the understanding that the operation of the control apparatus at the other group retarder locations is the same.

Weight information is supplied to $R_{1,2}$ computer 21 and $V_3$ computer 22 from the A bank of the 1–2 phantom storage unit over front contact $d$ of relay CL4TP. The CLV indication is supplied to $V_3$ computer 22 over front contact $e$ of relay CL4TP. If the leaving speed V1 from the master retarder has been correct, the CLV indication will permit the computer to proceed on a fully automatic basis. However, if the leaving speed was materially different from the selected speed V1, the computer will predict $V_3$ on the basis of average values. A further check is provided by an indication from cut length measuring circuit 23, which will interrupt the fully automatic operation of the computer if the cut length is greater than can be measured.

The cut length check and the V1 check are transmitted from the $V_3$ computer as a combined indication to $R_{1,2}$ computer 21 to determine whether it will compute the curved track rolling resistance $R_{1,2}$ on the basis of measured values, or will supply an average value.

The route information is supplied to $V_3$ computer 22 directly from the A bank of the 1–2 phantom storage unit as shown. It is also supplied to track fullness unit 25 to select the proper value of $D_{4,5}$ for application to the $V_3$ computer 22.

The velocity of the cut approaching the group retarder is measured by radar velocity meter 26 and is supplied to $R_{1,2}$ computer 21 over front contact $b$ of relay CL4TP.

As schematically indicated, the various track constants are set into $V_3$ computer 22 and $R_{1,2}$ computer 21 by manual adjustments in the initial calibration of the yard, while the FNS lever position is manually set into the computers by the operator depending on the observed over-all operation conditions of the yard.

The value of $R_{1,2}$ calculated by computer 21 is supplied to $V_3$ computer 22 which proceeds to compute the desired leaving speed $V_3$. The computed leaving speed is supplied to R1–$V_3$ storage unit 49a for the first section of the group retarder over front contact $c$ of relay CL4TP.

When relay R1TP picks up, the computed value of $V_3$ is supplied to R1 speed control unit 50 over front contact $d$ of relay R1TP and the actual speed V of the cut is supplied to speed control unit 50 from radar velocity meter 26 over front contact $c$ of relay R1TP.

Weight information is supplied to R1 weight storage unit 69 from the A bank of the 1–2 phantom storage unit over front contact $d$ of relay CL4TP, which is still up, because the car enters section 1–2GR1T while still shunting section CL4T, and over back contact $c$ of relay GAEC, which remains down until CL4T becomes unoccupied.

The weight information is immediately transmitted from storage unit 69 to retarder pressure control unit 1–2GR1 for the first section of group retarder 1–2GR. This unit now has available both the weight information from unit 69 and speed information from unit 50 and accordingly assumes control of the cut in section 1–2GR1T.

Relay 1–2RC has a pickup circuit extending from terminal B of the battery over front contact $a$ of relay R2TP, through the winding of relay 1–2RC and over back contact $c$ of relay R1EC to terminal N of the battery, and a stick circuit shunting contact $a$ of R2TP which includes front contact $a$ of relay 1–2RC. As will be described, relay R1EC remains deenergized until section 1–2GR1T becomes unoccupied. Therefore, relay 1–2RC will pick up and remain up as long as the first section of the master retarder is occupied.

When relay 1–2RC picks up, the speed error signal from R1 speed control unit 50 is supplied to the GR2 retarder pressure control for the second section of the group retarder over front contact $b$ of relay 1–2RC. At the same time, the weight information from R1 weight storage unit 69 is transferred to R2 weight storage unit 70 over front contact $c$ of relay 1–2RC. The weight information is transferred directly from the weight storage unit 70 to the GR2 pressure control unit. Therefore, the cut is controlled from R1 speed control unit 50 and radar velocity meter 26 by both sections of the group retarder until the first section 1–2GR1T becomes unoccupied.

When section CL4T becomes unoccupied, relay CL4TP drops away, releasing its front contacts $b$, $c$, $d$, and $e$, thus disconnecting $R_{1,2}$ computer 21 from radar velocity meter 26 at contact $b$, disconnecting the weight and CLV inputs to the computers at contacts $d$ and $e$ respectively, and disconnecting the output of computer 22 from R1–$V_3$ storage unit 49a at contact $c$.

At the same time, a circuit for relay GAEC is completed, which extends from terminal B of the battery over back contact $a$ of relay CL4TP, front contact $a$ of relay R1TP, through the winding of relay GAEC, and over back contact $b$ of relay R1EC to terminal N of the battery. When relay GAEC picks up, it completes its stick circuit extending from terminal B of the battery over its front contact $a$, through the winding of the relay, and over back contact $b$ of relay R1EC to terminal N of the battery. The circuit for the supply of weight information to the R1 weight storage unit 69, already opened at front contact $d$ of relay CL4TP, is thus further interrupted at open back contact $c$ of relay GAEC.

When the cut clears section 1–2GR1T, relay R1TP is released and a pickup circuit is completed for relay R1EC which extends from terminal B of the battery over back contact $b$ of relay R1TP, front contact $b$ of relay R2TP, front contact $b$ of relay GAEC, the winding of relay R1EC, and over back contact $a$ of relay R2EC to terminal N of the battery. When relay R1EC picks up, it completes a stick circuit extending from terminal B of the battery over its own front contact $a$, through the winding of the relay, and over back contact $a$ of relay R2EC to terminal N of the battery.

The previously traced stick circuit for relay 1–2RC is now interrupted at back contact $c$ of relay R1EC, and relay 1–2RC drops away. The previously traced stick circuit for relay GAEC is interrupted at back contact $b$ of relay R1EC and relay GAEC drops away, again preparing the circuit for R1 weight storage unit 69 by closing back contact $c$ of relay GAEC.

With relay 1–2RC down, the speed error signal from R2 speed control unit 51 is supplied to pressure control unit 1–2GR2 over back contact $b$ of relay 1–2RC. The output of R2–$V_3$ storage unit 49b is supplied to R2 speed control unit 51 over front contact $e$ of relay R2TP and the output of radar velocity meter 52 is supplied to speed control unit 51 over front contact $d$ of relay R2TP. The cut is now controlled in section 1–2GR2T by the second radar unit 52, the R2 speed control unit 51, and pressure control unit 1–2GR2, releasing the controls for the first section of the group retarder for use with a second cut if desired.

As the cut leaves the group retarder and occupies detector track section 1–2T, a circuit is prepared for relay R2EC extending from terminal B of the battery over back contact *a* of relay 1–2TR, which is associated with detector track section 1–2T and is released upon the occupancy of the detector track section, through the winding of relay R2EC and over front contact *d* of relay R1EC to back contact *c* of relay R2TP. When section 1–2GR2T becomes unoccupied, relay R2TP will release and complete the pickup circuit for relay R2EC over back contact *c* of relay R2TP to terminal N of the battery. When relay R2EC picks up, it completes a stick circuit from terminal N of the battery over its own front contact *a*, through the winding of the relay and over back contact *a* of relay 1–2TR to terminal B of the battery.

With relay R2EC up, the previously traced stick circuit for relay R1EC is interrupted at the open back point of contact *a* of relay R2EC and relay R1EC is released. When detector track section 1–2T is cleared by the cut, relay 1–2TR picks up and relay R2EC is released due to the interruption of its previously traced stick circuit at back contact *a* of relay 1–2TR. The apparatus is thus restored to its initial condition.

The general operation of the control apparatus of our invention having been described, we will now describe in detail a specific embodiment thereof, having reference to FIGS. 18 through 68 when arranged as shown in FIG. 17. For convenience, the detailed description will be divided into a detailed description of the several components of our apparatus, followed by a description of the interconnecting circuits. The detailed operation of the disclosed system will then be discussed for typical cases which may arise in practice. Since the control apparatus for the various group retarders and for the several switches following the master retarder is identical, the detailed description will be confined to the master retarder and the route including group retarder 1–2GR, which controls cuts routed to tracks T1 and T2.

*The track circuits*

The track from the hump is divided by insulated joints at points *a* and *b* into an approach track section AT which may, for example, be 58 feet in length, although greater lengths might be employed if so desired. The length should be chosen, according to this embodiment of our invention, that section AT cannot be spanned by the wheels of a single car. A track relay ATR of conventional construction is connected across the rails of section AT adjacent point *a*, and a track battery TB is connected across the rails adjacent point *b*, in a conventional D.C. track circuit, in a manner well known in the art, so that relay ATR is normally energized, but is released when section AT is shunted by the wheels of a car.

Figure 18:
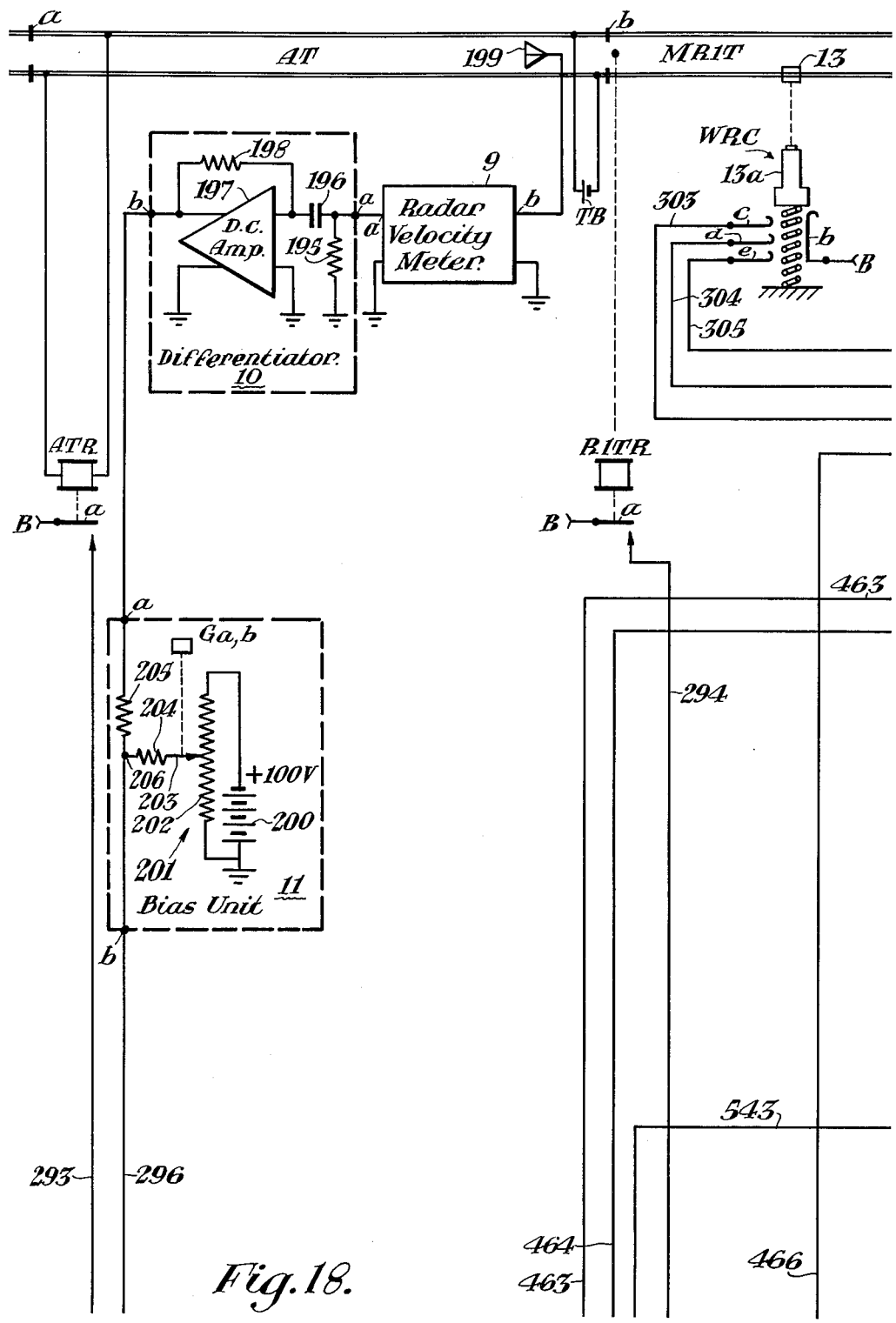
Figure 22:
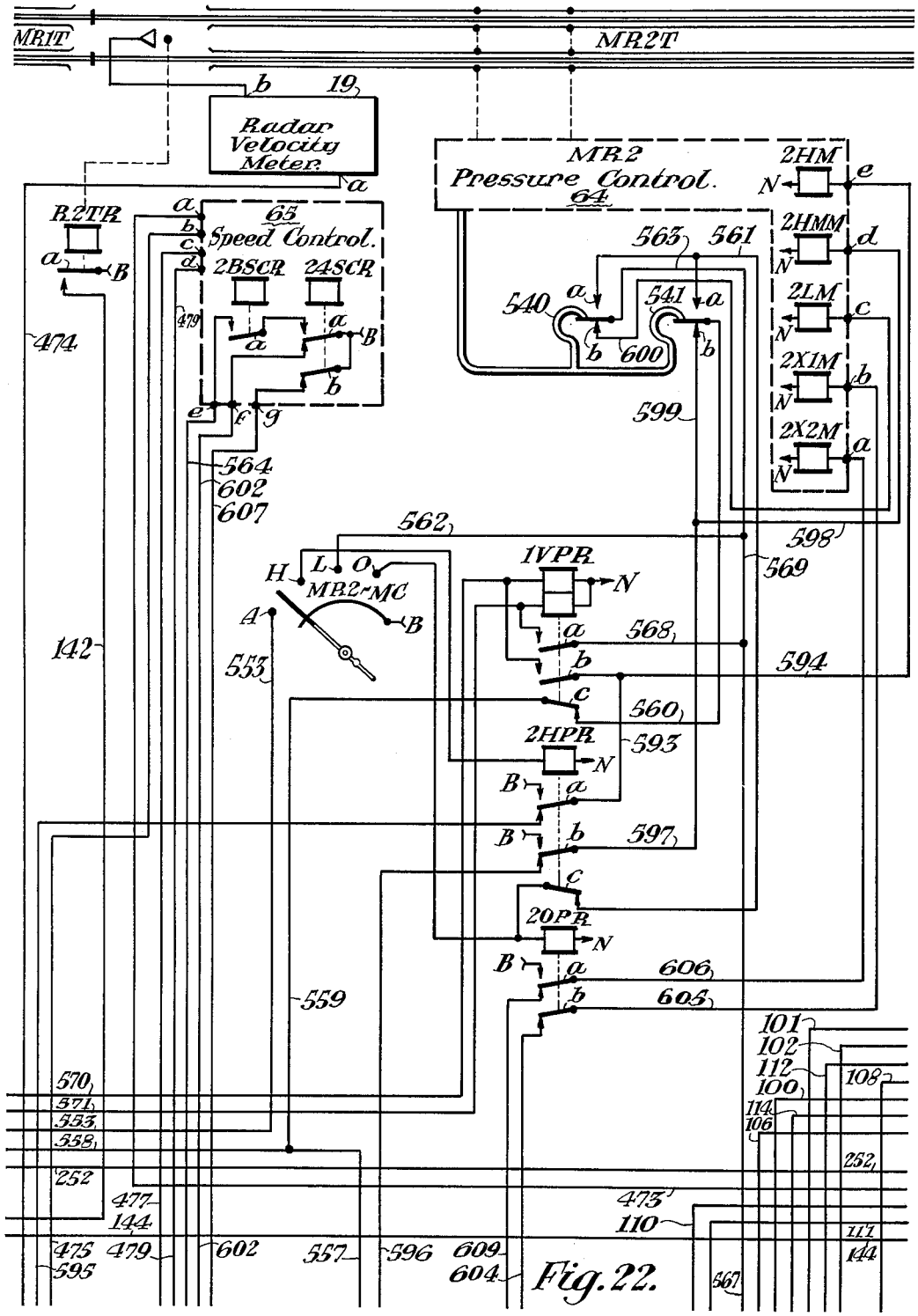

A third pair of insulated joints at point *c* defines a master retarder track section between points *b* and *c*. This section is further divided by insulated joints as shown in FIG. 22 into a first master retarder track section MR1T and a second master retarder track section MR2T. A track relay R1TR is connected across the rails of section MR1T at one end, as schematically indicated in FIG. 18, in a conventional D.C. track circuit of the type illustrated for section AT, such that relay R1TR is normally energized, but is released when the rails of section MR1T are shunted by a car. A track relay R2TR is connected across the rails of section MR2T at one end thereof as schematically shown, in a conventional D.C. track circuit such that relay R2TR is energized when section MR2T is unoccupied and is released when section MR2T is occupied.

A detector track circuit for switch 1–8W is provided in detector track section 1–8T, which is defined by insulated joints in a conventional manner as shown, by track relay 1–8TR and track batttery TB, which are connected across the rails at opposite ends of the section.

Since certain of the controls to be described are based on the joint occupancy of section MR2T and 1–8T, these sections are necessarily adjoining as shown. In accordance with the practice of this embodiment of our invention, sections MR1T, MR2T and 1–8T should have effective lengths of 58 feet or more. The switch detector sections for switches 1–4W and 5–8W need not adjoin detector track section 1–8T, but may be separated therefrom by any desired length.

The detector track sections 1–4T and 5–8T may correspond identically to detector sections 1–8T, previously described. As shown, the track circuit for detector section 1–4T is formed by a track battery TB and a relay 1–4TR which is energized in an obvious fashion when section 1–4T is unoccupied and is released when section 1–4T is occupied. While the full circuit for track section 5–8T is not shown, it would correspond in detail to that shown for section 1–4T.

The track circuits for tracks 5 through 8 are shown in block form, the blocks for tracks 5 and 6 including the group retarders 5–6GR, the 5–6 phantom location, switch 5–6W and switch control 5–6WC. The blocks for tracks 7 and 8 include group retarder 7–8GR, the 7–8 phantom location, switch 7–8W and switch control 7–8WC. The details of the track circuits indicated schematically within these blocks are identical with those shown for tracks 1–4 which will be described in somewhat further detail.

The track circuits associated with group retarder 3–4GR are shown in block form, but may be identical with those shown for group retarder 1–2GR to be described. The track circuit for end switch 3–4T is partly shown in schematic form similar to the showing of the track circuit for section 5–8T, but this circuit may be identical with the track circuit for switch 1–2W which will be described below.

The track approaching each of the group retarders is divided by insulated joints into four track sections, CL1T, 58 feet long; CL2T and CL3T, which are each 29 feet long; and CL4T, which is 58 feet long. These lengths are designed to give a particular cut length classification, as will be described. Track relays CL1TR, CL2TR, CL3TR and CL4TR are associated with these track sections, as indicated schematically, by means of conventional D.C. track circuits which it is not thought necessary to show in detail, but which in practice may be identical with the track circuit for section AT, previously described. These track relays are picked up when the respective sections are unoccupied and are released when the sections are occupied in the conventional manner.

Adjoining track section CL4T is the first track section 1–2GR1T of group retarder 1–2GR. Adjoining section 1–2GR1T is section 1–2GR2T, which is defined by insulated joints as shown. A track relay R1TR is associated with section 1–2GR1T, and a track relay R2TR is associated with track section 1–2GR2T, in schematically indicated conventional D.C. track circuits which may correspond in detail to the previously described circuit for track section AT. Relays R1TR and R2TR are picked up when their associated track sections are unoccupied and are released when their respective track sections are occupied in the conventioned manner.

Adjoining section 1–2GR2T is a detector track section 1–2T for the final switch 1–2W which leads to tracks 1T and 2T. This track section is divided by insulated joints in the conventional manner as shown and is provided with a track circuit comprising a track battery TB and a track relay 1–2TR which are connected across the rails at opposite ends of the section as shown. Relay 1–2TR is picked up when section 1–2T is unoccupied and is released when section 1–2T is occupied.

Tracks 1T and 2T need not be track circuited, and may be of a length suitable to accommodate the desired number of cars, which in practice might be, for example, 100 cars. However, as will later appear, we have illustrated the capacity of track 1T to be 42 cars and the capacity of track 2T to be 35 cars. The capacity of the other body tracks 3T through 8T may be any desired number of cars.

The switch control circuits

The switch control circuits employed in the illustrated embodiment of our invention are substantially conventional and are shown principally to avoid confusion in understanding the timing of certain operations in the control apparatus.

Figure 23:
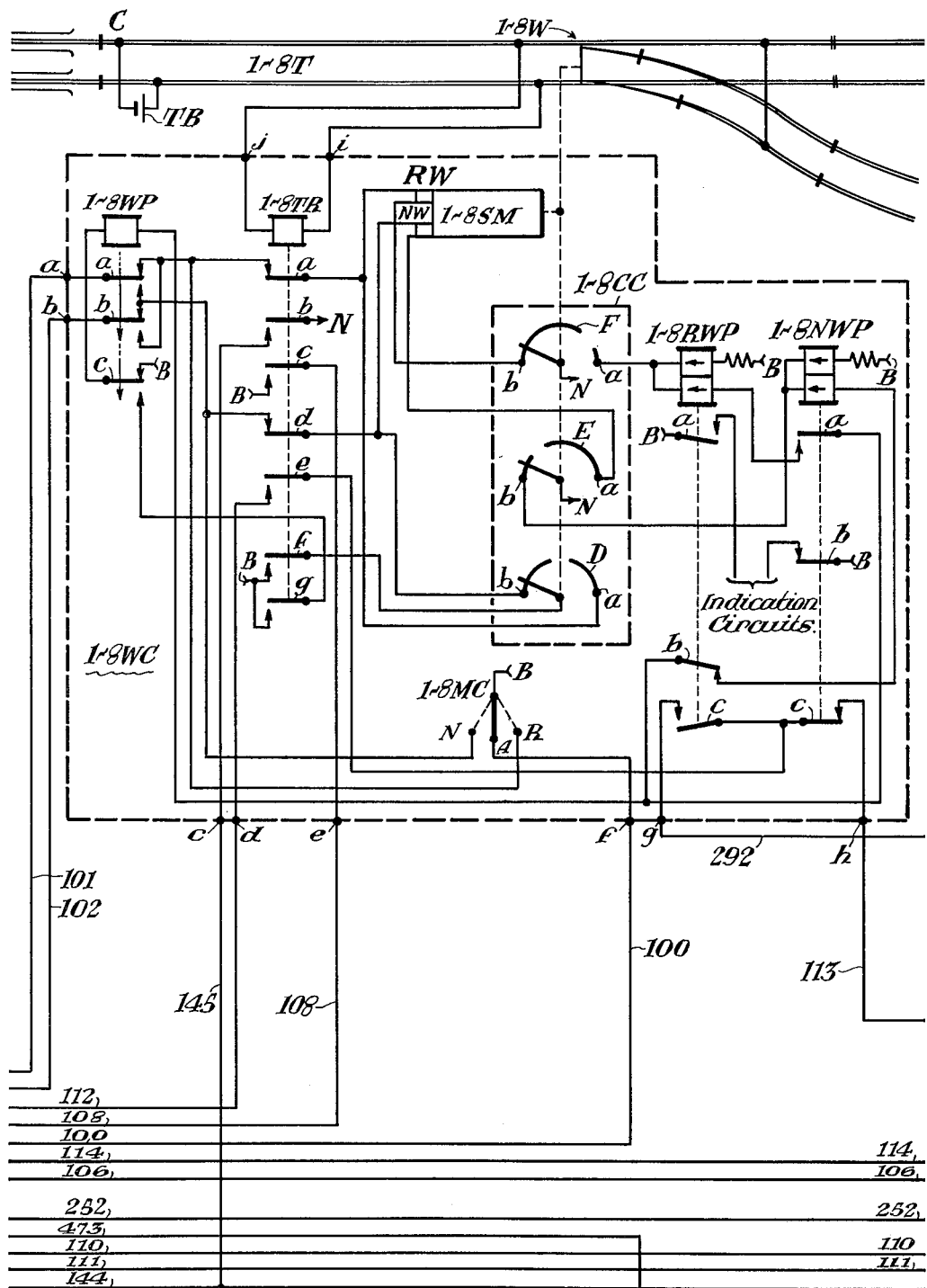

Referring first to switch control 1–8WC, as shown in FIG. 23, the unit comprises a switch mechanism 1–8SM which may be of convention construction and which is controlled to actuate switch 1–8W to its normal or reverse positions by actuating magnets NW and RW, respectively. The details of this apparatus form no part of our present invention and accordingly are not shown.

The switch control also includes a circuit controller unit 1–8CC which includes three circuit controllers D, E and F. Each of these circuit controllers comprises a contact arm which is moved by the switch machine 1–8SM in accordance with the movement of the points of switch 1–8W, as indicated schematically by dotted lines. The arm of circuit controller F engages a contactor attached to terminal $a$ over a small arc of travel with the switch in and adjacent its reverse position, and engages a contactor connected to its terminal $b$ over an arc including the normal position of the switch substantially as shown, with an open position between the contactors over a short range of travel of the switch towards the reverse position as shown. The switch arm of circuit controller E is electrically connected to its terminal $a$ over a range including the reverse position of the switch and to its terminal $b$ over a short range of movement including the normal position of the switch, with a relatively small arc of open travel adjacent the normal position as shown. Circuit controller D has its switch arm electrically connected to its terminal $b$ over a range of movement including the normal position of the switch and to its terminal $a$ over a range of movement including the reverse position of the switch, with a short interval of open travel in the central position of the switch as shown.

The switch control unit further includes normal and reverse repeater relays 1–8NWP and 1–8RWP, respectively, which may be conventional double coil directional relays of a type well known in the art. These relays each have two windings, either winding serving to pick up the contacts of the relay upon current flow therethrough in the direction of the arrow.

Relay 1–8NWP has a pickup circuit extending from terminal B of the battery through a suitable voltage dropping resistor, the upper winding of the relay, over terminal $b$ of circuit controller E and its associated switch arm in the normal position of switch 1–8W to terminal N of the battery. A second circuit for relay 1–8NWP, which serves to hold up the relay and in addition forms a stick circuit for relay 1–8WP, to be described, extends from terminal B of the battery over front contact $c$ of relay 1–8WP, through the winding of relay 1–8WP, over back contact $b$ of relay 1–8RWP, through the lower winding of relay 1–8NWP and over terminal $b$ of circuit controller E and its associated switch arm in the normal position of the switch to terminal N of the battery.

Relay 1–8RWP has a pickup circuit which extends from terminal B of the battery through a suitable voltage dropping resistor as shown, through the upper winding of relay 1–8RWP, and over terminal $a$ of circuit controller F and its associated switch arm in the reverse position of the switch to terminal N of the battery. Relay 1–8RWP has a second circuit which serves to hold up the relay and also serves as a second stick circuit for relay 1–8WP which extends from terminal B of the battery over front contact $c$ of relay 1–8WP, through the winding of relay 1–8WP, over back contact $a$ of relay 1–8NWP, through the lower winding of relay 1–8RWP, and over terminal $a$ of circuit controller F and its associated switch arm in the reverse position of the switch to terminal N of the battery.

Contacts $a$ of relay 1–8RWP and $b$ of relay 1–8NWP may be used to actuate suitable indication circuits, as indicated schematically. The indication circuits may be conventional, and as they do not form a part of our present invention, they wil not be shown in detail.

Relay 1–8WP is a repeater relay which is energized in either extreme position of switch 1–8W. It has a pickup circuit extending from terminal B of the battery over back contact $g$ of track relay 1–8TR in the occupied condition of track section 1–8T, back contact $c$ of relay 1–8WP, through the winding of relay 1–8WP, and over alternative paths, depending on the position of switch 1–8W, the first including back contact $b$ of relay 1–8RWP, the lower winding of relay 1–8NWP, and over terminal $b$ of circuit controller E and its associated switch arm in the normal position of the switch to terminal N of the battery, and the second extending over back contact $a$ of relay 1–8NWP, through the lower winding of relay 1–8RWP, and over terminal $a$ of circuit controller F and its associated switch arm in the reverse position of the switch to terminal N of the battery. Relay 1–8WP has a pair of stick circuits which correspond to the second circuit described for relays 1–8NWP and 1–8RWP, and which extend from terminal B of the battery over front contact $c$ of relay 1–8WP, through its winding, and through the two alternative paths previously traced for the pickup circuit.

The switch control unit 1–8WC further includes a manual controller 1–8MC which has three terminals N, A and R and a lever arm connected to battery terminal B as shown. With the lever in position R, the switch is controlled to the reverse position by a circuit extending from terminal B of the battery over terminal R of controller 1–8MC, front contact $a$ of track relay 1–8TR, to the upper side of the winding of reverse control magnet RW, and through the winding to terminal $b$ of circuit controller F, and its associated switch arm over a range extending from the normal position of the switch into a position on the reverse side of the mid position to terminal N of the battery. When the switch has moved to the position in which circuit controller F is open, a spring within switch mechanism 1–8SM completes the movement of switch in a manner well known in the art, and reverse repeater relay 1–8RWP is picked up over its circuit previously traced. With lever 1–8MC in its normal or N position, a circuit extends from terminal B of the battery over terminal N of the lever and front contact $d$ of track relay 1–8TR, through normal magnet NW, and over teminal $a$ of circuit controller E and its associated arm in the reverse position of the switch to terminal N of the battery. When the switch moves sufficiently so that circuit controller E is open, the switch movement is completed by spring action and normal repeater relay 1–8NWP is picked up by its previously traced circuit.

If an attempt is made to move the switch and during the switch movement track section 1–8T becomes occupied, releasing relay 1–8TR, circuit controller D operates to return the switch to its nearest extreme position. For example, if the switch is on the normal side of the mid-position a circuit extends from terminal B of the battery over back contact $f$ of relay 1–8TR, over the arm of circuit controller D to terminal $b$ of circuit controller D, through normal magnet NW and through terminal $a$ of circuit controller E and its associated arm to terminal N of the battery. If the switch is in its normal position or within the range of adjustment at which circuit controller E is open, the switch will automatically be returned to its normal position by a spring action. Similarly, if the switch is on the reverse side of its midposition but not within the range in which it will be automatically spring-restored to the reverse position, a circuit will extend from terminal B of the battery over back contact $f$ of relay 1–8TR, the arm of circuit controller D and terminal $a$ of circuit controller D, through the reverse magnet RW, and over terminal b and the associated arm of circuit controller F to terminal N of the battery until the switch is moved sufficiently towards the reverse position to open circuit controller F at which time the spring action of switch machine 1–8SM will complete the movement of the switch towards its reverse position. It will be noted that at all times during which the detector section 1–8T is occupied, the other circuits to magnets RW and NW are opened at contacts a and d, respectively, of track relay 1–8TR.

With manual lever 1–8MC in its automatic or A position, a circuit extends from terminal B of the battery, over terminal A of manual controller 1–8MC, lead 100, front contact h of relay 1–8AD (FIG. 49), to be described, in the A bank of the 1–8 automatic switching storage unit, over back contact e of relay 1–8AT in the A bank of the 1–8 storage unit and the front or back point of contact a of relay 1–8A1 in the A bank of the 1–8 storage unit, to be described, over lead 101 or 102 (to FIG. 23) to contact a or contact b of relay 1–8WP, respectively, in accordance with the energized or released condition of route storage relay 1–8A1, to be described. Relay 1–8WP is sufficiently slow releasing to bridge the normal operation of the switch and is accordingly energized unless, due to a failure, the switch is stored in some intermediate position. Accordingly, if relay 1–8A1 is picked up and the previously traced circuit is completed up to contact a of relay 1–8WP, the circuit is continued over the front point of contact a of relay 1–8WP and front contact a of relay 1–8TR, through reverse magnet RW and through circuit controller F to terminal N of the battery until circuit controller F becomes open and the switch movement to its reverse position is completed by the spring action of switch machine 1–8SM. On the other hand, if relay 1–8A1 is down to direct a normal setting of switch 1–8W, the previously traced circuit is completed from terminal b of unit 1–8WC over front contact b of relay 1–8WP, front contact d of relay 1–8TR, through the winding of normal magnet NW and through circuit controller E to terminal N of the battery until the switch has been moved sufficiently close to its normal position so that circuit controller E is open and the switch movement is completed by spring action of switch machine 1–8SM.

In the event of a failure which would cause relay 1–8WP to be deenergized, a reverse action will take place. That is, the circuit previously traced over front contact a of relay 1–8WP to call for a reverse movement of the switch will now be completed over the back point of contact a, front contact d of relay 1–8TR, and through normal magnet NW and circuit controller E to cause movement of the switch to its normal position. Similarly, if relay 1–8A1 remains released to energize terminal b of unit 1–8WC with relay 1–8WP down, the switch operating circuit will be completed over the back point of contact b of relay 1–8WP and front contact a of relay 1–8TR through the reverse magnet RW and circuit controller F to direct a reverse movement of the switch. The purpose of this circuitry is to provide for the case in which the switch is physically blocked from movement in one direction, to attempt to position it in the other direction so that it will be in one or the other of its extreme positions when occupied and will no derail a car.

The circuits which include terminals c, d, e, g and h of switch control 1–8WC will be described later in connection with other units.

Figure 25:
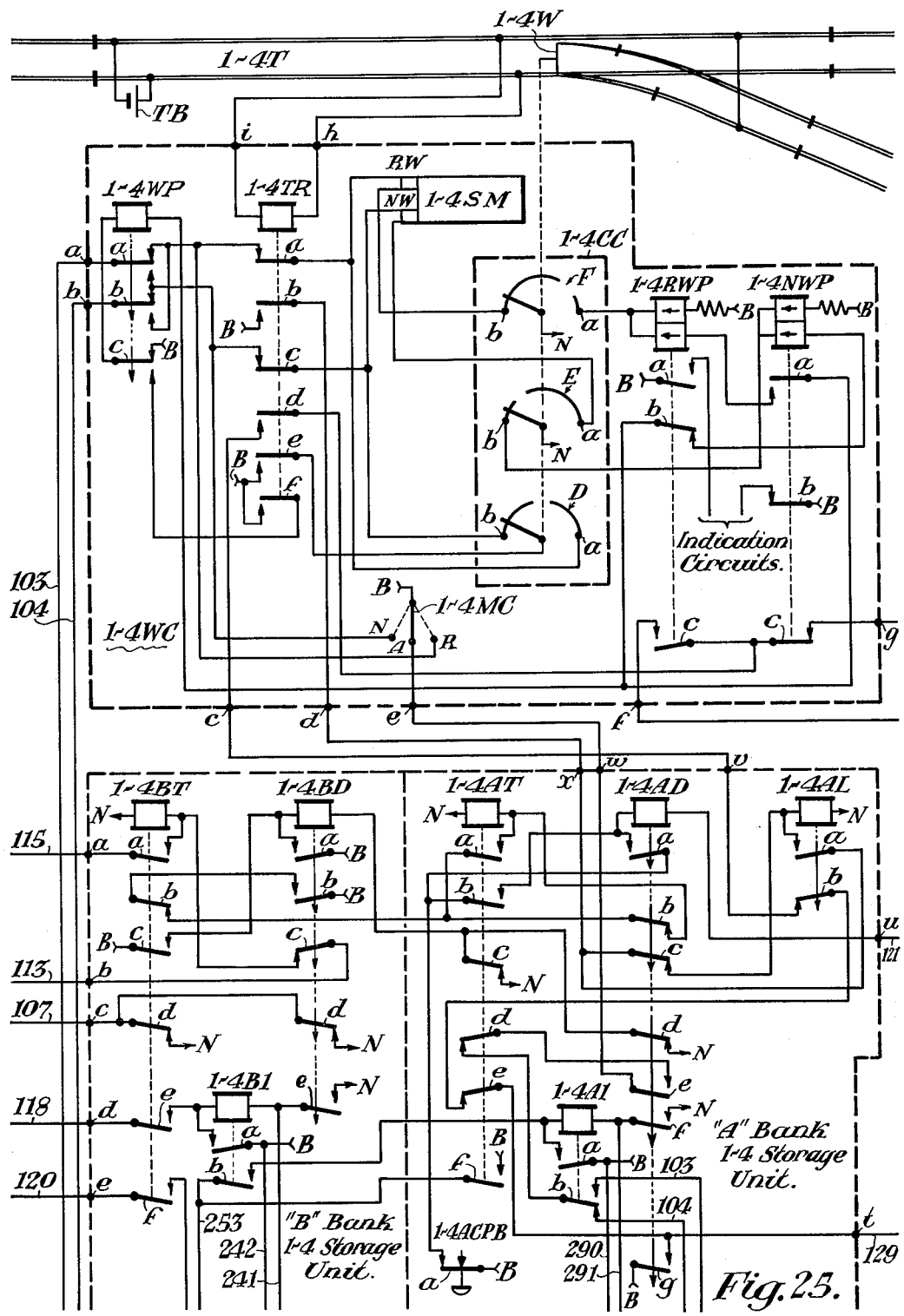

Switch control 1–4WC in FIG. 25 is substantially similar to switch control 1–8WC in most respects. The circuits for relays 1–4RWP, 1–4NWP, 1–4WP, the operating circuits for magnets RW and NW, the operation of switch machine 1–4SM, and the operation of circuit controller 1–4CC are identical with those described for switch control 1–8WC and this description will not be repeated. The operation of switch control 1–4WC in the N and R positions of lever 1–4MC is the same as that just described for switch control 1–8WC.

The switch control circuit in the automatic position of lever 1–4MC extends from terminal B of the battery over terminal A of lever 1–4MC, terminal e of switch control 1–4WC, terminal w of the A bank of the 1–4 storage unit, front contact e of relay 1–4AD, to be described, back contact d of relay 1–4AT, to be descirbed, and the front or back point of contact b of relay 1–4A1, the route storage relay for switch 1–4W, which as will be described later is picked up to direct a reverse movement of switch 1–4W and is released to direct a normal movement of the switch, over lead 103 or 104 respectively, to terminals c or b of the A bank of the 1–4 storage unit (FIG. 40), and thence over lead 103 or 104 to terminal a or terminal b, respectively, of switch control 1–4WC (FIG. 25). Under normal conditions, with relay 1–4WP up, the circuit may be completed from terminal a of switch control 1–4WC, which is energized when relay 1–4A1 is picked up, over front contact a of relay 1–4WP, front contact a of relay 1–4TR, through reverse magnet RW, and through circuit controller F to terminal N of the battery to direct a reverse movement of the switch. If relay 1–4A1 is down, and terminal b of switch control 1–4WC is energized over the circuit previously traced, the circuit is completed over front contact b of relay 1–4WP, front contact c of relay 1–4TR, through the normal magnet NW, and through circuit controller E to direct a normal setting of the switch. Under conditions where, due to failure, relay 1–4WP is deenergized, an opposite setting of the switch will be sought by circuits extending from terminal a or b of switch control 1–4WC and back contact a or back contact b of relay 1–WP in the same manner as previously described for switch control 1–8WC.

The circuits including terminals c, d, f, and g of switch control 1–4WC will be described later in connection with other units.

Figure 24:
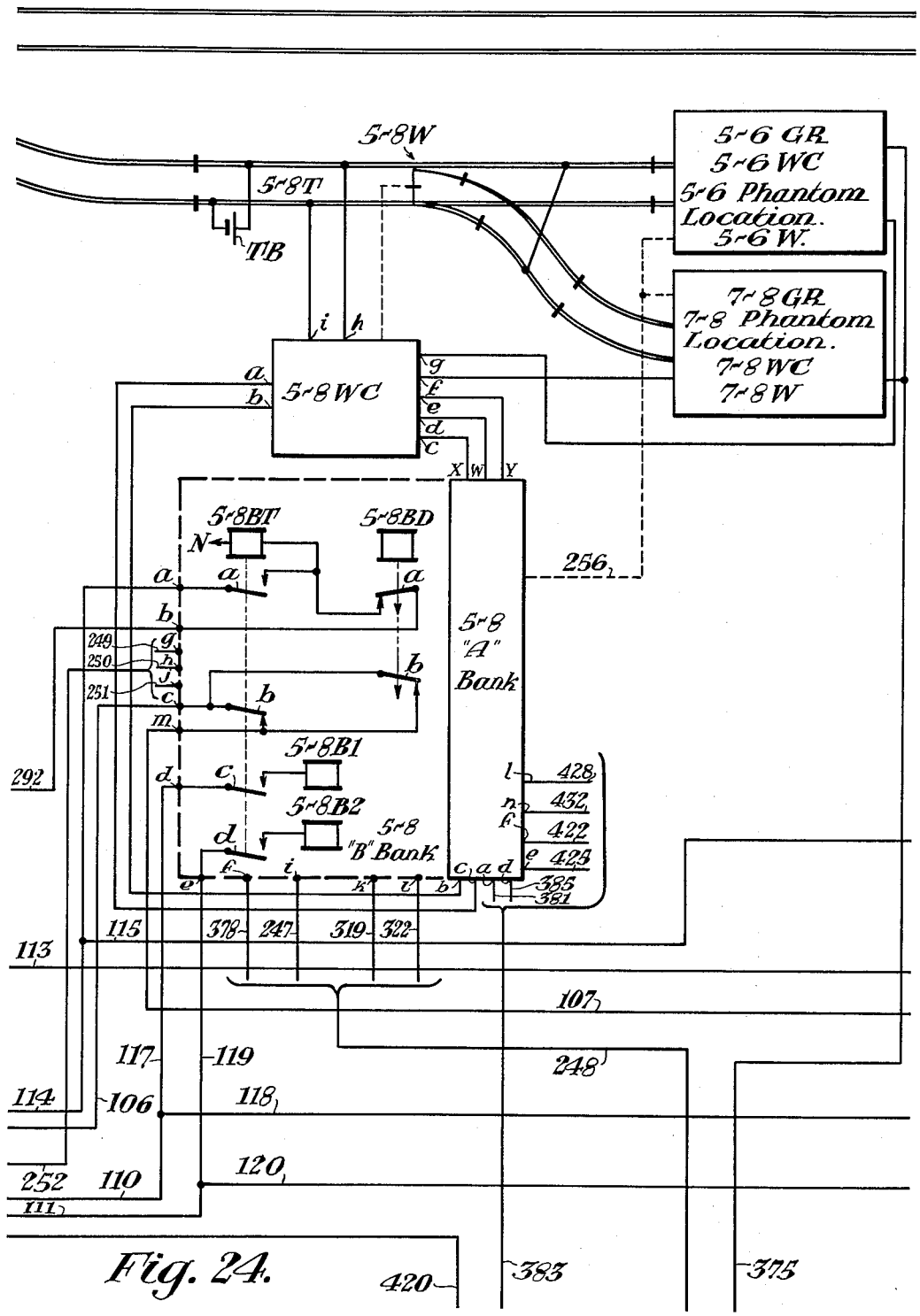

Switch control 5–8WC in FIG. 24 is identical in all respects to switch control 1–4WC and is shown in block form. The circuits connected to terminals a through i of 5–8WC correspond in detail to those shown connected to terminals a through i of switch control 1–4WC and will therefore not be shown in detail.

Figure 32:
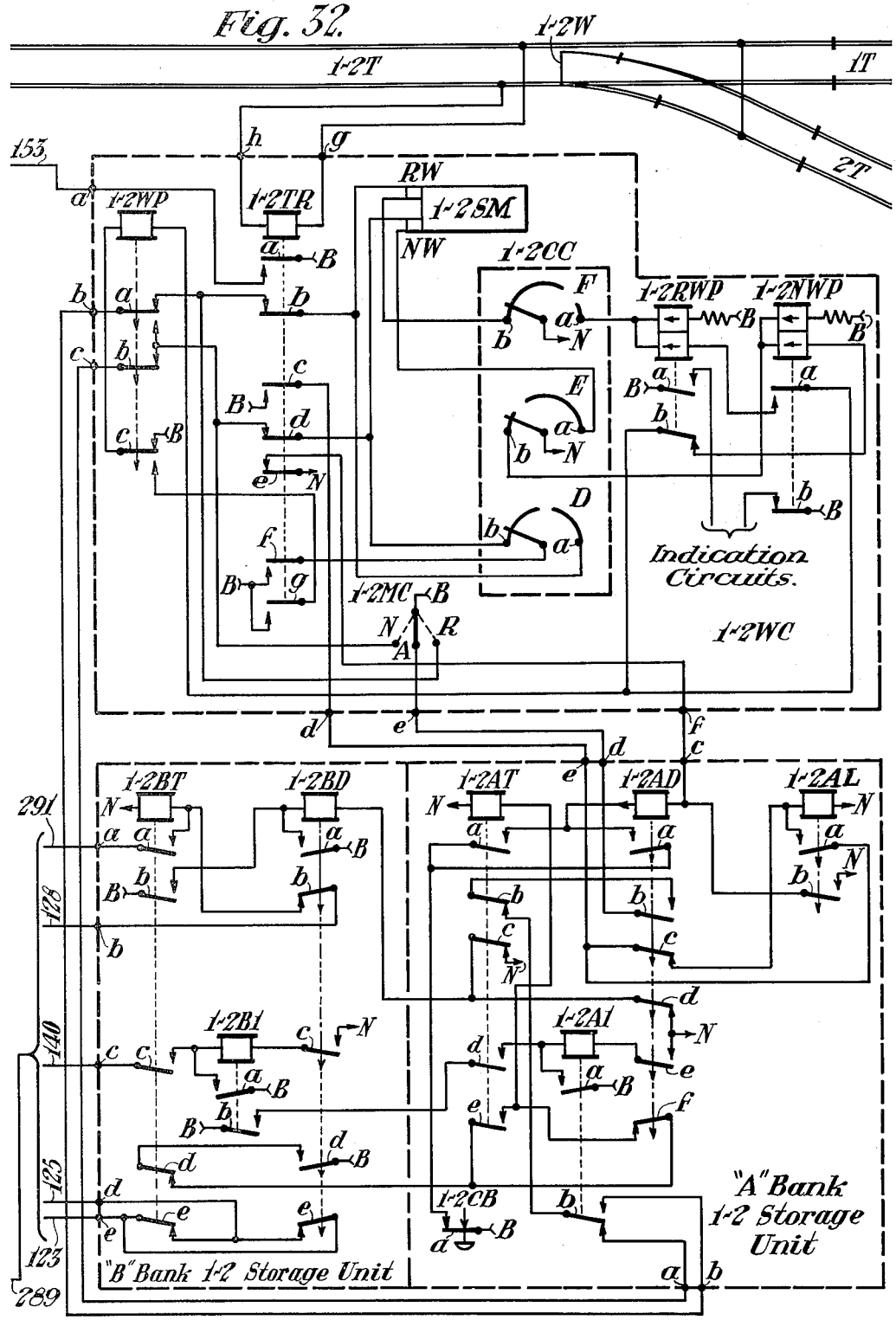

Switch control 1–2WC in FIG. 32 is substantially identical with the previously described switch control units 1–8WC and 1–4WC in that relays 1–2RWP, 1–2NWP, 1–2TR, and 1–2WP have the same control circuits and cooperate with manual control lever 1–2MC and circuit controller 1–2CC to control 1–2SM in the same manner as previously described. Accordingly, these circuits will not be further described in detail.

The switch operating circuit for unit 1–2WC in the automatic position of manual control lever 1–2MC extends from terminal B of the battery over terminal A of lever 1–2MC, terminal e of switch control 1–2WC, terminal d of the A bank of the 1–2 storage location, front contact b of relay 1–2AD, to be described, back contact b of relay 1–2AT, to be described, and the front or back point of contact b of route storage relay 1–2A1, to be described, according as the relay is picked up to direct reverse movement of the switch or released to direct a normal setting of the switch, to terminals b or a of the A bank of the 1–2 storage location, and thence to terminal b or c, respectively, of switch control 1–2WC. The circuits from these terminals to the magnets RW and NW are identical with those previously described in connection with switch controls 1–8WC and 1–4WC and will not be further described.

Figure 26:
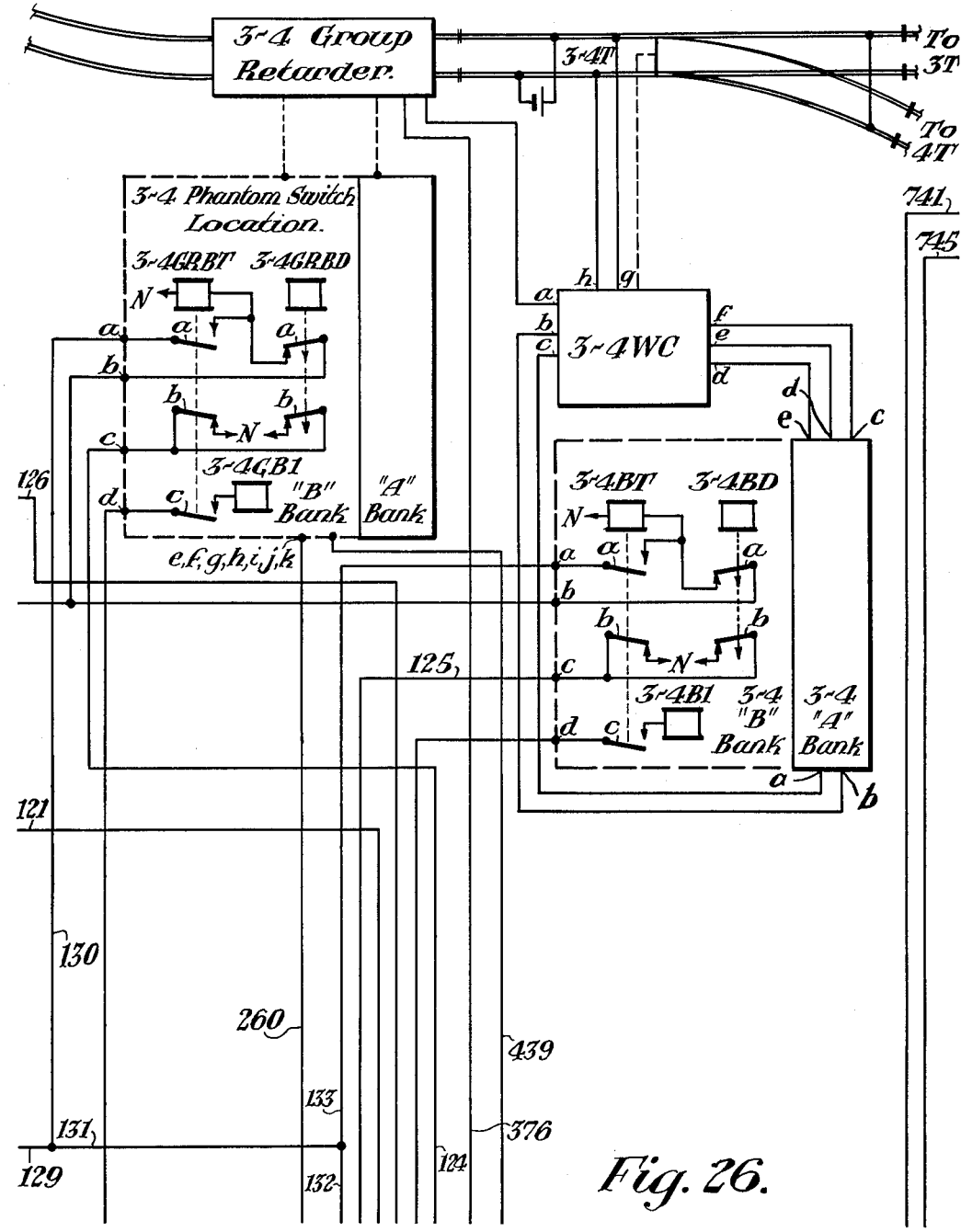

Switch control 3–4WC in FIG. 26 is identical with switch control 1–2WC just described, and its terminals a through h are connected to the same circuits as are the corresponding terminals of switch control 1–2WC. Switch controls 5–6WC and 7–8WC are also identical with switch control 1–2WC and are therefore not shown in detail.

The automatic switching system

Initial storage unit 1-8 of the automatic switching system is shown in FIGS. 48, 49, 60 and 61. This unit comprises three storage banks A, B and C as shown. For purposes of illustration, eight push buttons 1PB through 8PB have been shown for setting routes into the C bank of the storage unit. In practice, however, it will be apparent to those skilled in the art that other known means, such as an automatic tape storage system, could be used to supply this information if desired without departing from the scope of our invention.

The C bank of the 1-8 storage unit comprises three control relays 1-8CT, 1-8CSC and 1-8CD, eight storage relays 1-8C1C through 1-8C8C, and eight indicator lamps 1-8C1K through 1-8C8K. Relays 1-8CT and 1-8CD are made slow releasing by any suitable conventional means, as indicated by the arrow through their contacts, to ensure the proper sequence of operation of the control circuits actuated thereby.

Relay 1-8CT is a transfer control relay having a pickup circuit extending from terminal B of the battery over either back contact $a$ of relay 1-8BT or back contact $a$ of relay 1-8BD in the B bank of the 1-8 storage unit and through the winding of relay 1-8CT to terminal N of the battery.

Relay 1-8CSC is a storage cancellation relay having a pickup circuit extending from terminal B of the battery over the normally open contact of a cancellation push button 1-8CPB, front contact $b$ of relay 1-8CD and through the winding of relay 1-8CSC to terminal N of the battery. Relay 1-8CSC has a first stick circuit extending from terminal B of the battery over the normally open contact of cancellation push button 1-8CPB, its own front contact $b$, and through its winding to terminal N of the battery. A second stick circuit for relay 1-8CSC is provided over its front contact $d$ and front contact $c$ of relay 1-8CD to terminal B of the battery.

Relay 1-8CD is a storage detection relay which has multiple pickup circuits extending from terminal B of the battery over front contact $c$ of each relay 1-8C1C through 1-8C8C and through the winding of relays 1-8CD to terminal N of the battery.

Each of relays 1-8C1C through 1-8C8C has a similar pickup circuit. The pickup circuit for relay 1-8C1C extends from terminal B of the battery over back contact $d$ of relay 1-8CD, back contact $b$ of relay 1-8BT, front contact $a$ of push button 1PB, back contact $a$ of relay 1-8C1C, through the winding of relay 1-8C1C, and over front contact $b$ of relay 1-8CT and back contact $a$ of relay 1-8CSC to terminal N of the battery. Relay 1-8C1C has a stick circuit which extends from terminal B of the battery over its own front contact $a$, through the winding of the relay, and over a common circuit which extends over front contact $b$ of relay 1-8CT and back contact $a$ of relay 1-8CSC to terminal N of the battery.

The pickup circuit for relay 1-8C2C is substantially identical with that for relay 1-8C1C except that it includes a back contact of the preceding push button 1PB. This pickup circuit extends from terminal B of the battery over back contact $d$ of relay 1-8CD, back contact $b$ of relay 1-8BT, back contact $a$ of push button 1PB, front contact $a$ of push button 2PB, the back point of contact $a$ of relay 1-8C2C, and through the winding of relay 1-8C2C to the common portion of the circuit previously traced, which extends over front contact $b$ of relay 1-8CT and back contact $a$ of relay 1-8CSC to terminal N of the battery. The stick circuit for relay 1-8C2C is similar for relay 1-8C1C and extends from a common bus connected to terminal B of the battery, over its front make-before-break contact $a$, through the winding of the relay, and through the common portion of the circuit previously traced to terminal N of the battery. The pickup and stick circuits for the remaining relays 1-8C3C through 1-8C8C are similar to those previously traced except that in each case the pickup circuit includes the back contacts $a$ of all the preceding push button. For example, the pickup circuit for relay 1-8C8C includes back contacts $a$ of push buttons 1PB through 7PB and front contact $a$ of push button 8PB. Contact $a$ of each of relay 1-8C1C through 1-8C8C is of the make-before break type as indicated by the arc shown across the contact arm, to permit stick circuits for the relays to be established before the pickup circuits are broken. The remaining details of these pickup and stick circuits are believed to be obvious from the preceding description and will not be further described.

Each of the C bank indicator lamps 1-8C1K through 1-8C8K has a similar energizing circuit which extends from terminal BX of an alternating current source, not shown, over front contact $a$ of slow release relay 1-8CD, front contact $a$ of slow release relay 1-8CT, front contact $d$ of the associated storage relay 1-8C1C through 1-8C8C, and through the filament of the lamp 1-8C1K through 1-8C8K to a common bus connected to terminal NX of the alternating current source.

The B bank of the 1-8 storage unit includes three control relays, transfer relay 1-8BT, storage cancellation relay 1-8BSC, and a slow release storage detection relay 1-8BD; eight storage relays 1-8B1C through 1-8B8C; and eight indicator lamps 1-8B1K through 1-8B8K as shown. Relay 1-8BD is made slow to release by conventional means, not shown, as indicated by the arrow through its contacts, to ensure the correct sequence of operation of the circuits controlled thereby.

Transfer relay 1-8BT has a pickup circuit extending from terminal B of the battery over front contact $e$ of slow release relay 1-8CD, back contact $c$ of relay 1-8BD, and through the winding of relay 1-8BT to terminal N of the battery. Relay 1-8BT has two stick circuits. The first extends from terminal B of the battery over front contact $e$ of relay 1-8CD, front contact $c$ of relay 1-8BT and through the relay to terminal N of the battery. The second stick circuit for relay 1-8BT extends from terminal B of the battery over any of the front contacts $b$ of push buttons 1PB through 8PB, front contact $d$ of relay 1-8BT, and through the winding of relay 1-8BT to terminal N of the battery.

Storage cancellation relay 1-8BSC has a pickup circuit extending from terminal B of the battery over the normally open contact of cancellation push button 1-8CPB, back contact $b$ of slow release relay 1-8CD, back contact $c$ of relay 1-8CSC, front contact $b$ of slow release detector relay 1-8BD, and through the winding of relay 1-8BSC to terminal N of the battery. Relay 1-8BSC has two stick circuits. The first extends from terminal B of the battery over contact $a$ of cancellation button 1-8CPB, back contact $b$ of relay 1-8CD, back contact $c$ of relay 1-8CSC, front contact $a$ of relay 1-8BSC and through the winding of the relay to terminal N of the battery. The second stick circuit for relay 1-8BSC extends from terminal B of the battery over front contact $d$ of detector relay 1-8BD, front contact $b$ of relay 1-8BSC, and through the winding of the relay to terminal N of the battery.

Slow release detector relay 1-8BD has a pickup circuit extending from terminal B of the battery over back contact $d$ of relay 1-8BSC, front contact $f$ of relay 1-8BT, through the winding of relay 1-8BD, and over either back contact $b$ of relay 1-8AT or back contact $b$ of relay 1-8AD in the A bank of the storage unit to terminal N of the battery. Relay 1-8BD has a stick circuit extending from terminal B of the battery over back contact $d$ of relay 1-8BSC and front contact $e$ of relay 1-8BD, through the winding of relay 1-8BD, and over back contacts $b$ in multiple of relays 1-8AT and 1-8AD in the A bank of the storage unit to terminal N of the battery.

Relays 1-8B1C through 1-8B8C have similar pickup circuits. These pickup circuits include a common portion extending from terminal B of the battery over front contact $e$ of relay 1-8BT, individual paths extending over front contact $b$ of the respective associated relay 1–8C1C through 1–8C8C to the back point of contact *a* of the respective relay 1–8B1C through 1–8B8C and through the winding of the respective relay 1–8B1C through 1–8B8C, and a common bus extending over front contact *h* of relay 1–8BD to terminal N of the battery. Relays 1–8B1C through 1–8B8C have similar stick circuits, each extending from terminal B of the battery over a common bus to the front point of contact *a* of the respective relay 1–8B1C through 1–8B8C and through the winding of the relay to a common bus extending to terminal N of the battery over front contact *h* of relay 1–8BD. Contact *a* of each of relays 1–8B1C through 1–8B8C is of the make-before-break type, as indicated by the arc shown on the movable arm, to permit the stick circuits to be completed before the pickup circuits are broken.

Indicator lamps 1–8B1K through 1–8B8K have similar energizing circuits extending from terminal BX of a source of alternating current, not shown, over front contact *g* of relay 1–8BD, back contact *h* of relay 1–8BT, over front contact *c* of the associated storage relay 1–8B1C through 1–8B8C, and through the filament of the lamp to a common bus connected to terminal NX of the alternating current source.

The A bank of the 1–8 storage unit includes four control relays, a transfer control relay 1–8AT, a storage cancellation relay 1–8ASC, a slow release storage detector relay 1–8AD and a transfer locking relay 1–8AL. The A bank also includes eight storage relays 1–8A1C through 1–8A8C, eight indicator lamps 1–8A1K through 1–8A8K associated with the storage relays, a route code storage relay 1–8A1 and a cancellation push button 1–8ACPB.

Relay 1–8AT has a pickup circuit extending from terminal B of the battery over front contact *f* of relay 1–8BD in the B bank, back contact *g* of relay 1–8BT, back contact *a* of relay 1–8AD, and through the winding of relay 1–8AT to terminal N of the battery. Relay 1–8AT has a stick circuit extending from terminal B of the battery over front contact *f* of relay 1–8BD, back contact *g* of relay 1–8BT, its own front contact *a*, and through its winding to terminal N of the battery.

Storage cancellation relay 1–8ASC has a pickup circuit extending from terminal B of the battery over front contact *a* of cancellation push buton 1–8CPB, back contact *b* of relay 1–8CD in the C bank, back contact *c* of relay 1–8CSC, back contact *b* of relay 1–8BD in the B bank, back contact *c* of relay 1–8BSC, front contact *c* of relay 1–8AD in the A bank, and through the winding of relay 1–8ASC to terminal N of the battery. Relay 1–8ASC has a first stick circuit which coincides with its pickup circuit previously traced up to back contact *c* of relay 1–8BSC, and is then continued over its own front contact *a* and through its winding to terminal N of the battery. Relay 1–8ASC has a second stick circuit extending from terminal B of the battery over front contact *d* of relay 1–8AD, its own front contact *b*, and through its winding to terminal N of the battery.

Relay 1–8AD has a pickup circuit extending from terminal B of the battery over normally closed contact *a* of cancellation push button 1–8ACPB, back contact *c* of relay 1–8ASC, front contact *c* of relay 1–8AT, through the winding of relay 1–8AD to terminal *b* of the A bank, and over lead 106 to terminal *c* of the B bank of the 5–8 storage unit (FIG. 24), over back contacts *b*, in multiple, of relays 5–8BT and 5–8BD out of the B bank at terminal *m*, over lead 107 to terminal *c* of the B bank of the 1–4 storage unit (FIG. 25), and thence over back contact *d* of relay 1–4BT and back contacts *d*, in multiple, of relays 1–4BT and 1–4BD to terminal N of the battery. Relay 1–8AD has a stick circuit which extends from terminal B of the battery over contact *a* of cancellation push button 1–8ACPB (FIG. 49), back contact *c* of relay 1–8ASC, front contact *e* of relay 1–8AD, through the winding of relay 1–8AD to lead 106, and thence over the circuit path traced above to terminal N of the battery in the B bank of the 1–4 storage unit (FIG. 25).

Relay 1–8AL has a pickup circuit extending from terminal B of the battery in switch control unit 1–8WC (FIG. 23), back contact *c* of track relay 1–8TR, terminal *e* of unit 1–8WC, lead 108, terminal *c* of the A bank of the 1–8 storage unit (FIG. 49), over back contact *f* of relay 1–8AD, and through the winding of relay 1–8AL to terminal N of the battery. Relay 1–8AL has a stick circuit which extends from terminal B of the battery in switch control unit 1–8WC (FIG. 23), over back contact *c* of relay 1–8TR, over lead 108, over front contact *a* of relay 1–8AL, and through the winding of the relay to terminal N of the battery.

Relays 1–8A1C through 1–8A8C have similar pickup circuits extending from terminal B of the battery over front contact *f* of relay 1–8AT (FIG. 49), front contact *b* of any one of relays 1–8B1C through 1–8B8C (FIG. 48), over the back point of make-before-break contact *a* of the respective relay 1–8A1C through 1–8A8C, and through the winding of the relay to a bus extending to terminal N of the battery over front contact *i* of relay 1–8AD. Relays 1–8A1C through 1–8A8C have similar stick circuits extending from terminal B of the battery over a common bus to the front point of contact *a* of any of the relays 1–8A1C through 1–8A8C and through the winding of the relay over front contact *i* of relay 1–8AD to terminal N of the battery.

Indicator lamps 1–8A1K through 1–8A8K have similar energizing circuits extending from terminal BX of an alternating current source, not shown, front contact *j* of relay 1–8AD, back contact *g* of relay 1–8AT, the front contact *b* of the associated relay 1–8A1C through 1–8A8C, and through the filament of the lamp to a common bus connected to terminal NX of the alternating current source.

The route indication stored in relays 1—8A1C through 1–8A8C is in the form of a contact associated with each track and indicating the selection of that track by being closed in its front position. For use in the remainder of the apparatus, it is convenient to translate this information into a code in which one bit is assigned to each switch in series in a route, each bit having a first condition in which the associated switch is to be reversed, and a second condition corresponding to the normal positioning of the switch. For this purpose, as applied to the eight track layout of the illustrated embodiment, in which there are three switches in any given route, three bits of information are required. Accordingly, three lines 109, 110 and 111 are provided to transmit the required information. Line 109 is associated with switch 1–8W, line 110 is associated with the second switches 1–4W and 5–8W, and line 111 is associated with final switches 1–2W, 3–4W, 5–6W and 7–8W.

The first switch 1–8W is reversed for each of the routes leading to tracks 5T through 8T and is normal for the remaining routes leading to tracks 1T through 4T. Accordingly, line 109 is energized over front contacts of relays 1–8A5C through 1–8A8C. This circuit extends from terminal B of the battery over a common bus 288 and in multiple over front contacts *c* of relays 1–8A5C through 1–8A8C to line 109 as shown.

The energized or deenergized condition of line 109 is repeated by relay 1–8A1, which has its winding connected at one side to line 109 and at the other side to terminal N of the battery. Accordingly, relay 1–8A1 is picked up when it is required to reverse switch 1–8W and is released when switch 1–8W is required to be in its normal position. This relay controls the application of energy to lines 101 and 102 over its front or back points, respectively. Lines 101 and 102 are connected to terminals *a* and *b* of switch control 1–8WC in the circuits previously described.

Line 110 governs the operation of switches 1–4W and 5–8W. Switch 1–4W is reversed for the routes leading to tracks 3T and 4T. Switch 5–8 is reversed for the routes leading to tracks 7T and 8T. Accordingly, line 110 is energized over a circuit extending from terminal B of the battery and common bus 288, front contacts c of relays 1–8A3C and 1–8A4C and front contacts d of relays 1–8A7C and 1–8A8C.

Line 111 governs the operation of the end switches 1–2W through 7–8W. These switches are reversed for the routes leading to the even tracks 2T, 4T, 6T and 8T. Accordingly, line 111 is energized over a circuit extending from terminal B of the battery and common bus 288 over front contacts c of relay 1–8A2C, d of relay 1–8A4C, d of relay 1–8A6C, and e of relay 1–8A8C.

Lines 110 and 111 are connected to terminals h and i, respectively, of the A bank of the 1–8 storage unit, and the information represented thereby is transmitted successively to the succeeding storage units by circuitry to be described.

Figure 40:
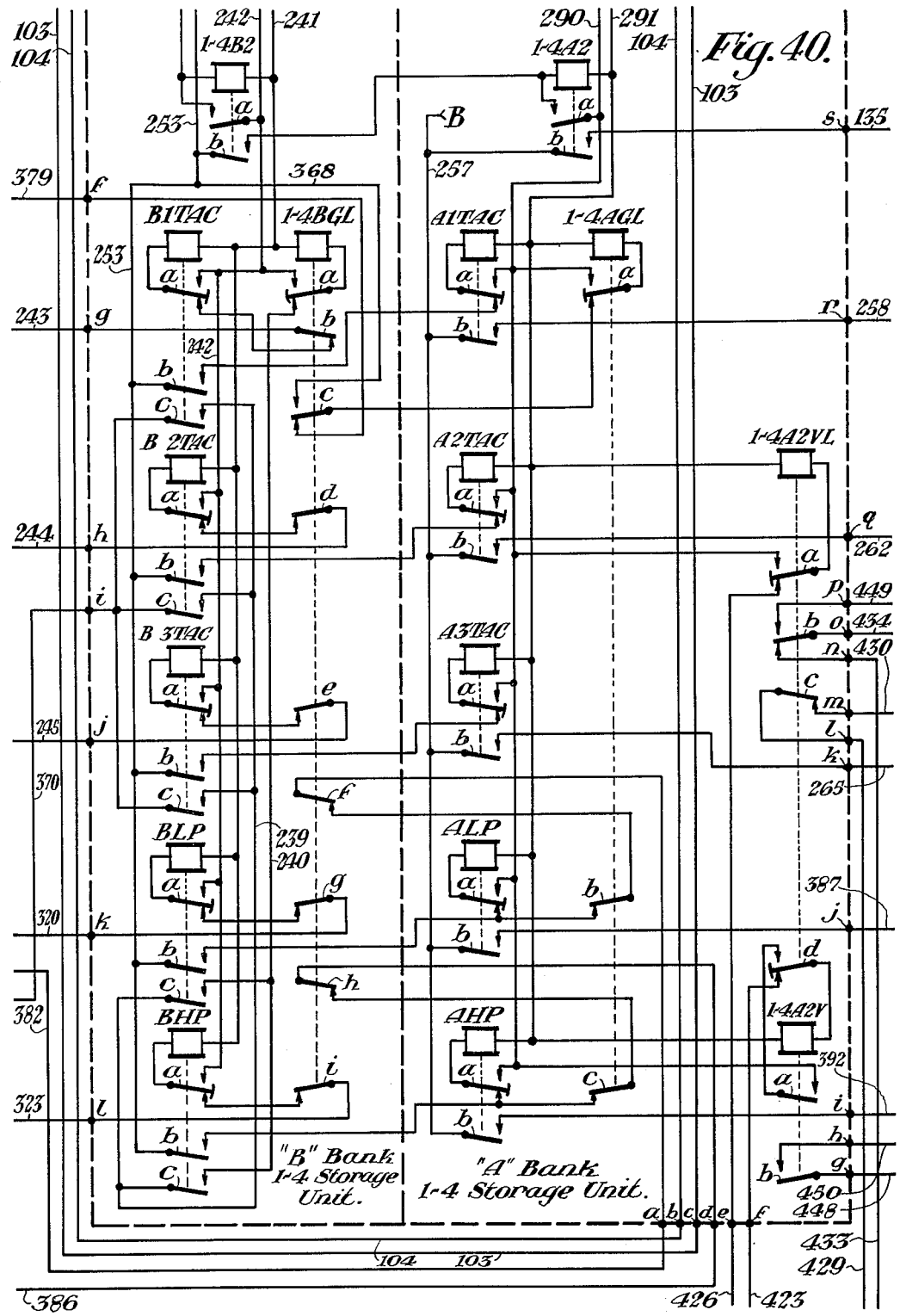
Figure 41:
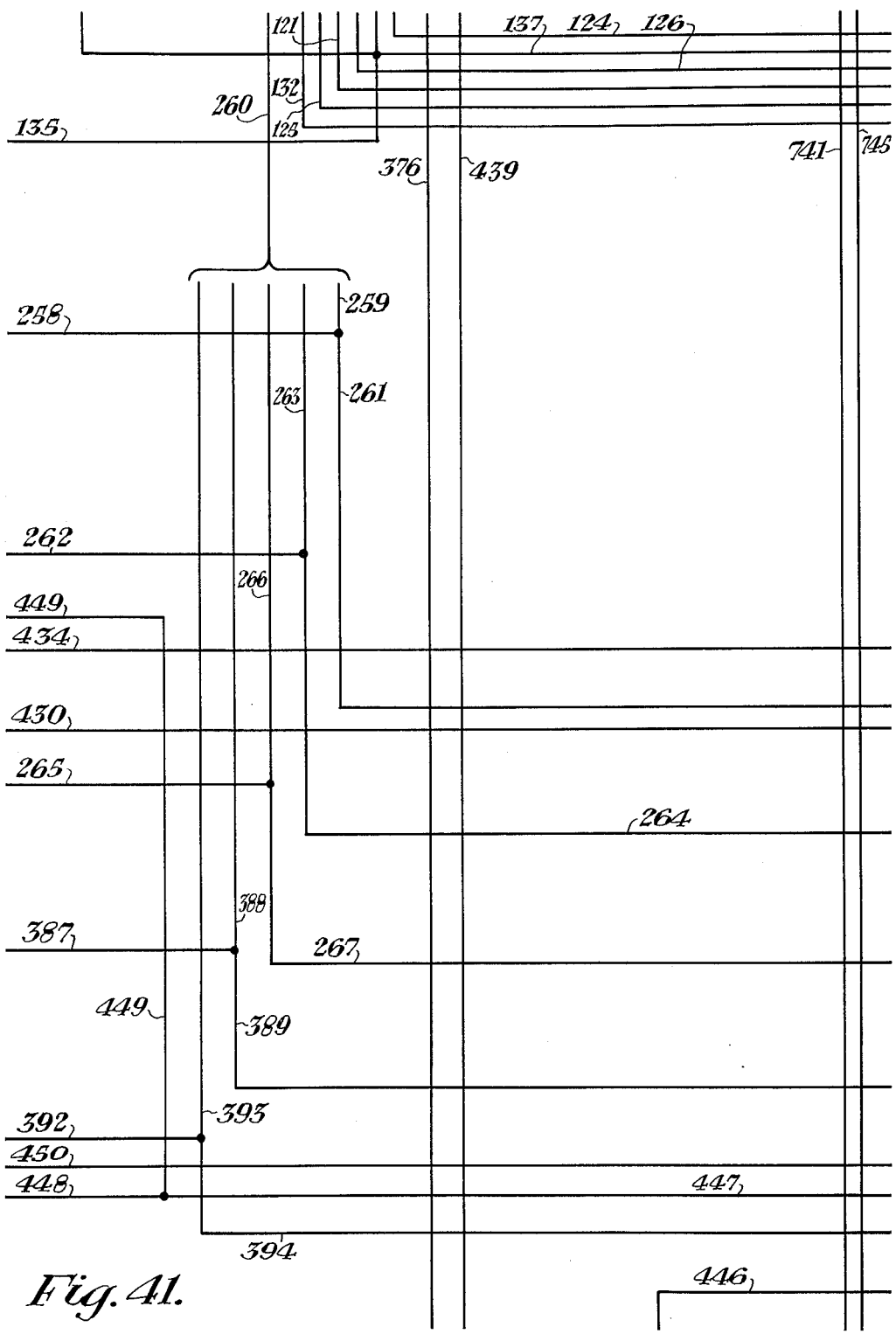

The 1–4 storage unit is shown in FIGS. 25 and 40. For purposes of illustration, it is shown as having two banks A and B.

As shown in FIGS. 25 and 40, the B bank of the 1–4 storage unit comprises two control relays 1–4BT and 1–4BD, two route storage relays 1–4B1 and 1–4B2, an additional control relay 1–4BGL, three tangent acceleration code storage relays B1TAC, B2TAC and B3TAC, and two weight storage relays BLP and BHP.

Relay 1–4BT has a pickup circuit extending from terminal B of the battery in bank A of the 1–8 storage unit (FIG. 49), over front contact g of relay 1–8AD, back contact d of relay 1–8AT, back contact b of relay 1–8AL, terminal a of the A bank of the 1–8 storage unit, lead 112, terminal d of switch control unit 1–8WC (FIG. 23), back contact e of relay 1–8TR, front contact c of relay 1–8NWP in the normal position of the switch, terminal h of switch control 1–8WC, lead 113, terminal b of the B bank of the 1–4 storage unit (FIG. 25), back contact c of relay 1–4BD, and through the winding of relay 1–4BT to terminal N of the battery. Relay 1–4BT has a stick circuit extending from terminal B of the battery in the A bank of the 1–8 storage unit (FIG. 49), over front contact g of relay 1–8AD to terminal d of the A bank of the 1–8 storage unit, lead 114, lead 115 (FIG. 24), to terminal a of the B bank of the 104 storage unit (FIG. 25), over front contact a of relay 1–4BT, and through the winding of the relay to terminal N of the battery.

Relay 1–4BD (FIG. 25) has a pickup circuit extending from terminal B of the battery over front contact c of relay 1–4BT, through the winding of relay 1–4BD, and in multiple over back contact c of relay 1–4AT and back contact d of relay 1–4AD to terminal N of the battery. Relay 1–4BD has a stick circuit which extends from terminal B of the battery over its own front contact a, through the winding of the relay, and in multiple over back contact c of relay 1–4AT and back contact d of relay 1–4AD to terminal N of the battery. Relay 1–4BD is made relatively slow to release as indicated schematically in the drawing.

Relay 1–4B1 (FIG. 25) has a pickup circuit extending from terminal B of the battery over the multiple energizing circuit for lead 110 in the A bank of the 1–8 storage unit (FIGS. 49 and 61) previously described, to terminal h of the A bank of the 1–8 storage unit, such that lead 110 and terminal h are connected to terminal B of the battery when it is desired to reverse either switch 1–4W or 5–8W, from terminal h of the A bank of the 1–8 storage unit over lead 110, lead 118 (FIG. 24), to terminal d of the B bank of the 1–4 storage unit (FIG. 25), over front contact e of relay 1–4BT, through the winding of relay 1–4B1, and over front contact e of relay 1–4BD to terminal N of the battery. Relay 1–4B1 has a stick circuit extending from terminal B of the battery over its own front contact a, through the winding of the relay, and over front contact e of relay 1–4BD to terminal N of the battery.

Figure 49:
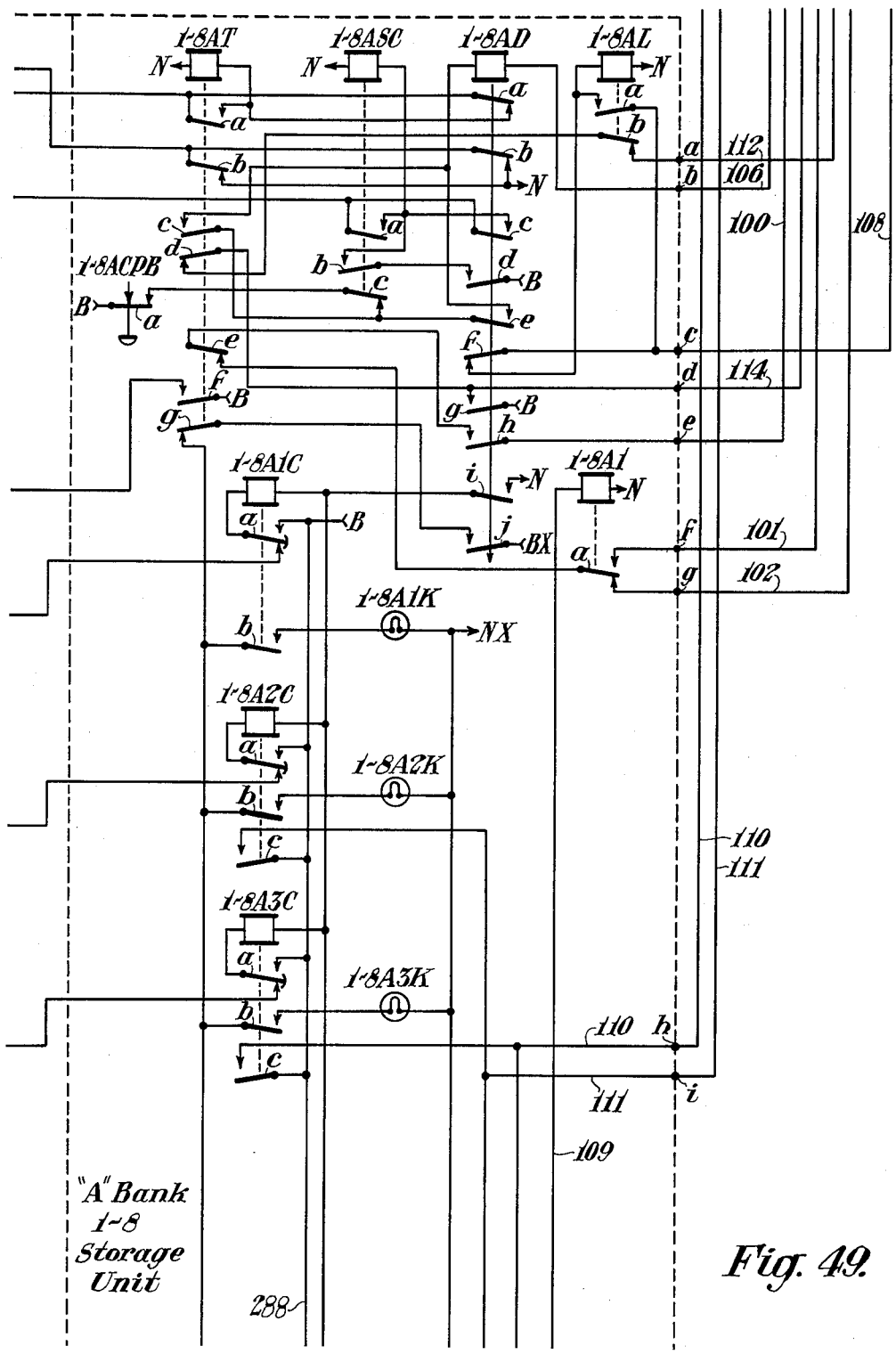

Relay 1–4B2 (FIG. 40) has a pickup circuit extending from the multiple energizing circuit for lead 111 in storage bank A of the 1–8 storage unit (FIGS. 49 and 61), previously described, which connects terminal B of the battery to lead 111 to indicate a reverse setting of the selected terminal switch 1–2W through 7–8W when any route to even tracks 2T, 4T, 6T and 8T is selected, over lead 111 from terminal i of the A bank of the 1–8 storage unit in FIG. 49 to lead 120 in FIG. 24, thence to terminal e of the B bank of the 1–4 storage unit in FIG. 25, over front contact f of relay 1–4BT, through the winding of relay 1–4B2 (FIG. 40), and over common bus 241 for the storage relays of the B bank and front contact e of relay 1–4BD (FIG. 25) to terminal N of the battery. Relay 1–4B2 has a stick circuit extending from terminal B of the battery over bus 242, its front contact a, through the winding of the relay, and over bus 241 and front contact e of relay 1–4BD to terminal N of the battery.

The circuits just described comprise basic automatic switching apparatus which is conventionally supplied for the control of switches in a classification yard. The remaining relays in the B bank of the 1–4 storage unit perform additional functions which will be described below in connection with the particular functions performed.

The A bank of the 1–4 storage unit (FIGS. 25 and 40) comprises three control relays 1–4AT, 1–4AD and 1–4AL, two route storage relays 1–4A1 and 1–4A2, three additional control relays 1–4AGL, 1–4A2VL and 1–4A2V, three tangent acceleration code storage relays A1TAC, A2TAC and A3TAC, and two weight storage relays ALP and AHP.

Relay 1–4AT (FIG. 25) has a pickup circuit extending from terminal B of the battery in the B bank of the 1–4 storage unit over front contact b of relay 1–4BD, back contact b of relay 1–4BT, back contact b of relay 1–4AD, and through the winding of relay 1–4AT to terminal N of the battery. Relay 1–4AT has a stick circuit extending from terminal B of the battery over front contact b of relay 1–4BD in the B bank of the 1–4 storage unit, back contact b of relay 1–4BT, its own front contact a, and through its winding to terminal N of the battery.

Slow release relay 1–4AD (FIG. 25) has a first pickup circuit extending from terminal B of the battery over normally closed contact a of cancellation push button 1–4ACPB, front contact b of relay 1–4AT, through the winding of relay 1–4AD, to terminal u of the A bank of the 1–4 storage unit, over lead 121, lead 122 (FIG. 42), terminal c of the B bank of the 1–2 phantom storage unit associated with group retarder 1–2GR, to terminal d of the 1–2GR storage unit over either back contact d of relay 1–2GRBT or back contact d of relay 1–2GRBD, to be described, from terminal d over lead 124 to terminal c of the 3–4 phantom storage location (FIG. 26) associated with group retarder 3–4GR, and over either back contact b of relay 3–4GRBT or back contact b of relay 3–4GRBD to terminal N of the battery. Relay 1–4AD (FIG. 25) has a second pickup circuit extending from terminal B of the battery over normally closed contact a of cancellation push button 1–4ACPB, front contact b of relay 1–4AT, through the winding of relay 1–4AD to terminal u of the A bank of the 1–4 storage unit, over lead 121, lead 123 and cable 289 (FIG. 42) to FIG. 31 where lead 123 is produced and connected to terminal e of the B bank of the 1–2 storage location associated with switch 1–2W, over back contact e of relay 1–2BT or back contact e of relay 1–2BD to terminal d of the B bank of the 1–2 storage location, from terminal d over lead 125 and cable 289 to FIG. 42, where lead 125 is produced, to terminal c of the B bank of the 3–4 storage unit associated with switch 3–4W (FIG. 26), and over contact b of relay 3–4BT or contact b of relay 3–4BD to terminal N of the battery. Relay 1–4AD (FIG. 25) has a stick circuit which shunts contact *b* of relay 1–4AT in the two pickup circuits previously traced over front contact *a* of relay 1–4AD. The remainder of the stick circuits are the same as for the two pickup circuits previously traced.

Transfer control relay 1–4AL (FIG. 25) has a pickup circuit extending from terminal B of the battery in switch control unit 1–4WC, over back contact *b* of relay 1–4TR, terminal *d* of switch control 1–4WC, terminal *x* of the B bank of the 1–4 storage unit, over back contact *c* of relay 1–4AD, and through the winding of relay 1–4AL to terminal N of the battery. Relay 1–4AL has a stick circuit which is the same as its previously traced pickup circuit except that its own front contact *a* shunts contact *c* of relay 1–4AD. Relay 1–4AL is made somewhat slow releasing as indicated to insure the proper sequence of operation of the circuits controlled thereby.

Route storage relay 1–4A1 (FIG. 25) has a pickup circuit extending from terminal B of the battery over front contact *f* of relay 1–4AT, front contact *b* of relay 1–4B1, through the winding of relay 1–4A1, and over front contact *f* of relay 1–4AD to terminal N of the battery. Relay 1–4A1 has a stick circuit extending from terminal B of the battery over its front contact *a*, through the winding of the relay, and over front contact *f* of relay 1–4AD to terminal N of the battery.

Route storage relay 1–4A2 (FIG. 40) has a pickup circuit extending from terminal B of the battery over front contact *f* of relay 1–4AT (FIG. 25), bus 253, front contact *b* of relay 1–4B2 (FIG. 40), through the winding of relay 1–4A2, and over bus 291 and front contact *f* of relay 1–4AD (FIG. 25) to terminal N of the battery. Relay 1–4A2 has a stick circuit extending from terminal B of the battery over bus 290 (FIG. 25), its own front contact *a*, through the winding of the relay, over bus 291 and front contact *f* of relay 1–4AD (FIG. 25) to terminal N of the battery.

The remaining relays in the A bank of the 1–4 storage location perform functions other than switching functions and will be described below in connection with the circuits to which they pertain.

The 5–8 storage location associated with switch 5–8W (FIG. 24) is identical with the 1–4 location just described and accordingly only those elements of its circuits which are required to understand the interconnection of the units have been shown, the remainder being indicated schematically in block form.

The 1–2 storage location associated with switch 1–2W is illustrated (FIG. 32) as having two banks B and A. Bank B comprises a transfer control relay 1–2BT, a slow release storage detector relay 1–2BD, and a route storage relay 1–2B1.

Relay 1–2BT has a pickup circuit extending from terminal B of the battery in bank A of the 1–4 storage unit (FIG. 25), over front contact *g* of relay 1–4AD, back contact *e* of relay 1–4AT, back contact *b* of relay 1–4AL, terminal *v* of the A bank of the 1–4 storage unit, terminal *c* of unit 1–4WC, back contact *d* of relay 1–4TR, front contact *c* of relay 1–4NWP in the normal position of the switch, terminal *g* of unit 1–4WC, lead 126, lead 128 (FIG. 42), over cable 289 to FIG. 32, lead 128, terminal *b* of the A bank of the 1–2 storage unit, back contact *b* of relay 1–2BD, and through the winding of relay 1–2BT to terminal N of the battery. Relay 1–2BT has a stick circuit extending from terminal B of the battery in storage bank A of the 1–4 storage unit (FIG. 25), front contact *g* of relay 1–4AD, terminal *t* of the A bank of the 1–4 storage unit, lead 129, lead 131 (FIG. 26), lead 132, lead 291 (FIG. 42), cable 289 to FIG. 32, lead 291, terminal *a* of the 1–2 storage unit, and over front contact *a* of relay 1–2BT and through the winding of the relay to terminal N of the battery.

Slow release relay 1–2BD (FIG. 32) has a pickup circuit extending from terminal B of the battery over front contact *b* of relay 1–2BT, through the winding of relay 1–2BD, and over back contact *c* of relay 1–2AT and back contact *d* of relay 1–2AD in multiple to terminal N of the battery. Relay 1–2BD has a stick circuit extending from terminal B of the battery over its front contact *a*, through the winding of the relay and over back contact *c* of relay 1–2AT and back contact *d* of relay 1–2AD in multiple to terminal N of the battery.

Relay 1–2B1 (FIG. 32) has a pickup circuit extending from terminal B of the battery in the A bank of the 1–4 storage unit (FIG. 40), over front contact *b* of relay 1–4A2, terminal *s* of the A bank of the 1–4 storage unit, lead 135, lead 137 (FIG. 41), lead 140 (FIG. 42), cable 289 to FIG. 32, lead 140, terminal *c* of the B bank of the 1–2 storage unit, over front contact *c* of relay 1–2BT, through the winding of relay 1–2B1, and over front contact *c* of relay 1–2BD to terminal N of the battery. Relay 1–2B1 has a stick circuit extending from terminal B of the battery over its own front contact *a*, through the winding of the relay, and over front contact *c* of relay 1–2BD to terminal N of the battery.

The A bank of the 1–2 storage unit (FIG. 32) comprises a transfer control relay 1–2AT, a slow release storage detector relay 1–2AD, a slow release locking relay 1–2AL, a route storage relay 1–2A1, and a cancellation push button 1–2CB.

Relay 1–2AT has a pickup circuit extending from terminal B of the battery in the B bank of the 1–2 storage unit over front contact *d* of slow release relay 1–2BD, back contact *d* of relay 1–2BT, back contact *f* of relay 1–2AD in the A bank of the 1–2 storage unit, and through the winding of relay 1–2AT to terminal N of the battery. Relay 1–2AT has a stick circuit which extends from terminal B of the battery over front contact *d* of relay 1–2BD, back contact *d* of relay 1–2BT, front contact *e* of relay 1–2AT, and through the winding of the relay to terminal N of the battery.

Storage detection relay 1–2AD is a conventional relay, made slightly slow releasing in any conventional manner known in the art. It has a pickup circuit extending from terminal B of the battery over the normally closed contact of cancellation button 1–2CB, front contact *a* of relay 1–2AT, through the winding of the relay to terminal *c* of the A bank of the 1–2 storage unit, terminal *f* of switch control unit 1–2WC, and over front contact *e* of relay 1–2TR to terminal N of the battery. Relay 1–2AD has a second pickup circuit extending from terminal B of the battery over the normally closed contact of cancellation button 1–2CB, front contact *a* of relay 1–2AT, through the winding of the relay, and over front contact *b* of relay 1–2AL to terminal N of the battery. Relay 1–2AD has a pair of stick circuits which are the same as its previously traced pickup circuits except that its own front contact *a* shunts front contact *a* of relay 1–2AT.

Locking relay 1–2AL is made somewhat slow to release as indicated. It has a pickup circuit extending from terminal B of the battery in switch control unit 1–2WC (FIG. 32), back contact *c* of relay 1–2TR, terminal *d* of unit 1–2WC, terminal *e* of the A bank of the 1–2 storage unit, back contact *c* of relay 1–2AD, and through the winding of relay 1–2AL to terminal N of the battery. Relay 1–2AL has a stick circuit which is the same as its previously traced pickup circuit except that its own front contact *a* shunts back contact *c* of relay 1–2AD in the previously traced circuit.

Relay 1–2AL (FIG. 32) has a pickup circuit extending from terminal B of the battery in the B bank of the 1–2 storage unit, front contact *b* of relay 1–2B1, front contact *d* of relay 1–2AT, through the winding of relay 1–2A1, and over front contact *e* of relay 1–2AD to terminal N of the battery. Relay 1–2A1 has a stick circuit which extends from terminal B of the battery over its own front contact *a*, through the winding of the relay, and over front contact *e* of relay 1–2AD to terminal N of the battery.

Switch storage units 3–4, 5–6, and 7–8, shown in FIGS. 26 and 24, are identical with the 1–2 storage unit just described, and accordingly no details of these units are shown, except for certain of the interconnecting circuits in the 3–4 storage unit in FIG. 26 which are included to facilitate an understanding of the operation of our control apparatus.

While the apparatus described up to this point has been largely conventional, and its construction and operation have been described in the literature, a brief description of the normal operation of the switching system will be given in order to lay a basis for the later description of the additional functions which this equipment performs in the control system of our invention. For further details of the construction and operation of the automatic switching portion of the disclosed embodiment of our invention, reference should be had to the copending application for Letters Patent of the United States of John R. George and Sih Hsuin Tsiang, Serial No. 592,198, filed on June 18, 1956, which is now Patent No. 2,863,992, issued December 9, 1958, and assigned to the assignee of the present application, and to Manual 517, entitled "Union" Automatic Switching for Classification Yards, published in January 1953 by Union Switch & Signal, Division of Westinghouse Air Brake Company, and the supplement thereto published June 21, 1955.

Before describing the operation of the automatic switching apparatus, however, the control circuits for the phantom locations associated with the group retarder will be described, since they operate in conjunction with the automatic switching units and affect the sequence of operations thereof.

Since all of the phantom locations may be identical, it will suffice to describe the 1–2 phantom location associated with group retarder 1–2GR. The use of the term "phantom" to describe these storage locations was derived from the fact that, previously, classification yard storage units have been associated with switch locations. Since these units are not associated with any switch, it has become customary to refer to them as phantom switch storage locations, or simply phantom locations.

Referring to FIGS. 42, 43, 53 and 54, the 1–2 phantom storage location is seen to comprise two banks, A and B. These banks control relays operating somewhat similarly to the switch storage location control relays, to receive and store information pertaining to a cut, to transfer it from one bank to the next when the next bank becomes available, and to cancel the information when it is no longer required.

Figure 42:
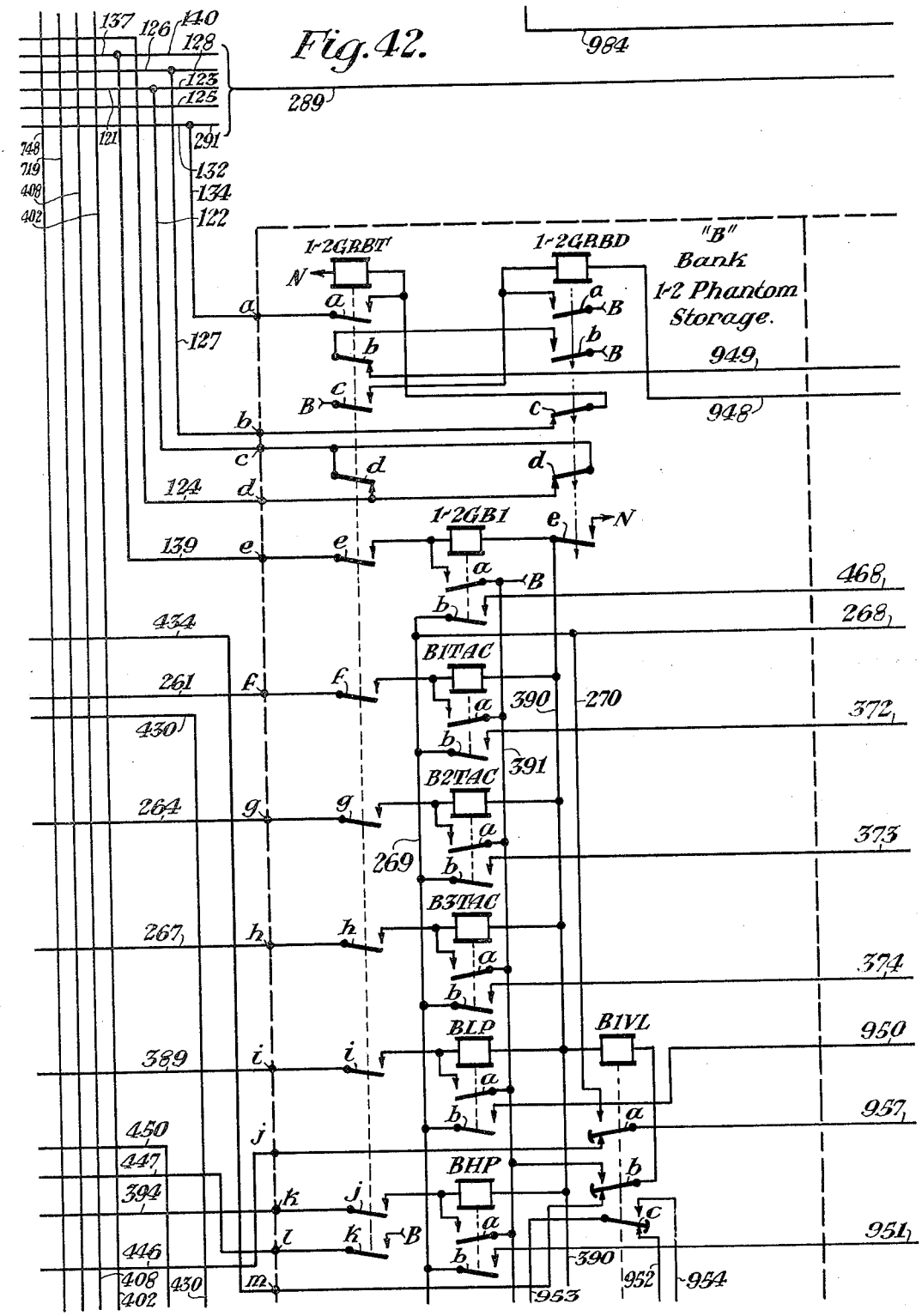

Referring now to FIG. 42, the B bank of the 1–2 phantom location includes two control relays 1–2GRBT and 1–2GRBD, and an additional control relay B1VL which will be described later in connection with other functions performed by the unit. Also included in the B bank is a route storage relay 1–2GB1.

Relay 1–2GRBT (FIG. 42) has a pickup circuit which extends from terminal B of the battery over front contact g of relay 1–4AD (FIG. 25), back contact e of relay 1–4AT, back contact b of relay 1–4AL, terminal v of the A bank of the 1–4 storage location, terminal c of switch control unit 1–2WC, back contact d of track relay 1–4TR, front contact c of normal repeater relay 1–4NWP in the normal position of the switch, terminal g of unit 1–4WC, lead 126, lead 127 (FIG. 42), terminal b of the B bank of the 1–2 phantom location, back contact c of relay 1–2GRBD, and through the winding of relay 1–2GRBT to terminal N of the battery. Relay 1–2GRBT has a stick circuit which extends from terminal B of the battery over front contact g of relay 1–4AD (FIG. 25), terminal t of the A bank of the 1–4 storage location, lead 129, lead 131 (FIG. 26), lead 132, lead 134 (FIG. 42), terminal a of the B bank of the 1–2 phantom location, and over its own front contact a and through its winding to terminal N of the battery.

Relay 1–2GRBD (FIG. 42) has a pickup circuit which extends from terminal B of the battery over front contact c of relay 1–2GRBT, through the winding of the relay, lead 948, and over back contact c of relay 1–2GRAT (FIG. 43) and back contact d of relay 1–2GRAD in multiple to terminal N of the battery. Relay 1–2GRBD has a stick circuit which extends from terminal B of the battery over its own front contact a, through the winding of the relay, lead 948, and over back contact c of relay 1–2GRAT and back contact d of relay 1–2GRAD in multiple to terminal N of the battery.

Storage relay 1–2GB1 (FIG. 42) has a pickup circuit extending from terminal B of the battery over front contact b of relay 1–4A2 (FIG. 40), terminal s of the A bank of the 1–4 storage location, lead 135, lead 137 (FIG. 41), lead 139 (FIG. 42), terminal e of the B bank of the 1–2 phantom location, front contact e of relay 1–2GRBT, through the winding of relay 1–2GB1, and over front contact e of relay 1–2GRBD to terminal N of the battery. Relay 1–2GB1 has an obvious stick circuit including its own front contact a and front contact e of relay 1–2GRBD.

From the above description, it will be apparent that relay 1–2GRBT is picked up when the preceding switch 1–4W is in its normal position, detector track section 1–4T is occupied, information is stored in the A bank of the 1–4 storage location, and the B bank of the 1–2 phantom location is available, as indicated by the deenergized condition of relay 1–2GRBD. Once 1–2GRBT is picked up, relay 1–2GRBD may be picked up if either there is no information stored in the A bank of the 1–2 phantom location, or information is stored in this bank and its storage has beeen completed as indicated by the deenergized condition of relay 1–2GRAT. Relay 1–2GB1 will be picked up if the corresponding route storage relay 1–4A2 in the A bank of the preceding switch storage location is picked up, and relays 1–2GRBT and 1–2GRBD are picked up.

The A bank of the 1–2 phantom location (see FIG. 43) includes control relays 1–2GRAT, 1–2GRAD, 1–2GRADP and route storage relay 1–2GA1. An additional control relay, A1VL, will be described hereinafter in connection with the separate function which it performs.

Relay 1–2GRAT (FIG. 43) has a pickup circuit extending from terminal B of the battery over front contact b of relay 1–2GRBD (FIG. 42), back contact b of relay 1–2GRBT, lead 949, back contact b of relay 1–2GRAD (FIG. 43), and through the winding of relay 1–2GRAT to terminal N of the battery. Relay 1–2GRAT has a stick circuit extending from terminal B of the battery over front contact b of relay 1–2GRBD, back contact b of relay 1–2GRBT, lead 949, its own front contact a, and through its winding to terminal N of the battery.

Relay 1–2GRAD has a pickup circuit extending from terminal B of the battery over normally closed contact a of cancellation push button 1–2GACB (FIG. 43), front contact b of relay 1–2GRAT, through the winding of 1–2GRAD, and over alternate paths, a first extending over back contact a of relay 1–2GRADP to terminal N of the battery, and a second extending from terminal b of the A bank of the 1–2 phantom location over lead 467 and front contact n of relay CL4TP (FIG. 28) to terminal N of the battery. Relay 1–2GRAD has a stick circuit which is the same as its previously traced pickup circuit except that it includes its own front contact a in shunt around front contact b of relay 1–2GRAT.

Relay 1–2GRADP has a pickup circuit extending from terminal B of the battery over front contact c of relay 1–2GRAD, terminal a of the A bank of the 1–2 phantom location, lead 142, front contact g of relay CL4TP, lead 141, terminal c of the A bank of the 1–2 phantom location, and through the winding of relay 1–2GRADP to terminal N of the battery. Relay 1–2GRADP has a stick circuit extending from terminal B of the battery over front contact c of relay 1–2GRAD, its own front contact b, and through its winding to terminal N of the battery.

Relay 1–2GA1 has a pickup circuit extending from terminal B of the battery over front contact *e* of relay 1–2GRAT (FIG. 43), lead 268, front contact *b* of relay 1–2GB1 (FIG. 42), lead 468, front contact *d* of relay 1–2GRAT (FIG. 43), through the winding of relay 1–2GA1, and over front contact *e* of relay 1–2GRAD to terminal N of the battery. Relay 1–2GA1 has a stick circuit extending from terminal B of the battery over its own front contact *a*, through its winding, and over front contact *e* of relay 1–2GRAD to terminal N of the battery.

From the above description it will be apparent that relay 1–2GRAT is picked up, if the A bank is available for storage as indicated by the deenergized condition of relay 1–2GRAD, if there is information stored in the B bank, as indicated by the energized condition of relay 1–2GRBD, and if the storage of this information is complete, as indicated by the deenergized condition of relay 1–2GRBT. Relay 1–2GRAD is picked up if relay 1–2GRAT is picked up and relay 1–2GRADP is released, or if section CL4T is occupied. When section CL4T is occupied after relay 1–2GRAD is picked up, relay 1–2GRADP is picked up and is held up as long as relay 1–2GRAD is held up. Relay 1–2GA1 will also be held up as long as relay 1–2GRAD is held up. Since relay 1–2GRAD will remain up as long as section CL4T is occupied, it will be apparent that the information stored in the A bank of the phantom locations is not cancelled until a cut has occupied and then vacated section CL4T.

In order to describe the operation of the switching circuits, it will first be assumed that the 1–8AL relay is deenergized, all of the route relays and indicator lamps in each of the three banks are deenergized, and relay 1–8CT (FIG. 48) is energized over its pickup circuit extending in multiple from terminal B of the battery over back contacts *a* of relays 1–8BT and 1–8BD, and through the winding of relay 1–8CT to terminal N of the battery. It will further be assumed that switch control units 1–8WC (FIG. 23), 1–4WC (FIG. 25), 5–8WC (FIG. 24), 1–2WC (FIG. 32), 3–4WC (FIG. 26), 5–6WC (FIG. 24) and 7–8WC (FIG. 24) are in their normal conditions with the switches in their normal positions, the track relays picked up, the RWP relays released, and the WP and NWP relays energized over their previously traced circuits as shown. All of the relays in the storage units following the 1–8 storage unit are deenergized as shown.

With the conditions above assumed, further assume that it is desired to route a cut through the yard to track 2T. For this purpose, button 2PB in FIG. 48 will be briefly depressed. As push button 2PB is depressed, the previously described pickup circuit for relay 1–8C2C is completed at front contact *a* of push button 2PB. As previously noted, this circuit extends from terminal B of the battery over back contact *d* of relay 1–8CD, back contact *b* of relay 1–8BT, back contact *a* of push button 1PB, front contact *a* of push button 2PB, back contact *a* of relay 1–8C2C, through the winding of the relay, over front contact *b* of relay 1–8CT, which is energized as previously described, and over back contact *a* of relay 1–8CSC to terminal N of the battery. Relay 1–8C2C immediately picks up and sticks over its stick circuit previously traced, which includes its own front contact *a*, front contact *b* of relay 1–8CT, and back contact *a* of relay 1–8CSC.

With relay 1–8C2C picked up, relay 1–8CD picks up over its previously traced circuit extending from battery terminal B over front contact *c* of relay 1–8C2C and through the winding of relay 1–8CD to terminal N of the battery.

An energizing circuit for indicator lamp 1–8C2K is now completed, extending from terminal BX of the alternating current source over front contact *a* of relay 1–8CD, front contact *a* of relay 1–8CT, front contact *d* of relay 1–8C2C, and through the filament of the lamp to terminal NX of the source.

With relay 1–8CD picked up, the previously traced pickup circuit for relay 1–8BT, extending from terminal B of the battery over front contact *e* of relay 1–8CD, back contact *c* of relay 1–8BD, and through the winding of relay 1–8BT to terminal N of the battery, will be completed and relay 1–8BT will pick up. Relay 1–8BT will stick up as long as push button 2PB remains operated over its first previously traced stick circuit including front contact *b* of relay 2PB and front contact *d* of relay 1–8BT. It is also held up over its stick circuit extending from terminal B of the battery over front contact *e* of relay 1–8CD, front contact *c* of relay 1–8BT and through the winding of the relay to terminal N of the battery.

With relay 1–8BT up, relay 1–8BD can pick up over its previously traced circuit extending from terminal B of the battery over back contact *d* of relay 1–8BSC, front contact *f* of relay 1–8BT, through the winding of relay 1–8BD, and in multiple over back contacts *b* of relays 1–8AT and 1–8AD to terminal N of the battery.

With both relays 1–8BT and 1–8BD picked up, the previously traced energizing circuit for relay 1–8CT is interrupted in the open back points of contact *a* of relays 1–8BT and 1–8BD and relay 1–8CT accordingly releases at the end of its predetermined time delay. However, before relay 1–8CT releases and releases relay 1–8C2C by opening its front contact *b*, the previously traced pickup circuit for relay 1–8B2C in the B bank is completed. This circuit extends from terminal B of the battery over front contact *e* of relay 1–8BT, front contact *b* of relay 1–8C2C, back contact *a* of relay 1–8B2C, through the winding of the relay, and over front contact *h* of relay 1–8BD to terminal N of the battery. As soon as relay 1–8B2C picks up, it sticks up over its previously traced stick circuit including its own front contact *a* and front contact *h* of relay 1–8BD.

When relay 1–8CT releases, relay 1–8C2C is released by the interruption of its previously traced stick circuit at the open front point of contact *b* of relay 1–8CT. Indicator lamp 1–8C2K is accordingly deenergized by the interruption of its energizing circuit at the open front point of contact *d* of relay 1–8C2C. The energizing circuit for relay 1–8CD is also interrupted at the open front point of contact *c* of relay 1–8C2C, and relay 1–8CD accordingly drops out after its predetermined time delay.

When relay 1–8CD releases, the previously traced second stick circuit for relay 1–8BT is interrupted at the open front point of contact *e* of relay 1–8CD. Since its first stick circuit is interrupted at the open front point of contacts *b* of the push buttons 1PB through 8PB, and its pickup circuit is interrupted at the open back point of contact *c* of relay 1–8BD, relay 1–8BT will now release.

With relay 1–8BT released, the previously traced energizing circuit for relay 1–8CT is completed from terminal B of the battery over back contact *a* of relay 1–8BT and through the winding of relay 1–8CT to terminal N of the battery. The apparatus of the C bank of the 1–8 storage unit is now restored to its initial condition.

In the meantime, with relay 1–8B2C in the B bank picked up (FIG. 48), indicator lamp 1–8B2K is energized over its energizing circuit extending from terminal BX of the alternating current source over front contact *g* of relay 1–8BD, back contact *h* of relay 1–8BT, front contact *c* of relay 1–8B2C, and through the filament of the lamp to terminal NX of the source.

With relay 1–8BD picked up and relay 1–8BT released, relay 1–8AT (FIG. 49) can now pick up over its energizing circuit extending from terminal B of the battery over front contact *f* of relay 1–8BD (FIG. 48), back contact *g* of relay 1–8BT, back contact *a* of relay 1–8AD (FIG. 49), and through the winding of the relay to terminal N of the battery. When relay 1–8AT picks up, it is held up over its previously traced stick circuit including front contact *f* of relay 1–8BD (FIG.

48), back contact g of relay 1–8BT, front contact a of relay 1–8AT (FIG. 49), and through the winding of the relay to terminal N of the battery.

With relay 1–8AT picked up, relay 1–8AD (FIG. 49) can pick up over its previously traced pickup circuit extending from terminal B of the battery over normally closed contact a of cancellation button 1–8ACB, back contact c of relay 1–8ASC, front contact c of relay 1–8AT, through the winding of relay 1–8AD, terminal b of the A bank of the 1–8 storage unit, over lead 106, to terminal c of the B bank of the 5–8 storage unit (FIG. 24) and in multiple over back contacts b of relays 5–8BT and 5–8BD to terminal m of the B bank, over lead 107 to terminal c of the B bank of the 1–4 storage unit (FIG. 25), and in multiple over back contacts d of relays 1–4BT and 1–4BD to terminal N of the battery.

With relays 1–8AT and 1–8AD up, relay 1–8A2C (FIG. 49) can pick up over its previously traced circuit including front contact f of relay 1–8AT, front contact b of relay 1–8B2C (FIG. 48), back contact a of relay 1–82C (FIG. 49), through the winding of the relay, and over front contact i of relay 1–8AD to terminal N of the battery. As soon as relay 1–8A2C picks up, it sticks up over its previously traced stick circuit including its front contact a and front contact i of relay 1–8AD.

At the time relay 1–8AD picks up, the stick circuit for relay 1–8BD (FIG. 48) previously traced, including back contact d of relay 1–8BSC, front contact e of relay 1–8BD, and back contacts b of relays 1–8AT (FIG. 49) and 1–8AD, is open at both of the back points of contacts b of relays 1–8AT and 1–8AD. Accordingly, relay 1–8BD will release at the end of its predetermined time delay period. When relay 1–8BD does release, the previously traced stick circuit for relay 1–8AT is interrupted at the open front point of contact f of relay 1–8BD and relay 1–8AT drops away. The release of relay 1–8BD interrupts the previously traced stick circuit for relay 1–8B2C at the open front point of contact h of relay 1–8BD and the energizing circuit for indicator lamp 1–8B2K is interrupted at the open front point of contact g of relay 1–8BD. The B bank of the storage unit is now in condition to receive another transfer.

With relay 1–8A2C held up as described, lead 111 is energized over its previously traced energizing circuit including front contact c of relay 1–8A2C, and lines 109 and 110 are deenergized, in the code pattern 001; which indicates that the first two switches 1–8W and 1–4W are to be set in their normal positions, and that the third switch 1–2W is to be set in its reverse position. The first route storage relay 1–8A1 in the A bank of the 1–8 storage unit accordingly remains deenergized, and with relay 1–8AT down, relay 1–8AD up, and relay 1–8A1 down, the previously traced circuit for insuring that switch 1–8W is set to its normal position is completed. The circuit will not be traced in detail, since it has been described in the discussion of switch control unit 1–8WC.

The information on leads 110 and 111, consisting, it will be recalled, of the deenergized condition of lead 110 and the energized condition of lead 111 by reason of its connection to terminal B of the battery over front contact c of relay 1–8A2C, is in condition to be transferred to the selected storage unit associated with the next switch, after switch 1–8 has been positioned and the appropriate repeater relay has been energized. However, in order to keep this transfer in step with the progress of the car, it is delayed until detector track section 1–8T is occupied by the cut.

When the cut enters section 1–8T (FIG. 23), shunting track relay 1–8TR, a circuit is completed for relay 1–4BT (FIG. 25) which extends from terminal B of the battery in the A bank of the 1–8 storage unit (FIG. 49) over front contact g of relay 1–8AD, back contact d of relay 1–8AT, back contact b of relay 1–8AL, terminal a, lead 112, back contact e of track relay 1–8TR (FIG. 23), front contact c of relay 1–8NWP, which is picked up at this time to indicate the normal position of the switch, lead 113, back contact c of relay 1–4BD in the B bank of the 1–4 storage unit (FIG. 25), and through the winding of relay 1–4BT to terminal N of the battery. (It will be noted that, had switch 1–8 been set to the reverse position, the circuit previously traced could be traced from back contact e of relay 1–8TR (FIG. 23) over front contact c of relay 1–8RWP to terminal g of unit 1–8WC, from terminal g of relay 1–8WC over lead 292 to terminal b of the B bank of the 5–8 storage unit, and thence over back contact a of relay 5–8BD and through the winding of relay 5–8BT to terminal N of the battery. Accordingly, the T relay of the storage unit for the switch in advance of a given switch which is selected by the position of the given switch is picked up to direct the remaining bits of the route storage code to the proper storage unit.)

With relay 1–4BT picked up, relay 1–4BD is picked up over a circuit extending from terminal B of the battery over front contact c of relay 1–4BT, through the winding of relay 1–4BD, and over either back contact c of relay 1–4AT or back contact d of relay 1–4AD to terminal N of the battery. The previously traced stick circuit for relay 1–4BD, including its own front contact a and back contacts c of relay 1–4AT and d of relay 1–4AD in multiple, is completed as soon as relay 1–4BD is picked up.

With relays 1–4BT and 1–4BD picked up (FIG. 25), the information stored in the A bank of the 1–8 storage unit (FIG. 49) can be transferred to the bank of the 1–4 storage unit (FIGS. 25 and 40). Lead 110 at terminal h (FIG. 49) of the A bank of the 1–8 storage unit, which is not energized from terminal B of the battery in the example under consideration, has a first branch 117 (FIG. 24) connected to terminal d of the B bank of the 5–8 storage unit, which is open circuited at the open front point of contact c of relay 5–8BT, and a second branch 118 which is connected to terminal d of the B bank of the 1–4 storage unit (FIG. 25), and thence over front contact e of relay 1–4BT, the winding of relay 1–4B1, and front contact e of relay 1–4BD to terminal N of the battery. Since lead 110 is not connected to terminal B of the battery, however, relay 1–4B1 remains deenergized.

Lead 111 at terminal i of the A bank of the 1–8 storage unit (FIG. 49) is connected to terminal B of the battery over front contact c of relay 1–8A2C, and has two branches (FIG. 24); one branch 119 being connected to terminal e of the B bank of the 5–8 storage unit and to an open circuit at the open front point of contact d of relay 5–8BT, and a second branch 120 which is connected to terminal e of the 1–4 storage unit (FIG. 25) and thence over front contact f of relay 1–4BT, through the winding of relay 1–4B2 (FIG. 40), lead 241, and over front contact e of relay 1–4BD (FIG. 25) to terminal N of the battery. Since lead 111 is energized from terminal B of the battery, relay 1–4B2 picks up and sticks up over its previously traced stick circuit including its own front contact a and front contact e of relay 1–4BD.

It will be noted that as soon as relays 1–4BT and 1–4BD pick up, to permit the transfer just described to the B bank of the 1–4 storage unit (FIGS. 25 and 40), the previously traced stick circuit for relay 1–8AD (FIG. 49) is interrupted at the open back points of contacts d of relays 1–4BT and 1–4BD (FIG. 25). Accordingly, at the end of its predetermined time delay, which is designed to be sufficient to permit the information transfer to take place, relay 1–8AD (FIG. 49) will release and will open its front contacts i and j, interrupting the stick circuit for relay 1–8A2C and the energizing circuit for indicator lamp 1–8A2K which have been previously described. The A bank of the 1–8 storage unit is thus returned to its initial condition and is in condition to receive another route code.

The stick circuit for relay 1–4BT (FIG. 25), previously traced, extends from terminal B of the battery over front contact g of relay 1–8AD (FIG. 49), over leads 114 and 115 (FIG. 24) and front contact $a$ of relay 1–4BT (FIG. 25), through the winding of the relay, and thence to terminal N of the battery. Accordingly, when relay 1–8AD releases at the end of its time delay period relay 1–4BT will release, due to the opening of its stick circuit at the open front point of contact $g$ of relay 1–8AD.

With relay 1–4BT released and relay 1–4BD picked up (FIG. 25), a pickup circuit for relay 1–4AT is completed from terminal B of the battery over front contact $b$ of relay 1–4BD, back contact $b$ of relay 1–4BT, back contact $b$ of relay 1–4AD, and through the winding of relay 1–4AT to terminal N of the battery. With relay 1–4AT picked up, it is held up over its previously traced stick circuit including its own front contact $a$, back contact $b$ of relay 1–4BT, and front contact $b$ of relay 1–4BD.

The previously traced pickup circuit for relay 1–4AD is also completed at this time, extending, it will be recalled, from terminal B of the battery over normally closed contact $a$ of cancellation button 1–4ACPB, front contact $b$ of relay 1–4AT, through the winding of relay 1–4AD to terminal $u$ of the A bank of the 1–4 storage unit, over lead 121 (FIG. 42) and from lead 121 over two parallel paths, the first extending over lead 122 to terminal $c$ of the 1–2 phantom storage location associated with group retarder 1–2GR, to be described, back contacts $d$ of relays 1–2GRBT and 1–2GRBD in multiple, terminal $d$ of the 1–2 phantom storage bank, and over lead 124 to terminal $c$ of the 3–4 phantom storage B bank (FIG. 26), and thence over back contacts $b$ of relays 3–4GRBT and 3–4GRBD in multiple to terminal N of the battery. The second circuit path from lead 121 (FIG. 42) extends over leads 123, cable 289, lead 123 (FIG. 32), terminal $e$ of the B bank of the 1–2 storage unit, over back contacts $e$ of relays 1–2BT and 1–2BD in multiple to terminal $d$ of the 1–2 storage unit, over lead 125 to cable 289 and thence to FIG. 42, lead 125 from FIG. 42 to terminal $c$ of the B bank of the 3–4 storage unit (FIG. 26), and over back contacts $b$ of relays 3–4BT and 3–4BD in multiple to terminal N of the battery.

The phantom storage location and the switch storage location following the group retarder associated with each route receive information in parallel from the switch storage unit associated with the switch preceding the group retarder in the route. Accordingly, the purpose of the two paths previously traced in the pickup and holding circuits for relay 1–4AD is to insure that both the phantom location and the switch storage location have completed the receipt of the information from the preceding switch location before the D relay, in this case relay 1–4AD, is allowed to release.

With relays 1–4AT and 1–4AD picked up (FIG. 25), the previously traced transfer circuits for relays 1–4A1 and 1–4A2 (FIGS. 25 and 40) are prepared by the closing of front contacts $f$ of relays 1–4AT and 1–4AD. Since relay 1–4B1 is deenergized, the circuit for relay 1–4A1 will be open at the open front point of contact $b$ of relay 1–4B1, and relay 1–4A1 will accordingly remain deenergized. The circuit for relay 1–4A2 (FIG. 40) is completed over closed front contact $b$ of relay 1–4B2 and relay 1–4A2 is picked up and held up over its previously traced stick circuit including its own front contact $a$ and front contact $f$ of relay 1–4AD (FIG. 25).

When relay 1–4AD (FIG. 25) picked up as previously described, the previously traced circuit for relay 1–4BD was opened at the open back points of contact $c$ of relay 1–4AT and $d$ of relay 1–4AD. Accordingly, at the end of its predetermined time delay, which is made sufficient to permit the previously described transfer, relay 1–4BD is released, and opens the circuits for relays 1–4B1 and 1–4B2 at the open front point of its contact $e$. The B bank of the 1–4 storage unit is thus restored to its initial condition, in which it is adapted to receive additional information.

With relay 1–4BD down, the previously traced holding circuit for relay 1–4AT is interrupted at the open front point of contact $b$ of relay 1–4BD, and relay 1–4AT is accordingly released.

With relay 1–4AT released and relay 1–4AD held up, a circuit is completed as previously described for ensuring that switch 1–4W is in its normal position, or for setting it to its normal position. This circuit extends from terminal B of the battery over contact A of manual controller 1–4MC, in its automatic position to terminal $e$ of switch control 1–4WC, terminal $w$ of the A bank of the 1–4 storage unit, front contact $e$ of relay 1–4AD, back contact $d$ of relay 1–4AT, back contact $b$ of relay 1–4A1, terminal $b$ of the A bank of the 1–4 storage unit (FIG. 40), lead 104, terminal $b$ of the 1–4WC unit (FIG. 25), front contact $b$ of relay 1–4WP, front contact $c$ of relay 1–4TR, through the normal magnet NW, and through circuit controller E to terminal N of the battery unless switch 1–4W is in its normal position or close enough thereto to be under the control of the spring action of switch machine 1–4WM.

When the cut occupies detector track section 1–4T (FIG. 25), relay 1–4TR is released. Since switch 1–4W is in its normal position, it is desired to energize the T relays in the B banks of the 1–2 switch storage location and the 1–2 phantom storage location associated with group retarder 1–2GR. The circuit for this purpose extends from terminal B of the battery over front contact $g$ of relay 1–4AD, back contact $e$ of relay 1–4AT, back contact $b$ of relay 1–4AL, terminal $v$ of the A bank of the 1–4 storage location, terminal $c$ of unit 1–4WC, back contact $d$ of relay 1–4TR, front contact $c$ of normal repeater relay 1–4NWP, terminal $g$ of unit 1–4WC, lead 126, and over a first branch (FIG. 42) including lead 127, terminal $b$ of the B bank of the 1–2 phantom storage unit, back contact $c$ of relay 1–2GRBD, and through the winding of relay 1–2GRBT to terminal N of the battery, and over a second path from lead 126 including lead 128, cable 289, lead 128 (FIG. 32), terminal $b$ of the B bank of the 1–2 storage location, back contact $b$ of relay 1–2BD, and through the winding of relay 1–2BT to terminal N of the battery. Relays 1–2GRBT and 1–2BT accordingly pick up.

With relay 1–2GRBT picked up (FIG. 42), the previously traced pickup circuit for relay 1–2GRBD is completed, which circuit extends from terminal B of the battery over front contact $c$ of relay 1–2GRBT, through the winding of relay 1–2GRBD, and over either back contact $c$ of relay 1–2GRAT or back contact $d$ of relay 1–2GRAD (FIG. 43) to terminal N of the battery.

With relays 1–2GRBT and 1–2GRBD picked up, the circuit is completed for the transfer of information to route storage relay 1–2GB1 (FIG. 42). This circuit extends from terminal B of the battery in the A bank of the 1–4 storage location (FIG. 40), over front contact $b$ of relay 1–4A2, to terminal $s$ of the A bank of the 1–4 storage location, over leads 135, 137 (FIG. 41) and 139 (FIG. 42) to terminal $e$ of the B bank of the 1–2 phantom storage location, over front contact $e$ of relay 1–2GRBT, through the winding of relay 1–2GB1, and over front contact $e$ of relay 1–2GRBD to terminal N of the battery. Relay 1–2GB1 is picked up, since relay 1–4A2 is picked up, and is held up over its previously traced stick circuit including its front contact $a$ and front contact $e$ of relay 1–2GRBD.

With relay 1–2BT (FIG. 32) picked up in the B bank of the 1–2 storage location, the previously traced circuit for relay 1–2BD, including front contact $b$ of relay 1–2BT, the winding of relay 1–2BD, and back contact $c$ of relay 1–2AT and back contact $d$ of relay 1–2AD in multiple, is completed and relay 1–2BD is picked up. When picked up, relay 1–2BD is held up over its previously traced stick circuit including its own front contact $a$ and either back contact $c$ of relay 1–2AT or back contact $d$ of relay 1–2AD.

With relays 1–2BT and 1–2BD both up, a circuit is completed for the transfer of information to storage relay 1–2B1. This circuit extends from terminal B of the battery in the A bank of the 1–4 storage location (FIG. 40) over front contact *b* of relay 1–4A2, to terminal *s* of the A bank of the 1–4 location, and thence over leads 135, 137 (FIG. 41), 140 (FIG. 42), cable 289, and lead 140 (FIG. 32) to terminal *c* of the B bank of the 1–2 storage location, over front contact *c* of relay 1–2BT, through the winding of relay 1–2B1, and over front contact *c* of relay 1–2BD to terminal N of the battery. Relay 1–2B1 accordingly picks up and is held up over its stick circuit including its own front contact *a* and front contact *c* of relay 1–2BD.

As soon as relays 1–2BT and 1–2BD in the 1–2 storage location (FIG. 32) and relays 1–2GRBT and 1–2GRBD in the 1–2 phantom storage location (FIG. 42) are all up, the previously traced holding circuit for relay 1–4AD (FIG. 25) is interrupted at the open back contacts *e* of relays 1–2BT and 1–2BD, and is interrupted in the parallel branch at the open back points of contacts *d* of relays 1–2GRBT and 1–2GRBD. Accordingly, at the end of its predetermined time delay, which is made long enough to permit the previously described transfer, relay 1–4AD is released.

With relay 1–4AD released, the circuits for storage relays 1–4A1 and 1–4A2 (FIGS. 25 and 40) are interrupted at the open front point of contact *f* of relay 1–4AD (FIG. 25), and any of these relays which were energized, are released. In the case under consideration, relay 1–4A2 will be released.

If section 1–4T is still occupied when relay 1–4AD is released, which would be a normal condition, relay 1–4AL will pick up over a circuit extending from terminal B of the battery in unit 1–4WC (FIG. 25), over back contact *b* of relay 1–4TR, to terminal *d* of unit 1–4WC and terminal *x* of the A bank of the 1–4 storage location, and thence over back contact *c* of slow release relay 1–4AD and through the winding of relay 1–4AL to terminal N of the battery. Relay 1–4AL will then hold up over a stick circuit which is the same as its previously traced pickup circuit except that it includes its own back contact *a* in shunt around contact *c* of relay 1–4AD.

It will be recalled that back contact *b* of relay 1–4AL was in the pickup circuits for the succeeding T relays of the phantom storage locations and switch storage locations. Accordingly, the pickup of relay 1–4AL will prevent a second transfer to these units as long as section 1–4T is occupied. As soon as section 1–4T becomes unoccupied, the circuit for relay 1–4AL will be interrupted at the open back point of contact *b* of relay 1–4TR, and at the end of its predetermined time delay, relay 1–4AL will be released and the A bank of the 1–4 storage location will be restored to its normal condition and become available for a subsequent transfer of information to succeeding units. It should be noted that the A bank of the 1–4 storage location is available for a storage input even though relay 1–4AL remains picked up, but the transfer of the stored information to succeeding storage locations cannot be made with relay 1–4AL picked up.

After relay 1–4AD is released, the previously traced stick circuits for relay 1–2GRBT in the phantom storage location (FIG. 42) and 1–2BT in the 1–2 switch storage location (FIG. 32) are interrupted. It will be recalled that the stick circuit for relay 1–2GRBT extended from terminal B of the battery in the A bank of the 1–4 storage location (FIG. 25) over front contact *g* of relay 1–4AD, terminal *t* of the A bank of the 1–4 location, over leads 129, 131 (FIG. 26), 132 and 134 (FIG. 42) to terminal *a* of the 1–2 phantom location, and thence over front contact *a* of relay 1–2GRBT and through the winding of the relay to terminal N of the battery. The corresponding stick circuit for relay 1–2BT extends from terminal B of the battery in the A bank of the 1–4 storage location over front contact *g* of relay 1–4AD (FIG. 25) to terminal *t* of the A bank and thence over leads 129, 131 (FIG. 26), 132, and 291 (FIG. 42), cable 289, lead 291 (FIG. 32), to terminal *a* of the B bank of the 1–2 storage location, and from terminal *a* over front contact *a* of relay 1–2BT and through the winding of the relay to terminal N of the battery. As soon as relay 1–4 AD releases, the previously traced stick circuits for relays 1–2GRBT in the phantom location and 1–2BT in the switch storage location are interrupted at the open front point of contact *g* of relay 1–4AD in the A bank of the 1–4 storage unit. Accordingly, both these relays are released.

With relay 1–2GRBT released and relay 1–2GRBD energized (FIG. 42), relay 1–2GRAT (FIG. 43) can pick up over its previously traced circuit extending from terminal B of the battery over front contact *b* of relay 1–2GRBD, back contact *b* of relay 1–2GRBT, back contact *b* of relay 1–2GRAD, and through the winding of relay 1–2GRAT to terminal N of the battery. As soon as relay 1–2GRAT picks up, it is held up over its stick circuit including its own front contact *a*, back contact *b* of relay 1–2GRBT, and front contact *b* of relay 1–2GRBD.

With relay 1–2GRAT picked up, relay 1–2GRAD can pick up over its previously traced circuit extending from terminal B of the battery over normally closed contact *a* of cancellation button 1–2GACB, front contact *b* of relay 1–2GRAT, through the winding of the relay 1–2GRAD, and over back contact *a* of relay 1–2GRADP to terminal N of the battery.

With relays 1–2GRAT and 1–2GRAD both up, the previously traced circuit for relay 1–2GRBD (FIG. 42) is interrupted at the open back point of contact *c* of relay 1–2GRAT (FIG. 43) and the open back point of contact *d* of relay 1–2GRAD, but relay 1–2GRBD does not release until the end of its predetermined time delay. In the meantime, the circuit for relay 1–2GA1 (FIG. 43) is completed, which circuit extends from terminal B of the battery over front contact *e* of relay 1–2GRAT, front contact *b* of relay 1–2GB1 (FIG. 42), front contact *d* of relay 1–2GRAT, the winding of relay 1–2GA1, and over front contact *e* of relay 1–2GRAD to terminal N of the battery. Relay 1–2GA1 is accordingly picked up and held up over its stick circuit including its own front contact *a* and front contact *e* of relay 1–2GRAD.

At the end of its predetermined time delay, relay 1–2GRBD is released, opening the stick circuit for relay 1–2GB1 at contact *e* and opening the stick circuit for relay 1–2GRAT at the open front point of its contact *b*. Relay 1–2GRAT is accordingly released. With the release of relay 1–2GRBD, the B bank of the 1–2 phantom storage unit is restored to its initial condition and is adapted to receive an additional transfer. With the pickup of relay 1–2GA1, terminal *g* of the A bank of the 1–2 phantom storage location is energized from terminal B of the battery over front contact *b* of relay 1–2GA1, for purposes to be described.

Figure 27:
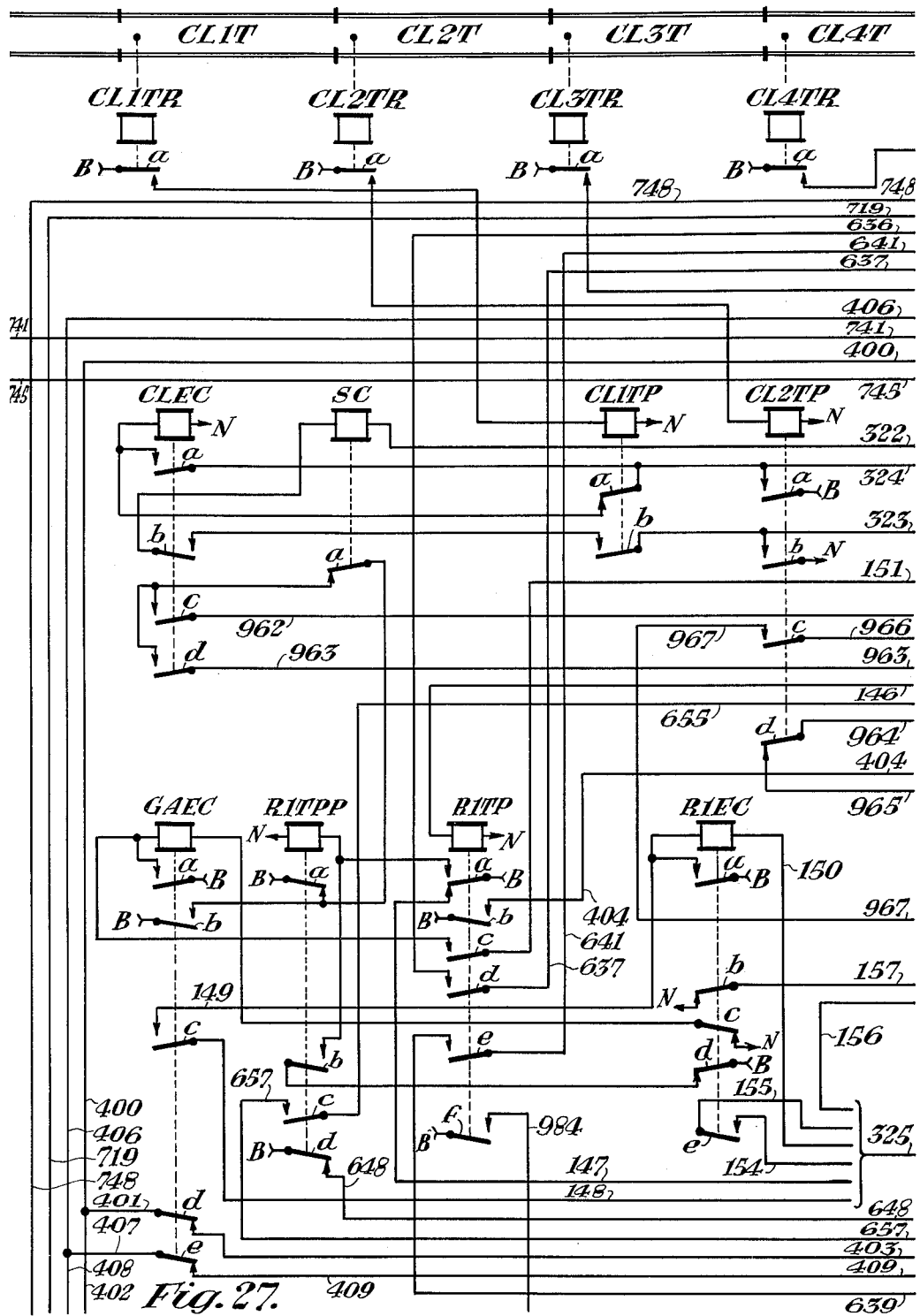
Figure 28:
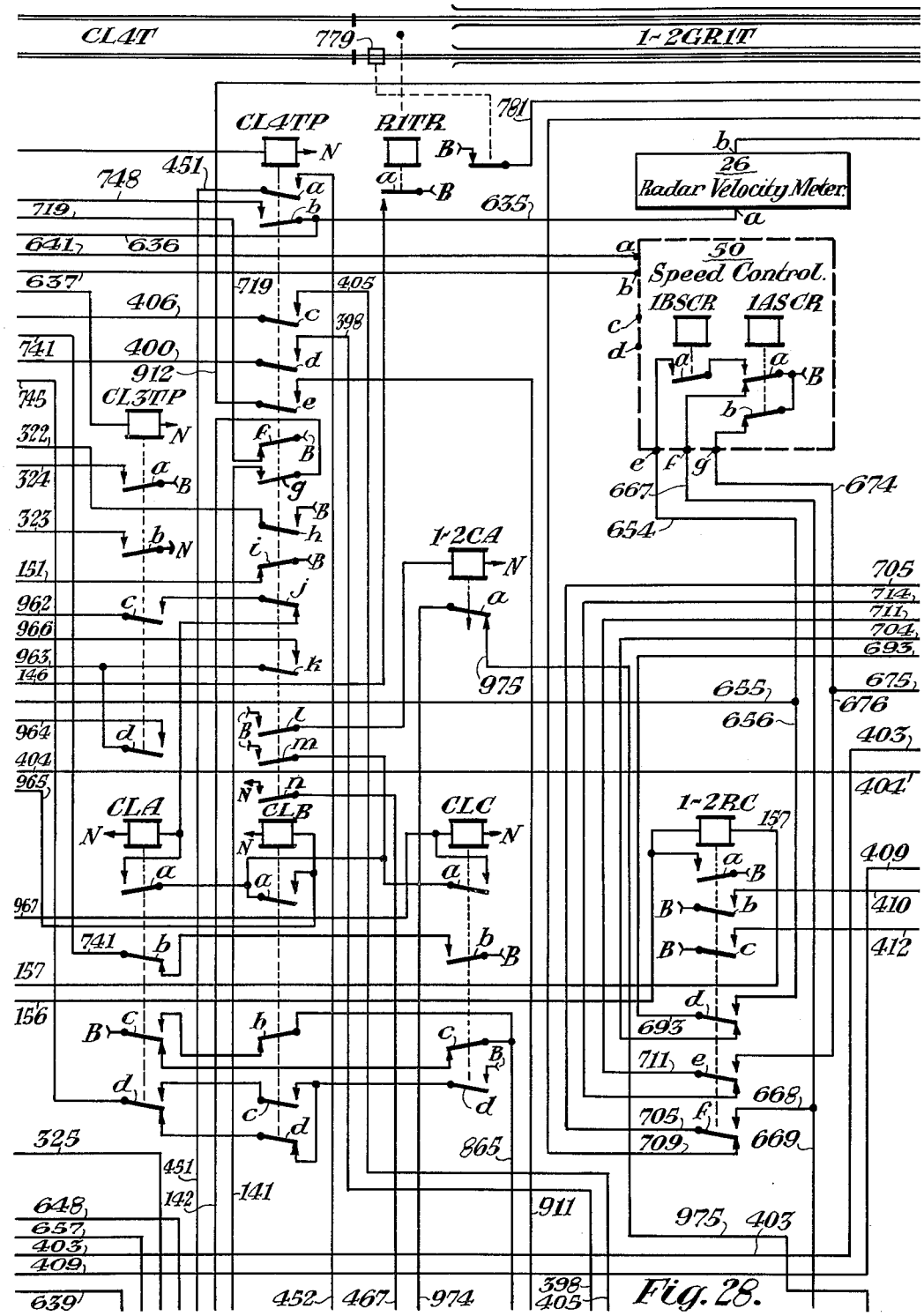

When the cut occupies section CL4T (FIG. 27), relay CL4TR is released and relay CL4TP (FIG. 28) is picked up over an obvious circuit including back contact *a* of track relay CL4TR. When relay CL4TP is picked up, it completes the second previously traced stick circuit for relay 1–2GRAD (FIG. 43) at the front point of contact *n* of relay CL4TP (FIG. 28). The stored information in the A bank is thus retained as long as section CL4T is occupied.

The information represented by the energized or deenergized condition of terminal *g* of the A bank of the 1–2 phantom location is used to direct the operation of the computer during the occupancy of section CL4T as will later be described. After section CL4T has been vacated, the A bank is restored to its initial condition.

Returning now to the 1–2 storage bank (FIG. 32), with relay 1–2BT down and relay 1–2BD up, relay 1–2AT is energized over its previously traced pickup circuit extending from terminal B of the battery over front contact *d* of relay 1–2BD, back contact *d* of relay 1–2BT, back contact *f* of relay 1–2AD, and through the winding of relay 1–2AT to terminal N of the battery. Once relay 1–2AT is picked up, it is held up over its previously traced stick circuit including its own front contact *e*, back contact *d* of relay 1–2BT, and front contact *d* of relay 1–2BD.

With relay 1–2AT up, the previously traced pickup circuit for relay 1–2AD is completed. This circuit extends from terminal B of the battery over normally closed contact *a* of cancellation button 1–2CB, front contact *a* of relay 1–2AT, the winding of relay 1–2AD, terminal *c* of the A bank of the 1–2 storage location, terminal *f* of unit 1–2WC, and over front contact *e* of relay 1–2TR to terminal N of the battery. When relay 1–2AD picks up, it is held up over its first stick circuit which is the same as its pickup circuit except that it includes its own front contact *a* in shunt around contact *a* of relay 1–2AT.

With relays 1–2AT and 1–2AD both up, the previously traced stick circuit for relay 1–2BD is interrupted at the open back points of contact *c* of relay 1–2AT and contact *d* of relay 1–2AD. However, relay 1–2BD will not release until the end of its predetermined time delay period. In the meantime, relay 1–2A1 is picked up over its previously traced transfer circuit including front contact *b* of relay 1–2B1, front contact *d* of relay 1–2AT, the winding of the relay, and front contact *e* of relay 1–2AD. Relay 1–2A1 is then held up over its stick circuit including its own front contact *a* and front contact *e* of relay 1–2AD.

When relay 1–2BD drops away, relay 1–2B1 is released due to the opening of its stick circuit at contact *c* of relay 1–2BD and relay 1–2AT is released due to the opening of its stick circuit at contact *d* of relay 1–2BD.

With relay 1–2AT released, relay 1–2AD picked up, and relay 1–2A1 picked up, the previously traced circuit for insuring that switch 1–2W is in its reverse position is completed from terminal B of the battery over terminal A of manual control 1–2MC in its automatic position, terminal *e* of switch control unit 1–2WC and terminal *d* of the A bank of the 1–2 storage location, front contact *b* of relay 1–2AD, back contact *b* of relay 1–2AT, front contact *b* of relay 1–2A1, terminal *b* of the A bank of the 1–2 storage location, terminal *b* of switch control unit 1–2WC, front contact *a* of relay 1–2WP, front contact *b* of relay 1–2TR, the winding of reverse magnet RW, and through circuit controller F to terminal N of the battery until the switch is moved to the position at which the spring action of switch machine 1–2SM will complete its movement to the reverse position. Reverse repeater relay 1–2RWP will then be picked up over its previously traced circuit which extends from terminal B of the battery through a suitable resistor, the upper winding of relay 1–2RWP, and over contact *a* of circuit controller F to terminal N of the battery. The picked up condition of relay 1–2RWP serves to actuate suitable indication circuits, not shown.

When section 1–2T is occupied by the cut, the previously traced stick circuit for relay 1–2AD is interrupted at the open front point of contact *e* of relay 1–2TR. Relay 1–2AD accordingly releases at the end of its predetermined time delay period. Relay 1–2A1 is then released due to the interruption of its stick circuit at the open front point of contact *e* of relay 1–2AD.

If section 1–2T is still occupied when relay 1–2AD is released, which is the normal condition, relay 1–2AL is picked up over its previously traced circuit extending from terminal B of the battery over back contact *c* of track relay 1–2TR, terminal *d* of unit 1–2WC, terminal *e* of the A bank of the 1–2 storage location, back contact *c* of relay 1–2AD, and through the winding of relay 1–2AL to terminal N of the battery. When relay 1–2AL is picked up, it is held up over its stick circuit, which is the same as its pickup circuit except that its front contact *a* shunts contact *c* of relay 1–2AD.

With relay 1–2AL picked up, a second circuit for relay 1–2AD is completed over front contact *b* of relay 1–2AL, permitting relay 1–2AD to be picked up while section 1–2T is still occupied but preventing its release until section 1–2T has been unoccupied for a time in excess of the time delay of relay 1–2AL and again reoccupied. When section 1–2T becomes unoccupied, the apparatus is again restored to its initial condition.

The coordination circuits

The coordination circuits in the control apparatus of our invention serve to mark the progress of each cut through the yard and to control the transfer of information from one storage unit to the next. These circuits comprise one group of circuits associated with the master retarder location and a group of circuits associated with each of the group retarder locations. Since the circuits associated with each group retarder are identical with those for every other group retarder, only those associated with group retarder 1–2GR will be discussed in detail.

The master retarder coordination circuits

The first group of relays associated with the master retarder control the storage of a signal for each cut representing the tangent track rolling resistance of the cut, to be described. This group (FIG. 33) consists of relays ATP, RI, ATCP, and R1TP.

Relay ATP is a back contact repeater of track relay ATR (FIG. 18), previously described, and has an obvious pickup circuit extending from terminal B of the battery over back contact *a* of track relay ATR, lead 293, and through the winding of relay ATP to terminal N of the battery.

Relay R1TP is a back contact repeater of track relay R1TR, previously described, and has an obvious pickup circuit extending from terminal B of the battery over back contact *a* of relay R1TR, lead 294, and through the winding of relay R1TP to terminal N of the battery.

Relay RI has a pickup circuit extending from terminal B of the battery over the front point of contact *b* of relay ATP, front contact *b* of relay ATCP, and through the winding of relay RI to terminal N of the battery. Relay RI has a stick circuit extending from terminal B of the battery over back contact *c* of relay R1TP, its own front contact *a*, and through the winding of the relay to terminal N of the battery.

Slow release relay ATCP has a pickup circuit extending from terminal B of the battery over the back point of contact *b* of relay ATP, and through the winding of the relay to terminal N of the battery. It has a first stick circuit extending from terminal B of the battery over back contact *b* of relay RI, its own front contact *a*, and through the winding of the relay to terminal N of the battery. Relay ATCP has a second stick circuit extending from terminal B of the battery over front contact *a* of relay R1TP, its own front contact *a*, and through the winding of the relay to terminal N of the battery.

Relays ATR and R1TR are normally picked up in the unoccupied condition of track sections AT and MR1T, respectively. Accordingly, relays ATP and R1TP are normally released, relay RI is normally released, and relay ATCP is normally energized over both its pickup circuit and its first stick circuit as shown. When sections AT and MR1T are occupied in that order, relay ATR is first released, picking up relay ATP. Relay RI is then picked up over its previously traced circuit including front contact *b* of relay ATP and front contact *b* of relay ATCP. Although the pickup circuit for relay ATCP is now open at the open back point of contact *b* of relay ATP, and the first stick circuit will be opened as soon as relay RI begins to pick up, relay ATCP has a slight time delay, as shown, to permit relay RI to pick up before it drops away. When relay RI picks up, it is held up over its stick circuit including back contact $b$ of relay R1TP and its own front contact $a$. At the end of its predetermined time delay, relay ATCP will then drop out.

As the cut comes on to section MR1T, relay R1TR is released and relay R1TP is picked up. Since relay ATCP is released, it is not immediately affected by this action.

However, relay RI is released due to the opening of its stick circuit at the open back point of contact $c$ of relay R1TP. As soon as section AT becomes unoccupied, picking up relay ATR and causing relay ATP to release, relay ATCP is picked up over its previously traced pickup circuit including back contact $b$ of relay ATP and is held up over its first stick circuit and also its second stick circuit, including front contact $a$ of relay R1TP and its own front contact $a$.

When track section MR1T becomes vacated, picking up relay R1TR and causing relay R1TP to release, relay ATCP remains up over its pickup and first stick circuits previously traced, and the apparatus is accordingly restored to its initial condition. At each occupancy of the track section AT, therefore, there occurs a period in which both relays ATP and RI are up, followed by a predetermined period in which relay ATP is up and relay RI is down, and finally by the release of both relays ATP and RI. The utility of this sequence of operations will hereinafter be made apparent.

Figure 36:
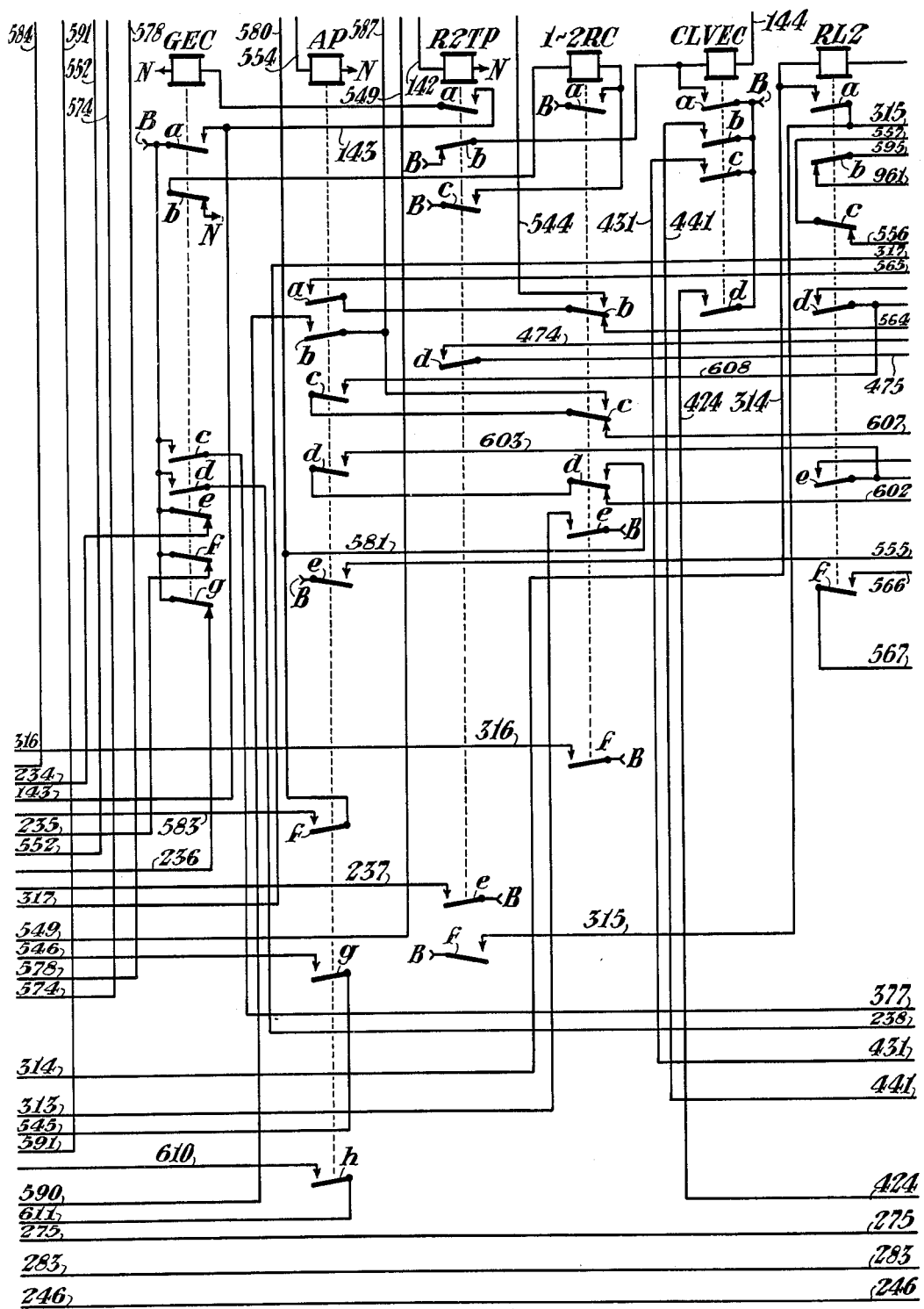

The second group of control relays associated with the master retarder, as shown in FIG. 36, comprises relays GEC, R2TP, 1–2RC and CLVEC. As described in connection with FIGS. 7 through 14, relay R2TP is a back contact repeater of relay R2TR associated with track section MR2T, and is energized by a circuit extending from terminal B of the battery over back contact $a$ of track relay R2TR (FIG. 22), lead 142, and through the winding of relay R2TP (FIG. 36) to terminal N of the battery.

Figure 33:
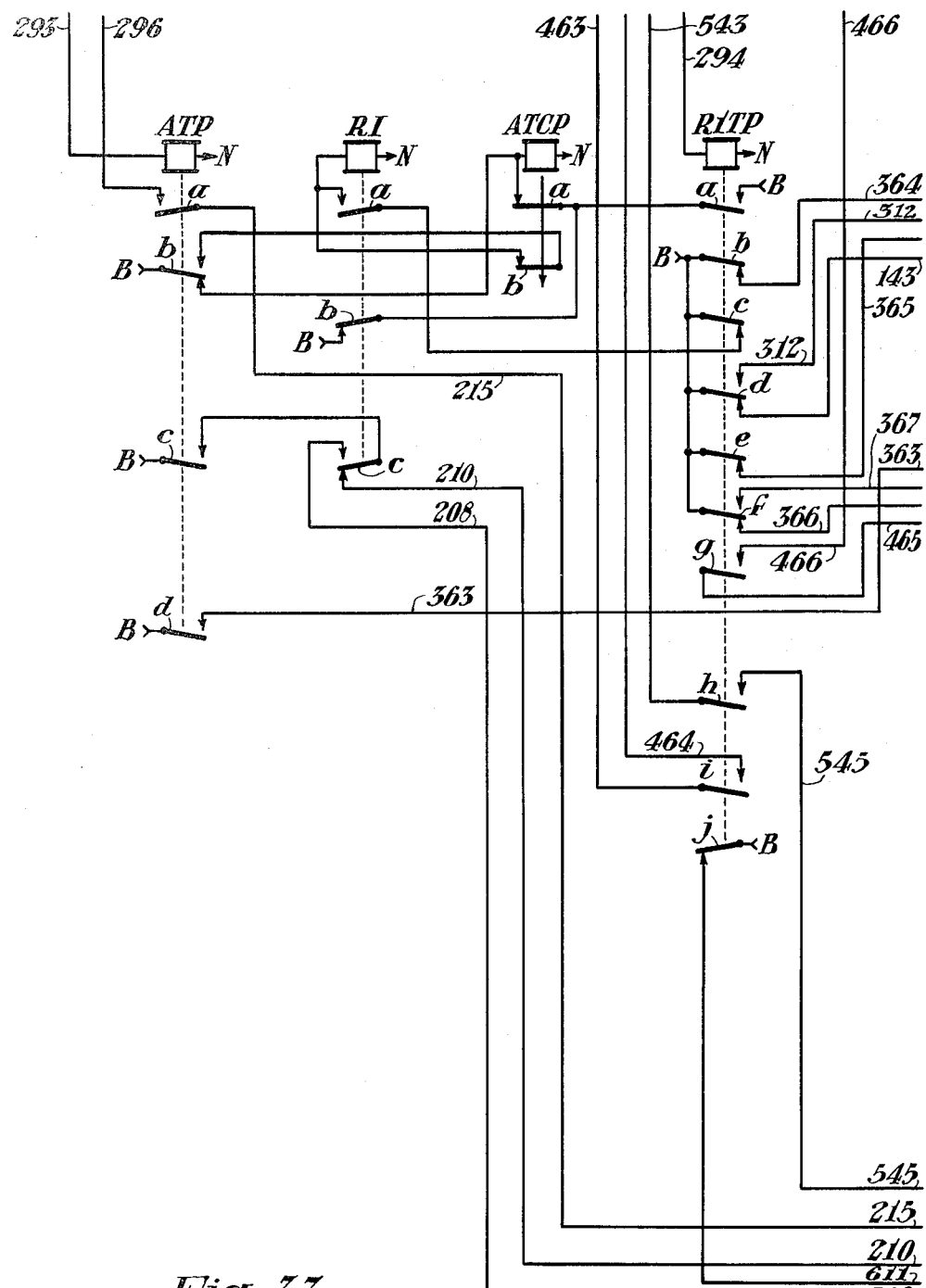

Relay GEC has a pickup circuit extending from terminal B of the battery in FIG. 33 over back contact $d$ of relay R1TP, lead 143, front contact $a$ of relay R2TP (FIG. 36), and through the winding of relay GEC to terminal N of the battery. Relay GEC has a stick circuit extending from terminal B of the battery over its own front contact $a$, front contact $a$ of relay R2TP, and through the winding of relay GEC to terminal N of the battery. Relay GEC will accordingly pick up when relay R1TP is released and relay R2TP is picked up, which will occur when a cut moves over section MR1T to section MR2T, and will remain up as long as section MR2T is occupied. This relay accordingly indicates when a cut has cleared section MR1T of the master retarder.

Relay 1–2RC (FIG. 36) has a pickup circuit extending from terminal B of the battery over front contact $c$ of relay R2TP, through the winding of relay 1–2RC, and over back contact $b$ of relay GEC to terminal N of the battery. Relay 1–2RC has a stick circuit extending from terminal B of the battery over its own front contact $a$, through the winding of the relay, and over back contact $b$ of relay GEC to terminal N of the battery. This relay is accordingly picked up when section R2TP is occupied and is released as soon as setion R1TP is cleared, and thereby indicates by its picked up condition that a cut is shunting both section MR1T and section MR2T.

Relay CLVEC has a pickup circuit extending from terminal B of the battery over back contact $b$ of relay R2TP, through the winding of relay CLVEC, over lead 144, to FIG. 23, and over lead 145 in FIG. 23 to terminal $c$ of unit 1–8WC and thence over back contact $b$ of relay 1–8TR to terminal N of the battery. Relay CLVEC has a stick circuit which extends from terminal B of the battery over its own front contact $a$, through the winding of the relay, over leads 144 and 145 to terminal $c$ of switch control unit 1–8WC in FIG. 23, and thence over back contact $b$ of track relay 1–8TR in the occupied condition of track section 1–8T to terminal N of the battery. Accordingly, relay CLVEC is picked up when relay R2TP is released and relay 1–8TR is released, indicating that a cut has passed over section R2TP completely and is occupying section 1–8T. The pickup of this relay indicates the time of release of the cut from the master retarder and is used to set the time for checking whether or not the cut has left the master retarder at the correct velocity.

*The group retarder cordination circuits*

The first group of control relays associated with each group retarder is used both to measure the cut length of each cut approaching the group retarder and to program the operation of the computer to be hereinafter described. This group, as shown in FIGS. 27 and 28, comprises relays CL1TR, CL2TR, CL3TR, and CL4TR, which are all conventional track relays, as described above, which are picked up or released according as their associated track sections CL1T through CL4T are unoccupied or are occupied, respectively; relays CL1TP, CL2TP, CL3TP, and CL4TP, which are each direct back contact repeaters of track relays CL1TR through CL4TR, respectively; a control relay SC; and an end of cut relay CLEC.

Each of relays CL1TP through CL4TP is energized by an obvious pickup circuit extending from terminal B of the battery over back contact $a$ of its associated track relay CL1TR through CL4TR. These relays are accordingly picked up when their associated sections are occupied and are released when their associated sections are unoccupied.

Relay SC (FIG. 27) has a pickup circuit extending from terminal B of the battery over front contact $h$ of relay CL4TP (FIG. 28), lead 322, through the winding of the relay, over front contact $b$ of relay CLEC, front contact $b$ of relay CL1TP, and over either front contact $b$ of relay CL2TP or lead 323 and front contact $b$ of relay CL3TP to terminal N of the battery.

Relay CLEC (FIG. 27) has a first pickup circuit extending from terminal B of the battery over front contact $a$ of relay CL3TP (FIG. 28), lead 324, back contact $a$ of relay CL1TP, and through the winding of relay CLEC to terminal N of the battery. Relay CLEC has a second pickup circuit extending from terminal B of the battery over front contact $a$ of relay CL2TP, back contact $a$ of relay CL1TP, and through the winding of the relay to terminal N of the battery. Relay CLEC has two stick circuits which are the same as its previously traced pickup circuits except that its own front contact $a$ shunts back contact $a$ of relay CL1TP. Relay CLEC accordingly picks up when relay CL1TP is relased while relay CL2TP is up, indicating that the cut has cleared section CL1T, and is held up as long as section CL3TP is occupied.

Computer alarm relay 1–2CA (FIG. 28) performs the function of preventing the computer check apparatus, to be described, from giving an alarm during the period between the end of a computation of the group retarder leaving speed V3 for a cut and the time when the computer is able to give a stable solution to the test problem, to be described. This relay has an obvious pickup circuit extending from terminal B of the battery over front contact $i$ of relay CL4TP and through the winding of relay CA to terminal N of the battery. Relay 1–2CA has a time delay, as schematically indicated on the drawings, which may be of the order of one second, for example, but in practice is determined by the length of time necessary for the computer to settle down from one set of inputs to another.

Figure 30:
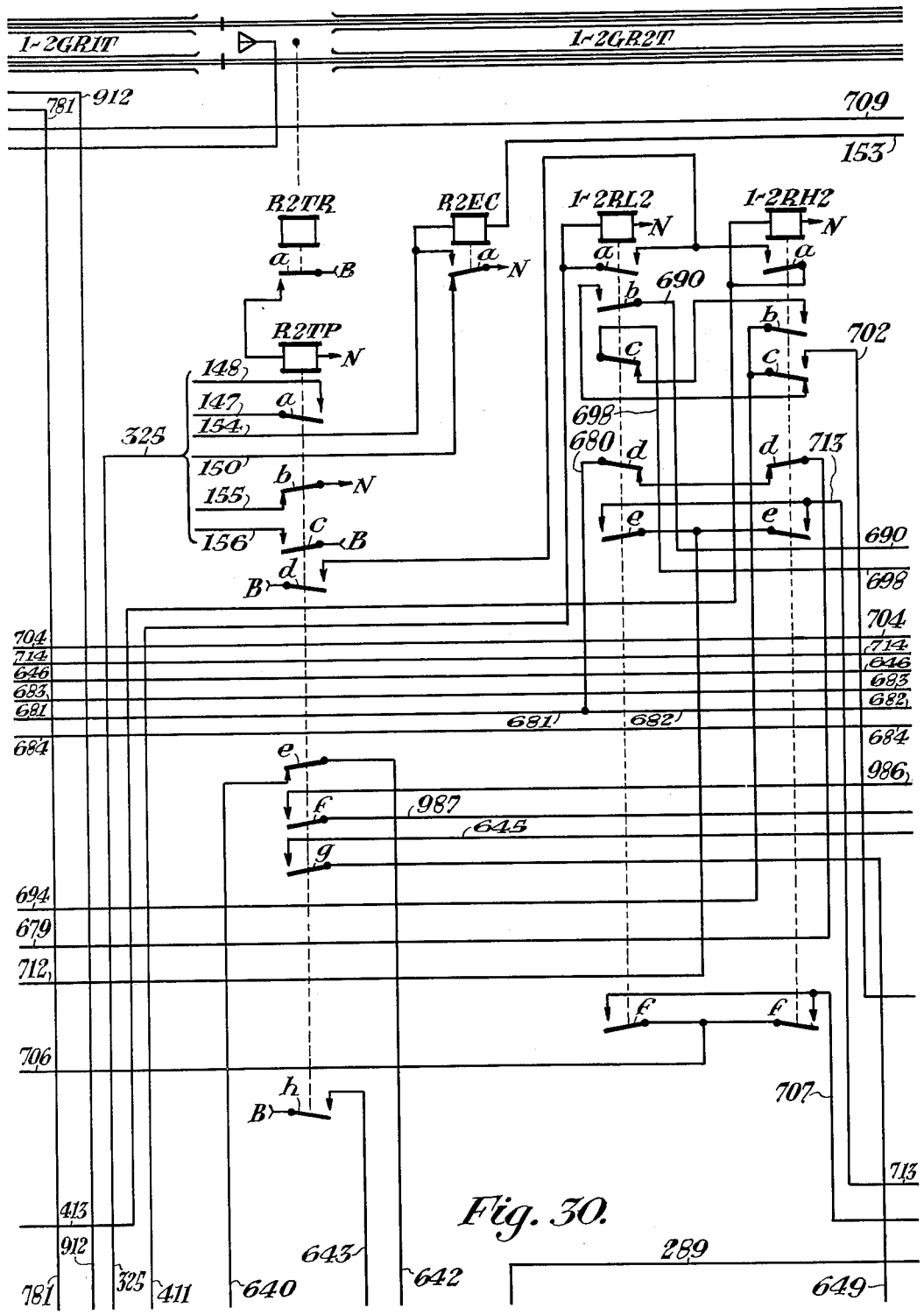

A second group of relays associated with the group retarder, as shown in FIGS. 27, 28 and 30, comprises relays 1–2RC, GAEC, R1EC, R1TP, R1TPP, R2TP and R2EC.

Relay R1TP (FIG. 27) is a direct back contact repeater of track relay R1TR, previously described, and has a pickup circuit extending from terminal B of the battery over back contact $a$ of track relay R1TR (FIG. 28), lead 146, and through the winding of relay R1TP to terminal N of the battery.

Relay R1TPP (FIG. 29) has a pickup circuit extending from terminal B of the battery over front contact *a* of relay R1TP and through the winding of relay R1TPP to terminal N of the battery. It has a stick circuit extending from terminal B of the battery over back contact *d* of relay R1EC, its own front contact *b*, and through the winding of the relay to terminal N of the battery.

Relay 1–2RC (FIG. 28) has a pickup circuit extending from terminal B of the battery over front contact *c* of relay R2TP (FIG. 30), lead 156, cable 325, lead 156 (FIG. 28), through the winding of relay 1–2RC, lead 157, and over back contact *b* of relay R1EC to terminal N of the battery. Relay 1–2RC has a stick circuit extending from terminal B of the battery over its own front contact *a*, through the winding of the relay, over lead 157, and over back contact *b* of relay R1EC to terminal N of the battery.

Relay R1EC (FIG. 27) has a pickup circuit extending from terminal B of the battery over the back point of contact *a* of relay R1TP, lead 147, cable 325, lead 147 (FIG. 30), front contact *a* of relay R2TP, lead 148, cable 325, lead 148 (FIG. 27), front contact *c* of relay GAEC, lead 149, through the winding of relay R1EC, over lead 150, cable 325, lead 150 (FIG. 30), and over back contact *a* of relay R2EC to terminal N of the battery. Relay R1EC has a stick circuit extending from terminal B of the battery over its own front contact *a* and through its winding, and over lead 150, cable 325, lead 150 (FIG. 30), and the back point of contact *a* of relay R2EC to terminal N of the battery.

Relay GAEC has a pickup circuit extending from terminal B of the battery over back contact *i* of relay CL4TP (FIG. 28), lead 151, front contact *c* of relay R1TP (FIG. 27), through the winding of relay GAEC, and over back contact *c* of relay R1EC to terminal N of the battery. Relay GAEC has a stick circuit extending from terminal B of the battery over its own front contact *a*, through the winding of the relay, and over back contact *c* of relay R1EC to terminal N of the battery.

Relay R2TP (FIG. 30) has a pickup circuit extending from terminal B of the battery over back contact *a* of relay R2TR and through the winding of the relay to terminal N of the battery.

Relay R2EC (FIG. 30) has a pickup circuit extending from terminal B of the battery in switch control unit 1–2WC (FIG. 32), over back contact *a* of relay 1–2TR, terminal *a* of switch control unit 1–2WC, lead 153, through the winding of relay R2EC (FIG. 30), over lead 154, cable 325, lead 154 (FIG. 27), over front contact *e* of relay R1EC, lead 155, cable 325, lead 155 (FIG. 30), and over back contact *b* of relay R2TP to terminal N of the battery. Relay R2EC has a stick circuit extending from terminal B of the battery in unit 1–2WC (FIG. 32), over back contact *a* of relay 1–2TR, lead 153, through the winding of relay R2EC, and over its own front contact *a* to terminal N of the battery.

The sequence of operation of this second group of relays will now be described. As a cut moves on to section 1–2GR1T, relay R1TR is released and relay R1TP is picked up. Relay R1TPP is then picked up over its previously traced pickup circuit including front contact *a* of relay R1TP, and is held over its previously traced holding circuit including its own front contact *b* and back contact *d* of relay R1EC until relay R1EC is picked up, it completes its previously traced stick circuit including tion CL4T was occupied and relay CL4TP would accordingly be up. As soon as section CL4T is cleared and relay CL4TP releases, relay GAEC picks up over its previously traced circuit including back contact *i* of relay CL4TP, front contact *c* of relay R1TP, and back contact *c* of relay R1EC. As soon as relay GAEC picks up, it completes its previously traced stick circuit including its own front contact *a* and back contact *c* of relay R1EC. The pickup of relay GAEC accordingly indicates that section CL4T has been cleared and this indication is maintained until section 1–2GR1T is cleared as indicated by the pickup of relay R1EC.

As soon as the cut enters section 1–2GR2T, relay R2TP picks up and relay 1–2RC picks up over its previously traced circuit including front contact *c* of relay R2TP, the winding of the relay, and back contact *b* of relay R1EC. As soon as relay 1–2RC is picked up, it is held up over its stick circuit including its own front contact *a* and back contact *b* of relay R1EC. Relay 1–2RC accordingly remains up during the time that both sections 1–2GR1T and 1–2GR2T are occupied.

As soon as the cut clears section 1–2GR1T, relay R1EC picks up over its circuit extending from terminal B of the battery over back contact *a* of relay R1TP, front contact *a* of relay R2TP, front contact *c* of relay GAEC, the winding of relay R1EC, and back contact *a* of relay R2EC to terminal N of the battery. As soon as relay R1EC picks up, it completes its previously traced stick circuit including its own front contact *a* and back contact *a* of relay R2EC. Relay R1EC accordingly indicates when it picks up that section 1–2GR1T is cleared and maintains this indication until section 1–2GR2T is cleared, as indicated by the pick up of relay R2EC.

When relay R1EC picks up, the stick circuits for relays 1–2RC, GAEC, and R1TPP are interrupted at the open back points of contacts *b*, *c* and *d* of relay R1EC, respectively. These relays accordingly release.

When section 1–2GR2T is cleared, with section 1–2T still occupied, relay R2TP is released while relay 1–2TR remains released. Accordingly, relay R2EC is picked up over its previously traced circuit including back contact *a* of relay 1–2TR, front contact *e* of relay R1EC, and back contact *b* of relay R2TP. Relay R2EC is then held up over its stick circuit including its own front contact *a* and back contact *a* of relay 1–2TR.

With relay R2EC picked up, the previously traced stick circuit for relay R1EC is interrupted at the open back point of contact *a* of relay R2EC, and relay R1EC releases.

When section 1–2T is cleared, relay 1–2TR picks up, interrupting the previously traced stick circuit for relay R2EC at the open back point of contact *a* of relay 1–2TR, and relay R2EC is released. The apparatus is then restored to its initial condition.

Speed measurement

Figure 19:
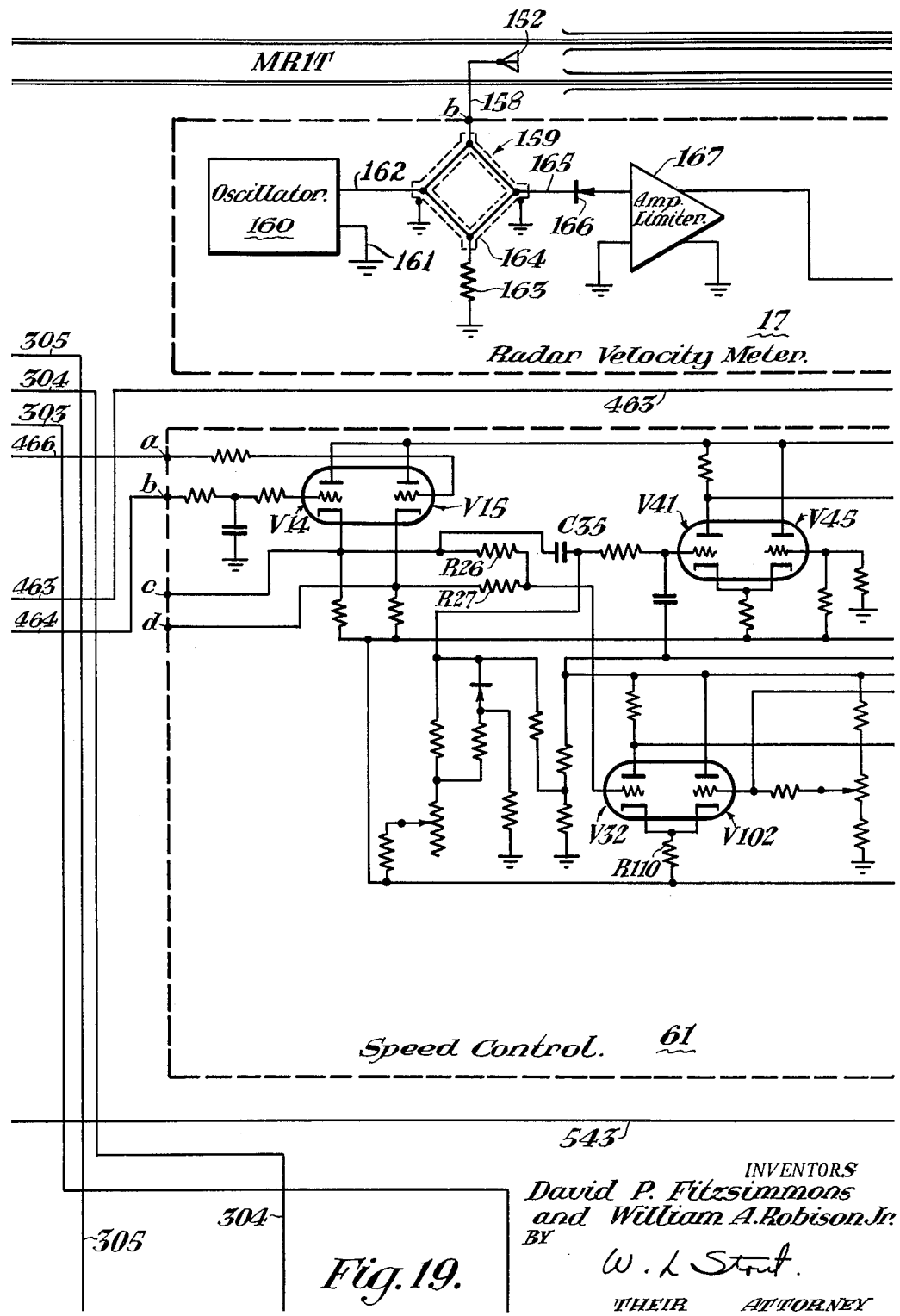
Figure 20:
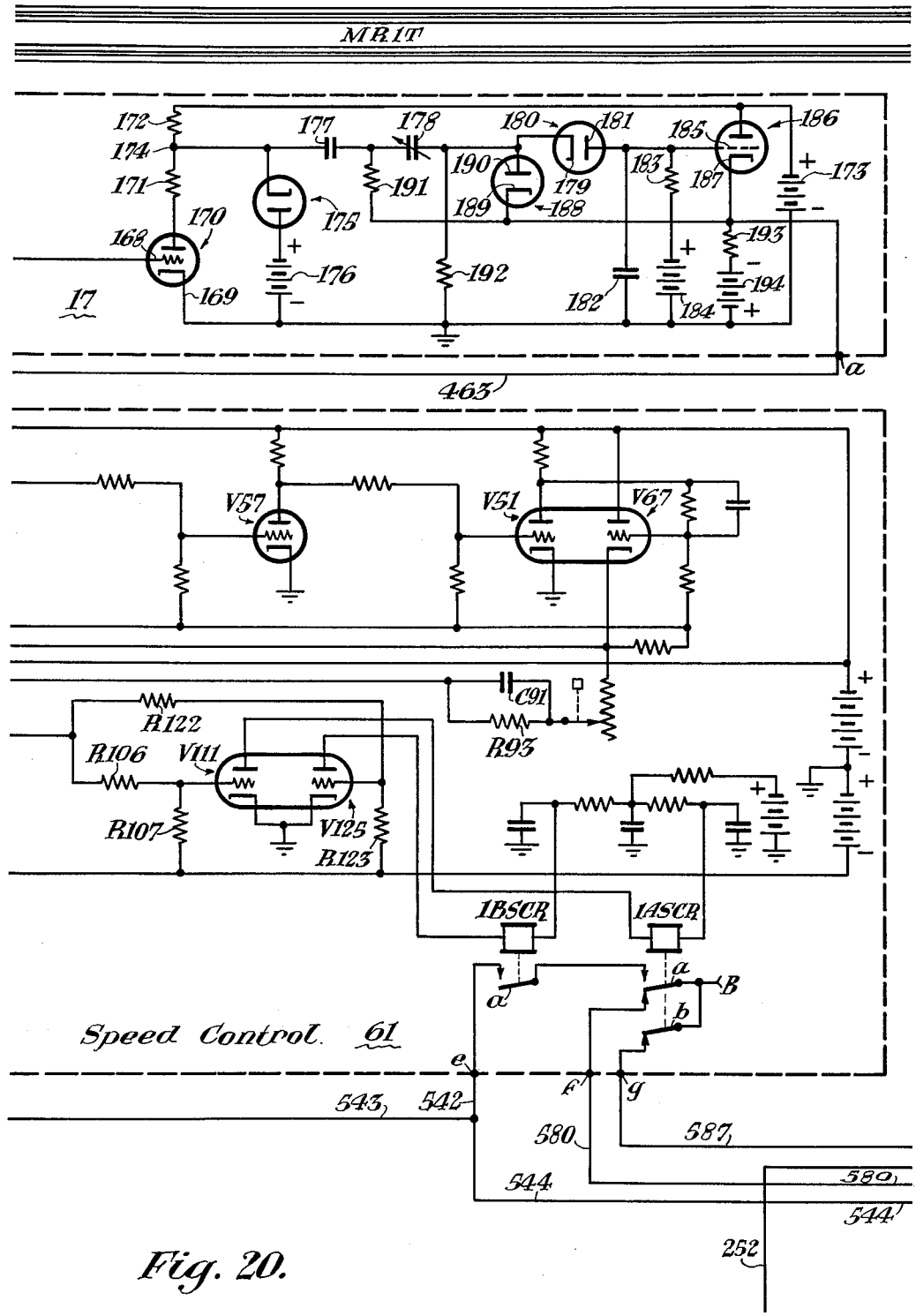

The velocity measurements at the several locations in a yard equipped with the control apparatus of our invention are made in the disclosed embodiment of our invention with a standardized radar velocity meter, the details of which are best shown in connection with radar velocity meter 17 in FIGS. 19 and 20. This apparatus comprises a directional antenna 152, oriented in the direction of the track, and in the case of unit 17, facing away from the hump as shown. This antenna is connected over a suitable wave guide shown schematically at 158 to unit 17 and to the upper junction of a "magic T" network 159 of a type well known in the art. An oscillator 160, which may be of any conventional construction adapted to produce an output frequency in the radar range, has a pair of output leads 161 and 162, lead 161 being connected to a reference ground which may be considered to be a common ground point wherever it is shown through the apparatus, and lead 162 being connected to another junction of the "magic T" network as shown. The "magic T" network has a third junction connected through a suitable impedance, here shown as a resistance 163, to ground, and a fourth junction connected to an output lead 165. The legs of the network are shielded by suitable means 164 which are grounded as shown.

As is well known in the art, energy from oscillator 160 fed to the "magic T" network is principally directed to antenna 152, but in the disclosed embodiment the network is constructed to be slightly unbalanced so that a portion of this energy appears on lead 165. The energy fed to antenna 152 is radiated directionally, and a portion thereof may be reflected back to the antenna by an object in the path of the beam. Energy received in this manner by antenna 152 is directed back to the "magic T" network and causes a voltage to appear on lead 165. If an object in the path of the beam of antenna 152, such as a rolling car, is in motion, the energy reflected back to antenna 152 will have a frequency shifted from the radiated frequency by an amount proportional to the relative speed of the car with respect to the antenna in accordance with the well known Doppler principle. Therefore, the signal on lead 165 will be composed of a first voltage of the frequency of oscillator 160 and a second voltage having a frequency depending on the speed of objects in the path of the antenna. This signal is fed to a mixer 166, here shown as a crystal diode. The crystal combines the energies of the received signals and develops a signal having a frequency component proportional to the difference in the frequencies of the transmitted and received waves. This "beat frequency" signal is supplied to a conventional amplifier and limiter 167, where the voltage is raised to a selected level, and due to the limiting action, the peaks of the waves are clipped to form an essentially square wave.

The output of amplifier 167 is applied to a frequency meter which, as shown, may be of the type disclosed and claimed in the copending application of Richard D. Campbell, Serial No. 582,248, for Frequency Measuring Apparatus, filed May 2, 1956, assigned to the assignee of our present application and now Patent No. 2,908,865, issued October 13, 1959. As more fully pointed out in this patent, the signal from amplifier limiter 167 is applied between grid 168 and cathode 169 of a suitable vacuum tube 170. The anode of this tube is connected through two resistors 171 and 172 in series to the positive terminal of a suitable source of potential, here shown as a battery 173. Cathode 169 of tube 170 and the negative terminal of battery 173 are connected to the common ground point as shown. The junction 174 of resistors 171 and 172 is connected to a clamping circuit comprising a diode 175 and a source of voltage such as battery 176. The clamping circuit acts in connection with vacuum tube 170 to limit the excursions of the voltage at junction 174. That is, these components provide an upper and lower limit for the voltage between the junction point and ground that cannot be exceeded. The input signal to tube 170 is of sufficient magnitude to cause this voltage to vary between these upper and lower limits during the successive cycles of the input signal.

During the positive half cycles of the input signal to tube 170, the grid is driven positive with respect to the cathode. This causes the tube to conduct a relatively high current and causes the voltage across resistors 171 and 172 to increase and the voltage between junction 174 and ground to decrease. This voltage can only decrease until it drops slightly below that of battery 176. Any tendency for the voltage to drop further provides a forward bias on diode 175 which causes the diode to conduct. This restores the voltage at junction 174 to substantially the voltage of battery 176 and thereby establishes a lower limit that cannot be exceeded.

During the negative half cycles of the input signal, the anode current of tube 170 is reduced to zero. This prevents any current from flowing through resistors 171 and 172 and the voltage between junction 174 and ground rises to the potential of battery 173. This establishes an upper limit for the voltage that cannot be exceeded. It is thus seen that the excursions of the voltage between junction 174 and ground are confined to voltages between that of battery 176 and that of battery 173.

A pair of capacitors 177 and 178 are connected between junction 174 and cathode 179 of a first diode 180. The anode 181 of diode 180 is connected to ground through a parallel circuit comprising capacitor 182 in one branch and a resistor 183 in series with a source of potential such as battery 184 in the second branch. Anode 181 is further connected to grid 185 of a vacuum tube 186. Cathode 187 of vacuum tube 186 is connected through a second diode 188 to the cathode 179 of the first diode 180. Cathode 189 of the second diode is connected to the cathode of tube 186, while the anode 190 is connected to the cathode of the first diode 180. A resistor 191 is connected between cathode 189 of the second diode and the junction of capacitors 177 and 178. A resistor 192 is connected between cathode 179 of the first diode and ground.

Capacitor 177 and resistor 191 provide isolation between the direct current potential of junction 174 and the diode circuits. The advantages of this construction are pointed out in Patent No. 2,908,865 referred to above.

Resistor 192 controls the charge on capacitor 178 in such manner that the output indication varies linearly with the measured frequency.

The charge, and in turn, the voltage on capacitor 182 is controlled by the measured frequency in the following manner. When no signal, or a signal of zero frequency, is applied to the frequency measuring circuit, the voltage across capacitor 182 is substantially equal to the voltage between the cathode 187 of tube 186 and ground. This is brought about by the action of diodes 180 and 188. That is, current flows from the source 184 through resistor 183, diodes 180 and 188, resistor 193, source 194 and back to the source 184 until the voltage between the grid 185 of tube 186 and ground is substantially equal to the voltage between the cathode 187 and ground. This reduces the voltage across the diodes to substantially zero. Hence, no further current flows through the diodes and capacitor 182 is provided with a voltage equal to the voltage between the cathode of tube 186 and ground.

The capacitor remains charged in this manner until an alternating current signal is applied to the measuring circuit. The application of such a signal causes the circuit to operate as follows. During each positive half cycle, when the potential of junction 174 decreases below its operating level, diode 180 is biased positively to provide current conduction which reduces the voltage across capacitor 182. During each subsequent half cycle, charging current from source 184 flows through resistor 183 to replenish the charge removed during the previous half cycle. However, before the charge is fully replenished the following half cycle will cause an additional charge to be removed from the capacitor. This action continues until the decrease in the charge during one half cycle of the measured frequency is substantially equal to the charge replenished by battery 184 and resistor 183 during each subsequent half cycle. Therefore, a unique voltage appears across the capacitor for each frequency to be measured.

The voltage that is representative of the measured frequency, and hence of the velocity of a car moving in the path of antenna 152, appears between output terminal *a* of velocity meter 17 and ground. The voltage across capacitor 182 is coupled to the output terminals through the cathode follower amplifier comprising tube 186 and its associated circuitry. The cathode of this tube is connected to ground through resistor 193 in series with the voltage source 194. Voltage source 194 is connected so as to make the cathode negative with respect to ground. The anode of tube 186 is connected to the positive terminal of battery 173 and is thereby provided with a suitable operating voltage. The cathode follower amplifying means isolates the output circuit from capacitor 182 and thereby prevents the circuitry connected to the output terminals from loading the frequency measuring circuit. Each of radar velocity meters 9, 19, 26 and 52 may be identical with radar velocity meter 17 just described.

The tangent track rolling resistance measurement

The output of radar velocity meter 9 (FIG. 18) associated with apporach track section AT is supplied to a differentiator 10 which may be of the type disclosed and claimed in copending application Serial No. 582,249, filed May 2, 1956, by Richard D. Campbell for a Differentiator assigned to the assignee of the present application and now Patent No. 2,901,609, issued August 25, 1959. Basically, this circuit comprises a differentiating network including a grounded resistor 195 and a capacitor 196, the capacitor being connected between terminal $a$ of velocity meter 9 and the input terminal of a D.C. amplifier 197 as shown. The D.C. amplifier may be of any conventional construction, although in a preferred embodiment of our invention it is of the form shown in Patent No. 2,901,609, referred to above, and if desired may be provided with feedback by means of a feedback resistor 198 as shown. The output of differentiator 10 appearing between terminal $b$ and ground will obviously be proportional to the acceleration of cars moving in the path of antenna 199 of velocity meter 9. This signal is supplied between terminal $a$ of bias unit 11 and ground.

Bias unit 11 comprises a suitable source of D.C. voltage such as a battery 200, which may, for example, have a voltage of 100 volts, which is connected across a potentiometer 201 comprising a resistance 202 and a movable wiper 203 which may be manually adjusted to a value dependent on the grade $G_{a,b}$ in section AT. The output voltage from potentiometer 201 is adjusted to a value of $100-G_{a,b}$. This voltage is applied to a summing network comprising resistors 204 and 205 connected to a common summing terminal 206. As previously pointed out, the rolling resistance $R_{a,b}=G_{a,b}-\alpha_{a,b}$. Therefore, the voltage appearing at summing terminal 206 and hence at output terminal $b$ of bias unit 11 will be $100-G_{a,b}+\alpha_{a,b}=100-R_{a,b}$. The 100 volt bias is applied at this time to avoid the necessity for storing negative voltages, and will be removed later in the circuitry as will hereinafter be described.

The rolling resistance storage and transfer circuits

The novel rolling resistance storage and transfer apparatus employed in the system of our invention is disclosed and claimed in the copending application of William A. Robison, Serial No. 728,230, filed April 14, 1958, for an Information Handling System, assigned to the assignee of the present application and now Patent No. 3,162,405, issued December 22, 1964. The checking circuits, to be described, are disclosed and claimed in the copending application of Edward C. Falkowski, Serial No. 728,316, filed April 14, 1958, for Storage Checking Apparatus, assigned to the assignee of the present application and now Patent No. 2,958,073, issued October 23, 1960. This equipment makes use of a plurality of storage units for storing electronic voltages, means for detecting the occupied or unoccupied condition of the storage units, means for selecting an unoccupied storage unit and applying a measured value of rolling resistance for storage in that unit, means for developing a code identifying the selected storage unit, means for transmitting the code along the route of a cut the rolling resistance of which has been stored, and means for interpreting the code and interrogating the proper storage unit to select the stored value of rolling resistance pertaining to the cut when it is desired to make use of the rolling resistance measurement in calculating the desired leaving speed of the cut from the group retarder in its selected route.

Figure 45:
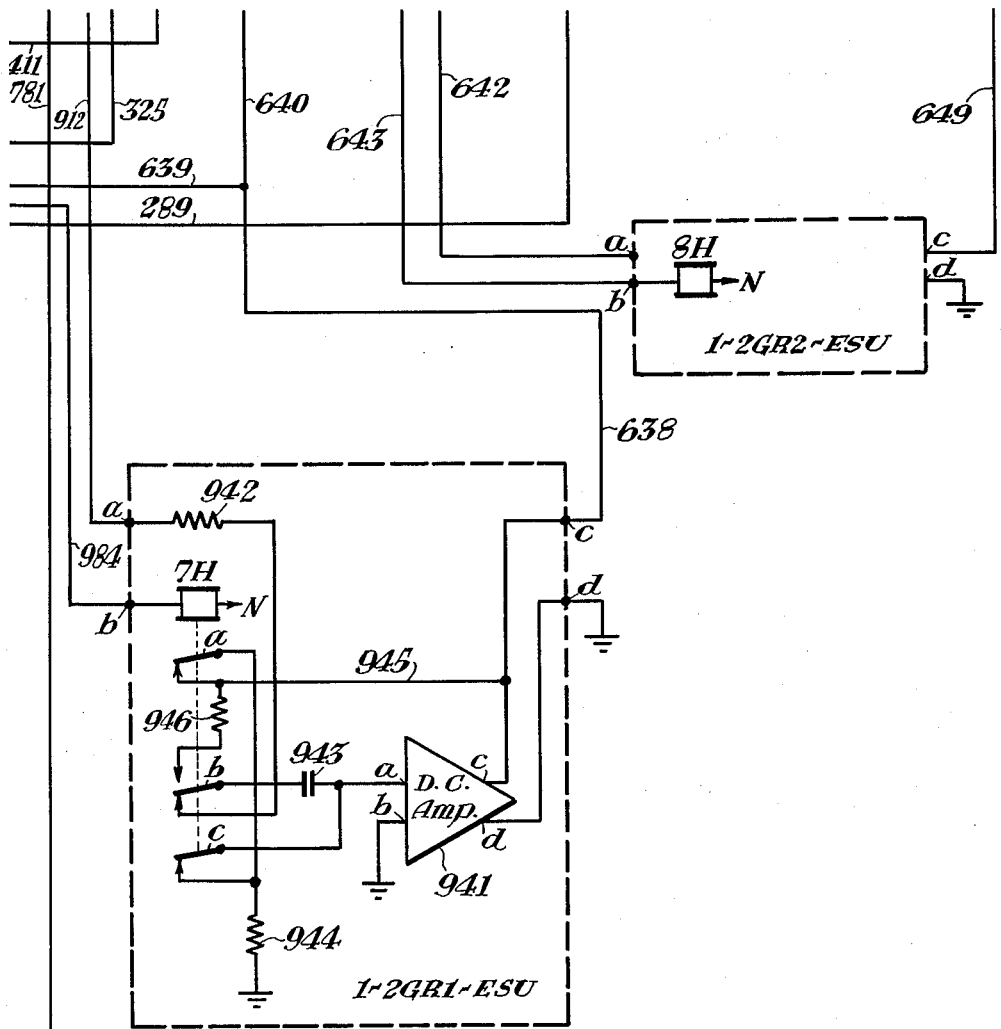

The electronic storage units employed in this portion of the equipment are units 1ES through 6ES which are located in rolling resistance storage panels 1RP through 6RP as shown in FIGS. 46, 47, 58 and 59. Since these storage panels, which include both the electronic storage units and the storage selection, code generating, storage interrogating and storage cancellation circuits, are substantially identical, only the first, second and last of the six panels are shown in detail. The details of panels 3RP through 5RP may be identical with panel 2RP except for an obvious progressive change in the generated code identifying the panel, as will be described. In these panels, the storage unit such as 1ES, 2ES and 6ES are shown in block form and the storage units in the remaining panels are not shown since they would be identical. The details of these storage units are shown in somewhat more detail in connection with the identical storage unit 1–2R1ESU in FIG. 45, which will hereinafter be described. For further details of this storage unit, reference may be had to the copending application of James A. Cook, Jr., Serial No. 634,000, for Electronic Storage Circuit, filed January 14, 1957, assigned to the assignee of our present application and now Patent No. 2,914,750, issued November 24, 1959. For present purposes, however, it is sufficient to note that terminals $a$, $b$, $c$ and $d$ on each of the storage units 1ES through 6ES correspond to the similarly lettered terminals of storage unit 1–2GR1ESU as shown in FIG. 45. The voltage to be stored is applied between terminal $a$ and ground terminal $d$. When it is desired to complete the storage, one of relays 1H through 6H is energized from terminal B of the battery over external circuitry to be described and through the winding of the selected relay 1H through 6H to terminal N of the battery. The stored voltage may be read out of the unit between output terminal $c$ and ground terminal $d$.

Rolling resistance storage panel 1RP comprises an electronic storage unit 1ES including relay 1H, and four additional relays 1RO, 1A, 1B and 1CR.

Relay 1RO (FIG. 46) has a pickup circuit which extends from terminal B of the battery and through a transfer tree, to be described, associated with each group retarder, over one of a set of parallel leads, to be described, to lead 207 (FIG. 46) and thence to terminal $a$ of panel 1RP, and from terminal $a$ through the winding of relay 1RO to terminal N of the battery. Relay 1RO is picked up when it is desired to read out a value of voltage stored in unit 1ES and to cancel the storage to make the panel available for a subsequent storage. When picked up, relay 1RO completes a stick circuit extending from terminal B of the battery over front contact $c$ of relay ATP in FIG. 33, previously described, the front point of contact $c$ of relay RI, lead 208, terminal $s$ of panel 1RP (FIG. 46), through a rectifier 209, and over front contact $a$ of relay 1RO and through the winding of the relay to terminal N of the battery.

Relay 1A (FIG. 46) has a pickup circuit extending from terminal B of the battery over front contact $c$ of relay ATP in FIG. 33, front contact $c$ of relay RI, lead 208, terminal $s$ of panel 1RP (FIG. 46), back contact $b$ of relay 1B, to be described, back contact $c$ of relay 1RO, lead 326, the front point of contact $a$ of relay 1CR, to be described, lead 327, and through the winding of relay 1A to terminal N of the battery. Relay 1A has a first stick circuit extending from terminal B of the battery over an additional back contact $d$ of relay 1H in storage unit 1ES (FIG. 47), lead 328, its own front contact $a$, and through the winding of the relay to terminal N of the battery. Relay 1A has a second stick circuit extending from terminal B of the battery over back contact $c$ of relay 1B, its own front contact $a$, and through the winding of the relay to terminal N of the battery.

Relay 1B (FIG. 46) has a first pickup circuit extending from terminal B of the battery over front contact $c$ of relay ATP in FIG. 33, the back point of contact $c$ of relay RI, lead 210, terminal $q$ of panel 1RP, the front point of contact $c$ of relay 1A, and through rectifier 211 and the winding of relay 1B to terminal N of the battery. Relay 1B has a second pickup circuit extending from terminal B of the battery over back contact $a$ of relay TRTCD to terminal $c$ of panel 1RP, lead 329, over back contact c of relay 1CR, the front point of contact e of relay 1H, lead 330, the back point of contact c of relay 1A, through rectifier 211, and the winding of relay 1B to terminal N of the battery. Relay 1B has a third pickup circuit which extends from terminal B of the battery over front contact b of relay 1CR, the back point of contact e of relay 1H, lead 330, back contact c of relay 1A, through rectifier 211, which serves to prevent reverse flow of current, and through the winding of relay 1B to terminal N of the battery. Relay 1B has a stick circuit which extends from terminal B of the battery over the back point of contact d of relay 1RO, its own front contact a, and through the winding of the relay to terminal N of the battery.

Relay 1CR (FIG. 47) has a pickup circuit extending from output terminal c of storage unit 1ES over leads 212 and 213, through the winding of relay 1CR, and over lead 331, back contact f of relay 1B, and lead 332 to ground and thus terminal d of unit 1ES. Relay 1CR is therefore picked up whenever a voltage is stored in unit 1ES.

Relay 1H (FIG. 47) has a first pickup circuit extending from terminal B of the battery in FIG. 33, over front contact c of relay ATP, the front point of contact c of relay RI, lead 208, terminal s of panel 1RP, the back point of contact b of relay 1B, back contact c of relay 1RO, lead 326, the back point of contact a of relay 1CR, lead 333, back contact b of relay 1A, lead 334, terminal b of storage unit 1ES, and through the winding of relay 1H to terminal N of the battery. Relay 1H has a second pickup circuit extending from terminal B of the battery over front contact d of relay 1B and lead 334 to terminal b of storage unit 1ES and through the winding of relay 1H to terminal N of the battery. Relay 1H has a third pickup circuit extending from terminal B of the battery over the front point of contact d of relay 1RO and lead 334 to terminal b of storage unit 1ES, and thence through the winding of relay 1H to terminal N of the battery.

Electronic storage unit 1ES has a first input circuit extending from ground through a 100 volt battery 214, and over the back point of contact e of relay 1A and lead 335 to terminal a of unit 1ES, and thence through the unit to ground at grounded terminal d of unit 1ES. Storage unit 1ES has a second input circuit extending from terminal b of bias unit 11 in FIG. 18, previously described, over front contact a of relay ATP (FIG. 33), lead 215, terminal r of panel 1RP (FIG. 46), and over the front point of contact e of relay 1A and lead 335 to terminal a of electronic stroage unit 1ES and through the unit to ground at grounded terminal d. Electronic storage unit 1ES has an output circuit extending between grounded terminal d and terminal c and from terminal c over leads 212 and 216 to front contact f of relay 1RO and thence over lead 336 to output terminal m of panel 1RP. The circuit from terminal m is completed to ground through a selecting network, to be described, and a utilization network selected from a group of such networks located at each of the group retarders, in a manner to be described.

Panel 2RP (FIGS. 46 and 47) comprises an electronic storage unit 2ES, including a relay 2H, and four additional relays 2RO, 2A, 2B and 2CR.

Relay 2RO (FIG. 46) has an energizing circuit similar to that described for relay 1RO which extends from terminal B of the battery through a transfer circuit to be described which is completed when it is desired to read out the storage in panel 2RP, and which circuit terminates in lead 217 (FIG. 46) which is connected to terminal a of panel 2RP and thence through the winding of relay 2RO to terminal N of the battery. Relay 2RO has two stick circuits. The first extends from terminal B of the battery over front contact c of relay ATP in FIG. 33, the front point of contact c of relay RI, lead 208, terminal s of panel 1RP, the front point of contact b of relay 1B, terminal f of panel 1RP, terminal r of panel 2RP, through a rectifier 218 which serves to prevent sneak circuits, and over front contact a of relay 2RO and through the winding of the relay to terminal N of the battery. The second stick circuit for relay 2RO is the same as the previously traced circuit except that it includes in the path from terminal s of panel 1RP to terminal f of panel 1RP front contact b of relay 1RO instead of front contact b of relay 1B.

Relay 2A (FIG. 46) has a pickup circuit extending from terminal B of the battery over front contact c of relay ATP in FIG. 33, front contact c of relay RI, lead 208, terminal s of panel 1RP, and from terminal s to terminal f of panel 1RP over two alternate paths, the first including front contact b of relay 1RO, and the second including the front point of contact b of relay 1B, from terminal f of panel 1RP to terminal r of panel 2RP, over the back point of contact b of relay 2B, back contact c of relay 2RO, lead 337, the front point of contact a of relay 2CR, lead 338 and through the winding of relay 2A to terminal N of the battery. Relay 2A has a first stick circuit extending from terminal B of the battery over back contact d of relay 2H, lead 339, front contact a of relay 2A, and through the winding of the relay to terminal N of the battery. Relay 2A has a second stick circuit which extends from terminal B of the battery over back contact c of relay 2B, front contact a of relay 2A, and through the winding of the relay to terminal N of the battery.

Relay 2B (FIG. 46) has three pickup circuits. The first extends from terminal B of the battery over front contact c of relay ATP in FIG. 33, back contact c of relay RI, lead 210, terminal q of panel 1RP, terminal h of panel 1RP, terminal p of panel 2RP, the front point of contact c of relay 2A, through rectifier 219, which serves to prevent sneak circuits, and through the winding of relay 2B to terminal N of the battery. The second pickup circuit for relay 2B extends from terminal B of the battery over front contact b of relay 2CR, the back point of contact e of relay 2H, lead 340, the back point of contact c of relay 2A, through rectifier 219, and through the winding of relay 2B to terminal N of the battery. Relay 2B has a third pickup circuit extending from terminal B of the battery over back contact a of relay TRCTD to terminal c of panel 1RP, lead 329, terminal l of panel 1RP, terminal l of panel 2RP, over back contact c of relay 2CR, the front point of contact e of relay 2H, lead 340, the back point of contact c of relay 2A, and through rectifier 219 and the winding of relay 2B to terminal N of the battery. Relay 2B has a stick circuit extending from terminal B of the battery over the back point of contact d of relay 2RO, front contact a of relay 2B, and through the winding of the relay to terminal N of the battery.

Relay 2CR (FIG. 47) has a pickup circuit extending from output terminal c of storage unit 2ES over leads 220 and 221, through the winding of relay 2CR, over lead 341, over back contact f of relay 2B, and over lead 342 to ground. Relay 2CR is accordingly picked up whenever a stored voltage appears between terminal c of unit 2ES and ground terminal d.

Relay 2H (FIG. 47) has four pickup circuits. The first and second extend from terminal B of the battery over front contact c of relay ATP in FIG. 33, front contact c of relay RI, lead 208, terminal s of panel 1RP, from terminal s to terminal f of panel 1RP over two alternate paths, the first including front contact b of relay 1RO and the second including the front point of contact b of relay 1B, from terminal f of panel 1RP to terminal r of panel 2RP, over the back point of contact b of relay 2B, back contact c of relay 2RO, lead 337, the back point of contact a of relay 2CR, lead 343, back contact b of relay 2A, lead 344, terminal b of unit 2ES, and through the winding of relay 2H to terminal N of the battery. The third pickup circuit for relay 2H extends from terminal B of the battery over front contact d of relay 2B and lead 344 to terminal b of unit 2ES and through the winding of relay 2H to terminal N of the battery. The fourth pickup circuit for relay 2H extends from terminal B of the battery over the front point of contact *d* of relay 2RO and thence over lead 344 to terminal *b* of unit 2ES and through the winding of relay 2H to terminal N of the battery.

Storage unit 2ES has two input circuits. The first extends from ground through battery 222 over the back point of contact *e* of relay 2A and lead 345 to input terminal *a* of storage unit 2ES and through the unit to grounded terminal *d*. The second extends from ground through bias unit 11 in FIG. 18 to terminal *b* of unit 11, over lead 296, front contact *a* of relay ATP, lead 215, terminal *r* of panel 1RP, terminal *g* of panel 1RP, terminal *q* of panel 2RP, and over the front point of contact *e* of relay 2A and lead 345 to input terminal *a* of unit 2ES. Storage unit 2ES has an output circuit extending from ground terminal *d* through the unit to output terminal *c*, and over leads 220 and 223, front contact *f* of relay 2RO and lead 346 to output terminal *k* of panel 2RP. The circuit is completed from terminal *k* through transfer circuits and one of a group of utilization devices associated with each of the group retarders in a manner which will hereinafter be fully described.

Panels 3RP through 5RP (FIGS. 58 and 59) are identical with panel 2RP just described, their internal circuitry corresponding to the circuits connected to terminals *a* through *t* in panel 2RP, with the exception to be noted hereinafter concerning the tangent acceleration code which has an individual combination for each panel.

Panel 6RP (FIGS. 58 and 59) comprises an electronic storage unit 6ES, including a relay 6H, and four additional relays 6RO, 6A, 6B, and 6CR.

Relay 6RO (FIG. 58) has a pickup circuit extending from terminal B of the battery through selection networks associated with the group retarders, to be hereinafter described, terminating in a lead 224 to terminal *a* of panel 6RP, and thence through the winding of relay 6RO to terminal N of the battery. Relay 6RO has a multiple stick circuit extending from terminal B of the battery over front contact *c* of relay ATP in FIG. 33, front contact *c* of relay RI, lead 208, terminal *s* of panel 1RP, from terminal *s* to terminal *f* of panel 1RP over alternate paths, the first including front contact *b* of relay 1RO and the second including the front point of contact *b* of relay 1B, from terminal *f* of panel 1RP to terminal *r* of panel 2RP, from terminal *r* to terminal *d* of panel 2RP over two alternate paths, the first including front contact *b* of relay 2RO and the second including the front point of contact *b* of relay 2B, from terminal *r* to terminal *d* of each of panels 3RP through 5RP over paths identical with that traced for panel 2RP, from terminal *d* of panel 5RP to terminal *i* of relay 6RP, through rectifier 225 which serves to prevent sneak paths, and over front contact *a* of relay 6RO and through the winding of the relay to terminal N of the battery.

Relay 6A (FIG. 58) has a multiple pickup circuit extending from terminal B of the battery over front contact *c* of relay ATP in FIG. 33, front contact *c* of relay RI, lead 208, terminal *s* of panel 1RP, over either front contact *b* of relay 1RO or the front point of contact *b* of relay 1B to terminal *f* of panel 1RP, from terminal *f* of panel 1RP to terminal *r* of panel 2RP, from terminal *r* to terminal *d* of each of panels 2RP through 5RP over a front contact of either the RO or the B relay in each panel, for example front contact *b* of relay 2RO and the front point of contact *b* of relay 2B in panel 2RP, from terminal *d* of panel 5RP to terminal *i* of panel 6RP, over back contact *b* of relay 6B, back contact *b* of relay 6RO, lead 347, the front point of contact *a* of relay 6CR, lead 348, and through the winding of relay 6A to terminal N of the battery. Relay 6A has a stick circuit extending from terminal B of the battery over back contact *e* of relay 6H, lead 349, front contact *a* of relay 6A, and through the winding of the relay to terminal N of the battery.

Relay 6B (FIG. 58) has three pickup circuits. The first extends from terminal B of the battery over front contact *c* of relay ATP in FIG. 33, back contact *c* of relay RI, lead 210, terminal *q* of panel 1RP, and thence over a continuous lead including terminal *h* of panel 1RP, and terminals *p* and *f* of each of panels 2RP through 5RP, terminal *g* of panel 6RP, the front point of contact *f* of relay 6A, through a rectifier 226 included to prevent sneak circuits, and through the winding of relay 6B to terminal N of the battery. Relay 6B has a second pickup circuit extending from terminal B of the battery over front contact *c* of relay 6CR, the back point of contact *d* of relay 6H, lead 350, the back point of contact *f* of relay 6A, and through rectifier 226 and the winding of relay 6B to terminal N of the battery. Relay 6B has a third pickup circuit extending from terminal B of the battery over back contact *a* of relay TRCTD (FIG. 46) to terminal *c* of panel 1RP, lead 329, and thence over a continuous lead including terminals 1 of panel 1RP, and *l* and *j* of panels 2RP through 5RP, to terminal *c* of panel 6RP, and thence over back contact *b* of relay 6CR, the front point of contact *d* of relay 6H, lead 350, the back point of contact *f* of relay 6A, and through rectifier 226 and the winding of relay 6B to terminal N of the battery. Relay 6B has a stick circuit extending from terminal B of the battery over the back point of contact *d* of relay 6RO, front contact *d* of relay 6B, and through the winding of the relay to terminal N of the battery.

Relay 6CR (FIG. 59) has a pickup circuit extending from output terminal *c* of storage unit 6ES over leads 227 and 228, through the winding of relay 6CR, lead 351, and over back contact *a* of relay 6B and lead 352 to ground. Relay 6CR is accordingly picked up whenever a stored voltage appears between ground terminal *d* and output terminal *c* of unit 6ES.

Relay 6H (FIG. 59) has three pickup circuits. The first is a multiple circuit extending from terminal B of the battery over front contact *c* of relay ATP in FIG. 33, front contact *c* of relay RI, lead 208, from terminal *s* to terminal *f* of panel 1RP over alternate paths including front contact *b* of relay 1RO and the front point of contact *b* of relay 1B, respectively, from terminal *f* of panel 1RP to terminal *r* of panel 2RP, and thence from terminal *r* to terminal *d* of each of panels 2RP through 5RP over alternate paths in each unit including a front contact of the RO relay in one path and a front contact of the B relay in the other path, and from terminal *d* of panel 5RP to terminal *i* of panel 6RP, over back contact *b* of relay 6B, back contact *b* of relay 6RO, lead 347, the back point of contact *a* of relay 6CR, lead 353, back contact *b* of relay 6A, lead 354, terminal *b* of unit 6ES, and through the winding of relay 6H to terminal N of the battery. The second pickup circuit extends from terminal B of the battery over front contact *c* of relay 6B, and lead 355 to terminal *b* of storage unit 6ES and through the winding of relay 6H to terminal N of the battery. The third circuit for relay 6H extends from terminal B of the battery over the front point of contact *d* of relay 6RO and thence over lead 355 to terminal *b* of unit 6ES and through the winding of relay 6H to terminal N of the battery.

Storage unit 6ES (FIG. 59) has two input circuits. The first input circuit for storage unit 6ES extends from ground in bias unit 11 in FIG. 18 to terminal *b* of unit 11, lead 296, and thence over front contact *a* of relay ATP, lead 215, and over a continuous lead including terminals *r* and *g* of panel 1RP and terminals *q* and *e* of panels 2RP thorugh 5RP to terminal *h* of panel 6RP, and over the front point of contact *c* of relay 6A and lead 356 to input terminal *a* of unit 6ES and through the unit to ground terminal *d*. The second pickup circuit extends from ground through battery 229, over the back point of contact *c* of relay 6A, and thence over lead 356 to input terminal *a* of unit 6ES and through the unit to grounded terminal *d*. Unit 6ES has an output circuit extending between grounded terminal *d* and output terminal *c* and from output terminal *c* over leads 227 and 230 to front contact *c* of relay 6RO and thence over lead 357 to output terminal *b* of panel 6RP. The output circuit is completed from terminal *b* through translation circuits and utilization devices associated with the group retarders as will hereinafter be described.

Relay TRCTD (FIG. 46) has a pickup circuit network including a multiple path through each of panels 1RP through 6RP. In panel 1RP, three parallel paths are provided to terminal *d* of panel 1RP, the first extending from terminal B of the battery over back contact *f* of relay 1H and lead 358 to terminal *d*, the second extending from terminal B of the battery over front contact *e* of relay 1B and lead 358 to terminal *d*, and the third extending from terminal B of the battery over front contact *e* of relay 1RO and lead 358 to terminal *d* of panel 1RP. Terminal *d* of panel 1RP is connected to terminal *t* of panel 2RP. There are three paths from terminal *t* of panel 2RP to terminal *b* of panel 2RP. These paths include front contact *e* of relay 2RO, front contact *e* of relay 2B, and lead 359, back contact *f* of relay 2H and lead 360. Terminal *b* of panel 2RP is connected to terminal *t* of panel 3RP, and in a similar manner panel 3RP is connected to panel 4RP, panel 4RP is connected to panel 5RP, and terminal *b* of panel 5RP is connected to terminal *k* of panel 6RP. Each of the connections between terminal *t* and terminal *b* in panels 3RP through 5RP has the three paths shown in connection with the similar terminals in panel 2RP. Terminal *k* of panel 6RP is connected to terminal *j* of panel 6RP over leads 361 and 362 in a similar combination of paths, that is, between leads 361 and 362 over a first path including front contact *e* of relay 6RO, a second path including front contact *e* of relay 6B, and a third path including back contact *f* of relay 6H. Terminal *j* of panel 6RP is connected to one side of the winding of relay TRCTD over a continuous lead including terminals *c* and *s* of each of panels 2RP through 5RP and terminal *e* and terminal *b* of panel 1RP. The opposite side of the winding of relay TRCTD is connected to terminal N of the battery as shown. Relay TRCTD is accordingly picked up if, in all of the panels, either the RO or B relay is picked up or the H relay is released.

It will be noted that a group of three leads runs through each of panels 1RP through 6RP. A first lead 231 extends over a path including terminals *p* and *i* of panel 1RP, terminals *o* and *g* of panels 2RP through 5RP, and terminal *f* of panel 6RP. A second lead 232 extends over a path including terminals *o* and *j* of panel 1RP, terminals *n* and *h* of panels 2RP through 5RP, and terminal *e* of panel 6RP. The third lead 233 extends over a path including terminals *n* and *k* of panel 1RP, terminals *m* and *i* of panels 2RP through 5RP, and terminals *d* of panel 6RP. Within each of the panels is included a contact or combination of contacts of the A relay for the panel which energizes leads 231 through 233 in an individual code combination for each panel. In the illustrated embodiment of our invention, since six panels are shown, not all of the energized and deenergized combinations of leads 231, 232 and 233 are required to identify the panels. As illustrated, the panel identifying code chosen is a binary code ranging from binary 1, or 001, to binary 6, or 110, where a 1 indicates an energized line and a 0 indicates a deenergized line in the manner well known in the art. In panel 1RP, as will hereinafter appear, selection of the panel for the storage of a voltage results in the pick up of relay 1A, which energizes lead 233 from terminal B of the battery over its front contact *d* and leaves leads 231 and 232 deenergized to generate the binary code combination 001. Similarly, in panel 2RP front contact *d* of relay 2A connects terminal B of the battery to lead 232 to generate the code sequence 010. Similar contacts of the A relays in panels 3RP through 5RP are used to energize leads 231, 232 and 233 in the respective code sequences 011, 100, and 101, respectively. In panel 6RP, front contacts *d* and *e* of relay 6A energize leads 231 and 232 to generate the identifying sequence 110. The code on leads 231, 232 and 233 will henceforth be called the tangent acceleration code, and the relays for storing this code will include the letters TAC as part of their designation.

Before describing the storage and transfer of the tangent acceleration code and the read-out and cancellation circuitry associated with the group retarders, the operation of the storage equipment described up to this point in storing a measurement of tangent track rolling resistance and generating a code identifying the selected storage panel will be described.

*Operation of the tangent rolling resistance storage and code generating equipment*

Initially, all relays concerned in the operation to be described are released, except for track relay ATR (FIG. 18), which is normally picked up over the track circuit associated with section AT, relay ATCP, which is normally held up over its circuit previously traced and including back contact *b* of relay ATP, and relay TRCTD, which is held up over its previously traced circuit extending from terminal B of the battery over back contacts *f* of each of relays 1H through 6H and through the winding of the relay to terminal N of the battery. Electronic storage units 1ES through 6ES are energized over their first traced input circuits. In panel 1RP, this circuit includes battery 214 and back contact *e* of relay 1A. In panel 2RP, this circuit includes battery 222 and back contact *e* of relay 2A, and identical circuits are provided in panels 3RP through 5RP. In panel 6RP, this circuit includes battery 229 and back contact *c* of relay 6A. A reference voltage, having a magnitude of, for example, 100 volts, is accordingly applied between input terminal *a* and grounded terminal *d* of storage units 1ES through 6ES. However, since relays 1H through 6H are down at this time, for reasons which will hereinafter appear in connection with the detailed description of storage unit 1–2GR1ESU in FIG. 45, no output voltage appears across terminals *c* and *d* of the storage units 1ES through 6ES at this time.

Now, assume that a car rolling down the hump enters track section AT and shunts track relay ATR (FIG. 18), closing its back contact *a* and causing relay ATP (FIG. 33) to pick up over its previously traced pickup circuit. With relay ATP picked up, and with car rolling in section AT in the path of antenna 199 of radar velocity meter 9, the output of radar velocity meter 9 which is differentiated in differentiator 10 and biased in bias unit 11 as previously described, is connected from terminal *b* of bias unit 11 over lead 296, front contact *a* of relay ATP and lead 215 to terminal *r* of panel 1RP and thence through a continuous lead in panels 1RP through 6RP. However, the circuit is interrupted in each of the panels at the open front point of contact *e* of relays 1A through 5A and the open front point of contact *c* of relay 6A.

With relay ATP up, relay RI is now picked up over its previously traced circuit including front contact *b* of relay ATP, and front contact *b* of relay ATCP, and sticks up over its previously traced stick circuit including back contact *c* of relay R1TP and front contact *a* of relay RI. Since relay R1TP is down, when relays ATP and RI are both picked up all the circuits for relay ATCP are interrupted and this relay will release after its time delay, which is adjusted to a small value just sufficient to insure the pick up of relay RI.

With relays ATP and RI picked up, a circuit extends from terminal B of the battery over front contact *c* of relay ATP and front contact *c* of relay RI to lead 208 and terminal *s* of rolling resistance storage unit 1RP. From terminal *s*, a pickup circuit is then completed for relay 1H which extends from terminal *s* over the back point of contact *b* of relay 1B, back contact *c* of relay 1RO, lead 326, the back point of contact *a* of relay 1CR, lead 333, back contact *b* of relay 1A, lead 334, and through the winding of relay 1H to terminal N of the battery.

Relay 1H now picks up and the voltage from battery 214 which is applied to the input circuit of storage unit 1ES is stored, thus causing an output voltage to appear between terminals *c* and *d* of electronic storage unit 1ES.

With relay 1H picked up, relay TRCTD is released due to the opening of its energizing circuit at the open back point of contact *f* of relay 1H.

With a stored voltage applied to terminal *c* of unit 1ES, relay 1CR picks up over its previously traced circuit extending from terminal *c* of unit 1ES, through the winding of relay 1CR, and over back contact *f* of relay 1B to ground. This operation is incorporated in our system in accordance with an invention disclosed and claimed in the above mentioned Falkowski Patent No. 2,958,073 for the purpose of checking the operation of the storage unit.

With relay 1CR picked up to indicate that the storage unit is operating properly, the previously traced circuit for relay 1A, which includes front contact *c* of relay ATP, front contact *c* of relay RI, lead 208, the back point of contact *b* of relay 1B, back contact *c* of relay 1RO, the front point of contact *a* of relay 1CR, and the winding of relay 1A, is completed and relay 1A picks up.

With relay 1A picked up, the three circuits traced for relay 1H are all open, at the open back point of contact *b* of relay 1A, the open front point of contact *d* of relay 1B, and the open front point of contact *d* of relay 1RO. Relay 1H is accordingly released. With relay 1H released, the stored voltage is removed from terminal *c* of unit 1ES and relay 1CR is released. However, relay 1A remains up over its two stick circuits previously traced, which include back contacts *d* of relay 1H and *c* of relay 1B in multiple and front contact *a* of relay 1A.

With relay 1A picked up, the second input circuit for storage unit 1ES is completed from the previously traced energizing circuit for lead 215 from bias unit 11 over lead 296 and contact *a* of relay ATP, and this circuit is now completed from terminal *r* of panel 1RP over the front point of contact *e* of relay 1A and lead 335 to terminal *a* of storage unit 1ES. The measured value of rolling resistance for the cut in section AT is now continuously applied to the input of electronic storage unit 1ES, but no output voltage appears at terminal *c* of unit 1ES because relay 1H is released.

With relay 1H down, relay TRCTD is again picked up over its previously traced energizing circuit including at this time terminal B of the battery, back contact *f* of relay 1H, lead 358, terminal *d* of panel 1RP, from terminal *d* to terminal *t* of panel 2RP, from terminal *t* of panel 2RP to terminal *b* of panel 2RP over back contact *f* of relay 2H, in a similar manner from terminal *t* to terminal *d* of each of panels 3RP through 5RP, from terminal *b* of panel 5RP to terminal *k* of panel 6RP and thence over back contact *f* of relay 6H and through unit 6RP through 1RP to terminal *b* of panel 1RP and through the winding of relay TRCTD to terminal N of the battery.

As the cut approaches the end of section AT, it is assumed that the rolling resistance measurement has become stabilized and can now be made final and stored. Accordingly, as the cut enters section MR1T (FIG. 18), dropping relay R1TR and causing repeater relay R1TP (FIG. 33) to pick up, the holding circuit for relay RI is broken at the open back point of contact *c* of relay R1TP and relay RI is released.

With relay ATP still up, since at this time the cut is shunting both sections AT and MR1T, a circuit is completed from terminal B of the battery over front contact *c* of relay ATP, back contact *c* of relay RI, and lead 210 to terminal *q* of panel 1RP, and thence over the front point of contact *c* of relay 1A and through rectifier 211 and the winding of relay 1B to terminal N of the battery. Relay 1B is accordingly picked up and completes a second holding path through panel 1RP, to hold up relay TRCTD.

With relay 1B picked up, the second pickup circuit for relay 1H is completed from terminal B of the battery over front contact *d* of relay 1B and lead 334 to terminal *b* of unit 1ESE and through the winding of relay 1H to terminal N of the battery.

Relay 1H will now pick up, interrupting the input circuit for storage unit 1ES and transferring the final value of rolling resistance measurement to the storage circuit, to be described, causing an output voltage to appear at terminal *c* of unit 1ES which is proportional to the measured value of $100 - R_{a,b}$ as previously described.

With relays 1B and 1H up, the previously traced stick circuit for relay 1A is interrupted at the open back point of contact *c* of relay 1B and the open back point of contact *d* of relay 1H, and relay 1A accordingly releases.

Although there is a voltage at terminal *c* of unit 1ES, relay 1CR does not pick up because its previously traced circuit is interrupted at the open back point of contact *f* of relay 1B.

Relay TRCTD remains up at this time, since its circuit paths through panels 2RP through 5RP have not been affected by the operations up to this point, and its circuit through panel 1RP is maintained over front contact *e* of relay 1B. Relay 1B remains held up over its stick circuit including the back point of contact *d* of relay 1RO and its own front contact *a*. It may now be assumed that the cut clears track section AT and then clears section MR1T, restoring the apparatus to its initial condition except that relays 1B and 1H are picked up and storage unit 1ES contains a measured value of rolling resistance.

During the interval that relay 1A was picked up, during the preceding cycle of operations, leads 231, 232 and 233 were energized in the code combination 001, identifying panel 1RP, by the connection of terminal B of the battery to lead 233 over front contact *d* of relay 1A. The utilization of this code will be described later.

As will more fully appear from the Robinson Patent No. 3,162,405, above referred to, the storage sequence just described is adapted to be repeated for any number of measurements up to 6, and the storage may be made in any of the six units which happens to be vacant and is the first vacant unit in the series from 1RP to 6RP. As will appear from the above description of panel 1RP, in any available unit each of the RO, A, B, CR and H relays are released. In any unit in which a voltage has been stored, the B and H relays are energized and the RO, 1A, and CR relays are released.

To give an example of the manner in which the circuits of our invention seek the first available storage unit, assume that panels 1RP and 3RP through 6RP are occupied with storages, and hence have their B and H relays picked up, and that panel 2RP is unoccupied and hence has all of its relays released. Now, assume that a train enters section AT, causing a rolling resistance measurement to appear at terminal *b* of bias unit 11 and causing relay ATR to drop and relay ATP to pick up.

When relay ATP picks up, relay RI is picked up over the circuits previously described and lead 208 is energized from terminal B of the battery over front contacts *c* of relays ATP and RI (FIG. 33). Since relay 1B in panel 1RP (FIG. 46) is picked up, lead 208 is connected to terminal *r* of panel 2RP by a circuit extending from terminal *s* of panel 1RP over the front point of contact *b* of relay 1B to terminal *f* of panel 1RP and hence to terminal *r* of panel 2RP. A circuit is now completed from terminal *r* of panel 2RP over back contact *b* of relay 2B, back contact *c* of relay 2RO, lead 337, the back point of contact *a* of relay 2CR, lead 343, back contact *b* of relay 2A, lead 344, and through the winding of relay 2H to terminal N of the battery.

When relay 2H picks up it transfers the value of voltage from battery 222 to the storage circuit within unit 2ES, and if the unit is operating properly, relay 2CR will pick up. With relay 2CR picked up, relay 2A can pick up over a circuit including the front point of contact $a$ of relay 2CR, back contact $c$ of relay 2RO, and back contact $b$ of relay 2B to energized terminal $r$. When relay 2A picks up, the code designation 010 is applied to leads 231, 232 and 233 by energizing lead 232 over front contact $d$ of relay 2A. This code is utilized as later described. At the same time, due to the pickup of relay 2CR, relay 2H is released as previously described. With relay 2A up, the measured value of rolling resistance from terminal $b$ of unit 11 can be applied to terminal $a$ of unit 2ES over the previously traced circuit including front contact $e$ of relay 2A, lead 215, and front contact $a$ of relay ATP. As soon as the cut enters section MR1T, relay RI will release and relay 2B will be picked up over its previously traced circuit including front contact $c$ of relay ATP, back contact $c$ of relay RI, lead 210, and the front point of contact $c$ of relay 2A. With relay 2B up, relay 2H is picked up over its previously traced circuit, completing the storage cycle, and panel 2RP will then be in the same condition as panels 1RP and 3RP through 6RP.

With all of the storage units occupied in the example just given, it is apparent that any attempt to make an additional storage would not affect the circuits of the panels. This results from the fact that the first operation in the storage cycle of a panel is the pick up of the H relay over a back contact of the B relay and a front contact of either the B or the RO relay in each of the preceding panels. Thus, the initial signal for the start of a storage cycle is transferred through each panel, to seek a circuit in the succeeding panel, when either the panel is occupied and its B relay is up or a voltage is being read out of the panel and its RO relay is up, and if all of the panels are occupied the input signal will be open circuited at the open back point of contact $b$ of relay 6B or the open back point of contact $b$ of relay 6RO.

In order to illustrate the operation of the storage panels when it is desired to read a stored voltage out, assume that a voltage is stored in typical panel 2RP and that relays 2B and 2H are picked up, and that relays 2RO, 2A and 2CR are down. The external circuitry for accomplishing the read out operation will be described later; it is sufficient to point out here that the operation of this external circuitry will affect a connection from terminal $k$ of panel 2RP through a suitable utilization device to ground, and that terminal B of the battery will be connected through an external circuit to terminal $a$ of panel 2RP.

With terminal $a$ energized from terminal B of the battery, relay 2RO will pick up, and if another cut happens to be in section AT at this time, it will stick up over its previously traced stick circuit including its own front contact $a$, rectifier 218, lead 208, front contact $c$ of relay RI and front contact $c$ of relay ATP to prevent interference by the additional cut while the read out operation is taking place. With relay 2RO up, the output of storage unit 2ES from terminal $c$ is applied to terminal $k$ over front contact $f$ of relay 2RO.

With relay 2RO up, the stick circuit for relay 2B previously traced is interrupted at the open back point of contact $d$ of relay 2RO. Relay 2B is accordingly released.

Relay 2H is held up at this time over its previously traced third pickup circuit including the front point of contact $d$ of relay 2RO.

When relay 2RO is released as a result of the interruption of the external circuit to terminal $a$, relay 2RO will release and interrupt the circuit for relay 2H, causing it to release. The apparatus of panel 2RP will thus be restored to its initial condition and made available for further storage.

The tangent acceleration code transfer circuits

Figure 11:
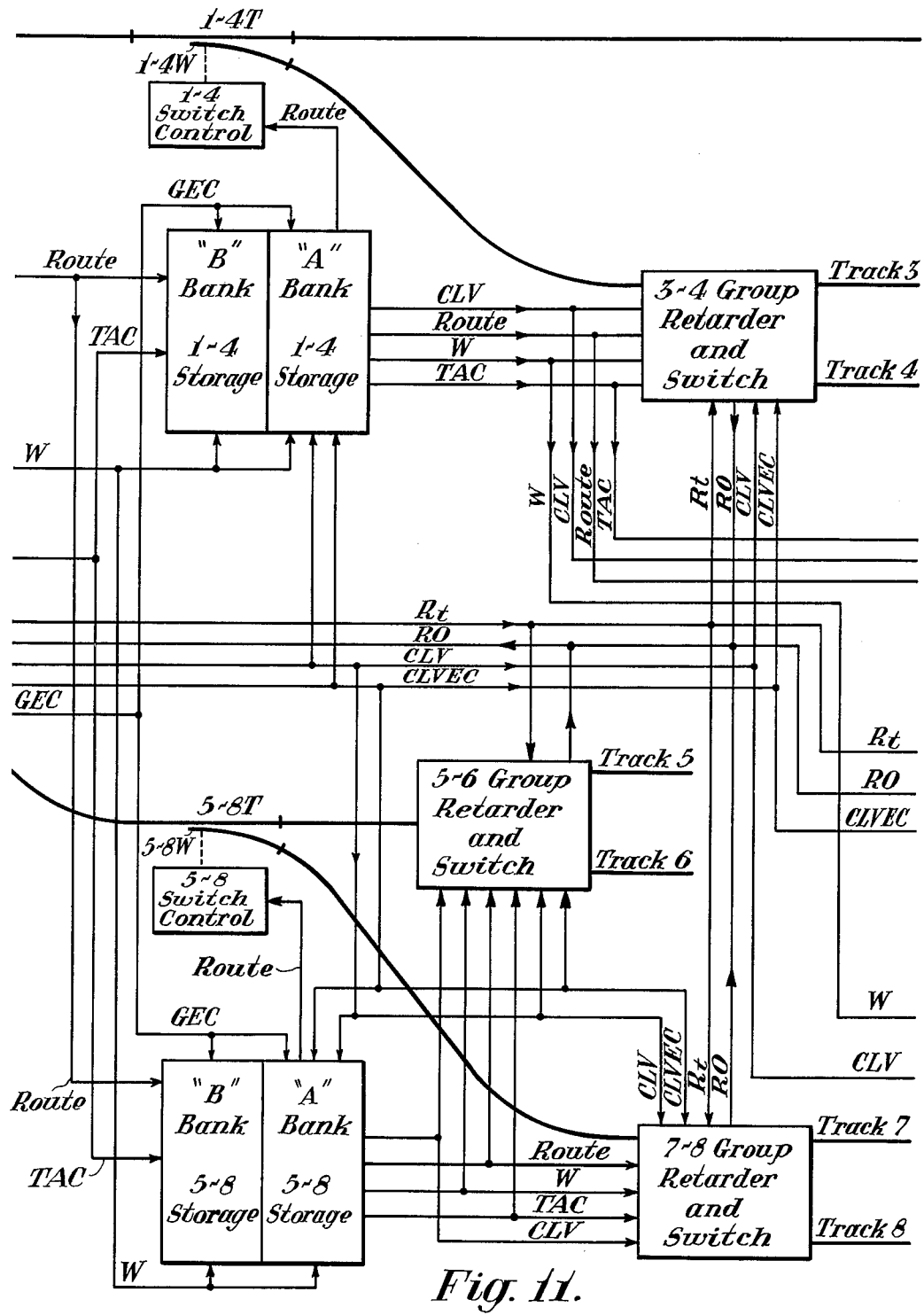
Figure 12:
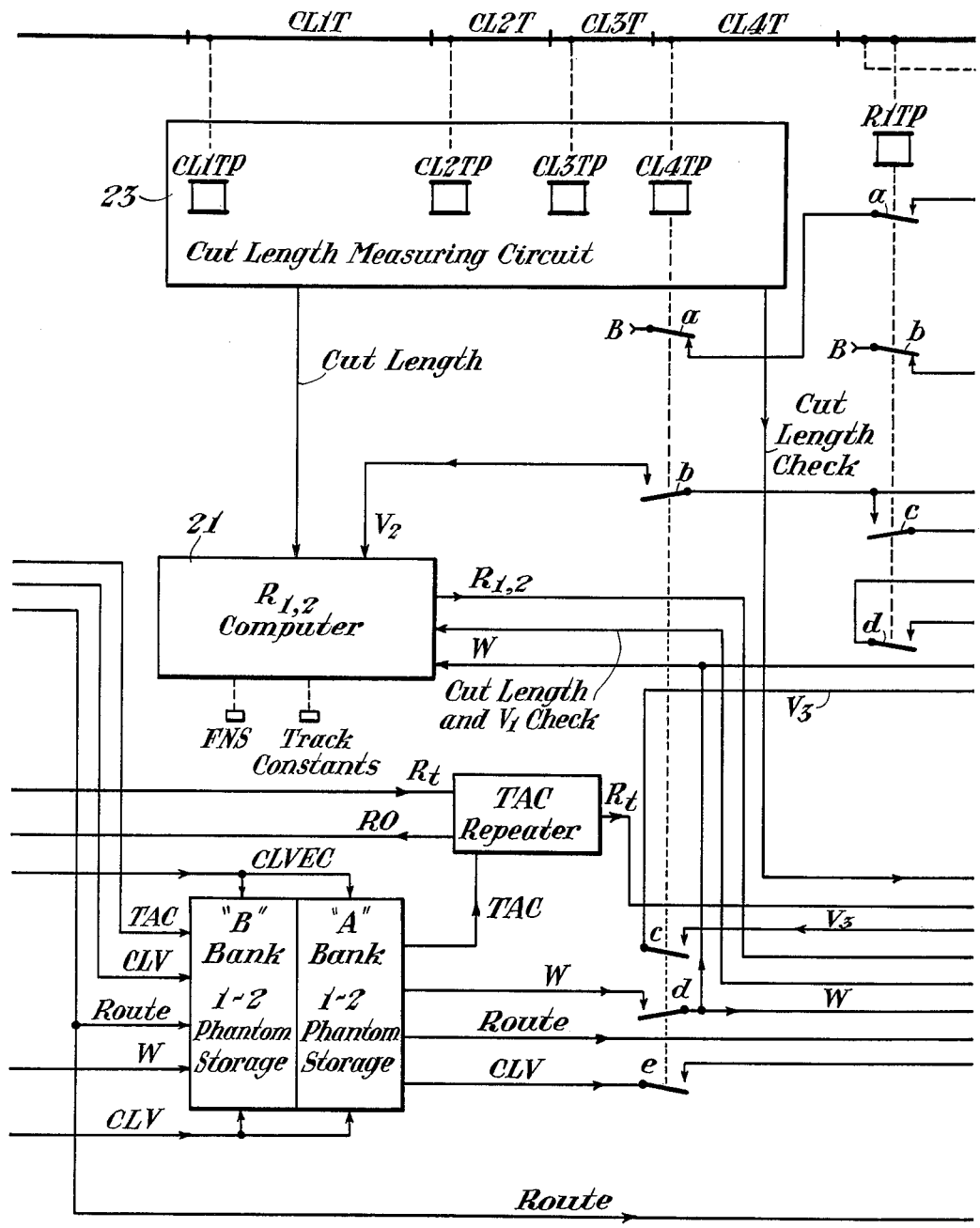

The transfer of the tangent acceleration code generated on lines 231, 232 and 233 in the storage cycle of panels 1RP through 6RP, as described above, will now be described. Referring briefly to FIGS. 7–14, it will be seen that the tangent acceleration code is first transferred to three storage banks 54, 55 and 56 associated with the master retarder, and is then added to the information stored at the second switch location, following the master retarder, which is associated with the route of the cut to which the particular code pertains (FIG. 11). Thereafter, the information is transferred with the route information to the phantom stored location associated with the group retarder in the selected route (FIGS. 11 and 12). The circuits for carrying out this sequential storage and transfer will first be described, and the operation thereof will then be discussed.

Figure 35:
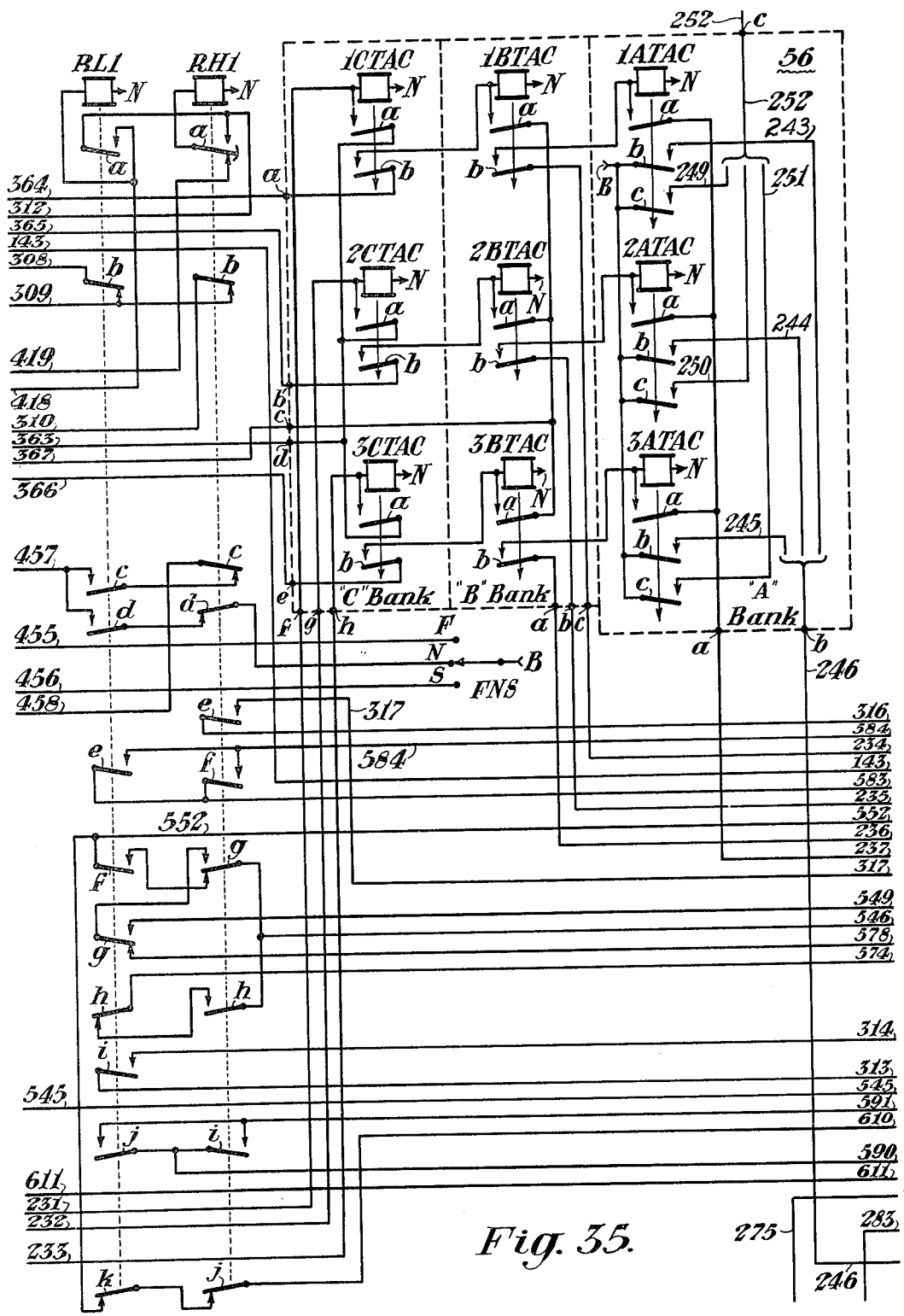

The C bank 54 of the TAC storage unit associated with the master retarder comprises three storage relays 1CTAC, 2CTAC and 3CTAC (FIG. 35). These relays are energized from leads 231, 232 and 233, respectively, in an obvious manner by connecting the respective leads to one terminal of the winding of the respective relays and the other terminals of their windings to terminal N of the battery. Each of these relays is made slightly slow to release to insure that the circuits controlled by the relays will be closed for a sufficient length of time to perform their functions. Storage relays 1CTAC through 3CTAC have stick circuits including a common lead 363 from terminal B of the battery over front contact $d$ of relay ATP (FIG. 33), and individual paths extending from this common lead over front contact $a$ of each of the relays and through the winding of the relay to terminal N of the battery.

The B bank 55 of the TAC storage associated with the master retarder comprises three relays 1BTAC, 2BTAC and 3BTAC (FIG. 35). Each of these relays is made slightly slow to release in order to insure that its transfer circuit is closed for a sufficient time, as will appear. Each of these relays has a similiar pickup circuit extending from terminal B of the battery over a back contact of relay R1TP (FIG. 33) and a front contact of the corresponding storage relay in the C bank previously described. For relay 1BTAC, the pickup circuit includes back contact $b$ of relay R1TP, lead 364, and front contact $b$ of relay 1CTAC. For relay 2BTAC, the pickup circuit includes back contact $e$ of relay R1TP, lead 365, and front contact $b$ of relay 2CTAC. The circuit for relay 3BTAC includes the back point of contact $f$ of relay R1TP, lead 366, and front contact $b$ of relay 3CTAC. Relays 1BTAC, 2BTAC and 3BTAC have similar stick circuits including a common path extending from terminal B of the battery over front contact $f$ of relay R1TP, lead 367, and individual paths over front contact $a$ of each relay and through the winding of the relay to terminal N of the battery.

The A bank 56 of the TAC unit associated with the master retarder comprises three relays 1ATAC, 2ATAC and 3ATAC. Relay 1ATAC has a pickup circuit extending from terminal B of the battery over back contact $e$ of relay GEC (FIG. 36), lead 234, front contact $b$ of relay 1BTAC, and through the winding of relay 1ATAC to terminal N of the battery. Relay 2ATAC has a pickup circuit extending from terminal B of the battery over back contact $f$ of relay GEC, lead 235, front contact $b$ of relay 2BTAC, and through the winding of relay 2ATAC to terminal N of the battery. Relay 3ATAC has a pickup circuit extending from terminal B of the battery over back contact $g$ of relay GEC, lead 236, front contact $b$ of relay 3BTAC, and through the winding of relay 3ATAC to terminal N of the battery. Relays 1ATAC through 3ATAC have similar stick circuits including a common path extending from terminal B of the battery over front contact *e* of relay R2TP (FIG. 36) to lead 237, and thence over the respective front contacts *a* and through the windings of the relays to terminal N of the battery.

As was noted in connection with FIGS. 7 through 14, the information from the A bank of the storage unit associated with the master retarder is transferred either to the B bank of the 1–4 storage location or the B bank of the 5–8 storage location according as switch 1–8 is set to its normal or to its reverse position. In order to explain the circuits for carrying out this function, reference should first be made to the B bank of the 1–4 storage location as shown in FIGS. 25 and 40.

Relays 1–4BT and 1–4BD in the 1–4 storage location, and their associated control circuits, have been described above in connection with the automatic switching function. The TAC storage relays in this bank are relays B1TAC, B2TAC and B3TAC. An additional control relay 1–4BGL is also provided to prevent modification of the weight information after section MR1T is clear, as will hereinafter appear.

It should be noted in FIG. 24 that, while all of the circuits in the B bank of the 5–8 storage unit are not shown, they are identical with the circuits for the B bank of the 1–4 storage location and the corresponding terminals *a* through *l* are connected to corresponding circuit within the units. The additional terminal *m* on unit 5–8 is obviously not necessary in the 1–4 unit since the corresponding circuit in the 1–4 unit is terminated therewithin, as will be readily apparent from a comparison of FIGS. 24 and 25. Otherwise, the circuits are identical and only the circuits for the 1–4 unit will be described.

Control relay 1–4BGL has a multiple pickup circuit extending from terminal B of the battery in FIG. 36 over front contact *d* of relay GEC, previously described, lead 238, lead 370 (FIG. 39), terminal *i* of the B bank of the 1–4 storage unit (FIG. 40), over alternate paths including front contact *c* of relay B1TAC in one path, front contact *c* of relay B2TAC in a second path, and front contact *c* of relay B3TAC in a third path, to a common lead 239, and over another pair of alternate paths, the first including front contact *c* of relay BHP and the second including front contact *c* of relay BLP, to lead 240, and from lead 240 over the back point of make-before-break contact *a* of relay 1–4BGL, through the winding of relay 1–4BGL, and over common lead 241 and front contact *e* of relay 1–4BD to terminal N of the battery. Relay 1–4BGL is accordingly picked up if end of cut relay GEC is picked up, one of relays B1TAC through B3TAC is picked up, and if one of relays BLP and BHP, to be described, is picked up. Relay 1–4BGL has a stick circuit which extends from terminal B of the battery over bus 242, front contact *a* of relay 1–4BGL, through the winding of relay 1–4BGL, and over common lead 241 and front contact *e* of relay 1–4BD to terminal N of the battery.

Relays B1TAC, B2TAC and B3TAC have similar pickup circuits extending from terminal B of the battery in FIG. 35 over front contacts *b* of relays 1ATAC, 2ATAC, and 3ATAC, leads 243, 244, and 245, which are carried as a cable 246 to FIG. 39, then again over leads 243, 244 and 245 to terminals *g*, *h* and *j*, respectively, of the 1–4B bank, over back contacts *b*, *d*, and *e*, respectively, of relay 1–4BGL, over the respective back points of make-before-break contacts *a* of relays B1TAC through B3TAC, respectively, through the winding of these relays to common lead 241, and from lead 241 over front contact *e* of relay 1–4BD to terminal N of the battery. Each of relays B1TAC through B3TAC has a similar stick circuit extending from terminal B of the battery over common bus 242, the front point of contact *a* of each of the relays, through the winding of the relays, and over common lead 241 and front contact *e* of relay 1–4BD to terminal N of the battery.

The transfer circuits for the B bank of the 5–8 storage unit are the same as those shown for the B bank of the 1–4 storage location, and they will therefore be discussed only generally. The end of cut indication from relay GEC which is applied to terminal *i* of the 1–4B bank is similarly applied to terminal *i* of the 5–8B bank over a circuit extending from terminal B of the battery over front contact *d* of relay GEC (FIG. 36), lead 238, lead 247 (FIG. 39), cable 248 and the continuation of lead 247 to terminal *i* of the B bank of the 5–8 storage unit. The transfer lines for energizing terminals *g*, *h* and *j* of the B bank of the 1–4 unit to supply relays B1TAC through B3TAC correspond to similar circuits, referring first to FIG. 35, which extend from terminal B of the battery over front contacts *c* of relays 1ATAC, 2ATAC, and 3ATAC, leads 249, 250 and 251, respectively, through cable 252, to FIG. 24, and over the extension of leads 249, 250 and 251 to terminals *g*, *h* and *j* of the B bank of the 5–8 storage unit.

The A bank of the 1–4 storage unit comprises three TAC storage relays A1TAC, A2TAC and A3TAC (FIG. 40). The additional relay 1–4AGL in the A bank does not affect the TAC storage, and will be described later in connection with the weight storage and transfer apparatus.

Relays A1TAC through A3TAC have similar pickup circuits extending from terminal B of the battery over front contact *f* of relay 1–4AT (FIG. 25), previously described, a common bus 253, over front contacts *b* of each of the respective relays B1TAC through B3TAC, over the back point of make-before-break contact *a* of the respective relays A1TAC through A3TAC, through the windings of the respective relays, and over common lead 291 and front contact *f* of relay 1–4AD to terminal N of the battery. Relays A1TAC through A3TAC have similar stick circuits extending from terminal B of the battery over battery bus 290, over the respective front points of contacts *a* of relays A1TAC through A3TAC, and through the winding of the respective relays to common lead 291 and thence over front contact *f* of relay 1–4AD to terminal N of the battery.

The TAC information stored in the A bank of the 1–4 storage unit is transferred to either the 1–2 phantom location or the 3–4 phantom location according as switch 1–4W is set to its normal or to its reverse position. Similarly, the TAC information stored in the A bank of the 5–8 location is transferred either to the 5–6 phantom location or to the 7–8 phantom location according as switch 5–8W is set to its normal or to its reverse position. Since this latter transfer is identical with the transfer from the 1–4 storage location, only the transfer from the 1–4 storage location will be described, the transfer from the 5–8 location being indicated schematically by the dotted line 256 connecting the A bank of the 5–8 storage unit to the apparatus for tracks 5 and 6 and 7 and 8 shown in block form.

Referring again to the A bank of the 1–4 storage unit (FIG. 40), the TAC storage output circuits include a common portion extending from terminal B of the battery over bus 257 and individual circuit paths for each of the relays A1TAC through A3TAC extending over their respective front contacts *b* to terminals *r*, *q* and *k*, respectively. Terminals *r*, *q*, and *k* are therefore energized or not energized according to the energized or deenergized condition of the respective relays A1TAC and A3TAC.

Terminals *r*, *q* and *k* are connected over parallel paths to terminals *f*, *g* and *h* of the B banks of the 1–2 phantom location and the 3–4 phantom location. The circuit from terminal *r* extends over leads 258, 259 and cable 260 to the B bank of the 3–4 phantom location, and extends over leads 258 and 261 to terminal *f* of the B bank of the 1–4 phantom location. A circuit from terminal *q* extends over leads 262 and 263 to cable 260 and thence to the B bank of the 3–4 phantom location, and over leads 262 and 264 to terminal *g* of the B bank of the 1–4 location. A circuit from terminal *k* extends over leads 265 and 266 and cable 260 to the B bank of the 3–4 phantom location, and over leads 265 and 267 to terminal h of the B bank of the 1–4 location.

Relays 1–2GRBT and 1–2GRBD in the B bank of the 1–2 phantom location (FIG. 42) have been previously described in connection with the automatic switching equipment. Also located in the B bank of this storage unit are three TAC storage relays B1TAC, B2TAC and B3TAC.

It will be recalled from the description of the automatic switching equipment that relay 1–2GRBT and 1–2GRBD are energized if switch 1–4W is set to its normal position upon the occupancy of detector section 1–4T, while relays 3–4GRBT and 3–4GRBD are energized if switch 1–4W is set to its reverse position. Therefore, although the code indications from relays A1TAC through A3TAC are applied simultaneously to terminals f, g and h of the 1–2 and 3–4 phantom locations, only the T and D relays of the selected storage bank are picked up at this time. Advantage is taken of this fact to route the TAC code to its proper location, as will appear.

Relays B1TAC through B3TAC in the B bank of the 1–2 phantom location (FIG. 42) have similar pickup circuits, including front contacts of relays A1TAC through A3TAC in the A bank of the 1–4 storage location and terminals f, g and h, respectively, of the B bank of the 1–2 phantom location, as previously described. The pickup circuit for relay B1TAC (FIG. 42) further includes front contact f of relay 1–2GRBT, the winding of the relay, and front contact e of relay 1–2GRBD which is connected to terminal N of the battery. Similarly, the circuits for relays B2TAC and B3TAC are continued from their respective terminals g and h, over front contacts g and h, respectively, of relay 1–2GRBT, through the windings of the relays, and over front contact e of relay 1–2GRBD to terminal N of the battery. Relays B1TAC through B3TAC have similar stick circuits, extending from terminal B of the battery over front contact a of each relay, through the winding of the relay, and over front contact e of relay 1–2GRBD to terminal N of the battery.

Relays 1–2GRAT, 1–2GRAD and 1–2GRAL in the A bank of the 1–2 phantom location (FIG. 43) have previously been described in connection with the automatic switching equipment. The A bank also includes three TAC storage relays A1TAC through A3TAC. These relays have common pickup circuits extending from terminal B of the battery over front contact e of relay 1–2GRAT (FIG. 43), lead 268, lead 269 (FIG. 42), over front contacts b of relays B1TAC through B3TAC and leads 372, 373 and 374, respectively, and through the windings of the respective relays A1TAC through A3TAC (FIG. 43) to a common circuit extending over front contact e of relay 1–2GRAD to terminal N of the battery. Relays A1TAC through A3TAC have similar stick circuits extending from terminal B of the battery over front contacts a of the respective relays, through the windings of the relays, and over front contact e of relay 1–2GRAD to terminal N of the battery.

*The storage interrogation and cancellation circuits*

Associated with each of the group retarder locations is a group of repeater relays for the tangent acceleration code which respond to this code by selecting the storage panel from the group 1RP through 6RP in which the tangent track rolling resistance for a particular cut is located, supplying the indication in that panel to the computer associated with the group retarder, to be described, and cancelling the storage from the selected panel to make the panel available for further storage. Since this equipment is identical for each of the group retarders, only that associated with group retarder 1–2GR will be described in detail.

Figure 44:
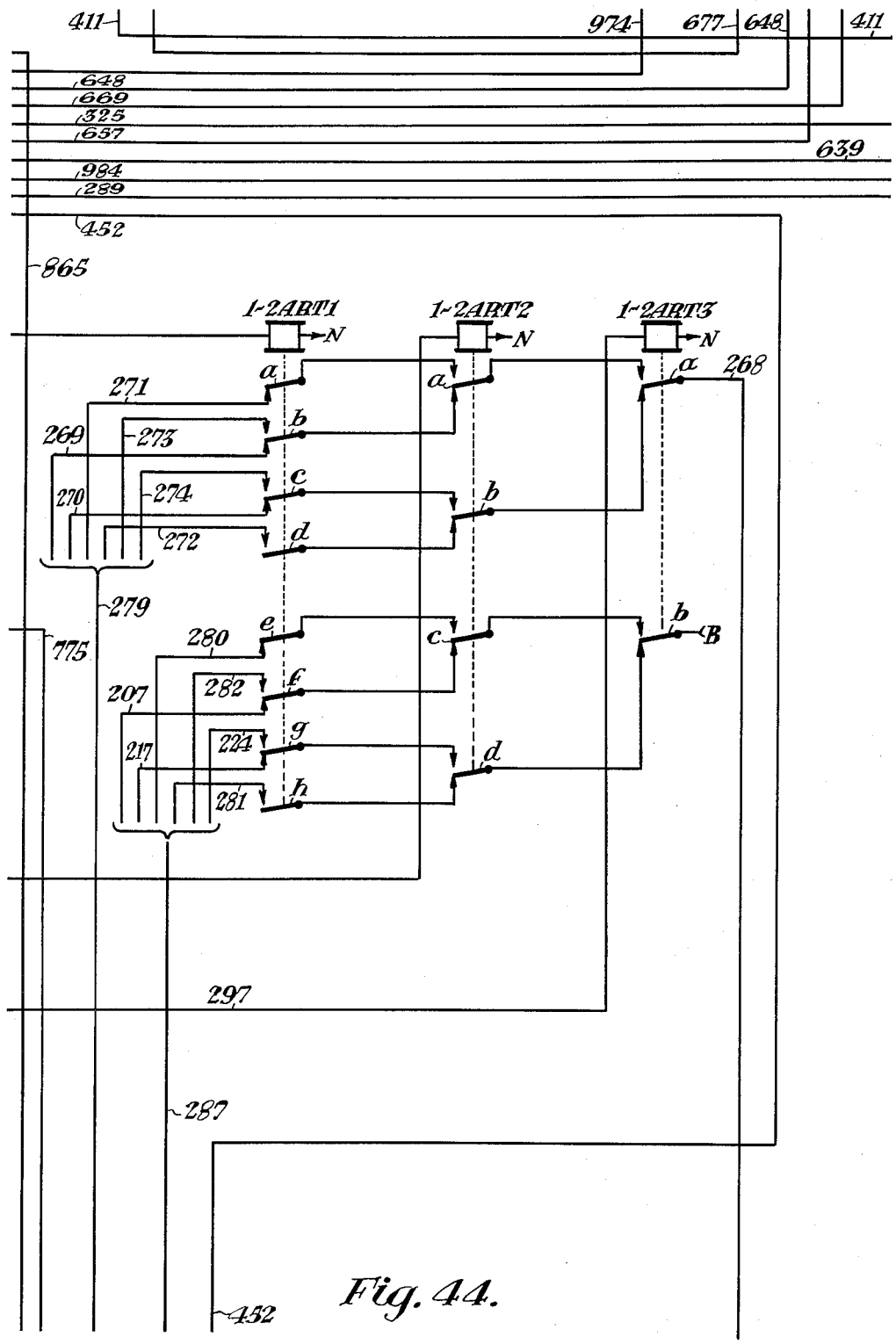

As shown in FIG. 44, three code repeater relays, 1–2ART1, 1–2ART2 and 1–2ART3 are associated with group retarder 1–2GR and phantom storage location 1–2. These relays have similar pickup circuits extending from terminal B of the battery over front contacts b of relays A1TAC, A2TAC and A3TAC, respectively, and through the windings of the relays to terminal N of the battery. Accordingly, relays 1–2ART1 through 1–2ART3 are direct front contact repeaters of relays A1TAC through A3TAC.

Figure 13:
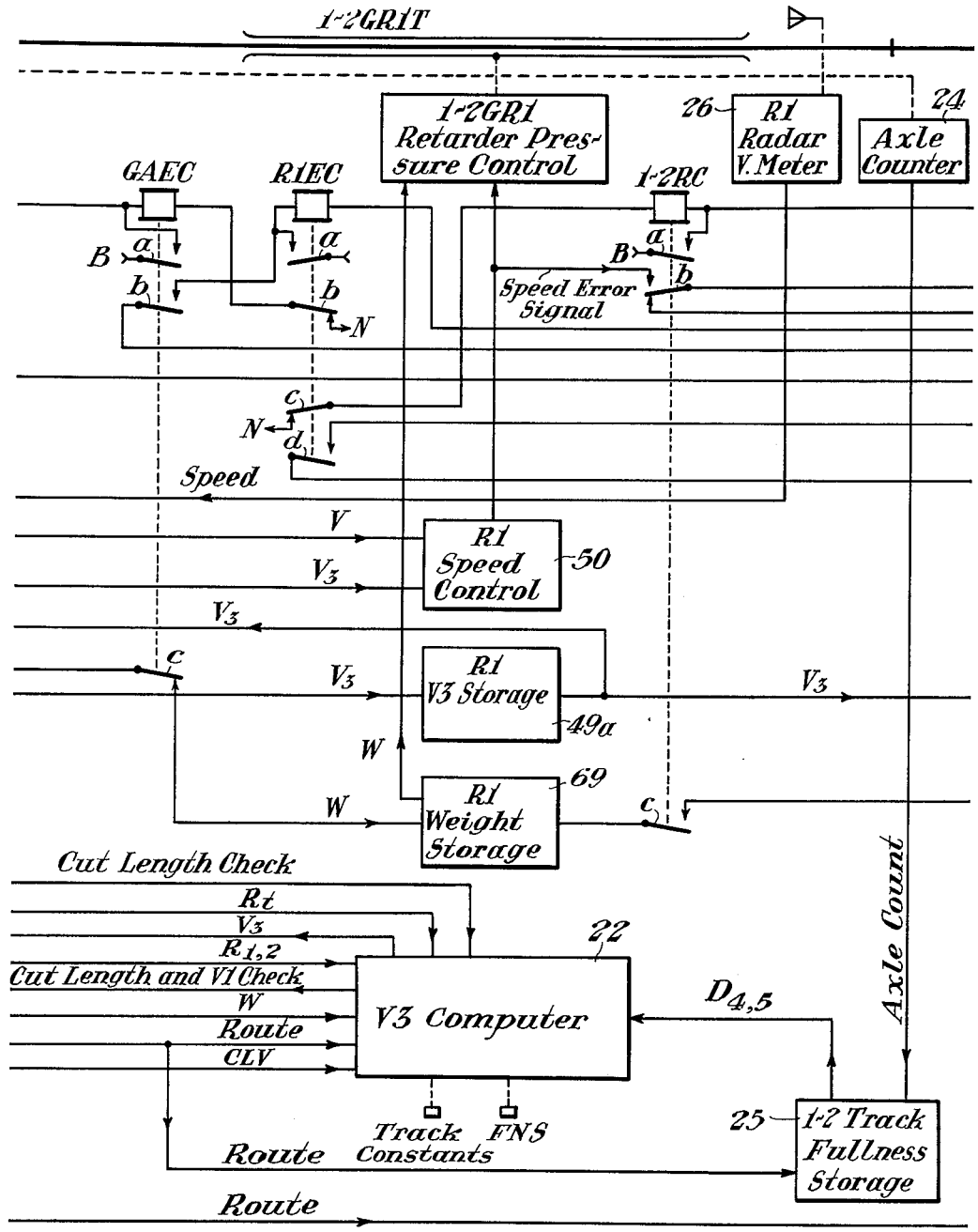

Relays 1–2ART1 through 1–2ART3 control a first group of circuits for connecting the output of the selected one of panels 1RP through 6RP to a utilization device, consisting in the disclosed embodiment of computer 22 in FIG. 13, which comprises apparatus shown in more detail in FIGS. 53, 54, 55, 64, 65 and 66. The input lead to this equipment is lead 268 from contact a of relay 1–2ART3 in FIG. 44.

Figure 39:
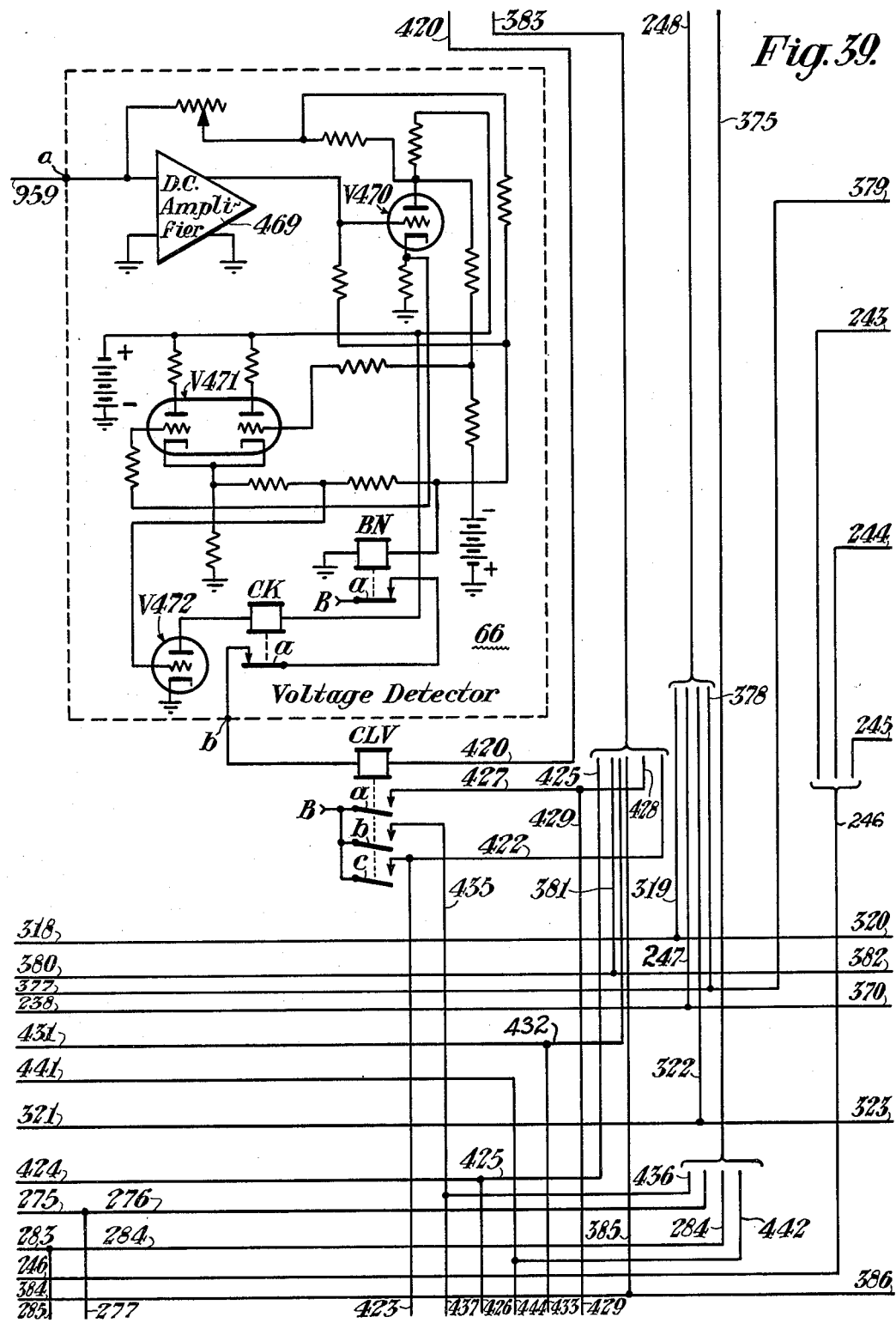
Figure 47:
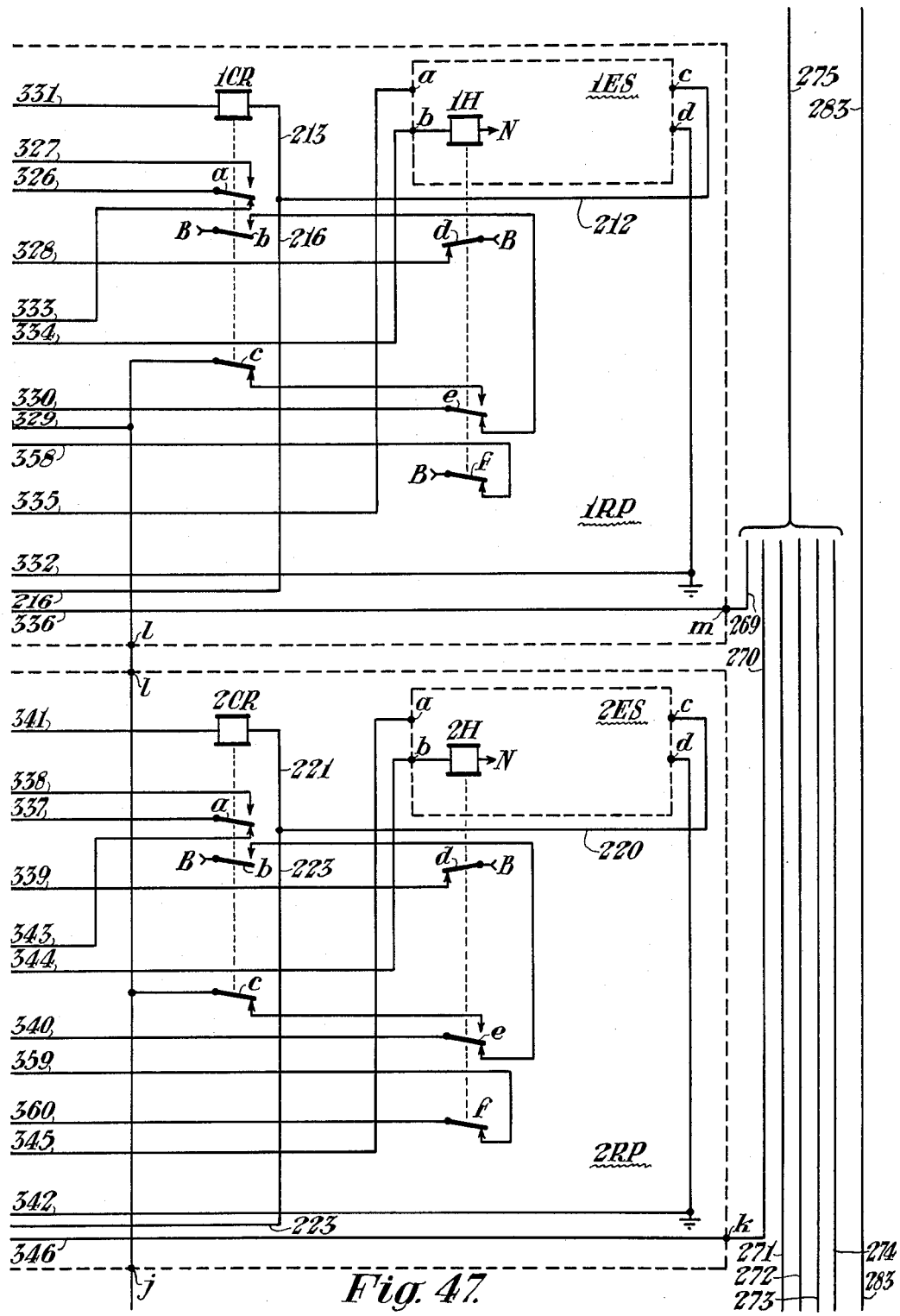
Figure 48:
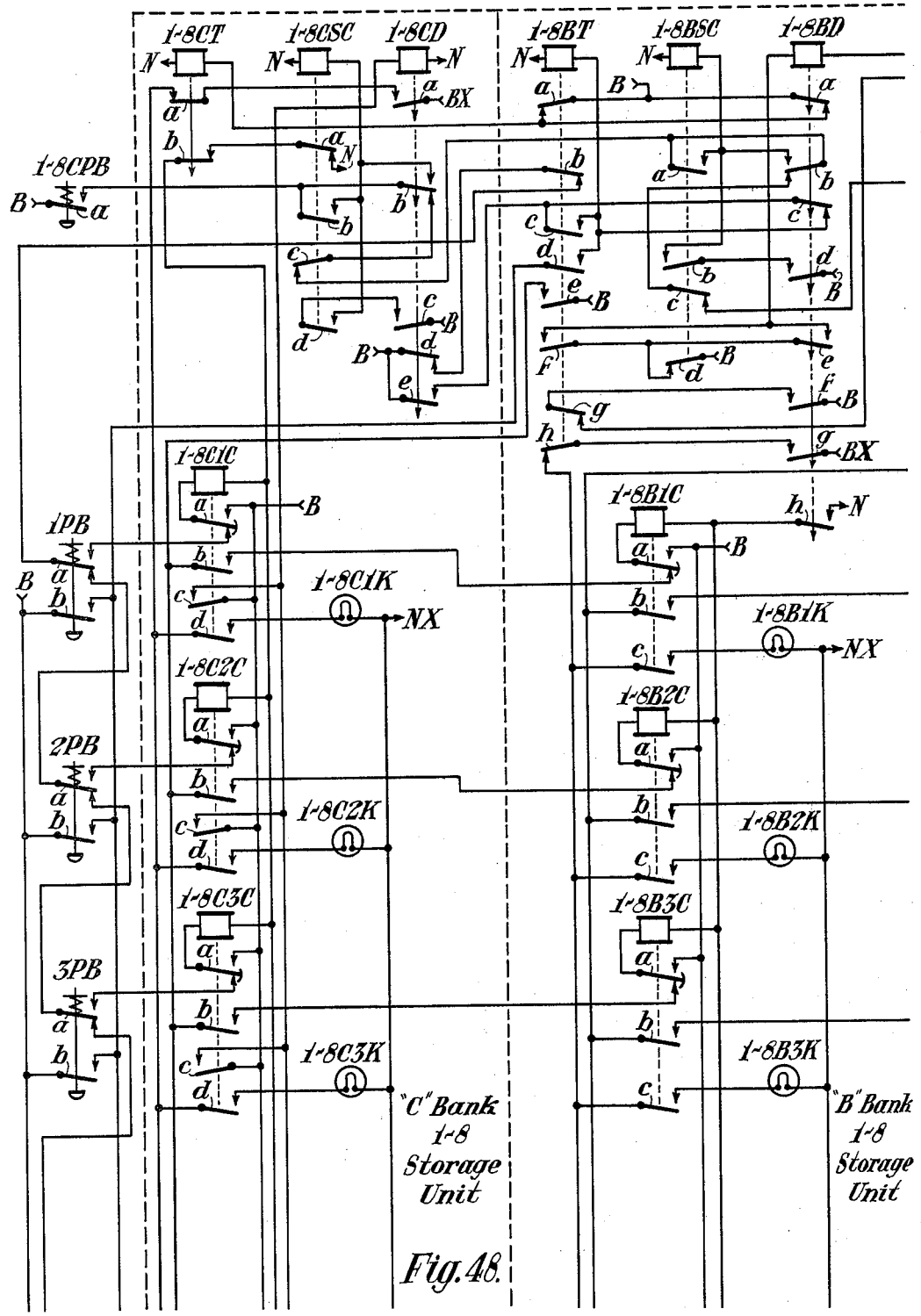
Figure 59:
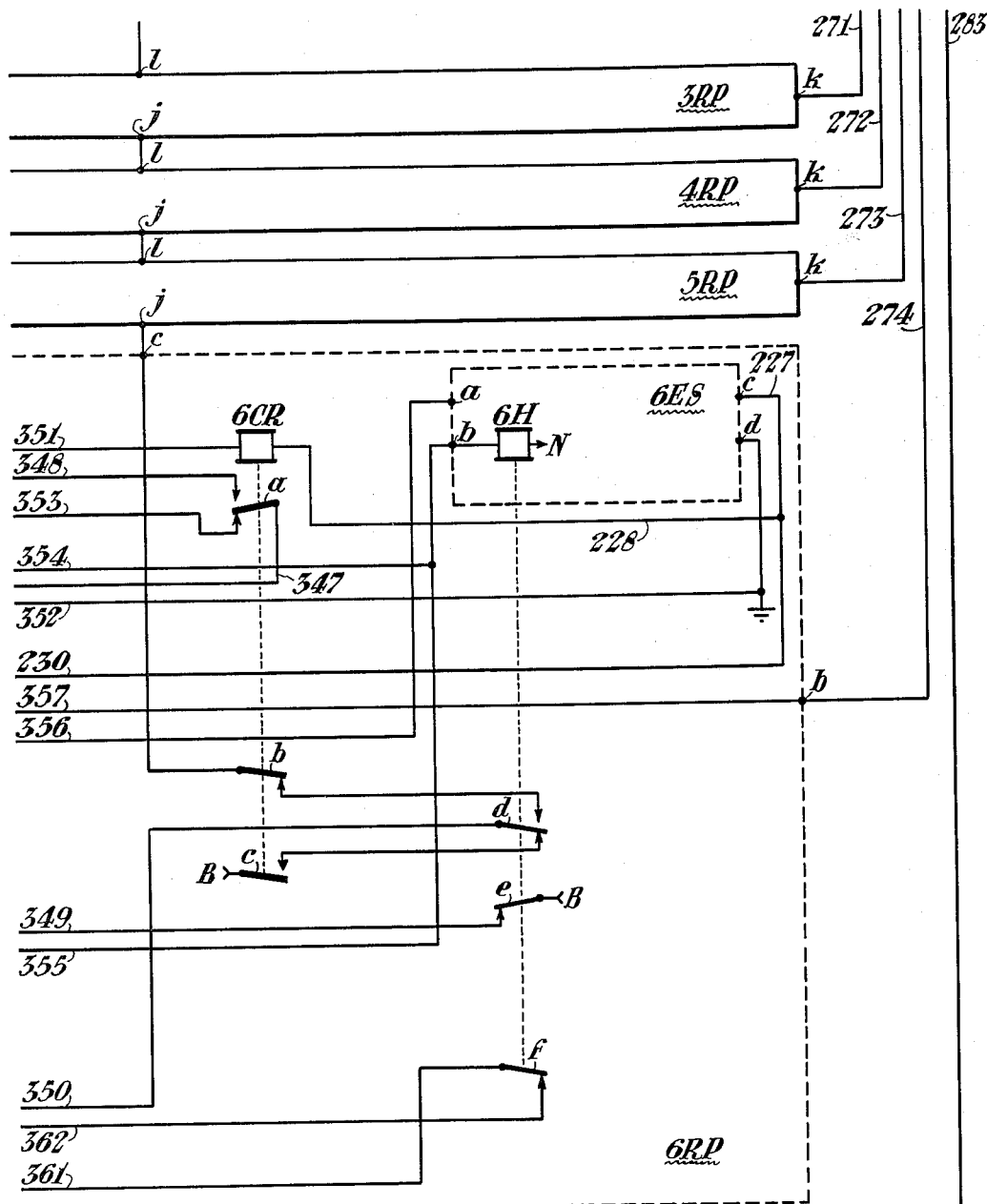
Figure 60:
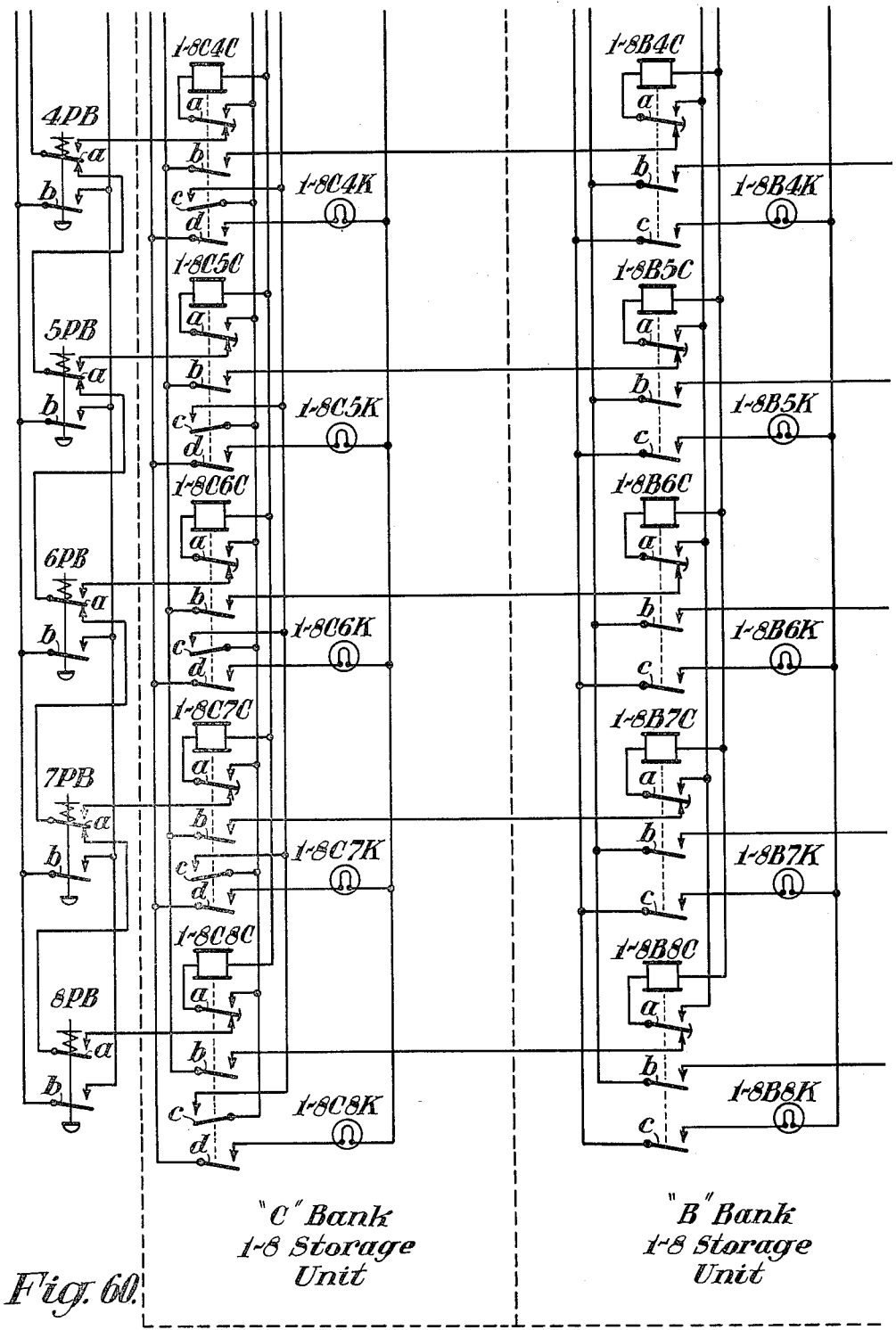
Figure 61:
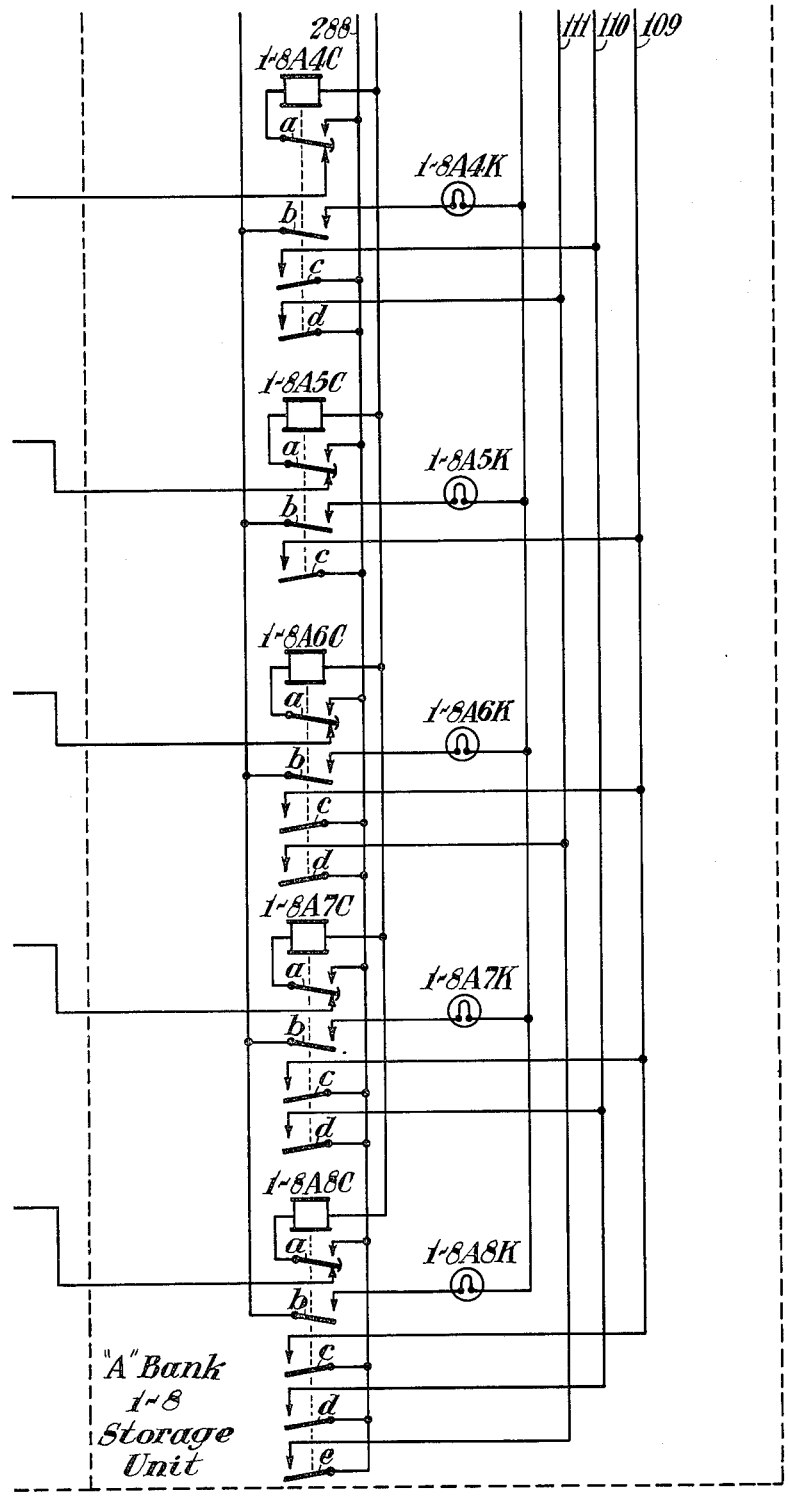

Referring now to FIGS. 47 and 59, the output leads from terminals m of panel 1RP, k of panels 2RP through 5RP, and b of panel 6RP are supplied to respective leads 269, 270, 271, 272, 273 and 274 which are carried to FIG. 39 by means of a cable 275, where the cable branches into two cables 276 and 277 which carry parallel extensions of the same six leads. Cable 276 runs through cable 375 to group retarders 5–6GR and 7–8GR in FIG. 24. Cable 277 extends to FIG. 52 where the cable branches again to two parts 278 and 279 which carry the same six leads. Cable 278 runs through cable 376 to the 3–4 group retarder in FIG. 26. Cable 279 extends to FIG. 44, where the original leads are again brought out at 269, 270, 271, 272, 273 and 274. Lead 269 from terminal m of panel 1RP is connected to computer input lead 268 over back contact b or relays 1–2ART1, back contact a of relay 1–2ART2 and front contact a of relay 1–2ART3, which, it will be recalled, corresponds to the code combination 001 which is assigned to panel 1RP. Similarly, lead 270 from panel 2RP is connected to lead 268 in the code combination 010 over back contact c of relay 1–2ART1, front contact b of relay 1–2ART2, and back contact a of relay 1–2ART3. Lead 271 from panel 3RP is connected to lead 268 in the code combination 011 over back contact a of relay 1–2ART1, front contact a of relay 1–2ART2 and front contact a of relay 1–2ART3. Lead 272 from panel 4RP is connected to output lead 268 in the code combination 100 over front contact d of relay 1–2ART1, back contact b of relay 1–2ART2 and back contact a of relay 1–2ART3. Lead 273 from panel 5RP is connected to lead 268 in the code combination 101 over front contact b of relay 1–2ART1, back contact a of relay 1–2ART2 and front contact a of relay 1–2ART3. Lead 274 from panel 6RP is connected to lead 268 in the code combination 110 over from contact c of relay 1–2ART1, front contact b of relay 1–2ART2 and back contact a of relay 1–2ART3.

Figure 46:
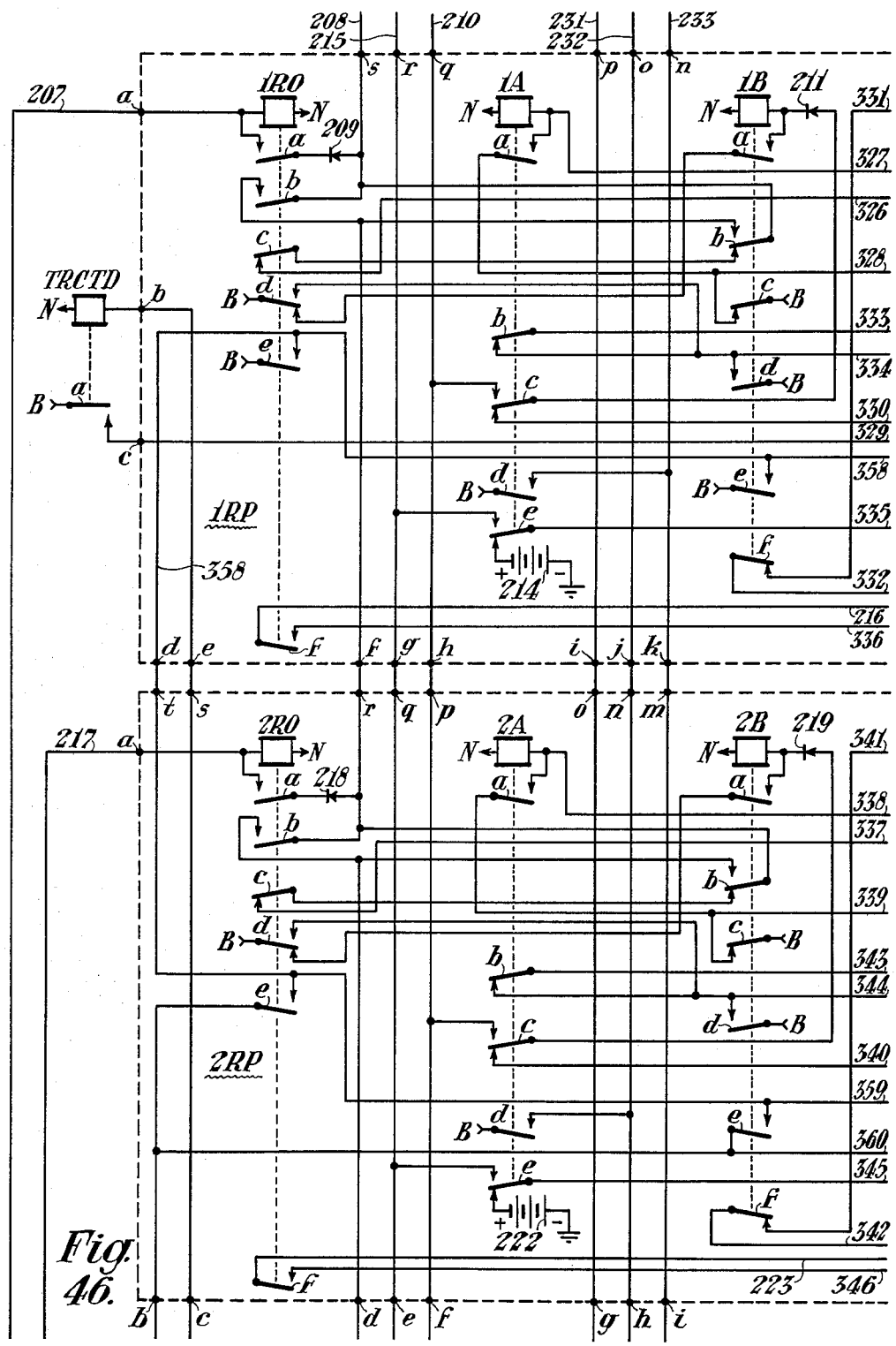
Figure 58:
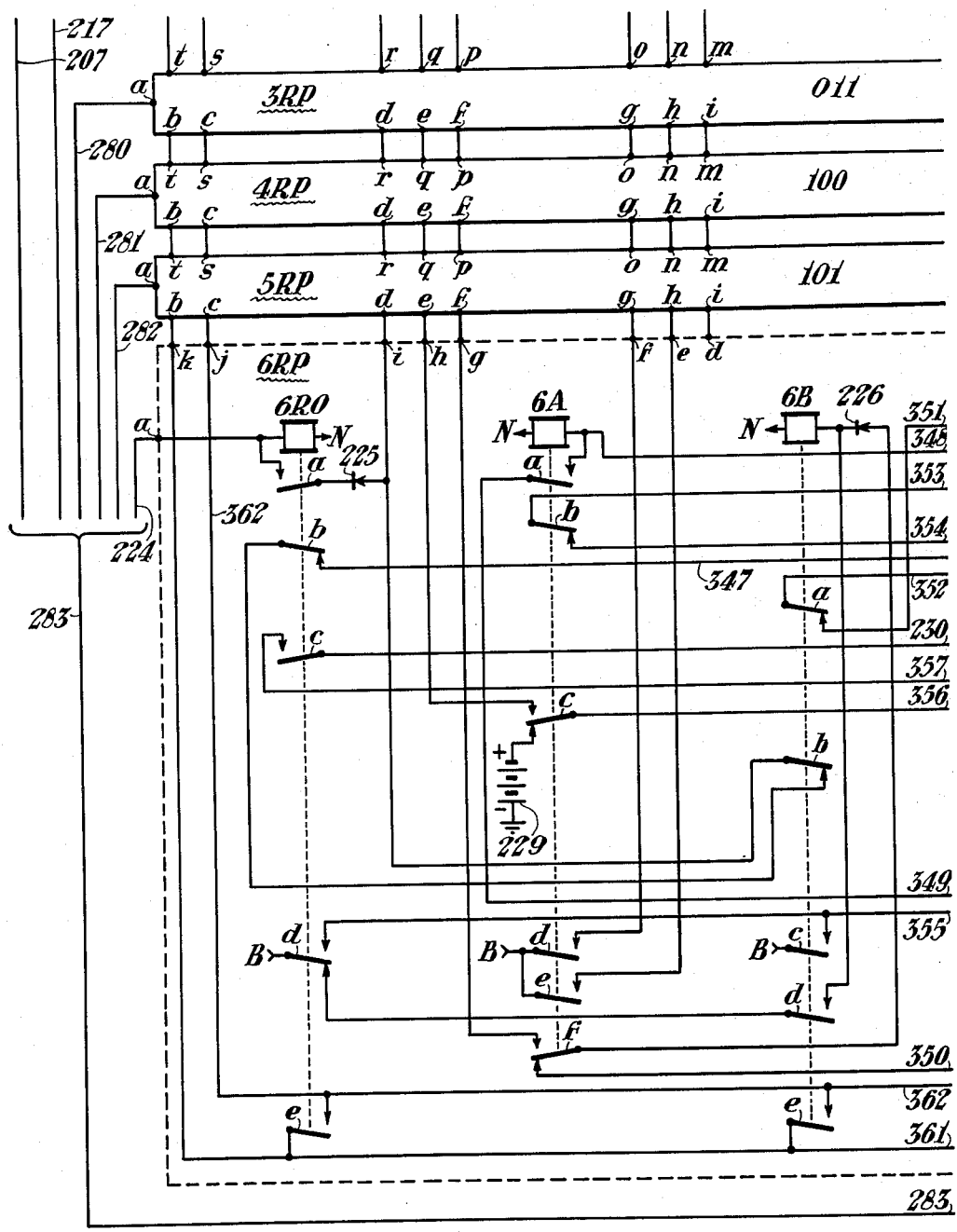

Relays 1–2ART1 through 1–2ART3 control a second group of circuits for connecting terminal B of the battery to readout terminals a of panels 1RP through 6RP. Referring now to FIGS. 46 and 58, terminals a of panels 1RP through 6RP are connected to leads 207, 217, 280, 281, 282, and 224, respectively, and thence over cable 283 to FIG. 39, where the cable is branched to carry the six leads over cables 284 and 285. Cable 284 is carried through cable 375 (FIG. 39) to group retarders 5–6GR and 7–8GR (FIG. 24). Cable 285 extends to FIG. 52 where the cable branches again to carry parallel extensions of the same six leads over cables 286 and 287. Cable 286 is carried through cable 376 (FIG. 52) to group retarder 3–4GR (FIG. 26). Cable 287 extends to FIG. 44 where the original leads 207, 217, 280, 281, 282 and 224 are produced. These leads are connected to terminal B of the battery over relays 1–2ART1 through 1–2ART3 in the same code combinations as the output leads previously described. Thus, lead 207 is connected to terminal B of the battery over back contact f of relay 1–2ART1, back contact c of relay 1–2ART2 and front contact b of relay 1–2ART3. Lead 217 from panel 2RP is connected to terminal B of the battery over back contact *g* of relay 1–2ART1, front contact *d* of relay 1–2ART2 and back contact *b* of relay 1–2ART3. Lead 280 from panel 3RP is connected to terminal B of the battery over back contact *e* of relay 1–2ART1, front contact *c* of relay 1–2ART2 and front contact *b* of relay 1–2ART3. Lead 281 from panel 4RP is connected to terminal B of the battery over front contact *h* of relay 1–2ART1, back contact *d* of relay 1–2ART2, and back contact *b* of relay 1–2ART3. Lead 282 from panel 5RP is connected to terminal B of the battery over front contact *f* of relay 1–2ART1, back contact *c* of relay 1–2ART2, and front contact *b* of relay 1–2ART3. Lead 224 from panel 6RP is connected to terminal B of the battery over front contact *g* of relay 1–2ART1, front contact *d* of relay 1–2ART2, and back contact *b* of relay 1–2ART3.

*The operation of the rolling resistance storage and transfer equipment*

For the purpose of describing the operation of the rolling resistance storage equipment, it will be assumed that all of the apparatus is in its normal condition as shown in the drawings and that a car routed to track 2T passes through the yard.

As the car descends the hump and occupies track section AT (FIG. 18), relay ATR is released and relay ATP is picked up over its previously traced circuit including back contact *a* of relay ATR and lead 293 (FIGS. 18 and 33). At the same time, the speed of the car is measured by radar velocity meter 9 in response to reflected energy received by antenna 199. The velocity signal appearing at output terminal *a* of velocity meter 9 is applied to input terminal *a* of differentiator 10. An output signal proportional to the acceleration of the car now appears at terminal *b* of differentiator 10 and is applied to input terminal *a* of bias unit 11. As previously explained, the output signal appearing at terminal *b* of bias unit 11 is proportional to (100−$R_{a,b}$). This signal is stored in unit 1ES in the manner previously described.

As previously described, with relay ATP up, relay RI is picked up and held up over back contact *c* of relay R1TP. Relay 1H is then energized, storing the test value of voltage from battery 214 in unit 1ES. In normal operation relay 1CR picks up and causes relay 1H to release. Relay 1A is then picked up. At the time that relay 1A is picked up, a tangent acceleration code (TAC) is applied to leads 231, 232 and 233 by connecting terminal B of the battery over front contact *d* of relay 1A to lead 233, leaving leads 231 and 232 deenergized, thus generating the code 001 to designate that the information is stored in the first panel. This information is stored in bank 54 of the master retarder storage location in relays 1CTAC, 2CTAC and 3CTAC (FIG. 35). With lead 233 energized, relay 3CTAC is picked up and is then held up over front contact *d* of relay ATP, front contact *a* of relay 3CTAC, and through the winding of the relay to terminal N of the battery.

Terminal *r* of panel 1RP is energized with the rolling resistance signal to be stored as previously described. This signal is now supplied to storage unit 1ES over the front point of contact *d* of relay 1A.

When the cut enters section MR1T in FIG. 18, relay R1TR is released and relay R1TP is picked up. The stick circuit for relay RI is then interrupted at the open back point of contact *c* of relay R1TP and relay RI is released. Relay 1B is then picked up as previously described, and is held up over the back point of contact *d* of relay 1RO and its own front contact *a*.

With relay 1B up, relay 1H is picked up as previously described. The stick circuit for relay 1A is then interrupted at the open back points of contacts *c* of relay 1B and *d* of relay 1H. Relay 1A is accordingly released.

When track section AT is vacated, relay ATR is again picked up and relay ATP is released. Relay ATCP is picked up over back contact *b* of relay ATP. This portion of the apparatus is then in condition to accept a subsequent measurement.

When section MR1T is vacated, picking up relay R1TR and causing relay R1TP to release, the tangent acceleration code stored in relays 1CTAC through 3CTAC is transferred to the B group of relays 1BTAC through 3BTAC (FIG. 35). Since relay 3CTAC is picked up, relay 3BTAC is picked up over a circuit extending from terminal B of the battery over back contact *f* of relay R1TP (FIG. 33), lead 366, front contact *b* of relay 3CTAC, and through the winding of relay 3BTAC to terminal N of the battery. Similar circuits are prepared for relays 1BTAC and 2BTAC, but these circuits are interrupted at the open front points of contacts *b* of relays 1CTAC and 2CTAC.

Since under the assumed conditions there is no cut ahead of the cut under consideration, relay GEC (FIG. 36) is down, and the information stored in relays 1BTAC through 3BTAC can immediately be transferred to relays 1ATAC through 3ATAC. Relay 3ATAC is accordingly picked up over a circuit extending from terminal B of the battery over back contact *g* of relay GEC, lead 236, front contact *b* of relay 3BTAC, and through the winding of the relay to terminal N of the battery. Similar circuits are prepared for relays 1ATAC and 2ATAC, but these circuits are interrupted at the open front points of contacts *b* of relays 1BTAC and 2BTAC.

As soon as the cut occupies section MR2T, releasing relay R2TR and causing relay R2TP to pick up as previously described, a stick circuit is established for relay 3ATAC which extends from terminal B of the battery over front contact *e* of relay R2TP (FIG. 36), lead 237, front contact *a* of relay 3ATAC, and through the winding of the relay to terminal N of the battery. Therefore, although relay GEC picks up as soon as section MR1T is vacated, relay 3ATAC is held up as long as section MR2T is occupied.

As soon as the cut occupies detector track section 1–8T, FIG. 23, the route information stored in the A bank of the 1–8 storage unit (FIG. 49) is transferred to the succeeding switch location selected by the position of switch 1–8W. In the case under consideration, with a cut routed to track 2T, this information will be transferred to the 1–4 storage location associated with switch 1–4W (FIGS. 25 and 40). As previously described, relay 1–4BD (FIG. 25) will accordingly be picked up. The TAC information stored in relays 1ATAC through 3ATAC (FIG. 35) is transferred to the 1–4 storage location at this time. Since the stored TAC is 001, relays B1TAC and B2TAC in FIG. 40 will remain deenergized and relay B3TAC will be picked up over a circuit extending from terminal B of the battery over front contact *b* of relay 3ATAC (FIG. 35), lead 245, cable 246 to FIG. 39, lead 245 to terminal *j* of the B bank of the 1–4 storage location (FIG. 40), over back contact *e* of relay 1–4BGL, the back point of make-before-break contact *a* of relay B3TAC, the winding of that relay, lead 241, and over front contact *e* of relay 1–4BD to terminal N of the battery. Once picked up, relay B3TAC is held up over its previously traced stick circuit including its own front contact *a*, lead 241, and front contact *e* of relay 1–4BD.

Since, under the conditions assumed, the A bank of the 1–4 storage unit is unoccupied at this time, relays 1–4AT and 1–4AD can pick up as described in connection with the automatic switching equipment, and the information stored in relays B1TAC through B3TAC is transferred to relays A1TAC through A3TAC in the A bank of the 1–4 storage location. The circuit for relay A3TAC extends from terminal B of the battery in FIG. 25 over front contact *f* of relay 1–4AT, lead 253, front contact *b* of relay B3TAC (FIG. 40), the back point of make-before-break contact *a* of relay A3TAC, through the winding of the relay, over lead 291, and over front contact *f* of relay 1–4AD (FIG. 25) to terminal N of the battery. Similar circuits are prepared for relays A1TAC and A2TAC, but these circuits are interrupted at the open front points of contacts *b* of relays B1TAC and B2TAC, respectively.

Once picked up, relay A3TAC is held up over its stick circuit including its own front contact *a* and front contact *f* of relay 1–4AD.

When section 1–4T (FIG. 25) is occupied by the cut, the T and D relays in the phantom storage location associated with the group retarder selected by the position of switch 1–4W are picked up as previously described in connection with the automatic switching apparatus. In the case under consideration, relays 1–2GRBT and 1–2GRBD (FIG. 42) are picked up. Circuits are accordingly prepared for relays B1TAC through B3TAC in FIG. 42. The circuits for relays B1TAC and B2TAC are interrupted at the open front points of contacts *b* of relays A1TAC and A2TAC in FIG. 40.

The circuit for relay B3TAC in the B bank of the 1–2 phantom storage location (FIG. 42) extends from terminal B of the battery in FIG. 40, over lead 257, front contact *b* of relay A3TAC, terminal *k* of the A bank of the 1–4 storage location, lead 265, lead 267 (FIG. 41), terminal *h* of the B bank of the 1–2 phantom storage location (FIG. 42), front contact *h* of relay 1–2GRBT, through the winding of relay B3TAC, and over front contact *e* of slow release relay 1–2GRBD to terminal N of the battery. Relay B3TAC accordingly picks up and is held up over its stick circuit including its own front contact *a* and contact *e* of relay 1–2GRBD.

At the time that detector section 1–4T was occupied, and relays 1–2GRBT and 1–2GRBD were picked up, relays 1–2BT and 1–2BD in the B bank of the storage location associated with switch 1–2W (FIG. 32) were also picked up, thus interrupting the stick circuit for relay 1–4AD and allowing this relay to release at the end of its predetermined time delay period, which is long enough to permit the above described transfer of information to take place. When relay 1–4AD is released, the A bank of the 1–4 storage location is cleared of information and is in condition for a subsequent transfer.

Since there is no cut ahead of the cut under consideration, the transfer of information from the B to the A bank of the 1–2 phantom storage location takes place at once. As previously described, relays 1–2GRAT and 1–2GRAD (FIG. 43) are picked up, and relay A3TAC is then picked up over a circuit extending from terminal B of the battery over front contact *e* of relay 1–2GRAT, lead 268, lead 269, front contact *b* of relay B3TAC, lead 374, through the winding of relay A3TAC, and over front contact *e* of relay 1–2GRAD to terminal N of the battery. Similar circuits are prepared for relays A1TAC and A2TAC, but these are interrupted at the open front points of contacts *b* of relays B1TAC and B2TAC.

With relay A3TAC picked up, a circuit is completed for energizing relay 1–2ART3 which extends from terminal B of the battery over front contact *b* of relay A3TAC to terminal *k* of the A bank of the 1–2 phantom storage location, lead 297, and through the winding of relay 1–2ART3 to terminal N of the battery. Relays 1–2ART1 and 1–2ART2 have similar pickup circuits which, however, are interrupted at the open front points of contacts *b* of relays A1TAC and A2TAC, respectively.

With relays 1–2ART1 and 1–2ART2 released and relay 1–2ART3 picked up, a circuit is completed for relay 1RO which extends from terminal B of the battery over the front point of contact *b* of relay 1–2ART3 (FIG. 44), the back point of contact *c* of relay 1–2ART2, the back point of contact *f* of relay 1–2ART1, lead 207, cable 287, cable 285 (FIG. 52), cable 283 (FIG. 39), lead 207 (FIG. 58), terminal *a* of panel 1RP (FIG. 46) and through the winding of relay 1RO to terminal N of the battery.

With relay 1RO picked up, a circuit is completed for supplying the value of rolling resistance stored in unit 1ES which extends from terminal *c* of storage unit 1ES over lead 212, lead 216, front contact *f* of relay 1RO, lead 336, terminal *m* of panel 1RP, lead 269, cable 275, cable 277 (FIG. 39), cable 279 (FIG. 52), lead 269 (FIG. 44), the back point of contact *b* of relay 1–2ART1, the back point of contact *a* of relay 1–2ART2, the front point of contact *a* of relay 1–2ART3, lead 268, the back point of contact *a* of relay RTA (FIG. 55), lead 298, the back point of contact *b* of test compute relay 3TC, to be described, lead 299, through summing resistance 300 and summing amplifier 301 to grounded lead 302 and thence to grounded lead *d* of storage unit 1ES in FIG. 47. The signal thus supplied actuates the computer in a manner which will be described in more detail below.

When the cut occupies section CL4T (FIGS. 27 and 28), relay CL4TP (FIG. 28) is picked up, and the circuit for relay 1–2GRADP (FIG. 43) is completed over front contact *g* of relay CL4TP (FIG. 28). Relay 1–2GRAD is now held up over its second stick circuit including front contact *n* of relay CL4TP. When section CL4T is vacated, causing relay CL4TP to release, this second stick circuit will be interrupted at the open front point of contact *n* of relay CL4TP and the first stick circuit will remain open at the open back point of contact *a* of relay 1–2GRADP, which is held up over its stick circuit including front contact *c* of relay 1–2GRADP and its own front contact *b*. Relay 1–2GRAD is accordingly released after its predetermined time delay period, and thereafter interrupts the circuit for relay A3TAC in FIG. 43 at the open front point of contact *e* of relay 1–2GRAD. With relay A3TAC released, the circuit for relay 1–2ART3 is interrupted at the open front point of contact *b* of relay A3TAC, and relay 1–2ART3 is accordingly released, restoring this portion of the apparatus to its initial condition.

When relay 1RO picked up (FIG. 46), the previously traced stick circuit for relay 1B is interrupted at the open back point of contact *d* of relay 1RO. Relay 1B is accordingly released. With relay 1B released, one of the three previously traced circuits for relay 1H is interrupted at the open front point of contact *d* of relay 1B. Another circuit is temporarily interrupted at the open back point of contact *c* of relay 1RO, but is also interrupted at the open front point of contact *c* of relay RI and again at the open front point of contact *c* of relay ATP. Relay 1RO is deenergized by the release of relay 1–2ART3 and releases to open its front contact *d* to interrupt the only remaining holding circuit for relay 1H. Relay 1H is accordingly released and the apparatus is restored to its initial condition.

*The weight storage and transfer circuits*

Referring first to FIG. 18, the weigh rail 13 is located just inside track section MR1T adjacent the insulated joints at point *b*. As schematically shown, deflection of the weigh rail in response to the weight of the wheels of a car actuates a weigh rail contactor WRC having a movable member 13*a* which electrically connects a wiper *b* to contact *c*, contacts *c* and *d*, or contacts *c*, *d* and *e*, accordingly as the weight is light, medium or heavy, respectively.

The condition of contacts *c*, *d* and *e* of weight rail contactor WRC is repeated by quick-acting relays L, M and H (FIG. 34), over leads 303, 304 and 305, respectively. These relays each have two windings, through each of which current passes in the direction indicated by the arrow, the energization of either winding being sufficient to maintain the front contacts of the relay closed. Since relays of this type are well-known in the art, for example, in the form of the familiar "KP" relay, their construction will not be described in detail.

Relay L has a pickup circuit extending from terminal B of the battery over wiper *b*, the movable element 13*a* of contactor WRC when actuated by a light, medium or heavy car, contact *c*, lead 303, and through the upper winding of the relay to terminal N of the battery.

Relay L has a stick circuit extending from terminal B of the battery over its own front contact *a*, the back point of contact *a* of relay LS, and through the lower winding of relay L to terminal N of the battery.

Relay M has a pickup circuit extending from terminal B of the battery over wiper *b* of contactor WRC, movable element 13*a* when actuated by a medium or heavy car, contact *d*, lead 304, and through the upper winding of the relay to terminal N of the battery. Relay M has a stick circuit which extends from terminal B of the battery over its own front contact *a*, front contact *b* of relay L and front contact *b* of relay LS in multiple, through a suitable current limiting resistor 306, and through the lower winding of the relay to terminal N of the battery.

Relay H has a pickup circuit extending from terminal B of the battery over wiper *b*, element 13*a* when actuated by a heavy car, contact *e*, lead 305, and through the upper winding of relay H to terminal N of the battery. Relay H has a stick circuit which extends from terminal B of the battery over front contact *a* of relay M, front contact *b* of relay L and front contact *b* of relay LS in multiple, its own front contact *a*, and through a suitable current limiting resistor 307 and the lower winding of the relay to terminal N of the battery.

A slow release repeater relay LS is provided for relay L. Relay LS has a pickup circuit extending from terminal B of the battery over front contact *a* of relay L and through the winding of relay LS to terminal N of the battery. Relay LS has a first stick circuit extending from terminal B of the battery over back contact *b* of relay H, lead 308, back contact *b* of relay RL1 (FIG. 35), to be described, lead 309, the front point of its own make-before-break contact *a*, and through the winding of the relay to terminal N of the battery. Relay LS has a second stick circuit which extends from terminal B of the battery over front contact *b* of relay M, lead 310, back contact *b* of relay RH1 (FIG. 35), to be described, lead 309, the front point of contact *a* of relay LS and through the winding of the relay to terminal N of the battery.

The operation of the weight coding circuits here shown is more fully described in copending application Serial No. 473,819 by E. C. Falkowski, filed December 8, 1954, for Car Retarder Speed Control Apparatus, assigned to the assignee of the present application and now Patent No. 2,819,682, issued January 14, 1958. Briefly, this apparatus operates such that in response to the passage of a light car of between 16 and 32 tons, only relay LS is energized; in response to the passage of a medium weight car of between 32 and 50 tons, relays LS and M are picked up; and in response to the passage of a heavy car of over 50 tons, relays LS, M and H are all picked up. Should the registration change from one weight to another, the apparatus will register medium weight by the energized condition of relays LS and M.

As also described in the Falkowski patent above referred to, relays RL1 and RH1 (FIG. 35) are provided to store the weight information received from the weigh rail in the form of a code. In particular, for light cars only relay RL1 is picked up, for heavy cars only relay RH1 is picked up, and for medium cars both relays RL1 and RH1 are picked up.

The pickup circuit for relay RL1 extends from terminal B of the battery over back contact *c* of relay H (FIG. 34), back contact *d* of relay L, front contact *c* of relay LS, lead 418, and through the winding of relay RL1 (FIG. 35) to terminal N of the battery. Relay RL1 has a stick circuit which extends from terminal B of the battery over the front point of contact *d* of relay R1TP (FIG. 33), lead 312, its own front contact *a* (FIG. 35), and through its winding to terminal N of the battery.

Relay RH1 has a pickup circuit which extends from terminal B of the battery over front contact *a* of relay M, front contact *b* of relay LS, back contact *c* of relay L, lead 419, the back point of its own make-before-break contact *a*, and through the winding of the relay to terminal N of the battery. Relay RH1 has a stick circuit which extends from terminal B of the battery over the front point of contact *d* of relay R1TP (FIG. 33), lead 312, the front point of its own front make-before-break contact *a*, and through the winding of the relay to terminal N of the battery.

Relay RL1 is accordingly picked up when relay H is down and relay LS is up, indicating either a light or a medium car; relay RH1 is picked up when either relay M or relays M and H are up, to indicate a medium or heavy car; and either relay, if picked up, is held up as long as section MR1T is occupied.

Relays RL2 (FIG. 36) and RH2 (FIG. 37) are provided to store the weight code for use in the second section of the master retarder. Associated with these relays are two series repeater relays RLP2 and RHP2 (FIG. 37), respectively, these additional relays being shown merely to illustrate a conventional feature incorporated in one embodiment of our invention by which the number of contacts on each relay is reduced, thus increasing the speed of operation and reducing the cost of the individual relays.

Relays RL2 and RLP2 have a common pickup circuit extending from terminal B of the battery over front contact *e* of relay 1–2RC (FIG. 36), previously described, lead 313, front contact *i* of relay RL1 (FIG. 35), lead 314, and through the windings of relays RL2 and RLP2 in series to terminal N of the battery. Relays RL2 and RLP2 have a common stick circuit which extends from terminal B of the battery over front contact *f* of relay R2TP, lead 315, front contact *a* of relay RL2, and through the windings of relays RL2 and RLP2 in series to terminal N of the battery.

Relays RH2 and RHP2 have a common pickup circuit which extends from terminal B of the battery over front contact *f* of relay 1–2RC, lead 316, front contact *e* of relay RH1, lead 317, and through the windings of relays RH2 and RHP2 in series to terminal N of the battery. Relays RH2 and RHP2 have a common stick circuit extending from terminal B of the battery over front contact *f* of relay R2TP, lead 315, front contact *a* of relay RH2, and through the windings of relays RH2 and RHP2 in series to terminal N of the battery.

Relays RL2 and RLP2 are accordingly picked up when relay RL1 is picked up and relay 1–2RC is picked up, and relays RH2 and RHP2 are picked up when relays RH1 and 1–2RC are picked up, and any of these relays which are picked up are held up as long as section MR2T is occupied.

It is not necessary to repeat the weight information at the switch location immediately following the master retarder. Accordingly, this information is transferred to the next switch location along with the other information pertaining to the cut, in this case either to storage unit 1–4 or 5–8 in accordance with the position of switch 1–8W.

The route information pertaining to a cut which is stored in the A bank of a given storage location is transferred to the first bank of the succeeding storage location as soon as the detector track section for the switch associated with the given storage location is occupied. Since, for a long cut, the weigh rail may be actuated even after section 1–8T has been occupied, it is desirable to make it possible to transfer the weight information from the master retarder storage to either of the A and B storage banks associated with switch 1–4 or 5–8. This permits the weight indication to be modified until the cut has cleared section MR1T, at which time no further change in weight can be made, unless the front of the cut occupies the next detector track section (1–4T or 5–8T) before this occurs, in which case the cut is too long for fully automatic control. The circuits for accomplishing this purpose will now be described. The operation of the system with long cuts will be discussed later.

Referring now to FIGS. 25 and 40, the B bank of the 1–4 storage location contains two weight storage relays BLP and BHP, and the A bank of the 1–4 storage unit contains two weight storage relays ALP and AHP. In addition to these relays, a control relay 1–4BGL is provided in the B bank and a control relay 1–4AGL is provided in the A bank of the 1–4 storage location.

The pickup of relay GEC in FIG. 36 indicates MR1T, and consequently the weigh rail, has been cleared and that the weight information can therefore be made final. Relays BGL and AGL are controlled by relay GEC in order to prevent further modification of the weight information when this condition is obtained.

Relay BLP has a pickup circuit which extends from terminal B of the battery over front contact *a* of relay RLP2 (FIG. 37), lead 318, lead 320 (FIG. 39), terminal *k* of the B bank of the 1–4 storage location (FIG. 40), back contact *g* of relay 1–4BGL, the back point of make-before-break contact *a* of relay BLP, through the winding of relay BLP, over bus 241, and over front contact *e* of relay 1–4BD (FIG. 25) to terminal N of the battery. Relay BLP has a stick circuit which extends from terminal B of the battery over bus 242, the front point of its own contact *a*, through its winding, over bus 241, and over front contact *e* of relay 1–4BD to terminal N of the battery. Relay BLP is accordingly picked up if relay 1–4BD is picked up, indicating that a route is stored in the B bank of the 1–4 storage unit, and if relay RLP2 is picked up. A similar circuit would exist for the corresponding relay BLP, not shown, in the 5–8 switch storage location. As schematically indicated, this circuit extends from terminal B of the battery over front contact *a* of relay RLP2 in FIG. 37, lead 318, lead 319 (FIG. 39), cable 248, lead 319, to terminal *k* of the B bank of the 5–8 storage location, corresponding to terminal *k* of the B bank of the 1–4 storage location. This circuit would be completed if switch 1–8W was reversed for any of the routes leading to tracks 5 through 8, in which case the corresponding relay 5–8BD in the 5–8 storage unit would be energized instead of relay 1–4BD in the 1–4 storage location.

Relay BHP (FIG. 40) has a pickup circuit which extends from terminal B of the battery over front contact *a* of relay RHP2 (FIG. 37), lead 321, lead 323 (FIG. 39), terminal *l* of the B bank of the 1–4 storage unit, back contact *i* of relay 1–4BGL, the back point of make-before-break contact *a* of relay BHP, through the winding of relay BHP, bus 241, and over front contact *e* of relay 1–4BD to terminal N of the battery. Relay BHP has a stick circuit which extends from terminal B of the battery over bus 242, the front point of its own contact *a*, through the winding of the relay, over bus 241, and over front contact *e* of relay 1–4BD to terminal N of the battery. The corresponding relay BHP in the 5–8 storage location has a similar pickup circuit extending from terminal B of the battery over front contact *a* of relay RHP2 (FIG. 37), lead 321, lead 322 (FIG. 39), cable 248, and lead 322 (FIG. 24) to terminal *l* of the 5–8 storage location.

Relay 1–4BGL (FIG. 40) has a pickup circuit which extends from terminal B of the battery (FIG. 36) over front contact *d* of relay GEC, lead 238, lead 370 (FIG. 39), terminal *i* of the B bank of the 1–4 storage location (FIG. 40), over front contacts *c* of relays B1TAC, B2TAC and B3TAC in multiple, lead 239, over front contacts *c* of relays BLP and BHP in multiple, lead 240, over the back point of make-before-break contact *a* of relay 1–4BGL, through the winding of the relay, over bus 241, and over front contact *e* of relay 1–4BD (FIG. 25) to terminal N of the battery. Relay 1–4BGL has a stick circuit extending from terminal B of the battery over bus 242, the front point of its make-before-break contact *a*, through the winding of the relay, and over bus 241 and front contact *e* of relay 1–4BD to terminal N of the battery. Relay 1–4BGL is accordingly picked up when a transfer of information to the B bank has been completed, as evidenced by the pickup of at least one of the TAC relays and at least one of the weight repeater relays; relay 1–4BD is picked up, to indicate that a route is being stored; and relay GEC is picked up, to indicate that the cut has cleared the first section of the master retarder. Once picked up, relay 1–4BGL is held up as long as storage detector relay 1–4BD is energized.

A corresponding circuit for relay 5–8BGL, not shown, in the B bank of the 5–8 storage unit (FIG. 24), extends from terminal B of the battery over front contact *d* of relay GEC (FIG. 36), lead 238, lead 247 (FIG. 39), cable 248, lead 247 (FIG. 24) to terminal *i* of the B bank of the 5–8 storage unit.

Relay 1–4AGL in the A bank of the 1–4 storage location (FIG. 40) has a pickup circuit extending from terminal B of the battery over front contact *c* of relay GEC (FIG. 36), lead 377, lead 379 (FIG. 39), terminal *f* of the B bank of the 1–4 storage location (FIG. 40), the back point of contact *c* of relay 1–4BGL, over the back point of make-before-break contact *a* of relay 1–4AGL, through the winding of the relay, over common lead 291, and over front contact *f* of relay 1–4AD (FIG. 25) to terminal N of the battery. Relay 1–4AGL has a second pickup circuit which extends from terminal B of the battery over front contact *f* of relay 1–4AT (FIG. 25), bus 253, lead 368 (FIG. 40), over the front point of contact *c* of relay 1–4BGL, the back point of contact *a* of relay 1–4AGL, through the winding of the relay, over bus 291 and front contact *f* of relay 1–4AD (FIG. 25) to terminal N of the battery. Relay 1–4AGL has a stick circuit which extends from terminal B of the battery over bus 290, the front point of make-before-break contact *a* of relay 1–4AGL, through its winding, over bus 291 and front contact *f* of relay 1–4AD to terminal N of the battery. Relay 1–4AGL is accordingly picked up when either relay GEC or relay 1–4BGL is picked up if there is a storage in the A bank of the 1–4 storage location, and is held up as long as the storage is maintained in the A bank.

The corresponding circuit for the 5–8 storage bank is not shown in detail, but the energizing circuit for the corresponding terminal *f* of the B bank of the 5–8 storage location extends from terminal B of the battery over front contact *c* of relay GEC (FIG. 36), lead 377, lead 378 (FIG. 39), cable 248, lead 378 (FIG. 24) to terminal *f* of the B bank of the 5–8 storage unit.

Relay ALP in the A bank of the 1–4 storage unit (FIG. 40) has a first pickup circuit extending from terminal B of the battery over front contact *f* of relay 1–4AT (FIG. 25), bus 253, front contact *b* of relay BLP (FIG. 40) in the B bank, the back point of make-before-break contact *a* of relay ALP, through the winding of the relay, over bus 291, and over front contact *f* of relay 1–4AD (FIG. 25) to terminal N of the battery. Relay ALP has a second pickup circuit extending from terminal B of the battery over front contact *b* of relay RLP2 (FIG. 37), lead 380, lead 382 (FIG. 39), terminal *a* of the A bank of the 1–4 storage unit (FIG. 40), over back contact *f* of relay 1–4BGL, back contact *b* of relay 1–4AGL, the back point of make-before-break contact *a* of relay ALP, the winding of relay ALP, bus 291, and over front contact *f* of relay 1–4AD (FIG. 25) to terminal N of the battery. Relay ALP has a stick circuit extending from terminal B of the battery over bus 290, the front point of its own make-before-break contact *a*, through its winding, and over bus 291 and front contact *f* of relay 1–4AD to terminal N of the battery. Relay ALP may accordingly be picked up by either relay BLP, or directly from relay RLP2, if storage detector relay 1–4AD is up, unless either of relays 1–4BGL or 1–4AGL has been picked up. Once picked up, it is held up as long as the storage detector relay is energized.

The circuits in the A bank of the 5–8 storage location are identical. The energizing circuit for terminal *a* of the A bank of the 5–8 storage location extends from terminal B of the battery over front contact *b* of relay RLP2 (FIG. 37), lead 380, lead 381 (FIG. 39), cable 383, and lead 381 (FIG. 24) to terminal *a* of the A bank of the 5–8 storage unit.

Relay AHP in the A bank of the 1–4 storage unit has a first pickup circuit extending from terminal B of the battery over front contact *f* of relay 1–4AT (FIG. 25), bus 253, front contact *b* of relay BHP (FIG. 40), over the back point of make-before-break contact *a* of relay AHP, through the winding of the relay, over bus 291, and over front contact *f* of relay 1–4AD (FIG. 25) to terminal N of the battery. Relay AHP has a second pickup circuit extending from terminal B of the battery over front contact *b* of relay RHP2 (FIG. 37), lead 384, lead 386 (FIG. 39), terminal *d* of the A bank of the 1–4 storage location (FIG. 40), over back contact *h* of relay 1–4BGL, back contact *c* of relay 1–4AGL, the back point of make-before-break contact *a* of relay AHP, through the winding of the relay, over bus 291, and over front contact *f* of relay 1–4AD (FIG. 25) to terminal N of the battery. Relay AHP has a stick circuit extending from terminal B of the battery over bus 290, the front point of its own make-before-break contact *a*, through its winding, and over bus 291 and front contact *f* of relay 1–4AD (FIG. 25) to terminal N of the battery. Relay AHP is accordingly picked up if relays 1–4AT and BHP are picked up, or if relay RHP2 is picked up and relays 1–4BGL and 1–4AGL are released, when relay 1–4AD is picked up.

The corresponding identical circuits in the A bank of the 5–8 storage location are not shown. The energizing circuit for the corresponding terminal *d* of the A bank of the 5–8 location extends from terminal B of the battery over front contact *b* of relay RHP2 (FIG. 37), lead 384, lead 385 (FIG. 39), cable 383, and over lead 385 (FIG. 24) to terminal *d* of the A bank of the 5–8 storage unit.

The transfer of information from the A bank of the 5–8 storage location to the subsequent storage locations associated with tracks 5 and 6 and tracks 7 and 8 will not be described in detail, since the circuits are identical with the corresponding circuits associated with tracks 1 through 4, which will be described. Accordingly, these circuits are merely indicated schematically by the dotted line 256.

The weight information stored in the A bank of the 1–4 storage location (FIG. 40) is transferred to the phantom storage location associated with either group retarder 1–2GR or 3–4GR in accordance with the position of switch 1–4W. The circuits for the transfer to group retarder 3–4GR will be described only generally, since they are identical with the circuits for group retarder 1–2GR, which will be described in detail.

The 1–2 phantom storage location is shown in FIGS. 42, 43, 53 and 54. The B bank of this storage unit (FIG. 42) includes two weight repeater relays BLP and BHP. The A bank (FIG. 43) includes two weight storage relays, ALP and AHP.

Relay BLP has a pickup circuit extending from terminal B of the battery over bus 257 (FIG. 40), front contact *b* of relay ALP in the A bank of the 1–4 storage location, terminal *j* of the A bank of the 1–4 storage location, lead 387, lead 389 (FIG. 41), terminal *i* of the B bank of the 1–2 storage location (FIG. 42), front contact *i* of relay 1–2GRBT, through the winding of relay BLP, over bus 390, and over front contact *e* of relay 1–4GRBD to terminal N of the battery. Relay BLP has a stick circuit extending from terminal *b* of the battery over bus 391, its own front contact *a*, through its winding, and over bus 390 and front contact *e* of relay 1–2GRBD to terminal N of the battery.

Relay BHP (FIG. 42) has a pickup circuit extended from terminal B of the battery over bus 257, front contact *b* of relay AHP in the A bank of the 1–4 storage location (FIG. 40), terminal *i* of the A bank of the 1–4 storage location, lead 392, lead 394 (FIG. 41), terminal *k* of the B bank of the 1–2 phantom location (FIG. 42), over front contact *j* of relay 1–2GRBT, through the winding of relay BHP, and over bus 390 and front contact *e* of relay 1–2GRBD to terminal N of the battery. Relay BHP has a stick circuit extending from terminal B of the battery over bus 391, its own front contact *a*, through its winding and over bus 390 and front contact *e* of relay 1–2GRBD to terminal N of the battery.

Relay ALP (FIG. 43) has a pickup circuit extending from terminal B of the battery over front contact *e* of relay 1–2GRAT, lead 268, lead 269 (FIG. 42), front contact *b* of relay BLP, lead 950, through the winding of relay ALP, and over bus 395 and front contact *e* of relay 1–2GRAD to terminal N of the battery. Relay ALP has a stick circuit which extends from terminal B of the battery over bus 396, its own front contact *a*, through its winding, and over bus 395 and front contact *e* of relay 1–2GRAD to terminal N of the battery.

Relay AHP (FIG. 43) has a pickup circuit which is identical with that just traced for relay ALP except that it includes front contact *b* of relay BHP (FIG. 42) and lead 951 instead of the corresponding contact of relay BRLP and lead 950, and it has a stick circuit identical with that of relay ALP.

Corresponding transfer circuits to the 3–4 storage location are indicated schematically. Thus, the weight output terminal *j* of the A bank of the 1–4 storage location (FIG. 40) is connected to corresponding terminal *i* of the B bank of the 3–4 phantom switch location (FIG. 26) over leads 387 and 388 (FIG. 41) and cable 260. Terminal *i* of the A bank of the 1–4 storage location is connected to terminal *k* of the B bank of the 3–4 phantom location over leads 392 and 393 (FIG. 41) and cable 260.

The weight information in the A bank of the 1–2 phantom storage location (FIG. 43) is transferred to storage units for use in the computer and in the first and second sections of group retarder 1–2GR by circuits which will now be described.

Figure 29:
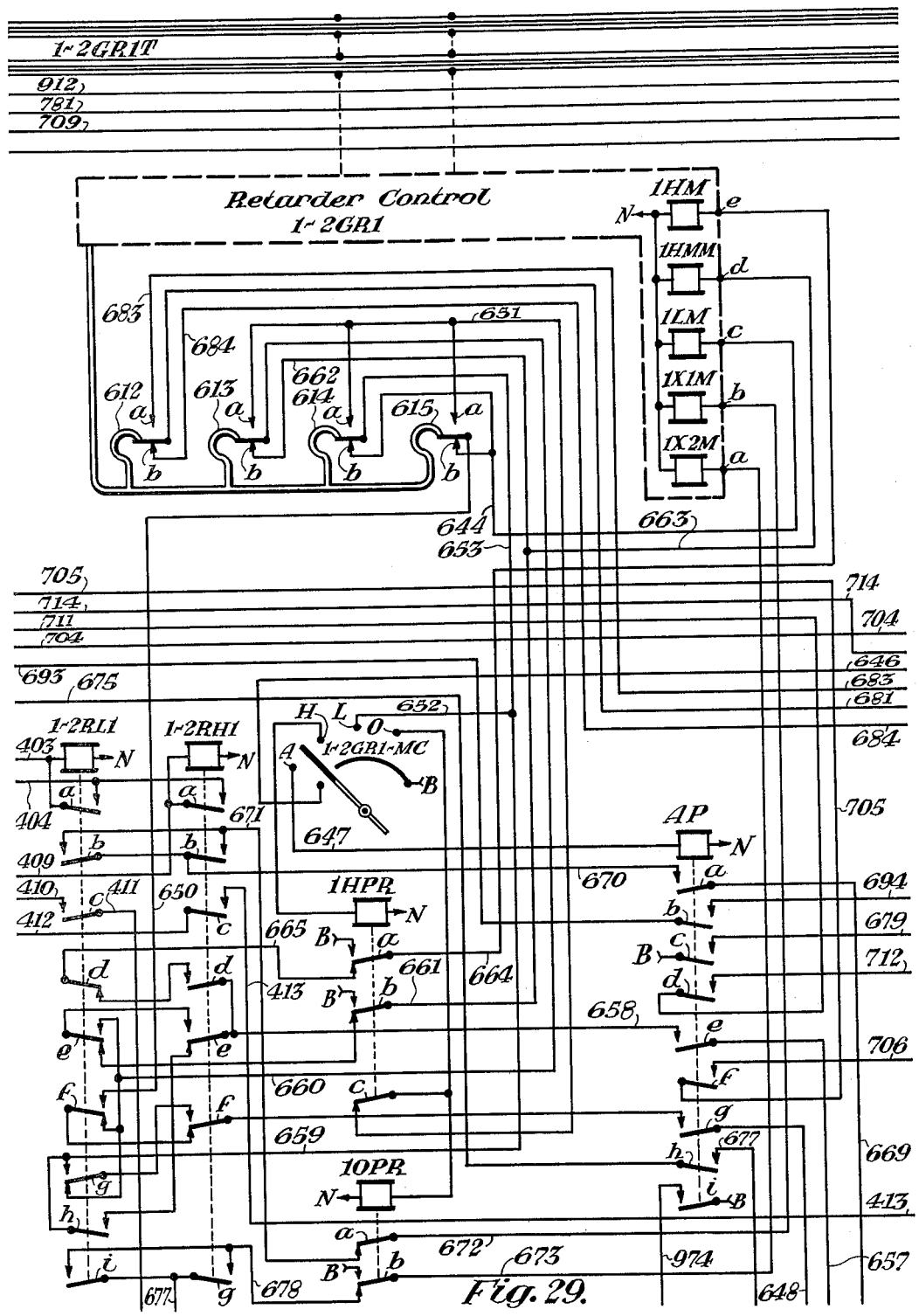

Referring first to FIG. 29, relays 1–2RL1 and 1–2RH1 store weight information for use in the first section of the group retarder.

Relay 1–2RL1 (FIG. 29) has a pickup circuit extending from terminal B of the battery over bus 397 (FIG. 43), front contact *b* of relay ALP, terminal *d* of the A bank of the 1–2 phantom location, lead 398, front contact *d* of relay CL4TP, lead 400, lead 401 (FIG. 27), back contact *d* of relay GAEC, lead 403, and through the winding of relay 1–2RL1 to terminal N of the battery. Relay 1–2RL1 has a stick circuit extending from terminal B of the battery over front contact *b* of relay R1TP (FIG. 27), lead 404, over front contact *a* of relay 1–2RL1, and through the winding of the relay to terminal N of the battery.

Relay 1–2RH1 (FIG. 29) has a pickup circuit extending from terminal B of the battery over bus 397 (FIG. 43), front contact *b* of relay AHP, terminal *e* of the A bank of the 1–2 phantom storage location, lead 405, front contact *c* of relay CL4TP (FIG. 28), lead 406, lead 407 (FIG. 27), back contact *e* of relay GAEC, lead 409, and through the winding of relay 1–2RH1 to terminal N of the battery. Relay 1–2RH1 has a stick circuit, similar to the stick circuit previously traced for relay 1–2RL1, which extends from terminal B of the battery over front contact *b* of relay R1TP (FIG. 27), lead 404, front contact *a* of relay 1–2RH1, and through the winding of the relay to terminal N of the battery.

Relays 1–2RL2 and 1–2RH2 (FIG. 30) store weight information for use in the second section of the group retarder.

Relay 1–2RL2 (FIG. 30) has a pickup circuit which extends from terminal B of the battery over front contact *b* of relay 1–2RC (FIG. 28), lead 410, front contact *c* of relay 1–2RL1 (FIG. 29), lead 411, and through the winding of relay 1–2RL2 (FIG. 30) to terminal N of the battery. Relay 1-2RL2 has a stick circuit which extends from terminal B of the battery over front contact d of relay R2TP (FIG. 30), its own front contact a, and through the winding of the relay to terminal N of the battery.

Relay 1-2RH2 (FIG. 30) has a pickup circuit which extends from terminal B of the battery over front contact c of relay 1-2RC (FIG. 28), lead 412, front contact c of relay 1-2RH1 (FIG. 29), lead 413, and through the winding of relay 1-2RH2 (FIG. 30) to terminal N of the battery. Relay 1-2RH2 has a stick circuit which extends from terminal B of the battery over front contact d of relay R2TP, its own front contact a, and through the winding of the relay to terminal N of the battery.

Relays 21-RLP and 21-RHP (FIG. 50) store weight information for use in RC computer 21.

Relay 21-RLP has a pickup circuit extending from terminal B of the battery over bus 397 (FIG. 43), front contact b of relay ALP in the A bank of the 1-2 phantom storage location, terminal d of the A bank, lead 398, front contact d of relay CL4TP (FIG. 28), lead 400, lead 402 (FIG. 27), lead 414 (FIG. 53), and through the winding of relay 21-RLP (FIG. 50) to terminal N of the battery.

Relay 21-RHP (FIG. 50) has a pickup circuit extending from terminal B of the battery over bus 397 (FIG. 43), front contact b of relay AHP in the A bank of the 1-2 phantom location, terminal e of the A bank, lead 405, front contact c of relay CL14TP (FIG. 28), lead 406, lead 408 (FIG. 27), lead 416 (FIG. 53), and through the winding of relay 21-RHP (FIG. 50) to terminal N of the battery.

Relays 22-RLP and 22-RHP (FIG. 54) are used to store weight information for use in computer 22.

Figure 43:
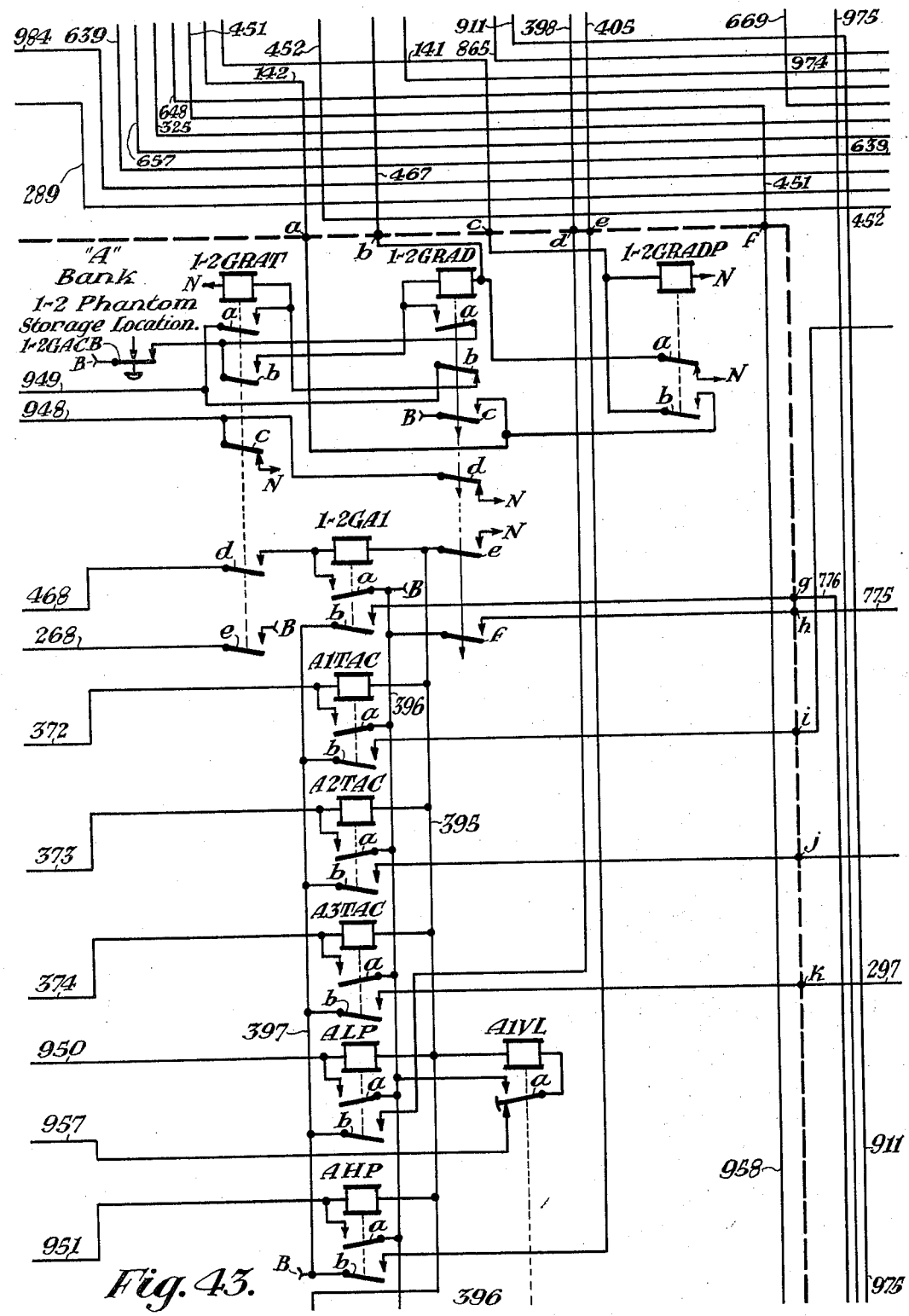

Relay 22-RLP has a pickup circuit extending from terminal B of the battery in FIG. 43, over bus 397, front contact b of relay ALP, terminal d of the A bank of the 1-2 phantom storage, lead 398, over front contact d of relay CL4TP (FIG. 28), lead 400, lead 402, lead 415 (FIG. 53), and through the winding of relay 22-RLP to terminal N of the battery.

Relay 22-RHP has a pickup circuit extending from terminal B of the battery in FIG. 43, over bus 397, front contact b of relay AHP, terminal e of the A bank of the 1-2 phantom location, lead 405, front contact c of relay CL4TP (FIG. 28), lead 406, lead 408 (FIG. 27), lead 417 (FIG. 53), and through the winding of relay 22-RHP (FIG. 54) to terminal N of the battery.

The circuits for the measurement and transfer of storage of weight now having been described, their operation under typical conditions for a cut routed to track 1 will be briefly described. These circuits and their operation are more fully described in the copending application of Benjamin Mishelevich, Serial No. 493,902, filed March 14, 1955, for Railway Car Retarder Speed Control Apparatus, assigned to the assignee of the present application and now Patent No. 3,175,082, issued March 23, 1965.

It will be assumed that the apparatus is in its normal condition, and that all relays are initially in the condition shown. For the purpose of illustration, the car will be assumed to be of medium weight, and to be of a length permitting fully automatic operation of the system.

As the car rolls from the hump in section AT, previously described operations take place, but the weight apparatus does not yet respond. When the car enters section MR1T, assuming that it is of medium weight, contacts c and d of weight rail contactor WRC (FIG. 18) will be connected to terminal B of the battery over wiper b and movable element 13a.

As is more fully described in the previously mentioned Falkowski Patent 2,819,682, relays L and M (FIG. 34) will be momentarily energized over leads 303 and 304. Relay LS will then pick up over front contact a of relay L, and stick up over its previously traced stick circuit including back contact b of relay H and back contact b of relay RL1. Relay M will then be stuck up over a circuit extending from terminal B of the battery over its own front contact a, front contact b of relay LS, and through resistor 306 and the winding of the relay to terminal N of the battery. As soon as the first wheel passes over weigh-rail 13, relay L will release.

With relays LS and M energized, relay RL1 (FIG. 35) will pick up over a circuit extending from terminal B of the battery over back contact c of relay H, back contact d of relay L, front contact c of relay LS, lead 418, and through the winding of relay RL1 to terminal N of the battery. Relay RH1 will pick up over a circuit extending from terminal B of the battery over front contact a of relay M, front contact b of relay LS, back contact c of relay L, lead 419, over the back point of its own make-before-break contact a, and through the winding of relay RH1 to terminal N of the battery.

With relays RL1 and RH1 both energized, the stick circuit for relay LS is interrupted at the open back points of contacts b of relays RL1 and RH1, and after a predetermined time delay, relay LS will release. With relay LS released and relay RH1 picked up, all of the stick circuits for relay M will be interrupted and relay M will be deenergized.

Once picked up, relays RL1 and RH1 remain up over a stick circuit extending from terminal B of the battery over the front point of contact d of relay R1TP (FIG. 33), which is up as long as the cut remains in section MR1T, lead 312, and in multiple over front contacts a of relays RL1 and RH1 and through the windings of the relays to terminal N of the battery.

Figure 37:
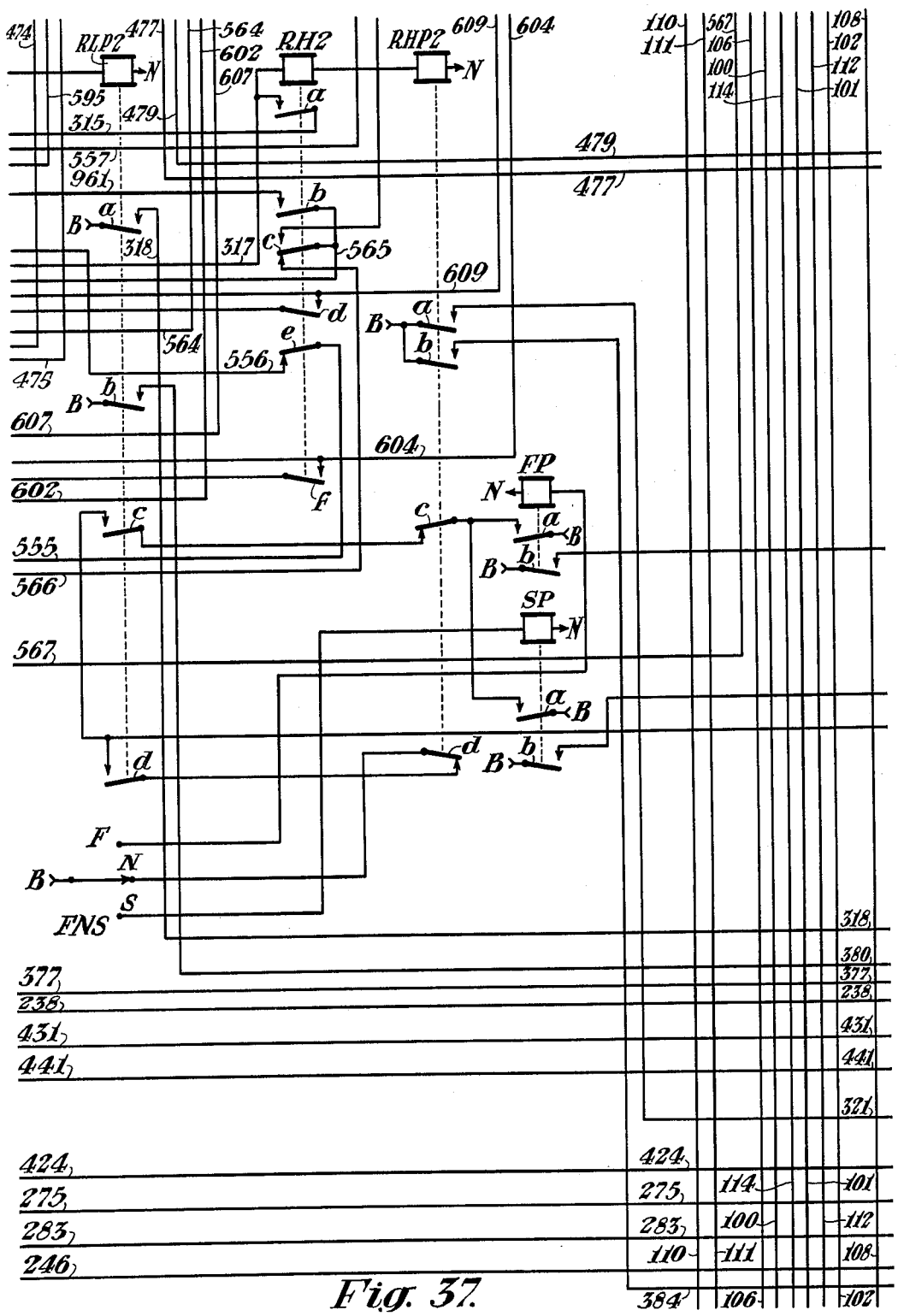

The information stored in relays RL1 and RH1 is used in the control of a cut in the first section of the master retarder in a manner which will later be described in detail. When the cut enters section MR2T, causing relay R2TR (FIG. 22) to release, relay R2TP (FIG. 36) is caused to pick up. Relay 1-2RC (FIG. 36) then picks up as previously described. With relay 1-2RC picked up, the information stored in relays RL1 and RH1 is transferred to relays RL2, its repeater RLP2, and RH2 and its repeater RHP2 (FIGS. 36 and 37).

As previously described the pickup circuit for relay RL2 and its repeater RLP2 includes front contact e of relay 1-2RC (FIG. 36), lead 313, front contact i of relay RL1 (FIG. 35), and lead 314. The circuit for relay RH2 and its repeater RHP2 includes front contact f of relay 1-2RC (FIG. 36), lead 316, front contact e of relay RH1 and lead 317. Once picked up, relays RL2, RLP2, RH2 and RHP2 will be held up over their previously traced stick circuits including front contact f of relay R2TP, lead 315, and front contacts a of relays RL2 and RH2. The information stored in relays RL2 and RH2 and their direct repeaters will be maintained until the car leaves section MR2T.

Assuming the cut consists of two cars, as it enters detector track section 1-8T, it will still be shunting sections MR1T and MR2T. At this time, the route information stored in the A bank of the 1-8 storage unit will be transferred to the B bank of the 1-4 storage unit, causing relays 1-4BD and 1-4BT to pick up. See FIG. 25. At this time, relays BLP and BHP (FIG. 40) can pick up over their previously traced circuits including front contacts a of relays RLP2 and RHP2, respectively (FIG. 37), leads 318 and 321, respectively, leads 320 and 323 (FIG. 39), terminals k and l, respectively, of the B bank of the 1-4 storage unit (FIG. 40), back contacts g and i of relay 1-4BGL, back contacts a of relays BLP and BHP, the windings of the respective relays, bus 241, and front contact e of relay 1-4BD (FIG. 25).

The parallel transfer to the 5-8 storage unit cannot take place at this time since the corresponding relay 5-8BD is released. The parallel transfer to the A bank cannot immediately take place, since its corresponding D relay is not yet picked up.

As soon as relay 1–4BT releases, in the normal sequence of its previously described operation, relays 1–4AT and 1–4AD (FIG. 25) can pickup, permitting relays ALP and AHP (FIG. 40) to pick up over either of their previously traced pickup circuits, the first including front contact f of relay 1–4AT and front contact b of the respective relays BLP and BHP, the back point of make-before-break contact a of the respective relays ALP and AHP, and front contact f of relay 1–4AD. The second circuit includes front contacts b of relays RLP2 and RHP2, respectively (FIG. 37), leads 380 and 384, respectively, leads 382 and 386 (FIG. 39), terminals a and d of the A bank of the 1–4 storage unit, back contact f and h, respectively, of relay 1–4BGL, back contacts b and c, respectively, of relay 1–4AGL, and back contacts a of relays ALP and AHP, respectively, bus 291, and front contact f of relay 1–4AD. As previously noted, the operation of these circuits under various conditions has been described in the above patent of Mishelevich, and it is accordingly considered unnecessary to consider the operation of the circuits under the various possible conditions which might arise. For the purpose of the present illustration, therefore it will be assumed that section MR1T is not cleared until relays ALP and AHP are up.

When section MR1T is cleared, relay R1TP (FIG. 33), will be released and relay GEC (FIG. 36) will be picked up over its previously traced circuit including back contact d of relay R1TP and front contact a of relay R2TP. Relay 1–4AGL will pick up over its previously traced circuit, but under the assumed conditions this action will have no effect on the operation of the rest of the circuits.

With the cut routed to track 1, switch 1–4W will be positioned normally, and when track section 1–4T is occupied, the weight information stored in the A bank of the 1–4 storage location will be transferred to the B bank of the 1–2 phantom location associated with group retarder 1–2GR. (See FIG. 42.) At this time relays 1–2GRBT and 1–2GRBD will be picked up. Relays BLP and BHP in FIG. 42 will then pick up over their previously traced circuits including front contacts b of relays ALP and AHP (FIG. 40), respectively, leads 387 and 392, respectively, leads 389 and 394 (FIG. 41), respectively, front contacts i and j of relay 1–2GRBT, respectively, the windings of relays BLP and BHP, bus 390 and front contact e of relay 1–2GRBD. When relay 1–2GRBT releases, these relays will remain up over their previously traced stick circuits including their own front contacts a and front contact e of relay 1–2GRBD.

Assuming that there is no cut ahead of the cut in question, the A bank of the 1–2 phantom location will be unoccupied and, as soon as relay 1–2GRBT releases, relays 1–2GRAT and 1–2GRAD (FIG. 43) will pick up. At this time, relays ALP and AHP in FIG. 43 will pick up over their previously traced circuits which include front contact e of relay 1–2GRAT and front contacts b of relays BLP and BHP (FIG. 42), respectively, and front contact e of relay 1–2GRAD (FIG. 43).

Figure 50:
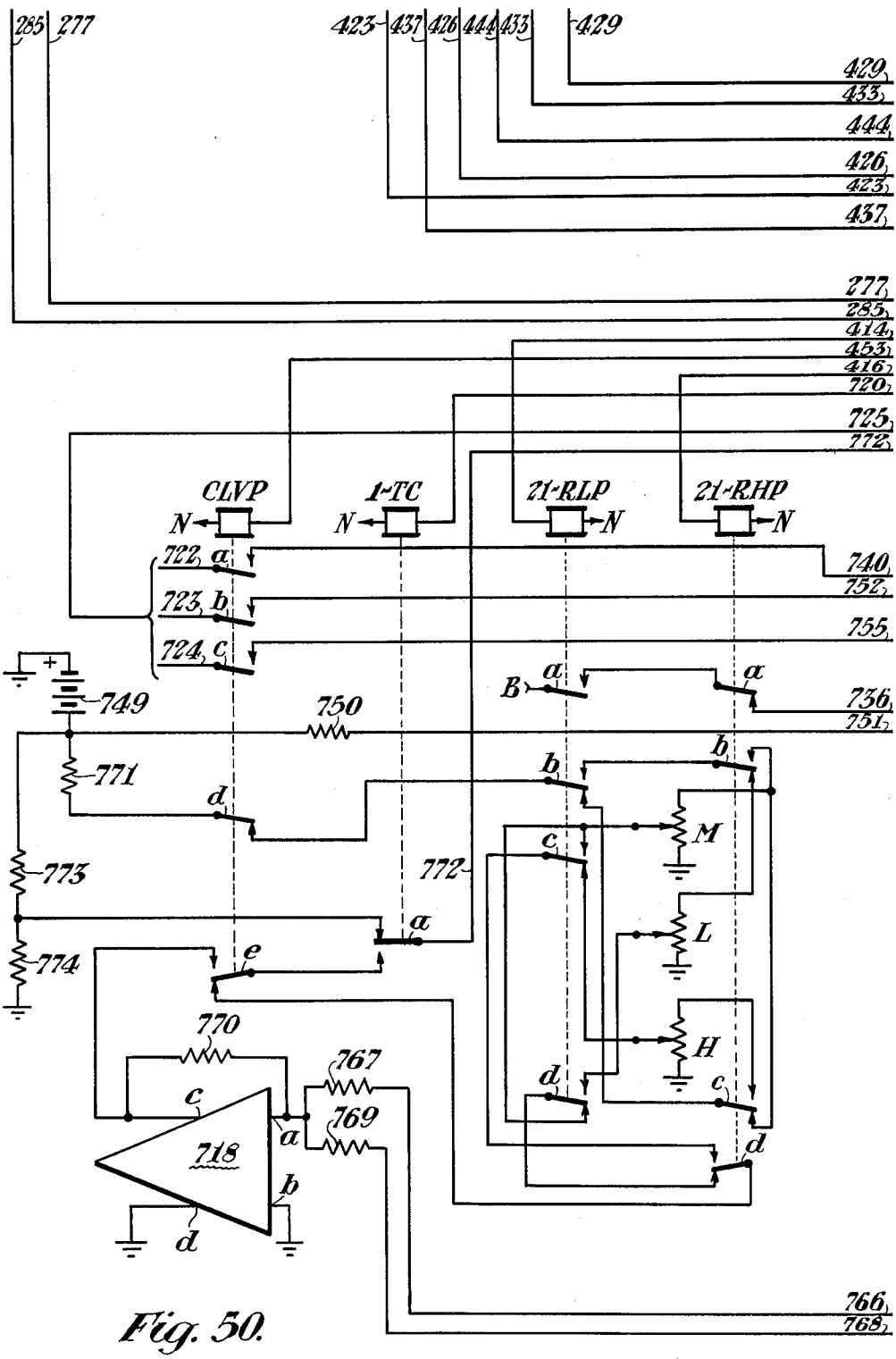

When the cut enters track section CL4T (FIG. 28), weight information stored in the A bank of the 1–2 phantom location (FIG. 43) is transferred to the various operational storage units associated with the group retarder. As previously described, circuits for this purpose extend from terminal B of the battery over front contacts b of relay ALP and AHP (FIG. 43), leads 398 and 405, front contacts d and c of track repeater relay CL4TP (FIG. 28), which is up during the occupancy of section CL4T, leads 400 and 406, and thence over the four paths previously described. The first and second of these extend over leads 401 and 407 (FIG. 27), back contacts d and e of relay GAEC, leads 403 and 409, and through the windings of relays 1–2RL1 and 1–2RH1 to terminal N of the battery. The third and fourth paths extend from leads 400 and 406 (FIG. 27) over leads 402 and 408, where a first branch extends over leads 415 and 417 (FIG. 53) and through the windings of relays 22–RLP and 22–RHP (FIG. 54) to terminal N of the battery. The second branch from leads 402 and 408 (FIG. 53) extends over leads 414 and 416 to energize relays 21–RLP and 21–RHP (FIG. 50).

The computing operation is carried out, as will be described, during the time the cut occupies section CL4T. The information supplied to relays 1–2RL1 and 1–2RH1 (FIG. 29), is used to control the first section of the group retarder. When the cut enters section 1–2GR2T (FIGS. 30 and 31), releasing relay R2TR and causing relay R2TP to pick up, relay 1–2RC (FIG. 28) is picked up over its previously traced circuit including front contact c of relay R2TP and back contact b of relay R1EC (FIG. 27). With relay 1–2RC up, relays 1–2RL2 and 1–2RH2 may be energized over their previously traced pickup circuits including front contacts b and c of relay 1–2RC and front contacts c of relays 1–2RL1 and 1–2RH1. Once picked up, these relays remain up over their previously traced stick circuits including front contact d of relay R2TP as long as section 1–2GR2T is occupied.

When section CL4T is vacated, the A bank of the 1–2 phantom storage location is cleared, relays ALP and AHP (FIG. 43) are released, and relays 22–RLP and 22–RHP (FIG. 54) and 21–RLP and 21–RHP (FIG. 50) are released. When section 1–2GR1T is vacated, relays 1–2RL1 and 1–2RH1 (FIG. 29) are released. When section 1–2GR2T is vacated, relays 1–2RL2 and 1–2RH2 (FIG. 30) are released, thus restoring the weight control portion of the system to its initial condition.

*The correct leaving velocity check, storage and transfer circuits*

As described previously, the operation of our system after a cut leaves the master retarder requires that the leaving speed of the cut be substantially equal to the preselected leaving speed $V_1$. Referring now to FIG. 39, the attainment of the correct leaving velocity is indicated by the energized condition of relay CK in voltage detector 66, to be described. A further check is provided by the energized condition of relay BN, which, as will be described below, operates to check that the voltage detector power supply is operative.

It is necessary to prevent the leaving velocity detection means from operating the check circuits until the cut has cleared the master retarder. For this purpose, relay CLV (FIG. 39) and previously described relay CLVEC (FIG. 36) are provided.

Relay CLV (FIG. 39) has a pickup circuit which extends from terminal B of the battery in voltage detector 66 over front contact a of relay BN and front contact a of relay CK, terminal b of the voltage detector, through the winding of relay CLV, over lead 420, lead 145 (FIG. 23), terminal c of switch control unit 1–8WC, and over back contact b of track relay 1–8TR to terminal N of the battery. Relay CLV is accordingly energized when detector track section 1–8T is occupied as soon as the leaving velocity of the car reaches the predetermined velocity $V_1$ as indicated by the energized condition of relay CK.

The indication provided by relay CLV is transferred along with the other information pertaining to the cut as the cut progresses through the yard. At the time that the cut clears the master retarder, as indicated by the pickup of relay CLVEC (FIG. 36), this indication is made final. The circuits for carrying out this function will now be described.

Since, for a long cut, the cut may have occupied detector track section 1–4T before it clears the master retarder, provision is made for allowing the correct leaving velocity indication to be deferred until the information pertaining to the cut has reached the A bank of the phatom storage unit associated with the group retarder to which the cut is rounted. Referring again to FIGS. 7 through 14, it will be seen that the CLV indication from unit 66, in FIG. 9, corresponding to voltage detector 66 in FIG. 39, is transferred in parallel to the A bank of the 1–4 and 5–8 storage units, to the A and B banks of the 1–2 phantom storage unit, and, as schematically indicated, in a similar manner to the 3–4, 5–6 and 7–8 group retarders.

The A bank of the 1–4 storage unit includes two relays which are concerned with the correct leaving velocity check. These are relays 1–4A2V and 1–4A2VL (FIG. 40).

Relay 1–4A2V is a storage relay repeating the indication of relay CLV. It has a pickup circuit which extends from terminal B of the battery over front contact c of relay CLV (FIG. 39), lead 423, terminal f of the A bank of the 1–4 storage unit (FIG. 40), the back point of make-before-break contact d of relay 1–4A2VL, through the winding of relay 1–4A2V, over bus 291 and over front contact f of relay 1–4AD (FIG. 25) to terminal N of the battery. Relay 1–4A2V is accordingly picked up when relay CLV is picked up and relay 1–4AD is picked up to indicate that information is stored in the A bank, unless locking relay 1–4A2VL has been picked up. Since the lock relay will not be energized until relay CLV has had an opportunity to pick up, the pickup of the lock relay 1–4A2VL before relay 1–4A2V is picked up would indicate that the cut had failed to reach the desired leaving speed, and would lock out any subsequent false operation of relay 1–4A2V. Relay 1–4A2V has a stick circuit which extends from terminal B of the battery over bus 290, its own front contact a, the front point of make-before-break contact d of relay 1–4A2VL, through the winding of relay 1–4A2V, over bus 291, and over front contact f of relay 1–4AD to terminal N of the battery.

Relay 1–4A2VL has a pickup circuit which extends from terminal B of the battery over front contact d of relay CLVEC (FIG. 36), lead 424, lead 426 (FIG. 39), terminal e of the A bank of the 1–4 storage unit (FIG. 40), over the back point of make-before-break contact a of relay 1–4A2VL, through the winding of the relay, and over bus 291 and front contact f of relay 1–4AD (FIG. 25) to terminal N of the battery. Relay 1–4A2VL is accordingly picked up when relay CLVEC picks up, if there is a storage present in the A bank as indicated by the energized condition of relay 1–4AD. Relay 1–4A2VL has a stick circuit which extends from terminal B of the battery over bus 290, the front point of make-before-break contact a of relay 1–4A2VL, through the winding of the relay, and over bus 291 and front contact f of relay 1–4AD to terminal N of the battery.

The 5–8 storage unit shown in FIG. 24 has transfer circuits similar to those just described for the 1–4 storage unit, and accordingly these will not be described in detail. The energizing circuit for terminal e of the 5–8 storage unit extends from terminal B of the battery over front contact d of relay CLVEC (FIG. 36), lead 424, lead 425 (FIG. 39), and over cable 383 to terminal e of the A bank of the 5–8 storage unit (FIG. 24). The energizing circuit for terminal f of the 5–8 storage unit extends from terminal B of the battery over front contact c of relay CLV (FIG. 39), lead 422, and over cable 383 to terminal f of the A bank of the 5–8 storage unit.

As previously noted, the CLV indication can also be transferred to either the A or the B bank of the phantom storage location associated with the group retarder through which the cut is routed. The circuits for this purpose will be described in detail for the 1–2 phantom storage unit, and by analogy for the other phantom storage locations.

Figure 53:
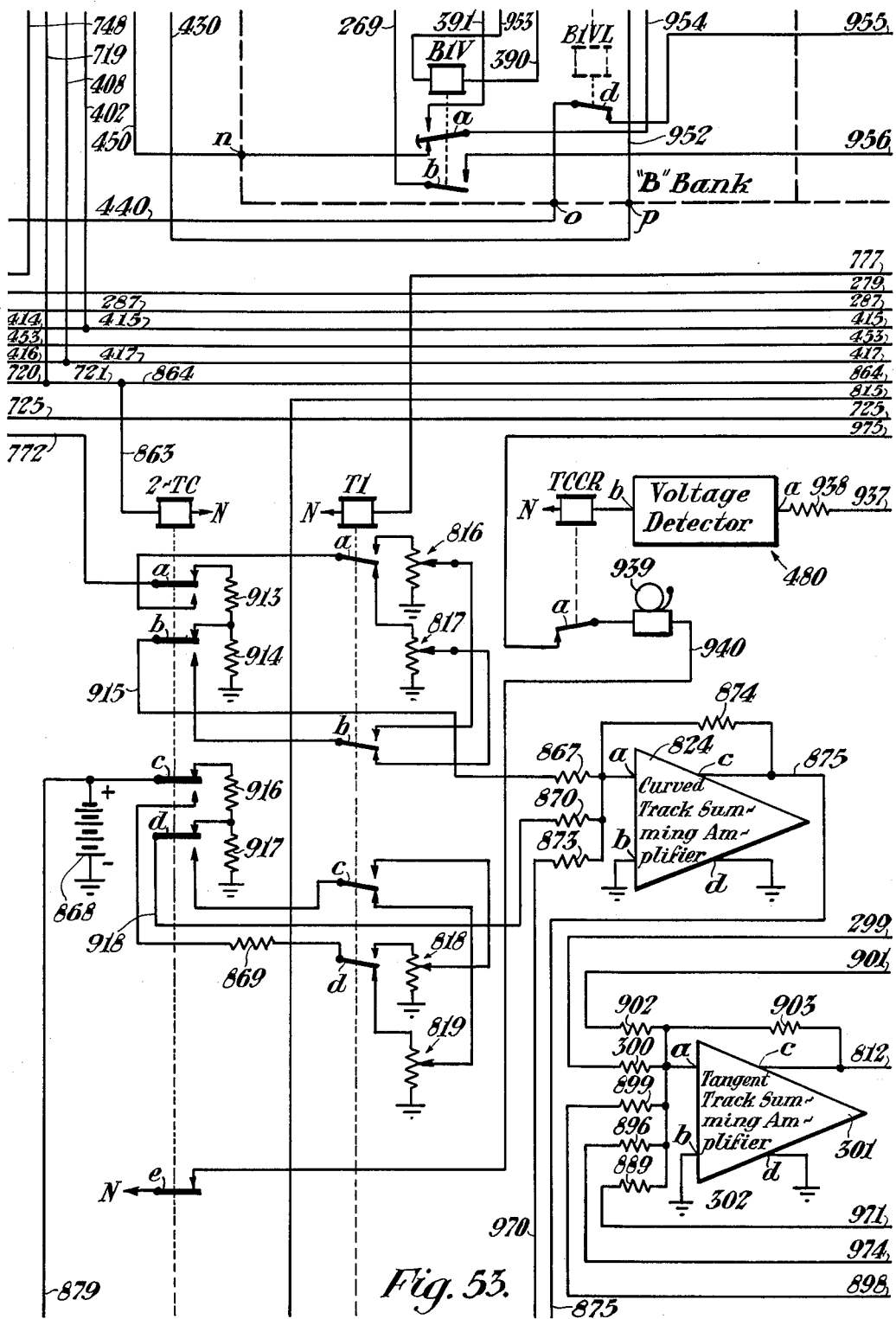

Referring now to FIGS. 42 and 53, the B bank of the 1–2 phantom storage location includes a storage relay B1V, which repeats the indication of relay CLV under certain conditions, and a lock-out relay B1VL, which functions to make the indication of relay B1V final when relay CLVEC is picked up.

Relay B1V has a first pickup circuit which extends from terminal B of the battery over front contact a of relay CLV (FIG. 39), lead 427, lead 429, terminal l of the A bank of the 1–4 storage unit (FIG. 40), over back contact c of relay 1–4A2VL, terminal m of the A bank of the 1–4 storage unit, lead 430, terminal p of the B bank of the 1–2 phantom storage location (FIG. 53), lead 952, over the back point of make-before-break contact c of relay B1VL (FIG. 42), lead 953, through the winding of relay B1V (FIG. 53) and over bus 390 and front contact e of relay 1–2GRBD (FIG. 42) to terminal N of the battery. Relay B1V may accordingly be picked up if relay CLV is picked up, relay 1–4A2VL is released, relay B1VL is released, and storage detector relay 1–2GRBD is picked up. Relay B1V has a stick circuit which extends from terminal B of the battery over bus 391, the front point of make-before-break contact a of relay B1V, lead 954, the front point of make-before-break contact c of relay B1VL, lead 953, through the winding of relay B1V, bus 390, and over front contact e of relay 1–2GRBD to terminal N of the battery. Relay B1V has a second pickup circuit extending from terminal B of the battery over front contact k of relay 1–2GRBD (FIG. 42), terminal l of the B bank of the 1–2 phantom location, lead 447 lead 448 (FIG. 41), terminal g of the A bank of the 1–4 storage unit (FIG. 40), front contact b of relay 1–4A2V, terminal h of the A bank of the 1–4 storage unit, lead 450, terminal n of the B bank of the 1–2 phantom location (FIG. 53), over the back point of make-before-break contact a of relay B1V, lead 954, over the front point of make-before-break contact c of relay B1VL, lead 953, through the winding of relay B1V, and over bus 390 and front contact e of relay 1–2GRBD to terminal N of the battery. This circuit is provided in order to permit the CLV indication to transfer from the A bank of the preceding storage unit if it has previously been stored there. From the above description, it will be apparent that once relay B1VL is picked up to indicate that the indication is to be made final, relay B1V remains up until the storage detector relay is released.

Relay B1VL (FIG. 42) has a first pickup circuit which extends from terminal B of the battery over front contact c of relay CLVEC (FIG. 36), lead 431, lead 433 (FIG. 39), terminal n of the A bank of the 1–4 storage location (FIG. 40) over the back point of contact b of relay 1–4A2VL, terminal o of the A bank of the 1–4 storage location, lead 434, terminal m of the B bank of the 1–2 phantom storage location, the back point of make-before-break contact b of relay B1VL, through the winding of relay B1VL, bus 390 and over front contact e of storage detector relay 1–2GRDB to terminal N of the battery. Relay B1VL has a second pickup circuit which extends from terminal B of the battery over front contact k of relay 1–2GRBT (FIG. 42), terminal l of the B bank of the 1–2 phantom storage location, lead 447, lead 449 (FIG. 41), terminal p of the A bank of the 1–4 storage location (FIG. 40), the front point of contact b of relay 1–4A2VL, terminal o of the A bank of the 1–4 storage unit, lead 434, terminal m of the B bank of the 1–2 phantom location (FIG. 42), over the back point of make-before-break contact b of relay B1VL, through the winding of relay B1VL, over bus 390, and over front contact e of relay 1–2GRBD to terminal N of the battery. Relay B1VL is accordingly picked up over its first pickup circuit if relay CLVEC is picked up, relay 1–4A2VL is released, and storage detector relay 1–2GRBD is picked up. Relay B1VL is picked up by its second pickup circuit when relay 1–4A2VL is picked up and the information stored in the A bank of the 1–4 storage unit is transferred to the B bank of the 1–2 phantom storage unit, thus making the locking indication independent of relay CLVEC once it has picked up. Relay B1VL has a stick circuit which extends from terminal B of the battery over bus 391, the front point of its own make-before-break contact *b*, through its winding, and over bus 390 and front contact *e* of relay 1–2GRBD to terminal N of the battery.

The A bank of the 1–2 phantom storage location (FIGS. 43 and 54) includes a correct leaving velocity storage relay A1V (FIG. 54), which at times repeats the indication of relay CLV, and a locking relay A1VL (FIG. 43), which makes the indication of relay A1V final when relay CLVEC picks up.

Relay A1V has a first pickup circuit which extends from terminal B of the battery over front contact *b* of relay CLV (FIG. 39), lead 435, lead 437, lead 440 (FIG. 52), terminal *o* of the B bank of the 1–2 phantom storage location (FIG. 53), over back contact *d* of relay B1VL, lead 955, the back point of make-before-break contact *b* of relay A1VL (FIG. 54), through the winding of relay A1V, and over bus 395 and front contact *e* of relay 1–2GRAD (FIG. 43) to terminal N of the battery. Relay A1V has a second pickup circuit extending from terminal B of the battery over front contact *e* of relay 1–2GRAT (FIG. 43), lead 268, lead 269 (FIG. 42), front contact *b* of relay B1V (FIG. 53), lead 956, the back point of make-before-break contact *a* of relay A1V (FIG. 54), the front point of make-before-break contact *b* of relay A1VL, through the winding of relay A1V, and over bus 395 and front contact *e* of relay 1–2GRAD (FIG. 43) to terminal N of the battery. This circuit is provided to permit the transfer of information from relay B1V at the time that the information in the B bank is transferred to the A bank. Relay A1V is accordingly picked up if the relay CLV is picked up, the preceding lock relays are released, relay A1VL is released, and storage detector relay 1–2GRAD is picked up. Relay A1V has a stick circuit which extends from terminal B of the battery over bus 396, the front point of its own make-before-break contact *a*, the front point of make-before-break contact *b* of relay A1VL, the winding of relay A1V, bus 395, and front contact *e* of detector relay 1–2GRAD. Accordingly, once relay A1V is picked up and its indication is made final by the energization of relay A1VL, it is held up until the detector relay is released.

Relay A1VL (FIG. 43) has a first pickup circuit which extends from terminal B of the battery over front contact *b* of relay CLVEC (FIG. 36), lead 441, lead 444 (FIG. 39), lead 446 (FIG. 52), termnial *j* of the B bank of the 1–2 phantom storage location (FIG. 42), the back point of make-before-break contact *a* of relay B1VL, lead 957, the back point of make-before-break contact *a* of relay A1VL (FIG. 43), the winding of relay A1VL, bus 395, and over front contact *e* of relay 1–2GRAD to terminal N of the battery. Relay A1VL has a second pickup circuit which extends from terminal B of the battery over front contact *e* of relay 1–2GRAT (FIG. 43), lead 268, lead 270 (FIG. 42), over the front point of make-before-break contact *a* of relay B1VL, lead 957, the back point of its own make-before-break contact *a* (FIG. 43), through its winding and over bus 395 and front contact *e* of relay 1–2GRAD to terminal N of the battery. If storage detector relay 1–2GRAD is picked up, and the preceding lock relay is released, relay A1VL is picked up when relay CLVEC is picked up. However, if relay B1VL is picked up, relay A1VL will be picked up when the storage in the B bank is transferred to the A bank. This circuit is provided in order to insure that the finality of the lockout indication is maintained after relay CLVEC is released. Relay A1VL has a stick circuit which extends from terminal B of the battery over bus 396, the front point of its own make-before-break contact *a*, through its winding, and over bus 395 and front contact *e* of relay 1–2GRAD to terminal N of the battery.

The information stored in the A bank of the 1–2 phantom location is made available to the computer during the occupancy of track section CL4T, as indicated by the energized condition of relay CL4TP (FIG. 28), previously described. This information is stored for use in the computer in relay CLVP (FIG. 50).

Relay CLVP has a pickup circuit which extends from terminal B of the battery over front contact *b* of relay A1V (FIG. 54), lead 958, terminal *f* of the A bank of the 1–2 storage location, lead 451, front contact *a* of relay CL4TP (FIG. 28), lead 452, back contact *b* of relay RTA (FIG. 55), lead 453, and through the winding of CLVP (FIG. 50) to terminal N of the battery. Relay CLVP is accordingly picked up when relay CL4TP is picked up to indicate the occupancy of track section CL4T, relay A1V (FIG. 54) is picked up to indicate the correct leaving velocity has been obtained, and relay RTA, to be described, is released, to indicate that the cut length is below the maximum limit for which fully automatic operation can take place.

The operation of the leaving velocity checking apparatus will now be described. It will be assumed that a single car cut routed to track 2 has entered the master retarder and is occupying detector track sections MR2T and 1–8T. At the time that the cut occupied section MR2T, assuming no other cuts are immediately ahead of it in the yard, the route information stored in the A bank of the 1–8 storage unit would have been transferred to the B bank of the 1–4 storage location, and subsequently transferred to the A bank of the 1–4 storage location (FIGS. 25 and 40). Accordingly, relay 1–4AD will be picked up; relay 1–4AT will be down; and the relays in the B bank will be deenergized.

It will now be assumed that just before the cut clears section MR2T, the speed of the cut is reduced to the preselected leaving speed $V_1$ and relay CLV (FIG. 39) is picked up. Relay 1–4A2V (FIG. 40) will then be picked up over its previously traced circuit including front contact *c* of relay CLV, back contact *d* of relay 1–4A2VL, and front contact *f* of relay 1–4AD. It will be noted that until relay 1–4A2VL picks up, relay 1–4A2V has no stick circuit independent of relay CLV. Accordingly, should the speed of the cut merely pass through the desired velocity $V_1$ and then fall to a lower value, causing relay CLV to release, relay 1–4A2V would be dropped out. However, let it be assumed that the cut clears section MR2T at the correct velocity, and that relay CLVEC (FIG. 36), picks up. Relay 1–4A2VL will now be picked up over its previously traced circuit including front contact *d* of relay CLVEC, the back point of its own contact *a*, and front contact *f* of relay 1–4AD. Once relay 1–4A2VL picks up, it is held up over its own front contact *a* and front contact *f* of relay 1–4AD.

With relay 1–4A2VL up, relay 1–4A2V is held up over its stick circuit including its own front contact *a*, the front point of make-before-break contact *d* of relay 1–4A2VL and front contact *f* of relay 1–4AD, and is thus rendered independent of the condition of relay CLV.

When the cut occupies detector section 1–4T, with switch 1–4W in normal position, the information stored in the A bank of the 1–4 storage unit is transferred to the B bank of the 1–2 phantom location. As previously described, in the first step of the transfer operation relays 1–2GRBT and 1–2GRBD in the 1–2 phantom location (FIG. 42), are picked up. Relay B1VL is then picked up over its previously traced pickup circuit including front contack *k* of relay 1–2GRBT (FIG. 42), lead 447, lead 449 (FIG. 41), the front point of contact *b* of relay 1–4A2VL (FIG. 40), lead 434, the back point of make-before-break contact *b* of relay B1VL (FIG. 42), and front contact *e* of relay 1–2GRBD. Once picked up, relay B1VL is held up over its previously traced stick circuit including the front point of its own make-before-break contact *d* and front contact *e* of relay 1–2GRBD.

Relay B1V (FIG. 53), is picked up over its previously traced pickup circuit including front contact *k* of relay 1–2GRBT, front contact $b$ of relay 1–4A2V (FIG. 40), the back point of its own make-before-break contact $a$, the front point of contact $c$ of relay B1VL, and front contact $e$ of relay 1–2GRBD. It will be noted that the alternate pickup circuits traced for relay B1V is open at the open back point of contact $c$ of relay 1–2A2VL. Once picked up, relay B1V is held up over its previously traced stick circuit including the front point of its own make-before-break contact $a$, the front point of make-before-break contact $c$ of relay B1VL, and front contact $e$ of relay 1–2GRBD.

As the transfer to the B bank of the 1–2 phantom location is completed, relay 1–2GRBT releases and relays 1–2GRAT and 1–2GRAD (FIG. 43) in the A bank are picked up. Relay A1VL is then picked up over its previously traced circuit including front contact $e$ of relay 1–2GRAT, the front point of make-before-break contact $a$ of relay B1VL, the back point of its own make-before-break contact $a$, and front contact $e$ of relay 1–2GRAD. Once picked up, relay A1VL is held up over the front point of its make-before-break contact $a$ and front contact $e$ of relay 1–2GRAD.

Relay A1V (FIG. 54) is now picked up over its previously traced circuit including front contact $e$ of relay 1–2GRAT, front contact $b$ of relay B1V, the back point of its own make-before-break contact $a$, the front point of make-before-break contact $b$ of relay A1VL, and front contact $e$ of relay 1–2GRAD. Relay A1V is then held up over its own front contact $a$, front contact $b$ of relay A1VL, and front contact $e$ of relay 1–2GRAD. As the cut occupies section CL4T, relay CL4TP (FIG. 28) is picked up, relay 1–2GRAD is now held up over front contact $n$ of relay CL4TP.

Relay CLVP (FIG. 50) is now picked up over its previously traced circuit including front contact $b$ of relay A1V, lead 451, front contact $a$ of relay CL4TP, lead 452, back contact $b$ of relay RTA (FIG. 55), lead 453, and the winding of relay CLVP. The information is now available for use in the computer, and is cancelled out at the end of the time delay period of relay 1–2GRAD after section CL4T is vacated, at which time this relay releases and allows relays A1V, A1VL and CLVP to release, thus restoring this portion of the apparatus to its initial condition.

*The speed selector unit*

Figure 8:
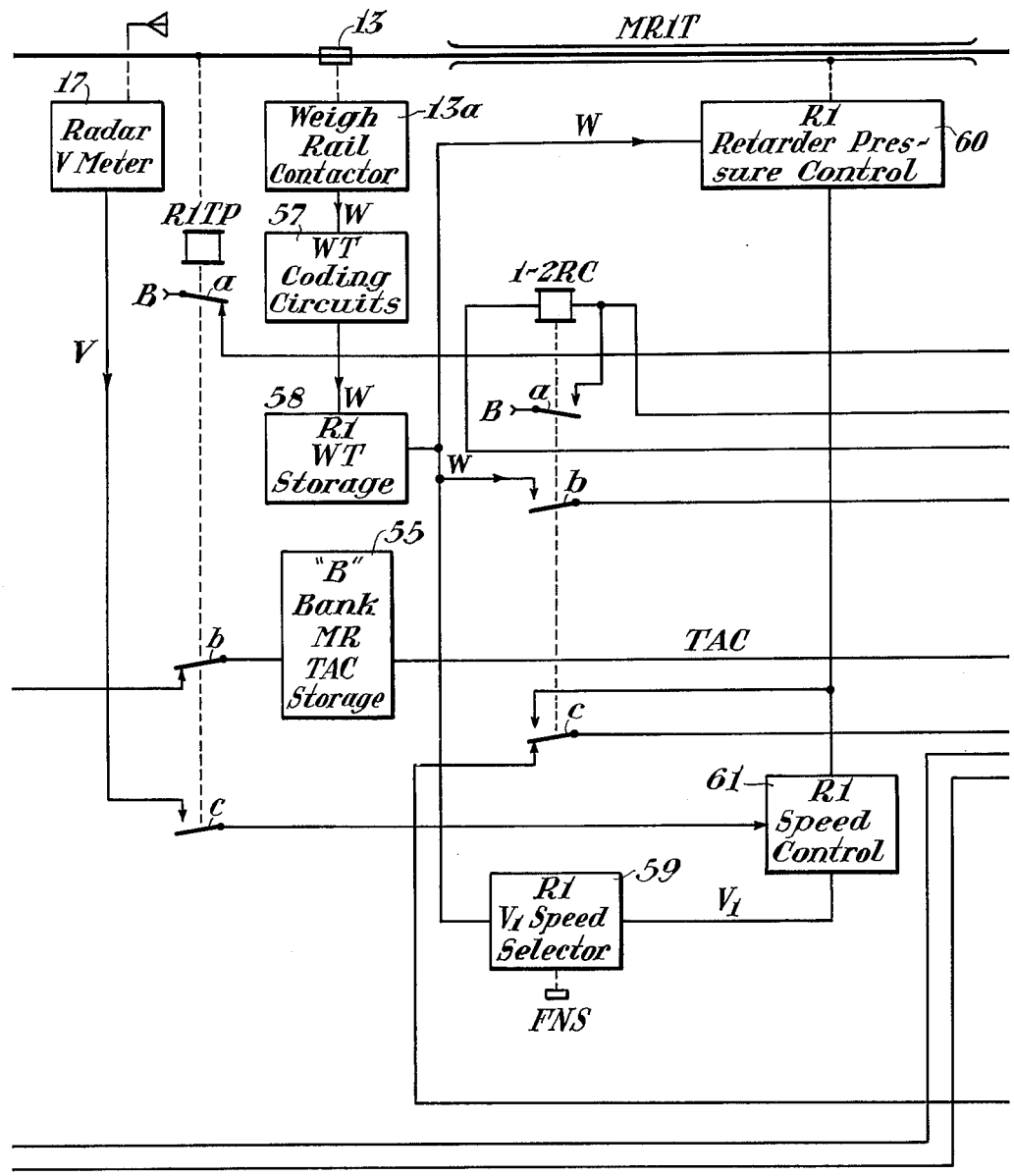
Figure 9:
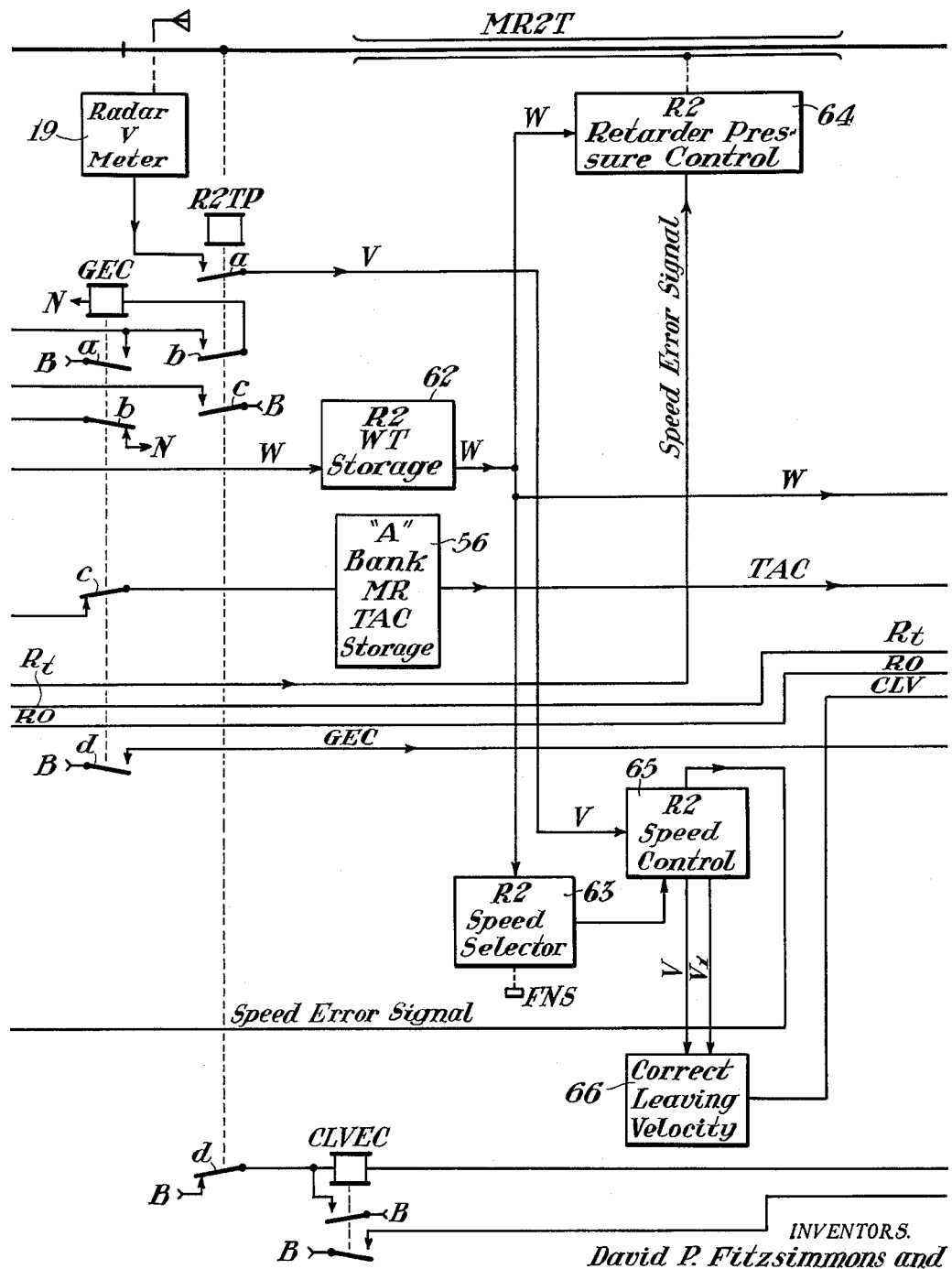
Figure 10:
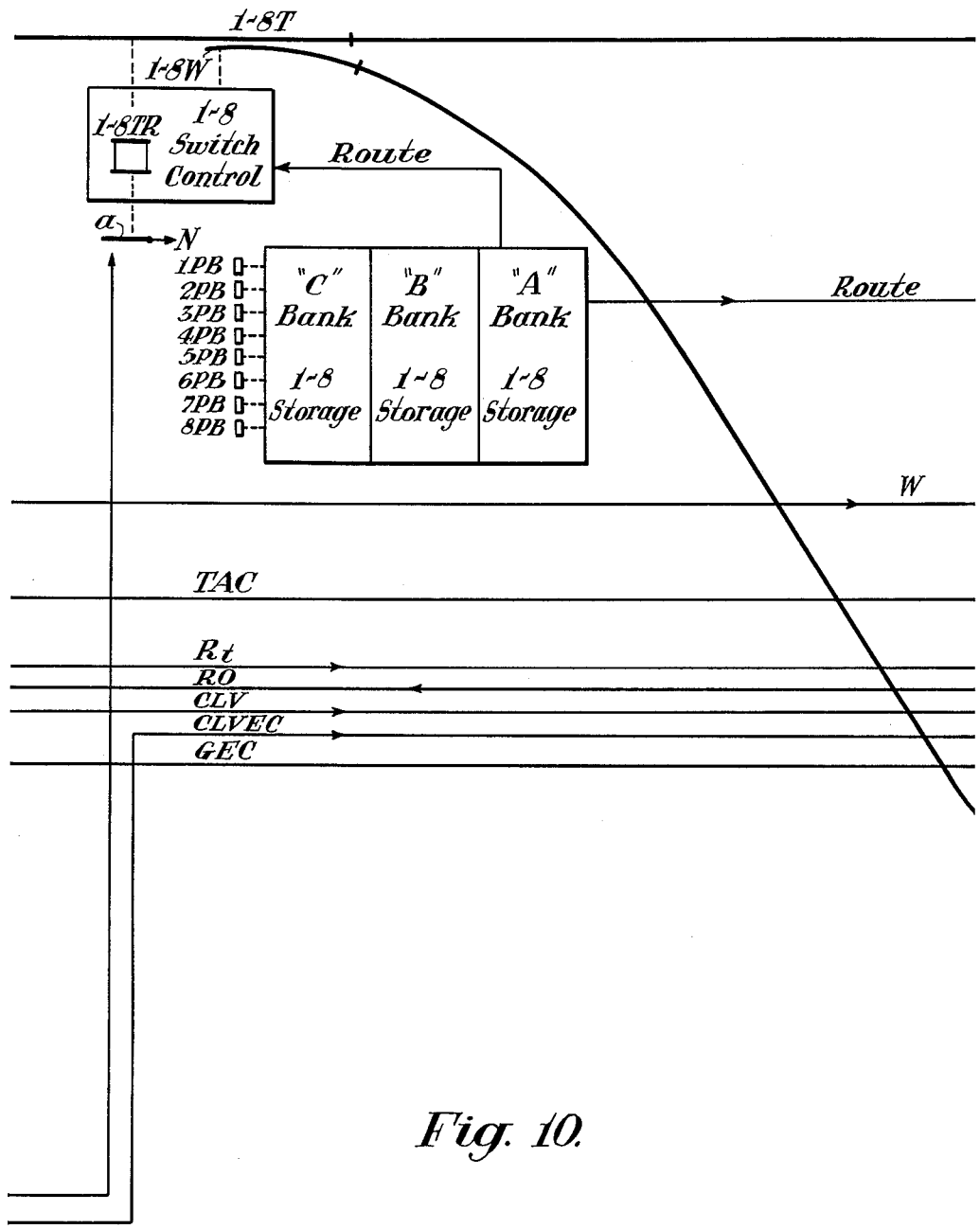
Figure 34:
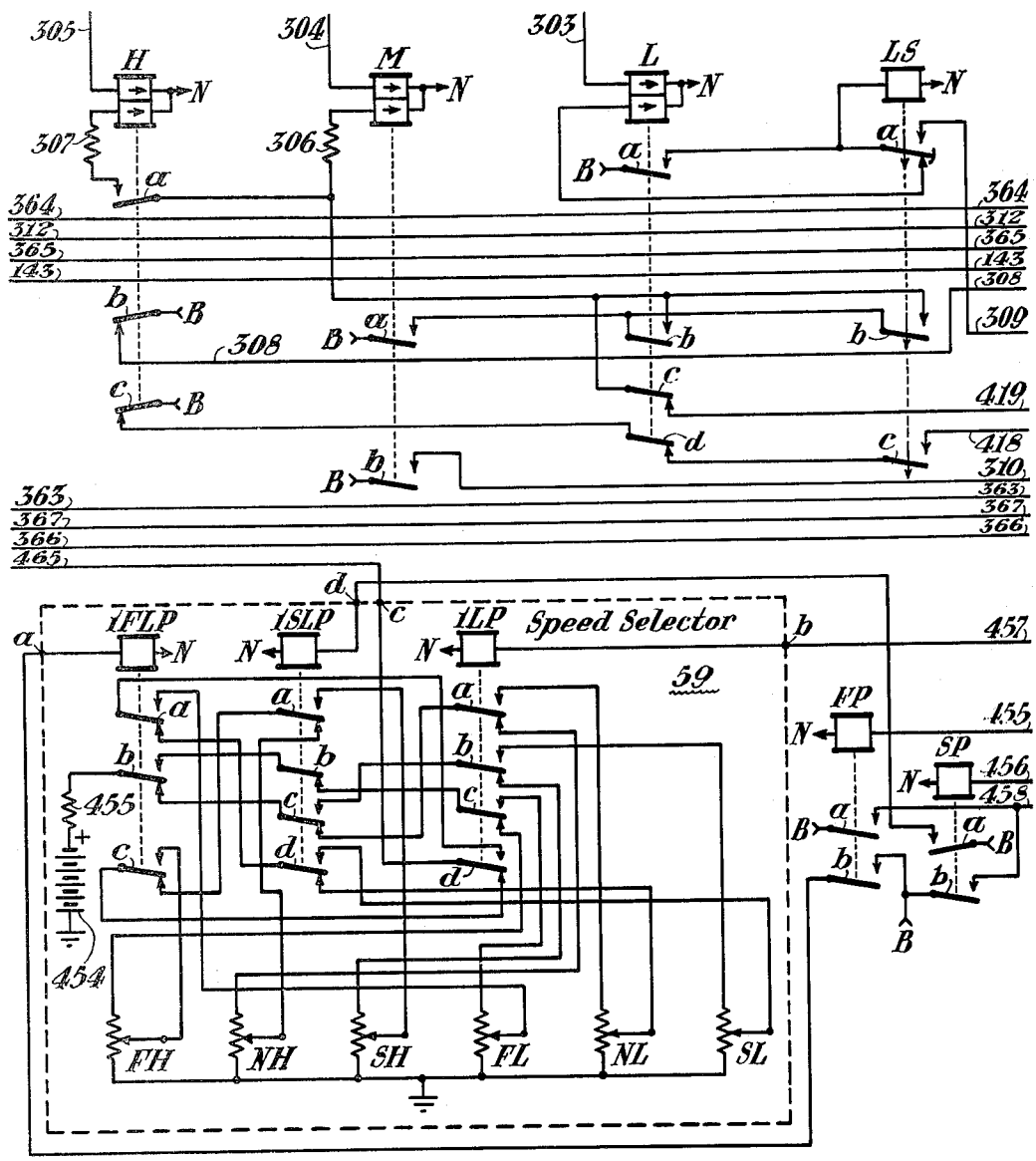

As shown in FIGS. 8 and 9, two identical speed selector units 59 and 63 are employed to control the first and second sections of the master retarder. The details of speed selector 59 are shown in FIG. 34, unit 63 being shown schematically in FIG. 38. These speed selector units operate to select one of a predetermined number of desired leaving speeds from the master retarder based on the weight of the cut and the position of the previously described FNS lever, which has a fast or F position used, in one embodiment of our invention, below about 40° F. to permit increased speeds, a slow or S position, used above about 85° F. to require reduced speeds, and a normal or N position which may be selected by the operator, generally between 40 and 85° F., depending on the overall rolling conditions in the yard. That is, if the overall conditions make cars roll more slowly than normal, lever position F is selected to increase permitted retarder leaving speeds. If cars are rolling faster than normal, lever position S is selected. In actual practice, as will later appear, the FNS lever performs a plurality of functions in the system. In practice, only one lever is usually provided, which may have a plurality of contacts, or in some cases a plurality of connections to one set of contacts, to carry out these various functions. However, for simplicity and to avoid unduly complicating the drawings, a separate FNS lever has been indicated for each function in the drawing, these levers all being simply indicated as FNS to indicate that they would be interconnected for actuation by a single movement.

Speed selector 59, as shown in FIG. 34, comprises three selecting relays 1FLP, 1SLP and 1LP, a source of potential 454, a current limiting resistor 455, and six adjustable potentiometers FH, NH, SH, FL, NL and SL. As indicated by the reference characters employed, each of these potentiometers corresponds to a particular combination of weight (heavy, H or light, L) and FNS lever position. That is, potentiometers FH and FL are selected with the FNS lever in its F position, potentiometer NH or NL is selected when the lever is in its N position, and potentiometer SH or SL is selected with the lever in its S position, depending upon whether the weight is heavy or light. The weight of the cut is divided for other purposes into the three previously described classes of light, medium and heavy. However, for the purposes of the speed selector unit, medium weight cars are considered as heavy and the initial weight storage code is modified to indicate only light or heavy in these terms by circuits to be described.

For the purposes of energizing the speed selector unit, two repeater relays FP and SP (FIG. 34) are provided for lever FNS (FIG. 35). Relay FP is directly controlled by an obvious circuit extending from terminal B of the battery over terminal F of the FNS lever, lead 455, and through the winding of relay FP to terminal N of the battery.

Relay SP is controlled by an obvious circuit extending from terminal B of the battery over terminal S of the FNS lever, lead 456, and through the winding of relay SP to terminal N of the battery.

Relay 1LP (FIG. 34) has a first pickup circuit extending from terminal B of the battery over terminal N of lever FNS (FIG. 35), back contact $d$ of relay RH1, front contact $d$ of relay RL1, lead 457, terminal $b$ of speed selector 59, and through the winding of relay 1LP to terminal N of the battery. Relay 1LP has a second pickup circuit which extends from terminal B of the battery over front contact $a$ of relay FP, lead 458, back contact $c$ of relay RH1, front contact $c$ of relay RL1, lead 457, terminal $b$ of unit 59, and through the winding of relay 1LP to terminal N of the battery. Relay 1LP has a third pickup circuit which extends from terminal B of the battery over front contact $b$ of relay SP, lead 458, back contact $c$ of relay RH1, front contact $c$ of relay RL1, lead 457, terminal $b$ of speed selector unit 59, and through the winding of relay 1LP to terminal N of the battery. Accordingly, relay 1LP is picked up over its first circuit if the FNS lever is in its N position and the cut is of light weight, as indicated by the energized condition of relay RL1 and the deenergized condition of relay RH1. Relay 1LP is energized by its second or third circuits if relay FP or SP, respectively, is up, and if the weight of the cut is light as indicated by the energization of relay RL1 and the release of relay RH1.

Relay 1SLP has a single pickup circuit which extends from terminal B of the battery over front contact $a$ of relay SP, terminal $d$ of unit 59, and through the winding of the relay to terminal N of the battery. Relay 1SLP is accordingly picked up when the FNS lever is in its S position.

Relay 1FLP has an obvious pickup circuit extending from terminal B of the battery over front contact $b$ of relay FP, terminal $a$ of the speed selector unit, and through the winding of relay 1FLP to terminal N of the battery.

As previously described relays RL1 and RH1 are energized in a particular combination according as the measured weight of the cut is light, medium or heavy. Since it is desirable to use only two weight categories in the speed selector unit, it is sufficient to recognize whether the cut is light in order to classify it in one of the two classes L (light) or H (medium or heavy). This question is determined by the condition of relay 1LP which is controlled as previously described.

Depending upon the condition of energization of relays 1LP, 1SLP, and 1FLP, one of the six output potentiometers is connected in circuit to select a desired leaving speed. Potentiometer FH has an energizing circuit extending from ground through battery 454, resistor 455, over the front point of contact b of relay 1FLP, back contact b of relay 1SLP, back contact c of relay 1LP, and through the resistance element of potentiometer FH to ground. At the same time, the movable wiper on potentiometer FH is connected to output terminal c of the speed selector unit over the front point of contact c of relay 1FLP, and the back point of contact d of relay 1LP. The wiper on potentiometer FH will be adjusted to select a portion of the voltage from battery 454 corresponding to a relatively high leaving speed required for a heavy car under slow overall operating conditions.

Potentiometer NH has an energizing circuit which extends from ground through battery 454, resistor 455, over back contact b of relay 1FLP, the back point of contact c of relay 1SLP, the back point of contact a of relay 1LP, and through the resistive element of potentiometer NH to ground. At the same time, the wiper of potentiometer NH is connected to output terminal c over the back point of contact a of relay 1SLP, the back point of contact c of relay 1FLP, and the back point of contact d of relay 1LP. The selection of potentiometer NH provides a somewhat lower voltage than potentiometer FH which is suitable for a heavy car under normal operating conditions.

Potentiometer SH has an energizing circuit extending from ground through battery 454 and resistor 455, over the back point of contact b of relay 1FLP, the front point of contact c of relay 1SLP, the back point of contact b of relay 1LP, and through the resistive element of potentiometer SH to ground. The wiper of potentiometer SH is connected to terminal c over the front point of contact a of relay 1SLP, the back point of contact c of relay 1FLP, and the back point of contact d of relay 1LP. The wiper of potentiometer SH is adjusted to give a voltage somewhat smaller than that of potentiometer NH, to permit a lower leaving speed for a heavy cut under fast rolling conditions.

Potentiometer FL has an energizing circuit extending from ground through battery 454 and resistor 455, over the front point of contact b of relay 1FLP, back contact b of relay 1SLP, the front point of contact c of relay 1LP, and through the resistive element of potentiometer FL to ground. The adjustable wiper of potentiometer FL is connected to output terminal c over the front point of contact a of relay 1FLP and the front point of contact d of relay 1LP. The wiper of potentiometer FL is adjusted to give a voltage somewhat in excess of that selected by potentiometer FH, corresponding to a higher leaving speed required for a light car under slow operating conditions.

Potentiometer NL has an energizing circuit extending from ground through battery 454 and resistor 455, over back contact b of relay 1FLP, the back point of contact c of relay 1SLP, the front point of contact a of relay 1LP, and through the resistive element of potentiometer NL to ground. At the same time, the wiper of potentiometer NL is connected to output terminal c over the back point of contact d of relay 1SLP, the back point of contact a of relay 1FLP, and the front point of contact d of relay 1LP. This wiper is adjusted to provide a lower value of voltage than potentiometer FL to select a suitable leaving speed for light cars under normal rolling conditions.

Potentiometer SL has an energizing circuit extending from ground through battery 454 and resistor 455, over back contact b of relay 1FLP, front contact c of relay 1SLP, the front point of contact b of relay 1LP and through the resistive element of potentiometer SL to ground. The movable wiper of potentiometer SL is connected to output terminal c over the front point of contact d of relay 1SLP, the back point of contact a of relay 1FLP and the front point of contact d of relay 1LP. This wiper is adjusted to give relatively low leaving speed for light cars under fast rolling conditions.

Figure 15:
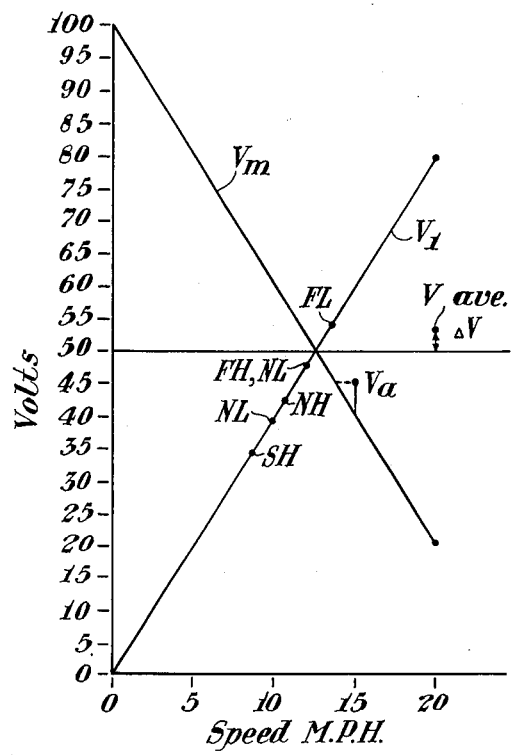
FIG. 15 is a graph showing certain voltage relationships in a speed control unit employed in the illustrated embodiment of our invention.

While any selected plurality of leaving speeds may be used in the scope of my invention, depending on the grades in the classification yard, the length and efficiency of retarders, and the type of cars being classified, according to one embodiment of our invention, the leaving speeds selected by potentiometers FH, NH, SH, FL, NL and SL may be 12.0, 10.8, 8.8, 13.6, 12.0 and 10.0 miles per hour, respectively. Referring to FIG. 15, each of these selected values will lie along curve $V_1$, and the selected voltages will be as shown in FIG. 15. It will be apparent from the above description that the output voltage on terminal c of the speed selector unit will have a value corresponding to speed selector leaving speed $V_1$ as chosen by the measured weight of the cut and the selected position of lever FNS.

Figure 38:
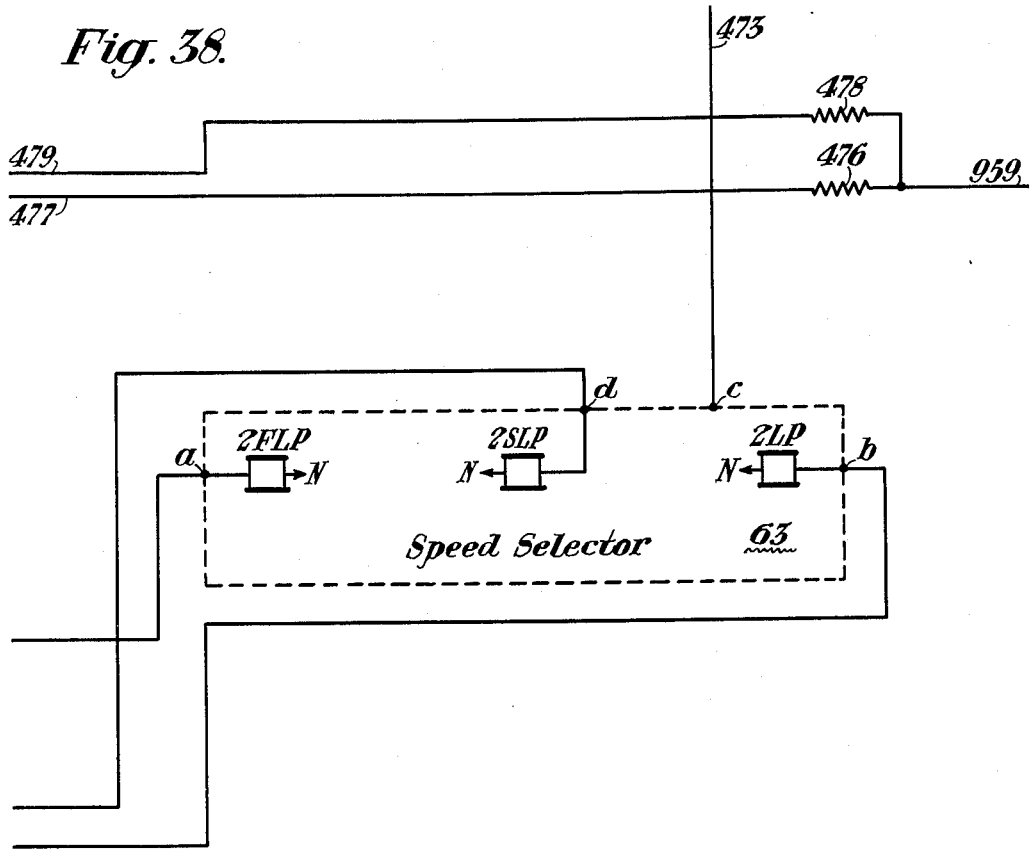

The operation of speed selector unit 63 in FIG. 38 is identical with unit 59 previously described. Terminals a through d of unit 63 correspond to the same terminals of unit 59 in FIG. 34.

*The speed control circuits*

Figure 14:
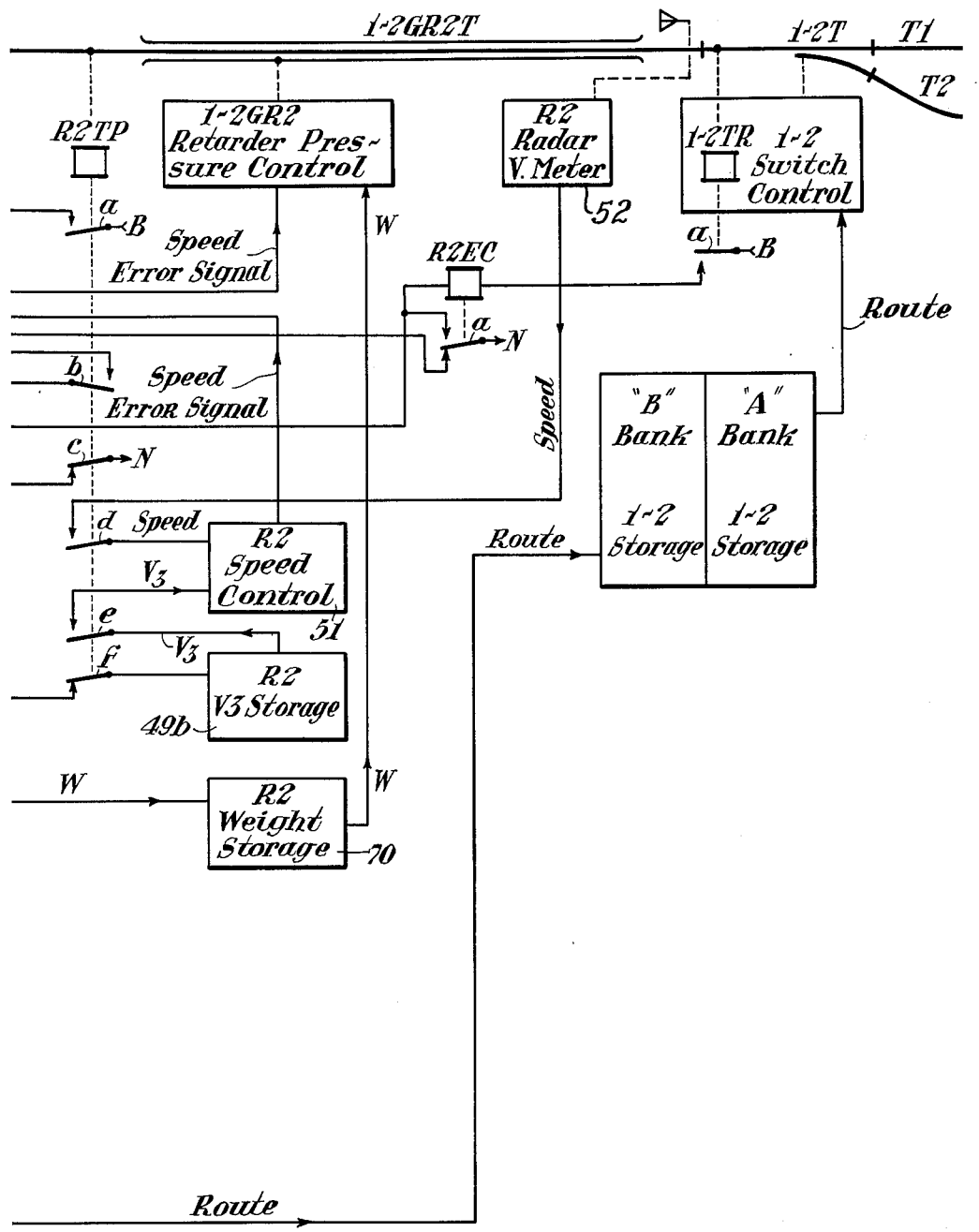

As shown in FIGS. 8 and 9, two speed control units 61 and 65 are used for the master retarder. Two identical speed control units are used for each group retarder. As illustrated in FIGS. 13 and 14, group retarder 1-2GR employs a first speed control unit 50 to control the first section and a second speed control unit 51 to control the second section. Similar units are employed for the other group retarders, but since they would be similarly disposed, they are not illustrated. Each of these speed control units may be of the type disclosed and claimed in the copending application of Richard D. Campbell and James A. Cook, Serial No. 676,732, filed on August 7, 1957, for Control Circuits, and assigned to the assignee of the present application. Since these units have been fully described in the copending application, they will not be described in detail here. However, in order to facilitate an understanding of the present invention, the details of typical speed control unit 61 are shown in FIGS. 19 and 20, and the operation thereof will be briefly described.

Referring now to FIGS. 19 and 20, the reference numerals used in the above noted application of Campbell and Cook have been retained, except that in order to avoid confusion with other reference characters used in the system they have been preceded by the letter R for resistor, C for capacitor and V for vacuum tube. Moreover, the relays designated as 114 and 128 in the copending application are designated 1BSCR and 1ASCR, respectively, to correspond to the designations used in a particular embodiment of our invention. Further, in some cases we have shown pairs of triodes enclosed in a single envelope, since we find it convenient to employ conventional dual triodes in many cases. However, separate halves of these triodes have been given designations corresponding to those in the copending application, accompanied by the prefix V.

The output from terminal a of radar velocity meter 17, as shown in FIG. 15, is basically a voltage Vm which falls from a value of 100 volts when the radar unit is measuring a speed of 0 miles per hour to a value of 20 volts when the measured speed is 20 miles per hour. The values of V1 which are selected fall on line $V_1$ between a value of 0 volts for 0 miles per hour and 80 volts for 20 miles per hour. Obviously, therefore, if the measured voltage equals the selected voltage, the average value of these voltages over the entire speed range is 50 volts. The speed control unit functions to measure this average value and to indicate any departure therefrom by a suitable combination of energized relays.

As shown in FIGS. 19 and 20, the input from radar velocity meter 17 appearing at terminal a is supplied over lead 463, front contact *i* of relay R1TP (FIG. 33), lead 464, to terminal *b* of speed control unit 61. The output of speed selector unit 59, previously described, appearing at terminal *c* (FIG. 34) is supplied over lead 465, front contact *g* of relay R1TP (FIG. 33), and lead 466, to terminal *a* of speed control unit 61.

The values appearing at terminals *a* and *b* of unit 61 are averaged by means of cathode follower stages V14 and V15 and summing resistors R26 and R27, as more fully described in the above noted copending application. The average value of the speed selector voltage and the radar measured speed voltage appearing at the summing terminal of resistors R26 and R27 is supplied to the grid of amplifier V32.

At the same time, the radar speed signal appearing at the cathode of V14 is supplied through capacitor C35 to a differentiating and noise eliminating network comprising tubes V41, V45, V57, V51 and V67, as more fully described in the above noted application of Campbell and Cook. The output of this network is a signal in accordance with the rate of change of the output of the radar velocity meter. A portion of this signal is coupled directly to the grid of amplifier tube V102 through resistor R93, and another portion is differentiated in capacitor C91 to add a small component proportional to the second time derivative of the radar signal. This signal adjusts the current flow through tube V102, therefore affecting the voltage drop through cathode resistor R110 and adjusting the plate current through V32 which occurs as a result of the averaged signal applied to its grid. The voltage at the plate of V32 will, therefore, be varied in accordance with the average of the signals from the speed selector and radar velocity meter, as well as components of the first and second time derivatives of the radar signal. The latter two signals may be omitted, if desired, in our present system, but in one embodiment are provided to improve the damping of the system.

The combined signal appearing at the plate of V32 is applied to the grid of a first amplifier V111 through a voltage divider network comprising resistors R106 and R107, and in parallel to the grid of a second amplifier V125 through a voltage divider comprising resistors R122 and R123. Resistors R107 and R123 may be of the same value, for example, 6.8 megohms. Resistor R106 has a slightly lower value than does resistor R122. For example, according to one embodiment of our invention, R106 may be 4.7 megohms and R122 may be 5 megohms. Therefore, the voltage applied to the grid of tube V111 will always be slightly greater than that applied to the grid of tube V125. The apparatus is initially adjusted so that with the average voltage applied to the grid of V32 equal to 50 volts, and with no time derivative signals applied to the grid of tube V102, tube V111 will be conducting and tube V125 will be either cut off or conducting a relatively small current. Relay 1ASCR is connected in the plate circuit of V111, so that when tube V111 is substantially conducting, it will be picked up. Relay 1BSCR is connected in the plate circuit of tube V125, such that it will be picked up if tube V125 is conducting substantially, but will be released if V125 is substantially non-conducting, or conducting a relatively small value of current.

As will be apparent from the preceding description, and now referring to FIG. 15, as well as to FIGS. 19 and 20, if the radar signal has a value corresponding to the speed selected by the speed selector unit, the average value of the two voltages will be 50 volts, which voltage will be applied to the grid of tube V32, causing tube V111 to conduct and tube V125 to be relatively non-conducting. Therefore, relay 1ASCR will be picked up and relay 1BSCR will be released. However, if the speed selector is adjusted for an output speed V1 of 15 miles per hour (to take an example conveniently located on the curves) corresponding to a voltage of 60 volts, and the actual speed measured by the radar, $Va$ in FIG. 15, is 45 volts, corresponding to the lower speed of 13.8 miles per hour, the voltage input to tube V32 in FIG. 19 will be 52.5 volts, corresponding to an error signal $\Delta V$ of 2.5 volts. Accordingly, the plate current through V32 will increase and the voltage at the plate will drop, causing tube V111 to cease conduction and releasing relay 1ASCR. As will later appear, this will result in air being released from the retarder operating cylinders. The same result could be obtained if the actual speed of the car was equal to the desired speed, but the car was still decelerating such that a negative signal was applied to the grid of tube V102. In this event, the decreased cathode voltage applied to V32 across common cathode resistor R110 will cause a drop in the plate voltage of V32 and cause relay 1ASCR to be released. On the other hand, if the measured speed is above the selected speed, the measured voltage $Vm$ will be lower than that which would give an average voltage of 50 volts at the grid of V32, the voltage at the plate of V32 would rise, and both tubes V111 and V125 would be caused to conduct, causing both of relays 1BSCR and 1ASCR to be picked up, which, as will later appear, will result in more air being supplied to the retarder control cylinders. The latter result could also be effected by acceleration of the car, even though its speed was equal to the selected speed, in which case a positive going signal would be applied to the grid of tube V102, increasing the voltage at the cathode of tube V32 and causing a rise in its plate voltage.

It will appear from the above description that relays 1ASCR and 1BSCR are both released when the unit is not operating, when there is no car in the area viewed by the radar, when a cut has a speed below the selected speed, or when the combined speed and speed derivative signals indicate a need for less braking. When the measured speed and time derivatives of the measured speed together indicate that the cut is being properly retarded, relay 1ASCR is picked up and relay 1BSCR is released. When the speed of the cut is above the desired speed, or when the combined speed and time derivative signals indicate a need for further braking, both relays 1BSCR and 1ASCR are picked up.

As will later appear, two sets of exhaust valves are provided for each section of each retarder. Signals for energizing these valves are supplied to terminals *f* and *g* of unit 61 from terminal B of the battery over the back point of contact *a* and back contact *b*, respectively, of relay 1ASCR. A signal for energizing the intake valves is supplied to terminal *e* of speed control unit 61 from terminal B of the battery over the front point of contact *a* of relay 1ASCR and front contact *a* of relay 1BSCR.

Figure 31:
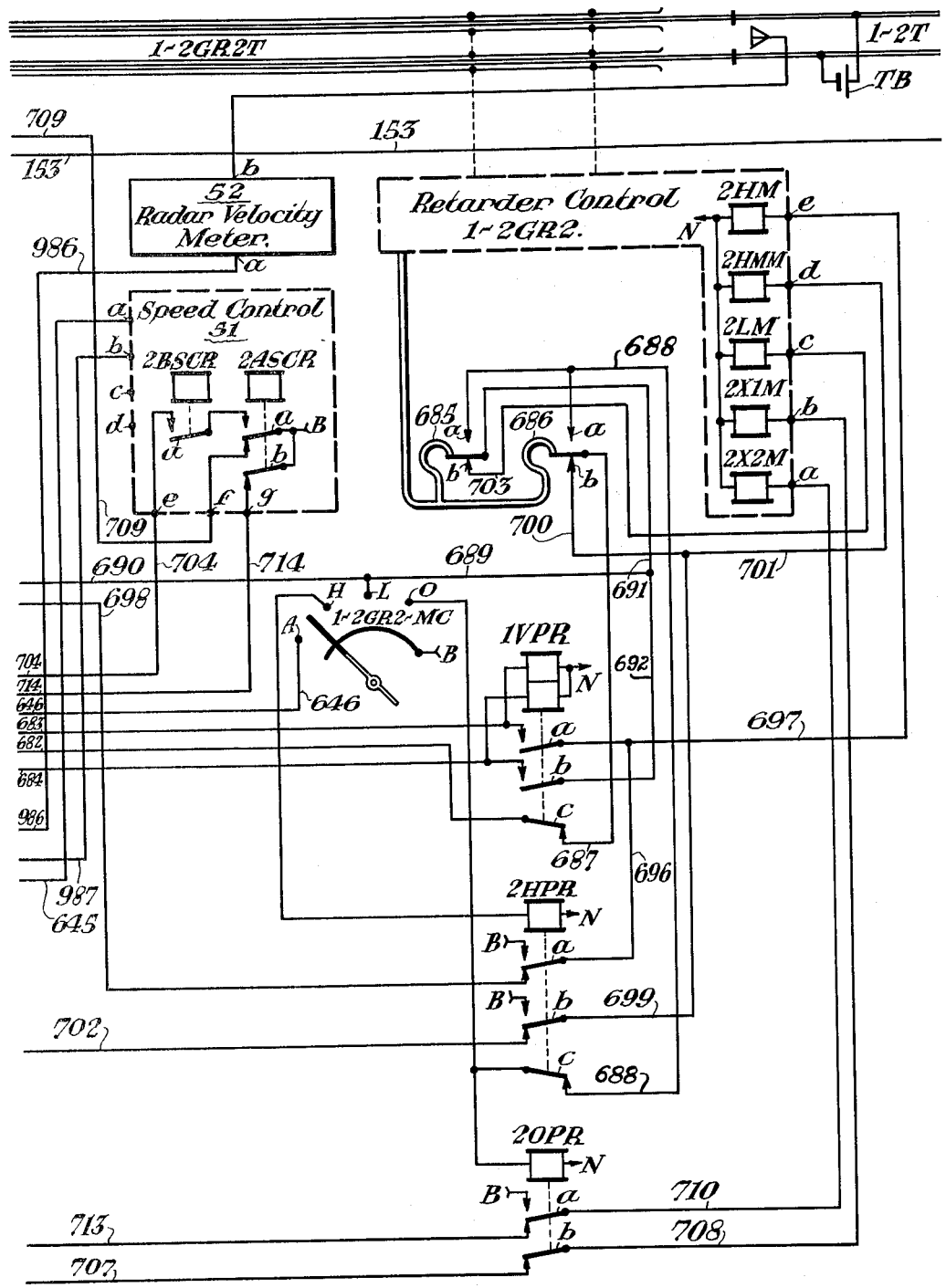

Terminals *a* through *g* of speed control unit 61 correspond to the same terminals of speed control unit 65, shown in FIG. 22, unit 50, shown in FIG. 28, and unit 51, shown in FIG. 31. Since these units are identical with unit 61, they will not be described in detail.

*The voltage detector*

Referring to FIG. 9, the correct leaving velocity unit 66 comprises a voltage detector circuit shown in detail in FIG. 39. The same circuit is shown at 480 in FIG. 53, for the purpose of checking the output of the computer in response to a test problem which is supplied during the time when the computer is not otherwise occupied. This unit has been disclosed and claimed in the copending application of James A. Cook, Jr., and Roelif Stapelfeldt, Serial No. 676,731, filed August 7, 1957, for Voltage Detector Circuit, assigned to the assignee of the present application and now Patent No. 2,965,889, issued December 20, 1960.

For the purposes of comparing this application with this prior patent, it should be noted that input terminal *a* of voltage detector 66 in FIG. 39 corresponds to the output from computer 11 in the drawing of the patent. For simplicity, tubes 19, 29, 45 and 61 in the patent have been shown as a D.C. amplifier 469 in FIG. 39.

Also in FIG. 39, tube V470 corresponds to tube 69, the two stages of dual triode V471 correspond to tubes 85 and 97, tube V472 corresponds to tube 115, relay CK corresponds to relay 119, and relay BN corresponds to relay 131, all in the prior patent. Since the structure and operation of this circuit have been described in detail in the patent, such a description will not be repeated here. However, in order to facilitate an understanding of the operation of our system, the operation of the voltage detector will be briefly described.

A signal voltage applied to terminal *a* of the voltage detector is amplified in D.C. amplifier 469 and applied to the grid of a paraphase amplifier V470. The output at the plate at V470 is applied to the grid of one-half of tube V471, whereas the output at the cathode of V470 is applied to the grid of the other section of tube V471. The apparatus is so designed that with a voltage of 50 volts applied to terminal *a*, the conduction in both halves of V471 will be equal, and the voltage across the common cathode resistor will be at a maximum. This voltage is coupled to the grid of an amplifier V472. A voltage checking relay CK, in the plate circuit of V472, is accordingly maintained in an energized condition, closing its front contact *a*. If the voltage at terminal *a* rises above 50 volts, the conduction in tube V470 will be decreased, due to the inversion in amplifier 469, and the voltage at the plate of tube V470 will increase, slightly increasing the conduction in one-half of V471. However, at the same time, the decrease in the cathode voltage of tube V470 will cause a marked decrease in the conduction of the other half of V471, and the overall effect will be to lower the cathode voltage in tube V471 to a value insufficient to energize relay CK through amplifier V472. In a similar manner, if the voltage at terminal *a* decreases below 50 volts, an increase in the grid voltage of V470 will result, causing its plate voltage to drop and its cathode voltage to increase. This will cause slightly increased conduction in the left half of tube V471, but will cause a marked decrease in the conduction of the right half of tube V471. The result will again be a net decrease in the cathode voltage of tube V471. Amplifier V472 will accordingly conduct a current insufficient to energize relay CK.

Relay BN is employed to check the negative battery voltage in the voltage detector. This relay has a front contact *a* which is included in a series circuit with front contact *a* of relay CK, such that when both relays are picked up output terminal *b* of the voltage detector is energized from terminal B of the battery.

As applied to the correct leaving velocity check function in FIG. 39, the voltage detector functions in the following manner. The output from radar velocity meter 17 is applied to terminal *b* of speed control unit 61 (FIG. 19) as previously described. The voltage from speed selector unit 59 is applied to terminal *a* of speed control unit 61. As previously described, the cathodes of tube V14 and V15 follow these applied voltages, so that terminals *c* and *d* of speed control unit 61 are energized with voltages proportional to the radar output voltage and the speed selector voltage, respectively. Referring now to FIG. 22, speed control unit 65 has similar terminals *a*, *b*, *c* and *d*. Accordingly, the voltage at terminal *c* of unit 65 is proportional to the output of radar velocity meter 19, and the voltage at terminal *d* is proportional to the output of speed selector 63 (FIG. 38). That is, output terminal *c* of speed selector unit 63 is connected to terminal *a* of speed control unit 65 over lead 473, and terminal *a* of radar velocity meter 19 is connected to terminal *b* of speed control unit 65 over lead 474, front contact *d* of relay R2TP (FIG. 36) and lead 475.

Terminal *c* of speed control unit 65 is connected to one terminal of a summing resistor 476 (FIG. 38) over lead 477, and terminal *d* of the speed control unit is connected to one terminal of a second summing resistor 478 over lead 479. The opposite terminals of summing resistors 476 and 478 (FIG. 38) are connected to terminal *a* of voltage detector 66 (FIG. 39) over lead 959.

Referring again to FIG. 15, it will be recalled that the average of the voltages from the speed selector unit and the radar speed measuring unit is 50 volts when the actual speed equals the desired speed. Therefore, as will be apparent to those skilled in the art, the voltage at terminal *a* will be 50 volts when the actual speed equals the desired speed. Under these conditions, as previously described, relays CK and BN will be energized, and terminal *b* of voltage detector 66 will be energized from terminal B of the battery. The utility of this energized terminal has previously been described in connection with the description of the correct leaving velocity checking circuits.

The operation of voltage detector unit 480 shown in FIG. 53 is the same as that described above. By circuitry to be later described, a test problem is supplied to the computer during intervals when it is not solving actual problems. If the computer is properly functioning, it will provide an output voltage at terminal *a* of voltage detector 480 at this time which is equal to 50 volts. Under these conditions, terminal *b* of voltage detector 480 will be energized from the positive terminal of the battery and will complete an obvious energizing circuit for a test computer check relay TCCR.

*The master retarder*

Figure 21:
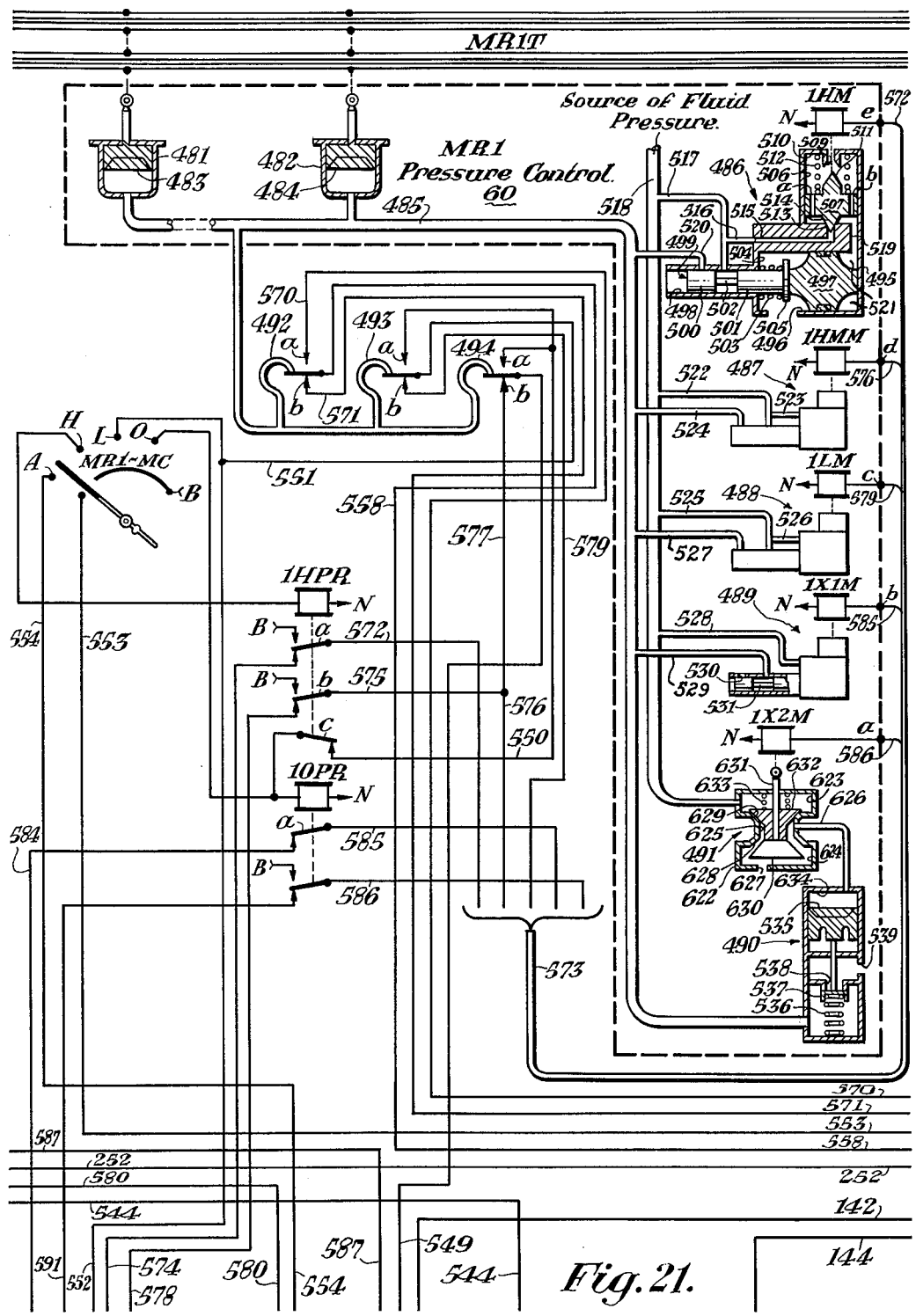

As shown in FIGS. 21 and 22, a pressure control unit 60 is provided for the first section of the master retarder and a second pressure control unit 64 is provided for the second section of the master retarder. Pressure control unit 60 includes a suitable plurality of operating cylinders such as 481 and 482, which have pistons 483 and 484 connected to the braking bars of the retarder in a conventional manner, well known in the art, which will not be further described. These cylinders are connected either to atmosphere or to a suitable source of fluid pressure, not shown, by means of a manifold 485.

The supply of fluid from the source to the manifold is controlled by three fast acting intake valves 486, 487, and 488. These intake valves are controlled, in a manner to be described, by control magnets 1HM, 1HMM and 1LM, respectively. Manifold 485 is connectable to the atmosphere, or any suitable fluid return, by means of a plurality of exhaust valves having different characteristics. While any number of such valves may be employed within the scope of our invention, at least one fast-acting valve such as 489, which may be of the same construction as intake valves 486 and 487, is employed, and at least one larger capacity and relatively more slowly acting valve 490 is employed. Valve 489 is controlled by a magnet 1X1M, and valve 490 is controlled by a pilot valve 491, which is in turn controlled by a magnet 1X2M. The pressure in manifold 485 is registered by three Bourdon tubes 492, 493 and 494. These tubes operate contacts in a manner to be described.

Valve 486, which is also typical of valves 487 and 489, may be of any conventional design, but is preferably of the type sold by Westinghouse Air Brake Company under the name "Pilotaire." As schematically shown, such a valve may comprise a casing 495 including a first cylindrical passage 496 in which a piston 497 is slidably mounted. A second cylindrical passage 498 is formed in casing 495, in which a valve stem 499 formed integrally with piston 497 is slidably received. Stem 499 comprises a first portion 500 and a second portion 501 which are substantially the same diameter as passage 498, and a reduced portion 502 which is of smaller diameter than the passage. A spring 503 is mounted between wall 504 of casing 495 and a retaining flange 505 formed on piston 497. A third cylindrical chamber 506 is formed in casing 495, and slidably received in this chamber is a valve element 507. Valve element 507 is provided with vent passages such as *a* and *b*.

A valve seat 509 is formed about a port in the end wall 510 of casing 495. A valve portion 511 formed on valve element 507 is adapted to engage seat 509 in sealing relationship. A spring 512 is disposed between valve seat 509 and portion 511 of valve element 507 to urge the valve element out of engagement with the valve seat.

A second valve seat 513 is formed about a port in chamber 506 at the opposite side of valve element 507, and is adapted to engage a mating portion 514 formed on valve element 507 in sealing relationship. A port 515 in casing 495 communicates with chamber 506, and is connected at the other end through conduits 516 and 517 to manifold 518 which is connected to the fluid pressure source.

A passage 519 extends between chambers 496 and 506. A first conduit 517 connects passage 498 to supply manifold 518, and a second conduit 520 connects passage 498 to manifold 485 as shown.

The intake magnet 1HM has an armature operatively connected to move portion 511 of valve element 507 into engagement with valve seat 509 against the resistance of spring 512 when the magnet is energized.

In operation, when magnet 1HM is deenergized, fluid pressure from supply manifold 518 appearing in conduits 517 and 516 is prevented from entering chamber 506 by the engagement of valve member 514 with seat 513. Any fluid which might leak around member 514 would be released to the atmosphere through passages such as *a* and *b* and the open port in end wall 510. The fluid pressure in conduit 517 is cut off from the conduit 520 by portion 500 of valve stem 499.

Piston 497 is maintained in the position shown in the drawing by the action of spring 503. When magnet 1HM is energized, valve element 507 is drawn up against the force of spring 512, causing member 511 to engage seat 509 and close the port in wall 510. Fluid pressure from manifold 518 is then conducted to compartment 521 in chamber 496 through conduits 517 and 516, chamber 506 and passage 519. Piston 497 is thereby moved against the force of spring 503 and reduced portion 502 will permit fluid pressure from supply mainfold 518 to be conducted through conduits 517 and 520 to manifold 485 and thence to operating cylinders 481 and 482, and such other cylinders as may be provided in any particular case. It is found that this construction results in rapid response of the actuating cylinders to the energization of magnet 1HM.

Valves 487 and 488 are constructed identically with valve 486, and hence will not be described in detail. However, according to one preferred embodiment of our invention, valve 488 is approximately half the size and capacity of valves 486 and 487, and is correspondingly more rapid in its response. Conduits 522 and 523 of valve 487 correspond to conduits 517 and 516 of valve 486 and conduit 524 corresponds to conduit 520. Similarly, conduits 525, 526 and 527 connected to valve 488 correspond to conduits 522, 523 and 524 of valve 487.

It will be apparent that varying rates of response may be secured by energizing one or more of magnets 1LM, 1HMM and 1HM in combination, and circuits for carrying out this function will be described below.

Exhaust valve 489 is identical in structure with valve 486, except that it has only a single supply conduit 528 corresponding to conduit 517 and 516 of valve 486, and that its manifold connection 529 is brought back to the rear port in its valve chamber 530, while the forward port is connected to the atmosphere, in such a way that when energized, the reduced portion 531 of the valve stem moves to the left in FIG. 21, connecting manifold 485 to atmosphere through conduit 529, and thus causing a rapid, but relatively small, decrease in the pressure in the operating cylinders.

Exhaust valve 490 may be of a type well known in the art, and formerly used as a sole means of control for conventional retarders. It is characterized by opening more slowly than the valves such as 486 previously described, but once opened, it has a capacity substantially greater than the smaller and faster valves. Valve 490 is controlled by a pilot valve 491 of conventional solenoid operated construction. As schematically shown, pilot valve 491 comprises a casing 622 having a first chamber 623 and a second chamber 624 joined by a passage 625. The source of fluid pressure is connected to chamber 623 by manifold 518. Connecting passage 625 is provided with an output conduit 626. Chamber 624 is vented to the atmosphere or a suitable fluid return by means of a port 627. The ends of passage 625 are formed into valve seats 628 and 629. A first valve element 630 is adapted to cooperate with valve seat 628, and has a stem 631 connected to a magnet or solenoid 1X2M. A second valve element 632 has a central opening through which stem 631 is slidably received. Valve element 632 is normally urged into engagement with valve seal 629 by a spring means 633 disposed around stem 631 and confined by the valve member 632 and the end wall of casing 622. In operation, when magnet 1X2M is energized, stem 631 is raised, urging valve member 630 into engagement with valve seat 628, and raising valve element 632 out of engagement with valve seat 629. Fluid pressure from manifold 518 is thereby supplied through output conduit 626 to an upper chamber 634 in valve 490, driving a piston 535 downwardly against the force of spring 536 and disengaging a valve 537 from its seat 538 to vent manifold 485 through port 539.

In operation, the pressure control has varying response characteristics depending upon the desired rate and extent of response. Energizing one or more of intake valve magnets 1LM, 1HMM and 1HM causes air to be supplied to the operating cylinders at rates varying from a slow rate quickly established by half-size valve 488 alone, to a rapid rate obtained by the use of valves 486 and 487 in parallel. A medium rate of response is attained by the use of valve 487 alone. The exhaust magnets are normally energized in parallel in the automatic operation of the system, and a plurality of valves may be supplied in parallel in place of each of the illustrative valves 489 and 490. If both magnets 1X1M and 1X2M are simultaneously energized, valve 489 responds very rapidly to produce a relatively slight pressure decrease in the operating cylinders which is quickly reflected by the action of the Bourdon tubes, which reflect back to the control system the fact that operation has been commenced in order to improve the system damping. The larger valve 490, opening after valve 489, provides the bulk of the exhaust capacity required for quickly reducing the pressure in the operating cylinders.

Bourdon tube 492 is set to close its front contact *a* at a pressure of 85 p.s.i., and to close its back contact *b* at a pressure of 35 p.s.i. This tube is used to pre-set the second retarder section, as will appear. Bourdon tube 493 is set to close its front contact *a* at 37 p.s.i. and to close its back contact *b* at 30 p.s.i. As will be described, this tube is used to establish a maximum pressure for light cars. Bourdon tube 494 is set to close its front contact *a* at a pressure of 82 p.s.i., and its back contact *b* at a pressure of 75 p.s.i. This tube is used to establish a maximum pressure for medium cars, and to establish a standby pressure, as will be described.

Pressure control unit 64 for the second section of the master retarder is substantially the same as the first section pressure control unit 60, and will, therefore, not be described in detail. Its intake valves are controlled by intake magnets 2HM, 2HMM and 2LM, and its exhaust valves are controlled by exhaust magnets 2X1M and 2X2M, in the same manner as are the corresponding valves of the first section pressure control. The second section has only two Bourdon tubes, 540 and 541. Tube 540 is set to close its front contact *a* at 37 p.s.i., and to close its back contact *b* at 30 p.s.i. This tube is used to establish a maximum pressure for light cars and to preset the second section when contact *b* of tube 492 in the first section is closed. Bourdon tube 541 is adjusted to close its front contact *a* at 70 p.s.i. and to close its back contact *b* at a pressure of 63 p.s.i. This tube is used to preset the second section of the retarder when the pressure in the first section is between 35 and 85 p.s.i., in which case tube 492 in the first section will close neither of its contacts *a* or *b*, and to establish a standby pressure in the second section of the retarder.

The master retarder is provided with two manual levers, a lever MR1–MC for the first section, and a lever MR2–MC for the second section. Each of these levers has a position A to which the levers are adjusted when the equipment is to be operated automatically, a position H which may be selected by the operator to manually provide a control suitable for heavy or medium weight cars, a position L which may be selected by the operator to provide a manual control suitable for light cars, and a position O to which the lever may be moved to open the retarder.

Manual lever MR1–MC controls two relays 1HPR and 1OPR. Relay 1HPR is energized by an obvious circuit extending from terminal B of the battery over the contacts of the lever in its H position and through the winding of relay 1HPR to terminal N of the battery.

Relay 1OPR has a first pickup circuit extending from terminal B of the battery over the contacts of lever MR1–MC in the O position, and through the winding of relay 1OPR to terminal N of the battery. Relay 1OPR has a second pickup circuit which extends from terminal B of the battery over the front point of contact *a* of relay 1ASCR in speed control unit 61 (FIG. 20), front contact *a* of relay 1BSCR, terminal *e* of speed control unit 61, lead 542, lead 543, front contact *h* of relay R1TP (FIG. 33), lead 545, front contact *g* of relay AP (FIG. 36), to be described, which is closed when the apparatus is in its automatic position, lead 546, the front point of contact *g* of relay RH1, the front point of contact *g* of relay RL1, lead 549, front contact *a* of Bourdon tube 494, closed when the pressure in the retarder exceeds 82 p.s.i., lead 550, back contact *c* of relay 1HPR, and through the winding of relay 1OPR to terminal N of the battery. As previously described, Bourdon tube 494 provides a maximum pressure for the retarder when medium cars are being handled. By the second circuit for relay 1OPR just traced, it is apparent that when the speed control unit requests more air, as indicated by the energized condition of terminal *e* of speed control unit 61, when the cut is in the first section of the master retarder as indicated by the energized condition of relay R1TP, when the cut is of medium weight as indicated by the energized condition of relays RL1 and RH1, when the retarder is operating automatically as indicated by the energized condition of relay AP, and when the pressure exceeds the maximum pressure for medium cars as indicated by the closing of front contact *a* of tube 494, relay 1OPR is picked up. As will appear, this relay then controls the exhaust valves to open the retarder. Relay 1OPR has a third pickup circuit which extends from terminal B of the battery over the contacts of lever MR1–MC in its L position, lead 551, front contact *a* of Bourdon tube 493, closed when the pressure in the retarder exceeded 37 p.s.i., lead 550, back contact *c* of relay 1HPR, and through the winding of relay 1OPR to terminal N of the battery. As previously described, Bourdon tube 493 is employed to establish a pressure ceiling for light cars. It will now be apparent that this function is carried out in the manual operation of our system by completing the third traced energizing circuit for relay 1OPR over the contacts of the lever in its L position when the pressure exceeds 37 p.s.i., as indicated by closing of contact *a* of tube 493. Relay 1OPR has a fourth pickup circuit extending from terminal B of the battery over front contact *a* of relay 1ASCR in speed control unit 61 (FIG. 20), front contact *a* of relay 1BSCR, terminal *e* of speed control unit 61, lead 542, lead 543, front contact *h* of relay R1TP (FIG. 33), lead 545, front contact *g* of relay AP (FIG. 36), lead 546, the back point of contact *g* of relay RH1 (FIG. 35), front contact *f* of relay RL1, lead 552, lead 551, front contact *a* of Bourdon tube 493 (FIG. 21), lead 550, back contact *c* of relay 1HPR, and through the winding of relay 1OPR to terminal N of the battery. By this fourth circuit, the above mentioned function of establishing a pressure ceiling for light weight cars when front contact *a* of tube 493 is closed, indicating a cylinder pressure of more than 37 p.s.i., is carried out. Relay 1OPR has a fifth pickup circuit extending from terminal B of the battery over back contact *j* of relay R1TP (FIG. 33), lead 611, front contact *h* of relay AP (FIG. 36), lead 610, back contact *j* of relay RH1, back contact *k* of relay RL1, lead 552, lead 551 (FIG. 21), front contact *a* of Bourdon tube 493, closed when the pressure in the first section exceeds 37 p.s.i., lead 550, back contact *c* of relay 1HPR, and through the winding of relay 1OPR to terminal N of the battery. This circuit is employed to keep the pressure in the first section below 37 p.s.i. under standby conditions.

Levers MR1–MC and MR2–MC jointly control relay AP (FIG. 36) when both levers are in their automatic positions. The energizing circuit for relay AP extends from terminal B of the battery over the contacts of lever MR2–MC (FIG. 22) in its A position, lead 533, the contacts of lever MR1–MC in its automatic or A position, lead 554, and through the winding of relay AP to terminal N of the battery. Relay AP is accordingly picked up when and only when both sections of the master retarder are operating automatically.

Lever MR2–MC controls two relays, 2HPR and 2OPR (FIG. 22).

Relay 2HPR has an obvious energizing circuit extending from terminal B of the battery over the contacts of lever MR2–MC in its H position, and through the winding of relay 2HPR to terminal N of the battery. As will later appear, when this relay is energized, a relatively high pressure is applied to the actuating cylinders of pressure control unit 64 to control medium or heavy cars under direct supervision by an operator.

Relay 2OPR (FIG. 22) has a first pickup circuit extending from terminal B of the battery over the contacts of lever MR2–MC in its O position, and through the winding of relay 2OPR to terminal N of the battery. As will later appear, relay 2OPR controls contacts in circuits which cause the control cylinders of pressure control unit 64 to be exhausted. Relay 2OPR has a second pickup circuit which extends from terminal B of the battery over front contact *e* of relay AP (FIG. 36), lead 555, back contact *e* of relay RH2 (FIG. 37), lead 556, back contact *c* of relay RL2 (FIG. 36), lead 557, lead 559 (FIG. 22), back contact *c* of relay 1VPR, to be described, lead 560, front contact *a* of Bourdon tube 541, closed when the pressure in the second section of the master retarder exceeds 70 p.s.i., lead 561, back contact *c* of relay 2HPR, and through the winding of relay 2OPR to terminal N of the battery. By this circuit, relay 2OPR is picked up to exhaust the control valves of the second section of the retarder when the pressure exceeds 70 p.s.i. and the equipment is operating automatically but is in a standby condition, thus carrying one of the functions of tube 541 described above. Relay 2OPR has a third pickup circuit which extends from terminal B of the battery over the contacts of lever MR2–MC in its L position, lead 562, lead 563, front contact *a* of tube 540, closed when the pressure in the second section exceeds 37 p.s.i., lead 561, back contact *c* of relay 2HPR, and through the winding of relay 2OPR to terminal N of the battery. By this circuit, relay 2OPR is picked up in the manual condition of the apparatus when the maximum pressure for light cars is exceeded as indicated by the closing of front contact *a* of tube 540. Relay 2OPR has a fourth pickup circuit extending from terminal B of the battery over front contact *a* of relay 2ASCR in speed control unit 65 (FIG. 22), front contact *a* of relay 2BSCR, terminal *e* of speed control unit 65, lead 564, back contact *b* of relay 1–2RC, front contact *a* of relay AP, lead 565, back contact *c* of relay RH2, lead 566, front contact *f* of relay RL2, lead 567, lead 569, lead 563, front contact *a* of tube 540, closed when the pressure is not in excess of 37 p.s.i., lead 561, over back contact *c* of relay 2HPR, and through the winding of relay 2OPR to terminal N of the battery. This circuit establishes the pressure ceiling for light cars in the automatic position of the equipment after a cut has fully cleared section MR1T and is no longer being retarded by the first section. Relay 2OPR has a fifth pickup circuit which extends from terminal B of the battery over front contact *a* of relay 1ASCR (FIG. 20), front contact *a* of relay 1BSCR, terminal *e* of speed control unit 61, lead 542, lead 544, the front point of contact *b* of relay 1–2RC (FIG. 36), front contact *a* of relay AP, lead 565, back point of contact *c* of relay RH2 (FIG. 37), lead 566, front contact *f* relay RL2 (FIG. 36), lead 567, lead 569 (FIG. 22), lead 563, front contact *a* of tube 540, lead 561, back contact *c* of relay 2HPR, and through the winding of relay 2OPR to terminal N of the battery. This circuit functions to establish a ceiling for light cars when a cut occupies the first and second sections and the second section pressure control unit 64 is being operated by the first section pressure control unit 61.

An additional control relay 1VPR (FIG. 22) is provided for the second section of the master retarder. This is a conventional relay having two windings, either of which when energized being sufficient to hold up the contacts of the relay. Relay 1VPR has a first pickup circuit which extends from terminal B of the battery over front contact *e* of relay AP (FIG. 36), lead 555, back contact *e* of relay RH2 (FIG. 37), lead 556, back contact *c* of relay RL2 (FIG. 36), lead 557, lead 558, front contact *a* of Bourdon tube 492 (FIG. 21), which is closed when the pressure in the first section exceeds 85 p.s.i., lead 570, and through the upper winding of relay 1VPR to terminal N of the battery. This circuit controls relay 1VPR when the second section is in the standby condition. The circuits controlled by relay 1VPR prevent the preset pressure in the second section from exceeding 85 p.s.i. Relay 1VPR has a second pickup circuit extending from terminal B of the battery over front contact *e* of relay AP (FIG. 36), lead 555, back contact *e* of relay RH2 (FIG. 37), lead 556, back contact *c* of relay RL2 (FIG. 36), lead 557, lead 558, back contact *b* of Bourdon tube 492 (FIG. 21) closed when the pressure in the first section is less than 35 p.s.i., lead 571, and through the lower winding of relay 1VPR to terminal N of the battery. As will appear, when this circuit is energized circuits are established by relay 1VPR in conjunction with other controls to prevent the preset pressure in the second section from going below 35 p.s.i.

Intake magnet 1HM (FIG. 21) has a first energizing circuit extending from terminal B of the battery over the front point of contact *a* of relay 1HPR, lead 572, cable 573, lead 572, terminal *e* of pressure control unit 60, and through the winding of magnet 1HM to terminal N of the battery. This circuit is energized when lever MR1–MC is in its H position. Magnet 1HM has a second pickup circuit extending from terminal B of the battery over front contact *a* of relay 1ASCR (FIG. 20), from contact *a* of relay 1BSCR, terminal *e* of speed control unit 61, lead 542, lead 543, front contact *h* of relay R1TP (FIG. 33), lead 545, front contact *g* of relay AP (FIG. 36), lead 546, front contact *h* of relay RH1 (FIG. 35), back contact *h* of relay RL1, lead 574, the back point of contact *a* of relay 1HPR (FIG. 21), lead 572, cable 573, lead 572, and through the winding of magnet 1HM to terminal N of the battery. This circuit is accordingly energized when a heavy car is being retarded automatically and speed control unit 61 asks for more air.

Magnet 1HMM has a first pickup circuit extending from terminal B of the battery over the front point of contact *b* of relay 1HPR, lead 575, lead 576, cable 573, lead 576, terminal *d* of pressure control unit 60, and through the winding of magnet 1HMM to terminal N of the battery. Magnet 1HMM has a second energizing circuit which extends from terminal B of the battery over front contact *a* of relay 1ASCR (FIG. 20), front contact *a* of relay 1BSCR, terminal *e* of speed control unit 61, lead 542, lead 543, front contact *h* of relay R1TP (FIG. 33), lead 545, front contact *g* of relay AP (FIG. 36), lead 546, the front point of contact *g* of relay RH1 (FIG. 35), the back point of contact *g* of relay RL1, lead 578, the back point of contact *b* of relay 1HPR (FIG. 21), lead 575, lead 576, cable 573, lead 576, and through the winding of magnet 1HMM to terminal N of the battery. Magnet 1HMM has a third pickup circuit extending from terminal B of the battery over front contacts *a* of relays 1ASCR and 1BSCR in speed control unit 61, lead 542, lead 543, front contact *h* of relay R1TP, lead 545, front contact *g* of relay AP, lead 546, the front point of contact *g* of relay RH1, the front point of contact *g* of relay RL1, lead 549, back contact *b* of Bourdon tube 494, closed when the pressure in the first section of the retarder is less than 75 p.s.i., lead 577, lead 576, cable 573, lead 576, and through the winding of magnet 1HMM to terminal N of the battery. This circuit functions to actuate magnet 1HMM when a medium weight cut is being retarded, more air is requested by the speed control unit, and the pressure in the first section is less than 75 p.s.i.

Magnet 1LM (FIG. 21) has a first pickup circuit extending from terminal B of the battery over the contacts of lever MR1–MC in the L position, lead 551, back contact *b* of Bourdon tube 493, closed when the pressure in the first section is less than 30 p.s.i., lead 579, cable 573, lead 579, terminal *c* of pressure control unit 60, and through the winding of magnet 1LM to terminal N of the battery. Magnet 1LM is thus energized by the manual lever to control light cars and to admit air to the actuating cylinders of the retarder when the pressure of the cylinder is less than 30 p.s.i. Magnet 1LM has a second pickup circuit which extends from terminal B of the battery over front contacts *a* of relays 1ASCR and 1BSCR in speed control unit 61 (FIG. 20), terminal *e* of unit 61, lead 542, lead 543, front contact *h* of relay R1TP (FIG. 33), lead 545, front contact *g* of relay AP (FIG. 36), lead 546, the back point of contact *g* of relay RH1, front contact *f* of relay RL1, lead 552, lead 551 (FIG. 21), back contact *b* of tube 493, lead 579, cable 573, lead 579, and through the winding of magnet 1LM to terminal N of the battery. This circuit functions in the automatic condition of the apparatus to actuate magnet 1LM when a light car is being retarded, the pressure in the first section is less than 30 p.s.i., and more air is requested by the speed control unit. Magnet 1LM has a third energizing circuit which extends from terminal B of the battery over back contact *j* of relay R1TP (FIG. 33), lead 611, front contact *h* of relay AP (FIG. 36), lead 610, back contact *j* of relay RH1 (FIG. 35), back contact *k* of relay RL1, lead 552, lead 551 (FIG. 21), back contact *b* of Bourdon tube 493, closed when the pressure in the first section is below 30 p.s.i., lead 579, cable 573, lead 579, terminal *c* of unit 60, and through the winding of magnet 1LM to terminal N of the battery. This circuit is employed to keep the pressure in the first section above 30 p.s.i. under standby conditions.

Exhaust magnet 1X1M has an energizing circuit which extends from terminal B of the battery over the back point of contact *a* of relay 1ASCR (FIG. 20), terminal *f* of speed control unit 61, lead 580, front contact *f* of relay AP, lead 583, front contact *e* of relay RL1 and front contact *f* of relay RH1 in multiple (FIG. 35), lead 584, back contact *a* of relay 1OPR (FIG. 21), lead 585, cable 573, lead 585, terminal *b* of pressure control unit 60, and through the winding of magnet 1X1M to terminal N of the battery.

Exhaust magnet 1X2M has a first energizing circuit extending from terminal B of the battery over front contact *b* of relay 1OPR, lead 586, cable 573, lead 586, terminal *a* of unit 60, and through the winding of magnet 1X2M to terminal N of the battery. This circuit provides for the exhaust of the actuating cylinders under the previously described conditions controlling the energization of relay 1OPR. Magnet 1X2M has a second energizing circuit extending from terminal B of the battery over back contact *b* of relay 1ASCR (FIG. 20), terminal *g* of speed control unit 61, lead 587, front contact *b* of relay AP (FIG. 36), lead 590, front contact *j* of relay RL1 and front contact *i* of relay RH1 (FIG. 35) in multiple, lead 591, the back point of contact *b* of relay 1OPR (FIG. 21), lead 586, cable 573, lead 586, and through the winding of magnet 1X2M to terminal N of the battery. This provides exhaust control for cars of all weights when the apparatus is in its automatic condition and less pressure is requested by the speed control unit to counteract a tendency for the cut to decelerate too rapidly.

The circuits for the valve magnets in pressure control unit 64 will now be described. These circuits are somewhat more complex than those described for the first section since they include means for controlling the second section from the control unit in the first section when both sections are occupied by a cut, for turning the control over to the second section when the cut clears the first section, for pre-setting the pressures in accordance with the weight of the cut, and for establishing a suitable standby pressure.

Magnet 2HM (FIG. 22) has a first pickup circuit extending from terminal B of the battery over front contact *a* of relay 2HPR, lead 593, lead 594, terminal *e* of pressure control unit 64, and through the winding of magnet 2HM to terminal N of the battery. This circuit is energized only in the manual condition of the apparatus when pressure suitable for the control of a medium or heavy car is selected by the movement of manual lever MR2–MC to the H position. Magnet 2HM has a second energizing circuit extending from terminal B of the battery over front contacts *a* of relays 2ASCR and 2BSCR in speed control unit 65 (FIG. 22), terminal *e* of speed control unit 65, lead 564, the back point of contact *b* of relay 1–2RC (FIG. 36), front contact *a* of relay AP, lead 565, front contact *b* of relay RH2 (FIG. 37), lead 961, back contact *b* of relay RL2 (FIG. 36), lead 595, the back point of contact *a* of relay 2HPR, lead 593, lead 594, and through the winding of magnet 2HMN to terminal N of the battery. This circuit functions to control magnet 2HM from speed control unit 65 after a cut has cleared the first section of the master retarder. Magnet 2HM has a third energizing circuit extending from terminal B of the battery over front contacts *a* of relays 1ASCR and 1BSCR (FIG. 20), terminal *e* of speed control unit 61, lead 542, lead 544, the front point of contact *b* of relay 1–2RC (FIG. 36), front contact *a* of relay AP, lead 565, front contact *b* of relay RH2 (FIG. 37), lead 961, back contact *b* of relay RL2 (FIG. 36), lead 595, the back point of contact *a* of relay 2HPR, lead 593, lead 594, and through the winding of magnet 2HM to terminal N of the battery. Magnet 2HM is controlled by this circuit from speed control unit 61 of the first section of the master retarder when a heavy weight car is being retarded, as indicated by the energized condition of relay RH2 and the deenergized condition of relay RL2. Magnet 2HM has a fourth energizing circuit extending from terminal B of the battery over front contact *e* of relay AP (FIG. 36), lead 555, back contact *e* of relay RH2 (FIG. 37), lead 556, back contact *c* of relay RL2 (FIG. 36), lead 557, lead 558 (FIG. 22), front contact *a* of Bourdon tube 492 (FIG. 21), lead 570, over front contact *b* of relay 1VPR, picked up when lead 570 is energized, lead 594, and through the winding of magnet 2HM to terminal N of the battery. This circuit functions to maintain the standby pressure in the second section of the master retarder before the weight of the cut has been established.

Magnet 2HMM (FIG. 22) has a first energizing circuit extending from terminal B of the battery over front contact *b* of relay 2HPR, lead 597, lead 598, terminal *d* of pressure control unit 64, and through the winding of magnet 2HMM to terminal N of the battery. It will thus appear that when relay 2HPR is picked up in response to the motion of lever MR2–MC to its H position in the manual condition of the apparatus, both magnets 2HM and 2HMM are energized to rapidly increase the pressure in the actuating cylinders. Magnet 2HMM has a second energizing circuit extending from terminal B of the battery over front contacts *a* of relays 2ASCR and 2BSCR in speed control unit 65 (FIG. 22), terminal *e* of unit 65, lead 564, the back point of contact *b* of relay 1–2RC (FIG. 36), front contact *a* of relay AP, lead 565, the front point of contact *c* of relay RH2 (FIG. 37), lead 596, the back point of contact *b* of relay 2HPR, lead 597, lead 598, and through the winding of magnet 2HMM to terminal N of the battery. This circuit controls magnet 2HMM from the second section of the master retarder when a cut occupies the second section after having cleared the first section. Magnet 2HMM has a third energizing circuit extending from terminal B of the battery over front contacts *a* of relays 1ASCR and 1BSCR (FIG. 20), lead 542, lead 544, the front point of contact *b* of relay 1–2RC (FIG. 36), front contact *a* of relay AP, lead 565, the front point of contact *c* of relay RH2 (FIG. 37), lead 596, the back point of contact *b* of relay 2HPR (FIG. 22), lead 597, lead 598, and through the winding of magnet 2HMM to terminal N of the battery. This circuit controls magnet 2HMM from the first section of the master retarder while a cut occupies both sections MR1T and MR2T. Magnet 2HMM has a fourth energizing circuit from terminal B of the battery over front contact *e* of relay AP (FIG. 36), lead 555, back contact *e* of relay RH2 (FIG. 37), lead 556, back contact *c* of relay RL2 (FIG. 36), lead 557, lead 559 (FIG. 22), back contact *c* of relay 1VPR, lead 560, back contact *b* of Bourdon tube 541, closed when the pressure in the second section is less than 63 p.s.i., lead 599, lead 598, and through the winding of magnet 2HMM to terminal N of the battery. This circuit functions to maintain the standby pressure in the second section above 63 p.s.i.

Magnet 2LM (FIG. 22) has a first energizing circuit extending from terminal B of the battery over the contacts of lever MR2–MC in its L-position, lead 562, lead 563, back contact *b* of Bourdon tube 540, closed when the pressure in the second section is less than 30 p.s.i., lead 600, terminal *c* of pressure control unit 64, and through the winding of relay 2LM to terminal N of the battery. By this circuit, when light pressure is selected in the manual condition of the apparatus, the pressure in the second section is maintained above 30 p.s.i. Magnet 2LM has a second energizing circuit extending from terminal B of the battery over front contact *e* of relay AP (FIG. 36), lead 555, back contact *e* of relay RH2 (FIG. 37), lead 556, back contact *c* of relay RL2 (FIG. 36), lead 557, lead 558, back contact *b* of Bourdon tube 492 (FIG. 21), closed when the pressure in the first section is below 35 p.s.i., lead 571, front contact *a* of relay 1VPR, closed when lead 571 is energized, lead 568, lead 569, lead 563, back contact *b* of Bourdon tube 540, lead 600, and through the winding of magnet 2LM to terminal N of the battery. This circuit is used in the standby condition of the retarder to maintain the pressure above 30 p.s.i. in the second section if the pressure in the first section is below 35 p.s.i. Magnet 2LM has a third energizing circuit extending from terminal B of the battery over front contacts a of relays 2ASCR and 2BSCR in speed control unit 65 (FIG. 22), terminal e of unit 65, lead 564, the back point of contact b of relay 1–2RC (FIG. 36), front contact a of relay AP, lead 565, the back point of contact c of relay RH2 (FIG. 37), lead 566, front contact f of relay RL2, lead 567, lead 569 (FIG. 22), lead 563, back contact b of Bourdon tube 540, lead 600, and through the winding of magnet 2LM to terminal N of the battery. This circuit is used to control magnet 2LM from the second section of speed control unit 65 when the cut has completely cleared the first section. Magnet 2LM has a fourth energizing circuit extending from terminal B of the battery over front contacts a of relays 1ASCR and 1BSCR (FIG. 20), terminal e of speed control unit 61, lead 542, lead 544, the front point of contact b of relay 1–2RC (FIG. 36), front contact a of relay AP, lead 565, the back point of contact c of relay RH2 (FIG. 37), lead 566, front contact f of relay RL2 (FIG. 36), lead 567, lead 569 (FIG. 22), lead 563, back contact b of Bourdon tube 540, lead 600, and through the winding of magnet 2LM to terminal N of the battery. This circuit controls magnet 2LM from the speed control unit 61 for the first section of the master retarder when a cut occupies both sections.

Exhaust magnet 2X1M (FIG. 22) has a first energizing circuit which extends from terminal B of the battery over the back point of contact a of relay 2ASCR (FIG. 22), terminal f of speed control unit 65, lead 602, the back point of contact d of relay 1–2RC (FIG. 36), front contact d of relay AP, lead 603, front contact e of relay RL2 (FIG. 36) and front contact f of relay RH2 (FIG. 37) in multiple, lead 604, back contact b of relay 2OPR, lead 605, terminal b of pressure control unit 64, and through the winding of magnet 2X1M to terminal N of the battery. This circuit controls exhaust magnet 2X1M from the second section of speed control unit 65 when the cut has fully cleared the first section. Relay 2X1M has a second energizing circuit extending from terminal B of the battery over the back point of contact a of relay 1ASCR (FIG. 20), terminal f of speed control unit 61, lead 580, lead 581 (FIG. 36), the front point of contact d of relay 1–2RC, front contact d of relay AP, lead 603, front contact e of relay RL2 (FIG. 36) and front contact f of relay RH2 (FIG. 37) in multiple, lead 604, back contact b of relay 2OPR (FIG. 22), lead 605, and through the winding of magnet 2X1M to terminal N of the battery. This circuit controls magnet 2X1M from the first section of speed control unit 61 while the cut occupies both sections of the master retarder.

Exhaust magnet 2X2M (FIG. 22) has a first control circuit extending from terminal B of the battery over the front point of contact a of relay 2OPR (FIG. 22), lead 606, terminal a of pressure control unit 64, and through the winding of magnet 2X2M to terminal N of the battery. This circuit controls the exhaust of the retarder actuating cylinders under the previously described conditions for the energization of relay 2OPR. Magnet 2X2M has a second energizing circuit which extends from terminal B of the battery over back contact b of relay 2ASCR (FIG. 22), terminal g of speed control unit 65, lead 607, the back point of contact c of relay 1–2RC (FIG. 36), front contact c of relay AP, lead 608, front contacts d of relays RL1 (FIG. 36) and RH2 (FIG. 37) in multiple, lead 609, the back point of contact a of relay 2OPR, lead 606, and through the winding of relay 2X2M to terminal N of the battery. This circuit controls magnet 2X2M from the second section speed control unit 65 after a cut has cleared the first section. Magnet 2X2M has a third energizing circuit extending from terminal B of the battery over back conact b of relay 1ASCR (FIG. 20), terminal g of speed control unit 61, lead 587, the front point of contact c of relay 1–2RC (FIG. 36), front contact c of relay AP, lead 608, front contacts d of relays RL2 (FIG. 36) and RH2 (FIG. 37) in multiple, lead 609, back contact a of relay 2OPR (FIG. 22), lead 606, and through the winding of magnet 2X2M to terminal N of the battery. This circuit controls magnet 2X2M from the first section of the master retarder when both the first and second sections are occupied.

*The operation of the master retarder*

In order to explain the operation of the master retarder pressure control system, it will first be assumed that all of the apparatus is in its normal condition as shown in the drawings and that there are no cars in approach to, or being retarded by, the master retarder. Next it will be assumed that levers MR1–MC (FIG. 21) and MR2–MC (FIG. 22) are moved to their automatic or A positions. Relay AP (FIG. 36) will accordingly be picked up over its previously traced pickup circuit including the contacts of both levers. The circuit for intake magnet 1HM (FIG. 21) is interrupted at this time at the open front point of contact h of relay RH1 (FIG. 35). The circuit for intake magnet 1HMM (FIG. 22) which extends over leads 576 and 577, back contact b of Bourdon tube 494, which will be closed at this time, and lead 549 will be interrupted at the open front point of contact g of relay RL1 (FIG. 35). The circuit for magnet 1HMM (FIG. 21) which extends over leads 576 and 575, the back point of contact b of relay 1HPR, lead 578 and back contact g of relay RL1 (FIG. 35) is interrupted at the open front point of contact g of relay RH1. The circuit for magnet 1LM (FIG. 21) which extends over lead 579, back contact b of Bourdon tube 493, which is closed at this time, and leads 551 and 552, back contact k of relay RL1, back contact j of relay RH1, lead 610, front contact h of relay AP, lead 611, and back contact j of relay R1TP is completed to establish a standby pressure in the first section of the master retarder by picking up relay 1LM and applying air to the actuating cylinders. The circuit for exhaust magnet 1X1M, which extends over lead 585, back contact a of relay 1OPR, and lead 584, is interrupted at the open front points of contact e of relay RL1 and contact f of relay RH1. The exhaust circuit for magnet 1X2M which extends over lead 586, back contact b of relay 1OPR and lead 591 is interrupted at the open back points of contact j of relay RL1 and contact i of relay RH1. When the pressure rises to 30 p.s.i., back contact b of tube 493 will be opened and magnet 1LM will be released. Should the pressure rise above 37 p.s.i., front contact a of tube 493 will be closed, and relay 1OPR will be picked up over its previously traced circuit including lead 550 and back contact c of relay 1HPR. With relay 1OPR picked up, exhaust magnet 1X2M will be picked up over its previously traced circuit including the front point of contact b of relay 1OPR and lead 586, until the pressure has again been reduced to 37 p.s.i. With the apparatus in this standby condition, the retarder will be closed and there will be a pressure between 30 and 37 p.s.i. in the manifold 485 of the first section pressure control unit.

In the second section of the retarder, the energizing circuit for magnet 2HM which extends over lead 584 will be interrupted at the open front point of contact b of relay 1VPR. The circuit which includes leads 594 and 593, back contact a of relay 2HPR, lead 595 and back contact b of realy RL2, will be open at the open front point of contact b of relay RH2. The energizing circuit for magnet 2HMM which extends over leads 598 and 599, back contact b of Bourbon tube 541, lead 560, back contact c of relay 1VPR, lead 559, lead 557, back contact c of relay RL2, lead 556, back contact e of relay RH2, lead 555, and front contact e of relay AP will be initially closed to apply standby pressure to the second section of the master retarder. At the same time, relay 1VPR will be energized over its previously traced circuit including front contact e of relay AP, lead 555, back contact e of relay RH2, lead 556, back contact c of relay RL2, lead 557, lead 558, back contact b of Bourdon tube 492, lead 571, and through lower winding of relay 1VPR to terminal N of the battery. With relay 1VPR picked up, a circuit is completed over its front contact *a*, leads 568, 569 and 563, back contact *b* of Bourdon tube 540, lead 600, and to the winding of magnet 2LM. At the same time, the previously traced circuit for magnet 2HMM is interrupted at the open back point of contact *c* of relay 1VPR. The pressure in the cylinders of unit 64 will build up under the influence of the air supplied by the valve controlled by magnet 2LM. When the pressure increases above 30 pounds, back contact *b* of Bourdon tube 540 will open, interrupting the previously traced circuit for magnet 2LM. The supply of air to the cylinders of the second section of the retarder will be interrupted. However, should the pressure increase above 37 pounds, front contact *a* of tube 540 will be closed, and relay 2OPR will be picked up over its previously traced circuit including front contact *e* of relay AP, lead 555, back contact *e* of relay RH2, lead 556, back contact *c* of relay RL2, lead 557, lead 558, back contact *b* of Bourdon tube 492, lead 571, front contact *a* of relay 1VPR, leads 568, 569 and 563, front contact *a* of Bourdon tube 540, lead 561, and back contact *c* of relay 2HPR. With relay 2OPR up, exhaust magnet 2X2M will be picked up and the pressure in the cylinders of the second section will be reduced, until the pressure again drops below 37 p.s.i. The second section of the master retarder is thus maintained in a standby condition at a pressure of between 30 and 37 p.s.i., as long as the first section remains in its standby condition.

When the pressure in the first section of the master retarder is established, the pressure in the second section is set accordingly. If the pressure in the first section is below 35 p.s.i., back contact *b* of Bourdon tube 492 is closed. At this time, a circuit extends from terminal B of the battery over front contact *e* of relay AP, lead 555, front contact *e* of relay RH2 (FIG. 37), lead 556, back contact *c* of relay RL2 (FIG. 36), lead 557, lead 558 (FIG. 22), the back contact *b* of Bourdon tube 492, lead 571, through the lower winding of relay 1VPR to pick relay 1VPR, over front contact *a* of relay IVPR, and over leads 568, 569, and 563 to the movable element of Bourdon tube 540. This tube operates to maintain the pressure in the second section between 30 and 37 p.s.i. If the pressure falls below 30 p.s.i., back contact *b* of Bourdon tube 540 is closed and magnet 2LM is energized over lead 600 to increase the pressure. If front contact *a* of tube 540 is closed and magnet 2LM is energized over lead 600 to increase the pressure. If front contact *a* of tube 540 is closed, relay 2OPR is picked up over lead 561 and back contact *c* of relay 2HPR, and magnet 2X2M is then energized, over front contact *a* relay 2OPR and lead 606, to decrease the pressure. Thus as previously described the standby range of the second section is between 30 and 37 p.s.i. Whether back contact *b* of Bourdon tube 492 in the first section is closed or open, it will appear from the above description that the pressure in the second section will be maintained between 30 and 37 p.s.i. Should the pressure in the first section increase above 85 p.s.i., causing front contact *a* of tube 492 to close, a circuit will extend from terminal B of the battery over front contact *e* relay AP (FIG. 36), lead 556, back contact *c* of *e* of relay RH2 (FIG. 37), lead 556, back contact *c* of relay RL2 (FIG. 36), leads 557 and 558 (FIG. 22), over front contact *a* of Bourdon tube 492 (FIG. 21), lead 570, through the upper winding of relay 1VPR to terminal N of the battery, causing relay 1VPR to pick up, and over front contact *b* of relay 1VPR and lead 594 to energize magnet 2HM. Under these conditions, the pressure in the second section will be increased to its maximum limit which may, for example, be 110 p.s.i.

Next, let it be assmued that a cut of light weight enters section MR1T, causing relay RL1 (FIG. 35) to be picked up, and relay RH1 to remain deenergized, as previously described. At the same time, radar velocity meter 17 (FIG. 20) will respond and apply a signal over lead 463, front contact *i* of relay R1TP (FIG. 33), which is picked up at this time, and lead 464, to terminal *b* of speed control unit 61 (FIG. 19). Let it be further assumed that the FNS lever (FIG. 35) is set to its N or normal position. Since the weight registered is light, or L, speed selector unit 59 (FIG. 34) will function to connect the output of potentiometer NL to terminal *a* of speed control unit 61 over lead 465, front contact *g* of relay R1TP, and lead 466, as previously described.

Assuming that the speed of the cut is initially above the exit velocity thus selected, speed control unit 61 will request air pressure in the actuating cylinders of pressure control unit 60 by closing front contacts *a* of relays 1ASCR and 1BSCR. A circuit will then be completed for magnet 1LM which, as previously traced, extends from terminal *e* of speed control unit 61, over leads 542 and 543, front contact *h* of relay R1TP, lead 545, front contact *g* of relay AP, lead 546, back contact *g* of relay RH1, front contact *f* of relay RL1, lead 552, lead 551, back contact *b* of Bourdon tube 493 (FIG. 21), lead 579, cable 573, lead 579, and through the winding of magnet 1LM to terminal N of the battery. Magnet 1LM will then actuate valve 488 to supply air from manifold 518 to manifold 485 and thence to the retarder actuating cylinders such as 481 and 482. As soon as the pressure is increased above 30 p.s.i., back contact *b* of tube 493 will open, interrupting the circuit for magnet 1LM. At this time the previously traced standby circuits for the second section will be operative to maintain the pressure in the second section between 30 and 37 p.s.i., by the action of Bourdon tube 540. Should the pressure increase above 37 p.s.i., front contact *a* of Bourdon tube 493 will close, causing relay 10PR to be picked up over a circuit which is the same as that just mentioned for magnet 1LM up to lead 551, and then continued over front contact *a* of tube 493, lead 550, back contact *c* of relay 1HPR and the winding of relay 1OPR. With relay 1OPR picked up, a circuit is complete for magnet 1×2M over the front point of contact *b* of relay 1OPR and lead 586. The pressure will accordingly be reduced below 37 pounds and maintained above 30 pounds as long as the speed of the cut is above the speed selected.

Should the speed drop below the selected speed, speed control unit 61 will respond by releasing both relays 1ASCR and 1BSCR. Under these conditions, both of magnets 1X1M and 1X2M will be energized. Magnet 1X1M is energized over a circuit including back contact *a* of relay 1ASCR, terminal *f* of unit 61, lead 580, front contact *f* of relay AP, lead 583, front contact *e* of relay RL1, lead 584, back contact *a* of relay 1OPR, and lead 585. Magnet 1X2M is energized over a circuit extending from terminal *g* of unit 61, lead 587, front contact *b* of relay AP, lead 590, front contact *j* of relay RL1, lead 591, back contact *b* of relay 1OPR and lead 586. The pressure will thus be reduced independently of the Bourdon tubes until the combined speed and higher time derivatives of speed of the cut regain the desired value.

In the meantime, the second section of the retarder has been maintained at a pressure between 30 and 37 p.s.i. by the circuits previously described. As the cut enters section MR2T while section MR1T is still occupied, relay 1–2RC (FIG. 36) picks up. A circuit will now be completed for transferring the weight registration stored in relays RL1 and RH1 (FIG. 35) to relays RL2, RLP2, RH2 and RHP2 (FIGS. 36 and 37).

If the speed of the cut is still above the selected value, a circuit will now be completed from energized terminal *e* of speed control unit 61 over leads 542 and 544, the front point of contact *b* of relay 1–2RC, front contact *a* of relay AP, lead 565, the back point of contact *c* of relay RH2, lead 566, front contact *f* of relay RL2, lead 567, and leads 569 and 563 to the movable contact element of Bourdon tube 540. If Bourdon tube 540 is in its intermediate position indicating a presssure between 30 and 37 p.s.i., no further action will take place. On the other hand, if the pressure rises to 37 p.s.i. or above, front contact *a* of tube 540 will close, causing relay 2OPR to pick up and exhaust magnet 2X2M to be energized, by the circuits previously traced. On the other hand, if the pressure is reduced to 30 p.s.i. or below, back contact *b* of tube 540 will close, causing intake magnet 2LM to be picked up. The pressure in the second section will thus be maintained between 30 and 37 p.s.i. as long as the combined speed and higher time derivatives of the cut are above the desired value. Should this value be at or very near the desired value, none of the terminals *e*, *f* and *g* of speed control unit 61 would be energized, since relay 1ASCR would be picked up and relay 1BSCR would be released, as previously described, and the magnet valves would not be actuated. Should the value of the combined speed and high derivatives fall below the desired value, terminals *f* and *g* of speed control unit 61 would be energized. A circuit for magnet 2X1M would be completed from terminal *f* of unit 61 over leads 580 and 581, front contact *d* of relay 1–2RC, front contact *d* of relay AP, lead 603, front contact *e* of relay RL2, lead 604, back contact *b* of relay 2OPR and lead 605. An energizing circuit for relay 2X2M would also be completed, extending from terminal *g* of speed control unit 61 over leads 587 and 588, the front point of contact *c* of relay 1–2RC, front contact *c* of relay AP, lead 608, front contact *d* of relay RL2, lead 609, back contact *a* of relay 2OPR and lead 606. The retarder would thus be opened to the extent necessary to prevent a further decrease in the speed or further deceleration.

It will be apparent that at the time that the second section is functioning as described above, the first section will continue to function, since none of its circuits have been changed. However, when the cut vacates section MR1T, relay R1TP is released, releasing weight storage relay RL1 and disconnecting the output of the radar unit from the speed control unit. The first section accordingly turns to its standby condition.

At the same time, relay 1–2RC (FIG. 36) is released. The release of relay 1–2RC is caused by the interruption of its stick circuit at the open back point of contact *b* of relay GEC, which is picked up as soon as relay R1TP is released with relay R2TP picked up, to indicate that a cut has cleared section MR1T. Radar velocity meter 19 (FIG. 22) is now connected to speed control unit 65 over front contact *d* of relay R2TP (FIG. 36) and leads 474 and 475. Assuming that the speed of the cut and its combined derivatives still exceed the desired value, relays 2ASCR and 2BSCR will be picked up, and a circuit will extend from terminal B of the battery over their front contacts *a*, terminal *e* of unit 65, lead 564, the back point of contact *b* of relay 1–2RC, front contact *a* of relay AP, lead 565, the back point of contact *c* of relay RH2, lead 566, front contact *f* of relay RL2, and leads 567, 569, and 563 to the movable contact arm of Bourdon tube 540. Should the pressure in the retarder cylinders then fall below 30 p.s.i., closing back contact *b* of tube 540, intake magnet 2LM will be picked up as previously described. On the other hand, if the pressure rises above 37 p.s.i., closing front contact *a* of tube 540, relay 2OPR will be picked up and exhaust magnet 2X2M will be energized as previously described to reduce the pressure.

If the speed and acceleration characteristics of the car are as desired, none of terminals *e*, *f* and *g* of speed control unit 65 will be energized, and no change will be made in the magnet valve settings. On the other hand, should the combined velocity and higher time derivatives fall below the desired value, terminals *f* and *g* of speed control unit 65 would be energized and exhaust magnets 2X1M and 2X2M would be energized. The circuit for exhaust magnet 2X1M extends from terminal *f* of unit 65 over lead 602, the back point of contact *d* of relay 1–2RC, front contact *d* of relay AP, lead 603, front contact *e* of relay RL2, lead 604, back contact *b* of relay 2OPR and lead 605 to magnet 2X1M. The circuit for magnet 2X2M from terminal *g* of unit 65 includes lead 607, the back point of contact *c* of relay 1–2RC, front contact *c* of relay AP, lead 608, front contact *d* of relay RL2, lead 609, back contact *a* of relay 2OPR, and lead 606. The retarder would accordingly be exhausted to the degree necessary to prevent the speed characteristics of the cut from a further decrease.

The above described operation of the second section of the master retarder continues as long as section MR2T is occupied by a cut. When the cut vacates section MR2T, relay R2TP is released, releasing the weight storage relays for the second section and disconnecting the velocity meter from the speed control. The second section thus returns to its standby condition.

During the above described operation of the master retarder with a light cut, the use of magnets 1LM and 2LM alone, to control pressure increases in the actuating cylinder, causes such increases to be carried out at a low rate best suited to the control of light cars.

The operation of the retarder for a cut of medium weight will now be described. Assume that the first and second sections of the retarder are in standby conditions as previously described, with the first section and the second section at a standby pressure of between 30 and 37 p.s.i.

As the cut moves into section MR1T, velocity meter 17 and speed selector 59 are connected to speed control unit 61 in the manner previously described, and both of weight registration relays RL1 and RH1 will be picked up. With the FNS lever set in its N position, speed selector unit 59 will accordingly connect its potentiometer NH to the speed control unit 61, since as pointed out above, medium and heavy weight cars are grouped together in this unit.

Let it be assumed that the speed of the cut is above the desired value, and that the cut is not initially decelerating excessively. Under these conditions, a circuit will extend from energized terminal *e* of speed control unit 61 over leads 542 and 543, front contact *h* of relay R1TP, lead 545, front contact *g* of relay AP, lead 546, the front point of contact *g* of relay RH1, the front point of contact *g* of relay RL1, and lead 549, to the movable contact member of Bourdon tube 494. If the pressure in the cylinders of the first section is below 75 p.s.i., causing back contact *b* of tube 494 to be closed, intake magnet 1HMM will be energized over leads 577 and 576. On the other hand, should the pressure rise above 82 p.s.i., relay 1OPR would be picked up over front contact *a* of tube 494, lead 550, and back contact *c* of relay 1HPR. With relay 1OPR picked up, exhaust magnet 1X2M would be energized over front contact *b* of relay 1OPR and lead 536. The pressure will accordingly be maintained between 75 and 82 p.s.i. as long as the speed of the cut is above the desired speed. Should the speed characteristics of the cut be correct, none of terminals *e*, *f* and *g* of speed control unit 61 would be energized, and no further action would take place. However, should the speed characteristics decrease below the desired value, terminals *f* and *g* of the speed control unit would be energized, and magnets 1X1M and 1X2M would be energized to reduce the pressure. These circuits are the same as those traced for the similar condition described above in connection with the light cut, and will not be retraced in detail. It will be recalled, however, that these circuits now include front contacts of relay RH1 in multiple with the contacts of relay RL1.

As soon as the cut occupies section MR2T while still shunting section MR1T, relay 1–2RC will pick up and the second section will be controlled from the first section speed control unit 61, and the weight information registered in relays RL1 and RH1 is transferred to relays RL2, RLP2, RH2 and RHP2, which are made available for weight storage when relay 1–2RC picks up.

The intake circuit for the second section under these conditions extends from terminal *e* of speed control unit 61, which is energized when more braking is required, over leads 542 and 544, the front point of contact *b* of relay 1-2RC, front contact *a* of relay AP, lead 565, the front point of contact *c* of relay RH2, lead 596, the back point of contact *b* of relay 2HPR, lead 597, lead 598, and through the winding of magnet 2HMM to terminal N of the battery. Magnet 2HMM will accordingly be energized until the pressure has increased sufficiently to decrease the combined speed characteristics of the cut to a value at which terminal *e* of speed control unit 61 is deenergized.

The exhaust circuits under these conditions include circuits from both terminals *f* and *g* of speed control unit 61. The circuit from terminal *f* extends over leads 580 and 581, the front point of contact *d* of relay 1-2RC, front contact *d* of relay AP, lead 603, front contact *e* of relay RL2 and front contact *f* of relay RH2 in multiple, lead 604, back contact *b* of relay 2OPR, lead 605, and through the winding of magnet 2X1M to terminal N of the battery. The circuit from terminal *g* of speed control unit 61 includes lead 587, the front point of contact *c* of relay 1-2RC, front contact *c* of relay AP, lead 608, front contacts *d* of relays RL2 and RH2 in multiple, lead 609, back contact *a* of relay 2OPR, lead 606 and the winding of magnet 2X2M. The speed of the cut is thus reduced through the combined action of all of the exhaust valves, until terminals *f* and *g* of speed control unit 61 are no longer energized.

At this time, the first section continues to be operated as described. When the cut clears section MR1T, the first section returns to its standby condition and the second section is operated from second section speed control unit 65 in conjunction with the second section weight storage relays. Under these conditions, the intake control circuit extends from terminal *e* of speed control unit 65 over lead 564, the back point of contact *b* of relay 1-2RC, which is now released, front contact *a* of relay AP, lead 565, the front point of contact *c* of relay RH2, lead 596, the back point of contact *b* of relay 2HPR, lead 597, and over lead 598 to the winding of magnet 2HMM.

A first exhaust circuit extends from terminal *f* of speed control unit 65 over lead 602, the back point of contact *d* of relay 1-2RC, front contact *d* of relay AP, lead 603, front contact *e* of relay RL2 and front contact *f* of relay RH2 in multiple, lead 604, back contact *b* of relay 2OPR and over lead 605 to magnet 2X1M. A second exhaust circuit extends from terminal *g* of speed control unit 65 over lead 607, the back point of contact *c* of relay 1-2RC, front contact *c* of relay AP, lead 608, front contacts *d* of relays RL2 and RH2 in multiple, lead 609, the back point of contact *a* of relay 2OPR, and over lead 606 to the winding of magnet 2X2M. The pressures accordingly are reduced under the combined action of magnets 2X1M and 2X2M until terminals *f* and *g* of speed control unit 65 are deenergized.

The above described action will continue until section MR2T is vacated, at which time the second section will be returned to its standby condition. It will thus appear that for medium cuts no pressure ceiling is enforced on either section of the master retarder in this form of our apparatus. It will be noted that an increase of pressure to the first and second sections is applied at a medium rate by the use of magnets 1HMM and 2HMM alone.

It will next be assumed that with the master retarder in its standby condition, a heavy weight cut enters section MR1T. Since the speed selector unit 59 treats heavy cars the same as medium cars, potentiometer NH will be selected and connected to speed control unit 61 as described for medium cars. The connection of the radar unit to the speed control will be the same as previously discussed, and will not be retraced. Weight storage relay RL1 will be released, and relay RH1 will be energized.

Under these conditions, a first intake circuit will extend from terminal *e* of speed control unit 61 over leads 542 and 543, front contact *h* of relay R1TP, lead 545, front contact *g* of relay AP, lead 546, the front point of contact *g* of relay RH1, the back point of contact *g* of relay RL1, lead 578, the back point of contact *b* of relay 1HPR, and over leads 575 and 576 to the winding of magnet 1HMM. A second intake circuit will now extend from terminal *e* of unit 61 over leads 542 and 543, front contact *h* of relay R1TP, lead 545, front contact *g* of relay AP, lead 546, front contact *h* of relay RH1, back contact *h* of relay RL1, lead 574, the back point of contact *a* of relay 1HPR, and over lead 572 to the winding of magnet 1HM. A rapid increase in pressure will thus be brought about by the combined action of 1HM and 1HMM until the speed characteristics of the cut are restored to the desired value and terminal *e* of speed control unit 61 is deenergized.

The exhaust circuits under these conditions will be the same as those previously considered for medium weight cars, and will not be considered in detail except to point out that, whereas with medium weight cars the exhaust circuits include front contacts of both of relays RL1 and RH1 in multiple, in the case of heavy cuts, only the front contacts of relay RH1 are included in these circuits.

When the cut occupies section MR2T while shunting section MR1T, the second section will be controlled from the first section in the general manner previously described. In this case, a pair of intake circuits are completed, including a common branch extending from terminal *e* of speed control unit 61 over leads 542 and 544, the front point of contact *b* of relay 1-2RC, front contact *a* of relay AP, lead 565, and then over a first branch including the front point of contact *c* of relay RH2, lead 596, the back point of contact *b* of relay 2HPR, lead 597, and lead 598 to the winding of magnet 2HMM, and over a second branch from lead 565 including front contact *b* of relay RH2, lead 961, back contact *b* of relay RL2, lead 595, the back point of contact *a* of relay 2HPR, and over leads 593 and 594 to the winding of magnet 2HM. The pressure is thus increased rapidly under the influence of intake magnets 2HM and 2HMM in parallel until terminal *e* of speed control unit 61 becomes deenergized. The exhaust circuits for this case are substantially the same as those described for the case of medium weight cuts, except that they include front contacts of relay RH2 alone instead of contacts of the relays RH2 and RL2 in multiple, and will, therefore, not be further described.

When the first section of the master retarder is vacated, it will be returned to its standby condition and the second section will be controlled from speed control unit 65. Under these conditions, a pair of intake circuits is established, including a common portion extending from terminal *e* of speed control unit 65 over lead 564, the back point of contact *b* of relay 1-2RC, front contact *a* of relay AP, lead 565, and over the two paths traced above to magnets 2HM and 2HMM in parallel. The same control as established by the first section will then be continued until terminal *e* of speed control unit 65 becomes deenergized. The exhaust circuits under these conditions are the same as those considered for medium cuts, except that they include only the front contacts of relay RH2 instead of contacts of relays RL2 and RH2 in multiple, and will hence not be described in detail. When section MR2T is vacated, the second section is returned to its standby condition as previously described.

*Manual operation of the master retarder*

When it is desired to operate the master retarder manually, levers MR1–MC and MR2–MC are moved to their H, L or O positions and relay AP is released.

In the H position of lever MR1–MC, relay 1HPR is picked up. Magnet 1HM is then picked up over the front point of contact *a* of relay 1HPR and lead 572 and magnet 1HMM is picked up over the front point of contact *b* of relay 1HPR and leads 575 and 576. This control is maintained by the operator until the desired amount of braking has been effected. The control for light cars is established by moving the lever to the L position, in which case a circuit extends over lead 551 to the movable element of Bourdon tube 493. When the pressure in the master retarder falls below 30 p.s.i., lead 579 is energized to energize intake magnet 1LM. When the pressure rises above 37 p.s.i., lead 550 is energized and relay 1OPR is picked up over back contact c of relay 1HPR. Exhaust magnet 1X2M is then energized over the front point of contact b of relay 1OPR and lead 586 to bring the pressure down below 37 p.s.i. For light cars, the pressure is thereby maintained between 30 and 37 p.s.i. until the amount of braking deemed desirable by the operator has been secured. In the O position of the lever, relay 1OPR is picked up directly, causing exhaust magnet 1X2M to be energized, and the retarder will ultimately be opened completely.

The operation of lever MR2–MC is similar. In its H position, relay 2HPR is picked up and magnets 2HM and 2HMM are energized in parallel, causing a rapid increase in the braking pressure, and maintaining a high braking pressure until sufficient braking, as determined by the operator, has been secured. In the L position, leads 562 and 563 are energized, and the pressure is automatically maintained between 30 and 37 p.s.i. by the action of Bourdon tube 540. When the pressure is below 30 p.s.i., back contact b of tube 540 is closed and intake magnet 2LM is energized. When the pressure rises above 37 p.s.i., front contact a of tube 540 is closed and relay 2OPR is picked up over back contact c of relay 2HPR, causing exhaust magnet 2H2M to be energized. In the O position of the lever, relay 2OPR is picked up directly and magnet 2X2M is continuously energized to open the retarder.

*The group retarder*

Since the controls for all of the group retarders are the same, only those for group retarder 1–2GR will be described in detail. Referring to FIGS. 28, 29, 30 and 31, the first and second sections of the group retarder are controlled by pressure control units 1–2GR1 and 1–2GR2, respectively. These pressure control units are identical with those described for the master retarder and will, therefore, not be described in detail. Pressure control unit 1–2GR1 (FIG. 29) is provided with a plurality of intake magnets, here illustrated as three magnets 1HM, 1HMM and 1LM, although other magnets can be used in parallel with these illustrated magnets to provide more capacity in a given case if so desired. Similarly, a rapidly acting exhaust magnet 1X1M and an exhaust magnet 1X2M which controls a slower acting valve of larger capacity, are illustrated, although in practice, additional magnet valves in parallel with those shown could be provided if desired. As in the master retarder, the valve controlled by intake magnet 1LM may be of appropriately one-half the capacity of the valves controlled by magnets 1HM, 1HMM and 1X1M.

In the first section of the group retarder, four Bourdon tubes are provided. As will appear, Bourdon tube 612 is used to preset the second section of the group retarder. Its front contact a is closed when the pressure in the first section exceeds 85 p.s.i., and its back contact b is closed when the pressure in the first section is less than 35 p.s.i. A second Bourdon tube 613 is adapted to close its front contact a when the pressure in the first section exceeds 82 p.s.i., and to close its back contact b when the pressure is less than 75 p.s.i. This Bourdon tube is used to establish a ceiling for medium cars, to preset the first section of the retarder for heavy cars, and to establish a standby pressure in the first section. A third Bourdon tube 614 is provided which closes its front contact a when the pressure exceeds 37 p.s.i. and its back contact b when the pressure goes below 30 p.s.i. This tube is used to establish a pressure ceiling for light cars and to preset the first section of the retarder for medium cars. A fourth Bourdon tube 615 closes its front contact a when the pressure exceeds 22 p.s.i. and closes its back contact b when the pressure is below 15 p.s.i. This tube is used to preset the first section of the group retarder for light cars.

A speed control unit 50 (FIG. 28) is provided for the first section of the group retarder, which at times also controls the second section, as will be described. A second speed control unit 51 (FIG. 31) is provided for the second section of the group retarder. These speed control units are identical with those described in connection with the master retarder, and will, therefore, not be described in detail. Each of these speed control units has an intake terminal e which is energized when the combined speed characteristics of the cut exceed the desired value, and two exhaust terminals f and g which are energized when the combined speed characteristics of the cut are below the desired value. The speed control units further include terminals a and b, connected to circuits identical with those shown for unit 61, as well as terminals c and d, which are not employed in the group retarder.

The first section of the group retarder has a lever 1–2GR1–MC (FIG. 29), and the second section has a corresponding lever 1–2GR2–MC (FIG. 31). Each of these levers has contacts similar to those for the levers in the master retarder, comprising a first set of contacts A which are closed in the automatic condition of the apparatus, a second set of contacts H, closed when it is desired to control a medium or heavy cut manually, a third set of contacts L, closed when it is desired to control a light cut manually, and a fourth set of contacts O, closed when it is desired to open the retarder.

Each section of the group retarder is provided with a radar velocity meter, radar velocity meter 26 being provided for the first section of the group retarder (FIG. 28) and velocity meter 52 being provided for the second section (FIG. 31). Terminals b of these radar velocity meters are connected to suitable antennas through conventional wave guides as schematically illustrated, and the output terminals a of these meters are at times connected to the input terminals b of their corresponding speed control units, as will be described.

The leaving speed for the group retarders is established by a computer, previously described in general terms in connection with FIGS. 4 through 6 and 7 through 14, and which will be described in detail below. The computed leaving speeds are made available to speed control unit 50, in the first section of the group retarder, from a first electronic storage unit 1–2GR1–ESU (FIG. 45). The leaving speed is made available to the second section of the group retarder from a second electronic storage unit 1–2GR2–ESU (FIG. 45). These storage units will be described in detail below. However, for present purposes, it is sufficient to note that when required by the group retarder, these storage units provide output voltages between their terminals c and grounded terminals d which are a measure of the desired leaving speed. These output voltages are at times connected to terminals a of the speed control units for the group retarder by circuits to be described.

Output terminal a of radar velocity meter 26 (FIG. 28) is connected to input terminal b of speed control unit 50 over a circuit including leads 635 and 636, front contact d of relay R1TP (FIG. 27) and lead 637. The velocity meter is accordingly connected to the speed control unit during the time when track section 1–2GR1T is occupied, as indicated by the energized condition of relay R1TP.

Output terminal c of electronic storage unit 1–2GR1–ESU (FIG. 45) is connected to input terminal a of speed control unit 50 (FIG. 28) over leads 638 and 639, front contact e of relay R1TP (FIG. 27) and lead 641. This unit is, therefore, also connected to speed control unit 50 during the occupancy of section 1–2GR1T.

As previously described, relays 1–2RL1 and 1–2RH1 (FIG. 29) will be energized during the occupancy of section 1–2GR1T, being held up at this time over their previously traced stick circuits including front contact *b* of relay R1TP, lead 404, and their own front contacts *a*.

When both sections of the group retarder are occupied, relay 1–2RC (FIG. 28) picks up as previously described. At this time, relays 1–2RL2 and 1–2RH2 (FIG. 30) repeat the indications of relays 1–2RL1 and 1–2RH1, as previously described, and will continue to hold this indication as long as second section 1–2GR2T is occupied, being held up over their previously traced stick circuits including front contact *d* of relay R2TP and their own front contacts *a*.

During the time that relay 1–2RC is up, speed control unit 50 controls both the first and second sections by circuits to be described. Before relays R2TP and 1–2RC are energized, the output of first section electronic storage unit 1–2GR1–ESU is connected to the second section electronic storage unit 1–2GR2–ESU (FIG. 45) by a circuit extending from terminal *c* of unit 1–2GR1–ESU over leads 638 and 640, back contact *e* of relay R2TP, lead 642, and input terminal *a* of unit 1–2GR2–ESU. The selected leaving velocity $V_3$ calculated by the computer is thus made available for control of the second section.

When section 1–2GR2T is occupied, relay R2TP is accordingly energized, the transfer circuit just traced is broken, and the value stored in unit 1–2GR2–ESU is maintained by the action of relay 8H in its energized condition. Relay 8H will be energized at this time over a circuit extending from terminal B of the battery over front contact *h* of relay R2TP (FIG. 30), lead 632, terminal *b* of unit 1–2GR2–ESU, and through the winding of relay 8H to terminal N of the battery. The circuits actuated by relay 8H and the other internal circuitry of unit 1–2GR2–ESU will be described below.

The output of unit 1–2GR2–ESU will now be made available to speed control unit 51 over a circuit extending from terminal *c* of unit GR2–ESU (FIG. 45), lead 649, front contact *g* of relay R2TP (FIG. 30), lead 645, and terminal *a* of speed control unit 51 (FIG. 31).

Section 1–2GR1 has associated with it a pair of control relays 1HPR and 1OPR similar to the corresponding relays previously described for the master retarder. The second section has control relays 1VPR, 2HPR and 2OPR which also correspond with the similar relays in the master retarder. The levers for both sections control a relay AP, energized in the automatic position of both levers, in the same manner as described in connection with the master retarder.

The general arrangement of the units employed in the control of the group retarder having been described, their detailed arrangement as employed in one form of our system will now be described. For this purpose, the controls associated with the first section will be first described.

Relay AP (FIG. 29) has an energizing circuit extending from terminal B of the battery over the contacts of lever 1–2GR2–MC (FIG. 31) in its A position, lead 646, the contacts of lever 1–2GR1–MC in its A position, lead 647 and through the winding of relay AP to terminal N of the battery. This relay is accordingly picked up when both sections of the group retarder are in their automatically controlled condition.

Relay 1HPR (FIG. 29) has an obvious pickup circuit extending from terminal B of the battery over the contacts of lever 1–2GR1–MC in its H position and through the winding of the relay to terminal N of the battery. This relay is accordingly energized whenever it is desired to apply manually a heavy braking pressure suitable for cuts of medium or heavy weight.

Relay 1OPR (FIG. 29) has a first pickup circuit extending from terminal B of the battery over the contacts of lever 1–2GR1–MC in its O position and through the winding of the relay to terminal N of the battery. The lever is moved to position O when it is desired to open the retarder manually, and relay 1OPR will continuously be energized while the lever is in this position. Relay 1OPR has a second pickup circuit which extends from terminal B of the battery over back contact *d* of relay R1TPP (FIG. 27), lead 648, front contact *g* of relay AP (FIG. 29), the back point of contact *f* of relay 1–2RH1, the front point of contact *f* of relay RL1, lead 650, front contact *a* of Bourdon tube 615, closed when the pressure in the first section exceeds 22 p.s.i., lead 651, back contact *c* of relay 1HPR and through the winding of relay 1OPR to terminal N of the battery. This circuit is employed to pick up relay 1OPR before section 1–2GR1T is occupied, but after it has been established that the weight of the next cut is light, to maintain the preset pressure of the first section below 22 p.s.i. Relay 1OPR has a third pickup circuit which extends from terminal B of the battery over the contacts of lever 1–2GR1–MC (FIG. 29) in its L position, leads 652 and 653, front contact *a* of Bourdon tube 614, closed when the pressure in the first section exceeds 37 p.s.i., lead 651, back contact *c* of relay 1HPR and through the winding of relay 1OPR to terminal N of the battery. This circuit is used to establish a pressure ceiling of 37 p.s.i. for light cars under manual control. Relay 1OPR has a fourth pickup circuit extending from terminal *e* of speed control unit 50, energized when the combined speed characteristics of the cut are above the desired value to request more air pressure in the retarder, lead 654, lead 655, front contact *c* of relay R1TPP (FIG. 27), lead 657, from contact *e* of relay AP (FIG. 29), lead 658, the back point of contact *e* of relay RH1, front contact *h* of relay RL1, lead 659, lead 653, front contact *a* of Bourdon tube 614, lead 651, back contact *c* of relay 1HPR and through the winding of relay 1OPR to terminal N of the battery. This circuit is employed to enforce a pressure ceiling of 37 p.s.i. on light cars under automatic control. Relay 1OPR has a fifth pickup circuit extending from terminal B of the battery over back contact *d* of relay R1TPP (FIG. 27), lead 648, front contact *g* of relay AP, the front point of contact *f* of relay RH1, the front point of contact *g* of relay RL1, lead 659, lead 653, front contact *a* of Bourdon tube 614, lead 651, back contact *c* of relay 1HPR and through the winding of relay 1OPR to terminal N of the battery. This circuit is used in presetting the first section of the retarder for medium weight cars to prevent the pressure from exceeding 37 p.s.i. Relay 1OPR has a sixth pickup circuit extending from terminal *e* of speed control unit 50 (FIG. 28) over leads 654 and 655, front contact *c* of relay R1TPP (FIG. 27), lead 657, front contact *e* of relay AP, lead 658, the front point of contact *e* of relay RH1, the front point of contact *e* of relay RL1, lead 660, front contact *a* of Bourdon tube 613, closed when the pressure in the first section exceeds 82 p.s.i. lead 651, back contact *c* of relay 1HPR, and through the winding of relay 1OPR to terminal N of the battery. This circuit is used to establish a maximum pressure of 82 p.s.i. for medium weight cuts under automatic control. Relay 1OPR has a seventh pickup circuit extending from terminal B of the battery over back contact *d* of relay R1TPP, lead 648, front contact *g* of relay AP, the back point of contact *f* of relay RH1, the back point of contact *f* of relay RL1, lead 660, front contact *a* of Bourdon tube 613, lead 651, back contact *c* of relay 1HPR and through the winding of relay 1OPR to terminal N of the battery. This circuit is used to establish a standby pressure in the group retarder at a maximum of 82 p.s.i. Relay 1OPR has an eighth pickup circuit extending from terminal B of the battery over back contact *d* of relay R1TPP, lead 648, front contact *g* of relay AP, the front point of contact *f* of relay RH1, the back point of contact *g* of relay RL1, lead 660, front contact *a* of Bourdon tube 613, lead 651, back contact *c* of relay 1HPR and through the winding of relay 1OPR to terminal N of the battery. This circuit is used in presetting the first section for heavy cars to prevent the pressure from exceeding 82 p.s.i.

Intake magnet 1HM (FIG. 29) has a first pickup circuit extending from terminal B of the battery over the front point of contact *a* of relay 1HPR, lead 664, and through the winding of magnet 1HM to terminal N of the battery. This circuit is used in the manual control of heavy and medium cuts to assist in obtaining a high braking pressure. Magnet 1HM has a second pickup circuit which extends from terminal *e* of speed control unit 50 (FIG. 28) over leads 654 and 655, front contact *c* of relay R1TPP, lead 657, front contact *e* of relay AP, lead 658, front contact *d* of relay RH1, back contact *d* of relay RL1, lead 665, the back point of contact *a* of relay 1HPR, lead 664, and through the winding of magnet 1HM to terminal N of the battery. This circuit is used to energize magnet 1HM in the control of heavy cuts when the combined speed characteristics of the cut demand more braking as evidenced by the energized condition of terminal *e* of speed control unit 50.

Magnet 1HMM has a first pickup circuit extending from terminal B of the battery over the front point of contact *b* of relay 1HPR, lead 661, lead 663, and through the winding of magnet 1HMM to terminal N of the battery. By this circuit, magnet 1HMM is energized in conjunction with magnet 1HM to bring about a rapid increase in braking pressure for the manual control of medium and heavy cuts. Magnet 1HMM has a second pickup circuit extending from terminal *e* of speed control unit 50 over leads 654 and 655, front contact *c* of relay R1TPP, lead 657, front contact *e* of relay AP, lead 658, the front point of contact *e* of relay RH1, the back point of contact *e* of relay RL1, the back point of contact *b* of relay 1HPR, leads 661 and 663, and through the winding of magnet 1HMM to terminal N of the battery. This circuit is employed to energize magnet 1HMM together with magnet 1HM in the automatic control of heavy cuts. Magnet 1HMM has a third pickup circuit which extends from terminal *e* of speed control unit 50 over leads 654 and 655, front contact *c* of relay R1TPP, lead 657 front contact *e* of relay AP, leads 658, the front point of contact *e* of relay RH1, the front point of contact *e* of relay RL1, lead 660, back contact *b* of Bourdon tube 613, closed when the pressure in the first section is below 75 p.s.i., lead 662, lead 663, and through the winding of magnet 1HMM to terminal N of the battery. This circuit is used in the automatic control of medium weight cuts to permit an increase of pressure when requested by the energized condition of speed control terminal *e* if the pressure in the first section is below 75 p.s.i. Magnet 1HMM has a fourth pickup circuit which extends from terminal B of the battery over back contact *d* of relay R1TPP (FIG. 27), lead 648, front contact *g* of relay AP, the back point of contact *f* of relay RH1, the back point of contact *f* of relay RL1, lead 660, back contact *b* of Bourdon tube 613, leads 662 and 663, and through the winding of magnet 1HMM to terminal N of the battery. This circuit is used to establish a standby pressure of at least 75 p.s.i. in the first section. Magnet 1HMM has a fifth pickup circuit extending from terminal B of the battery over back contact *d* of relay R1TPP, lead 648, front contact *g* of relay AP, the front point of contact *f* of relay RH1, the back point of contact *g* of relay RL1, lead 660, back contact *b* of Bourdon tube 613, leads 662 and 663, and through the winding of magnet 1HMM to terminal N of the battery. This circuit is used to preset the first section of the retarder to at least 75 p.s.i. when the approach of a heavy cut is indicated.

Magnet 1LM (FIG. 29) has a first pickup circuit extending from terminal B of the battery over back contact *d* of relay R1TPP (FIG. 27), lead 648, front contact *g* of relay AP (FIG. 29), back point of contact *f* of relay RH1, the front point of contact *f* of relay RL1, lead 650, back contact *b* of Bourdon tube 615, closed when the pressure is below 15 p.s.i., lead 644, and through the winding of magnet 1LM to terminal N of the battery. This circuit is used to preset the first section to at least 15 p.s.i. on the approach of a lightweight cut. Magnet 1LM has a second pickup circuit extending from terminal B of the battery over tht contacts of lever 1–2GR1–MC (FIG. 29) in its L position, leads 652 and 653, back contact *b* of Bourdon tube 614, lead 644, and through the winding of magnet 1LM to terminal N of the battery. This circuit is used to maintain the pressure in the first section above 30 p.s.i. in the manual control of light cuts. Magnet 1LM has a third pickup circuit extending from terminal B of the battery over back contact *d* of relay R1TPP (FIG. 27), lead 648, front contact *g* of relay AP (FIG. 29), the front point of contact *f* of relay RH1, the front point of contact *g* of relay RL1, leads 659 and 653, back contact *b* of Bourdon tube 614, closed when the pressure in the first section is below 30 p.s.i., lead 644 and through the winding of magnet 1LM to terminal N of the battery. This circuit is used to preset the first section to at least 30 p.s.i. for medium weight cuts. Magnet 1LM has a fourth pickup circuit extending from terminal *e* of speed control unit 50 over leads 654 and 655, front contact *c* of relay R1TPP, lead 657, front contact *e* of relay AP, lead 658, the back point of contact *e* of relay RH1, front contact *h* of relay RL1, leads 659 and 653, back contact *b* of Bourdon tube 614, lead 644 and through the winding of magnet 1LM to terminal N of the battery. This circuit is used in the automatic control of light cuts to maintain the pressure above 30 p.s.i. when the speed control unit requests more braking.

Exhaust magnet 1X1M (FIG. 29) has an energizing circuit extending from terminal *f* of speed control unit 50 (FIG. 28), which is energized when it is desired to reduce the braking force during automatic control, over leads 667 and 669, front contact *a* of relay AP, lead 670, front contact *b* of relay RL1 and front contact *b* of relay RH1 in multiple, to provide a circuit path for any weight registration other than 0, lead 671, back contact *a* of relay 1OPR, lead 672, and through the winding of magnet 1X1M to terminal N of the battery. Magnet 1X1M is accordingly energized during automatic control when the combined speed characteristics of the cut are less than the desired value.

Exhaust magnet 1X2M (FIG. 29) has a first energizing circuit extending from terminal B of the battery over the front point of contact *b* of relay 1OPR, lead 673, and through the winding of magnet 1X2M to terminal N of the battery. Magnet 1X2M is accordingly energized under any of the conditions previously described in which relay 1OPR is energized. Exhaust magnet 1X2M has a second energizing ciruit extending from terminal *g* of speed control unit 50, which is energized when the combined speed characteristics of a cut under automatic control are below the desired value, over leads 674 and 675, front contact *h* of relay AP, lead 677, front contacts *i* of relay RL1 and *g* of relay RH1 in multiple, lead 678, the back point of contact *b* of relay 1OPR, lead 673, and through the winding of magnet 1X2M to terminal N of the battery. Magnet 1X2M is accordingly energized in parallel with magnet 1X1M during automatic control when it is desired to reduce the braking pressure. As previously described, under these conditions, magnet 1X1M provides a rapid response which is quickly sensed by the velocity meter, and magnet 1X2M provides additional capacity, although at a slower rate.

The second section of the group retarder is provided with a pressure control unit 1–2GR2. This unit includes intake magnets 2HM, 2HMM and 2LM, and exhaust magnets 2X1M and 2X2M. As in the pressure control unit previously described, magnets 2HM, 2HMM and 2X1M control fast-acting valves of substantially the same capacity. Magnet 2LM controls a fast-acting valve of approximately one-half the capacity of those controlled by magnets 2HM, 2HMM and 2X1M, at a correspondingly increased rate of response. Magnet 2X2M controls a larger valve having greater capacity.

Two Bourdon tubes are provided in this embodiment of our invention for the second section of the group retarder. Bourdon tube 685 is set to close its front contact *a* at a pressure of 37 p.s.i., and to close its back contact *b* at a pressure of 30 p.s.i. This Bourdon tube is used to establish a pressure ceiling for light cars when back contact *b* of Bourdon tube 612 in the first section is closed. Bourdon tube 686 is set to close its front contact *a* when the pressure in the second section exceeds 70 p.s.i., and to close its back contact *b* when the pressure goes below 63 p.s.i. It is used to preset the second section when the pressure in the first section is between 35 and 85 p.s.i., and to establish a standby pressure in the second section.

Relay 1VPR (FIG. 31), in the second section of the group retarder, has two windings, either of which when energized is sufficient to open the back contacts and to close the front contacts of the relay. Since this relay may be of conventional construction, it will not be further described in detail. It has a first pickup circuit extending from terminal B of the battery over front contact *c* of relay AP (FIG. 29), lead 679, back contact *d* of relay 1–2RH2, back contact *d* of relay 1–2RL2, lead 680, lead 681, front contact *a* of Bourdon tube 612, closed when the pressure in the first section exceeds 85 p.s.i., lead 683, and through the upper winding of relay 1VPR to terminal N of the battery. As will appear, this circuit is employed to apply pressure to the second section to preset the second section when the pressure in the first section is above 85 p.s.i. Relay 1VPR has a second pickup circuit which extends from terminal B of the battery over front contact *c* of relay AP, lead 679, back contacts *d* of relays 1–2RL2 and 1–2RH2 in series, leads 680 and 681, back contact *b* of Bourdon tube 612, closed when the pressure in the first section is below 35 p.s.i., lead 684, and through the lower winding of relay 1VPR to terminal N of the battery. As will later appear, the pressure in the second section is maintained between 30 and 37 p.s.i. by circuits controlled by relay 1VPR when the pressure in the first section is below 35 p.s.i.

Relay 2HPR (FIG. 31) has an obvious pickup circuit extending from terminal B of the battery over the contacts of lever 1–2GR2–MC in its H position and through the winding of the relay to terminal N of the battery. Accordingly, relay 2HPR is energized when the lever is set manually to its H position, and, as will appear, it then controls circuits which energize intake magnets 2HM and 2HMM in parallel to provide a rapid increase in pressure, and to maintain a relatively high pressure, in the second section during the manual control of heavy or medium weight cuts.

Relay 2OPR (FIG. 31) has a first pickup circuit extending from terminal B of the battery over the contacts of lever 1–2GR2–MC in its O position and through the winding of the relay to terminal N of the battery. This relay is thus energized when it is desired to open the second section of the retarder, and, as will appear, completes circuits to maintain the large capacity exhaust magnet 2X2M energized at such times. Relay 2OPR has a second pickup circuit extending from terminal B of the battery over front contact *c* of relay AP (FIG. 29), lead 679, back contacts *d* of relays 1–2RL2 and 1–2RH2 in series, leads 680 and 682, back contact *c* of relay 1VPR, lead 687, front contact *a* of Bourdon tube 686, closed when the pressure in the second section is above 70 p.s.i., lead 688, back contact *c* of relay 2HPR, and through the winding of relay 2OPR to terminal N of the battery. This circuit is used to establish a standby pressure in the second section below 70 p.s.i. Relay 2OPR has a third pickup circuit which extends from terminal B of the battery over the contacts of lever 1–2GR2–MC in its L position, lead 689, lead 691, front contact *a* of Bourdon tube 685, closed when the pressure in the second section exceeds 37 p.s.i., lead 688, back contact *c* of relay 2HPR, and through the winding of relay 2OPR to terminal N of the battery. This circuit is used during the manual control of light cuts to maintain the pressure in the second section below 37 p.s.i. Relay 2OPR has a fourth pickup circuit extending from terminal *e* of the first section speed control unit 50 over leads 654 and 656, the front point of contact *d* of relay 1–2RP, lead 693, front contact *b* of relay AP, lead 694, the back point of contact *c* of relay 1–2RH2, front contact *b* of relay 1–2RL2, leads 690, 689 and 691, front contact *a* of Bourdon tube 685, lead 688, back contact *c* of relay 2HPR and through the winding of relay 2OPR to terminal N of the battery. This circuit is employed during the time when the cut occupies both sections of the group retarder, to maintain a ceiling of 37 p.s.i for light cuts even though increased braking may then be requested by the first section speed control unit. Relay 2OPR has a fifth pickup circuit which extends from terminal B of the battery over front contact *c* of relay AP (FIG. 29, lead 679, back contact *d* of relay 1–2RH2, back contact *d* of relay 1–2RL2, lead 680, lead 681, back contact *b* of Bourdon tube 612 in the first section, lead 684, front contact *b* of relay 1VPR, which will be energized if the circuit is energized to this point, leads 692 and 691, front contact *a* of Bourdon tube 685, lead 688, back contact *c* of relay 2HPR and through the winding of relay 2OPR to terminal N of the battery. This circuit is employed to maintain the present pressure below 37 p.s.i. when the pressure in the first section is below 35 p.s..i Intake magnet 2HM (FIG. 31) has first energizing circuit extending from terminal B of the battery over the front point of contact *a* of relay 2HPR, leads 696 and 697, and through the winding of magnet 2HM to terminal N of the battery. This circuit is employed to assist in increasing and maintaining a high pressure during the manual control of heavy and medium cuts. Magnet 2HM has a second energizing circuit which extends from terminal *e* of the first section speed control unit 50 (FIG. 28) over leads 654 and 656, the front point of contact *d* of relay 1–2RC, lead 693, front contact *b* of relay AP, lead 694, front contact *b* of relay 1–2RH2, back contact *c* of relay 1–2RL2, lead 698, the back point of contact *a* of relay 2HPR, leads 696 and 697, and through the winding of magnet 2HM to terminal N of the battery. This circuit is used during the automatic control of heavy cars when additional braking is requested by the first section speed control unit during the control of the second section by the first section speed control when both sections are occupied by a cut. Magnet 2HM has a third energizing circuit extending from terminal B of the battery over front contact *c* of relay AP (FIG. 29), lead 679, back contacts *d* of relays 1–2RH2 and 1–2RL2 (FIG. 30) in series, leads 680 and 681, front contact *a* of Bourdon tube 612 (FIG. 29), lead 683, front contact *a* of relay 1VPR, lead 697, and through the winding of magnet 2HM to terminal N of the battery. This circuit is employed to maintain the standby pressure in the second section at the highest possible value (for example, 110 p.s.i.) if the pressure in the first section exceeds 85 p.s.i. Magnet 2HM has a fourth energizing circuit extending from terminal *e* of speed control unit 51 (FIG. 31) over lead 704, the back point of contact *d* of relay 1–2RC, lead 693, front contact *b* of relay AP, lead 694, front contact *b* of relay 1–2RH2, back contact *c* of relay 1–2RL2, lead 698, the back point of contact *a* of relay 2HPR, leads 696 and 697, and through the winding of magnet 2HM to terminal N of the battery. This circuit is used when a cut has cleared the first section of the group retarder to assist in rapidly increasing the braking pressure for heavy cuts when requested by the energized condition of terminal *e* of speed control unit 51.

Magnet 2HMM (FIG. 31) has a first energizing circuit which extends from terminal B of the battery over the front point of contact *b* of relay 2HPR, leads 699 and 701, and through the winding of magnet 2HMM to terminal N of the battery. Magnet 2HMM is accordingly energized in parallel with magnet 2HM during the manual control of heavy and medium cuts. Magnet 2HMM has a second energizing circuit which extends from terminal e of first section speed control 50 over leads 654 and 656, the front point of contact d of relay 1–2RC, lead 693, front contact b of relay AP, lead 694, the front point of contact c of relay 1–2RH2, lead 702, the back point of contact b of relay 2HPR, leads 699 and 701, and through the winding of magnet 2HMM to terminal N of the battery. Magnet 2HMM is accordingly energized during the control of the second section by the first section speed control, when terminal e of speed control unit 50 is energized and the cut is either of medium or heavy weight. Magnet 2HMM has a third energizing circuit extending from terminal B of the battery over front contact c of relay AP (FIG. 29), lead 679, back contacts d of relays 1–2RH2 and 1–2RL2 in series, leads 680 and 682, back contact c of relay 1VPR, lead 687, back contact b of Bourdon tube 686, closed when the pressure is below 63 p.s.i., leads 700 and 701, and through the winding of magnet 2HMM to terminal N of the battery. This circuit keeps the pressure in the second section above 63 p.s.i. under standby conditions. Magnet 2HMM has a fourth energizing circuit which extends from terminal e of speed control unit 51 (FIG. 31) over lead 704, the back point of contact d of relay 1–2RC, lead 693, front contact b of relay AP, lead 694, the front point of contact c of relay 1–2RH2, lead 702, the back point of contact b of relay 2HPR, leads 699 and 701, and through the winding of magnet 2HMM to terminal N of the battery. This circuit is employed in the automatic control of either heavy or medium cuts after the cuts have cleared the first section and additional braking pressure is requested by the second section speed control unit 51.

Magnet 2LM has a first energizing circuit which extends from terminal B of the battery over the contacts of lever 1–2GR2–MC in its L position, leads 689 and 691, back contact b of Bourdon tube 685, closed when the pressure in the second section is below 30 p.s.i., lead 703, and through the winding of magnet 2LM to terminal N of the battery. This circuit keeps the pressure in the second section above 30 p.s.i. during the manual control of light cuts. Magnet 2LM has a second energizing circuit which extends from terminal e of the first section speed control unit 50 over leads 654 and 656, the front point of contact d of relay 1–2RC, lead 693, front contact b of relay AP, lead 694, the back point of contact c of relay 1–2RH2, front contact b of relay 1–2RL2, leads 690 and 691, back contact b of Bourdon tube 685, lead 703, and through the winding of magnet 2LM to terminal N of the battery. This circuit is employed in the automatic control of light cuts while such cuts span both sections, when the first section speed control requests more braking and the pressure in the second section is below 30 p.s.i. Magnet 2LM has a third energizing circuit which extends from terminal e of speed control unit 51 (FIG. 31) over lead 704, the back point of contact d of relay 1–2RC, lead 693, front contact b of relay AP, lead 694, the back point of contact c of relay 1–2RH2, front contact b of relay 1–2RL2, leads 690, 689 and 691, back contact b of Bourdon tube 685, lead 703, and through the winding of magnet 2LM to terminal N of the battery. This circuit is used in the control of the second section from the second section speed control unit after the cut has cleared the first section, to maintain the pressure above 30 p.s.i. for light cuts when increased pressure is requested by the speed control unit. Magnet 2LM has a fifth energizing circuit which extends from terminal B of the battery over front contact c of relay AP (FIG. 29), lead 679, back contacts d of relays 1–2RL2 and 1–2RH2 in series, leads 680 and 681, back contact b of Bourdon tube 612, closed when the pressure in the first section is below 35 p.s.i., lead 684, front contact b of relay 1VPR, leads 692 and 691, back contact b of Bourdon tube 685, closed when the pressure in the second section is below 30 p.s.i., lead 703, and through the winding of magnet 2LM to terminal N of the battery. This circuit is used to preset the second section and maintain its pressure above 30 p.s.i. when the pressure in the first section is below 35 p.s.i.

Exhaust magnet 2X1M has a first energizing circuit which extends from terminal f of first section speed control unit 50 over leads 667 and 668, the front point of contact f of relay 1–2RC, lead 705, front contact f of relay AP, lead 706, front contacts f of relays 1–2RL2 and 1–2RH2 in multiple, lead 707, back contact b of relay 2OPR, lead 708, and through the winding of magnet 2X1M to terminal N of the battery. Magnet 2X1M is energized by this circuit to cause a relatively rapid decrease in pressure in the automatic control of cuts of light, medium or heavy weight when both sections of the retarder are occupied and reduced pressure is requested by the first section speed control unit 50. Magnet 2X1M has a second energizing circuit which extends from terminal f of the second section speed control unit 51 (FIG. 31) over lead 709, the back point of contact f of relay 1–2RC, lead 705, front contact f of relay AP, lead 706, front contacts f of relays 1–2RL2 and 1–2RH2 in multiple, lead 707, back contact b of relay 2OPR, lead 708, and through the winding of magnet 2X1M to terminal N of the battery. This circuit functions the same as the previously traced circuit, except that it is operative after a cut has cleared the first section of the group retarder and is being controlled by the second section speed control unit 51.

Exhaust magnet 2X2M has a first energizing circuit extending from terminal B of the battery over the front point of contact a of relay 2OPR, lead 710, and through the winding of magnet 2X2M to terminal N of the battery. This circuit is employed to exhaust the retarder under the various conditions described above in which relay 2OPR is energized. Magnet 2X2M has a second energizing circuit which extends from terminal g of speed control 50 (FIG. 28) over leads 674 and 676, the front point of contact e of relay 1–2RC, lead 711, front contact d of relay AP, lead 712, front contacts e of relays 1–2RL2 and 1–2RH2 in multiple, lead 713, the back point of contact a of relay 2OPR, lead 710, and through the winding of magnet 2X2M to terminal N of the battery. This circuit is employed to obtain reduced pressure in the automatic operation of the second section by the first section speed control. Magnet 2X2M has a third energizing circuit extending from terminal g of speed control unit 51, over lead 714, the back point of contact e of relay 1–2RC, lead 711, front contact d of relay AP, lead 712, front contacts e of relays 1–2RL2 and 1–2RH2 in multiple, lead 713, the back point of contact a of relay 2OPR, lead 710, and through the winding of magnet 2X2M to terminal N of the battery. This circuit is used during the automatic control of the second section from the second section speed control unit 51 after a cut has cleared the first section.

*Operation of the group retarder*

The manual operation of the first section of the group retarder will be first considered. For the manual control of heavy cuts, lever 1–2GR1–MC is moved to the H position, causing relay 1HPR to pick up and magnets 1HM and 1HMM to be energized in parallel by their previously traced circuits. The lever is left in the H position until the desired amount of braking has been obtained. For light cuts, the operations is semi-automatic. The lever is moved to its L position, energizing the movable contact member of Bourdon tube 614. When the pressure rises above 37 p.s.i., front contact a of this Bourdon tube will close and relay 1OPR will be picked up by its previously traced circuit including back contact c of relay 1HPR. Exhaust magnet 1X2M will then be energized over its previously traced circuit including front contact *b* of relay 1OPR, and the pressure will be reduced. Should the pressure fall below 30 p.s.i., back contact *b* of Bourdon tube 614 would be closed, and intake magnet 1LM would be energized, causing the pressure to increase. When it is desired to reduce the pressure manually, lever 1–2GR1–MC may be moved to its O position, causing relay 1OPR and consequently exhaust magnet 1X2M to be energized, thus reducing the pressure to the desired value or opening the retarder completely.

The manual operation of the second section of the retarder is similar to that described for the first section. With lever 1–2GR2–MC in its H position, relay 2HPR is picked up and both intake magnets 2HM and 2HMM are energized in parallel to bring about a rapid increase in pressure to a relatively high sustained value. When the lever is moved to its L position, the movable contact member of Bourdon tube 685 is energized. Should the pressure increase above 37 p.s.i., front contact *a* of Bourdon tube 685 will be closed, and relay 2OPR will be picked up over its previously traced circuit including back contact *c* of relay 2HPR. Exhaust magnet 2X2M will then be energized, causing the pressure to decrease. Should the pressure fall below 30 p.s.i., back contact *b* of tube 685 will close, causing intake magnet 2LM to be energized and raising the pressure. In the O position of lever GR2–MC, relay 2OPR will be picked up, exhaust magnet 2X2M will be energized, and the pressure will then be reduced, and the retarder ultimately opened completely if so desired.

With no cars occupying the group retarder, and before any weight information has been registered in relays 1–2RL1 and 1–2RH1, if the retarder is set for automatic operation by placing levers 1–2GR1–MC and 1–2GR2–MC in their automatic or A positions, both sections of the retarder will be maintained at a standby pressure.

In the first section of the group retarder the standby pressure is controlled between 75 and 82 p.s.i. by the action of Bourdon tube 613. The movable contact of this Bourdon tube is energized over the previously traced circuit including back contact *d* of relay R1TPP, lead 648, front contact *g* of relay AP, the back point of contact *f* of relay 1–2RH1 and the back point of contact *f* of relay 1–2RL1 in series, and lead 660. Should the pressure increase above 82 p.s.i., front contact *a* of tube 613 will close and relay 1OPR will be energized over its previously traced circuit including back contact *c* of relay 1HPR, causing exhaust magnet 1X2M to be energized and the pressure to be reduced. Should the pressure fall below 75 p.s.i., back contact *b* of Bourdon tube 613 will close, causing intake magnet 1HMM to be energized until the pressure is increased above 75 p.s.i. In the second section of the group retarder, standby pressure is established between 63 and 70 p.s.i. by Bourdon tube 686. The movable contact of this Bourdon tube is energized over a previously traced circuit which extends from terminal B of the battery over front contact *c* of relay AP, lead 679, back contacts *d* of relays 1–2RH2 and 1–2RL2 in series, leads 680 and 682, back contact *c* of relay 1VPR, and over lead 687 to the movable contact of Bourdon tube 686. When the pressure rises above 70 p.s.i., front contact *a* of Bourdon tube 686 is closed and relay 2OPR will be energized over its previously traced circuit including back contact *c* of relay 2HPR. Exhaust magnet 2X2M will then be energized to reduce the pressure. Should the pressure fall below 63 p.s.i., back contact *b* of tube 686 will be closed, and magnet 2HMM will be energized to restore the pressure to the desired range.

As soon as a weight is registered in relays 1–2RL1 and 1–2RH1, and before section 1–2GR1T is occupied, in the automatic operation of our equipment the group retarders are preset to a pressure value in acordance with the weight of the next cut.

For light cars, the pressure in the first section is preset between 15 and 22 p.s.i. by the action of Bourdon tube 615. The movable contact of this Bourdon tube will be energized over a previously traced circuit including back contact *d* of relay R1TPP, lead 648, front contact *g* of relay AP, the back point of contact *f* of relay RH1, the front point of contact *f* of relay 1–2RL1, and lead 650. Should the pressure rise above 22 p.s.i., relay 1OPR will be energized over its previously traced circuit including front contact *a* of Bourdon tube 615, and back contact *c* of relay 1HPR. Exhaust magnet 1X2M will then be energized to reduce the pressure. Should the pressure fall below 15 p.s.i., back contact *b* of Bourdon tube 615 would close, and magnet 1LM will be energized to restore the pressure to the desired range.

For medium weight cars, when relays 1–2RL1 and 1–2RH1 are both picked up, the pressure in the first section is preset between 30 and 37 p.s.i. by the action of Bourdon tube 614. The movable contact of this Bourdon tube is energized at this time over a circuit including back contact *d* of relay R1TPP, lead 648, front contact *g* of relay AP, the front point of contact *f* of relay 1–2RH1, the front point of contact *g* of relay 1–2RL1, and leads 659 and lead 653. Should the pressure rise above 37 p.s.i., front contact *a* of tube 614 will be closed and relay 1OPR will be energized over its previously traced circuit, causing exhaust magnet 1X2M to be energized and reducing the pressure. Should the pressure fall below 30 p.s.i., magnet 1LM will be energized to restore it to the desired range.

For heavy cars, the pressure in the first section is preset between 75 and 82 p.s.i. by the action of Bourdon tube 613. The movable contact of this Bourdon tube is energized over a previously traced circuit including back contact *d* of relay R1TPP, lead 648, front contact *g* of relay AP, the front point of contact *f* of relay 1–2RH1, the back point of contact *g* of relay 1–2RL1, and lead 660. Should the pressure then rise above 82 p.s.i., relay 1OPR will be energized over its previously traced circuit and exhaust magnet 1X2M will be energized to reduce the pressure to the desired range. Should the pressure fall below 75 p.s.i., magnet 1HMM will be energized over back contact *b* of tube 613 to increase the pressure to its desired range.

The second section of the group retarder is preset to a range of 30 to 37 p.s.i. when the pressure in the first section is below 35 p.s.i. At such times, the movable contact of Bourdon tube 612 in the first section is energized over a previously traced circuit including front contact *c* of relay AP, lead 679, back contacts *d* of relays 1–2RH2 and 1–2RL2 in series, lead 680, and lead 681. With the pressure in the first section below 35 p.s.i., back contact *b* of Bourdon tube 612 is closed and the movable contact of Bourdon tube 685 will be energized over a circuit extending from back contact *b* of tube 612 over lead 684, front contact *b* of relay 1VPR, which will now be picked up, and leads 692 and 691. Should the pressure in the second section increase above 37 p.s.i., front contact *a* of Bourdon tube 685 will close, which will cause relay 2OPR to be picked up. The exhaust magnet 2X2M will then be picked up over the front point of contact *a* of relay 2OPR and the pressure will be reduced. Should the pressure in the second section drop below 30 p.s.i., back contact *b* of Bourdon tube 685 will be closed, and intake magnet 2LM will be energized to increase the pressure.

With the movable contact of Bourdon tube 612 in the first section energized as just described, should the pressure in the first section be above 85 p.s.i., magnet 2HM in the second section will be energized over a circuit extending from front contact *a* of tube 612 over lead 683, causing relay 1VPR to pick up, thus completing a circuit from lead 683 over front contact *a* of relay 1VPR and lead 697 to intake magnet 2HM. The pressure will thus be increased to its highest possible value; for example, 110 p.s.i. When the pressure in the first section is between 35 and 85 p.s.i., the circuits just traced will not be completed. Under these conditions, the second section of the group retarder will be preset between 63 and 70 p.s.i. by the action of Bourdon tube 686. The movable contact of this Bourdon tube is energized at this time over a circuit including front contact c of relay AP, lead 679, back contacts d of relays 1–2RL2 and 1–2RH2 in series, leads 680 and 682, back contact c of relay 1VPR, and lead 687. Should the pressure rise above 70 p.s.i., front contact a of tube 686 will be closed, causing relay 2OPR to be picked up and exhaust magnet 2X2M to be energized over the circuits previously described to reduce the pressure to the desired range. Should the pressure fall below 63 p.s.i., back contact b of tube 686 will be closed and intake magnet 2HMM will be energized to increase the pressure to the desired range.

The operation of the group retarder to control a light weight cut will now be described. It will be assumed that both sections of the retarder are in their automatic condition with the levers 1–2GR1–MC and 1–2GR2MC set to their automatic of A positions. Relay AP will accordingly be energized. It will be further assumed that the information transfer system previously described has functioned to register the light weight of the cut in the first section of the group retarder so that relay 1–2RL1 is energized and relay 1–2RH1 is released. The first section will be then preset as previously described between a pressure of 15 and 22 p.s.i., so that back contact b of Bourdon tube 612 is closed. The second section of the group retarder will accordingly be maintained at its preset pressure of between 30 and 37 p.s.i. by the action of Bourdon tube 685 as previously described. It will also be assumed that the computer has functioned to supply a value $V_3$ of leaving speed from the group retarder, which value will now be stored in electronic storage unit 1–2GR1–ESU.

As the cut moves into section 1–2GR1T, the output of velocity meter 26 will be connected to terminal b of speed control unit 50 over leads 635 and 636, front contact d of relay R1TP, which is picked up as soon as the cut shunts section 1–2GR1T, and lead 637. The output from terminal c of electronic storage unit 1–2GR1–ESU will be connected to terminal a of speed control unit 50 over leads 638 and 639, front contact e of relay R1TP, and lead 641.

The speed control unit will now function to measure the speed of the cut and its higher time derivatives, as previously described, such that when the combined speed characteristics of the cut are above the desired value, terminal e of speed control unit 50 will be energized, and when the combined characteristics fall below a desired value, terminals f and g will be energized. When the speed characteristics are as desired, none of the terminals of the speed control unit will be energized.

As soon as the cut occupies section 1–2GR1T, and relay R1TP picks up, relay R1TPP will be picked up over the front point of contact a of relay R1TP and will then be held up over its front contact b and back contact d of end-of-cut relay R1EC. With relay R1TPP picked up, the circuit for presetting the first section of the retarder will be interrupted at the open back point of contact d of relay R1TPP. The retarder will now be controlled from terminals e, f and g of speed control unit 50.

When terminal e of speed control unit 50 is energized, the movable element of Bourdon tube 614 will be energized over the previously traced circuit extending from terminal e of speed control unit 50 and including leads 654 and 655, front contact c of relay R1TPP, lead 657, front contact e of relay AP, lead 658, the back point of contact e of relay 1–2RH1, front contact h of relay 1–2RL1, and leads 659 and 653.

Under the initial conditions previously described, with the retarder preset between 15 and 22 p.s.i., back contact b of Bourdon tube 614 will be closed. Accordingly, intake magnet 1LM will be energized over lead 644 and the pressure will be increased. When the pressure exceeds 30 p.s.i., back contact b of tube 614 will be opened.

Should the pressure exceed 37 p.s.i., front contact a of tube 614 will be closed. Relay 1OPR will then be picked up over lead 651 and back contact c of relay 1HPR. Exhaust magnet 1X2M will be energized over front contact b of relay 1OPR and lead 673 until the pressure is reduced below 37 p.s.i.

Should the combined speed characteristics decrease below the desired value, terminals f and g of speed control unit 50 will be energized. Exhaust magnet 1X1M will be energized over its previously traced circuit extending from terminal f of speed control unit 50 over leads 667 and 669, front contact a of relay AP, lead 670, front contact b of relay 1–2RL1, lead 671, back contact a of relay 1OPR, lead 672, and through the winding of magnet 1X1M to terminal N of the battery. The valve controlled by magnet 1X1M will respond quite rapidly, causing a relatively slight decrease in braking force which will rapidly be reflected in the higher time derivatives of the speed of the cut, to prevent overcorrection, and consequent hunting of the system. Exhaust magnet 1X2M will be energized from terminal g of speed control unit 50 over leads 674 and 675, front contact h of relay AP, lead 677, front contact i of relay 1–2RL1, lead 678, the back point of contact b of relay 1OPR, and lead 673. The valve controlled by this magnet will provide a large exhaust capacity if needed to greatly reduce the combined speed characteristics of the cut.

As the cut moves into section 1–2GR2T, relay 1–2RC will be picked up and the weight information stored in relays 1–2RL1 and 1–2RH1 will be transferred to relays 1–2RL2 and 1–2RH2 by their previously described circuits.

During the time that the cut occupied section 1–2GR1T alone, the value of $V_3$ which was supplied from storage unit 1–2GR1–ESU to speed control unit 50 was supplied in parallel to storage unit 1–2GR2–ESU over a circuit extending from terminal c of unit 1–2GR1–ESU over leads 638 and 640, back contact e of relay R2TP, and lead 642, to terminal a of unit 1–2GR2–ESU. When section 1–2GR2T is occupied, relay R2TP will pick up and interrupt this transfer circuit. At the same time, relay 8H will be picked up over front contact h of relay R2TP, lead 643 and terminal b of storage unit 1–2GR2–ESU. The storage is accordingly held for use in the second section, to which the value of $V_3$ stored in unit 1–2GR2–ESU is now supplied from its output terminal c over lead 649, front contact g of relay R2TP, and lead 645 to terminal a of speed control unit 51. At the same time, the output appearing at terminal a of velocity meter 52 will be supplied to terminal b of speed control unit 51 over lead 986, front contact f of relay R2TP and lead 987. Speed control unit 51 will accordingly commence to follow the action of the cut, but will as yet be ineffective to control the second section.

During the joint occupancy of sections 1–2GR1T and 1–2GR2T, the second section pressure control unit 1–2GR2 is controlled from the first section speed control unit 50. Should terminal e of speed control unit 50 be energized, the movable contact of Bourdon tube 685 will be energized over a circuit including leads 654 and 656, the front point of contact d of relay 1–2RC, lead 693, front contact b of relay AP, lead 694, the back point of contact c of relay 1–2RH2, front contact b of relay 1–2RL2 and leads 690, 689 and 691. The action of this tube will maintain the pressure between 30 and 37 p.s.i. while terminal e of speed control unit 50 is energized. Should the pressure exceed 37 p.s.i. relay 2OPR and exhaust magnet 2X2M will be energized, as previously described, to reduce the pressure. Should the pressure go below 30 p.s.i., back contact b of tube 685 will be closed and intake magnet 2LM will be energized.

If terminals f and g of speed control unit 50 are energized, exhaust magnets 2X2M and 2X1M will be energized over their previously traced circuits including front contacts e and f of relay 1–2RC and the pressure will be decreased to the extent necessary to restore the speed characteristics of the cut to the desired value.

As the cut clears section 1–2GR1T, relay R1TP is released, and relay R1EC (FIG. 27) is picked up over its previously traced circuit extending from terminal B of the battery over the back point of contact a of relay R1TP, lead 147, front contact a of relay R2TP, lead 148, front contact c of relay GAEC, which is picked up when section CL4T is vacated and is held up over back contact c of relay R1EC, lead 149, the winding of relay R1EC, lead 150, and back contact a of relay R2EC to terminal N of the battery. Relay 1–2RC is now released, due to the opening of its previously traced stick circuit at the open back point of contact b of relay R1EC.

The first section of the group retarder will now be restored to its previously described standby condition, in which the pressure is maintained between 75 and 82 p.s.i. by the action of Bourdon tube 613. The second section will now be controlled from its own speed control unit 51. The intake control circuit from terminal e of speed control unit 51, as previously described, extends over lead 704, the back point of contact d of relay 1–2RC, lead 693, front contact b of relay AP, lead 694, the back point of contact c of relay 1–2RH2, front contact b of relay 1–2RL2 and leads 690, 689 and 691 to the movable contact of Bourdon tube 685. As long as terminal e is energized, Bourdon tube 685 will function as previously described to maintain the pressure between 30 and 37 p.s.i. by energizing intake magnet 2LM or relay 2OPR and exhaust magnet 2X2M, as required. The circuit from terminal f of speed control unit 51 extends over lead 709, the back point of contact f of relay 1–2RC, lead 705, front contact f of relay AP, lead 706, front contact f of relay 1–2RL2, lead 707, back contact b of relay 2OPR and lead 708 to the winding of magnet 2X1M. The circuit from terminal g of speed control unit 51 extends over lead 714, the back point of contact e of relay 1–2RC, lead 711, front contact d of relay AP, lead 712, front contact e of relay 1–2RL2, lead 713, the back point of contact a of relay 2OPR and over lead 710 to magnet 2X2M. Magnets 2X1M and 2X2M will accordingly be energized in parallel to the extent necessary to restore the combined speed characteristics of the cut to the desired value.

When the cut clears section 1–2GR2T, relay R2TP will release and speed control unit 51 will be disconnected from its supply voltage. At the same time, relay 1–2RL2 will be released. The second section will then be returned to its standby condition, in which it is maintained between 63 and 70 p.s.i. by the action of Bourdon tube 686 as previously described.

The sequence of operations for a medium weight cut is substantially the same as for the light cut just described, and accordingly, in considering the operation of such a cut, only those circuits which function differently will be described. It will be initially assumed that both sections of the group retarder are in their standby condition, with the first section maintained between 75 and 82 p.s.i. by Bourdon tube 613, and the second section held between 63 and 70 p.s.i. by Bourdon tube 686.

It will next be assumed that the weight of an approaching medium weight cut is registered by the energization of both relays 1–2RL1 and 1–2RH1. The first section of the group retarder will now be preset to a pressure between 30 and 37 p.s.i. by the action of Bourdon tube 614 as previously described. The second section of the retarder will be preset between 30 and 37 p.s.i. by the action of Bourdon tube 685 as long as the pressure in the first section remains below 35 p.s.i. so that contact b of Bourdon tube 612 is closed. However, should the pressure in the first section rise above 35 p.s.i., the control of the second section will be transferred to Bourdon tube 686, which will then raise the pressure to between 63 and 70 p.s.i.

When the cut enters the first section, and speed control unit 50 becomes effective to control unit 1–2GR1, the circuit from terminal e of speed control 50 will extend over leads 654 and 655, front contact c of relay R1TPP, lead 657, front contact e of relay AP, lead 658, the front point of contact e of relay 1–2RH1, the front point of contact e of relay 1–2RL1, and lead 660 to the movable contact of Bourdon tube 613. As previously described, this tube will function to keep the pressure between 75 and 82 p.s.i. by alternately energizing intake magnet 1HMM and relay 1OPR, the latter controlling exhaust magnet 1X2M, as required.

The exhaust circuit from terminal f of speed control unit 50 extends at this time over leads 667 and 669, front contact a of relay AP, lead 670, front contacts b of relays 1–2RL1 and 1–2RH1 in multiple, lead 671, back contact a of relay 1OPR and lead 672 to magnet 1X1M. The circuit from terminal g of speed control unit 50 extends over leads 674 and 675, front contact h of relay AP, lead 677, front contact i of relay 1–2RL1 in multiple with front contact g of relay 1–2RH1, lead 678, the back point of contact b of relay 1OPR, and over lead 673 to magnet 1X2M. Magnets 1X1M and 1X2M will be accordingly energized in parallel to affect the necessary reduction in braking force.

When the cut occupies both sections 1–2GR1T and 1–2GR2T, the second section pressure control unit 1–2GR2 will be controlled from the first section speed control unit 50. The first section has been maintained, as previously described, between 75 and 82 p.s.i. Back contact b of Bourdon tube 612, which opens at pressures above 35 p.s.i., will accordingly be opened, and the preset pressure of the second section will have been increased to between 63 and 70 p.s.i. by the action of Bourdon tube 686. At this time, relays 1–2RL2 and 1–2RH2 will be picked up.

A circuit from terminal e of speed control unit 50 will now extend over leads 654 and 656, the front point of contact d of relay 1–2RC, lead 693, front contact b of relay AP, lead 694, the front point of contact c of relay 1–2RH2, lead 702, the back point of contact b of relay 2HPR, lead 699, and over lead 701 to intake magnet 2HMM. This magnet will cause the pressure to increase to the extent necessary to reduce the speed characteristics of the cut to the desired value. It will be noted that in this case there is no pressure ceiling established, other than the value of the fluid supply pressure.

At this time, exhaust magnets 2X1M and 2X2M will be controlled from terminals f and g of speed control unit 50 in the same manner as previously described in the case of the light cut.

When the cut clears section 1–2GR1T, the first section will return to its standby condition. The second section will be operated from the second section speed control unit 51. The intake circuit in this case extends from terminal e of speed control unit 51 over lead 704, the back point of contact d of relay 1–2RC, lead 693, front contact b of relay AP, lead 694, the front point of contact c of relay 1–2RH2, lead 702, the back point of contact b of relay 2HPR, and over leads 699 and 701 to magnet 2HMM. The exhaust circuits are the same as those described for the light weight cut, controlling exhaust magnets 2X1M and 2X2M from terminals f and g of speed control unit 51 over the back points of contacts e and f of relay 1–2RC.

When the cut clears section 1–2GR2T, the second section will be restored to its standby condition as previously described.

The operation of the retarder in braking a heavy cut is substantially the same as for the light and medium cuts, and only the operations which are different will be described. When the heavy cut is registered in the first section by energizing relay RH1 and maintaining relay RL1 released, the previously described preset circuit for heavy cuts will be established, and Bourdon tube 613 will function to maintain the pressure in the first section between 75 and 82 p.s.i. Since, with the pressure in this range, neither of the contacts of Bourdon tube 612 will be closed, the pressure in the second section will be maintained between 63 and 70 p.s.i. by the action of Bourdon tube 686 as previously described.

When the heavy cut is in the first section under the control of speed control unit 50, the intake circuit extends from terminal e of unit 50 over leads 654 and 655, front contact c of relay R1TPP, lead 657, and front contact e of relay AP to lead 658, where the circuit divides into two branches. The first extends over the front point of contact e of relay 1–2RH1, the back point of contact e of relay 1–2RL1, the back point of contact b of relay 1HPR, and over leads 661 and 663 to intake magnet 1HMM. The second branch extends from lead 658 over front contact d of relay 1–2RH1, back contact d of relay 1–2RL1, lead 655, the back point of contact a of relay 1HPR, and over lead 664 to intake magnet 1HM. Magnets 1HM and 1HMM will accordingly be energized in parallel to rapidly increase the braking pressure to a high sustained value, limited only by the pressure of the supply source, until speed control terminal e becomes deenergized.

Exhaust terminals f and g of speed control unit 50 control exhaust magnets 1X1M and 1X2M in parallel in the same manner as described for light and medium cuts.

When the cut occupies both sections 1–2GR1T and 1–2GR2T, relays 1–2RL2 and 1–2RH2 will be picked up and pressure control unit 1–2GR2 will be controlled from speed control unit 50. The intake circuit in this case extends from terminal e of speed control unit 50 over leads 654 and 656, the front point of contact d of relay 1–2RC, lead 693, front contact b of relay AP, lead 694, and thence over a pair of paths, a first extending over the front point of contact c of relay 1–2RH2, lead 702, back contact b of relay 2HPR, and leads 699 and 701 to intake magnet 2HMM, and the second extending from lead 694 over front contact b of relay 1–2RH2, back contact c of relay 1–2RL2, lead 698, the back point of contact a of relay 2HPR, and over leads 696 and 697 to intake magnet 2HM. Magnets 2HM and 2HMM are accordingly energized in parallel for as long as required to bring the speed characteristics down to the desired value. At this time, terminals f and g of speed control unit 50 control exhaust magnets 2X1M and 2X2M in parallel in the same manner as described for light and medium cuts when required to reduce the amount of applied braking.

When the cut clears section 1–2GR1T, the first section is returned to its standby condition. The second section is now controlled by second section speed control unit 51. The intake circuits in this case extend from terminal e of speed control unit 51 over lead 704, the back point of contact d of relay 1–2RC, lead 693, front contact b of relay AP, lead 694, and thence over two paths to magnets 2HM and 2HMM which are the same as previously traced for control by the first section speed control unit. Magnets 2HM and 2HMM thus continue to be controlled in parallel when increased braking pressure is required.

The exhaust magnets 2X1M and 2X2M are controlled in parallel from terminals f and g of speed control unit 51 in the manner previously described for light and medium cuts. When the second section is vacated, it is returned to its standby condition in the manner previously described.

*The cut length measuring circuits*

Referring now to FIGS. 27 and 28, the length of cuts in this embodiment of our invention is measured by four track sections CL1T, CL2T, CL3T and CL4T located ahead of each of the group retarders. Since these track setcions and their associated circuits are the same for each of the group retarders, only those associated with group retarders 1–2GR will be described. Of these track sections, sections CL1T and CL4T are 58 feet in length, and sections CL2T and CL3T are each 29 feet in length.

As previously described, these track sections are provided with track relays CL1TR, CL2TR, CL3TR and CL4TR, and back contact repeater relays CL1TP, CL2TP, CL3TP and CL4TP, respectively. The manner in which these track circuits are employed to measure cut length are more fully described in the copending application of Joseph M. Berill, Serial No. 696,406 filed November 14, 1957, for a Cut Length Detector, assigned to the assignee of our present application and now Patent No. 2,976,401, issued March 21, 1961. However, since an understanding of the operation of these circuits is necessary to an understanding of the operation of our system, they will be briefly described.

The measured cut length is stored in three relays CLA, CLB and CLC (FIG. 28). If the length of the cut is between 0 and 29 feet, relays CLA and CLB will be energized. If the length of the cut is between 29 and 58 feet, all three relays will be energized. If the length of the cut is between 58 and 87 feet, relays CLB and CLC will be energized. If the length of the cut is between 87 and 116 feet, only relay CLC will be energized. If the length of the cut is greater than 116 feet, none of the relays will be energized. Relays CLC, CLB and CLC are energized in the above described combinations under the control of the previously described track repeater relays CL1TP through CL4TP in conjunction with control relays CLEC and SC in a manner which will now be described.

Relay CLEC has a first pickup circuit extending from terminal B of the battery over front contact a of relay CL3TP (FIG. 28), lead 324, back contact a of relay CL1TP (FIG. 27), and through the winding of relay CLEC to terminal N of the battery. Relay CLEC has a second pickup circuit extending from terminal B of the battery over front contact a of relay CL2TP, back contact a of relay CL1TP, and through the winding of relay CLEC to terminal N of the battery. Relay CLEC has a pair of stick circuits, which are the same as its previously traced pickup circuits except that they include its own front contact a in shunt around back contact a of relay CL1TP. Relay CLEC is thus energized to indicate the end of the cut in the measuring stretch when either relay CL2TP or relay CL3TP is picked up and relay CL1TP is released, and is held up as long as either relay CL2TP or CL3TP remains energized.

Relay SC has a pickup circuit which extends from terminal B of the battery over front contact h of relay CL4TP (FIG. 28), lead 322, through the winding of relay SC (FIG. 27), over front contact b of relay CLEC, front contact b of relay CL1TP, and over front contacts b of relays CL2TP (FIG. 27) and CL3TP (lead 323 to FIG. 28) in multiple to terminal N of the battery. Relay SC will accordingly be picked up if a second cut enters the measuring stretch which the first cut is still in section CL3T or section CL2T and occupies section CL4T with relay CLEC up, and will thus make the cut length registration final before the second cut can interfere.

Relay CLA has two pickup circuits. The first extends from terminal B of the battery over back contact a of relay R1TPP, which is picked up as soon as section 1–2GR1T is occupied, and is released when section 1–2GR1T is clear, back contact a of relay SC, front contact c of relay CLEC, lead 962, front contact c of relay CL3TP (FIG. 28), back contact j of relay CL4TP, and through the winding of relay CLA to terminal N of the battery. Relay CLA is picked up b ythis circuit as soon as relay CLEC comes up with relay CL3TP up and relay CL4TP down. The second pickup circuit for relay CLA extends from terminal B of the battery over front contact b of relay GAEC, back contact a of relay SC, front contact c of relay CLEC, lead 962, front contact c of relay CL3TP, back contact j of relay CL4TP, and through the winding of relay CLA to terminal N of the battery. This circuit makes it possible to pick up relay CLA even though section 1–2GR1T is occupied by a preceding cut, if section CL4T has been cleared by the preceding cut. Relay CLA has a stick circuit which extends from terminal B of the battery over front contact *m* of relay CL4TP, its own front contact *a*, and through its winding to terminal N of the battery. Once picked up, relay CLA is accordingly held up as long as section CL4T is occupied.

Relay CLB has a first pickup circuit extending from terminal B of the battery over back contact *a* of relay R1TPP (FIG. 27), back contact *a* of relay SC, front contact *d* of relay CLEC, lead 963, front contact *d* of relay CL3TP, lead 964, back contact *d* of relay CL2TP, lead 965, and through the winding of relay CLB to terminal N of the battery. Relay CLB may be picked up by this circuit if section 1–2GR1T is unoccupied and if relay CL3TP remains up after relays CLEC and CL2TP release. Relay CLB has a second pickup circuit which extends from terminal B of the battery over front contact *b* of relay GAEC, back contact *a* of relay SC, front contact *d* of relay CLEC, lead 963, front contact *d* of relay CL3TP, lead 964, back contact *d* of relay CL2TP, lead 965, and through the winding of relay CLB to terminal N of the battery. This circuit is the same as that previously traced except that it includes front contact *b* of relay GAEC rather than back contact *a* of relay R1TPP, and accordingly permits relay CLB to be picked up even though section 1–2GR1T is occupied once section CL4T has been cleared. Relay CLB has a stick circuit extending from terminal B of the battery over front contact *m* of relay CL4TP, its own front contact *a*, and through its winding to terminal N of the battery. It is accordingly held up during the occupancy of section CL4T if it has initially been picked up.

Relay CLC has a pair of pickup circuits, which extend from terminal B of the battery over back contact *a* of relay R1TPP in a first path and over front contact *b* of relay GAEC in a second path, and thence over a common path including back contact *a* of relay SC, front contact *d* of relay CLEC, lead 963, front contact *k* of relay CL4TP, lead 966, front contact *c* of relay CL2TP, lead 967, and through the winding of relay CLB to terminal N of the battery. Relay CLC is accordingly picked up when relays CLEC, CL2TP and CL4TP are energized and either section 1–2GR1T is unoccupied, or it is occupied and section CL4T has been cleared. Relay CLC has a stick circuit which extends over front contact *m* of relay CL4TP, its own front contact *a*, and through its winding to terminal N of the battery. It is accordingly held up during the occupancy of section CL4T if it has initially been picked up.

The cut length measuring circuits having been described, their operation will now be described.

Assume first that a cut comprising a single car less than 29 feet in length enters section CL1T, causing relay CL1TR to release and relay CL1TP to be picked up. No further action will take place during the occupancy of section CL1T. As the cut moves into section CL2T, relay CL2TR will be released and relay CL2TP will be picked up. Since the cut is less than 29 feet long, it will clear section CL1T before it occupies section CL3T, and relay CL1TR will be picked up and relay CL1TP will be released. Relay CLEC will now be picked up over its previously traced circuit including front contact *a* of relay CL2TP and back contact *a* of relay CL1TP.

It is assumed that there are no preceding cuts, so that section 1–2GR1T will be unoccupied and relay R1TPP is released. As the cut moves into section CL3T, relay CL3TR will release and relay CL3TP will be picked up. Relay CLA will now be picked up over its first previously traced circuit including back contact *a* of relay R1TPP, back contact *a* of relay SC, front contact *c* of relay CLEC, front contact *c* of relay CL3TP, and back contact *j* of relay CL4TP.

The cut will clear section CL2T before section CL4T is occupied. Accordingly, relay CLC will not pick up. However, when section CL2T is cleared, relay CLB will be picked up over its previously traced circuit including back contact *a* of relay R1TPP, back contact *d* of relay SC, front contact *d* of relay CLEC, front contact *d* of relay CL3TP, and back contact *d* of relay CL2TP.

As the cut moves onto section CL4T, the stick circuits previously traced for relays CLA and CLB are completed by the pick up of relay CL4TP. The indication of the relays is thus maintained for use in the computer as later will be described.

The operation of the equipment in response to the passage of a cut longer than 29 feet but less than 58 feet in length will now be described. In this case, section CL3T will be occupied before section CL1T is cleared. Relay CLEC will accordingly pick up over front contacts *a* of relays CL2TP and CL3TP in multiple and back contact *a* of relay CL1TP as soon as section CL1T is vacated. Before section CL4T is occupied, relay CLA will be picked up over its previously traced circuit including back contact *a* of relay R1TPP, back contact *a* of relay SC, front contact *c* of relay CLEC, front contact *c* of relay CL3TP, and back contact *j* of relay CL4TP. Relay CLC will pick up as soon as section CL4T is occupied, over its previously traced circuit including back contact *a* of relay R1TPP, back contact *a* of relay SC, front contact *d* of relay CLEC, front contact *k* of relay CL4TP and front contact *c* of relay CL2TP. As soon as section CL2T is vacated, relay CLB will be picked up over its previously traced circuit including back contact *a* of relay R1TPP, back contact *a* of relay SC, front contact *d* of relay CLEC, front contact *d* of relay CL3TP and back contact *d* of relay CL2TP.

If the cut length is between 58 and 87 feet, section CL4T will be occupied before section CL1T is vacated. When section CL1T is vacated, relay CLEC will pick up as before. With relay CLEC picked up, relay CLC will pick up over its previously traced circuit including back contact *a* of relay R1TPP, back contact *a* of relay SC, front contact *d* of relay CLEC, front contact *k* of relay CL4TP and front contact *c* of relay CL2TP. As soon as section CL2T is vacated, relay CLB will pick up over its previously traced circuit including back contact *a* of relay R1TPP, back contact *a* of relay SC, front contact *d* of relay CLEC, front contact *d* of relay CL3TP, and back contact *d* of relay CL2TP. The circuit for relay CLA will be open at the open back point of contact *j* of relay CL4TP.

If the cut length is between 87 and 116 feet, the cut will reach the end of section CL4T before section CL2T is vacated. Under these conditions, only relay CLC will pick up, since it is controlled over front contacts of relays CL2TP and CL4TP. The circuit for relay CLB will remain open at the open back point of contact *d* of relay CL2TP, and the circuit for relay CLA will remain open at the open back point of contact *j* of relay CL4TP.

If the length of the cut is greater than 116 feet, section 1–2GR1T will be occupied before section CL1T is cleared. Accordingly, the circuits for relays CLA, CLB and CLC will be interrupted at the open back point of contact *a* of relay R1TPP. The alternate circuits for these relays will be open at the front point of contact *b* of relay GAEC, which cannot pick up until section CL4T is cleared.

Under any of the preceding cases, should a following cut enter section CL1T while a previous cut is still in section CL4T and still occupying sections CL2T and CL3T or section CL3T, relay SC will pick up over its previously described circuit to interrupt the pick up circuit for relays CLA, CLB and CLC at the open back point of its contact *a*. This will prevent the change of the registered cut length once it has been established.

*The curved track rolling resistance computer*

As previously described, the curved track rolling resistance between the points 1 and 2 in FIGS. 4, 5 and 6, that is, from the point at which the cut clears the master retarder to the point at which it occupies the fourth cut length measuring section CL4T for the particular group retarder in its route, is found by solving Equation 29, previously derived. As pointed out, for the solution of this equation, 24 solutions for the functions $u$ and $v$ are required in order to compute $R_{1, 2}$ for any value of $V_2$, the velocity at which the cut approaches the group retarder. These solutions are pre-computed and stored in the equipment shown in FIGS. 50, 51, 52, 62 and 63, and one solution is then selected in accordance with the setting of the FNS lever and the values of weight and cut length for each cut. This apparatus is fully disclosed and claimed in the previously mentioned Mowery Patent 3,054,892. However, it will be described herein because an understanding of its operation is necessary in understanding the operation of our system, and also because in its broader aspects it forms a part of our invention.

Referring now to FIGS. 50, 51, 52, 62 and 63, the computing apparatus for finding the value of $R_{1, 2}$ comprises a relay CLVP (FIG. 50), which checks that the length of the cut is under 116 feet and that the cut has left the retarder at the pre-selected velocity $V_1$; a test compute relay 1-TC (FIG. 50), to be described; two weight storage relays 21-RLP and 21-RHP (FIG. 50), six computer ratio panels, 1CRP through 6CRP (FIGS. 51, 52, 62 and 63), a summing amplifier 718 (FIG. 50), and additional elements which will be described.

The control of relay CLVP has been described previously. If picked up, it indicates that the cut length has been measured and found to be less than 116 feet, and that the correct leaving velocity $V_1$ from the master retarder has been obtained.

The control of relays 21-RLP and 21-RHP has also been described. These relays are energized from the A bank of the 1–2 phantom storage location when section CL4T is occupied, in the same combination as previously described for the other weight storage relays in accordance with the weight of the cut.

Relay 1-TC has a pickup circuit which extends from terminal B of the battery over back contact $f$ of relay CL4TP (FIG. 28), lead 719, lead 720 (FIG. 53), and through the winding of relay 1-TC (FIG. 50) to terminal N of the battery. This relay is used to establish a test compute cycle. When relay CL4TP is released with section CL4T normally unoccupied, relay 1-TC is picked up to cause this portion of the computer to solve a test problem, as will be described, to check its operation. When section CL4T is occupied, relay 1-TC is released, and the computer solves for the leaving velocity of the particular cut that is occupying section CL4T.

Figure 66:
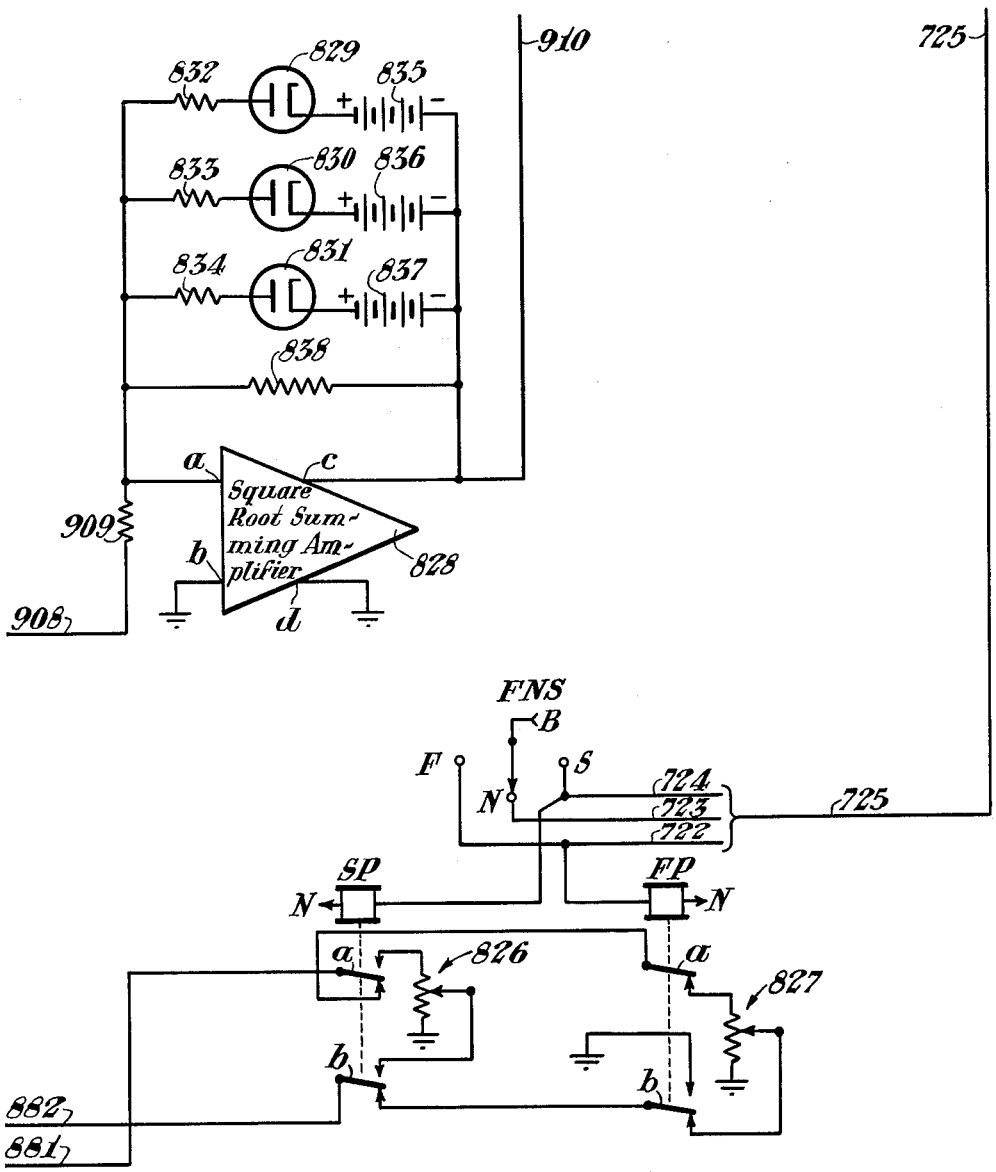

The FNS lever has contacts schematically shown in FIG. 66 corresponding to fast, slow and normal operating conditions in the yard as previously described. Fast contact F is connected to lead 722, normal contact N is connected to lead 723 and slow contact S is connected to lead 724. These leads are connected over a cable 725 to FIG. 50, where they are again produced and connected to contacts $a$, $b$, $c$, respectively, of relay CLVP. The one of leads 722, 723 and 724 which is energized selects a pair of panels from the six computer ratio panels 1CRP through 6CRP, as will be described.

Figure 62:
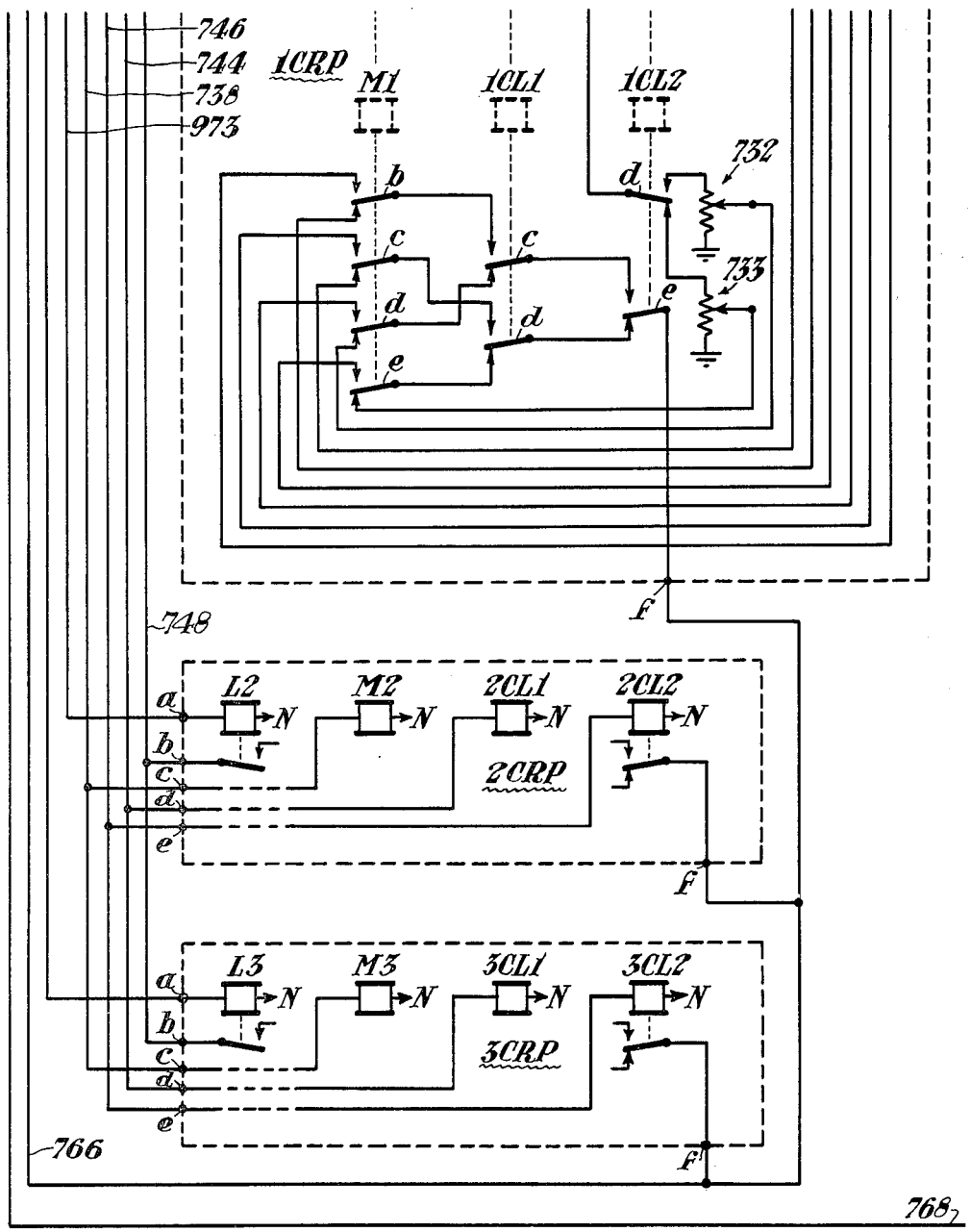
Figure 63:
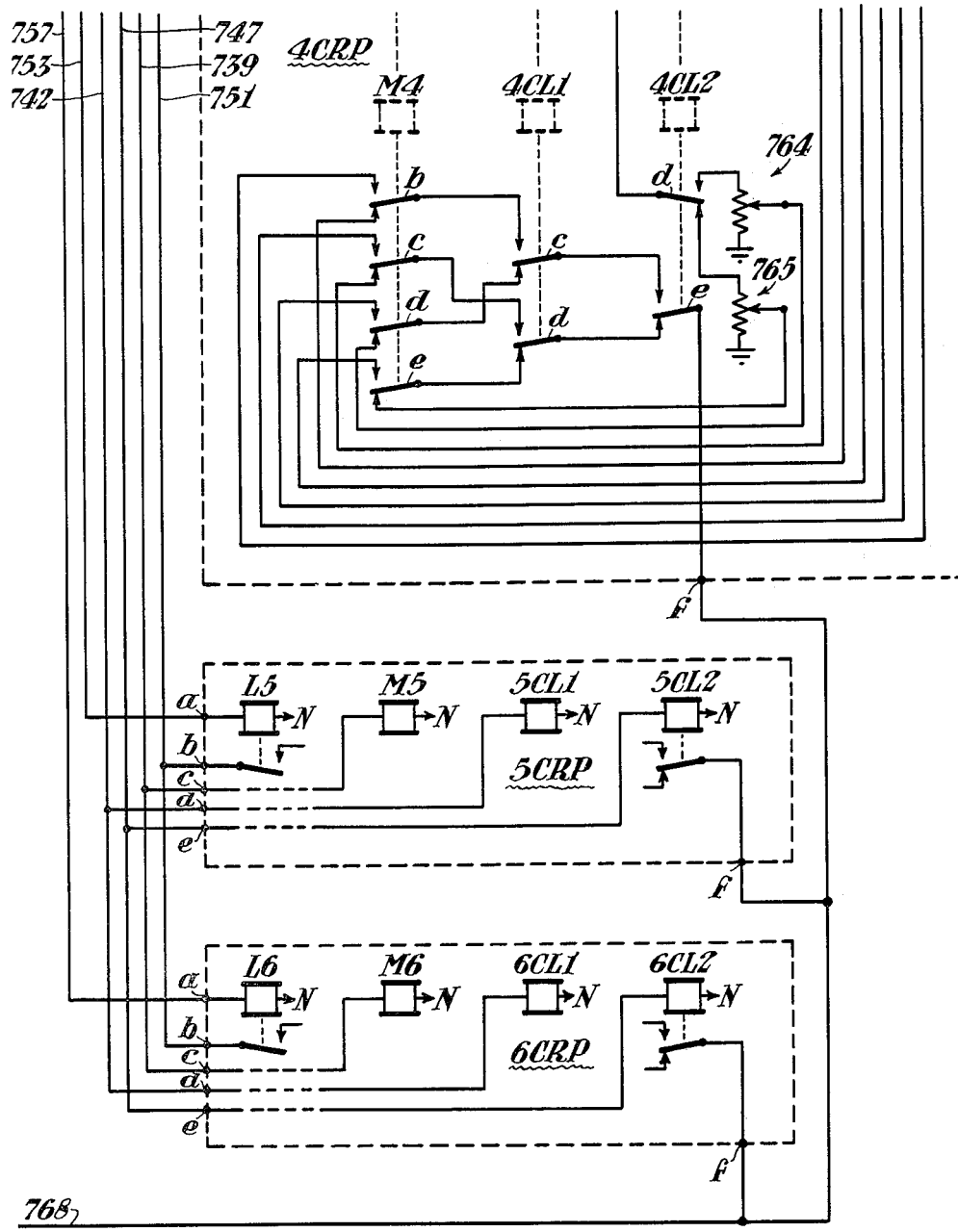

Each of panels 1CRP through 6CRP is of identical construction, and, therefore, only panels 1CRP (FIGS. 51 and 62) and 4CRP (FIGS. 52 and 63) will be described in detail. Panel 1CRP includes relays L1, M1, 1CL1 and 1CL2 (FIG. 50), and eight potentiometers 726, 727, 728, 729, 730, 731 (FIG. 50), 732 and 733 (FIG. 62).

Figure 52:
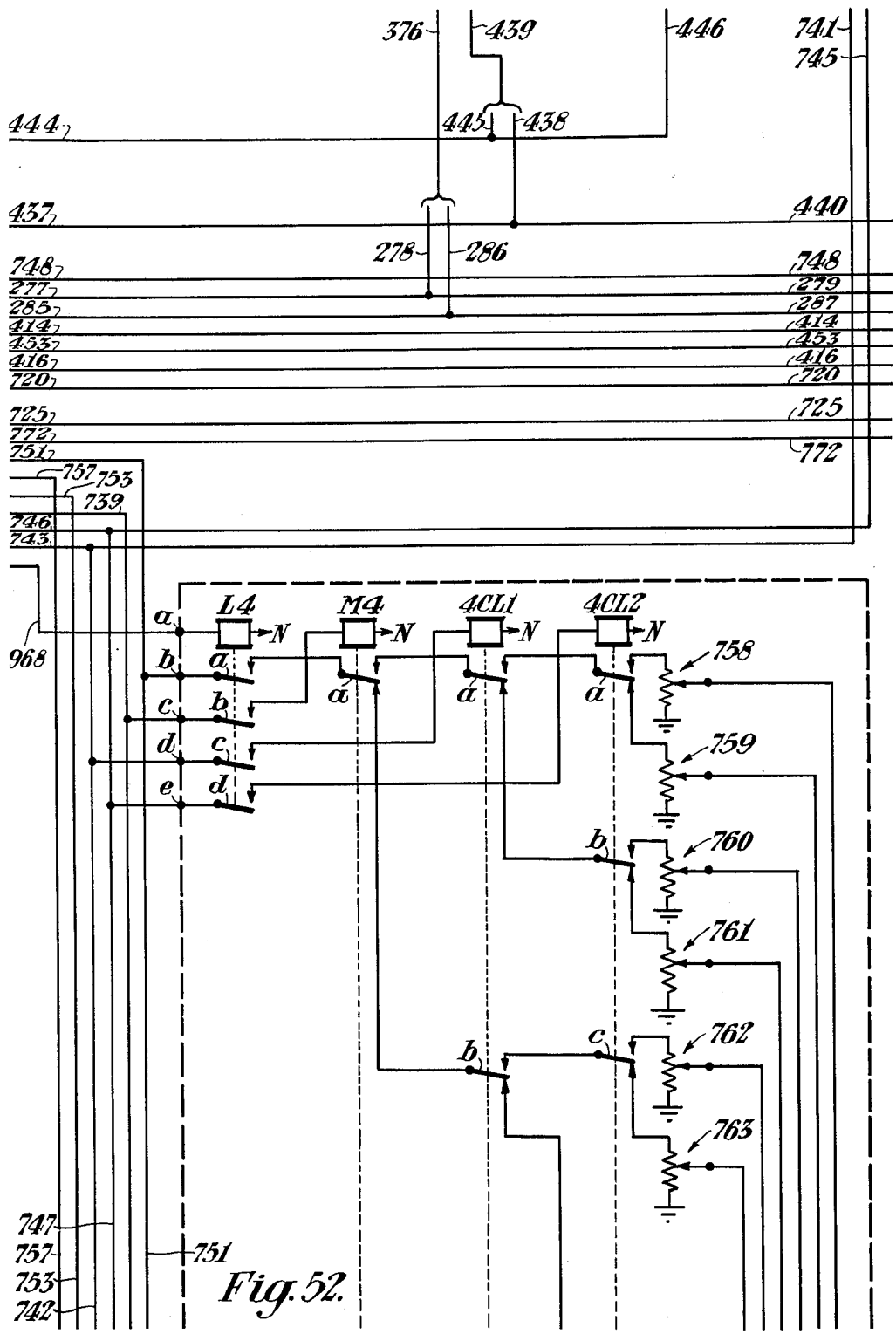

Relay L1 has a pickup circuit which extends from terminal B of the battery over the F contact of the FNS lever (FIG. 66), lead 722, cable 725, lead 722 (FIG. 50), front contact $a$ of relay CLVP, lead 740, terminal $a$ of panel 1CRP and through the winding of relay L1 to terminal N of the battery. It will be noted that when this circuit is completed, a parallel circuit over lead 968 is completed to energize relay L4, in panel 4CRP (FIG. 52). When these relays are picked up, the value of $R_{1, 2}$ is computed in panels 1CRP and 4CRP and the remaining panels are not employed.

Relay M1 has a pickup circuit extending from terminal B of the battery over front contact $a$ of relay 21-RLP, back contact $a$ of relay 21-RHP, lead 736, terminal $c$ of panel 1CRP, front contact $b$ of relay L1, and through the winding of relay M1 to terminal N of the battery. This relay is accordingly picked up if a light weight cut is under control and if panel 1CRP has been selected. It will be noted that parallel circuits extend over lead 738 to relays M2 and M3 in panels 2CRP and 3CRP, and over lead 739 to panels 4CRP, 5CRP and 6CRP. With the exception of relay M4 in panel 4CRP, all of these circuits will be interrupted at the open front points of the contacts of the L relays in the panels. However, relay M4 will be picked up if relay M1 is picked up, since panels 1CRP and 4CRP are used together.

Relay 1CL1 has a pickup circuit extending from terminal B of the battery over front contact $b$ of relay CLC (FIG. 28), back contact $b$ of relay CLA, lead 741, lead 743 (FIG. 52), terminal $d$ of panel 1CRP, front contact $c$ of relay L1, and through the winding of relay 1CL1 to terminal N of the battery. This relay is accordingly picked up if the cut length is between 58 and 116 feet. It will be noted that the CL1 relays in panels 2CRP and 3CRP are supplied by the circuit just traced from lead 743 over lead 744, but these circuits will be interrupted at the open front contacts of relays L2 and L3 if panels 1CRP and 4CRP have been selected by the FNS lever. The CL1 relays in panels 4CRP, 5CRP and 6CRP have similar circuits over leads 741 and 742, but with the exception of relay 4CL1, which is picked up if relay 1CL1 is picked up, these circuits are interrupted at the open front contacts of the L relays.

The CL2 relays of panels 1CRP through 6CRP have pickup circuits extending from terminal B of the battery over front contact $d$ of relay CLC (FIG. 28), and thence over alternate paths, the first including front contact $c$ of relay CLB and the front point of contact $d$ of relay CLA, and the second including back contact $d$ of relay CLB and the back point of contact $d$ of relay CLA, and thence over a common path from the heel of contact $d$ of relay CLA over lead 745, from lead 745 over a first lead 747 (FIG. 52) which supplies the CL2 relays of panels 4CRP, 5CRP and 6CRP, over the front contact $d$ of their respective L relays, and over a second branch 746 which supplies the CL2 relays of panels 1CRP, 2CRP and 3CRP over the front contacts $d$ of their respective L relays.

Accordingly, if relays L1 and L4 are picked up to select panels 1CRP and 4CRP, relays 2CL2 and 4CL2 will be energized if the cut length is either between 29 and 58 feet or between 87 and 116 feet. The CL1 and CL2 relays in combination, therefore, give all the information stored in relays CLA, CLB and CLC, since with neither of the CL1 or CL2 relays up the cut length must be below 29 feet, with only relay CL2 up the length is between 29 and 58 feet, with relay CL1 alone up the length must be between 58 and 87 feet, and with both the CL1 and CL2 relays up, the length must be between 87 and 116 feet.

Referring now specifically to panel 1CRP, one of potentiometers 726 through 733 will be selected in accordance with the energized or deenergized condition of relays M1, 1CL1 and 1CL2. These potentiometers are set to represent values of the function $v$ to be multiplied by the measured velocity $V_2$.

Referring now to FIG. 28, the output velocity $V_2$ from velocity meter 26 is supplied from output terminal $a$ over lead 635, front contact $b$ of relay CL4TP, lead 748, and thence to contacts $a$ of relays L1, L2 and L3. Since the circuit from this point is the same in each of the panels, attention will again be confined to panel 1CRP.

When relay L1 is energized, potentiometer 726 will be supplied from front contact *a* of relay L1 over the front points of contacts *a* of each of relays M1, 1CL1 and 1CL2. Potentiometer 727 will be supplied from front contact *a* of relay L1 over the front point of contact *a* of relay M1, the front point of contact *a* of relay 1CL1 and the back point of contact *a* of relay 1CL2. The rest of the potentiometers are selected by similar circuits. Specifically, if relay M1 is energized for a light cut one of potentiometers 726 through 729 will be selected, and if relay 1CL1 is picked up one of potentiometers 726 and 727 will be selected depending on whether relay 1CL2 is picked up or released. If relay 1CL1 is deenergized, one of potentiometers 728 and 729 is selected in accordance with the energized or deenergized condition of relay 1CL2. If relay M1 is released for a heavy or medium cut, one of potentiometers 730 through 733 is selected, potentiometer 730 or 731 being selected if relay 1CL1 is energized in accordance with the energized or deenergized condition of relay 1CL2, and one of potentiometers 732 and 733 being selected if relay 1CL1 is released in accordance with the energized or deenergized condition of relay 1CL2.

The one of potentiometers 726 to 733 which has been selected by the energized combination of relays M1, 1CL1 and 1CL2 has its wiper connected to output terminal *f* of panel 1CRP over a combination of contacts similar to the combination over which it was energized. The purpose of thus disconnecting non-selected potentiometers at both sides is to prevent them from loading the output circuit. It is believed that the arrangement of contacts for this purpose is sufficiently obvious from the drawing not to require a detailed explanation for each potentiometer. As an example, however, if relay M1 is picked up, relay 1CL1 is released and relay 1CL2 is picked up, the measured velocity $V_2$ appearing at terminal *b* of panel 1CRP will be connected to the resistive element of potentiometer 728 over front contact *a* of relay L1, the front point of contact *a* of relay M1, the back point of contact *a* of relay 1CL1, and the front point of contact *b* of relay 1CL2. The wiper of potentiometer 728 will then be connected to terminal *f* over the front point of contact *d* of relay M1, the back point of contact *c* of relay 1CL1 and the front point of contact *e* of relay 1CL2.

As is well known in the art, a voltage analogous to the product of two values may be obtained by applying a voltage proportional to one of the values across a potentiometer having a wiper adjusted above ground by an amount proportional to the other value, the voltage then appearing between the wiper and ground being proportional to the product of the two values. In the present case, a voltage proportional to the velocity $V_2$ of the cut approaching the group retarder is applied across the resistive element of the selected potentiometer, and the wiper is initially adjusted in the calibration of the apparatus to introduce one value of the function *v*. Eight values of *v* are thus available in each of panels 1CRP, 2CRP and 3CRP, each set of eight being calculated on the basis of a different position of the FNS lever, and the values within each set being computed in accordance with the eight possible combinations of weight and cut length represented by the M, CL1 and CL2 relays.

Panels 4CRP, 5CRP and 6CRP are employed to select the proper coefficient function *u* in Equation 29 for the selected value of $V_1$ leaving velocity from the master retarder. Since the apparatus will not function in a completely automatic manner unless the correct leaving velocity $V_1$ has been secured, and since the value of $V_1$ is initially selected on the basis of FNS lever position and the weight of the cut in the categories of light and heavy, it is sufficient to employ a fixed reference voltage to represent $V_1$ which is modified in accordance with weight and FNS position. This reference voltage is supplied by a suitable source of voltage such as a battery 749, which has its positive terminal grounded, as shown, and has its negative terminal connected through resistance 750 and lead 751 to terminals *b* of panels 4CRP, 5CRP and 6CRP. One of panels 4CRP, 5CRP and 6CRP is selected by the position of the FNS lever. That is, with the lever in its F position and front contact *a* of relay CLVP energized over lead 722, relay L4 is picked up over a circuit including leads 740 and 968, terminal *a* of panel 4CRP, and through the winding of relay L4 to terminal N of the battery. If the lever is in its N position, contact *b* of relay CLVP will be energized over lead 723, and relay L5 will be picked up over leads 752 and 753, terminal *a* of panel 5CRP, and through the winding of relay L5 to terminal N of the battery. If the lever is in its S position, front contact *c* of relay CLVP will be energized over lead 724 and relay L6 will be picked up over leads 755 and 757, terminal *a* of panel 6CRP, and through the winding of relay L6 to terminal N of the battery.

With one of relays L4 through L6 picked up, one of relays M4 through M6 may be energized over their previously traced circuits including front contact *a* of relay 21-RLP, back contact *a* of relay 21-RHP, leads 736 and 739, terminal *c* of the selected panel, and front contact *b* of the selected L relay. In the same manner, the CL1 and CL2 relays in the selected panel may be picked up over front contacts *c* and *d* of the selected L relay in accordance with the combined condition of relays CLA, CLB and CLC.

Each of panels 4CRP, 5CRP and 6CRP includes eight potentiometers such potentiometers 758, 759, 760, 761, 762, 763, 764 and 765 shown for panel 4CRP. Each of these potentiometers has a wiper adjusted to produce an output voltage in response to the applied voltage of battery 749 which is proportional to a particular value of *u* in Equation 29. Since the applied voltage from battery 749 is negative, this output voltage will be negative with respect to ground. The reason for this polarity will be explained below.

The selected one of potentiometers 758 through 765 in panel 4CRP has its resistive element connected across battery 749, which is applied to terminal *b* of panel 4CRP, and its output wiper connected to terminal *f* of panel 4CRP, over a combination of contacts of relays M4, 4CL1 and 4CL2. That is, if relay M4 is picked up, one of potentiometers 758 through 761 is selected, and if it is released, one of potentiometers 762 through 765 is selected. If relay 4CL1 is picked up, one of potentiometers 758 and 759 will be selected if relay M4 is picked up and one of potentiometers 762 and 763 will be selected if relay M4 is released. If relay 4CL1 is released, one of potentiometers 760 and 761 will be selected if relay M4 is energized, and one of potentiometers 764 and 765 will be selected if relay M4 is released. From the pair of potentiometers selected by this process, one is selected by the energized or deenergized condition of relay 4CL2. It is believed unnecessary to trace all of these circuits in detail. For example, however, if relays L4 and M4 are energized and relays 4CL1 and 4CL2 are released, the battery potential applied to terminal *b* of panel 4CRP is connected over front contact *a* of relay L4, the front point of contact *a* of relay M4, the back point of contact *a* of relay 4CL1, and the back point of contact *b* of relay 4CL2 to one side of the resistive element of potentiometer 761, the other side being connected to ground as shown. The wiper of potentiometer 761 is then connected to output terminal *f* of panel 4CRP over the front point of contact *e* of relay M4, the back point of contact *d* of relay 4CL1 and the back point of contact *e* of relay 4CL2. The corresponding circuits in panels 5CRP and 6CRP are identical with those just described for panel 4CRP.

The selected one of panels 1CRP through 3CRP will have an output voltage proportional to $vV_2$ appearing between its terminal *f* and ground, while terminals *f* of the remaining panels will be open circuited internally at the open front point of contact $a$ of their L relays. The terminals $f$ of these panels are connected together and are connected over lead 766, and through a summing resistor 767 to input terminal $a$ of summing amplifier 718 which has its other input terminal $b$ grounded as shown. Similarly, one of output terminals $f$ of panels 4CRP through 6CRP will have an output voltage with respect to ground which is proportional to $-u$. These terminals $f$ are connected together and are connected over lead 768, and through summing resistor 769 to the input $a$ of amplifier 718. Amplifier 718 may be provided with a suitable feed back resistor 770, and may be of conventional construction which need not be described in further detail.

Due to the inversion in amplifier 718, the output voltage at terminal $c$ of the amplifier with respect to grounded terminal $d$ is proportional to $u-vV_2$, which is equal to $R_{1,\ 2}$ as shown by Equation 29. This value is made available to the $V_3$ computer 22 (shown schematically in FIG. 13) in a manner to be described.

With relay CLVP released, either the cut has not left the master retarder with the correct leaving velocity, or it is too long to be handled automatically. In either case, the computed value of curved track rolling resistance cannot be used, and an average value is supplied. This value is modified by the weight of the cut in order to more nearly represent the actual conditions. For this purpose, three potentiometers M, L and H are provided, each having a wiper which is initially adjusted in the calibration of the yard to give the best average value of $R_{1,\ 2}$ for that particular weight category. Potentiometer M may have one end of its resistive element connected to the negative terminal of battery 749 through a suitable resistance 771, back contact $d$ of relay CLVP, the front point of contact $b$ of relay 21–RLP, and the front point of contact $b$ of relay 21–RHP, and the other end is connected to ground as shown. The wiper of potentiometer M may be connected to output lead 772 over the front point of contact $c$ of relay 21–RLP, the front point of contact $d$ of relay 21–RHP, the back point of contact $e$ of relay CLVP, and the back point of contact $a$ of relay 1–TC.

The resistive element of potentiometer L may have one end connected to the negative terminal of battery 749 through resistance 771 contact $d$ of relay CLVP, the front point of contact $b$ of relay 21–RLP and the back point of contact $b$ of relay 21–RHP, the other end being connected to ground as shown. The wiper of potentiometer L may be connected to output lead 772 over the front point of contact $d$ of relay 21–RLP, the back point of contact $d$ of relay 12–RHP, the back point of contact $e$ of relay CLVP, and the back point of contact $a$ of relay 1–TC.

Potentiometer H may have one end of its resistive element connected to the negative terminal of battery 749 through resistance 771, back contact $d$ of relay CLVP, the back point of contact $b$ of relay 21–RLP and the front point of contact $c$ of relay 21–RHP, the other side being connected to ground as shown. The wiper of potentiometer H may be connected to output lead 772 over the back point of contact $c$ of relay 21–RLP, the front point of contact $d$ of relay 21–RHP, the back point of contact $e$ of relay CLVP, and the back point of contact $a$ of relay 1–TC.

During the time that the computer is not solving for a value of $R_{1,\ 2}$ for a particular cut, it is desired to provide a test problem for solution to test the operation of the computer. For this purpose, $R_{1,\ 2}$ computer 21 merely provides a single value to the $V_3$ computer 22. This value is provided by connecting one end of resistor 773 to the negative terminal of battery 749 and the other end to one end of a resistor 774, which has its opposite end grounded as shown, to form a fixed voltage divider. The voltage at the junction of resistors 773 and 774 may be applied to output lead 772 over the front point of contact $a$ of relay 1–TC, which is picked up when track section CL4T is unoccupied.

It will appear from the above description that with section CL4T occupied by a cut of measurable length which has left the master retarder at the selected leaving velocity $V_1$, the value $R_{1,\ 2}$ is computed in panels 1CRP through 6CRP and summing amplifier 718, and the output proportional to $R_{1,\ 2}$ is supplied to output lead 772 over the front point of contact $e$ of relay CLVP and the back point of contact $a$ of relay 1–TC. If the cut is too long, or if its leaving velocity $V_1$ is not correct, an average value of $R_{1,\ 2}$ will be supplied to one of potentiometers M, L and H over the back point of contact $e$ of relay CLVP and the back point of contact $a$ of relay 1–TC. When the computer is in a standby condition, with track section CL4T unoccupied, a test value of $R_{1,\ 2}$ will be supplied from the potential divider comprising resistors 773 and 774 over the front point of contact $a$ of relay 1–TC.

Output lead 772 of the $R_{1,\ 2}$ computer 21 is connected to supply an input to computer 22 as will be described.

*The track fullness measuring and storing equipment*

The track fullness equipment shown schematically in FIGS. 6 and 13 is shown in more detail in FIGS. 28, 56, 57, 67 and 68. The details of this apparatus form no part of our present application, being more fully disclosed and claimed in the copending application, now abandoned, of William A. Robison, Jr., Serial No. 676,733, filed August 7, 1957, for Track Fullness Circuits, and assigned to the assignee of our present application. However, in order to facilitate an understanding of its use as a component of the system of our invention, it will be briefly described.

Figure 67:
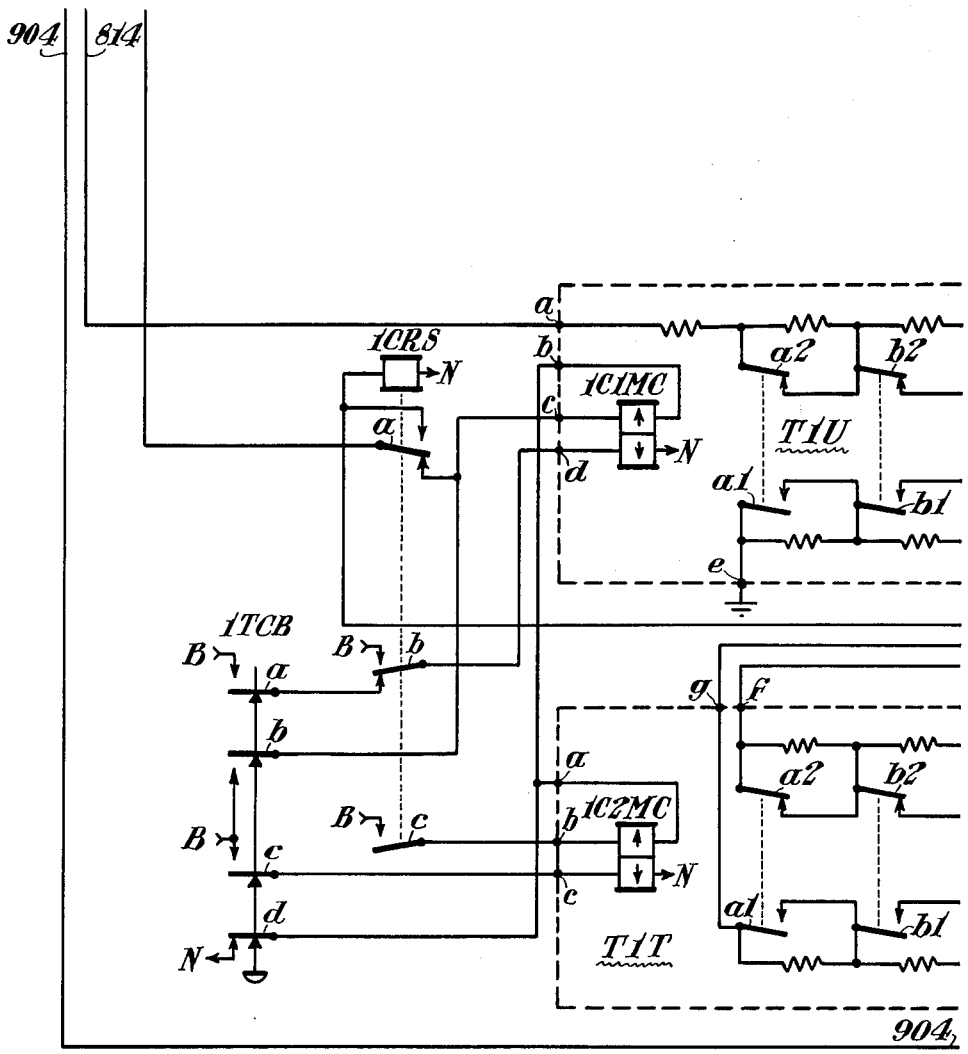
Figure 68:
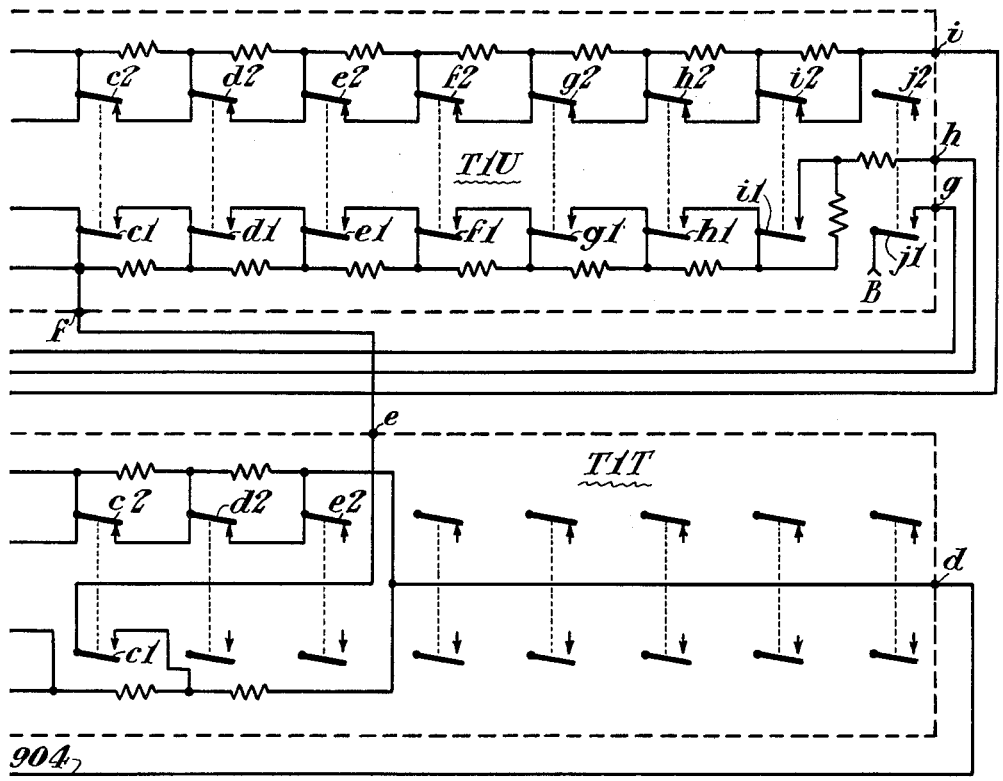

The track fullness measuring and storage apparatus comprises a car counter 1–2CC (FIGS. 56 and 57), a units counter and a tens counter T2U and T2T (FIGS. 56 and 57), respectively, for track 2, and a units and a tens counter T1U and T1T (FIGS. 67 and 68), respectively, for track 1. The apparatus further includes six control relays; an axle counter repeater relay AZTP (FIG. 56); a route repeater relay 1–2A1P (FIG. 56); a storage detector relay 1–2ADP (FIG. 56); and three counter reset relays AGRS, 2CRS (FIG. 56) and 1CRS (FIG. 67). The counters employed in this form of our invention may be of the magnetic impulse type well known in the art, modified to the extent shown in the drawings. Each of these counters may be of a type available from commercial sources, and is supplied with ten break and 10 mating make contacts. A stepping magnet such as AGMC for counter 1–2CC is provided, having a drive winding which when energized once causes one pair of make-and-break contacts to be actuated, and upon subsequent energizations causes succeeding pairs of contacts to be sequentially actuated. A lower winding is provided for the actuating magnet which when energized resets the contacts to their initial positions, that is, to the position as shown in the drawings.

The front point of each make contact of counter 1–2CC is connected to the back point of the succeeding break contact; for example, the front point of make contact $a_1$ is connected to the back point of break contact $b_2$, except that the last make contact $j_1$ is connected to the heel of its associated break contact $j_2$ as shown. Normally, these counters are provided with the heels of all of the make contacts interconnected and the heels of all of the break contacts interconnected. However, as shown, counter 1–2CC is modified by disconnecting the heel of break contact $d_2$ from the heel of break contact $e_2$ and by connecting terminal B of the battery to the heel of break contact $e_2$ and thus to the heels of the succeeding break contacts.

The drive winding of counter magnet AGMC in counter 1–2CC has an energizing circuit which extends from terminal B of the battery over the front point of contact $a$ of relay 1–2ADP, back contact $a$ of relay AZTP, through the drive winding, and over the back point of contact $a$ of reset relay AGRS to terminal N of the battery. When energized, the drive winding of magnet AGMC first closes make contact $a_1$, and prepares contacts $b_1$ and $b_2$ for actuation on the next energization of the drive winding. On the fourth energization of the drive winding of magnet AGMC, a pickup circuit for relay AGRS is completed from terminal B of the battery over back contact $e_2$ of counter 1–2CC, front contact $d_1$, and through the winding of relay AGRS to terminal N of the battery. The reset winding of magnet AGMC is then energized over an obvious circuit including the front point of contact $a$ of relay AGRS. In the normal operation of the counter, therefore, relay AGRS is picked up once for every four energizations of the drive winding of the magnet AGMC. Counter 1–2CC is then reset and the same cycle can be repeated. As shown, relay AGRS is made somewhat slow to release in order to insure sufficient time for the reset operation to take place.

Relay AGRS has a second energizing circuit which extends from terminal B of the battery over the back point of contact $a$ of relay 1–2ADP, and thence over a plurality of paths, a first including back contact $b_2$ and front contact $a_1$ of counter 1–2CC, the second including back contact $c_2$ and front contact $b_1$ and the third including back contact $d_2$ and front contact $c_1$, and thence from any of these paths through the winding of relay AGRS to terminal N of the battery. Accordingly, when relay 1–2ADP releases, relay AGRS is picked up and counter 1–2CC is reset regardless of the count stored in the counter. Obviously, the residual count in this case would be three or less, since once the count reached four the counter would be reset automatically as just described.

Relay 1–2ADP (FIG. 56) is a direct repeater of storage detector relay 1–2GRAD (FIG. 43) in the A bank of the 1–2 phantom storage location. It has a pickup circuit extending from terminal B of the battery over bus 396 (FIG. 43), front contact $f$ of relay 1–2GRAD, terminal $h$ of the A bank of the 1–2 phantom location, lead 775, and through the winding of relay 1–2ADP to terminal N of the battery. Relay 1–2ADP is accordingly picked up at any time that there is information stored in the A bank of the 1–2 phantom location.

Relay 1–2A1P (FIG. 56) is a direct repeater of route storage relay 1–2GA1 (FIG. 43) in the A bank of the 1–2 phantom location. It has a pickup circuit extending from terminal B of the battery over bus 397, front contact $b$ of relay 1–2GA1, terminal $g$ of the A bank of the 1–2 phantom location, lead 776, lead 778, and through the winding of relay 1–2A1P to terminal N of the battery. Relay 1–2A1P is accordingly picked up if switch 1–2W is to be reversed, when a cut will be routed to track 2, and will be released when a cut is to be routed to track 1 over switch 1–2W normal.

Relay AZTP is controlled by any suitable rail contactor, or other suitable axle counting device, as shown schematically in FIG. 28, where a contact 779 having a contact $a$ which is closed when the contactor is unactuated, and which is open when the contactor is actuated by the wheels of a car. For a normal car having four axles, contact $a$ will accordingly be opened four times during the passage of the car. Relay AZTP has an energizing circuit extending from terminal B of the battery over contact $a$ of contactor 779 in its closed position, lead 781, and through the winding of relay AZTP to terminal N of the battery. Relay AZTP is accordingly released four times during the passage of each car over contactor 779.

It will appear from the above description that the operation of this portion of the equipment is as follows: With a cut occupying section CL4T, relay 1–2ADP will be up, since as previously described, the information storage system will make information available for the cut in the A bank of the 1–2 phantom location at this time. Relay 1–2A1P will be up if switch 1–2W is to be reversed, and will be released if switch 1–2W is in its normal position. As the cut moves into section 1–2GR1T, while still occupying section CL4T, the contactor 779, which is just inside section GR1T, will begin to be actuated and will cause relay AZTP to release four times for each car in the cut. It is possible that the last one or two axles may not be registered, so that the actual number of times that relay AZTP will be released may be one or two counts short of four counts for each car. At each release of relay AZTP, the drive winding of magnet AGMC in counter 1–2CC will be actuated, causing sequential actuation of the counter contacts, with relay AGRS being picked up to reset the counter at the end of each four counts. If the last count is incomplete, such that relay 1–2ADP is released before one or two axles of the last car of the cut have registered, the release of relay 1–2ADP will cause relay AGRS to be picked up once again over its second previously traced circuit, and the last car will be counted properly. Relay AGRS will accordingly pick up once for each car in the cut.

Counters T2U, T2T, T1U and T1T are basically magnetic impulse counters of the type described above in connection with counter 1–2CC. Their modification for use in the system of our invention will be described below. Each of these counters is operated by a magnet having a drive winding, designated by an upwardly pointing arrow, which when actuated closes one of the make contacts and opens a corresponding break contact, once for each period of energization, and a reset winding, designated by a downwardly pointing arrow, which when actuated resets all of the contacts to their initial position as shown in the drawing.

The circuits for actuating these magnets will now be described.

The drive winding of magnet 2C1MC for units counter T2U has a first energizing circuit which extends from terminal B of the battery over front contact $b$ of slow release relay AGRS, the front point of contact $a$ of relay 1–2A1P, the back point of contact $a$ of relay 2CRS, terminal $c$ of counter T2U, through the drive winding of magnet 2C1MC, terminal $b$ of counter T2U, and over normally closed back contact $d$ of a three-position cancellation insertion push-pull button 2TCB to terminal N of the battery. With relay 1–2A1P picked up to indicate that a cut is routed to track 2, the drive winding of magnet 2C1MC will accordingly be energized each time relay AGRS is energized to indicate one car in the cut. The drive winding of magnet 2C1MC has a second energizing circuit extending from terminal B of the battery over back contact $b$ of push-pull button 2TCB, closed in its pulled-out condition, terminal $c$ of counter T2U, through the drive winding, terminal $b$ of counter T2U, and over back contact $d$ of push-pull button 2TCB, which remains closed when the push-pull button is pulled out, to terminal N of the battery. This circuit is used when it is desired to manually insert counts in the track fullness unit.

The reset winding of magnet 2C1MC has a first energizing circuit which extends from terminal B of the battery over the front point of contact $b$ of relay 2CRS, terminal $d$ of counter T2U, and through the reset winding of 2C1MC to terminal N of the battery. The reset winding is thus energized each time reset relay 2CRS is picked up. The reset winding of magnet 2C1MC has a second energizing circuit which extends from terminal B of the battery over front contact $a$ of push-pull button 2TCB, closed in its depressed condition, the back point of contact $b$ of relay 2CRS, terminal $d$ of counter T2U, and through the reset winding to terminal N of the battery. This circuit is employed when it is desired to manually cancel the information stored in the track fullness unit.

The drive winding of magnet 2C2MC has an energizing circuit which extends from terminal B of the battery over front contact $c$ of relay 2CRS, terminal $b$ of counter T2T, through the drive winding of magnet 2C2MC to terminal a of counter T2T, and thence over back contact d of push-pull button 2TCB to terminal N of the battery. The reset winding of counter 2C2MC has an energizing circuit which extends from terminal B of the battery over front contact c of push-pull button 2TCB, closed in its depressed position, terminal c of counter T2T, and through the reset winding of magnet 2C2MC to terminal N of the battery. This counter is accordingly reset only when actuated by the operator to clear the track fullness storage for track 2.

The energizing circuits for magnets 1C1MC and 1C2MC are identical with those just described for counters T2U and T2T, respectively, except that the energizing circuit for the drive winding of magnet 1C1MC includes the back point of contact a of relay 1–2A1P rather than the front point as was the case for magnet 2C1MC. These circuits will accordingly not be described in detail.

Reset relay 2CRS (FIG. 56) has a pickup circuit which extends from terminal B of the battery over the front point of make contact $j_1$ of counter T2U, terminal g of counter T2U, lead 805, and through the winding of relay 2CRS to terminal N of the battery. This relay is accordingly energized on every tenth count of counter T2U. Relay 2CRS has a stick circuit which extends from terminal B of the battery over front contact b of relay AGRS, the front point of contact a of relay 1–2A1P, the front point of its own contact a and through its winding to terminal N of the battery. It is accordingly held up during the full period of energization of relay AGRS on the tenth count to insure that enough time will be available to reset counter T2U and pulse counter T2T.

The circuits for relay 1CRS are substantially identical with those just described for relay 2CRS, except that they include make contact $j_1$ of counter T1U rather than contact $j_1$ of counter T2U, and that they include the back point of contact a of relay 1–2A1P in the stick circuit for relay 1CRS rather than the front point of contact a of relay 1–2A1P, as in the stick circuit for relay 2CRS. These circuits will accordingly not be further described.

Units counter T2U and tens counter T2T for track 2 are modified to provide an adjustable voltage divider. The heels of break contacts $a_2$, $b_2$, $c_2$, $d_2$, $e_2$, $f_2$, $g_2$, $h_2$ and $i_2$ of counter T2U are interconnected by resistors 783 through 790. The heels of make contacts $a_1$ through $i_1$ are interconnected by resistors 792 through 799 as shown in the drawing. The heel of contact $a_2$ is connected to output terminal a of counter T2U through a resistor 782. The heel of contact $i_2$ is connected to output terminal i of counter T2U through resistor 791. The heel of contact $f_1$ is connected to terminal f of counter T2U, and thence to terminal e of tens counter T2T. The heels of contacts $a_2$, $b_2$, $c_2$ and $d_2$ of counter T2T are interconnected by resistances 806, 807 and 808, as shown. The heel of contact $d_2$ is connected to output terminal d of counter T2T. Output terminal d is also connected to the front point of make contact $c_1$ of counter T2T. The heels of contacts $a_1$ and $b_1$ of counter T2T are interconnected by resistor 809, the heel of contact $b_1$ is connected to its own front point by resistor 810, and the front point of contact $b_1$ is connected to the front point of contact $c_1$ by resistor 811 as shown.

The heel of contact $a_1$ of counter T2T is connected to terminal g, which is in turn connected to terminal h of counter T2U over lead 804. Terminal h of counter T2U is connected to the front point of contact $i_1$ by resistor 801. The front point of contact $i_1$ is connected to the heel of contact $i_1$ through a resistor 800. The heel of contact $a_1$ is grounded at grounded terminal e of counter T2U. Resistances 783 through 800 are of the same magnitude, and each of resistances 806 through 811 are of a magnitude equal to ten times the magnitude of resistances 783 through 800. The heel of contact $c_1$ of counter T2T is connected through terminals e of counter T2T and f of counter T2U to the heel of contact $f_1$ of counter T2U for a purpose which will later appear.

The structure of counters T2U and T2T described thus far constitutes a potentiometer or variable voltage divider having a resistance path from terminal a of counter T2U through one or more resistors 782 through 791, lead 803 and resistors 806 through 808 to an output tap at terminal d of counter T2T, and a resistance path from terminal d to ground through one or more of resistors 809 through 811 of counter T2T and 792 through 801 of counter T2U. In operation, at each step of counter T2U, one of resistances 783 through 791 is added to the circuit above tap d of counter T2T and one of resistances 792 through 800 is removed from the path from terminal d of counter T2T to ground. At the tenth actuation of counter T2U, reset relay 2CRS is actuated over a circuit extending from terminal B of the battery over front contact $j_1$ of counter T2U, lead 805, and through the winding of relay 2CRS to terminal N of the battery. Counter T2U is thus restored to its initial condition, and the drive winding of magnet 2C2MC of counter T2T is actuated over its circuit including front contact c of relay 2CRS, the drive winding of magnet 2C2MC, terminal a of counter T2T, and over back contact d of push-pull button 2CTB to terminal N of the battery. Resistor 806 is thus added to the circuit above tap d of counter T2T, and resistor 809 is removed from the circuit between tap d of counter T2T and grounded terminal e of counter T2U. Since resistors 806 and 809 are each ten times the values of resistors 782 through 801, resetting counter T2U while shunting resistor 809 and adding resistor 806 to the voltage divider circuit above tap d of counter T2T does not change the ratio of the voltage divider. This action may continue for another ten counts, during which time counter T2U is sequentially actuated until contacts $j_1$ and $j_2$ are actuated, at which time counter T2U will be reset and counter T2T will be operated to actuate its b contacts. After the third cycle of operation, the c contacts of counter T2T will be actuated, and the voltage divider will comprise a path from terminal a of counter T2U through resistor 782, over the closed back points of contacts $a_2$ through $i_2$ of counter T2U, lead 803, through resistors 806, 807 and 808 to terminal d of counter T2T, and thence to ground over front contact $c_1$ of counter T2T, terminal e of counter T2T, terminal f of counter T2U and through resistors 796, 795, 794, 793 and 792 to ground at terminal e of counter T2U. The count will now be 30 cars. In the particular example shown, provision is made for counting 35 cars, as fully described in the application of William A. Robison, above referred to. The succeding five counts of counter T2U, as described in the above-referred to application, will insert a unit of resistance above tap d and remove a unit of resistance below tap d at each step. At the fifth step, with front contact $e_1$ closed and back contact $e_2$ open, the voltage divider will comprise a path from terminal a of counter T2U through resistors 782 through 787, over the closed contacts $f_2$ through $i_2$, lead 803, through resistors 806, 807 and 808, tap d of counter T2T, front contact $c_1$ of counter T2T, and the closed front points of contacts $e_1$, $d_1$, $c_1$, $b_1$, and $a_1$ of counter T2U to grounded terminal e of counter T2U. The counter is thus adjusted in unit increments by adding a unit of resistance above tap d of counter T2T and subtracting unit of resistance below terminal d for each car counted from 30 to 35.

A voltage is applied to terminal a of counter T2U over a circuit extending from output terminal a of tangent track summing amplifier 301 (FIG. 53), to be described, lead 812, the back point of contact k of relay 3–TC (FIG. 65) to be described, which is released when the computer is operating to derive a leaving velocity for an actual car, lead 813, the front point of contact i of relay T1 (FIG. 64) to be described, which is picked up when the cut is routed to track 2, lead 802, cable 815, lead 802 (FIG. 56), to terminal a of counter T2U, and thence through the voltage divider resistance path previously described to grounded terminal $e$ of counter T2U. An output voltage will accordingly appear at tap $d$ of counter T2T which is proportional to the product of the voltage output of summing amplifier 301 and the remaining distance of empty tangent track to the last coupled car. Since resistances are added to the voltage divider above the tap and removed below the tap at each car count, the voltage will decrease within increasing track fullness, and is therefore proportional to the remaining distance $D_{4,5}$ previously referred to. The circuits for the track 1 car fullness equipment are the same as those just described for the equipment for track 2, except that they are selected over the back contacts of the route relays. That is, terminal $a$ of counter T1U is energized from the output of summing amplifier 301 over lead 812 (FIG. 53), the back point of contact $k$ of relay 3–TC (FIG. 65), lead 813, the back point of contact $i$ of relay T1 (FIG. 64), which is released when the cut is routed to track 1, lead 814, cable 815, lead 814 (FIG. 56), to terminal $a$ of counter T1U (FIG. 67), and thence through the voltage divider to grounded terminal $e$ of counter T1U.

$V_3$ computer 22

Computer 22, shown schematically in FIGS. 5 and 13, when constructed in accordance with one embodiment of our invention comprises the apparatus shown in FIGS. 53, 54, 55, 64, 65, 66. In order to understand the general arrangement of the apparatus shown in these latter figures, reference should be made to FIG. 5, previously described, schematically showing the elements of the computer. Generally, the $b_1$ storage unit 28 and multiplier 35 in FIG. 5 correspond to contacts $a$ and $b$ of route repeater relays T1 and potentiometers 816 and 817 in FIG. 53. The $c_1$ storage unit 29 in FIG. 5 corresponds to contacts $c$ and $d$ of route repeater relay T1 and potentiometers 818 and 819. The $G_{3,4}$ storage unit 30 in FIG. 5 corresponds to contacts $e$ and $f$ of relay T1 (FIG. 64) and potentiometers 820 and 821. The $D_{3,4}$ storage unit 31 and multiplier 37 in FIG. 5 correspond to contacts $g$ and $h$ of relay T1 and potentiometers 822 and 823. Summing unit 36 in FIG. 5 corresponds to curved track summing amplifier 824 in FIG. 53. Summing unit 47 in FIG. 5 corresponds to the final summing amplifier 825 in FIG. 64. Signal generator 46 corresponds to fast and slow repeater relays FP and SP and potentiometers 826 and 827 in FIG. 66. Square root unit 48 in FIG. 5 corresponds to summing amplifier 828, diodes 829, 830 and 831, resistors 832, 833 and 834, batteries 835, 836, 837 and resistor 838 in FIG. 66. Multiplier 45 in FIG. 5 is not shown in FIGS. 53, 54, 55, 64, 65 and 66, but comprises the potential divider in the track fullness storage unit, previously described, which also forms a part of track fullness unit 25, which is shown in FIG. 6. Signal generator 39 in FIG. 5 comprises resistor 839 and potentiometer 840 in FIG. 65. Signal generator 40 in FIG. 5 corresponds to battery 841 (FIG. 54), contacts $d$, $e$ and $f$ of weight repeater relays 22–RLP and 22–RHP and potentiometers 842, 843, 844, 845, 846, 847 (FIGS. 54 and 65), manually adjustable center tapped potentiometer 848 (FIG. 65), and resistor 849 in FIG. 65. Signal generator 42 in FIG. 5 corresponds to relays WMFS, WF and WS, rectifiers 850, 851, 852 and 853, potentiometers 854, 855, 856, and 857, resistor 858 and battery 859 in FIG. 55. Signal generator 43 in FIG. 5 corresponds to contacts $g$, $h$ and $i$ of each of relays 22–RLP and 22–RHP, and potentiometers 860, 861 and 862 in FIG. 65. Summing unit 38 in FIG. 5 corresponds to tangent track summing amplifier 301 in FIG. 53.

The general arrangement of the apparatus corresponding to the functional diagram of FIG. 5 having been described, the details of this apparatus will now be described.

Relays 2–TC (FIG. 53) and 3–TC (FIG. 54) are test compute relays which are picked up when it is desired to introduce a sample problem into the computer to check its operation while no actual problem is being solved. These relays are energized over a parallel circuit which extends from terminal B of the battery over back contact $f$ of relay CL4TP (FIG. 28), lead 719, lead 721 (FIG. 53), and thence (FIG. 53) in a first path over lead 863 and through the winding of relay 2–TC to terminal N of the battery, and in a second path over lead 864 and through the winding of relay 3–TC (FIG. 54) to terminal N of the battery. Relays 2–TC and 3–TC are accordingly energized when computing track section CL4T is unoccupied and denergized when computing track section CL4T is occupied.

The control circuits for weight repeater relays 22–RLP and 22–RHP have been previously described. Briefly, these relays are picked up when a cut occupies section CL4T and information pertaining to the cut is stored in the A bank of the 1–2 phantom location associated with group retarder 1–2GR.

Relay RTA (FIG. 55) has a multiple pick-up circuit extending from terminal B of the battery to lead 865 over a first path including the back point of contact $c$ of relay CLA (FIG. 28) and back contact $c$ of relay CLC, and over a second path including the front point of contact $c$ of relay CLA and back contact $b$ of relay CLB. It will be apparent from the description of the cut length measuring equipment that this circuit is closed only when none of the measurable cut lengths are present and thus it will be closed only when the cut length is greater than 116 feet. The circuit just described is completed from lead 865 through the winding of relay RTA to terminal N of the battery. Since, as just described, the circuit for relay RTA will be closed only under conditions which would preclude accurate automatic selection of the leaving speed, the energized condition of relay RTA is employed to supply an average valve to the computer under these conditions.

Relays WMFS, WF and WS (FIG. 55) operate in conjunction with a five-position lever 866 to select the proper weather correction factor for the computer.

Lever 866 has a normal position N in which no weather correction is made. It has two positions F and FM in which a positive correction is applied for hot weather or other conditions tending to make the cars roll faster than normal, position FM giving less correction than position F, as will appear. The lever also has two positions SM and S which are employed during cold weather or other conditions tending to make the cars roll more slowly at the hump than at the body tracks, to supply a negative correction voltage, less correction being applied in position SM than in position S.

Relay WS has a first pickup circuit which extends from terminal B of the battery over the contacts of lever 866 in its S position, and thence through the winding of the relay to terminal N of the battery. A second energizing circuit for relay WS extends over the contacts of the lever in its SM position, through rectifier 853 in the forward direction, and through the winding of the relay to terminal N of the battery. Relay WS is accordingly picked up when the lever is in either its S or its SM position.

Relay WF has a first pickup circuit extending from terminal B of the battery over the contacts of lever 866 in its F position, and through the winding of the relay to terminal N of the battery. A second pickup circuit for relay WF extends over the contacts of the lever in its FM position, through rectifier 850 in the forward direction, and through the winding of the relay to terminal N of the battery. Relay WF is accordingly picked up when the lever is either in its F or its FM position.

Relay WMFS has a first pickup circuit which extends from terminal B of the battery over the contacts of lever 866 in its SM position, and through rectifier 852 and the winding of the relay to terminal N of the battery. A second energizing circuit for relay WMFS extends over the contacts of the lever in its FM position, through rectifier 851 in the forward direction, and through the winding of the relay to terminal N of the battery. Relay WMFS is accordingly picked up when the lever is in its medium correction positions, SM and FM.

Relays FP and SP (FIG. 66) have obvious energizing circuits extending from terminals F and S, respectively, of the FNS lever shown schematically in FIG. 66. Relay FP is accordingly picked up when the lever is in its F position, and relay SP is picked up when the lever is in its S position.

Relay T1 (FIG. 53) has a pickup circuit extending from terminal B of the battery over bus 397 (FIG. 43), front contact b of relay 1–2GA1 in the A bank of the 1–2 phantom location, terminal g of the A bank, lead 776, lead 777 (FIG. 54) and through the winding of relay T1 (FIG. 53) to terminal N of the battery. This relay is accordingly picked up when information pertaining to a cut routed to track 2 is stored in the A bank of the 1–2 phantom location.

Relay TCCR (FIG. 53) is energized directly from voltage detector unit 480 in a manner which will be later described in detail under the description of the operation of the computer in its test compute position.

The structure of the remaining elements of the computer will be considered together with the discussion of its operation, since the structure employed is more readily understandable in the light of the functions performed thereby.

The curve track rolling resistance $R_{1,2}$, which is supplied from the computer shown in FIGS. 50, 51, 52, 62 and 63 (computer 21 in FIG. 12) over lead 772 from the heel of contact a of test compute relay 1–TC (FIG. 50) as previously described, will be the computed value for a particular cut under normal operating conditions, an average value depending on the weight if the leaving velocity from the master retarder was incorrect or if the cut is over 116 feet, or an average value for test compute purposes when the computer is operating on its test compute cycle. It will be assumed for the present that relay 2–TC (FIG. 64) is released, indicating that the computer is not in its test compute cycle and that an actual problem is being solved. A computed value of $R_{1,2}$ will accordingly be applied from lead 772 (FIG. 50) over the back point of contact a of relay 2–TC (FIG. 53) to the heel of contact a of relay T1. For a cut routed to track 1, this voltage will be applied over the back point of contact a of relay T1 and through the resistive winding of potentiometer 817 to ground. The wiper of potentiometer 817 is manually positioned in the initial calibration of the yard to a value such that the voltage appearing between the wiper and ground is proportional to $R_{1,2}bi$. On the other hand, if track 2 is selected, as indicated by the energized condition of relay T1, the value of $R_{1,2}$ would be applied across the resistive winding of potentiometer 816, which is adjusted in accordance with the value of the constant $b_1$ for track 2. The output appearing at the wiper of potentiometer 817 or 816 is applied over either the back point or the front point, respectively, of contact b of relay T1, over the back point of contact b of relay 2–TC, and through resistor 867 to input terminal a of summing amplifier 824. This input is thus proportional to $R_{1,2}bi$.

The correction voltage proportional to $c_1$ is applied from the positive terminal of a suitable source of voltage such as battery 868 (FIG. 53) over the back point of contact c of relay 2–TC, and through resistor 869 to the heel of contact d of relay T1. If relay T1 is released, the battery voltage will be applied over the back point of contact d across the resistive winding of potentiometer 819. If relay T1 is energized, indicating that the cut is routed to track 2, the voltage will be applied across the resistive winding of potentiometer 818. The wipers of potentiometers 818 and 819 are adjusted to values in accordance with the constant $c_1$ for track 2 and track 1, respectively, such that the output voltage between these wipers and ground is proportional to the value of the constant $c_1$ for the track which is selected. The signal appearing on the selected wiper of potentiometers 818 and 819 is connected over either the front or back point, respectively, of contact c of relay T1, according as track 2 or track 1 is selected, and is thence applied over the back point of contact d of relay 2–TC and through summing resistor 870 to input terminal a of summing amplifier 824.

A voltage proportional to $G_{3,4}$ is developed by battery 871 (FIG. 64) and potentiometers 820 and 821. Battery 871 has its positive terminal grounded as shown, and its negative terminal connected over the back point of contact f of relay 2–TC and through resistor 872 to the heel of contact f of relay T1. If relay T1 is released, this voltage is applied across the resistive winding of potentiometer 821 to ground. If relay T1 is energized, the voltage from battery 871 is applied across the resistive winding of potentiometer 820. The wipers of potentiometers 821 and 820 are set to values corresponding to the grades of tracks 1 and 2, respectively. The $G_{3,4}$ signal appearing on the selected wiper of potentiometers 820 and 821 is applied over either the front or the back point of contact e of relay T1, according as this relay is energized or deenergized, and over the back point of contact g of relay 2–TC, lead 970, and through summing resistor 873 to terminal a of summing amplifier 824.

Summing amplifier 824 is a conventional element, knowledge of which is so thoroughly disseminated in the art as to require no detailed description. As shown, it may be provided with a feedback resistor 874 to make the overall gain approximately unity. The output voltage appearing between terminal c and grounded terminal d of amplifier 824 will obviously be proportional to the term $(G_{3,4}-R_{3,4})$ in Equation 21. It is now necessary to multiply this voltage by a voltage proportional to $D_{3,4}$.

Figure 64:
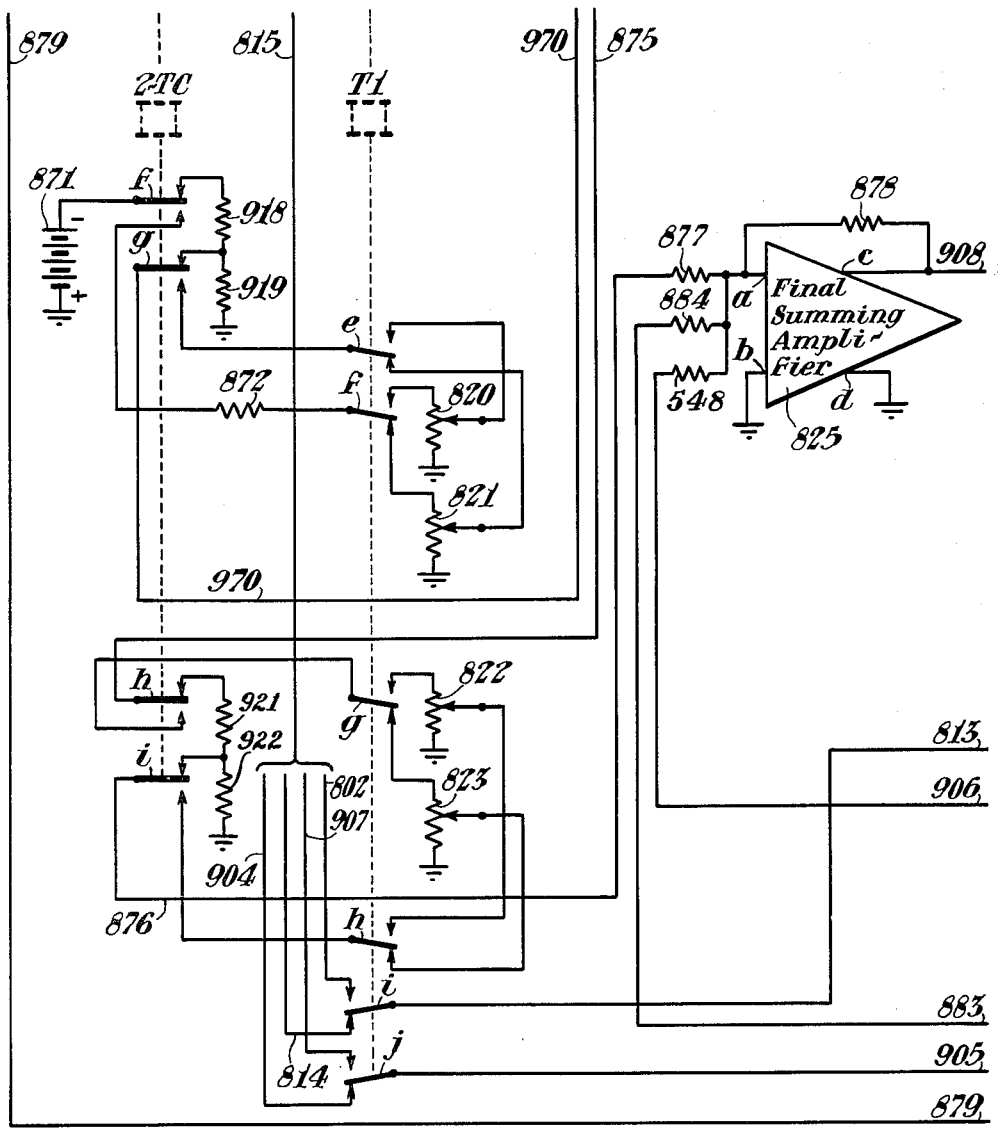
Figure 65:
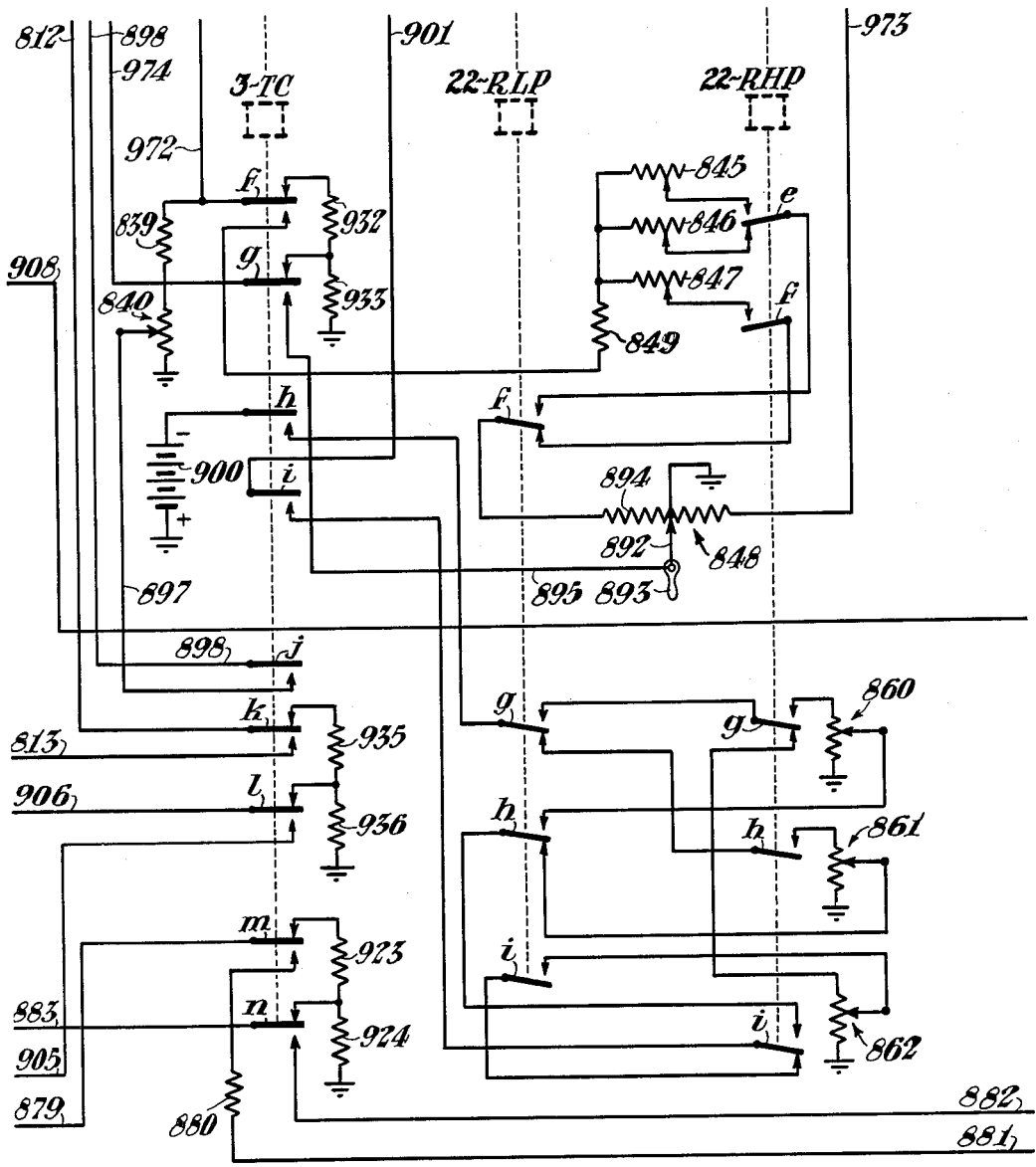

The output voltage at terminal c of amplifier 824 is applied over lead 875, and the back point of contact h of relay 2–TC to the heel of contact g of relay T1 (FIG. 64). If relay T1 is energized, indicating that track 2 is selected, the signal is applied across the resistive winding of potentiometer 822. If relay T1 is deenergized, the signal is applied across the resistive winding of potentiometer 823, associated with track 1. The wipers of potentiometers 823 and 822 are adjusted in accordance with the values of the distances $D_{3,4}$ for tracks 1 and 2, respectively, such that the voltage appearing between the selected wiper and ground will be proportional to the third term under the radical in Equation 21. The voltage appearing on the selected wiper of potentiometers 822 and 823 is applied over the front or back point of contact h of relay T1, according as relay T1 is energized or deenergized, over the back point of contact i of relay 2–TC, and over lead 876 and through summing resistor 877 to input terminal a of summing amplifier 825.

A voltage proportional to $V_5^2$ is supplied by battery 868 (FIG. 53), relays SP and FP (FIG. 66) and potentiometers 826 and 827. This voltage is developed from ground to the negative terminal of battery 868, from the positive terminal of battery 868 over lead 879, the back point of contact m of relay 3–TC (FIG. 65), through resistor 880, and over lead 881 to the heel of contact a of relay SP. With the FNS lever in its normal position, this voltage will then be applied over the back point of contact a of relay SP, back contact a of relay FP, and through the resistive winding of potentiometer 827 to ground. A voltage corresponding to 4 miles per hour for normal conditions is then developed between the wiper of potentiometer 827 and ground, this wiper being adjusted such that the voltage actually is in accordance with the square of coupling speed, $V_5^2$. This voltage is applied, under the conditions just noted, over the back point of contact b of relay FP, the back point of contact b of relay SP, lead 882, the back point of contact $n$ of relay 3-TC (FIG. 65), lead 883, and through summing resistor 884 to input terminal $a$ of summing amplifier 825 (FIG. 64). With lever FNS in its S position, relay SP (FIG. 66) will be picked up and the voltage from battery 868 applied to the heel of contact $a$ of relay SP will be applied over the front point of contact $a$ through the resistive winding of potentiometer 826 to ground. The wiper of potentiometer 826 is adjusted to apply a larger portion of positive voltage between its wiper and ground than potentiometer 827, corresponding to a higher coupling speed such as 6 miles per hour, for example, where it is desired to permit the cars to roll faster due to poorer rolling conditions, such as might be encountered in cold weather. This voltage on the wiper of potentiometer 826 will be applied over the front point of contact $b$ of relay SP, lead 882, the back point of contact $n$ of relay 3-TC, lead 883 and through resistor 884 to input terminal $a$ of summing amplifier 825. With the FNS lever in its F position, the apparatus will be set for a low coupling speed, for example, from 0 to 2 miles per hour, by grounding summing resistor 884 (FIG. 64) over lead 883, back contact $n$ of relay 3-TC (FIG. 65), lead 882, the back point of contact $b$ of relay SP, and over the front point of contact $b$ of relay FP to ground as shown in the drawing.

The manner in which a rolling resistance signal $100-R_{a, b}$ is applied from the selected one of storage panels 1RP through 6RP in FIGS. 46, 47, 58 and 59 over the contacts of TAC repeater relays 1-2 ART1, 1-2ART2 and 1-2ART3 to lead 268 in FIG. 44 has been previously described. As previously described, this signal is applied from lead 268 over the back point of contact $a$ of relay RTA (FIG. 55), lead 298, the back point of contact $b$ of relay 3-TC (FIG. 54), lead 299 and through summing resistor 300 (FIG. 53) to input terminal $a$ of summing amplifier 301.

The weather correction is supplied from either battery 885 (FIG. 54) or battery 859 (FIG. 55) through one of potentiometers 854, 855, 856, and 857 (FIG. 55) in accordance with the condition of energization of relays WMFS, WF and WS, which are set in accordance with the position of lever 866 as previously described. With lever 866 in its normal position, no weather correction is applied. With lever 866 in its SM position, relays WS and WMFS are picked up over their previously described circuits. A circuit is now provided from ground through battery 885 (FIG. 54), and from the negative terminal of battery 885 over the back point of contact $d$ of relay 3-TC, through resistor 890, over lead 886 to the front point of contact $a$ of relay WMFS, front contact $a$ of relay WS, and through the resistive element of potentiometer 854 to ground. The wiper of potentiometer 854 is adjusted to provide a first negative voltage to ground which effects a moderate correction in the direction of increased permitted rolling speed for the cut. This voltage is applied from the wiper of potentiometer 854 over the front point of contact $b$ of relay WMFS, front contact $c$ of relay WS, lead 887, lead 888, the back point of contact $e$ of relay 3-TC (FIG. 54), lead 971, and through summing resistor 889 to input terminal $a$ of summing amplifier 301.

With lever 866 in its S position, only relay WS is picked up. Under these conditions, the circuit extends from ground through battery 885, over the back point of contact $d$ of relay 3-TC through resistor 890, over lead 886, over back contact $a$ of relay WMFS, front contact $b$ of relay WS, and through the resistive winding of potentiometer 855 to ground. The wiper of potentiometer 855 is adjusted to provide a higher negative correction for extreme weather conditions. This voltage is applied from the wiper of potentiometer 855 over the back point of contact $b$ of relay WMFS, front contact $c$ of relay WS, leads 887 and 888, back point of contact $e$ of relay 3-TC, lead 971, and through summing resistor 889 to input terminal $a$ of amplifier 301.

With lever 866 in its FM position, both relays WF and WMFS will pick up over their previously described circuits. Under these conditions, a circuit extends from ground through battery 859 (FIG. 55), and from the positive terminal of battery 859 through resistor 858, over the front point of contact $c$ of relay WMFS, front contact $a$ of relay WF, and through the resistive element of potentiometer 856 to ground. The wiper of potentiometer 856 is adjusted to provide a first positive voltage sufficient to give a moderate correction to the rolling resistance for enforcing a lower speed of the cuts to compensate for lower terminal rolling resistance. This voltage is applied from the wiper of potentiometer 856 over the front point of contact $d$ of relay WMFS, front contact $c$ of relay WF, lead 891, lead 888, over the back point of contact $e$ of relay 3-TC, lead 971, and through summing resistor 889 to input terminal $a$ of amplifier 301.

With lever 866 in its F position, only relay WF is picked up. Under these conditions, the circuit extends from ground to the negative terminal of battery 859, through battery 859, from the positive terminal of battery 859 through resistor 858, over the back point of contact $c$ of relay WMFS, front contact $b$ of relay WF, and through the resistive element of potentiometer 857 to ground. The wiper of potentiometer 857 is adjusted to provide a large positive correcting voltage for extreme weather conditions. This voltage is applied from the wiper of potentiometer 857 over the back point of contact $d$ of relay WMFS, front contact $c$ of relay WF, leads 891 and 888, the back point of contact $e$ of relay 3-TC, lead 971, and through summing resistor 889 to terminal $a$ of amplifier 301.

Provision is made for applying a positive or negative correction for the effects of wind in accordance with the weight of the cut under control. For this purpose, referring now to FIGS. 54 and 65, batteries 885 and 841 are used in conjunction with potentiometers 842 to 848 and relays 22-RLP and 22-RHP.

Potentiometer 848 has a wiper 892 adjusted manually by means 893 over a center tapped resistive element 894. The center tap of resistive element 894 is grounded as shown. A negative voltage is applied to the left end of winding 894. For medium weight cars, this circuit extends from ground at the positive terminal of battery 885 (FIG. 54), through the battery and from the negative terminal of battery 885 over lead 972, the back point of contact $f$ of relay 3-TC, through resistor 849, through the portion of variable resistor 845 selected by its wiper for medium cars, over the front point of contact $e$ of relay 22-RHP, the front point of contact $f$ of relay 22-RLP, and through the left portion of resistor 894 to ground at the center tap. For heavy cars, this circuit extends from ground through battery 885, lead 972, over back point of contact $f$ of relay 3-TC, through resistor 849, through the portion of variable resistor 847 which is selected by the adjustment of its wiper for heavy cars, over front contact $f$ of 22-RHP, the back point of contact $f$ of relay 22-RLP, and through the left portion of resistor 894 to ground at the center tap. For light cars, the circuit extends through battery 885, lead 972, over the back point of contact $f$ of relay 3-TC, through resistor 849, through the portion of variable resistor 846 selected by the adjustment of its wiper for light cars, over the back point of contact $e$ of relay 22-RHP, the front point of contact $f$ of relay 22-RLP, and through the left portion of resistor 894 to ground at the center tap.

It will thus appear that a counter-clockwise rotation of wiper 892 from the center tap through a given angle will provide a negative voltage between the wiper and ground of an amount depending on the weight of the car. For light cars, the wind has a greater effect than for heavy cars. Accordingly, variable resistor 846 is adjusted to a lower value than variable resistor 845, which is in turn adjusted to a lower value than variable resistor 847, to give progressively decreasing voltage for heavier cars.

145

A positive voltage is applied to the right half of resistive element 894. For medium cars, this circuit extends from ground through battery 841 (FIG. 54) from its negative to its positive terminal, from the positive terminal of battery 841 through the portion of variable resistor 842, selected by the setting of its wiper for medium cars, over the front point of contact d of relay 22–RLP and the front point of contact d of relay 22–RHP, lead 973, and through the right half of resistance element 894 to ground at the center tap. For light weight cars, the circuit extends from the positive terminal of battery 841 through the portion of variable resistor 844 selected by its wiper, and over front contact e of relay 22–RLP, the back point of contact d of relay 22–RHP, lead 973, and through the right half of resistance element 894 to ground at the center tap. For heavy cars, the circuit extends from the positive terminal of battery 841 through the portion of variable resistor 843 selected by the adjusted position of its wiper, over the back point of contact d of relay 22–RLP and the front point of contact d of relay 22–RHP, lead 973, and through the right half of resistance element 894 to ground at the center tap.

A clockwise rotation of wiper 892 from the center tap will accordingly select a positive voltage of an amount depending on the weight of the cut. Again, variable resistors 842 to 844 are so adjusted in the initial calibration of the yard as to provide decreasing voltages across the right half of resistance element 894 for increasing car weights.

The voltage developed between wiper 892 and ground is supplied over lead 895, the back point of contact g of relay 3–TC, lead 974, and through summing resistor 896 (FIG. 53) to input terminal a of amplifier 301. It will thus appear that there is provided either a positive or negative voltage correction for wind depending on whether manual means 893 is adjusted to move wiper 892 to the right or to the left of the center tap, in accordance with the direction of the wind, and of a magnitude which is chosen in accordance with the extent of movement of the wiper and weight of the cut.

As previously mentioned, the rolling resistance signal from panels 1RP through 6RP is biased by a value of 100 volts for convenience in storage and transfer. In order to remove this bias voltage, an equal and opposite bias voltage is introduced with the $G_{4, 5}$ signal. For this purpose, battery 885 (FIG. 54), which has its positive terminal grounded as shown, has its negative terminal connected through lead 972, resistor 839 (FIG. 65), and through the resistive element of potentiometer 840 to ground. The wiper of potentiometer 840 is initially adjusted to develop a voltage to ground which is proportional to $G_{4, 5}-100$ for the particular yard. In some cases it may be necessary to have varying grades in the body tracks, and in such a case it would be necessary to store various values of $G_{4, 5}$ which would be selected over contacts of the route relays. However, according to a preferred embodiment of our invention, the grades of all of the body tracks are made equal. Accordingly, only a single value of this function is shown provided in the illustrated embodiment. This value is applied from the wiper of potentiometer 840 over lead 897 to back contact j of relay 3–TC, lead 898, and through summing resistor 899 to input terminal a of amplifier 301.

The value of $(G_{a, b}-G_{4, 5})K_w$ is supplied from one of potentiometers 860, 861 and 862 (FIG. 65) over contacts of weight repeater relays 22–RLP and 22–RHP. For light weight cuts, a circuit extends from ground through battery 900, and from the negative terminal of the battery 900 over back contact h of relay 3–TC, the front point of contact g of relay 22–RLP, the back point of contact g of relay 22–RHP, and through the resistive element of potentiometer 862 to ground. The wiper of potentiometer 862 is adjusted to develop a voltage to ground which is proportional to $(G_{a, b}-G_{4, 5})K_w$ for light weight cars. This value is applied over front contact i of relay 22–RLP, the back point of contact i of relay 22–RHP, back contact i of relay 3–TC, lead 901, and through summing resistor 902 to input terminal a of amplifier 301.

146

For medium weight cars, a circuit extends from the negative terminal of battery 900 over back contact h of relay 3–TC, the front point of contact g of relay 22–RLP, and front point of contact g of relay 22–RHP and through the resistive element of potentiometer 860 to ground. The wiper of potentiometer 860 is adjusted to develop a voltage to ground which is proportional to $(G_{a, b}-G_{4, 5})K_w$ for medium weight cars, that is, for cars of approximately 50 tons weight. This value is applied over the front point of contact h of relay 22–RLP, the front point of contact i of relay 22–RHP, back contact i of relay 3–TC, lead 901, and through summing resistor 902 to input terminal a of amplifier 301.

For heavy cars, the circuit extends from the negative terminal of battery 900 over back contact h of relay 3–TC, the back point of contact g of relay 22–RLP, front contact h of relay 22–RHP, and through the resistive element of potentiometer 861 to ground. The wiper of potentiometer 861 is adjusted to a value of $(G_{a, b}-G_{4, 5})K_w$ suitable for heavy cars of approximately 100 tons weight. This value is applied over the back point of contact h of relay 22–RLP, the front point of contact i of relay 22–RHP, back contact i of relay 3–TC, lead 901, and through summing resistor 902 to input terminal a of amplifier 301.

Amplifier 301 (FIG. 53) is a conventional summing amplifier, which need not be described in detail since suitable amplifiers for this purpose are well known in the art. If so desired, it may be supplied with a feedback resistor 903 to reduce the overall gain to approximately unity.

The output of summing amplifier 301, as will be apparent from the nature of the inputs just described and from the initial discussion in connection with FIGS. 4 through 6, will be proportional to $G_{4, 5}-R_{4, 5}$. This value is multiplied by $D_{4, 5}$, as will now be described.

The output appearing between ground and terminal c of amplifier 301 is applied over lead 812, the back point of contact k of relay 3–TC, and lead 813, to the heel of contact i of relay T1 (FIG. 64). If relay T1 is released, indicating that the cut is routed to track 1, the circuit is completed over the back point of contact i of relay T1, lead 814, cable 815, lead 814 (FIG. 56), terminal a of track fullness units counter T1U (FIG. 67), through the previously described resistance path in counters T1U and T1T which is set up in accordance with the fullness of track 1, to ground at grounded terminal e of counter T1U. As previously described, the voltage at tap d of counter T1T (FIG. 68) will be a fraction of the applied voltage which depends on the remaining distance from the tangency to the point of coupling of track 1. The voltage at tap d is thus proportional to $D_{4, 5}(G_{4, 5}-R_{4, 5})$. This voltage is applied over lead 904, cable 815, lead 904 (FIG. 64), the back point of contact j of relay T1, lead 905, the back point of contact l of relay 3–TC, lead 906, and through summing resistor 548 to input terminal a of summing amplifier 825.

If relay T1 is picked up, indicating that the cut is routed to track 2, the circuit from output terminal c of amplifier 301 (FIG. 53) extends over lead 812, the back point of contact k of relay 3–TC, lead 813, the front point of contact i of relay T1, lead 802, cable 815, lead 802 (FIG. 56), terminal a of units counter T2U for track 2, and hence through the previously described resistance path set up by the fullness of track 2 through counters T2U and T2T to ground at grounded terminal e of counter T2U. The voltage at terminal d of counter T2T (FIG. 57) will now be proportional to $D_{4, 5}(G_{4, 5}-R_{4, 5})$ for track 2. This voltage is applied over lead 907, cable 815, lead 907 (FIG. 64), the front point of contact j of relay T1, lead 905, the back point of contact *l* of relay 3–TC, lead 906, and through summing resistor 548 to input terminal *a* of summing amplifier 825.

As will appear from the preceding description, the output appearing between output terminal *c* of summing amplifier 825 and ground will be proportional to the square of the desired leaving speed, or $V_3^2$. This voltage is applied over lead 908 through resistor 909 (FIG. 66) to a suitable square root taking device here shown as a summing amplifier 828 having a non-linear feedback path.

Amplifier 828 has a first non-linear feedback path comprising a resistor 834 in series with a diode 831 and a battery 837, a second non-linear feedback path comprising a resistor 833 in series with a diode 830 and a battery 836, and a third non-linear feedback path including a resistor 832 in series with a diode 829 and a battery 835. Each of diodes 829, 830 and 831 are initially biased against conduction by batteries 835, 836 and 837, respectively. As the input potential increases, the biasing potentials will be successively overcome, and additional degenerative feedback is supplied. The biased values for the diodes are so selected that the output curve for the amplifier is a stepwise approximation to the square root of the input. Such devices are known in the art, and the circuit will accordingly not be described in detail. Moreover, this circuit is not essential in the practice of invention, since any other suitable square root computer could be employed.

The output of square root amplifier 828 will be proportional to $V_3$, the desired leaving velocity from the group retarder. This output voltage, appearing between terminal *c* of amplifier 828 and grounded terminal *d*, is applied over lead 910, the back point of contact *c* of relay 3–TC (FIG. 54), lead 911, front contact *e* of relay CL4TP (FIG. 28), and lead 912 to input terminal *a* of electron storage unit 1–2GR1–ESU (FIG. 45), to be described, where it is stored for use in controlling the first section of the group retarder 1–2GR.

The operation of the computer during its test cycle, and the additional structure necessary to carry out the test function, will now be described. As previously described, when track section CL4T (FIGS. 27 and 28) is unoccupied, relays 1–TC, 2–TC and 3–TC (FIGS. 50, 53 and 54, respectively) are picked up. As also described, under these conditions an average value of $R_{1, 2}$ is supplied by computer 21 through the potential divider comprising resistors 773 and 774 (FIG. 50), which is supplied from battery 749. The voltage developed across resistor 774 of this voltage divider is applied over the front point of contact *a* of relay 1–TC, lead 772, the front point of contact *a* of relay 2–TC (FIG. 53), through resistor 913, over a first path through resistor 914 to ground, and over a second path over the front point of contact *b* of relay 2–TC, lead 915, and through summing resistor 867 to input terminal *a* of amplifier 824. The voltage now applied across summing resistor 867 is proportional to a typical value of $R_{1, 2} bi$.

A typical voltage representing a value of $c_i$ is supplied from battery 868. A circuit for this purpose extends from ground through battery 868, from the positive terminal of battery 868 over the front point of contact *c* of relay 2–TC, through resistor 916, and thence over a first path through resistor 917 to ground, and over a second path over the front point of contact *d* of relay 2–TC, lead 918, and through summing resistor 870 to input terminal *a* of amplifier 824.

A voltage proportional to a typical value of $G_{3, 4}$ is supplied from battery 871 (FIG. 64). The circuit extends from ground through battery 871, from a negative terminal of battery 871 over the front point of contact *f* of relay 2–TC and through resistor 918, and thence over a first path through resistor 919 to ground, and over a second path over the front point of contact *g* of relay 2–TC, lead 970 and through summing resistor 873 to terminal *a* of amplifier 824.

The output between terminal *c* of amplifier 824 and ground is multiplied by a typical value of $D_{3, 4}$. From output terminal *c* of amplifier 824, a circuit extends over lead 875, the front point of contact *h* of relay 2–TC, through resistor 921, and thence over first path through resistor 922 to ground, and over a second path over the front point of contact *i* of relay 2–TC, lead 876, and through summing resistor 877 to input terminal *a* of amplifier 825.

A voltage proportional to a typical value of $V_5^2$ is supplied from battery 868. A circuit extends from ground at the negative terminal of battery 868, from the positive terminal of battery 868 over lead 879, over the front point of contact *m* of relay 3–TC (FIG. 65) and through resistor 923, and thence over a first path through resistor 924 to ground, and over a second path over the front point of contact *n* of relay 3–TC, lead 883, and through summing resistor 884 to input terminal *a* of summing amplifier 825.

Before tracing the third input of amplifier 825, the synthetic inputs to tangent track summing amplifier 301 (FIG. 53) will be described.

No $(G_{a, b} - G_{4, 5}) K_w$ term is introduced in testing the computer. Accordingly, the circuits that supply summing resistor 902 of amplifier 301 over lead 901 are interrupted during the test cycle at the open back point of contact *i* of relay 3–TC.

Figure 54:
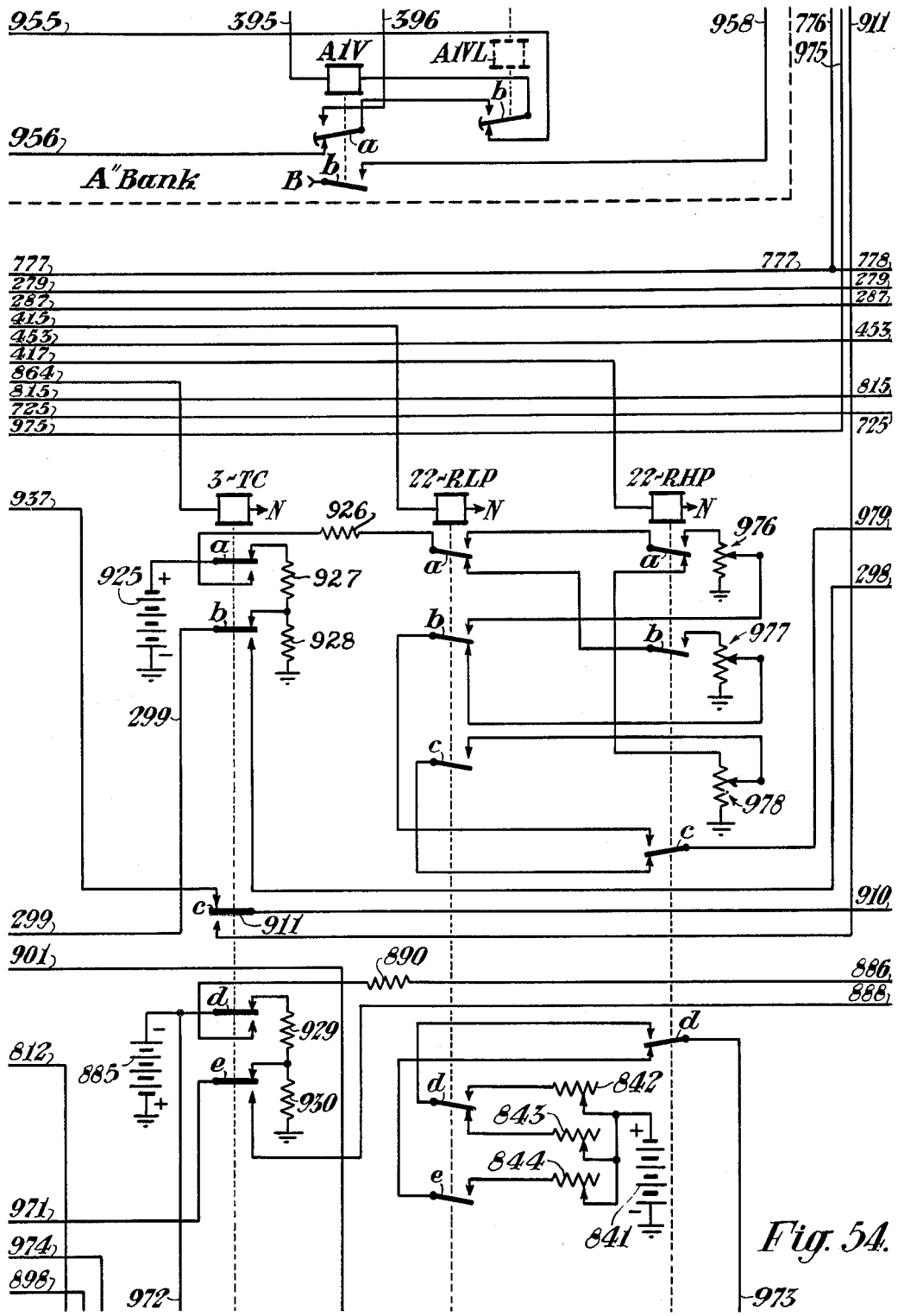
Figure 55:
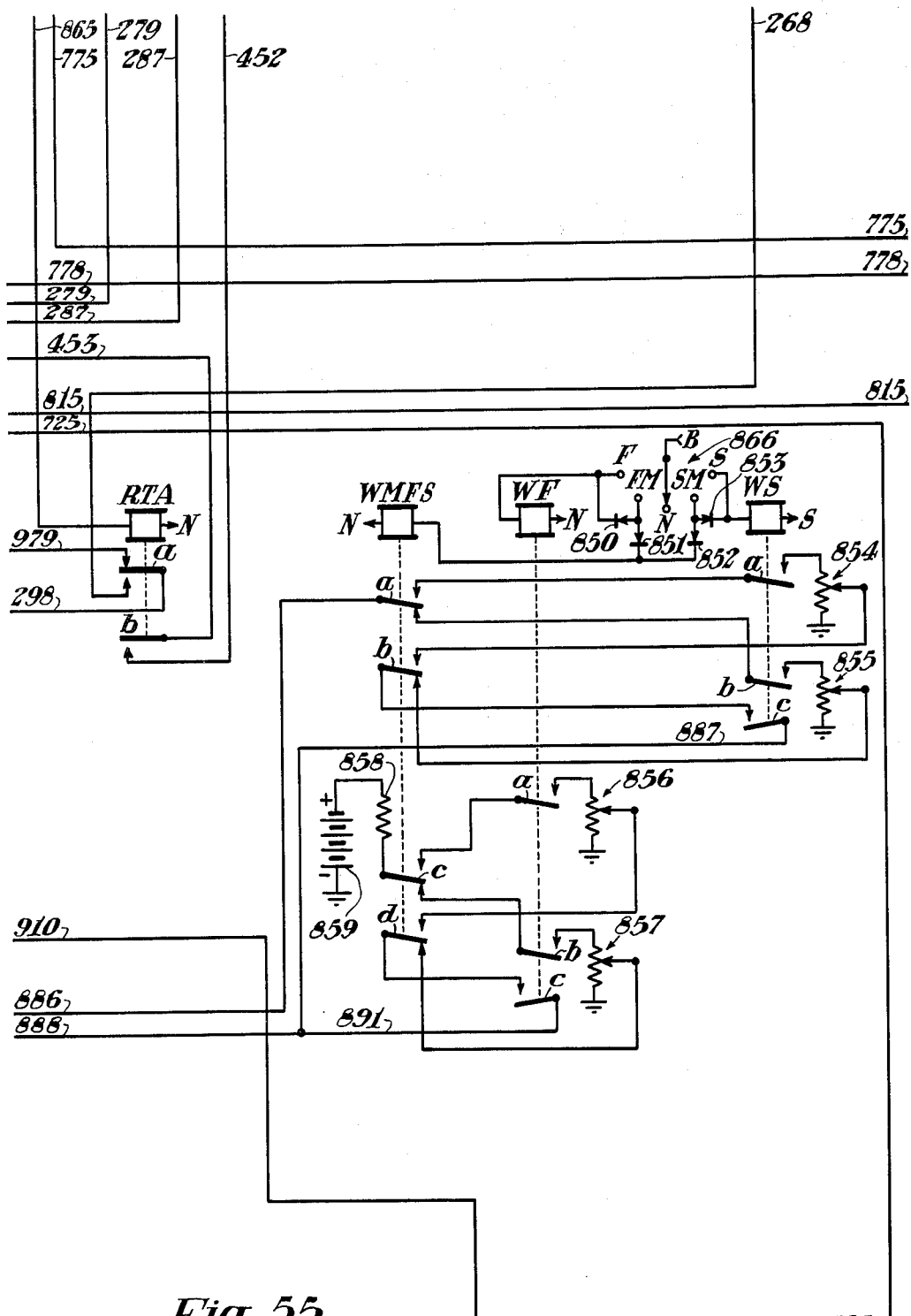

A synthetic voltage proportional to $100 - R_{a, b}$ is supplied from battery 925 (FIG. 54). Since this value and the value of $G_{4, 5} - 100$ are both constants for test purposes, this value may be further modified to be proportional to the combined value $G_{4, 5} - R_{4, 5}$. The circuit for this purpose extends from the negative terminal of battery 925 through the battery, from the positive terminal of the battery over the front point of contact *a* of relay 3–TC, through resistor 927, and thence over a first path through resistor 928 to ground, and over a second path over the front point of contact *b* of relay 3–TC, lead 299, and through summing resistor 300 to input terminal *a* of amplifier 301. Resistors 927 and 928 are so selected as to provide a voltage across resistor 928 from battery 925 which is a typical value for the rolling resistance signal.

The $G_{4, 5}$ signal is obtained for test purposes as just described, and accordingly, the circuit for supplying resistor 899 of amplifier 301 over lead 898 is interrupted at the open back point of contact *j* of relay 3–TC during the test cycle.

A typical value for the weather correction is introduced from battery 885 (FIG. 54). A circuit for this purpose extends from ground through battery 885, from the negative terminal of battery 885 over the front point of contact *d* of relay 3–TC, through resistor 929, and thence over a first path through resistor 930 to ground, and over a second path over the front point of contact *e* of relay 3–TC, lead 971, and through summing resistor 889 to input terminal *a* of amplifier 301.

A typical wind correction value is also introduced from battery 885. The circuit for this purpose extends from ground through battery 885, and from the negative terminal of the battery 885 over lead 972, the front point of contact *f* of relay 3–TC, and through resistor 932 (FIG. 65), and thence over a first path through resistor 933 to ground, and over a second path over the front point of contact *g* of relay 3–TC, lead 974, and through summing resistor 896 to terminal *a* of amplifier 301.

The output of amplifier 301 is now proportional to a typical value of $G_{4, 5}$. This value is multiplied by a typical value of $D_{4, 5}$. A circuit for this purpose extends from output terminal *c* of amplifier 301 over lead 812, the front point of contact *k* of relay 3–TC, through resistor 935, and thence over a first path through resistor 936 to ground, and over a second path over the front point of contact *l* of relay 3–TC, lead 906, and through summing resistor 907 to input terminal *a* of amplifier 825.

The output between terminal $c$ of amplifier 825 and ground is now proportional to a value of $V_3^2$. This value is applied over lead 908 and through resistor 909 to input terminal $a$ of square root summing amplifier 828 (FIG. 66).

The voltage appearing between output terminal $c$ of amplifier 828 and ground will now be proportional to a typical value of $V_3$. This voltage is applied over lead 910, the front point of contact $c$ of relay 3–TC (FIG. 54), lead 937, and through summing resistor 938 to input terminal $a$ of voltage detector 480 (FIG. 53). This voltage detector may be exactly the same as voltage detector 66, described in detail in connection with FIG. 39, and hence will not be further described. It is so adjusted that if the input voltage at terminal $a$ is, say, 100 volts, output terminal $b$ will be connected to the battery terminal identified through as B, hence picking up relay TCCR over an obvious circuit. Relay TCCR is a test check relay, whic his thus picked up when the computer is solving the test problem correctly. Should the computer produce a voltage other than 100 volts in response to the predetermined inputs, relay TCCR will be released.

A suitable indicator, here shown as an alarm bell 939, is used in conjunction with relays 2–TC, TCCR, and 1–2CA (FIG. 28) to produce an indication when the computer is not being properly operated.

Relay 1–2CA (FIG. 28) has an ovious circuit extending from terminal B of the battery over front contact $l$ of relay CL4TP and through the winding of the relay to terminal N of the battery. Relay 1–2CA is accordingly picked up when computing track section CL4T is occupied. Relay 1–2CA is made slow releasing, as indicated in the drawings, and according to one embodiment may have a release period of approximately one second. This relay is used to give the computer time to change its output from the value developed during the solution for $V_3$ for a particular cut to the value developed during the solution of the test problem before rendering the computer alarm circuit operative, as will be described.

Bell 939 (FIG. 53) has a pickup circuit extending from terminal B of the battery over front contact $i$ of relay AP (FIG. 29), lead 974, back contact $a$ of slow release relay 1–2CA (FIG. 38), lead 975, back contact $a$ of relay TCCR (FIG. 53), through the winding of bell 939, and over lead 940 and front contact $e$ of relay 2–TC to terminal N of the battery. Bell 939 accordingly cannot be operated unless relay 2–TC is picked up to indicate that the computer is in its test cycle, relay 1–2CA has been released to indicate that the computer has had sufficient time to solve the test problem, and relay AP is picked up to indicate that the apparatus is in its automatic position, and it will not then be operated unless relay TCCR is released to indicate that the computer is not solving the test problem correctly.

As previously described, relay RTA (FIG. 55) is picked up if the cut length measuring apparatus has not registered a measurable cut length. Under these conditions, the value of tangent track rolling resistance which was previously measured will be in error. Accordingly, an average value of tangent track rolling resistance which is determined by the weight of the cut will be supplied. Circuits for carrying out this function will now be described.

Three potentiometers 976, 977, and 978 operate in conjunction with battery 925 and relays 22–RLP and 22–RHP to supply an average value of tangent track rolling resistance for cuts over 116 feet in length.

For light weight cuts, the circuit extends from ground through battery 925, and from the positive terminal of battery 925 over the back point of contact $a$ of relay 3–TC, through resistor 926, over the front point of contact $a$ of relay 22–RLP and the back point of contact $a$ of relay 22–RHP, and through the restive element of potentiometer 978 to ground. The wiper of potentiometer 978 is initially adjusted to provide a voltage proportional to the average value of tangent track rolling resistance for long cuts of light weight cars. It may be noted in this connection that the total weight of the cut is not material. This is because the braking applied by the retarder is proportional to the number of axles, and hence it is the axle loading which determines the weight classification of the cut in our system. The voltage developed between the wiper of potentiometer 978 and ground is applied over front contact of relay 22–RLP, the back point of contact $c$ of relay 22–RHP, lead 979, the front point of contact $a$ of relay RHA (FIG. 55), lead 298, the back point of contact $b$ of relay 3–TC, lead 299, and through summing resistor 300 (FIG. 53), to input terminal $a$ of amplifier 301.

For medium weight cuts, the circuit extends from the positive terminal of battery 925 over the back point of contact $a$ of relay 3–TC, through resistor 926, over the front point of contact $a$ of relay 22–RLP, the front point of contact $a$ of relay 22–RHP, and through the resistive element of potentiometer 976 to ground. The wiper of potentiometer 976 is adjusted to develop a voltage proportional to the average value to tangent track rolling resistance for long cuts of medium weight. This voltage is applied from the wiper of potentiometer 976 over the front point of contact $b$ of relay 22–RLP, the front point of contact $c$ of relay 22–RHP, lead 979, the front point of contact $a$ of relay RTA, lead 298, the back point of contact $b$ of relay 3–TC, and over lead 299 to summing resistor 300 of amplifier 301.

For heavy cuts, the circuit extends from the positive terminal of the battery 925 over back contact $a$ of relay 3–TC, through resistor 926, over the back point of contact $a$ of relay 22–RLP, front contact $b$ of relay 22–RHP, and through the resistive element of potentiometer 977 to ground. Potentiometer 977 is adjusted to develop a voltage proportional to the average rolling resistance of a long cut of heavy weight. This voltage is applied over the back point of contact $b$ of relay 22–RLP, the front point of contact $c$ of relay 22–RHP, and thence over the circuit previously traced to input terminal $a$ of amplifier 301.

Since the measured value of tangent track rolling resistance is supplied to the computer biased by a voltage of 100 volts, battery 925 and potentiometers 976, 977 and 978 are so selected and adjusted as to provide this bias voltage for the available values selected.

*The electronic storage units*

The electronic storage units employed in the various described locations in our system are fully described and claimed in the aforementioned Cook Patent 2,914,750, for Electronic Storage Device, and assigned to the assignee of the present application. The structure and operation of these units are typified by unit 1–2GR1–ESU, the details of which are shown schematically in FIG. 45. As shown, unit 1–2GR1–ESU comprises a D.C. amplifier 941 having an input between its terminals $a$ and $b$ and an output between terminal $c$ of the unit and grounded terminal $d$.

As described in Patent 2,914,750, the input signal to be stored is applied to terminal $a$ of storage unit 1–2GR1–ESU, and thence through a resistor 942, the back point of contact $b$ of relay 7H, capacitor 943, back contact $c$ of relay 7H, and through resistor 944 to ground. In the condition shown, output terminal $c$ of amplifier 941 is connected over lead 945, back contact $a$ of relay 7H, and through resistor 944 to ground to provide a first feedback circuit to the amplifier. Resistor 944 is thus connected in shunt with the input and output circuits of the amplifier. With relay 7H deenergized, the applied signal causes current to flow through resistor 942, capacitor 943 and resistor 944 in series. While the capacitor is charged, the input and output circuits of amplifier 941 are connected together and shunted by resistor 944. Accordingly, a voltage will be developed at the output of the amplifier in accordance with the internal characteristics of the amplifier. This voltage will appear across resistor 944. The polarity of this voltage may be equal or opposite to that provided by the applied signal. If the voltages are opposite in polarity, capacitor 943 will be charged to a voltage equal to the difference between the applied signal voltage and the voltage developed by the amplifier across resistor 944. If the voltages are of the same polarity, the capacitor will be charged to a voltage equal to the sum of the applied signal and the voltage across resistor 944. In either event, the capacitor is charged to a voltage which differs from the voltage applied to terminal a of unit 1–2GR1–ESU by the voltage developed across resistor 944.

The circuit constants are so chosen that capacitor 943 is charged rapidly. When relay 7H is energized, the connection between the amplifier output circuit and the input circuit is interrupted at the open back point of contact a of relay 7H. The circuit for resistor 944 is now opened at the open back point of contact c of relay 7H. The applied signal is now disconnected at the open back point of contact b of relay 7H. The closing of the front point of contact b of relay 7H now connects a resistor 946 in series with capacitor 943 in a feedback path between input terminal a and output terminal c of amplifier 941. A high value is chosen for resistor 946, and since the amplifier is arranged to have negligible current flowing in the input circuit, capacitor 943 retains its charge for a relatively long period of time, during which the stored value of the applied signal is available between terminal c and grounded terminal d of the electronic storage unit.

*Operation of the system*

Since the overall operation of the system has been generally described in connection with FIGS. 1 through 14, and the individual variations in operation of separate portions of the apparatus caused by differences in values of the parameters of the particular cars having been described in detail in connection with the detailed description of the various portions of the system, a discussion of the operation of the detailed embodiment of our system shown will be limited to the consideration of a single typical case. Operation of the system in other cases will vary as to the individual components in the manner previously described, and accordingly, does not require detailed exposition.

For the purposes of illustrating the operation of the embodiment of our system, it will be assumed that a cut of two cars, each of medium weight, that is, weighing about 40 tons apiece, and having a combined length of 100 feet, are released from the hump at a speed of 15 miles an hour and are routed to track 2.

When the cut is on the hump, push button 2PB (FIG. 48) will be momentarily depressed to insert the route to track 2 in the C bank of the 1–8 storage unit. The apparatus will respond as previously described, causing relay 1–8C2C to be picked up and indicator lamp 1–8C2K to be lighted. The route will then be cascaded to bank B and then to bank A (FIG. 49), causing relay 1–8A2C to be picked up and indicator lamp 1–8A2K to be lighted. Relay 1–8A1 (FIG. 49) will remain released to indicate that switch 1–8W is to be positioned normally. Output terminal h and lead 110 will remain deenergized, indicating that switch 1–4W will be positioned normally, and output terminal 111 will be energized over front contact c of relay 1–8A2C to indicate that switch 1–2W is to be reversed.

Relays 1–8AT, 1–8ASC and 1–8AL may be assumed to be released at this time, and relay 1–8AD will be energized.

It will be assumed that switch 1–8W is already in its normal position. Accordingly, relays 1–8WP (FIG. 23) and 1–8NWP in switch control unit 1–8WC will be energized and relay 1–8RWP will be released. Accordingly, although output terminal g of the A bank of the 1–8 storage unit (FIG. 49) is energized at this time over the contacts of lever 1–8MC (FIG. 23) in its A position, terminal f of relay 1–8WC, lead 100, terminal e of the A bank of the 1–8 storage unit (FIG. 49), front contact h of relay 1–8AD, back contact e of relay 1–8AT and back contact a of relay 1–8A1, and terminal b of switch control unit 1–8WC (FIG. 23) will be energized over lead 102; the circuit which extends from terminal b of unit 1–8WC over front contact b of relay 1–8WP, front contact d of relay 1–8TR, and through the normal magnet NW to contactor E of circuit controller 1–8CC is open, since the wiper is now engaging terminal b. No further action will take place in this portion of the apparatus until detector track section 1–8T is occupied.

Referring now to FIG. 18, as soon as the cut comes into section AT, relay ATR will release and relay ATP (FIG. 33) will pick up. The velocity of the cut will be measured by radar velocity meter 9 (FIG. 18) and differentiated in differentiator 10. The output at terminal b of differentiator 10 is supplied to input terminal a of bias unit 11, which provides at its output terminal b a voltage proportional to $100-R_{a,b}$.

With relay ATP up, relay RI will pick up. Since relay R1TP is still released, relay ATCP will release after its time delay period. As previously described, the first available H relay in panels 1RP through 6RP is now picked up.

Assuming that panel 1RP (FIGS. 46 and 47) is available, relay 1H will pick up and the voltage from battery 214 (FIG. 46) will be applied to input terminal a of storage unit 1ES (FIG. 47), causing an output voltage to appear at terminal c.

If storage unit 1ES is functioning correctly, relay 1CR will now pick up as previously described. With relay 1CR picked up, relay 1A will pick up over front contact c of relay ATP (FIG. 33), the front point of contact c of relay RI, lead 208, the back point of contact b of relay 1B (FIG. 46), back contact c of relay 1RO, lead 326, the front point of contact a of relay 1CR, and lead 327. The tangent acceleration code 001 will now be applied to terminals p, o and n of panel 1RP by energizing lead 233 over front contact d of relay 1A.

With lead 233 energized and leads 231 and 232 deenergized, relay 3CTAC in the C bank 54 of the master retarder TAC storage unit (FIG. 35) will be energized, and relays 1CTAC and 2CTAC will remain released. This information will now be cascaded to the B bank 55 in FIG. 35, and as previously described, relay 3BTAC will be picked up and relays 1BTAC and 2BTAC will remain released. The information will now be transferred to the A bank 56 in FIG. 35, with relay 3ATAC being picked up over front contact b of relay 3BTAC, lead 236, and back contact g of relay GEC. Relays 1TAC and 2TAC in FIG. 35 will remain released. The information stored in the A bank 56 will be retained until the cut occupies track section 1–8T. Relay 1H (FIG. 36) will now release.

With relay 1A picked up, the measured value of rolling resistance which appears between output terminal b of bias unit 11 and ground is applied over lead 296, front contact a of relay ATP (FIG. 33), lead 215, terminal r of panel 1RP, the front point of contact e of relay 1A, and lead 335 to terminal a of storage unit 1ES (FIG. 47).

As the cut enters section MR1T, the rolling resistance measurement is made final by picking up relay 1H (FIG. 47) when relay R1TR is released and relay R1TP (FIG. 33) is picked up. The holding circuit for relay RI is broken and relay RI is released. A circuit is now completed from terminal B of the battery over front contact c of relay ATP, back contact c of relay RI and lead 210 to terminal q of panel 1RP, and thence over the front contact c of relay 1A, through rectifier 211 and through the winding of relay 1B to terminal N of the battery. Relay 1B is accordingly picked up.

With relay R1TP picked up, a holding circuit is completed for relay 3BTAC in FIG. 35 which includes the front point of contact *a* of relay R1TP. This relay will accordingly remain up while section MR1T is occupied and will be released as soon as section MR1T is vacated.

With relay 1B picked up, relay 1H will now be picked up over front contact *d* of relay 1B. Relay 1A will now be released, causing lead 233 to be deenergized. Relay 3CTAC is now held up over its own front contact *a*, lead 363, and front contact *d* of relay ATP, and will be released when section ATP is vacated. With relay 1H energized, the input circuit for storage unit 1ES is interrupted, and the stored value is now made final as previously described, being available at output terminal *c* of relay 1ES until required by the computer.

The master retarder is initially in its standby position as previously described, with the pressure in the first section maintained between 30 and 37 p.s.i. by the action of Bourdon tube 493. The pressure in the second section is maintained between 30 and 37 p.s.i. by the action of Bourdon tube 540 if the first section is below 35 p.s.i. as indicated by the closing of back contacts *b* of Bourdon tube 492, and is maintained between 63 and 70 p.s.i. by the action of Bourdon tube 451 if the pressure in the first section is above 35 p.s.i. and back contact *b* of Bourdon tube 492 is open.

As the cut enters section MR1T, weigh rail contactor WRC will begin to function. Since the cut in the case under consideration is of medium weight, relays LS and M (FIG. 34) will be picked up as previously described.

Relay RL1 will now be picked up over back contact *c* of relay H, back contact *d* of relay L, front contact *c* of relay LS and lead 418. Relay RH1 will be picked up over front contact *a* of relay M, front contact *b* of relay LS, back contact *c* of relay L, lead 419, and the back point of its own make-before-break contact *a*.

As soon as the cut enters section MR1T, a signal proportional to the velocity of the cut as measured by radar velocity meter 17 (FIGS. 19 and 20), which appears at terminal *a* of velocity meter 17, is applied over lead 463, front contact *i* of relay R1TP (FIG. 33) and lead 464 to input terminal *b* of speed control unit 61 (FIG. 19).

With relays RL1 and RH1 picked up, and the FNS lever set to its normal position, relays 1LP, 1SLP and 1FLP in speed selector unit 59 (FIG. 34) will all be released. Under these conditions, the resistive element of potentiometer NH will be energized from battery 454, and the wiper of potentiometer NH will be connected to output terminal *c* of speed selector unit 59. A voltage of 42.5 volts, representing a speed of 10.8 miles per hour, will now be applied from terminal *c* of speed selector unit 59 over lead 465, front contact *g* of relay R1TP and lead 466 to input terminal *a* of speed control unit 61 (FIG. 19).

Speed control unit 61 will now function as previously described to energize its output terminal *e* (FIG. 20) if the combined characteristics of the cut provide a voltage in excess of that provided by the speed selector unit, to produce no output if the speed of the cut is correct, and to energize its terminals *f* and *g* if the combined speed characteristics of the cut are below the desired value.

The first section of the master retarder will now be maintained at a pressure of between 75 and 82 p.s.i. by the action of Bourdon tube 494 to control intake magnet 1HMM, or exhaust magnets 1X1M and 1X2M in parallel, according as terminal *e* or terminals *f* and *g* of speed control unit 61 are energized, as previously described.

During this time, the second section of the master retarder will be maintained between 63 and 70 p.s.i. by the action of Bourdon tube 541 as previously described.

When the cut enters section MR2T, relay 1–2RC (FIG. 36) will be picked up and relays RL2, RLP2, RH2 and RHP2 (FIGS. 36 and 37) will be picked up as previously described. The second section of the master retarder will now be controlled from the first section pressure control unit 61 as previously described, and will be maintained between its upper limit of, say, 110 p.s.i. and atmospheric pressure at some series of pressure values depending on the output of speed control unit 61.

With track section MR2T occupied and relay R2TP picked up, the tangent acceleration code stored in the A bank 56 of the master retarder storage unit (FIG. 35) is retained, relay 3ATAC being held up at this time over a circuit including its own front contact *a*, lead 237 and front contact *e* of relay R2TP.

When section MR1T is vacated, the first section will return to its standby condition and relay GEC will pick up (FIG. 36). Relay 1–2RC will be released, relay R1TP (FIG. 33) will be released, and relays RL1 and RH1 will release.

The second section of the master retarder will now be controlled from the second section speed control unit 65 (FIG. 22) as previously described. Since the length of the cut is 100 feet, detector track section 1–8T will be occupied before section MR1T is cleared. Track relay 1–8TR (FIG. 23) will now be released.

With track relay 1–8TR released, relay 1–4BT (FIG. 25) in the B bank of the 1–4 storage location will be energized over its previously traced circuit extending from terminal B of the battery over front contact *g* of relay 1–8AD (FIG. 49), back contact *d* of relay 1–8AT, back contact *b* of relay 1–8AL, terminal *a* of the A bank of the 1–8 storage location, lead 112, terminal *d* of switch control unit 1–8WC (FIG. 23), back contact *e* of relay 1–8TR, front contact *c* of relay 1–8NWP, terminal *h* of unit 1–8WC, lead 113, terminal *b* of the B bank of the 1–4 storage location (FIG. 25), back contact *c* of relay 1–4BD, and through the winding of relay 1–4BT to terminal N of the battery. The stick circuit for relay 1–4BT includes front contact *g* of relay 1–8AD and leads 114 and 115. Relay 1–4BD is then energized over front contact *c* of relay 1–4BT and back contacts *c* and *d* of relays 1–4AT and 1–4AD, respectively.

With relays 1–4BT and 1–4BD picked up, relay 1–4B2 will be picked up over a circuit extending from energized terminal *i* of the A bank of the 1–8 storage unit (FIG. 49) over leads 11 and 120 (FIG. 24), front contact *f* of relay 1–4BT (FIG. 25), through the winding of relay 1–4B2 (FIG. 40), bus 241, and front contact *e* of relay 1–4BD (FIG. 25). Relay 1–4B1 (FIG. 25) also has a transfer circuit path prepared, but does not pick up since its circuit is interrupted at deenergized terminal *h* (FIG. 49) of the A bank of the 1–8 storage unit.

At the same time, the TAC information which is stored in the A bank 56 of the master retarder storage unit (FIG. 35) is transferred to the B bank of the 1–4 storage location. Since relays 1TAC and 2TAC are released, relays B1TAC and B2TAC in FIG. 40 will remain released. However, relay B3TAC in FIG. 40 will be picked up over a circuit which extends from terminal B of the battery over front contact *b* of relay 3ATAC (FIG. 35) lead 245, cable 246, lead 245, back contact *c* of relay 1–4BGL (FIG. 40), the back point of make-before-break contact *a* of relay 3BTAC, bus 241, and over front contact *e* of relay 1–4BD to terminal N of the battery.

The weight information stored in relays RL2, RLP2, RH2 and RPH2 is transferred at this time to the B bank of the 1–4 storage location. Relay BLP in FIG. 40 will be picked up over front contacts *a* of relay RLP2, lead 318, lead 320 (FIG. 29), back contact *g* of relay 1–4BGL, the back point of its own make-before-break contact *a*, bus 241, and front contact *e* of relay 1–4BD (FIG. 45). Relay BHP will be picked up over front contact *a* of relay RHP2, lead 321, lead 323 (FIG. 39), back contact *i* of relay 1–4BGL (FIG. 40), the back point of its own make-before-break contact *a*, its winding, bus 241, and front contact *e* of relay 1–4BD. All of the information pertaining to the cut is now stored in the B bank of the 1–4 storage location. Relay 1–4BT (FIG. 25) will now release and relay 1–4AT will pick, causing relay 1–4AD to pick up. The information stored in the B bank will now be transferred to the A bank of the 1–4 storage location. The circuits for this purpose were previously described in detail. It is only necessary at this point to state that relay 1–4A1 (FIG. 25) will remain released, relay 1–4A2 will be picked up over front contact *b* of relay 1–4B2, relays A1TAC and A2TAC remain released, relay A3TAC will be picked up over front contact *b* of relay B3TAC, and relays ALP and AHP will be picked up over front contacts *b* of relay BLP and BHP.

When section MR1T is cleared, relay R1TP (FIG. 33) is released, and relay GEC (FIG. 36) is picked up. The weight registration, which is now stored in the A bank of the 1–4 storage location (FIGS. 25 and 40), is now made final. Relay 1–4AGL (FIG. 40) will also be picked up, over a circuit extending from terminal B of the battery over front contact *c* of relay GEC (FIG. 36), lead 377, lead 379 (FIG. 39), back contact *c* of relay 1–4BGL, the back point of its own make-before-break contact *a*, bus 291, and over front contact *f* of relay 1–4AD to terminal N of the battery. With relay 1–4AGL picked up, the previously traced alternate pickup circuits for relays ALP and AHP in FIG. 40 are interrupted at the open back points of contacts of relay 1–4AGL.

It will be assumed that switch 1–4W is already in its normal position, and that relays 1–4WP and 1–4NWP are energized over their circuits previously traced. No further action will then take place in this section until detector track section 1–4T is occupied.

Before the cut clears section MR2T, it will be assumed that the correct selected leaving velocity of 10.8 miles per hour has been secured. During the occupancy of the master retarder, output terminals *c* and *d* of speed control unit 65 (FIG. 22) have been connected through leads 477 and 479 and summing resistors 476 and 478 (FIG. 38) to input terminal *a* of voltage detector unit 66 (FIG. 39). When the speed of the cut reaches 10.8 miles per hour, the voltage detector will function as previously described to pick up relay CK, and with relay BN picked up to indicate that the B— supply is operative, relay CLV will be picked up as soon as detector track section 1–8T is occupied over back contact *b* of relay 1–8TR (FIG. 23), leads 145 and 420, the winding of relay CLV, and front contacts *a* of relays CK and BN.

Assuming that the information pertaining to the cut has been transferred to the A bank of the 1–4 storage location before the correct leaving velocity is attained, when relay CLV picks up relay 1–4A2V will be picked up (FIG. 40) over a circuit extending from terminal B of the battery over front contact *c* of relay CLV, lead 423, terminal *f* of the A bank of the 1–4 storage unit, the back point of make-before-break contact *d* of relay 1–4A2VL, the winding of relay 1–4A2V, bus 291, and front contact *f* of relay 1–4AD (FIG. 25) to terminal N.

When the cut clears section MR2T, the second section of the master retarder will return to its standby condition, relay R2TP will release, and relay GEC will release. Relay CLVEC will pick up over back contact *b* of relay R2TP, lead 144, lead 145, and back contact *b* of relay 1–8TR, which will be deenergized at this time.

The correct leaving velocity indication will be made final at this time. For this purpose, relay 1–4A2VL (FIG. 40) will be picked up over front contact *d* of relay CLVEC, lead 424, lead 426 (FIG. 39), terminal *e* of the A bank of the 1–4 storage unit (FIG. 40), the back point of its own make-before-break contact *a*, through its winding, and over bus 291 and front contact *f* of relay 1–4AD. With relay 1–4A2VL picked up, relay 1–4A2V can no longer be picked up by relay CLV, but since it has been previously picked up, it will be held up over its own front contact *a*, the front point of make-before-break contact *d* of relay 1–4A2VL, and front contact *f* of relay 1–4AD.

When the cut occupies detector track section 1–4T, the information stored in the A bank of the 1–4 storage location (FIGS. 25 and 40) is transferred to the B bank of the 1–2 phantom storage location (FIGS. 42, 43, 53 and 54), and in parallel to the B bank of the 1–2 storage location associated with switch 1–2W (FIG. 32).

Referring now to FIG. 32, relay 1–2BT will be picked up over a circuit extending from terminal B of the battery over front contact *g* of relay 1–4AD (FIG. 25), back contact *e* of relay 1–4AT, back contact *b* of relay 1–4AL, terminal *v* of the A bank of the 1–4 storage unit, terminal *c* of switch control unit 1–4WC, back contact *d* of track relay 1–4TR, front contact *c* of relay 1–4NWP, terminal *g* of switch control unit 1–4WC, lead 126, lead 128 (FIG. 42), cable 289, lead 128 (FIG. 32), terminal *b* of the B bank of the 1–2 storage unit, back contact *b* of relay 1–2BD, and through the winding of relay 1–2BT to terminal N of the battery. Relay 1–2BD will now be picked up over its previously traced circuit including front contact *b* of relay 1–2BT, and back contact *c* of relay 1–2AT and back contact *d* of relay 1–2AD in multiple.

Relay 1–2B1 will now pick up over its previously traced circuit including front contact *b* of relay 1–4A2 (FIG. 40), terminal *s* of the A bank of the 1–4 storage unit, lead 135, lead 137 (FIG. 40), lead 140 (FIG. 42), cable 289, lead 140 (FIG. 32), terminal *c* of the B bank of the 1–2 storage unit, front contact *c* of relay 1–2BT and front contact *c* of relay 1–2BD.

The previously described sequence of operations will now take place to transfer the information stored in the B bank of the 1–2 storage location to the A bank. Without tracing these circuits, which have been previously described in detail, it is sufficient to note when relay 1–2BT releases, relay 1–2AT will pick up and relay 1–2AD will then pick up. With these relays up, relay 1–2A1 will be picked up over front contact *b* of relay 1–2B1.

When relay 1–2AT releases, switch 1–2W will be set to its reverse position by the circuits previously traced, which include contact *a* of lever 1–2MC in its automatic or A position, front contact *b* of relay 1–2AD, back contact *b* of relay 1–2AT, front contact *b* of relay 1–2A1, from terminal *b* of the A bank to terminal *b* of switch control unit 1–2WC, front contact *a* of relay 1–2WP, front contact *b* of track relay 1–2TR, reverse magnet RW, and through contactor F of circuit controller 1–2CC to terminal N of the battery. With switch 1–2W set to its reverse position, relays 1–2RWP and 1–2WP will be energized, and no further action will take place at this switch location until detector track section 1–2T is occupied.

At the same time that the information was transferred to the B bank of the 1–2 storage location, a parallel transfer will take place to the B bank of the 1–2 phantom location (FIGS. 42 and 53). Relays 1–2GRBT and 1–2GRBD will be picked up over their previously described circuits, which it is believed unnecessary to retrace in detail. With these relays picked up, and relays 1–4A2, 1–4AGL, 1–4A2VL, A3TAC, 1–4A2V, ALP and AHP in FIG. 40 picked up, relays 1–2GB1, B3TAC, BLP and BHP in FIG. 42 will be picked up over their previously described circuits which is believed unnecessary to retrace here.

Relay B1VL in FIG. 42 will be picked up at this time over its previously traced circuit including front contact *k* of relay 1–2GRBT, lead 447, lead 449 (FIG. 41), front point of contact *h* of relay 1–4A2VL (FIG. 40), lead 434, the back point of its own make-before-break contact *b*, its winding, bus 390, and over front contact *e* of relay 1–2GRBD to terminal N of the battery. Relay B1V will be picked up at this time over its previously traced circuit including front contact *k* of relay 1–2GRBT, lead 447, lead 448 (FIG. 41), front contact *b* of relay 1–4A2V (FIG. 40), lead 450, the back point of its own make-before-break contact *a* lead 954, the front point of make-before-break contact *c* of relay B1VL, lead 953, through the winding of relay B1V, lead 390, and over front contact e of relay 1–2GRBD to terminal N of the battery.

The information stored in the B bank of the 1–2 phantom location will now transfer to the A bank, shown in FIGS. 43 and 54. When relay 1–2GRBT in FIG. 42 releases, relay 1–2GRAT in FIG. 43 will be picked up, and relay 1–2GRAD will be subsequently picked up.

At this time, relays 1–2GA1, A3TAC, ALP, AHP, A1VL and A1V will be picked up over the contacts of the corresponding relays in the B bank by circuits which have been previously traced and which will not be repeated in detail.

The information pertaining to the cut is now stored in the A bank of the 1–2 phantom location, where it will be held until section CL4T is occupied and vacated by the cut.

The TAC repeater relays in FIG. 44 now repeat the tangent acceleration code stored in relays 1TAC, 2TAC and 3TAC in FIG. 43. Since only relay 3TAC is picked up, only relay 1–2ART3 will be picked up. The rolling resistance signal stored in panel 1RP (FIG. 47) is now made available to the computer. Relay 1RO (FIG. 46) is first picked up over a circuit including the front point of contact b of relay 1–2ART3, the back point of contact c of relay 1–2ART2, the back point of contact f of relay 1–2ART1, lead 207, cable 287, cable 285 (FIG. 52), cable 283 (FIG. 39), lead 207 (FIG. 58), and the winding of relay 1RO (FIG. 46). The output appearing between terminal c of storage unit 1ES and grounded terminal d (FIG. 47) is now applied over leads 212 and 216, front contact f of relay 1RO, lead 336, terminal m of panel 1RP (FIG. 47), lead 269, cable 275, cable 277 (FIG. 39), cable 279 (FIG. 52), lead 269 (FIG. 44), the back point of contact b of relay 1–2ART1, the back point of contact a of relay 1–2ART2, the front point of contact a of relay 1–2ART3, lead 268, the back point of contact a of relay RTA, lead 298, to the back point of contact b of relay 3–TC.

Since track section CL4T is not yet occupied, the TC relays will be up as previously described, and the rolling resistance signal will not, therefore, be applied to summing amplifier 301 at this time.

No further action will take place in the 1–2 phantom storage location until track section CL4T is occupied.

When the cut occupies track section CL1T (FIG. 27), the cut length measuring apparatus previously described will begin to function. Since the cut is assumed to be 100 feet in length, by the time section CL1T is vacated, the front of the cut will have occupied section CL4T. At this time, as previously described, relays CLA and CLB will remain released and relay CLC will be energized (FIG. 28).

When the cut occupies section CL4T, a number of operations take place simultaneously. First, relays 1–2RL1 and 1–2RH1 will pick up over their previously traced circuits including the front contacts of relays ALP and AHP and front contacts of relay CL4TP. The first section of the group retarder, which was initially in its standby condition with the first section maintained between 75 and 82 p.s.i. by the action of Bourdon tube 613 is preset in accordance with the medium weight of the cut by the action of Bourdon tube 614 to a pressure of between 30 and 37 p.s.i. The second section will now be maintained at a pressure of between 30 and 37 p.s.i. if the firt section is below 35 p.s.i., and back contact b of Bourdon tube 612 is closed, or it will be raised to between 63 and 70 p.s.i. by the action of Bourdon tube 686 if the pressure in the first section rises above 35 p.s.i.

Figure 51:
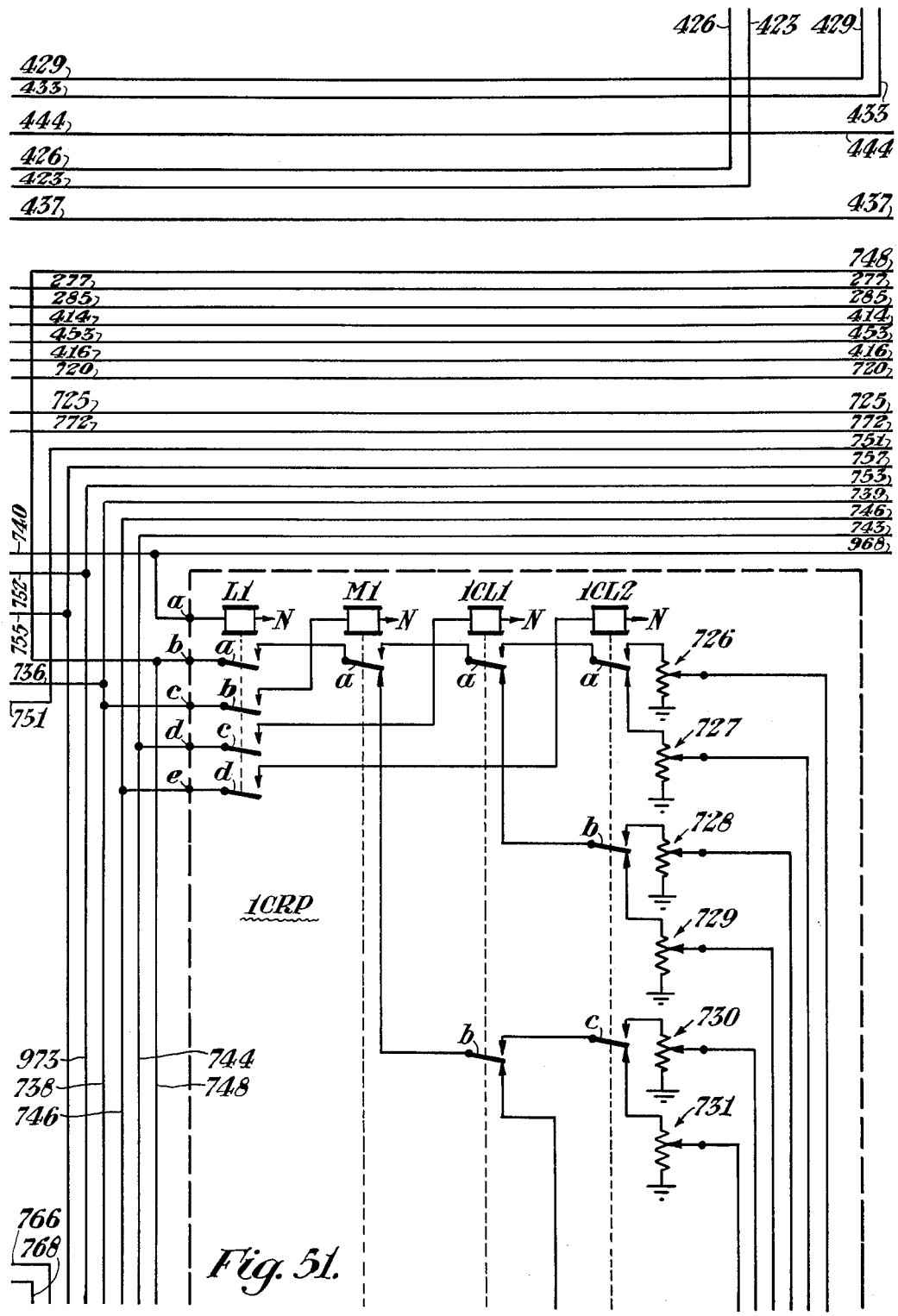

The output terminal a of radar velocity meter 26 will now be applied over lead 635, front contact b of relay CL4TP, and lead 748 to terminals b of panels 1CRP, 2CRP and 3CRP in FIGS. 51 and 62.

The weight information stored in relays ALP and AHP in FIG. 43 will be transferred at this time to pick up relays 21–RLP and 21–RHP in FIG. 50 and relays 22– RLP and 22–RHP in FIG. 54 over previously described circuits which will not be retraced here.

Since relay A1V in FIG. 54 is picked up, a circuit now extends from terminal B of the battery over front contact b of relay A1V, lead 958, terminal f of the A bank of the 1–2 phantom location (FIG. 43), lead 451, front contact a of relay CL4TP (FIG. 28), lead 452, back contact b of relay RTA (FIG. 55), lead 453, and through the winding of relay CLVP (FIG. 50) to terminal N of the battery.

With relay CL4TP picked up, relays 1–TC (FIG. 50), 2–TC (FIG. 53) and 3–TC (FIG. 54) will be released.

With relay CLC (FIG. 28) picked up, and relays CLA and CLB released, relay RTA (FIG. 55) will be released.

Figure 56:
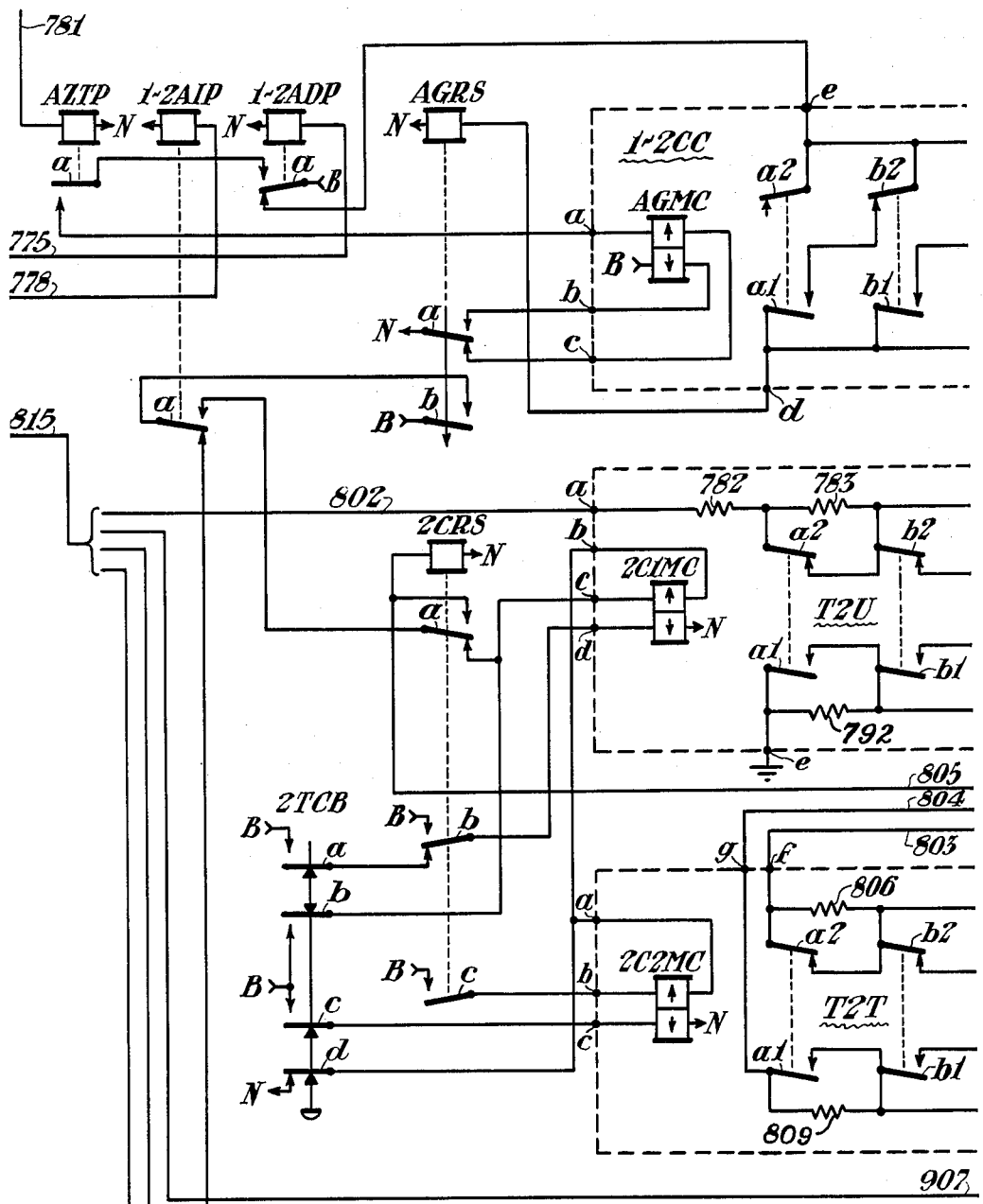
Figure 57:
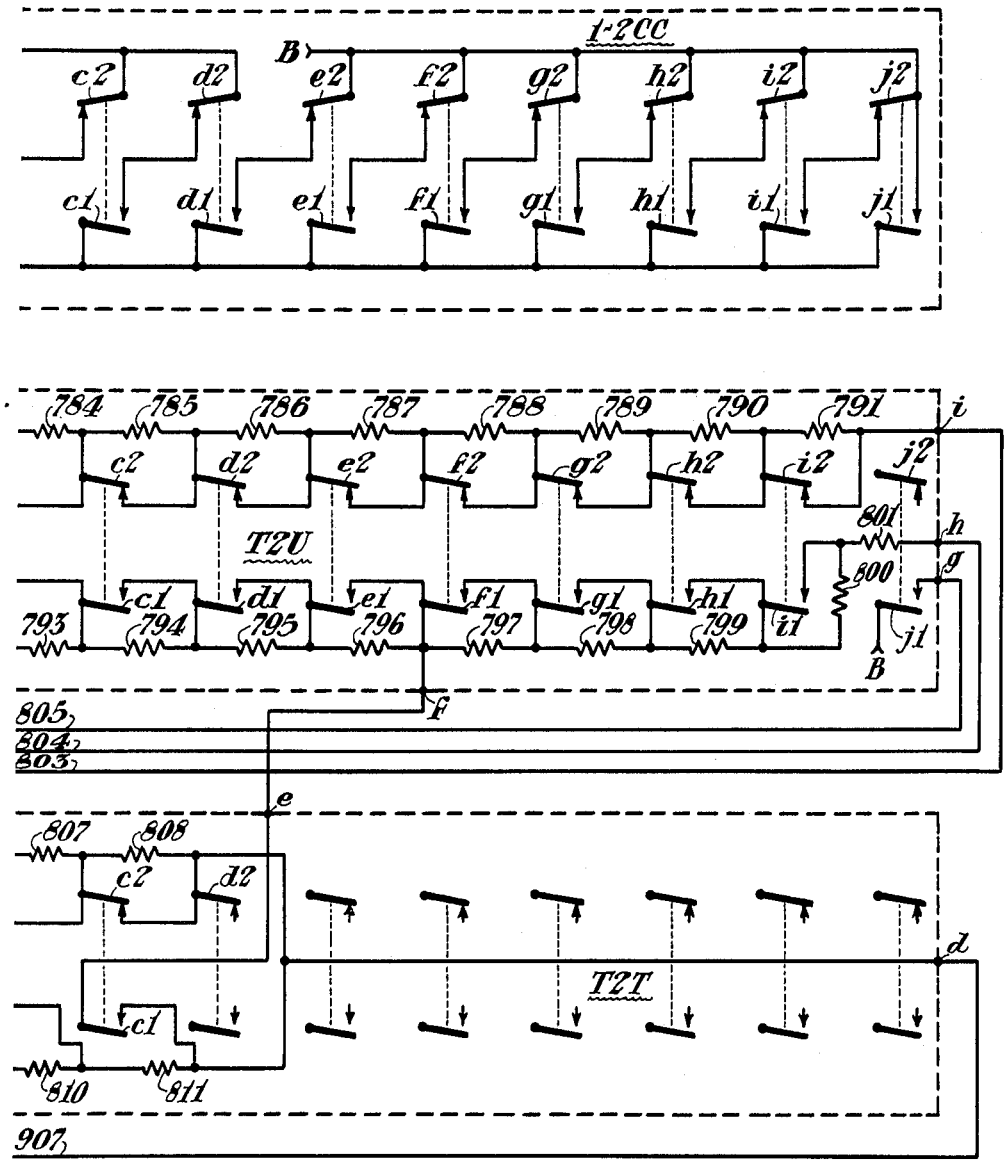

Referring now to FIGS. 50, 51, 52, 62 and 63, and with the FNS lever in FIG. 56 set to its normal position, so that the heel of contact b of relay CLVP is energized from terminal B of the battery, panels 2CRP (FIG. 62) and 5CRP (FIG. 63) will be selected. Computer 21 will then compute a value of $R_{1,2}$ for use in computer 22 under the conditions of relays 21–RLP and 21–RHP picked up, relay CLVP picked up, and relay 1–TC released.

Relay L2 in panel 2CRP will be picked up at this time over energized lead 723 (FIG. 50), front contact b of relay CLVP, lead 752, lead 973 (FIG. 51), and through the winding of relay L2 (FIG. 62), to terminal N of the battery. Relay L5 will be picked up over front contact b of relay CLVP, and leads 752 and 753. Since the weight is medium, relays M2 and M5 will remain released.

With relay CLC picked up (FIG. 28) and relay CLA released, relays 2CL1 and 5CL1 will be picked up over their previously traced circuit, which extends from terminal B of the battery over a common path including front contact b of relay CLC, back contact b of relay CLA, and lead 741, and thence over lead 742 in a first path to terminal d of panel 5CRP, over circuits analogous to those in panel 4CRP shown in detail, and through the winding of relay 5CL1 to terminal N of the battery, and over a second path from lead 741 over leads 743 and 744 to terminal d of panel 2CRP (FIG. 62), and over the circuitry indicated schematically in dotted lines and through the winding of relay 2CL1 to terminal N of the battery.

With relays CLA and CLB released and relay CLC picked up, relays 2CL2 and 5CL2 in panels 2CRP and 5CRP, respectively, will be picked up. For this purpose, a circuit extends from terminal B of the battery over front contact d of relay CLC (FIG. 28), back contact d of relay CLB, the back point of contact d of relay CLA, and lead 745, and thence over lead 747 to terminal e of panel 5CRP in FIG. 63 to pick up relay 5CL1, and over lead 746 to terminal e of panel 2CRP in FIG. 62 to pick up relay 2CL2.

A voltage proportional to a leaving velocity $V_1$ of 10.8 miles per hour is now supplied to input terminal b of panel 5CRP (FIG. 63) over a circuit extending from ground at the positive terminal of battery 749 in FIG. 50, and from the negative terminal of battery 749 through resistor 750 and over lead 751.

The rolling resistance signal has been applied to input terminal b of panel 2CRP over lead 748 as previously described. An output now appears at terminal f of panel 2CRP over the circuits previously described for panel 1CRP, proportional to $vV_2$. This signal is applied over lead 766 and through summing resistor 767 to input terminal a of amplifier 718 (FIG. 50). At the same time, a signal proportional to $-u$ appears at output terminal f of panel 5CRP in FIG. 63. This signal is applied over lead 768 and through summing resistor 769 to input terminal a of amplifier 718 in FIG. 50. A signal proportional to $R_{1,2}$ is now supplied from output terminal c of amplifier 718 over the front point of contact e of relay CLVP, the back point of contact a of relay 1TC, lead 772, the back point of contact *a* of relay 2-TC (FIG. 53), to the heel of contact *a* of relay T1.

Since track 2 is selected and relay 1-2GA1 in FIG. 43 is picked up, relay T1 will be picked up over its previously traced circuit. Accordingly, the $R_{1,2}$ signal will be applied over the front point of contact *a* of relay T1 and through the resistive winding of potentiometer 816 to ground. The value of $R_{1,2}(b_1)$ appearing between the wiper of potentiometer 816 and ground will now be applied over the front point of contact *b* of relay T1, the back point of contact *b* of relay 2-TC and lead 915, and through summing resistor 867 to input terminal *a* of amplifier 824.

A voltage is now applied from the positive terminal of battery 868 over the back point of contact *c* of relay 2-TC, through resistor 869, over the front point of contact *d* of relay T1, and through the resistive element of potentiometer 818 to ground. A signal proportional to $c_1$ is thus developed at the wiper of potentiometer 818, and is applied over the front point of contact *c* of relay T1, the back point of contact *d* of relay 2-TC, lead 918, and through summing resistor 870 to input terminal *a* of amplifier 824.

A voltage is applied from the negative terminal of battery 871 (FIG. 64) over the back point of contact *f* of relay 2-TC, through resistor 872, over the front point of contact *f* of relay T1, and through the resistive element of poentiometer 820 to ground. The voltage appearing between the wiper of potentiometer 820 and ground is proportional to $G_{3,4}$; this voltage applied from the wiper of potentiometer 820 over the front point of contact *e* of relay T1, the back point of contact *g* of relay 2-TC, lead 970, and through summing resistor 873 (FIG. 53) to input terminal *a* of amplifier 824. The output voltage developed between terminal *c* and grounded terminal *e* of amplifier 824 is now multiplied by a voltage proportional to $D_{3,4}$ to obtain the term $$D_{3,4}(G_{3,4}-R_{3,4})$$

in Equation 21. For this purpose, the circuit extends from terminal *c* of amplifier 824 over lead 875, the back point of contact *h* of relay 2-TC, the front point of contact *g* of relay T1, and through the resistive element of potentiometer 822 to ground. The voltage appearing between the wiper of potentiometer 822 and ground is applied over the front point of contact *h* of relay T1, the back point of contact *i* of relay 2-TC, lead 876, and through summing resistor 877 to input terminal *a* of amplifier 825.

As previously described, the rolling resistance signal was previously available at the back point of contact *b* of relay 3-TC. With relay 3-TC now released, this voltage is applied over the heel of its contact *b*, lead 299, and through summing resistor 300 to terminal *a* of tangent track summing amplifier 301 (FIG. 53).

The inertia correction term $(G_{a,b}-G_{4,5})Kw$ is supplied at this time from the negative terminal of battery 900 (FIG. 65) over back contact *h* of relay 3-TC, the front point of contact *g* of relay 22-RLP, the front point of contact *g* of relay 22-RHP, and through the resistive element of potentiometer 860 to ground. The voltage appearing at the wiper of potentiometer 860 is supplied over front point of contact *h* of relay 22-RLP, the front point of contact *i* of relay 22-RHP, the back point of contact *i* of relay 3-TC, lead 901, and through summing resistor 902 to input terminal *a* of amplifier 301 (FIG. 53).

A voltage is supplied from the negative terminal of battery 885 through resistor 839 and through the resistive element of potentiometer 840 to ground. The voltage proportional to $G_{4,5}-100$, appearing between the wiper of potentiometer 840 and ground, is supplied over lead 897, back contact *j* of relay 3-TC, lead 898, and through summing resistor 899 to input terminal *a* of amplifier 301 (FIG. 53).

It will be assumed for the present example that the wind in the body tracks is more strongly opposing the motion of the cars than is the wind at the hump. Accordingly, it is desirable to supply a positive wind correction. For this purpose, the operator will move wiper 892 to the right of the center tap of potentiometer 848 by an amount depending on the observed wind effect. A voltage will be supplied at this time from the positive terminal of battery 841 (FIG. 54) through resistor 842, the front point of contact *d* of relay 22-RLP, the front point of contact *d* of relay 22-RHP, lead 973, and through the right half of resistive element 894 to ground at the center tap. The wind correction voltage thus determined will be applied from the wiper of potentiometer 848 over lead 895, the back point of contact *g* of relay 3-TC, lead 974, and through summing resistor 896 to terminal *a* of amplifier 301.

It will be assumed that the weather is cold and that the cuts accordingly have relatively high rolling resistance at the hump, which is partially overcome by the heat of the bearings during the journey through the yard, so that the rolling resistance in the body tracks is less than that measured in section AT. Accordingly, it is necessary to insert a positive voltage correction for weight. For this purpose, let it be assumed that lever 866 is moved to its F position, causing relay WF to be picked up. A circuit will now extend from the positive terminal of battery 859 through resistor 858, over the back point of contact *c* of relay WMFS, front contact *b* of relay WF, and through the resistive element of potentiometer 857 to ground. The correction signal appearing on the wiper of potentiometer 857 will be applied over the back point of contact *d* of relay WMFS, front contact *c* of relay WF, leads 891 and 888, the back point of contact *e* of relay 3-TC, lead 971, and through summing resistor 889 to terminal *a* of amplifier 301 (FIG. 53).

As previously described, the output appearing between terminal *c* of amplifier 301 and ground must be multiplied by $D_{4,5}$ to obtain the term $D_{4,5}(G_{4,5}-R_{4,5})$. Assuming that the cut under consideration is the first to be routed to its designated body track 2, the track fullness equipment comprising counters T2U and T2T in FIGS. 56 and 57 will be in its initial condition as shown in the drawings, and the initial distance $D_{4,5}$ will, therefore, be proportional to 35 car lengths, which is the normal capacity of track 2 in the illustrated embodiment.

The output appearing at terminal *c* of tangent track summing amplifier 301 (FIG. 53) will be applied over lead 812, the back point of contact *k* of relay 3-TC (FIG. 65), lead 813, the front point of contact *i* of relay T1 (FIG. 64), lead 802, cable 815, lead 802 (FIG. 56), terminal *a* of units counter T2U, through resistor 782, over the back points of contacts *a2* through *i2* of counter T2U terminal *i* of counter T2U, lead 803, terminal *f* of counter T2T, over the back points of contacts *a2* through *c2* of counter T2T, through resistors 811, 810 and 809, terminal *g* of counter T2T, lead 804, terminal *h* of counter T2U, and through resistors 792 through 801 to ground at grounded terminal *e* of counter T2U.

The output appearing between terminal *d* of counter T2T (FIG. 57) and ground is now applied over lead 907, cable 815 (FIG. 56), lead 907 (FIG. 64), the front point of contact *j* of relay T1, lead 905, the back point of contact *l* of relay 3-TC (FIG. 65), lead 906, and through summing resistor 548 to input terminal *a* of the final summing amplifier 825.

In the example under consideration, the FNS lever (FIG. 56) is set to its normal position, and a coupling speed of 4 miles per hour is accordingly selected. Since, at this time, both relays SP and FP are released, a circuit extends from the positive terminal of battery 868 (FIG. 53), lead 879, the back point of contact *m* of relay 3-TC (FIG. 65), resistor 880, lead 881, over the back point of contact *a* of relay SP, back contact *a* of relay FP, and through the resistive element of potentiometer 827 to ground. The output appearing between the wiper of potentiometer 827 and ground is applied over the back point of contact *b* of relay FP, the back point of contact *b* of relay SP, lead 882, the back point of contact *n* of relay 3–TC (FIG. 65), lead 883, and through summing resistor 884 to input terminal *a* of amplifier 825.

The output appearing at terminal *c* of amplifier 825 is applied over lead 908 and through resistor 909 to input terminal *a* of square root summing amplifier 828. As previously described, a voltage will now appear between output terminal *c* of amplifier 828 and ground which is proportional to the square root of the input, and thus is proportional to $V_3$, the desired leaving speed from the group retarder. In the case under consideration, this speed might, for example, be 6.5 miles per hour.

The computed signal proportional to $V_3$ appearing at output terminal *c* of amplifier 828 is applied over lead 910, the back point of contact *c* of relay 3–TC (FIG. 54), lead 911, front contact *e* of relay CL4TP (FIG. 28), and lead 912 to input terminal *a* of electronic storage unit 1–GR2–ESU (FIG. 45). Capacitor 943 is accordingly charged as previously described.

When the cut occupies section 1–2GR1T (FIG. 28), relay R1TR is released and relay R1TP (FIG. 27) is picked up. Relay 7H in storage unit 1–2GR2–ESU is now picked up over a circuit extending from terminal B of the battery over front contact *f* of relay R1TP (FIG. 27), lead 984, terminal B of unit 1–2GR2–ESU, and through the winding of relay 7H to terminal N of the battery. With relay 7H picked up, the charging circuit for capacitor 943 is interrupted at the open back point of contact *b* of relay 7H and the capacitor is connected in series with resistor 946 in the feedback path of amplifier 941, over the front point of contact *b* of relay 7H. A signal proportional to the leaving speed $V_3$ is now available between output terminal *c* of storage unit 1–2GR2–ESU and ground.

As the cut enters section 1–2GR1T, contactor 779 (FIG. 28) will be actuated, opening its contact *a* once for each axle of the cut. Since the cut under consideration includes two cars, this action will be repeated for eight counts. Since relay 1–2GA1 in FIG. 43 is picked up, relay 1–2A1P in FIG. 56 will be picked up, and since relay 1–2GRAD is picked up, relay 1–2ADP in FIG. 56 will be picked up. Relay AZTP in FIG. 56 will be released eight times in succession, once for every actuation of contactor 779, as previously described.

As previously described, at each release of relay AZTP in FIG. 56, the drive winding of magnet AGMC of counter 1–2CC will be actuated. As the first four axles are counted, the *a*, *b*, *c* and *d* contacts of counter 1–2CC will be actuated and relay AGRS will be picked up. When relay AGRS picks up, counter 1–2CC will be reset, due to the energization of its reset winding, and the drive winding of magnet 2C1MC of units counter T2U will be energized, causing the *a* contacts of counter T2U to be picked up. This action will be repeated for the second four axles of the cut, at the end of which time both contacts *a* and contacts *b* of counter T2U will be picked up. The track fullness equipment is now in condition for use for a subsequent cut.

At the same time, the signal just described is made available to the charging circuit for the second section storage unit 1–2GR2–ESU over a circuit path extending from terminal *c* of unit 1–2GR1–ESU, leads 638 and 640, back contact *e* of relay R2TP (FIG. 30), and lead 642 to input terminal *a* of unit 1–2GR2–ESU.

At the same time, the output appearing at terminal *c* of storage unit 1–2GR1–ESU is applied over leads 638 and 639, front contact *e* of relay R1TP (FIG. 27), and lead 641 to input terminal *a* of speed control unit 50 (FIG. 28).

The output appearing at terminal *a* of radar velocity meter 26 (FIG. 28) is applied over lead 635, lead 636, front contact *d* of relay R1TP, and lead 637 to input terminal *b* of speed control unit 50. Speed control unit 50 now functions as previously described to energize either its terminal *e*, to cause intake magnet 1HMM in pressure control unit 1–2GR1 (FIG. 29) to be actuated, or to cause its terminals *f* and *g* to be energized to actuate exhaust magnets 1X1M and 1X2M in parallel.

The first section of the group retarder is now maintained between 75 and 82 p.s.i. as long as terminal *e* of speed control unit 50 is energized, or is reduced to any pressure necessary if terminals *f* and *g* of the speed control unit are energized, as previously described. The second section will be maintained between 63 and 70 p.s.i. at this time by the action of Bourdon tube 686 (FIG. 31), unless the pressure in the first section is brought down below 35 p.s.i. for any reason, causing back contact *b* of Bourdon tube 612 (FIG. 29) to close, in which case the second section will be maintained between 30 and 37 p.s.i. by the action of Bourdon tube 685 (FIG. 31).

When the cut occupies section 1–2GR2T (FIGS. 30 and 31), relay R2TR will release and relay R2TP will pick up. Relay 1–2RC will pick up (FIG. 28) and the weight information stored in relays 1–2RL1 and 1–2RH1 (FIG. 29) will be transferred to relays 1–2RL2 and 1–2RH2 in FIG. 30 as previously described. The input circuit to the second section $V_3$ storage unit 1–2GR2–ESU will be interrupted at the open back point of contact *e* of relay R2TP (FIG. 30). Also, relay 8H in this unit will be picked up over front contact *h* of relay R2TP and lead 643.

The output appearing at terminal *c* of storage unit 1–2GR2–ESU is now applied over lead 649, front contact *g* of relay R2TP, and lead 645 to input terminal *a* of speed control unit 51 (FIG. 31). At the same time, the output appearing at terminal *a* of radar velocity meter 52 is applied over lead 986, front contact *f* of relay R2TP, and lead 987 to input terminal *b* of speed control unit 51. Speed control unit 51 will now respond, and may energize its intake terminal *e* or its exhaust terminals *f* and *g* as previously described, but will not yet assume control of the cut.

During the time both section 1–2GR1T and section 1–2GR2T are occupied by the cut, the second section will be controlled from the first section speed control unit 50 in the manner previously described. The first section will continue to be controlled by the first section speed control unit as long as it is occupied.

With the cut under consideration, which is 100 feet in length, section CL4T will be vacated before detector track section 1–2T is occupied. When this occurs, relay CL4TR will pick up, relay CL4TP will release, relay GAEC will pick up, and previously traced input circuits to relays 1–2RL1 and 1–2RH1 will be broken, although these latter relays will remain up over contact *b* of relay R1TP. Relays CLA, CLB and CLC will release, and relays 1–TC, 2–TC and 3–TC in the computer will pick up.

At this time, relay 1–2GRADP in the A bank of the 1–2 phantom location (FIG. 43) will be held up and over its previously traced circuit including front contact *c* of relay 1–2GRAD and its own front contact *b*. With relay 1–2GRADP up and relay CL4TP released, both of the previously traced stick circuits for relay 1–2GRAD are interrupted, and at the end of its predetermined time delay period, relay 1–2GRAD will release.

With relay 1–2GRAD released, relays 1–2GA1, A3TAC, ALP, AHP, A1V and A1VL in the A bank of the 1–2 phantom location (FIGS. 43 and 54) will be released. Relay 1–2ART3 in FIG. 44, and relays CLVP, 21–RLP and 21–RHP in FIG. 50 will be released, relays L2 and L5 in FIGS. 62 and 63 will be released, relays 2CL1, 2CL2, 5CL1 and 5CL2 in FIGS. 62 and 63 will be released, relay T1 in FIG. 53 will be released, relays 22–RLP and 22–RHP in FIG. 54 will be released, and relays 1–2A1P and 1–2ADP in FIG. 56 will be released. The computer is now in its initial condition except that two car lengths have been subtracted from the available distance $D_{4,5}$ in the track fullness equipment for track 2.

As soon as relay CL4TP is released, the energizing circuit for relay 1–2CA (FIG. 28) is interrupted. At the end of its predetermined time delay period, relay 1–2CA is released and the computer is checked for its solution of the test problem, as previously described. Section 1–2T will be occupied before section 1–2GR1T is vacated. When this occurs, track relay 1–2TR will release, interrupting the previously traced circuit of relay 1–2AD in the A bank of the 1–2 storage unit. At the end of its predetermined time delay period, relay 1–2AD will accordingly be released and cause relay 1–2A1 to be released. The automatic switching portion of the apparatus is now in its initial condition.

When section 1–2GR1T is vacated, the first section of the group retarder is restored to its standby condition as previously described. The second section will now be controlled from the second section speed control unit 51 as previously described.

When the cut vacates section 1–2GR2T, the second setcion of the group retarder will be restored to its initial condition in the manner previously described. The apparatus will then be in its initial condition.

While we have described the operation of our apparatus as a whole for only a single cut, it will be apparent from the previous description of the apparatus that as each location becomes vacated by a cut, it is made available for use by a following cut. Accordingly, cuts may be continuously humped in a yard constructed in accordance with this embodiment of our invention, the only requirement being that the cuts must be separated by at least 58 feet in order to prevent a track section from being occupied by a following cut before it is vacated by a preceding cut.

While we have described only one embodiment of our invention in detail, it will be apparent to those skilled in the art after reading our description that many changes and modifications could be made within the scope of our invention. Accordingly, we do not wish to be limited to the details shown, but only by the scope of the following claims.

Having thus described our invention, what we claim is:

1. In an automatic control system for a classification yard having a hump, a straight first section of track of predetermined grade following the hump, a master retarder following said first section, a curved second section of track of predetermined length following said master retarder, a group retarder following said second section, a curved third section of track of known curvature, grade and length following said group retarder, and a straight section of body track of known grade following said third section, the length of said body track section depending on the number of cars stored therein, the combination comprising, means for measuring the acceleration of a cut rolling from the hump in said first section, means responsive to said acceleration measuring means and the grade of said first section for producing a signal proportional to the tangent track rolling resistance of the cut, means for measuring the weight of the cut, means for measuring the speed of the cut in the master retarder, speed control means adapted to be connected to said master retarder and responsive to said speed and weight measuring means to control the speed of the cut leaving the master retarder to a desired value, means for measuring the length of the cut, means for measuring the speed of the cut approaching the group retarder; first computer means responsive to said last mentioned speed measuring means, said cut length measuring means, said weight measuring means, and the grade and length of said second section for producing a signal proportional to the curved track rolling resistance of the cut in said second section; means for counting the number of cars in said body track and computing a signal proportional to the effective length of said body track; second computer means controlled by said effective length signal, said tangent track rolling resistance signal, said curved track rolling resistance signal, the grade of said body track, the grade of said third section, the length of said third section, and a selected coupling speed to produce a signal proportional to the leaving speed at which the cut should be released from the group retarder in order to couple with preceding cars on the body track section at said selected coupling speed; means for measuring the speed of the cut in the group retarder, and speed control means adapted to be connected to the group retarder and responsive to the signal produced by said second computer means, said weight measuring means, and said least mentioned speed measuring means to control the speed of the cut leaving the group retarder to the computed leaving speed.

2. Control apparatus for a classification yard of the type having a plurality of body tracks approached by stretches of track including curved portions diverging from a common hump track over routes controlled by switches located at the points of divergence, a stretch of tangent track common to all of said routes, and a plurality of group retarders each located on a stretch of track common to a group of said routes, each body track having a curved portion and a tangent portion, said apparatus comprising, an automatic switching system including control means for transferring predetermined route information for each cut along its preselected route in advance of the cut and means for positioning the switches along the route in advance of the cut, means for measuring the rolling resistance of each cut on said common stretch of tangent track and producing a signal in accordance therewith, a plurality of storage means for said signals, means for supplying each of said signals to a selected one of said storage means and producing a signal identifying the selected storage means, means governed by said control means for transferring each of said identifying signals along the preselected route for its associated cut with the route information for the cut to a switch location in advance of the group retarder in the preselected route, means for measuring the curved track rolling resistance of each cut on the curved portion of the stretch of track approaching the group retarder on its preselected route, computer means associated with each group retarder for calculating the desired leaving speed from the group retarder to couple each cut with preceding cars on the body track terminating its preselected route in accordance with the curved and tangent track rolling resistance of the cut and the characteristics of the selected body track, means for operatively connecting the curved track rolling resistance means to said computer means, means associated with each group retarder and controlled by the storage identifying signals stored at the switch location in approach of the group retarder for operatively connecting the selected tangent track rolling resistance storage unit for each cut to the computer means, and means for controlling the group retarders in accordance with the difference between the speed of each cut and the desired leaving speed calculated by said computer means.

3. Control apparatus for a classification yard having a plurality of body tracks approached by stretches of track diverging from a common hump track in routes controlled by switches and retarders located along said routes, said apparatus comprising, in combination, first means for measuring the tangent track rolling resistance of cuts rolling in said yard along one portion of their respective routes, second means for measuring the curved track rolling resistance of the cuts along another portion of their routes, storage means connected to said first means for storing the measured value of tangent track rolling resistance for each cut, computing means associated with said retarders and adjustable in accordance with the physical characteristics of each route to compute the leaving speed from the retarders necessary for each cut to couple at a preselected velocity with preceding cars on a preselected route in accordance with applied values of tangent and curved track rolling resistance for the cut, switching means for setting switches in advance of each cut in accordance with predetermined routes, means for supplying route information for each cut to said switching means, coordinating means responsive to the route supplied to said switching means for each cut for simultaneously connecting said storage means and said second means to the computing means associated with the retarder in the route, means associated with each retarder for measuring the speed of cuts therein, and control means for each retarder responsive to the difference between said measured speed and the leaving speed calculated by said computing means for reducing the speed of each cut to its calculated leaving speed.

4. In a control system for supervising the transfer of cuts of one or more cars from a hump track to preselected body tracks in a classification yard of the type having a first stretch of tangent track following the hump track, a master retarder following said tangent stretch, a first plurality of curved stretches of track leading from the master retarder to a plurality of group retarders over routes controlled by switches, and a second plurality of stretches of track leading from said group retarders to a plurality of body tracks over routes controlled by switches, the route from each group retarder to the point of coupling on each body track including a curved portion and a tangent portion of a length determined by the number of cars stored on the particular body track, the combination comprising, speed responsive means for producing a signal in accordance with the speed of cuts in said first section, differentiating means connected to said measuring means for producing a signal in accordance with the acceleration of cuts in said first section, means adjustable in accordance with the grade of said first section and connected to said differentiating means for producing a signal in accordance with the rolling resistance of cuts in said first section, a first plurality of storage means, each having an available empty condition and an unavailable condition in which information is being stored, means for selecting an available one of said storage means for each cut and connecting it to said adjustable means to store said rolling resistance signal, means controlled by said selecting means for producing a signal identifying the selected storage means for each cut, a second plurality of storage means associated with points along the routes from the master retarder to the group retarders, storage means associated with the group retarders, means for storing said identifying signal for each cut in one of said second plurality of storage means associated with a point in advance of the cut, means for transferring said signal to successive storage units of said second plurality along the route of each cut in advance of the cut, means for transferring said signal to said storage means associated with the group retarder in the route of each cut, first computing means for producing a signal proportional to the curved track rolling resistance of each cut in the curved stretch of track of said first plurality in the route of each cut, interrogating means connected to the storage means associated with the group retarder in the route of each cut and responsive to the identifying signal for each cut to interrogate the selected storage means of said first plurality and produce a signal proportional to the tangent track rolling resistance of the cut, means for determining the number of cars stored on the body track in the route of each cut and producing a signal in accordance with the remaining length of it on said body track; second computer means for calculating the leaving speed from the group retarder, necessary for each cut to couple with preceding cars on the body track in its route at a selected velocity, in dependence on the length and grade of said curved and tangent stretches in the route from the group retarder to the point of coupling on the body track in the route of the cut and the tangent and curved track rolling resistance of the cut; means responsive to the approach of each cut to the group retarder in its route for applying the signals from said interrogating means, said first computing means and said length measuring means to said second computer means whereby the signal from said second computer means represents the necessary leaving speed for the cut; and means for controlling the retarder in accordance with the signal from the second computer means and the speed of the cut in the group retarder to reduce the speed of the cut to said necessary leaving speed.

5. Apparatus for controlling the coupling speed of a railway car with another car standing on a stretch of tangent track approached by a stretch of curved track, comprising, in combination, a car retarder located at the entrance of said curved stretch, means for controlling the braking force exerted by said car retarder, means for measuring the speed of each car in said retarder, means for measuring the rolling resistance of each car on tangent track, means for measuring the rolling resistance of each car on curved track, means adjustable in accordance with the desired speed of coupling of each car, means controlled by said rolling resistance measuring means and said adjustable means for computing the leaving speed of each car from said retarder necessary to couple at said desired speed, and means responsive to the combined outputs of said computing means and said speed measuring means for actuating said braking force controlling means to reduce the speed of each car to its computed leaving speed.

6. Control apparatus for a classification yard having a plurality of storage tracks divided into groups, each group being approached through a master retarder and one of a plurality of group retarders, each storage track being located on a route from a hump track including, in sequence, a first stretch of tangent track of a first length, said master retarder, a first stretch of curved track of a second length including a plurality of track sections, one of said group retarders, and a second stretch of curved track of a third length, said storage track comprising a fourth stretch of tangent track of a fourth length, said apparatus comprising, in combination, means for measuring the tangent track rolling resistance of each cut of cars traversing said first length of tangent track, means for measuring the weight per axle of each cut of cars traversing said first length of tangent track, means controlled by said weight measuring means for controlling the braking force applied by said master retarder to reduce the leaving speed of each cut from the master retarder to a value in accordance with the weight, means responsive to the sequence of occupancy and vacancy of each of said plurality of track sections for measuring the length of cuts traversing said sections to determine the effective lengths of said second stretches, means for measuring the speed of cuts approaching the exit end of each of said second stretches; means controlled by said length measuring means, said weight measuring means, and said speed measuring means for computing the curved track rolling resistance of each cut; means for measuring the effective length of said fourth stretches of track in accordance with the number of cars stored thereon; computer means controlled by said curved track rolling resistance computing means, said tangent track rolling resistance measuring means, said weight measuring means, and said last mentioned effective length measuring means for computing the speed at which each cut must leave the group retarder in its route to reach the effective end of its storage track at a predetermined speed; and means associated with each group retarder and controlled by said computer means for controlling the braking force exerted by said group retarders to reduce the speed of each car to its computed leaving speed.

7. Apparatus of the class described, comprising, in combination, a stretch of track in a classification yard including, in sequence, a first stretch of tangent track including an approach track section, a master retarder having at least one track section, a first stretch of curved track including a first plurality of switch detector track sections and a plurality of cut- length measuring track sections of predetermined lengths, a group retarder having at least one track section, a second stretch of curved track including a second plurality of switch detector track sections, and a relatively straight stretch of storage track, all of said detector track sections including switches, said stretch forming a continuous route when said switches are set in normal or reverse positions in a pattern characteristic of the stretch, detecting means associated with each of said track sections and actuated to a first or a second of two conditions in accordance with the occupied or unoccupied condition of its associated section, acceleration measuring means for measuring tangent track rolling resistance, means controlled by said detecting means for said approach section for actuating said acceleration measuring means to measure the tangent track rolling resistance of a cut occupying said approach section, a first plurality of storage means, means controlled by said approach section detecting means and said acceleration measuring means for storing a value in accordance with said measured tangent track rolling resistance in a selected one of said storage means, means for generating a code identifying said selected storage means, weight measuring means located adjacent the entrance of said master retarder track section for measuring the weight of cuts entering said section, means controlled by said weight measuring means for controlling the braking force exerted by said master retarder to reduce the speed of cuts traversing said retarder to a value in accordance with the weight of each cut, storage means associated with each of said detector track sections, control means for each storage means actuated by the detector means in the occupied condition of the associated detector track section for transferring information stored in said storage means to the storage means associated with the next adjacent detector track section, means for storing route information in the storage means associated with the first of said switch detector track sections; means controlled by the occupancy of said first switch detector track section for storing said route, said measured weight and said storage means identifying code in the second of said detector track section storage means; means actuated when the first of said cut length measuring track sections is vacated to generate a code in accordance with the number of the remainder of said cut length sections which are occupied to measure the length of each cut, storage means associated with said group retarder; means controlled by the occupancy of the last of said switch detector track sections ahead of said group retarder for transferring the weight, storage means identifying code and route stored in the storage means associated with said detector section to said group retarder storage means; speed measuring means controlled by the detector means for the last of said cut length measuring track sections to measure the speed of each cut in approach to said group retarder; means controlled by said speed measuring means, the weight information stored in said group retarder storage means, and said cut length code to generate a signal in accordance with the curved track rolling resistance of each cut; means located at a point on said route and controlled by the wheels of each cut passing said point for counting the number of cars passing said point, multiplying means controlled by said counting means to a condition indicative of the remaining unoccupied length of said storage track, means controlled by the detector means for said last cut length track section and said storage means identifying code for interrogating the storage means selected by said code to produce a signal in accordance with the stored value, means responsive to the route stored in said group retarder storage means for modifying said stored value in accordance with the grade of said storage track, means for connecting said modified stored value to said multiplying means, second multiplying means for modifying said curved track rolling resistance in accordance with the length of said second stretch of curved track, means for producing a signal in accordance with the square of the desired coupling speed of each cut in said storage track, means for combining said squared signal and the outputs of said multiplying means to generate a signal in accordance with the desired leaving speed of each cut from said group retarder, and means for controlling the braking force exerted by said group retarder to reduce the speed of each cut to its desired leaving speed.

8. Control means for a classification yard having a master retarder approached through a first stretch of tangent track, a group retarder having its entrance end approached from the exit end of the master retarder by a first stretch of curved track, and a storage track comprising a second stretch of tangent track connected to the exit end of said group retarder by a second curved stretch of track, comprising, in combination, means associated with said first stretch for producing a signal in accordance with the tangent track rolling resistance of cuts traversing said first stretch, weighing means adjacent the entrance end of said master retarder for weighing each cut entering said master retarder, means controlled by said weighing means for controlling the braking force exerted by said master retarder to reduce the leaving speed of each cut from the master retarder to a value in accordance with its weight, means associated with said first stretch of curved track for measuring the length of each cut approaching the group retarder, means located in advance of said group retarder for measuring the speed of each cut approaching the group retarder; first computing means controlled by said weighing means, said cut length measuring means and said speed measuring means for generating a signal in accordance with the curved track rolling resistance of each cut; means for measuring the free rolling distance in said second stretch of tangent track; second computing means controlled by said first computing means, said tangent track rolling resistance signal, said weighing means, and said distance measuring means to produce a signal in accordance with the desired leaving speed of each cut from said group retarder; and control means actuated by said second computing means for controlling the braking force exerted by said group retarder to reduce the leaving speed of each cut to the desired speed.

9. Apparatus for controlling the leaving speed of a railway car from a car retarder, the exit end of said car retarder being connected to a stretch of track having curved portions and straight portions on which cars are stored, comprising, in combination, means for measuring the weight of each cut approaching said retarder, means for measuring the tangent track rolling resistance of each cut approaching said retarder, means for measuring the curved track rolling resistance of each cut approaching said retarder, means for measuring the distance each car must travel on said stretch of track in dependence on the number of cars stored on said track, means controlled by all said measuring means for computing the leaving speed of each cut from said retarder necessary for the cut to couple with the preceding cars on said stretch of track at a predetermined velocity, and means for controlling the braking force exerted by said retarder to reduce the speed of each cut to said computed leaving speed.

10. In an automatic classification yard, in combination, a group of storage tracks, each approached over a route including a master retarder and a group retarder, the portion of the route from the group retarder to each storage track comprising a curved stretch of track and a straight stretch of track, said master retarder being approached by a straight stretch of track common to all of said routes, the route from said master retarder to each group retarder comprising a first curved stretch of track, means for controlling the braking force exerted by said master retarder to reduce the speed of each cut to a first speed, means for measuring the speed of each cut in approach to the group retarder in its route, means for computing the curved track rolling resistance of each cut in dependence on said first speed and on said measured speed, means for measuring the tangent track rolling resistance of each cut on said stretch of track approaching said master retarder, means for computing the leaving speed for each cut from the group retarder in its route in dependence on said rolling resistance values, and means for controlling the braking of each of said group retarders to control the leaving speed of each cut from the group retarder in its route to its computed leaving speed.

11. Apparatus of the class described, comprising, in combination, a stretch of railway track of predetermined shape, length and grade, a car retarder located at the entrance end of said stretch, means for measuring the tangent track rolling resistance of a cut of cars approaching said retarder, means for measuring the curved track rolling resistance of the cut, computing means responsive to both said measuring means for computing the speed at which the cut should enter said stretch to emerge at a predetermined speed, and means actuated by said computing means for controlling the braking force exerted by said retarder to reduce the speed of said cut to said computed speed.

12. In an automatic control system for a classification yard having a straight first section of track of predetermined grade, a master retarder following said first section, a curved second section of track of predetermined length following said master retarder, a group retarder following said second section, a curved third section of track of known curvature, grade and length following said group retarder, and a straight section of body track of known grade and length following said third section, the combination comprising, means for measuring the acceleration of a cut of cars rolling in said first section, means responsive to said acceleration measuring means and the grade of said first section for producing a signal proportional to the tangent track rolling resistance of the cut, means for measuring the weight of the cut, means for measuring the speed of the cut in the master retarder, speed control means operatively connected to said master retarder and responsive to said speed and weight measuring means to control the speed of the cut leaving the master retarder to a desired value, means for measuring the length of the cut, means for measuring the speed of the cut approaching the group retarder; first computer means responsive to said last mentioned speed measuring means, said cut length measuring means, said weight measuring means, and the grade and length of said second section for producing a signal proportional to the curved track rolling resistance of the cut in said second section; second computer means controlled by said tangent track rolling resistance signal, said curved track rolling resistance signal, the grade of said body track, the grade of said third section, the length of said body track, and a selected speed to produce a signal proportional to the leaving speed at which the cut should be released from the group retarder in order to reach the end of said body track at said selected speed; means for measuring the speed of the cut in the group retarder, and speed control means operatively connected to the group retarder and responsive to the signal produced by said second computer means, said weight measuring means, and said last mentioned speed measuring means to control the speed of the cut leaving the group retarder to the computed leaving speed.

13. Control apparatus for a classification yard of the type having a plurality of body tracks approached by stretches of track including curved portions diverging from a common hump track over routes controlled by switches located at the points of divergence, a stretch of tangent track common to all of said routes, and a plurality of group retarders each located on a stretch of track common to a group of said routes, each body track having a tangent portion approached from the group retarder in its route by a curved stretch of track, said apparatus comprising, means for storing a route code for each cut, said code having a component for each switch in the route of the cut, information transfer means for transferring said code components sequentially to storage means associated with the switches in said route in advance of the cut, means controlled by said code components for positioning each switch in said route in advance of the cut, radar speed measuring means located on said stretch of tangent track for generating a signal in accordance with the speed of each cut, differentiating means controlled by said speed measuring means for generating a signal in accordance with the acceleration of each cut, means adjustable with the grade of said tangent stretch and controlled by said acceleration signal to produce a signal in accordance with the tangent track rolling resistance of each cut, a plurality of storage means for said rolling resistance signals, means for supplying each of said signals to a selected one of said storage means, means for producing a code identifying the selected storage means, means governed by said information transfer means for transferring said identifying code along the preselected route for its associated cut with the route code components for the cut to a switch storage location in advance of the group retarder in the preselected route, means for measuring the curved track rolling resistance of each cut on the curved portion of the stretch of track approaching the group retarder in its preselected route and producing a signal in accordance therewith, computer means associated with each group retarder for calculating the desired leaving speed from the group retarder to couple each cut with preceding cars on the body track terminating said selected route, in accordance with said rolling resistance signals and the characteristic of the selected body track, means for operative connecting the curved track rolling resistance means to said computer means, means associated with each group retarder and controlled by the storage identifying code stored at the switch location in approach of the preselected group retarder for operatively connecting the selected tangent track rolling resistance storage unit for each cut to the computer means, and means for controlling the group retarder in accordance with the difference between the speed of each cut and the desired leaving speed calculated by said computer means.

14. Control apparatus for a classification yard having plurality of storage tracks divided into groups, each group being approached through a master retarder and one of a plurality of group retarders, each storage track being located on a route from a stretch of track of descending grade including, in sequence, a first stretch of tangent track of a first length, said master retarder, a first stretch of curved track of a second length, one of said group retarders, and a second stretch of curved track of a third length, said storage track comprising a fourth stretch of tangent track of a fourth length, said apparatus comprising, in combination, means for measuring the tangent track rolling resistance of each cut of cars traversing said first stretch of tangent track, means for measuring the weight per axle of each cut of cars traversing said first stretch of tangent track, means controlled by said weight measuring means for controlling the braking force applied by said master retarder to reduce the leaving speed of each cut from the master retarder to a value in accordance with the weight, means controlled by the length of each cut for determining the effective lengths of said second stretches, means for measuring the speed of cuts approaching the exit end of each of said second stretches; means controlled by said length controlled means, said weight measuring means, and said speed measuring means for computing the curved track rolling resistance of each cut; means for measuring the effective length of said fourth stretches of track in accordance with the number of cars stored thereon; computer means controlled by said curved track rolling resistance computing means, said tangent track rolling resistance measuring means, said weight measuring means, and said last mentioned effective length measuring means for computing the speed at which each cut must leave the group retarder in its route to reach the effective end of its storage track at a predetermined speed; and means associated with each group retarder and controlled by said computer means for controlling the braking force exerted by said group retarders to reduce the speed of each car to its computed leaving speed.

15. Apparatus for causing a railway car to arrive at a designated point on a stretch of track with a predetermined velocity, comprising, in combination, means for measuring the weight of the car, means for measuring the rolling resistance of the car on straight portions of the said stretch, means for measuring the rolling resistance of the car on curved portions of said stretch, means for measuring the distance the car must travel on said stretch to reach said point, means adjustable in accordance with the characteristics of said stretch, means controlled by said measuring means and said adjustable means for computing the speed at which said car must enter said stretch to reach said point at said predetermined velocity, means for causing said car to approach said stretch at a speed in excess of said computed speed, and means controlled by said computing means for reducing the speed of said car entering said stretch to said computed leaving speed.

16. The method of sorting cars in a gravity operated classification yard, comprising the steps of measuring the tangent track rolling resistance of cars entering said yard, measuring the weight of each car, reducing the speed of each car to a predetermined value selected in accordance with its weight, releasing each car at said predetermined speed into a stretch of curved track of predetermined length, measuring the speed of each car at the end of said stretch, measuring the free rolling distance of each car in said stretch; computing the curved track rolling resistance of each car in said stretch in dependence on the weight of said car, said predetermined speed, said free rolling distance, and said measured speed; calculating the leaving speed of each car from a predetermined point in said yard necessary to reach the destination for the car at a desired terminal velocity in dependence on said tangent and curved track rolling resistance values, and controlling the leaving speed of each car to said calculated value.

17. That method of controlling the classification of cars in a gravity classification yard having a master retarder and a plurality of group retarders, a plurality of switches for establishing routes from said master retarder through each of said group retarders, and a plurality of storage tracks for each group retarder connected thereto over routes determined by the settings of a second plurality of switches, which comprise the steps of measuring the rolling resistance of each cut of cars in approach to said master retarder over a stretch of tangent track, measuring the weight of each cut in approach to said master retarder, controlling the master retarder to reduce the speed of each cut to a predetermined value determined in accordance with said measured weight, measuring the length over which each cut is free rolling between the master retarder and the group retarder in its selected route, measuring the speed of each cut in approach to the group retarder in its selected route; computing the curved track rolling resistance of each cut in dependence on said predetermined speed, said measured speed, said measured length, and said measured weight; computing the exit speed from the group retarder necessary for each cut to reach its destination on the body track in its route in accordance with said measured rolling resistance and said computed rolling resistance, and controlling each group retarder to reduce the speed of each cut passing therethrough to its computed leaving speed.

18. The method of controlling a gravity classification yard having a hump, a straight first section of track of predetermined length and grade following the hump, a master retarder following said first section, a curved second section of track of predetermined length following said master retarder, a group retarder following said second section, a curved third section, and a straight body track section of a length depending on the number of cars stored therein, the steps comprising, measuring the acceleration of a cut rolling from the hump in said first section, producing a signal in accordance with said measured acceleration and the grade of said first section proportional to the tangent track rolling resistance of the cut, measuring the weight of the cut, measuring the speed of the cut in the master retarder, controlling the braking force exerted by said master retarder in accordance with said measured speed and weight to reduce the speed of the cut leaving the master retarder to a predetermined value depending on the weight, measuring the length of the cut, measuring the speed of the cut approaching the group retarder, producing a signal proportional to the curved track resistance of the cut in said second section in accordance with said measured speed approaching said group retarder, said measured length, said measured weight and the grade and length of said second section, counting the number of cars in said body track and computing a signal proportional to the remaining length of said body track, computing a signal proportional to the leaving speed at which the cut should be released from the group retarder in order to couple with preceding cars on the body track section at a selected coupling speed in accordance with said computed length signal, said tangent track rolling resistance, said curved track rolling resistance, the grade of said body track, the grade and length of said third section, and said selected coupling speed; measuring the speed of the cut in the group retarder, and controlling said group retarder in accordance with said weight, said computed leaving speed, and said measured speed in said group retarder to reduce the speed of said cut to said computed leaving speed.

19. A method of operating a classification yard of the type having a plurality of body tracks approached by stretches of track including curved portions diverging from a common hump track over routes controlled by switches located at the points of divergence, a stretch of tangent track common to all of said routes, and a plurality of group retarders each located on a stretch of track common to a group of said routes, each body track having a curved portion and a tangent portion, comprising the steps of transferring predetermined route information for each cut along the preselected route in advance of the cut, measuring the rolling resistance of each cut on said common stretch of tangent track, producing a signal in accordance with said rolling resistance, storing said signal in one of a plurality of storage means, producing a signal identifying said storage means, transferring each of said identifying signals along the preselected route for its associated cut together with the route information for the cut to a switch location in approach of the group retarder in the preselected route, measuring the curved track rolling resistance of each cut in the curved portion of the stretch of track approaching the group retarder on its preselected route, supplying said curved track rolling resistance measurement to a computer, interpreting said identifying signal to locate said storage means, connecting said stored tangent rolling resistance value for each cut to said computer, operating the computer in accordance with the curved and tangent track rolling resistance of the cut and the characteristics of the selected body track to compute the desired leaving speed from the group retarder necessary to couple each cut with preceding cars on the body track terminating its preselected route at a selected coupling speed, and controlling the group retarders in accordance with the difference between the speed of each cut and the desired leaving speed calculated by said computer means.

20. A method for controlling a classification yard of the type having a plurality of body tracks approached by stretches of track diverging from a common hump track in routes controlled by switches and retarders located along the routes, comprising the steps of measuring the tangent track rolling resistance of cuts rolling in said yard along a tangent stretch of track common to their respective routes, measuring the curved track rolling resistance of the cuts along a curved portion of their routes, storing the measured value of tangent track rolling resistance for each cut, setting the switches in said yard in advance of each cut in accordance with predetermined routes, supplying route information for each cut to the switch setting means, simultaneously connecting said stored value of tangent track rolling resistance and said measured value of curved track rolling resistance to a computer associated with the retarder in the route of each cut, adjusting the computer in accordance with the characteristics of each route, operating said computer in accordance with said adjustment and said rolling resistance values to compute the leaving speed from the associated retarder necessary for each cut to couple with preceding cars at a preselected velocity, measuring the speed of cars in the retarder, and controlling the braking force exerted by the retarders in accordance with the difference between said measured speeds and said computed leaving speeds to reduce the speed of each cut to its computed leaving speed.

21. The method of controlling the coupling speed of a railway car with another car standing on a stretch of tangent track approached by a stretch of curved track which comprises the steps of directing the car through a car retarder located at the entrance of said curved stretch, measuring the speed of said car in said retarder, measuring the rolling resistance of the car on a stretch of tangent track located in the approach to said retarder, measuring the rolling resistance of the car on a stretch of curved track located in the approach to said retarder, computing the speed at which said car should leave said retarder in order to couple at a predetermined speed in accordance with said measured rolling resistances, and controlling the braking force exerted by said retarder in accordance with the difference between said measured speed and said computed speed to reduce the speed of the car to its computed leaving speed.

22. The method of controlling a railway car to cause it to arrive at a designated point on a stretch of track at a predetermined speed, comprising the steps of supplying energy to said car in an amount in excess of that required to reach said point at said predetermined speed, measuring the weight of the car, measuring the rolling resistance of the car on straight portions of said stretch, measuring the rolling resistance of the car on curved portions of said stretch, measuring the distance the car must travel on said stretch to reach said point, calculating in dependence on all said measurements the amount by which said energy should be reduced for said car to reach said point at said predetermined velocity, and reducing the energy of said car by said calculated amount.

23. Apparatus for computing the leaving speed of a railway car from a car retarder located at the entrance end of a track route comprising a first curved stretch and a first straight stretch of predetermined lengths and grades, comprising, in combination, means responsive to the acceleration of the car in a second straight stretch of track of known grade for producing a signal in accordance with the rolling resistance of said car in said second stretch, means adjustable in accordance with the grade in said first stretch of straight track and controlled by said rolling resistance signal for producing a signal in accordance with the difference between said grade and said rolling resistance, means responsive to said difference signal and adjustable in accordance with the length of said first straight stretch for producing a signal in accordance with the product of said length and said difference, means for generating a signal in accordance with the square of the desired terminal velocity of said car in said first straight stretch, means for generating a signal in accordance with the rolling resistance of said car on a second stretch of curved track of known length and grade, means for correcting said curved track rolling resistance signal in accordance with the curvature and grade of said first stretch of curved track, means for multiplying said corrected curved track rolling resistance signal by a factor proportional to the length of said first stretch of curved track to produce a second product signal, summing means controlled by said product signals and said square signal for producing a signal in accordance with the algebraic sum thereof, and means controlled by said last mentioned signal for generating an output signal in accordance with the desired leaving speed of said car from said retarder.

24. Apparatus for computing the leaving speed of a railway car from a car retarder located at the entrance end of a stretch of track comprising a first curved stretch of known grade and length and a first straight storage stretch of known grade and having a length depending on the number of cars stored therein, said apparatus comprising, in combination, means for measuring the acceleration of the car on a second stretch of straight track of known grade, means for generating a signal in accordance with the grade of said second stretch, summing means for producing a signal in accordance with the difference between said grade and said acceleration, means for generating a signal in accordance with the difference in the effect of wheel inertia on the behavior of said car in said first and second straight stretches, means for subtracting said difference signal from the sum of said inertia signal and a signal proportional to the grade of said first stretch of straight track, means responsive to the number of cars routed through said retarder for generating a signal in accordance with the product of the remaining length of said first stretch of straight track and the output of said summing means, means for producing a signal in accordance with the square of the desired coupling speed of said car with the preceding cars on said first stretch of straight track, means for producing a signal in accordance with the rolling resistance of said car in said first stretch of curved track in dependence on its behavior in a second stretch of curved track of known characteristics, means adjustable in accordance with the grade of said first curved stretch and controlled by said curved track rolling resistance signal for producing a signal in accordance with the difference between said grade and said rolling resistance of said car on said first stretch of curved track, means adjustable in accordance with the length of said first stretch of curved track and controlled by said last mentioned signal for producing a signal in accordance with the product of said length of said first curved stretch and said signal, summing means controlled by said square signal and said product signals for generating a signal in accordance with the difference between said square signal and the sum of said product signals, and square root computing means controlled by said last mentioned summing means for producing a signal in accordance with the desired leaving speed of said car from said retarder.

25. In a computer for predicting the leaving speed of a railway car from a car retarder located at the entrance end of a stretch of track comprising a first stretch of curved track followed by a second stretch of tangent storage track, said first stretch being of known length and grade and said second stretch being of known grade and having a length depending on the number of cars stored therein, said leaving speed to be determined so as to permit the car to couple with the preceding cars at a predetermined velocity, in combination, means for producing a first signal in accordance with the difference between the grade of said second stretch and the rolling resistance of said car in said stretch, multiplying means adjustable in accordance with the number of cars routed to said second stretch and controlled by said first signal for producing a second signal in accordance with the negative product of the remaining length of said second stretch and said first signal, means for producing a third signal in accordance with the difference between the grade of said first stretch and the rolling resistance of said car in said first stretch, multiplying means adjustable in accordance with the length of said first stretch and controlled by said third signal to produce a fourth signal in accordance with the negative product of the grade of said first stretch minus the rolling resistance of said car in said first stretch times the length of said first stretch, means for generating a fifth signal in accordance with the square of the desired coupling speed, means for generating a sixth signal in accordance with the algebraic sum of said second, fourth and fifth signals and square root computing means controlled by said sixth signal for producing a seventh signal representative of said leaving speed in accordance with the square root of said sixth signal.

26. Control apparatus for a classification yard comprising in sequence a first stretch of straight track, a second stretch of curved track, a car retarder, a third stretch of curved track, and a fourth stretch of straight track, said apparatus comprising, in combination, means for measuring the rolling resistance of a car in said first stretch, means controlled by said measuring means for generating a first signal in accordance with said measurement, means for generating a second signal in accordance with the grade difference between said first and said fourth stretch and the weight of the wheels of said car, means for producing a third signal in accordance with the difference between said first and second signals, means for producing a fourth signal in accordance with the product of said third signal and a signal determined by the length of said fourth stretch, means for generating a fifth signal in accordance with the rolling resistance of the car on said second stretch, means controlled by said fifth signal and adjusted in accordance with the relative characteristics of said second and third stretch and the grade of said third stretch for producing a sixth signal in accordance with the difference between the grade of said third stretch and the rolling resistance of said car in said third stretch, means for multiplying said sixth signal by a factor proportional to the length of said third stretch to produce a seventh signal, means for subtracting the sum of said fourth and seventh signals from an eighth signal generated in accordance with the square of the desired terminal velocity of said car in said fourth stretch, square root computing means controlled by said subtracting means for producing a ninth signal in accordance with the square root of the output thereof, and means for controlling said retarder while occupied by said car in accordance with said ninth signal.

27. Apparatus of the class described, comprising, in combination, a classification yard comprising in sequence a first stretch of tangent track, a master retarder, a second stretch of curved track, a group retarder, a third stretch of curved track, and a fourth stretch of tangent track, acceleration measuring means located adjacent the exit end of said first stretch for measuring the acceleration of a car rolling therein, bias means controlled by said acceleration measuring means for producing a first signal in accordance with the rolling resistance of said car in said first stretch, first storage means, means for applying the output of said bias means to said storage means, means located adjacent the entrance end of said master retarder for measuring the weight of said car, control means for said master retarder for reducing the leaving speed of said car from said master retarder to a value in accordance with the output of said weighing means, means located adjacent the exit end of said second stretch for measuring the leaving speed of said car from said second stretch, second storage means, means for supplying the output of said weighing means to said second storage means, means located adjacent the exit end of said second stretch for measuring the length of said car; computing means controlled by said length measuring means, said second storage means and said speed measuring means for producing a signal in accordance with the rolling resistance of said car in said second stretch; means controlled by the output of said computing means and the characteristics of said third stretch for producing a signal in accordance with the product of the length of said third stretch times the difference betwen the grade of said third stretch and the rolling resistance of the car on said third stretch, means controlled by said first storage means and adjustable in accordance with the characteristics of said fourth stretch to produce a signal in accordance with the length of said fourth stretch times the difference between the grade of said fourth stretch and the rolling resistance of said car on said fourth stretch, means for generating a signal in accordance with the square of the desired terminal velocity of said car on said fourth stretch, means for producing a signal in accordance with the difference between said velocity signal and the sum of said product signals, means for producing a signal in accordance with the square root of said last mentioned signal, and means controlled by said square root signal for adjusting the braking force exerted by said group retarder to reduce the leaving speed of said car from the group retarder to a value at which the desired terminal velocity will be secured.

28. Control apparatus for a classification yard having a plurality of storage tracks approached from a group retarder over routes controlled by switches, said storage tracks comprising straight sections of an effective length depending on the number of cars stored therein, said routes comprising curved sections of known characteristics, said goup retarder being approached by a stretch of track comprising in sequence a first stretch of tangent track of known characteristics, a master retarder, and a stretch of curved track, a radar velocity meter adjacent the exit end of said first stretch and having an antenna oriented to measure the speed of a cut of cars rolling in said first stretch, differentiating means controlled by the output of said radar velocity meter for producing a signal in accordance with the acceleration of said cut, means for biasing said signal in accordance with the grade of said first stretch to produce a second signal in accordance with the rolling resistance of said cut in said first stretch, means controlled by the occupancy of said master retarder for storing said second signal, means for measuring the rolling resistance of said cut in said second stretch, means for storing a route code for the cut identifying the route to its destination storage track, means controlling by said route code and said rolling resistance measuring means for generating a signal in accordance with the product of the length of said selected route times the difference between the grade of said route and the rolling resistance of the cut in said route, means controlled by said first storage means and adjustable in accordance with the characteristics of said storage track and the number of cars stored thereon for generating a signal in accordance wiht the product of the effective length of said storage track times the difference between the grade of said storage track and the rolling resistance of said cut in said storage track, computing means responsive to the square root of the difference between the square of the desired coupling velocity of said car on said storage track and the sum of said product signals for generating a control signal, and means responsive to said control signal for controlling the braking force exerted by said group retarder on said cut so that the cut leaves said retarder at the proper speed to cause it to couple with preceding cars on its selected storage track at said predetermined velocity.

29. In control apparatus for a classification yard having in sequence a first stretch of tangent track, a master retarder following said first stretch, a second stretch of curved track, a group retarder, and at least two storage tracks approached from said group retarder over curved portions of track including a switch, apparatus for computing the leaving speed of cuts of cars from said group retarder, comprising, in combination, means associated with said first stretch for measuring the acceleration of each cut of cars occupying said stretch, means adjustable in accordance with the grade of said first stretch and controlled by said acceleration measuring means for producing a first signal in accordance with the rolling resistance of each cut in said first stretch, means for measuring the weight of each cut, means for storing a route code identifying the storage track destination for each cut, means controlled by said route code and said weight measuring means for generating a second signal to correct for the inertia of the wheels of each cut, adjustable means for generating a third signal in accordance with prevailing weather conditions, adjustable means for generating a fourth signal in accordance with prevailing wind conditions, means for producing a fifth signal in accordance with the grade of said storage tracks, summing means responsive to said signals for producing a sixth signal in accordance with the algebraic sum thereof, means for counting the cars approaching said group retarder, storage means associated with each of said storage tracks, means controlled by said route code and said counting means for adjusting the storage means associated with the storage track in the route of each cut in accordance with the number of cars in the cut, whereby the adjusted condition of each of said storage means reflects the effective length of the associated storage track, means controlled by said summing means and said storage means for producing a seventh signal for each cut in accordance with the product of said sixth signal and a factor proportional to the remaining length of the storage track in the route for the cut, means controlled by the performance of each cut in said second stretch for producing an eighth signal in accordance with the curved track rolling resistance of the cut, means controlled by said route code and said eighth signal for producing a ninth signal for each cut in accordance with the product of said eighth signal and a factor determined by the characteristics of the storage track in the route of the cut, means controlled by said route code and said ninth signal for producing a tenth signal in accordance with the sum of said ninth signal and a second factor determined by the characteristics of the storage track in the route of the cut, means controlled by said route code and said tenth signal for producing an eleventh signal in accordance with the product of said tenth signal and a factor proportional to the length of the curved track between said group retarder and the entrance end of the storage track in the route for each cut, means for generating a twelfth signal in accordance with the square of the desired coupling velocity of each cut with the preceding cars on the storage track in its route, summing means controlled by said seventh, eleventh and twelfth signals for producing an output signal in accordance with the algebraic sum thereof, and means for deriving a signal from said output signal in accordance with the square root thereof, whereby said derived signal varies in accordance with the leaving speed of each cut from said group retarder necessary to achieve said desired coupling speed.

30. In control apparatus for a classification yard having in sequence a first stretch of tangent track, a master retarder following said first stretch, a second stretch of curved track, a group retarder and at least two storage tracks approaching from said group retarder over curved stretches of track, apparatus for computing the leaving speed of cuts of cars from said group retarder comprising, in combination, means associated with said first stretch for measuring the acceleration of each cut occupying said stretch, means adjustable in accordance with the grade of said first stretch and controlled by said acceleration means for producing a first signal in accordance with the rolling resistance of each cut in said first stretch, means for measuring the weight of each cut, means for storing a route code identifying the storage track destination for each cut, means controlled by said route code and said weight measuring means for generating a second signal to correct for the inertia of the wheels of each cut, means for producing a third signal in accordance with the grade of the storage track associated with each cut, summing means responsive to said signals for producing a fourth signal in accordance with the algebraic sum thereof, means controlled by said route code and accumulatively controlled by the number of cars in each cut and responsive to said fourth signal for producing a fifth signal in accordance with the product of said fourth signal and a factor proportional to the remaining length of the storage track in the route for each cut, means controlled by the performance of each cut in said second stretch for producing a sixth signal in accordance with the curved track rolling resistance of the cut, means controlled by said route code and said sixth signal for producing a seventh signal for each cut in accordance with the product of said sixth signal and a factor determined by the characteristics of the storage track in the route of the cut, means controlled by said route code and seventh signal for producing an eighth signal in accordance with the difference between the grade of the stretch of curved track between the group retarder and the entrance end of the storage track in the route for each cut and the rolling resistance of the cut in said stretch, means for multiplying said eighth signal by a factor proportional to the distance between said group retarder and the entrance end of the storage track in the route for each cut to produce a ninth signal, means for producing a tenth signal in accordance with the square of the desired coupling velocity of each cut with the preceding cars on the storage track in its route, summing means controlled by said fifth, ninth and tenth signals for producing an eleventh signal in accordance with the difference between said tenth signal and the sum of said fifth and ninth signals, and means for producing a twelfth signal in accordance with the square root of said eleventh signal, whereby said twelfth signal varies in accordance with the leaving speed of each cut in the group retarder necessary to couple with the preceding cars on the storage track in its selected route at said desired coupling speed.

31. A computer, comprising, in combination, means for measuring the rolling resistance of a railway car on a stretch of tangent track, means for measuring the rolling resistance of said car on a curved stretch of track, means controlled by said measuring means and adjustable in accordance with the characteristics of a second stretch of tangent track and a second stretch of curved track for producing a first signal in accordance with the difference between the grade of said second stretch of tangent track and the rolling resistance of said car therein, and a second signal proportional to the difference between the grade of said second stretch of surved track and the rolling resistance of said car therein, means for producing a signal in accordance with the square of the desired speed of said car after passing through said second stretches in sequence, means for multiplying each of said difference signals by a factor proportional to the length of the associated one of said second stretches, means for producing a signal in accordance with the difference between said square signal and the sum of said product signals, and means for producing an output signal in accordance with the square root of said last mentioned signal.

References Cited by the Examiner

UNITED STATES PATENTS

| | | | |
|---|---|---|---|
| 2,045,201 | 6/1936 | Rabourdin | 246—182 |
| 2,814,996 | 12/1957 | Albrighton | 246—182 |
| 2,819,682 | 1/1958 | Falkowski | 246—182 |
| 2,954,462 | 9/1960 | Utt et al. | 246—182 X |

(Other references on following page)

UNITED STATES PATENTS

| | | | |
|---|---|---|---|
| 2,964,617 | 12/1960 | Mishelevich et al. | 246—182 |
| 2,976,401 | 3/1961 | Berill | 246—182 X |
| 3,046,394 | 7/1962 | Mishelevich et al. | 246—182 |
| 3,054,892 | 9/1962 | Mowery | 246—182 |
| 3,056,022 | 9/1962 | Phelps | 246—182 |
| 3,125,315 | 3/1964 | Kendall et al. | 246—182 |
| 3,162,405 | 12/1964 | Robison | 246—182 X |
| 3,169,736 | 2/1965 | Brown | 246—182 |
| 3,172,628 | 3/1965 | Bone et al. | 246—182 |
| 3,175,082 | 3/1965 | Mishelevich | 246—182 |
| 3,182,188 | 5/1965 | Berill | 246—182 |

FOREIGN PATENTS

| | | |
|---|---|---|
| 208,415 | 5/1957 | Australia. |
| 921,845 | 1/1947 | France. |
| 746,735 | 3/1956 | Great Britain. |
| 756,499 | 9/1956 | Great Britain. |

OTHER REFERENCES

An article titled "Automation for Freight Yards," written by A. V. Dasburg and appearing on pages 986–990 in the November 1955 issue of "Electrical Engineering."

A thesis prepared by Wilhelm Koth and titled "Die Laufzielstenerung in der Ablanfdynamik," Germany, 151 pages. This thesis was available for public inspection on October 29, 1953.

ARTHUR L. LA POINT, *Primary Examiner.*

LEO QUACKENBUSH, JAMES S. SHANK, *Examiners.*

L. J. LEONNIG, S. T. KRAWCZEWICZ,
*Assistant Examiners.*